US007925077B2

(12) United States Patent
Woodfill et al.

(10) Patent No.: US 7,925,077 B2
(45) Date of Patent: Apr. 12, 2011

(54) GENERATION OF A DISPARITY RESULT WITH LOW LATENCY

(75) Inventors: John Iselin Woodfill, San Francisco, CA (US); Henry Harlyn Baker, Los Altos, CA (US); Brian Von Herzen, Carson City, NV (US); Robert Dale Alkire, San Jose, CA (US)

(73) Assignee: Tyzx, Inc., Menlo Park, CA (US)

( * ) Notice: Subject to any disclaimer, the term of this patent is extended or adjusted under 35 U.S.C. 154(b) by 0 days.

(21) Appl. No.: 12/362,562

(22) Filed: Jan. 30, 2009

(65) Prior Publication Data

US 2009/0136091 A1 May 28, 2009

Related U.S. Application Data

(63) Continuation of application No. 11/187,613, filed on Jul. 21, 2005, now Pat. No. 7,567,702, which is a continuation of application No. 10/020,862, filed on Dec. 14, 2001, now abandoned, which is a continuation of application No. 09/641,610, filed on Aug. 17, 2000, now Pat. No. 6,456,737, which is a continuation of application No. 08/839,767, filed on Apr. 15, 1997, now Pat. No. 6,215,898.

(51) Int. Cl.
*G06K 9/00* (2006.01)

(52) U.S. Cl. .......................... 382/154; 382/278; 348/46

(58) Field of Classification Search .................. 382/106, 382/107, 154, 278, 303, 304; 348/42, 43, 348/46, 47; 708/422, 424
See application file for complete search history.

(56) References Cited

U.S. PATENT DOCUMENTS

| | | | | |
|---|---|---|---|---|
| 3,946,696 | A | 3/1976 | Lubnow | 114/221 R |
| 4,067,027 | A | 1/1978 | Yamazaki | 354/79 |
| 4,418,993 | A | 12/1983 | Lipton | 352/57 |
| 4,717,958 | A | 1/1988 | Gal et al. | 358/222 |
| 4,751,570 | A | 6/1988 | Robinson | 358/88 |
| 4,761,066 | A | 8/1988 | Carter | 350/510 |
| 4,879,596 | A | 11/1989 | Miura et al. | 358/88 |
| 4,905,081 | A | 2/1990 | Morton | 358/88 |
| 5,004,328 | A | 4/1991 | Suzuki et al. | 350/416 |
| 5,049,988 | A | 9/1991 | Sefton et al. | 358/93 |
| 5,063,441 | A | 11/1991 | Lipton et al. | 358/88 |
| 5,142,357 | A | 8/1992 | Lipton et al. | 358/88 |
| 5,179,441 | A | 1/1993 | Anderson et al. | 358/88 |
| 5,206,503 | A | 4/1993 | Toops | 250/234 |
| 5,270,861 | A | 12/1993 | Estelle | 359/676 |
| 5,402,171 | A | 3/1995 | Tagami et al. | 348/219 |
| 5,440,343 | A | 8/1995 | Parulski et al. | 348/316 |
| 5,453,784 | A | 9/1995 | Krishnan et al. | 348/348 |
| 5,453,785 | A | 9/1995 | Lenhardt et al. | 348/357 |
| 5,454,064 | A | 9/1995 | Castelaz | 395/21 |
| 5,548,327 | A | 8/1996 | Gunday et al. | 348/97 |
| 5,633,491 | A | 5/1997 | Kasdan | 250/201.3 |
| 5,652,616 | A | 7/1997 | Chen et al. | 348/43 |
| 5,712,483 | A | 1/1998 | Boone et al. | 250/367 |
| 5,719,954 | A | 2/1998 | Onda | 382/154 |
| 5,721,608 | A | 2/1998 | Taniguchi | 355/53 |
| 5,727,078 | A | 3/1998 | Chupeau | 382/154 |
| 5,764,871 | A | 6/1998 | Fogel | 395/127 |
| 5,767,922 | A | 6/1998 | Zabih et al. | 348/700 |
| 5,768,404 | A | 6/1998 | Morimura et al. | 382/107 |
| 5,812,191 | A | 9/1998 | Orava et al. | 348/308 |
| 5,819,120 | A | 10/1998 | Hamada et al. | 396/77 |
| 5,861,994 | A | 1/1999 | Kelly | 359/630 |
| 5,864,630 | A | 1/1999 | Cosatto et al. | 382/103 |
| 5,917,937 | A | 6/1999 | Szeliski et al. | 382/154 |
| 5,969,760 | A | 10/1999 | Ernest et al. | 348/357 |
| 6,028,672 | A | 2/2000 | Geng | 356/376 |
| 6,038,071 | A | 3/2000 | Chikazawa | 359/464 |
| 6,115,482 | A | 9/2000 | Sears et al. | 382/114 |
| 6,141,036 | A | 10/2000 | Katayama et al. | 348/47 |

(Continued)

FOREIGN PATENT DOCUMENTS

DE 4304529 C1 6/1994

(Continued)

OTHER PUBLICATIONS

U.S. Appl. No. 12/191,891, filed Mar. 14, 2008, Baker et al.
"Spherically Symmetrical Lenses and Associated Equipment for Wide Angle Aerial Photography," Office of Scientific Research ad Development, National Defense Research Committee, Optical Research Laboratory; Harvard University, Contract No. OEMsr-474, Nov. 30, 1945, 121 pgs.
Appenzeller et al, "A Low-Cost Real-Time Stereo Vision System for Looking at People," Proc. of IEEE International Symposium on Industrial Electronics, 1997, vol. 3, pp. 767-722.

(Continued)

*Primary Examiner* — Andrew W Johns
(74) *Attorney, Agent, or Firm* — Van Pelt, Yi & James LLP

(57) ABSTRACT

A powerful, scaleable, and reconfigurable image processing system and method of processing data therein is described. This general purpose, reconfigurable engine with toroidal topology, distributed memory, and wide bandwidth I/O are capable of solving real applications at real-time speeds. The reconfigurable image processing system can be optimized to efficiently perform specialized computations, such as real-time video and audio processing. This reconfigurable image processing system provides high performance via high computational density, high memory bandwidth, and high I/O bandwidth. Generally, the reconfigurable image processing system and its control structure include a homogeneous array of 16 field programmable gate arrays (FPGA) and 16 static random access memories (SRAM) arranged in a partial torus configuration. The reconfigurable image processing system also includes a PCI bus interface chip, a clock control chip, and a datapath chip. It can be implemented in a single board. It receives data from its external environment, computes correspondence, and uses the results of the correspondence computations for various post-processing industrial applications. The reconfigurable image processing system determines correspondence by using non-parametric local transforms followed by correlation. These non-parametric local transforms include the census and rank transforms. Other embodiments involve a combination of correspondence, rectification, a left-right consistency check, and the application of an interest operator.

26 Claims, 153 Drawing Sheets

U.S. PATENT DOCUMENTS

| | | | | |
|---|---|---|---|---|
| 6,141,434 | A | 10/2000 | Christian et al. | 382/103 |
| 6,188,777 | B1 | 2/2001 | Darrell et al. | 382/103 |
| 6,204,880 | B1 | 3/2001 | Nishimura | 348/240 |
| 6,215,898 | B1 | 4/2001 | Woodfill et al. | 382/154 |
| 6,456,737 | B1 | 9/2002 | Woodfill et al. | 382/154 |
| 6,587,148 | B1 | 7/2003 | Takeda et al. | 348/342 |
| 6,661,918 | B1 | 12/2003 | Gordon et al. | 382/173 |
| 6,693,666 | B1 | 2/2004 | Baker et al. | 348/219.1 |
| 6,807,290 | B2 | 10/2004 | Liu et al. | 382/118 |
| 6,967,678 | B2 | 11/2005 | Baker et al. | 348/219.1 |
| 7,317,830 | B1 | 1/2008 | Gordon et al. | 382/173 |
| 7,486,311 | B2 | 2/2009 | Baker et al. | 348/219.1 |
| 7,567,702 | B2 * | 7/2009 | Woodfill et al. | 382/154 |
| 2006/0013473 | A1 | 1/2006 | Woodfill et al. | 382/154 |

FOREIGN PATENT DOCUMENTS

| | | | |
|---|---|---|---|
| EP | 0512403 | A2 | 11/1992 |
| GB | 2210530 | A | 6/1989 |
| JP | 2238576 | A | 9/1990 |
| JP | 05288532 | A | 11/1993 |
| JP | 7303207 | A | 11/1995 |

OTHER PUBLICATIONS

Baker et al., "Realtime Stereo and Motion Integration for Navigation," ISPRS Commission III, IC Working Group V/III, Aug. 1994, pp. 17-24.

Gordon et al., "Integrated person tracking using stereo, color and pattern detection," Proceedings of the IEEE Conference on Computer Vision and Pattern Recognition, Jun. 25, 1998, 10 pgs.

Gordon, et al, "Background Estimation and Removal Based on Range and Color," Interval Research Corporation, 1999, 7 pages.

Hannah, "Computer Matching of Areas in Stereo Images," Dissertation, Jul. 1974, 100 pgs.

Kanade, et al., "A Stereo Machine for Video-rate Dense Depth Mapping and Its New Applications," Proceedings of the 15th Computer Vision and Patter Recognition Conference, Jun. 18-20, 1996m San Francisco, 7 pgs.

Kanade, et al., "Development of a Video-Rate Stereo Machine," Proceedings of the International Robotics and Systems Conference, Aug. 5-9, 1995, Pittsburgh, PA, pp. 95-100.

Kayaalp et al., "A Pipeline Architecture for Near Real-time Stereo Range Detection," 1007 SPIE Mobile Robots III, 1988, pp. 279-286.

Kim, Sang-Hoon et al, "Facial Region Detection Using Range Color Information," IEICE Transactions on Information and Systems, JP, Institute of Electronics Information and Comm. Eng. Tokyo, vol. E81-D, No. 9, Sep. 1998, pp. 968-975.

Lewis, "WFOV Star Tracker Camera," Sensors and Sensor Systems for Guidance and Navigation, 1991, SPIE, vol. 1478, pp. 2-12.

Malassiotis et al, "Coding of video-conference stereo image sequences using 3D models," Signal Processing: Image Communication, vol. 9, No. 2, Jan. 1997, pp. 125-135, Elsevier Science, Amsterdam, NL.

McDonnell, "Box-Filtering Techniques," 17 Computer Graphics and Image Processing, 17, 1981. pp. 65-70.

Nickerson, S.B., et al, "The ARK project: Autonomous Mobile Robots for Known Industrial Environments"; Robotics and Autonomous Systems, NL, Elsevier Science Publishers, Amsterdam, vol. 25, No. 1-2, Oct. 1998, pp. 83-104.

Park et al. "Realtime Tracking System for the Wide-Field-of-View Telescope Project," Acquisition, Tracking, and Pointing, Proceedings of SPIE—The International Society for Optical Engineering, Mar. 27-29, 1989, Orlando Florida, SPIE Series, vol. 1111, 10 pgs.

Taniguchi, et al, "Scene Interpretation by Fusing Intermediate Results of Multiple Visual Sensory Information Processing," Proc. IEEE International Conference on MFI 1994, Multi-sensor Fusion and Integration for Intelligence Systems, pp. 699-706.

Woodfill, "Motion, Vision and Tracking for Robots in Dynamic, Unstructured Environment," Dissertation, pp. 10-151, Aug. 1992.

Woodfill, John, "Real-Time Stereo Vision on the PARTS Reconfigurable Computer," IEEE Symposium on FPGAs for Custom Computing Machines, Apr. 1997, 10 pgs.

Yoshida, "Real-Time Stereo Vision with Multiple Arrayed Camera," Proceedings of the 1992 IEEE International Conference on Robotics and Automation, Nice, France, May 1992, pp. 1765-1770.

Zabih, et al., "Individual Unknown Objects by Combining Motion and Stereo," Dissertation, Aug. 1994, 124 pgs.

Zabih, R. and Woodfill, J., "Non-parametric Local Transforms for Computing Visual Correspondence," Proceedings of the third European conference on Computer Vision, 1994, vol. II, pp. 151-158, Springer-Verlag New York, Inc.

Non-Final Office Action for U.S. Appl. No. 12/191,891, Mail Date Oct. 2, 2009, 15 pages.

* cited by examiner

CENSUS TRANSFORM
&
CENSUS VECTORS

CORRELATION SUM & DISPARITY OPTIMIZATION (REGIONS 7 & 8)

INTEREST
OPERATION

INTEREST OPERATION (REGION 10)

LEFT - RIGHT CONSISTENCY CHECK

MODE FILTER

MODE FILTER
( REGIONS 1 & 2 )

MODE FILTER
( REGIONS 3 & 4)

MODE FILTER
(REGION 5)

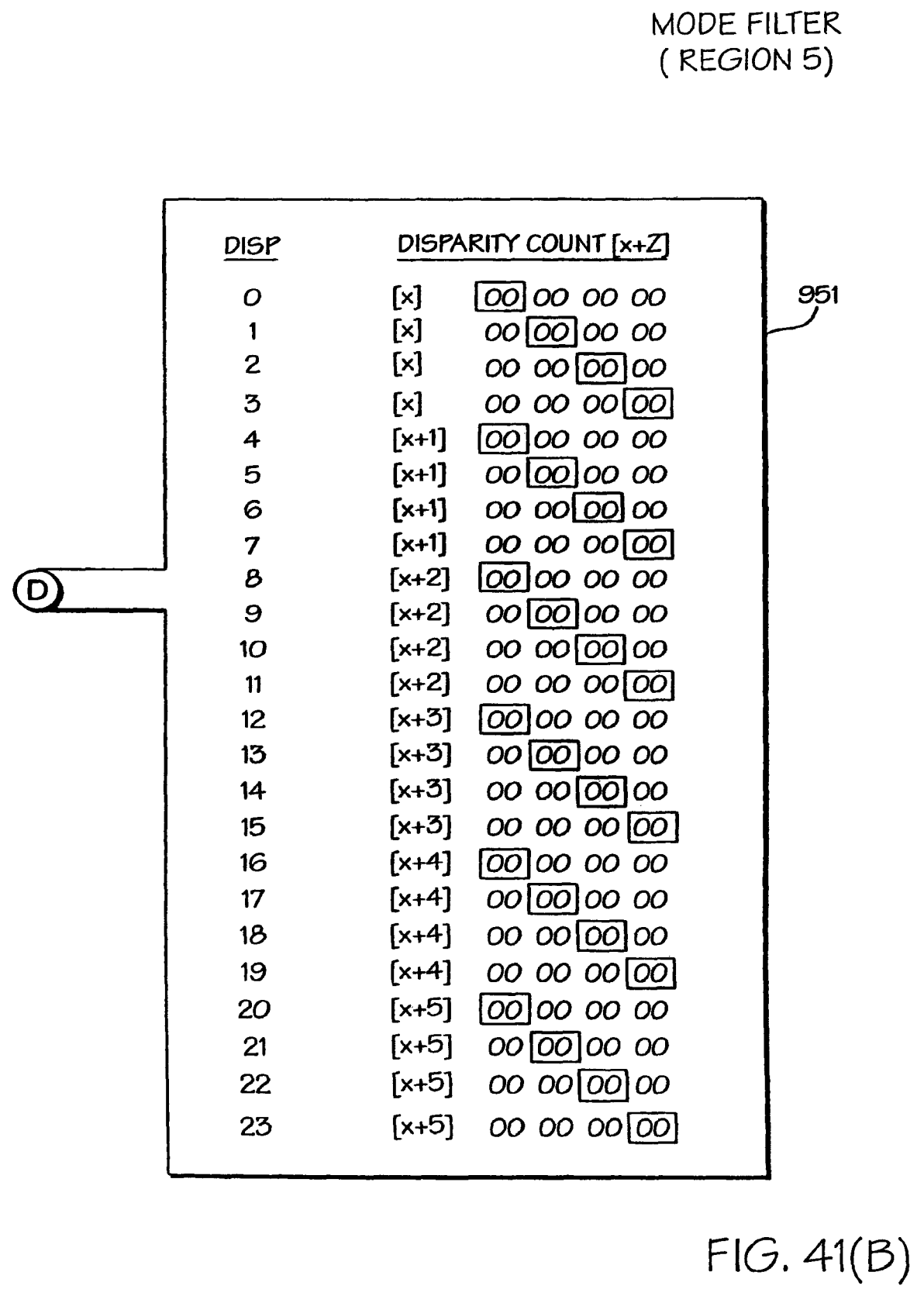

MODE FILTER
( REGION 5)

D

951

| DISP | DISPARITY COUNT [x+Z] | | | | |
|---|---|---|---|---|---|
| 0 | [x] | 00 | 00 | 00 | 00 |
| 1 | [x] | 00 | 00 | 00 | 00 |
| 2 | [x] | 00 | 00 | 00 | 00 |
| 3 | [x] | 00 | 00 | 00 | 00 |
| 4 | [x+1] | 00 | 00 | 00 | 00 |
| 5 | [x+1] | 00 | 00 | 00 | 00 |
| 6 | [x+1] | 00 | 00 | 00 | 00 |
| 7 | [x+1] | 00 | 00 | 00 | 00 |
| 8 | [x+2] | 00 | 00 | 00 | 00 |
| 9 | [x+2] | 00 | 00 | 00 | 00 |
| 10 | [x+2] | 00 | 00 | 00 | 00 |
| 11 | [x+2] | 00 | 00 | 00 | 00 |
| 12 | [x+3] | 00 | 00 | 00 | 00 |
| 13 | [x+3] | 00 | 00 | 00 | 00 |
| 14 | [x+3] | 00 | 00 | 00 | 00 |
| 15 | [x+3] | 00 | 00 | 00 | 00 |
| 16 | [x+4] | 00 | 00 | 00 | 00 |
| 17 | [x+4] | 00 | 00 | 00 | 00 |
| 18 | [x+4] | 00 | 00 | 00 | 00 |
| 19 | [x+4] | 00 | 00 | 00 | 00 |
| 20 | [x+5] | 00 | 00 | 00 | 00 |
| 21 | [x+5] | 00 | 00 | 00 | 00 |
| 22 | [x+5] | 00 | 00 | 00 | 00 |
| 23 | [x+5] | 00 | 00 | 00 | 00 |

FIG. 41(B)

MODE FILTER
(REGION 6)

MODE FILTER
(REGION 6)

MODE FILTER
( REGIONS 7 & 8 )

980

A

| DISP | DISPARITY COUNT [x+Z] | | | | |
|---|---|---|---|---|---|
| 0 | [x] | **00** | 00 | 00 | 00 |
| 1 | [x] | 00 | **00** | 00 | 00 |
| 2 | [x] | 00 | 00 | **00** | 00 |
| 3 | [x] | 00 | 00 | 00 | **00** |
| 4 | [x+1] | **00** | 00 | 00 | 00 |
| 5 | [x+1] | 00 | **00** | 00 | 00 |
| 6 | [x+1] | 00 | 00 | **00** | 00 |
| 7 | [x+1] | 00 | 00 | 00 | **00** |
| 8 | [x+2] | **00** | 00 | 00 | 00 |
| 9 | [x+2] | 00 | **00** | 00 | 00 |
| 10 | [x+2] | 00 | 00 | **00** | 00 |
| 11 | [x+2] | 00 | 00 | 00 | **00** |
| 12 | [x+3] | **00** | 00 | 00 | 00 |
| 13 | [x+3] | 00 | **00** | 00 | 00 |
| 14 | [x+3] | 00 | 00 | **00** | 00 |
| 15 | [x+3] | 00 | 00 | 00 | **00** |
| 16 | [x+4] | **00** | 00 | 00 | 00 |
| 17 | [x+4] | 00 | **00** | 00 | 00 |
| 18 | [x+4] | 00 | 00 | **00** | 00 |
| 19 | [x+4] | 00 | 00 | 00 | **00** |
| 20 | [x+5] | **00** | 00 | 00 | 00 |
| 21 | [x+5] | 00 | **00** | 00 | 00 |
| 22 | [x+5] | 00 | 00 | **00** | 00 |
| 23 | [x+5] | 00 | 00 | 00 | **00** |

FIG. 43(B)

MODE FILTER
( REGION 9)

MODE FILTER
( REGION 10)

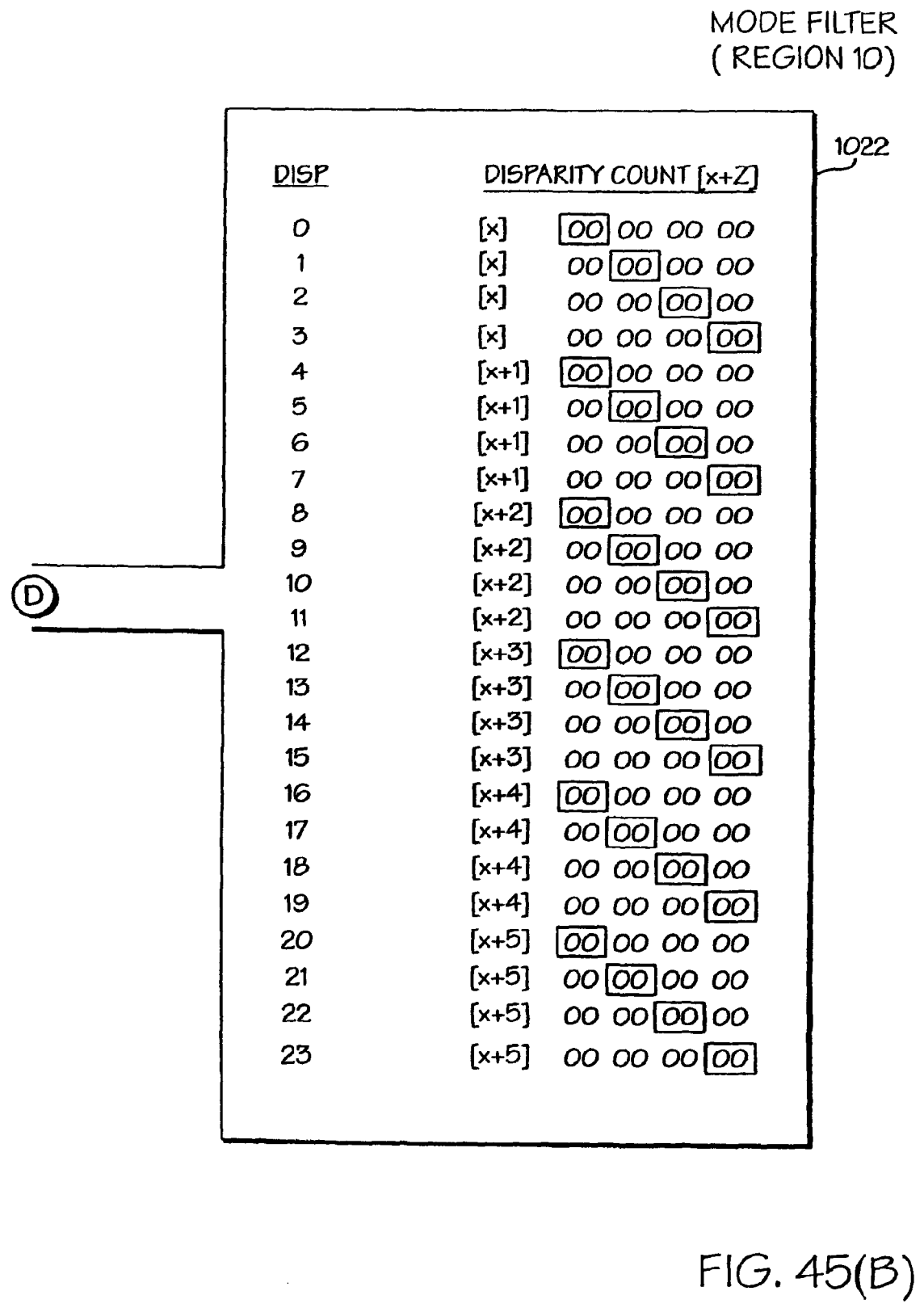

MODE FILTER
( REGION 10)

1022

D

| DISP | DISPARITY COUNT [x+Z] | | | | |
|---|---|---|---|---|---|
| 0 | [x] | 00 | 00 | 00 | 00 |
| 1 | [x] | 00 | 00 | 00 | 00 |
| 2 | [x] | 00 | 00 | 00 | 00 |
| 3 | [x] | 00 | 00 | 00 | 00 |
| 4 | [x+1] | 00 | 00 | 00 | 00 |
| 5 | [x+1] | 00 | 00 | 00 | 00 |
| 6 | [x+1] | 00 | 00 | 00 | 00 |
| 7 | [x+1] | 00 | 00 | 00 | 00 |
| 8 | [x+2] | 00 | 00 | 00 | 00 |
| 9 | [x+2] | 00 | 00 | 00 | 00 |
| 10 | [x+2] | 00 | 00 | 00 | 00 |
| 11 | [x+2] | 00 | 00 | 00 | 00 |
| 12 | [x+3] | 00 | 00 | 00 | 00 |
| 13 | [x+3] | 00 | 00 | 00 | 00 |
| 14 | [x+3] | 00 | 00 | 00 | 00 |
| 15 | [x+3] | 00 | 00 | 00 | 00 |
| 16 | [x+4] | 00 | 00 | 00 | 00 |
| 17 | [x+4] | 00 | 00 | 00 | 00 |
| 18 | [x+4] | 00 | 00 | 00 | 00 |
| 19 | [x+4] | 00 | 00 | 00 | 00 |
| 20 | [x+5] | 00 | 00 | 00 | 00 |
| 21 | [x+5] | 00 | 00 | 00 | 00 |
| 22 | [x+5] | 00 | 00 | 00 | 00 |
| 23 | [x+5] | 00 | 00 | 00 | 00 |

FIG. 45(B)

MODE FILTER
( REGION 10)

15 IMAGE ELEMENTS (1 TO 15 FOR L; 1' TO 15' FOR R)
D=5 (d={0, 1, 2, 3, 4})

GENERATION OF A DISPARITY RESULT WITH LOW LATENCY

CROSS-REFERENCE TO RELATED APPLICATION(S)

This application is a continuation of U.S. patent application Ser. No. 11/187,613, entitled DATA PROCESSING SYSTEM AND METHOD filed Jul. 21, 2005, now U.S. Pat. No. 7,567,702, which is incorporated herein by reference for all purposes; and which is a continuation of U.S. patent application Ser. No. 10/020,862, entitled DATA PROCESSING SYSTEM AND METHOD filed Dec. 14, 2001, now abandoned, which is incorporated herein by reference for all purposes; and which is a continuation of U.S. patent application Ser. No. 09/641,610, entitled DATA PROCESSING SYSTEM AND METHOD filed Aug. 17, 2000, now U.S. Pat. No. 6,456,737, which is incorporated herein by reference for all purposes; and which is a continuation of U.S. patent application Ser. No. 08/839,767, entitled DATA PROCESSING SYSTEM AND METHOD filed Apr. 15, 1997, now U.S. Pat. No. 6,215,898, which is incorporated herein by reference for all purposes.

TECHNICAL FIELD

The present invention relates generally to data processing. More particularly, the present invention relates to determining correspondence between related data sets, and to the analysis of such data. In one application, the present invention relates to image data correspondence for real time stereo and depth/distance/motion analysis.

BACKGROUND

Certain types of data processing applications involve the comparison of related data sets, designed to determine the degree of relatedness of the data, and to interpret the significance of differences which may exist. Examples include applications designed to determine how a data set changes over time, as well as applications designed to evaluate differences between two different simultaneous views of the same data set.

Such applications may be greatly complicated if the data sets include differences which result from errors or from artifacts of the data gathering process. In such cases, substantive differences in the underlying data may be masked by artifacts which are of no substantive interest.

For example, analysis of a video sequence to determine whether an object is moving requires performing a frame-by-frame comparison to determine whether pixels have changed from one frame to another, and, if so, whether those pixel differences represent the movement of an object. Such a process requires distinguishing between pixel differences which may be of interest (those which show object movement) and pixel differences introduced as a result of extraneous artifacts (e.g., changes in the lighting). A simple pixel-by-pixel comparison is not well-suited to such applications, since such a comparison cannot easily distinguish between meaningful and meaningless pixel differences.

A second example of such problems involves calculation of depth information from stereo images of the same scene. Given two pictures of the same scene taken simultaneously, knowledge of the distance between the cameras, focal length, and other optical lens properties, it is possible to determine the distance to any pixel in the scene (and therefore to any related group of pixels, or object). This cannot be accomplished through a simple pixel-matching, however, since (a) pixels at a different depth are offset a different amount (this makes depth calculation possible); and (b) the cameras may have slightly different optical qualities. Since differences created by the fact that pixels at different depths are offset different amounts is of interest, while differences created as an artifact of camera differences is not of interest, it is necessary to distinguish between the two types of differences.

In addition, it may be useful to perform such comparisons in real-time. Stereo depth analysis, for example, may be used to guide a robot which is moving through an environment. For obvious reasons, such analysis is most useful if performed in time for the robot to react to and avoid obstacles. To take another example, depth information may be quite useful for video compression, by allowing a compression algorithm to distinguish between foreground and background information, and compress the latter to a greater degree than the former.

Accurate data set comparisons of this type are, however, computationally intensive. Existing applications are forced to either use very high-end computers, which are too expensive for most real-world applications, or to sacrifice accuracy or speed. Such algorithms include Sum of Squared Differences ("SSD"), Normalized SSD and Lapalacian Level Correlation. As implemented, these algorithms tend to exhibit some or all of the following disadvantages: (1) low sensitivity (the failure to generate significant local variations within an image); (2) low stability (the failure to produce similar results near corresponding data points); and (3) susceptibility to camera differences. Moreover, systems which have been designed to implement these algorithms tend to use expensive hardware, which renders them unsuitable for many applications.

Current correspondence algorithms are also incapable of dealing with factionalism because of limitations in the local transform operation. Factionalism is the inability to adequately distinguish between distinct intensity populations. For example, an intensity image provides intensity data via pixels of whatever objects are in a scene. Near boundaries of these objects, the pixels in a some local region in the intensity image may represent scene elements from two distinct intensity populations. Some of the pixels come from the object, and some from other parts of the scene. As a result, the local pixel distribution will in general be multimodal near a boundary. An image window overlapping this depth discontinuity will match two half windows in the other image at different places. Assuming that the majority of pixels in such a region fall on one side of the depth discontinuity, the depth estimate should agree with the majority and not with the minority. This poses a problem for many correspondence algorithms. If the local transform does not adequately represent the intensity distribution of the original intensity data, intensity data from minority populations may skew the result. Parametric transforms, such as the mean or variance, do not behave well in the presence of multiple distinct sub-populations, each with its own coherent parameters.

A class of algorithms known as non-parametric transforms have been designed to resolve inefficiencies inherent in other algorithms. Non-parametric transforms map data elements in one data set to data elements in a second data set by comparing each element to surrounding elements in their respective data set, then attempt to locate elements in the other data set which have the same relationship to surrounding elements in that set. Such algorithms are therefore designed to screen out artifact-based differences which result from differences in the manner in which the data sets were gathered, thereby allowing concentration on differences which are of significance.

The rank transform is one non-parametric local transform. The rank transform characterizes a target pixel as a function of how many surrounding pixels have a higher or lower intensity than the target pixel. That characterization is then compared to characterizations performed on pixels in the other data set, to determine the closest match.

The census transform is a second non-parametric local transform algorithm. Census also relies on intensity differences, but is based on a more sophisticated analysis than rank, since the census transform is based not simply on the number of surrounding pixels which are of a higher or lower intensity, but on the ordered relation of pixel intensities surrounding the target pixel. Although the census transform constitutes a good algorithm known for matching related data sets and distinguishing differences which are significant from those which have no significance, existing hardware systems which implement this algorithm are inefficient, and no known system implements this algorithm in a computationally efficient manner.

In the broader field of data processing, a need exists in the industry for a system and method which analyze data sets to determine relatedness, extract substantive information that is contained in these data sets, and filter out other undesired information. Such a system and method should be implemented in a fast and efficient manner. The present invention provides such a system and method and provides solutions to the problems described above.

SUMMARY

The present invention provides solutions to the aforementioned problems. One object of the present invention is to provide an algorithm that analyzes data sets, determine their relatedness, and extract substantive attribute information contained in these data sets. Another object of the present invention is to provide an algorithm that analyzes these data sets and generates results in real-time. Still another object of the present invention is to provide a hardware implementation for analyzing these data sets. A further object of the present invention is to introduce and incorporate these algorithm and hardware solutions into various applications such as computer vision and image processing.

The various aspects of the present invention include the software/algorithm, hardware implementations, and applications, either alone or in combination. The present invention includes, either alone or in combination, an improved correspondence algorithm, hardware designed to efficiently and inexpensively perform the correspondence algorithm in real-time, and applications which are enabled through the use of such algorithms and such hardware.

One aspect of the present invention involves the improved correspondence algorithm. At a general level, this algorithm involves transformation of raw data sets into census vectors, and use of the census vectors to determine correlations between the data sets.

In one particular embodiment, the census transform is used to match pixels in one picture to pixels in a second picture taken simultaneously, thereby enabling depth calculation. In different embodiments, this algorithm may be used to enable the calculation of motion between one picture and a second picture taken at different times, or to enable comparisons of data sets representing sounds, including musical sequences.

In a first step, the census transform takes raw data sets and transforms these data sets using a non-parametric operation. If applied to the calculation of depth information from stereo images, for example, this operation results in a census vector for each pixel. That census vector represents an ordered relation of the pixel to other pixels in a surrounding neighborhood. In one embodiment, this ordered relation is based on intensity differences among pixels. In another embodiment, this relation may be based on other aspects of the pixels, including hue.

In a second step, the census transform algorithm correlates the census vectors to determine an optimum match between one data set and the other. This is done by selecting the minimum Hamming distance between each reference pixel in one data set and each pixel in a search window of the reference pixel in the other data set. In one embodiment, this is done by comparing summed Hamming distances from a window surrounding the reference pixel to sliding windows in the other data set. The optimum match is then represented as an offset, or disparity, between one of the data sets and the other, and the set of disparities is stored in an extremal index array or disparity map.

In a third step, the algorithm performs the same check in the opposite direction, in order to determine if the optimal match in one direction is the same as the optimal match in the other direction. This is termed the left-right consistency check. Pixels that are inconsistent may be labeled and discarded for purposes of future processing. In certain embodiments, the algorithm may also applies an interest operator to discard displacements in regions which have a low degree of contrast or texture, and may apply a mode filter to select disparities based on a population analysis.

A second aspect of the present invention relates to a powerful and scaleable hardware system designed to perform algorithms such as the census transform and the correspondence algorithm. This hardware is designed to maximize data processing parallelization. In one embodiment, this hardware is reconfigurable via the use of field programmable devices. However, other embodiments of the present invention may be implemented using application specific integrated circuit (ASIC) technology. Still other embodiments may be in the form of a custom integrated circuit. In one embodiment, this hardware is used along with the improved correspondence algorithm/software for real-time processing of stereo image data to determine depth.

A third aspect of the present invention relates to applications which are rendered possible through the use of hardware and software which enable depth computation from stereo information. In one embodiment, such applications include those which require real-time object detection and recognition. Such applications include various types of robots, which may include the hardware system and may run the software algorithm for determining the identity of and distance to objects, which the robot might wish to avoid or pick up. Such applications may also include video composition techniques such as z-keying or chromic keying (e.g., blue-screening), since the depth information can be used to discard (or fail to record) information beyond a certain distance, thereby creating a blue-screen effect without the necessity for either placing a physical screen into the scene or of manually processing the video to eliminate background information.

In a second embodiment, such applications include those which are enabled when depth information is stored as an attribute of pixel information associated with a still image or video. Such information may be useful in compression algorithms, which may compress more distant objects to a greater degree than objects which are located closer to the camera, and therefore are likely to be of more interest to the viewer. Such information may also be useful in video and image editing, in which it may be used, for example, to create a composite image in which an object from one video sequence is inserted at the appropriate depth into a second sequence.

BRIEF DESCRIPTION OF THE DRAWINGS

The above objects and description of the present invention may be better understood with the aid of the following text and accompanying drawings.

FIG. 5(A) shows the relative window positioning for a given disparity when the right image is designated as the reference, while FIG. 5(B) shows the relative window positioning for a given disparity when the left image is designated as the reference.

FIGS. 16(A)-16(D) show the relative window shifting for the disparities when either the right image or the left image is designated as the reference; FIGS. 16(E)-16(F) show a portion of the left and right census vectors; and FIG. 16(G) shows the structure of the correlation sum buffer and the image elements and corresponding disparity data stored therein.

FIGS. 41(A)-(D) show a flow chart of one embodiment of the mode filter for region 5.

FIGS. 43(A)-(B) show a flow chart of one embodiment of the mode filter for regions 7 and 8.

FIGS. 45(A)-(D) show a flow chart of one embodiment of the mode filter for region 10.

DETAILED DESCRIPTION

I. Overview

A. General

Figure 1:
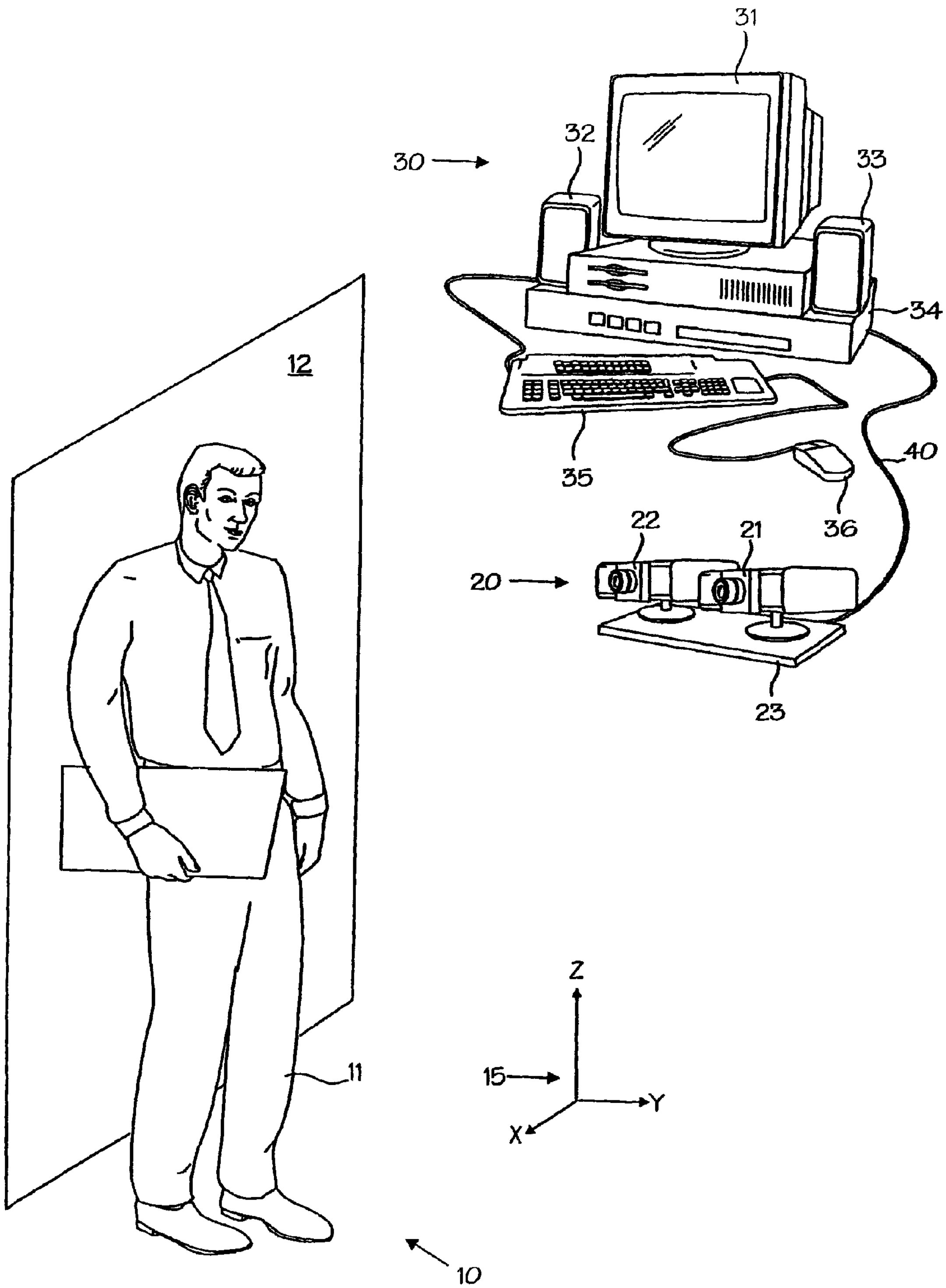
FIG. 1 shows a particular industrial application of the present invention in which two sensors or cameras capture data with respect to a scene and supply the data to the computing system.

An objective of the present invention is to provide high-performance, fast and efficient analysis of related data sets. The invention incorporates three related aspects: algorithm/software, hardware implementation, and industrial applications. Thus, the various embodiments of the present invention can: (1) determine whether these data sets or some portions of these data sets are related by some measure; (2) determine how these data sets or some portions of these data sets are related; (3) utilize a transform scheme that converts the original information in the data sets in such a manner that a later-extracted information sufficiently represents the original substantive information; (4) extract some underlying substantive information from those data sets that are related; and (5) filter out other information, whether substantive or not, that do not significantly contribute to the underlying information that is desired by the user. Each of these aspects is discussed in greater detail in the following sections.

One aspect of the present invention is the software/algorithm implementation, generally called the correspondence algorithms. Generally, one embodiment of the correspondence algorithms involves the following steps: 1) transform the "raw" data sets into vectors; and 2) use the vectors to determine the correlation of the data sets. The end result is a disparity value that represents the best correlation between a data element in one data set to a data element in the other data set. In other words, the optimum disparity also represents the distance between one data element in one data set to its best match data element in the other data set.

The transform portion of one embodiment of the correspondence algorithms used in the present invention constitute a class of transform algorithms known as non-parametric local transforms. Such algorithms are designed to evaluate related data sets in order to determine the extent or nature of the relatedness, and may be particularly useful for data sets which, although related, may differ as a result of differences in the data collection techniques used for each set.

In particular embodiments, the correspondence algorithms of the present invention may incorporate some or all of the following steps, each of which is described in greater detail below: (1) acquire two or more related data sets; (2) utilize a transform operation on data in both data sets, the transform operating to characterize data elements according to their relationship with other data elements in the same data set; (3) use the transformed characterization to correlate data elements in one data set with data elements in the other data set; (4) filter the results in a manner designed to screen out results which appear anomalous or which do not meet a threshold or interest operator; (5) report or use the results in a useful format.

In another embodiment of the software/algorithm aspect of the present invention, the census and correlation steps are performed in parallel and pipelined fashion. The systolic nature of the algorithm promotes efficiency and speed. Thus, the census vectors (or the correlation window) in one image are correlated with each of their respective disparity-shifted census vectors (or the correlation window) in the other image in a parallel and pipelined manner. At the same time as this correlation step, the left-right consistency checks are performed. Thus, optimum disparities and left-right consistency checks of these disparities are performed concurrently.

The hardware aspect of the present invention represents a parallel pipelined computing system designed to perform data set comparisons efficiently and at low cost. Data is processed in a systolic nature through the pipeline. This image processing system provides high performance via high computational density, high memory bandwidth, and high I/O bandwidth. Embodiments of this hardware include a flexible topology designed to support a variety of data distribution techniques. Overall throughput is increased by distributing resources evenly through the array board of the present invention. One such topology is a torus configuration for the reconfigurable system.

In one embodiment, the hardware system of the present invention is reconfigurable, in that it can reconfigure its hardware to suit the particular computation at hand. If, for example, many multiplications are required, the system is configured to include many multipliers. As other computing elements or functions are needed, they may also be modeled or formed in the system. In this way, the system can be optimized to perform specialized computations, including real-time video or audio processing. Reconfigurable systems are also flexible, so that users can work around minor hardware defects that arise during manufacture, testing or use.

In one embodiment, the hardware aspect of the present invention constitutes a reconfigurable image processing system designed as a two-dimensional array of computing elements consisting of FPGA chips and fast SRAMs to provide the computational resources needed for real-time interactive multi-media applications. In one embodiment, the computing system comprises a 4×4 array of computing elements, a datapath unit, a PCI interface unit, and a clock control unit. The computing elements implement the census transform, determine correlation, and perform other transmission functions. The datapath unit controls the routing of data to various computing elements in the array. The PCI interface unit provides an interface to the PCI bus. The clock control unit generates and distributes the clock signals to the computing elements, the datapath unit, and the PCI interface unit.

The applications aspect of the present invention include applications related to processing of images or video, in which the algorithm may be used for a variety of purposes, including depth measurement and motion tracking. Information derived from the algorithm may be used for such purposes as object detection and recognition, image comprehension, compression and video editing or compositing.

Although the various aspects of the present invention may be used for a variety of applications, one illustrative embodiment will be used to illustrate the nature of the invention. In this embodiment, a variety of nonparametric local transform known as the census transform is applied to images received from two cameras used to simultaneously record the same scene. Each pixel in each image is represented as an intensity value. The pixels are transformed into "census vectors," representing the intensity relationship of each pixel to selected surrounding pixels (i.e., whether the intensity of the target pixel is higher or lower than that of the other pixels). Census vectors from a window surrounding a target pixel in one image are then compared to census vectors from a variety of windows in the other image, with the comparisons being represented as summed Hamming distances. The summed Hamming distances are used to determine a likely match between a target pixel in one image and the same pixel in the other image. That match is then represented as a disparity, or offset, based on the difference between the xy-coordinate of the pixel in one image and the xy-coordinate of the matching pixel in the other image. Results are then subject to error-detection and threshholding, including reversing the direction of the comparison to determine if the same matching pixels are found when the comparison is done in the other direction (left-right consistency check), examining the texture in the image to determine whether the results have a high enough confidence (interest operation), and applying a population analysis of the resulting disparities (mode filter).

Once pixels from one image have been mapped onto pixels in the other image, and the disparities are known, the distance from the cameras to the scene in each image may be calculated. This distance, or depth, may then be used for a variety of applications, including object detection (useful for a robot moving through an environment) and object recognition (object edges may be determined based on depth disparities, and objects may be more easily recognized since the distance to the object may be used to determine the object's gross three-dimensional structure). One particular embodiment of the steps in the algorithm include:

1) Receive input images from the two cameras.
2) Rectify input images so that epipolar lines are scan lines in the resulting imagery. Note that this step can be omitted if this constraint is already satisfied.
3) Transform the input images using a local transform, such as the census transform. This is done on each intensity image separately
4) Determine stereo matches by computing the Hamming distance between two transformed pixels P and Q, where P is a transformed pixel for one input image and Q is a transformed pixel in a search window for a second input image. If P is the reference pixel, the Hamming distance is computed between pixel P and each of the pixels in the other image that represents the displacement (i.e., shift or disparity) from the reference pixel P for all allowable disparities.
5) Sum these Hamming distances over a rectangular correlation window using sliding sums and determine the displacement of the minimum summed Hamming distance over the search window.
6) Optionally perform a left-right consistency check by conceptually repeating step 3 above with the reference images reversed to determine that the resulting displacements are inverses. Label pixels that are inconsistent.
7) Optionally apply an interest operator to the input images. Displacements in regions without sufficient contrast or texture can be labeled as suspect.
8) Apply a mode filter to select disparities based on a population analysis.
9) For each pixel in the reference image, produce a new image comprising the displacement to the corresponding pixel in the other image that is associated with the minimal summed Hamming distance, along with annotations about left-right consistency, interest confidence, and mode filter disparity selection.

Here, the software/algorithm is an image processing algorithm which receives two images, one image from the left camera and the other image from the right camera. The intensity images represent the distinct but somewhat related data sets. The algorithm takes two intensity images as input, and produces an output image consisting of a disparity for each image pixel. The census transform generates census vectors for each pixel in both images. Again, the minimum Hamming distance of all the Hamming distances in a search window for a given census vector/pixel is selected as the optimum Hamming distance. The disparity that is associated with this optimum Hamming distance is then used for various post-processing applications.

The output is optionally further processed to give a measure of confidence for each result pixel, and thresholded based on image noise characteristics. If one or more such schemes are used, the initial disparity selected is only temporary until it passes the confidence/error detection check. Any combination of three confidence/error detection checks can be used in this system—left-right consistency check, interest operation, and mode filter.

The left-right consistency check is a form of error detection. This check determines and confirms whether an image element in the left image that has been selected as the optimal image element by an image element in the right image will also select that same image element in the right image as its optimal image element. The interest operation determines whether the intensity images are associated with a high level of confidence based on the texture of the scene that has been captured. Thus, correspondence computations that are associated with image elements of a scene that is of uniform texture has a lower confidence value than those scenes where the texture is more varying. The mode filter determines whether the optimal disparities selected have a high degree of consistency by selecting disparities based on population analysis. In one embodiment, the mode filter counts the occurrence of each disparity in a window and selects the disparity with the greatest count for that window.

In some embodiments, the image processing system receives data from its external environment, computes correspondence, and uses the results of the correspondence computations for various post-processing industrial applications such as distance/depth calculations, object detection, and object recognition. The following image processing system of the present invention can implement several variations and embodiments of the correspondence algorithm. The algorithm will be described in more detail below. In implementing the correspondence algorithm for stereo vision, one embodiment of the image processing system receives pairs of stereo images as input data from a PCI bus interface in non-burst mode and computes 24 stereo disparities. The pairs of input data can be from two spatially separated cameras or sensors or a single camera or sensor which receives data in a time division manner. Another embodiment uses only 16 disparities. Other embodiments use other numbers of disparities.

This complete system includes image capture, digitization, stereo and/or motion processing, and transmission of results. Other embodiments are not limited to image or video data. These other embodiments use one or more sensors for capturing the data and the algorithm processes the data.

As a general note, a reconfigurable image processing system is a machine or engine that can reconfigure its hardware to suit the particular computation at hand. If lots of multiplications are needed, the system is configured to have a lot of multipliers. If other computing elements or functions are needed, they are modeled or formed in the system. In this way, the computer can be optimized to perform specialized computations, for example real-time video or audio processing, more efficiently. Another benefit of a reconfigurable image processing system is its flexibility. Any minor hardware defects such as shorts that arise during testing or debugging do not significantly affect production. Users can work around these defects by rerouting required signals using other lines.

Most computers for stereo vision applications execute their instructions sequentially in time, whereas the present invention executes its instructions concurrently, spread out over the area of the reconfigurable image processing system. To support such computations, the reconfigurable image processing system of the present invention has been designed as a two-dimensional array of computing elements consisting of FPGA chips and fast SRAMs to provide the computational resources needed for real-time interactive multi-media applications.

In the discussions that follow for the various figures, the terms "image data" and "image element" are used to represent all aspects of the data that represents the image at various levels of abstraction. Thus, these terms may mean a single pixel, a group of pixels, a transformed (census or rank) image vector, a Hamming correlation value of a single data, a correlation sum, an extremal index, an interest operation sum, or a mode filter index depending on the context.

B. PCI-Compliant System

FIG. 1 shows a particular industrial application of the present invention in which two sensors or cameras capture data with respect to an object and supply the data to the computing system. A scene 10 to be captured on video or other image processing system includes an object 11 and background 12. In this illustration, the object 11 is a man carrying a folder. This object 11 can either be stationary or moving. Note that every element in the scene 10 may have varying characteristics including texture, depth, and motion. Thus, the man's shirt may have a different texture from his pants and the folder he is carrying.

As shown by the x-y-z coordinate system 15, the scene is a three-dimensional figure. The present invention is equally capable of capturing one and two dimensional figures. Note that the various embodiments of the present invention can determine distance/depth with knowledge of the relative spacing of the two cameras, pixel spacing, the focal length, lens properties, and the disparity which will be determined in real time in these embodiments. Thus, according to Dana H. Ballard & Christopher M. Brown, COMPUTER VISION 19-22 (1982), which is incorporated herein by reference, $$z = f - \frac{2df}{x'' - x'}$$

where, z is the depth position, f is the focal length, 2d is the camera spacing baseline, and x"-x' is the disparity.

Camera/sensor system 20 captures the image for further processing by computing system 30. Camera/sensor system 20 includes a left camera 21 and a right camera 22 installed on a mounting hardware 23. The cameras 21 and 22 may also be sensors such as infrared sensors. The size of the cameras in this illustration has been exaggerated for pedagogic or instructional purposes. The cameras may actually be much smaller than the depiction. For example, the cameras may be implemented in a pair of glasses as worn by an individual.

Although this particular illustration shows the use of a mounting hardware 23, such mounting hardware as shown in FIG. 1 is not necessary to practice the present invention. The cameras can be directly mounted to a variety of objects without the use of any mounting hardware.

In other embodiments, only a single camera is used. The single camera may or may not be in motion. Thus, distinct images can be identified by their space/time attributes. Using a single camera, the "left" image may correspond to an image captured at one time, and the "right" image may correspond to an image captured at another time. The analysis then involves comparing successive frames; that is, if a, b, c, and d represent successive frames of images captured by the single camera, a and b are compared, then b and c, then c and d, and so on. Similarly, the single camera may shift or move between two distinct positions (i.e., left position and right position) back and forth and the captured images are appropriately designated or assigned to either the left or right image.

The left camera 21 and right camera 22 capture a pair of stereo images. These cameras may be either analog or digital. Digital cameras include those distributed by Silicon Vision. Since the invention operates on digital information, if the system includes analog cameras, the picture information must be converted into digital form using a digitizer (not shown).

The frame grabber may be installed either in the camera system 20 or in the computing system 30. Usually, the frame grabber has a digitizer to convert incoming analog signals to digital data streams. If no digitizer is provided in the frame grabber, a separate digitizer may be used. Image data is transferred from the camera/sensor system 20 to the computing system 30 via cables or wires 40.

As known to those ordinarily skilled in the art, intensity data in the form of analog signals are initially captured by the camera/sensor system 20. The analog signals can be represented by voltage or current magnitude. The camera/sensor system translates this voltage or current magnitude into a luminance value ranging from 0 to 255, in one embodiment, where 0 represents black and 255 represents white. In other embodiments, the luminance value can range from 0 to 511. To represent these 0 to 255 luminance values digitally, 8 bits are used. This 8-bit value represents the intensity data for each pixel or image element. In other embodiments, the camera/sensor system is an infrared sensor that captures temperature characteristics of the scene being imaged. This temperature information can be translated to intensity data and used in the same manner as the luminance values.

The computing system 30 includes a computer 34, multimedia speakers 32 and 33, a monitor 31, and a keyboard 35 with a mouse 36. This computing system 30 may be a stand-alone personal computer, a network work station, a personal computer coupled to a network, a network terminal, or a special purpose video/graphics work station.

In the embodiment shown, the hardware and algorithm used for processing image data are found in computer 34 of the computing system 30. The computing system complies with the Peripheral Component Interconnect (PCI) standard. In one embodiment, communication between the PC or workstation host and the reconfigurable image processing system is handled on the PCI bus.

Live or video source data are sent over the PCI bus into the image processing system with images coming from frame grabbers. Alternatively, cameras can send video data directly into the connectors of the image processing system by either: (1) using an analog input, digitizing the image signals using a digitizer in a daughter card, and passing the digitized data into the image processing system while compensating for the noise, or (2) using a digital camera. The disparity calculation of the image processing system produces real-time video in which brightness corresponds to proximity of scene elements to the video cameras.

Figure 2:
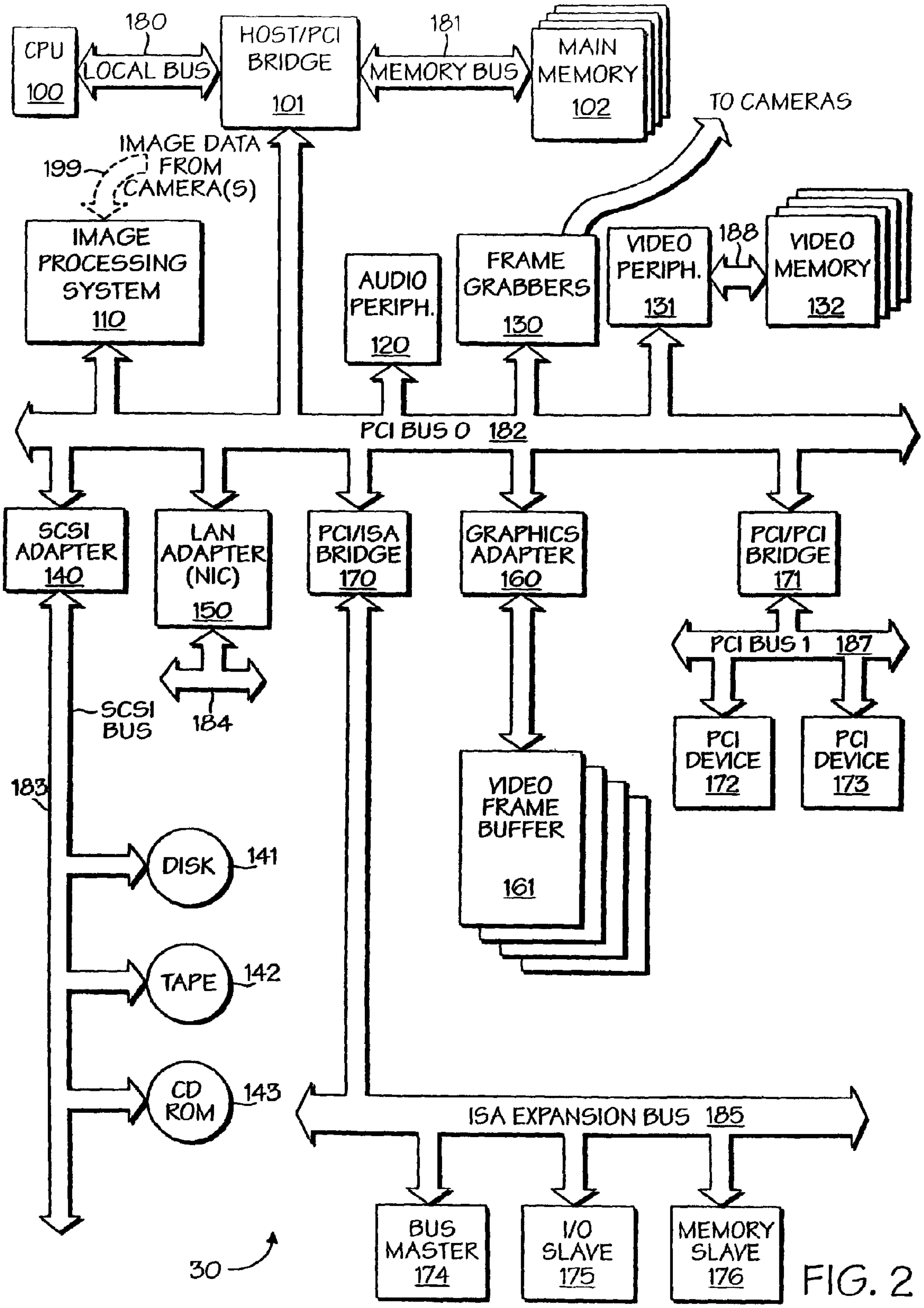
FIG. 2 shows in block diagram form a PCI-compliant bus system in which the present invention can be implemented.

FIG. 2 shows a Peripheral Component Interconnect (PCI) compliant system where the image processing system of the present invention can fit in one or more PCI cards in a personal computer or workstation. The PCI compliant system may be found in computing system 30. One embodiment of the present invention is a image processing system 110 coupled to a PCI bus 182. The host computing system includes a CPU 100 coupled to a local bus 180 and a host/PCI bridge 101. Furthermore, the host processor includes a memory bus 181 coupled to main memory 102. This host processor is coupled to the PCI bus 182 via the host/PCI bridge 101. Other devices that may be coupled to the PCI bus 182 include audio peripherals 120, video peripherals 131, video memory 132 coupled to the video peripherals 131 via bus 188, SCSI adapter 140, local area network (LAN) adapter 150, graphics adapter 160, and several bridges. These bridges include a PCI/ISA bridge 170, a PCI/PCI bridge 171, and the previously mentioned host/PCI bridge 101. The SCSI adapter 140 may be coupled to several SCSI devices such as disk 141, tape drive 142, and CD ROM 143, all coupled to the SCSI adapter 140 via SCSI bus 183. The LAN adapter 150 allows network interface for the computing system 30 via network bus 184. Graphics adapter 160 is coupled to video frame buffers 161 via bus 186. The PCI/PCI bridge 171 permits multiple PCI buses and PCI devices to be interconnected in a single system without undue loads while permitting substantially optimal bus access by bus masters. PCI/PCI bridge 171 couples exemplary PCI devices 172 and 173 to PCI bus 187. The PCI/ISA bridge 170 permits ISA devices to be coupled to the same system. PCI/ISA bridge 170 is coupled to bus master 174, I/O slave 175, and memory slave 176 via ISA expansion bus 185. Frame grabber 130 provides image data to the image processing system 110 of the present invention via PCI bus 182. Note that the image processing system 110 is also coupled to the local host processor 100 via the same PCI bus 182.

As is known to those ordinarily skilled in the art, a frame grabber such as frame grabber 130 provides the image processing system with the ability to capture and display motion video, screen stills, and live video overlays. Existing frame grabbers are fully compatible with Video for Windows, PCMCIA, or PCI and can grab single frames. These frame grabbers can receive input from various sources including camcorders, video recorders, VCRs, videodisc, security cameras, any standard NTSC or PAL compatible sources, any device that outputs an NTSC signal on an RCA type jack, or any nonstandard video signals.

In the described embodiment, the frame grabber produces an array of pixels, or digital picture elements. Such pixel arrays are well-known. The described embodiment uses the intensity information produced by the cameras to create an array of numbers, where each number corresponds to the intensity of light falling on that particular position. Typically the numbers are 8 bits in precision, with 0 representing the darkest intensity value and 255 the brightest. Typical values for X (the width of the image) and Y (the height of the image) are 320×240, 640×240 and 640×480. Information captured for each pixel may include chrominance (or hue) and luminance (known herein as "intensity").

In alternative embodiments, the image data need not be provided through the PCI system along PCI bus 182 via frame grabber 130. As shown in the dotted line arrow 199, image data from the cameras/frame grabbers can be delivered directly to the image processing system 110.

This PCI-compliant system computes 24 stereo disparities on 320×240 pixel images at 42 frames per second, and produces dense results in the form of 32 bits of census data. Running at this speed, the image processing system performs approximately 2.3 billion RISC-equivalent instructions per second (2.3 giga-ops per second), sustains over 500 million bytes (MB) of memory access per second, achieves I/O subsystem bandwidth of 2 GB/sec, and attains throughput of approximately 77 million point x disparity measurements (PDS) per second. With a burst PCI bus interface, the system can achieve 225 frames per second using approximately 12.4 billion RISC equivalent operations per second and 2,690 MB/sec of memory access. The pairs of input data can be from two spatially separated cameras or sensors or a single camera or sensor which receives data in a time division manner.

C. Array Board

Figure 3:
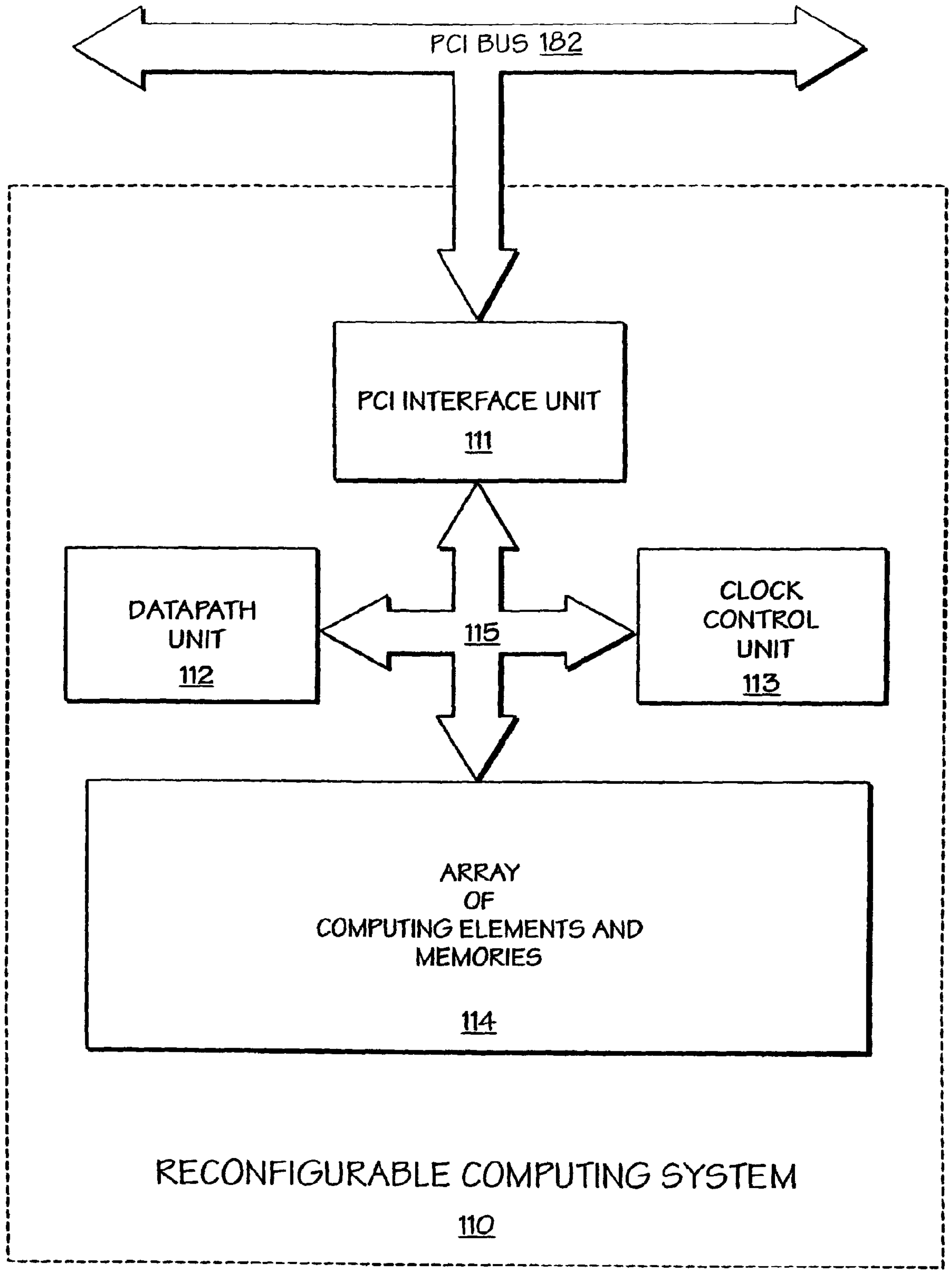
FIG. 3 shows a particular block diagram representation of the present invention, including the computing elements, datapath unit, clock control unit, and a PCI interface unit.

As shown in FIG. 3, the image processing system 110 which is coupled to PCI bus 182 includes an array of computing elements and memories 114, a PCI interface unit 110, a data path unit 112, a clock control unit 113, and several interconnecting buses 115. The array 114 includes a homogeneous array of sixteen (16) field programmable gate arrays (FPGA) and sixteen (16) static random access memories (SRAM) arranged in a partial torus configuration. It can be implemented in a single board. The ASIC and custom integrated circuit implementations, of course, do not use reconfigurable elements and do not have torus configurations.

The array of sixteen FPGAs performs the census transform, correlation, error checks (e.g., left-right consistency checks), and various transmission functions. These functions are built into the FPGAs via appropriate programming of applicable registers and logic. One embodiment of the present invention processes data in a systolic manner. For each scan line of the intensity image, the parallel and pipelined architecture of the present invention allows comparisons of each census vector (i.e., each image element) in one image with each of its census vectors in its search window in the other image. In one embodiment, the output of this parallel and pipelined system is a left-right optimal disparity number, a left-right minimum summed Hamming distance for a window, a right-left optimal disparity number, and a right-left minimum summed Hamming distance for a window for each data stream that has a complete search window.

When used in a PCI-compliant computing system, a PCI interface unit controls the traffic of the image data (for read operations) and correspondence data (for write operations) between the PCI bus and the image processing array of computing elements. Furthermore, the PCI host can contain two or three such image processing systems resulting in a more dense and flexible package in a single standard personal computer. The host computer communicates directly to a PCI interface unit through a PCI controller on the motherboard. The interface for the PCI bus can be burst or non-burst mode.

The datapath unit 112 is responsible for transporting data to and from various select portions of the array and for managing the 64-bit PCI bus extension. The datapath unit 112 has been programmed with control structures that permit bi-directional data transmission between the host processor and the array and manage data communications tasks. The pipelined datapaths between array chips run at 33 MHz and higher. While the datapath unit 112 controls data communications between the array and the PCI bus, it also connects directly to the 64-bit extension of the PCI bus. The datapath unit 112 is programmed by the PCI-32 chip and can be reconfigured dynamically as applications require.

Once the clock control unit 113 and datapath unit 112 are configured, the clock control unit 113 can configure the rest of the array. It passes configuration data to the array directly, sending 16 bits at a time, one bit to each of the 16 array computing elements (FPGAs and SRAMs). When the array has been fully programmed, the clock control chip manages the clock distribution to the entire array.

In one embodiment, the image processing system requires a three-level bootstrapping process to completely configure the board. The PCI interface unit 110 directly connects the image processing system to the PCI bus. This programs the datapath and clock control chips, which in turn program the entire array. The PCI interface unit 110 can accept configuration bits over the PCI bus and transmits them to the datapath unit 112 and clock control unit 113.

Having described the basic hardware and system of the present invention, the various embodiments of the algorithms to be implemented will now be described. Further details of the hardware and implemented system will be described later.

II. Algorithm/Software

A. Overview

Although the present invention relates to a class of algorithms, and to the use of those algorithms for a variety of applications, the correspondence algorithms can best be explained through a description of a particular software embodiment, which use a census transform to create depth information. This algorithm will first be explained in high-level overview, with following sections describing various steps in greater detail. In the Exemplary Program section of this specification, the program called MAIN provides the general operation and flow of one embodiment of the correspondence algorithm of the present invention.

The first step in the algorithm is to rectify the images. This is done on each intensity image separately. Rectification is the process of remapping images so that the epipolar constraint lines of stereo correspondence are also scan lines in the image. This step may be useful if camera alignment may be improper, or if lens distortion may warp each image in a different manner. The rectification step is, however, optional, and may not be necessary if the original images are of such a quality that lines from one image can successfully be mapped onto lines in the other image without rectification.

The second step in the algorithm is to apply a non-parametric local transform, such as census or rank, on the rectified images. In the embodiment which will be discussed, the algorithm used is the census transform. This operation transforms the intensity map for each image into a census map, in which each pixel is represented by a census vector representing the intensity relationship between that pixel and surrounding pixels.

The third step is correlation. This step operates on successive lines of the transform images, updating a correlation summation buffer. The correlation step compares the transform values over a window of size $X_{WIN} \times Y_{WIN}$ in reference transform image 2 (the right image) to a similar window in transform image 1 (the left image), displaced by an amount called the disparity. The comparison is performed between the reference image element in one image with each image element in the other image within the reference image element's search window.

At the same time as the correlation step is proceeding, a confidence value can also be computed by performing a left-right consistency check and/or summing an interest calculation over the same correlation window. The results of the interest operator for each new line are stored in one line of the window summation buffer. The left-right consistency check and the interest operation are optional.

The correlation step results in the calculation of a disparity result image. Two computations are performed here: (1) determining the optimal disparity value for each image element, and (2) determining low confidence image intensity or disparity results. Optimal disparity computation involves generating an extremal index that corresponds to the minimum summed correlation value. This picks out the disparity of the best match. The second computation eliminates some disparity results as low-confidence, on the basis of (a) interest operation in the form of a thresholded confidence values from the intensity values, (b) a left-right consistency check on the correlation summation buffer, and (c) a mode filter to select disparities based on population analysis. The end result of the algorithm is an image of disparity values of approximately the size of the original images, where each pixel in the disparity image is the disparity of the corresponding pixel in intensity image 2.

Figure 4:
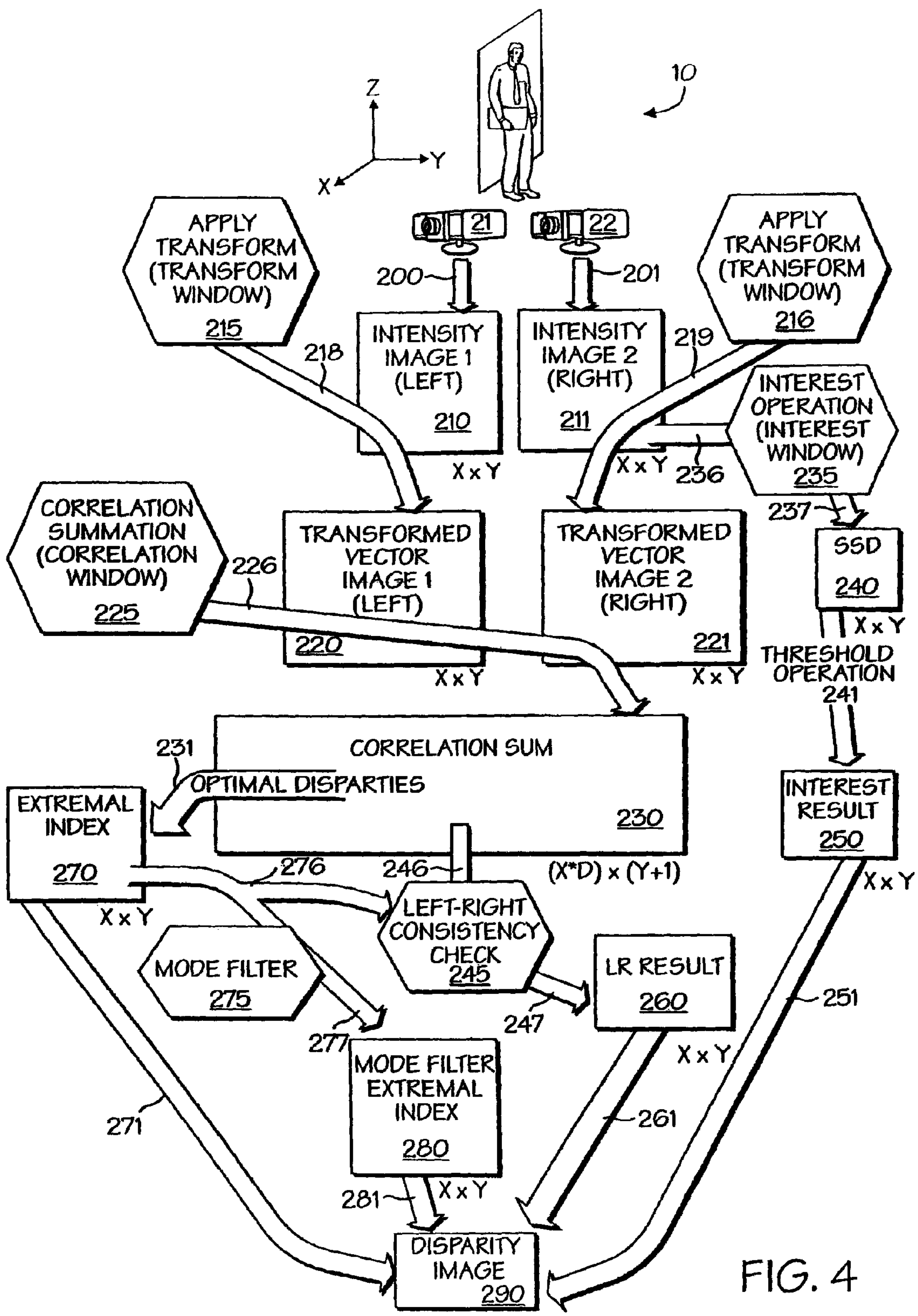
FIG. 4 shows a high level representation of one embodiment of the present invention in which the various functionality operate on, handle, and manipulate the data to generate other useful data.

FIG. 4 shows a high level representation of one embodiment of the present invention in which the various functions operate on, handle, and manipulate the image data to generate other useful data. One of the ultimate goals of this embodiment of the present invention is to generate disparity image 290, which is a set of selected optimal disparities for each image element in the original images. To obtain this disparity image, the image data must be transformed, correlated, and checked for error and confidence.

Scene 10 is captured by a left camera 21 and right camera 22. Appropriate frame grabbers and digitizers provide image data to the reconfigurable image processing system of the present invention. Left image data 200 and right image data 201 in the form of individual pixel elements and their respective intensities are mapped onto a left intensity image 210 and a right intensity image 211. These images are each of width X and height Y (X×Y). A non-parametric local transform, such as the census transform or the rank transform, is applied to each of these intensity images. A transform 215 is applied to the left intensity image 210 as represented by arrow 218 to generate a transformed vector left image 220. Analogously, a transform 216 is applied to the right intensity image 211 as represented by arrow 219 to generate a transformed vector right image 221. These transforms are applied to substantially all of the image elements in these two intensity images in a neighborhood or window of each image element. Accordingly, the size of the window and the location of the reference image elements determine which image elements on the edges of the intensity image are ignored in the transform calculations. Although these ignored image elements are not used as reference image elements, they may still be used in the calculation of the transform vectors for other reference image elements.

The present invention further includes a correlation summation process. The correlation summation process is one step in the correspondence determination between the left image and the right image. The correlation summation process 225 operates on the transform vectors within a correlation window for the left image 220 and the transform vectors within the same size correlation window for the right image 221 to generate a correlation sum matrix 230 as represented by a single arrow 226. In generating this correlation sum matrix 230, either the left or the right image is used as the reference, and the window in the other image is shifted. If the right image is treated as the reference, the correlation sum matrix 230 includes data that represents how each image element in the right image 221 within a correlation window correlates or corresponds with a left image element within its correlation window for each of the shifts or disparities of the left image element from the right image element. By definition, data that represents the correlation or correspondence of a particular left image element with various shifts or disparities of the right image element is also included in the correlation sum matrix 230. Based on these disparity-based correlation sums and the correlation sum matrix 230, optimal disparities as represented by arrow 231 may be selected for each right image element and stored in an extremal index array 270. A final disparity image 290 can then be determined with the extremal index array 270 as represented by arrow 271. In the case of stereo, the disparities are horizontal offsets between the windows in transform image 1 and the windows in transform image 2. In the case of motion, the disparities range over vertical offsets as well, and the second transform image must read in more lines in order to have windows with vertical offsets. This will be described later with respect to FIG. 58.

The disparity image determination may include three optional confidence/error detection checks: interest operation, left-right consistency check, and the mode filter. Interest operation determines whether the intensity images are associated with a high level of confidence based on the texture of the scene that has been captured. Thus, correspondence computations that are associated with image elements of a scene that is of uniform texture has a lower confidence value than those scenes where the texture is more varying. Interest operation is applied to only one of the intensity images—either the left or the right. However, other embodiments may cover interest operations applied to both intensity images. In FIG. 4, interest operation 235 is applied to the right intensity image as represented by arrow 236 to generate a sliding sum of differences (SSD) array 240 as represented by arrow 237 for each image element within an interest window. Upon applying a threshold operation 241, a final interest result array 250 is generated. The interest result includes data that reflects whether a particular image element has passed the confidence threshold established in this image processing system. Based on the data in the interest result array 250, the disparity image 290 may be determined in conjunction with the extremal index array 270.

The left-right consistency check is a form of error detection. This check determines and confirms whether an image element in the left image that has been selected as the optimal image element by an image element in the right image will also select that same image element in the right image as its optimal image element. The left-right consistency check 245 is applied to the correlation sum array 230 as represented by arrow 246 and compared to the extremal index array 270 as shown by arrow 276 to generate an LR result array 260 as represented by arrow 247. The LR result array 260 includes data that represents those image elements that pass the left-right consistency check. The LR result array 260 is used to generate the disparity image 290 as represented by arrow 261 in conjunction with the extremal index array 270.

The third confidence/error detection check is the mode filter. The mode filter determines whether the optimal disparities selected have a high degree of consistency by selecting disparities based on population analysis. Thus, if the chosen optimal disparities in the extremal index array 270 do not exhibit a high degree of consistency, then these optimal disparities are discarded. Mode filter 275 operates on the extremal index array 270 as represented by arrow 276 to generate a mode filter extremal index array 280 as represented by arrow 277. The mode filter extremal index array 280 includes data that represents whether a particular image element has selected a disparity that has passed its disparity consistency check. The data and the mode filter extremal index array 280 can be used to generate the disparity image 290 as represented by arrow 281 in conjunction with the extremal index array 270.

Note that these three confidence/error detection checks are optional. While some embodiments may employ all three checks in the determination of the disparity image 290, other embodiments may include none of these checks. Still further embodiments may include a combination of these checks. Alternatively, a single program that contains the interest operation, left-right consistency check, and the mode filter can be called once by MAIN. In this single program, the window sizes and locations of the reference points in their respective windows can be done once at the beginning of this confidence/error detection check program.

Although this figure illustrates the use of various memories for temporary storage of results, some embodiments may dispense with the need to store results. These embodiments performs the various operations above in parallel and in a pipelined manner such that the results obtained from one stage in the pipeline is used immediately in the next stage. Undoubtedly, some temporary storage may be necessary to satisfy timing requirements. For example, the left-right consistency check occurs in parallel with the correlation operation. The output of the pipeline generates not only the right-to-left optimal disparities for each image element but also the left-to-right optimal disparities. When a check is made, the result is not necessarily stored in an LR Result array 260. Such storage is necessary if the results must be off-loaded to another processor or some historical record is desired of the image processing.

B. Windows and Reference Points

The preceding section presented an overview of the correspondence algorithm. This section provides a more detailed description of certain concepts used in later sections, which describe the steps of the algorithm in greater detail.

Figures 5A, 5B:
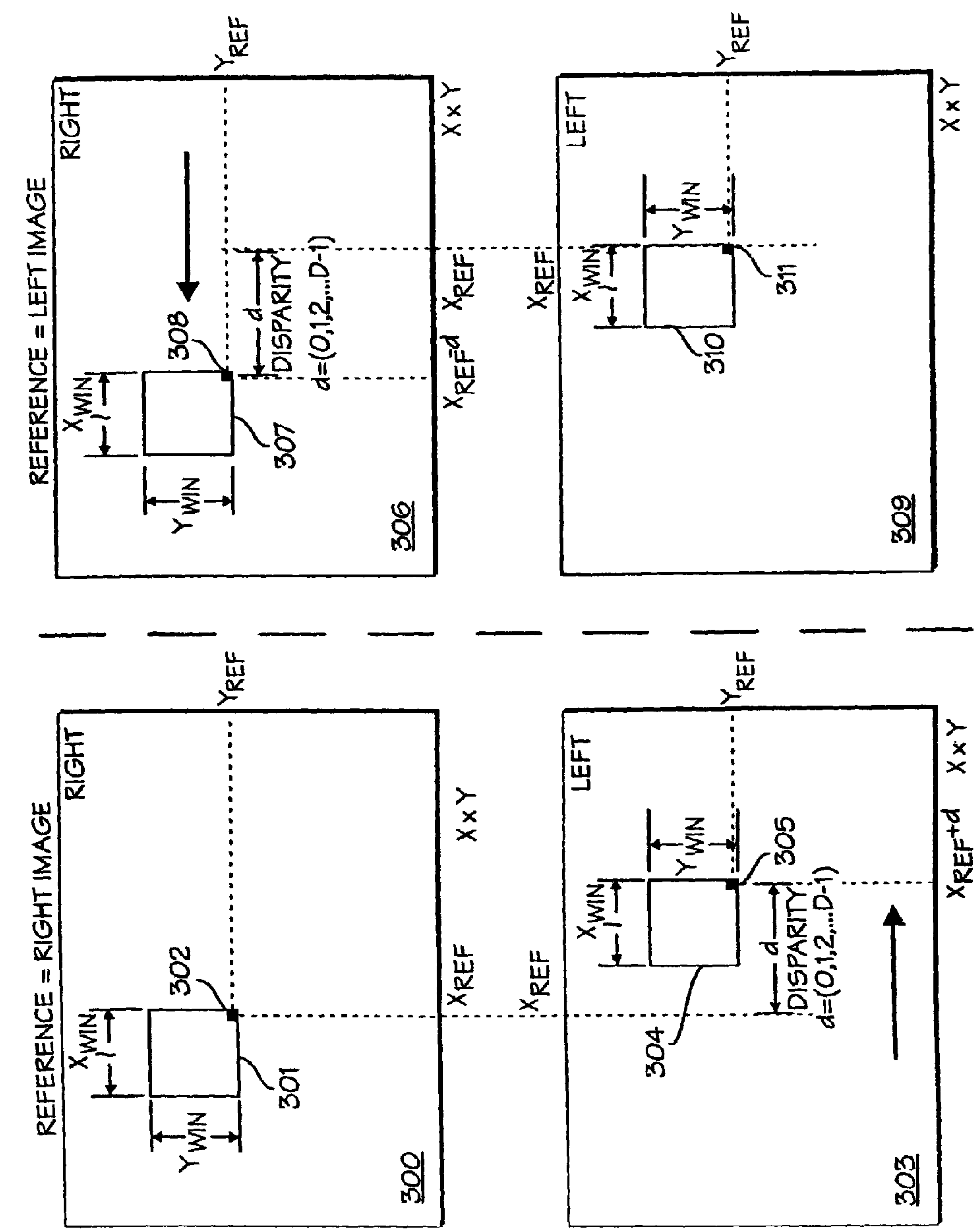

FIGS. 5(A) and 5(B) illustrate the concepts of window or neighborhood, reference image element, reference image, and disparity. FIG. 5(A) shows the relative window positioning for a given disparity when the right image is designated as the reference, while FIG. 5(B) shows the relative window positioning for a given disparity when the left image is designated as the reference.

A window or neighborhood is a small (compared to the intensity image) subset of image elements in a defined vicinity or region near a reference image element. In the present invention, the size of the window is programmable. One embodiment uses a transform window of size 9×9, with all other windows set at size 7×7. Although varying relative sizes of transform windows and other windows (e.g., correlation window, interest window, mode filter window) can be used without detracting from the spirit and scope of the present invention, the use of smaller correlation windows results in better localization at depth or motion discontinuities.

The location of the reference image element in the window is also programmable. For example, one embodiment of the transform window uses a reference point that is located at the center of the transform window. In other embodiments, the reference image element is located in the lower rightmost corner of the window. Use of the lower right corner of the window as the reference point aids in the box filtering embodiments of the present invention which, as is described further below, utilize past calculated results to update window sums for each current calculation. Thus, as the window moves from one image element to another, the only new element is the lower right corner image element.

FIG. 5(A) shows a right image 300 along with a window 301 associated with a reference image element 302. Similarly, left image 303 includes a window 304 and its associated reference image element 305. The relative sizes of these windows and their respective images have been exaggerated for illustrative purposes. The size of the window 301 of the right image 300 is $X_{WIN} \times Y_{WIN}$. The size of the window 304 of the left image 303 is also $X_{WIN} \times Y_{WIN}$. The location of the window 301 on the right image 300 is defined by the location of the reference image element 302. Here, the reference image element 302 is located at $(X_{REF}, Y_{REF})$. The various computations and operations associated with reference image element 302 are performed for each selected image element within the window 301. In some cases, each and every image element in window 301 is used in the computations whereas in other cases, only some of the image elements are selected for the computations. For example, although a 9 by 9 transform window has 81 image elements located therein, the actual transform operation uses only 32 image elements surrounding the reference image element. For the correlation calculations however, the 7 by 7 window has 49 image elements and all 49 image elements are used in the correlation computations.

In one embodiment of the present invention, the right image 300 is set as the reference image while the left image 310 is shifted for the various correlation sum computations for each shift or disparity value. Thus, at disparity zero (d=0), the window 301 for the right image is located at $(X_{REF}, Y_{REF})$, while the window 304 in the left image 303 is located at the corresponding location of $(X_{REF}, Y_{REF})$. Because the right image 300 is designated as the reference image, the window 304 in the left image 303 is shifted from left to right for each disparity value. Thus, after the disparity zero computation for the reference image element 302, a disparity one (d=1) computation is performed by shifting the window 304 in the left image 303 one image element position to the right at location $(X_{REF}+1, Y_{REF})$. After computing this set of correlation sums for d=1, the correlation sums for the next disparity at d=2 are computed. Again, the window 304 of the left image 303 is shifted one image element position to the right while the location of the window 301 in the right image 300 remains fixed. These correlation sums for reference image element 302 are computed for each disparity (d=0, 1, 2, . . . , D) until the maximum number of disparities programmed for this system has been computed. In one embodiment of the present invention, the maximum number of disparities is 16 (D=16). In another embodiment, the maximum number of disparities is 24 (D=24). However, any number of disparities can be used without departing from the spirit and scope of the present invention. For stereo, the disparity offset in the left image is along the same horizontal line as in the right image; for motion, it is in a small horizontal and vertical neighborhood around the corresponding image element in the left image.

FIG. 5(B) shows an analogous shift for the disparity correlation sum computations when the left image rather than the right image is designated as the reference image. Here, the window 310 of the left image 309 is fixed for the various correlation sum computations for reference image element 311, while window 307 of the right image 306 is shifted one image element position at a time to the left until all the correlation sums for the required number of disparities has been computed and stored with respect to reference left image element 311. In sum, if the right image is designated as the reference, the window in the left image is shifted from left to right for each disparity calculation. If the left image is designated as the reference, the right image is shifted from right to left for each disparity calculation.

C. Non-Parametric Local Transforms

The present invention uses a non-parametric local transform. Such transforms are designed to correlate data elements in different data sets, based not on absolute similarities between the elements, but on comparisons of the manner in which elements relate to other elements in the same data set.

Two non-parametric local transforms are known: rank and census. Although the preferred embodiment of the present invention uses census, as an alternative the rank transform could be used, as could any similar non-parametric local transform operation.

The rank transform compares the intensity of a target pixel to the intensity of surrounding pixels. In one embodiment, a "1" designates surrounding pixels which have a higher intensity than the target pixel, while a "0" designates surrounding pixels with an equal or lower intensity than the target pixel. The rank transform sums these comparative values and generates a rank vector for the target pixel. In the described embodiment, the rank vector would constitute a number representing the number of surrounding pixels with a higher intensity than the target pixel.

The census transform is described in greater detail in the following section. In general, this transform compares a target pixel to a set of surrounding pixels, and generates a census vector based on the intensity of the target pixel relative to the intensity of the other pixels. Whereas the rank transform generates a number which represents the summation of all such comparisons, and uses that number to characterize the target pixel, the census transform generates a census vector made up of the results of the individualized comparisons (e.g., a string of 1s and 0s representing those surrounding pixels which have a higher intensity or an equal or lower intensity).

These non-parametric local transforms rely primarily upon the set of comparisons 7 and are therefore invariant under changes in gain or bias and tolerate factionalism. In addition, such transforms have a limited dependence on intensity values of a minority. Thus, if a minority of pixels in a local neighborhood has a very different intensity distribution than the majority, only comparisons involving a member of the minority are affected. Such pixels do not make a contribution proportional to their intensity, but proportional to their number.

The high stability and invariance of results despite varying image gain or bias are illustrated with the following example. Imagine a 3×3 neighborhood of pixels surrounding pixel P:

| | | |
|---|---|---|
| P1 | P2 | P3 |
| P4 | P | P5 |
| P6 | P7 | P8 |

The actual intensity values of each pixel in this 3×3 neighborhood of pixels surrounding pixel P may be distributed as follows:

| | | |
|---|---|---|
| 114 | 115 | 120 |
| 111 | 116 | 121 |
| 115 | 125 | A |

Here, P8=A and A can take on any value between 0 #A<256 and P=116. Applying a non-parametric transform such as census or rank, which relies on relative intensity values, results in the following comparison 7:

| | | |
|---|---|---|
| 1 | 1 | 0 |
| 1 | | 0 |
| 1 | 0 | a |

Here, a is either 1 or 0 depending on the intensity value A with respect to P, where in this example, P=116. As A varies from 0 to 256, a=1 if A<116 and a=0 if A≧116.

The census transform results in the 8 bits in some canonical ordering, such as {1,1,0,1,0,1,0,a}. The rank transform will generate a "5" if A<116 (a=1) and "4" if A≧116 (a=0).

This example illustrates the nonparametric local transform operation where a comparison of the center pixel to surrounding pixels in the neighborhood is executed for every pixel in the neighborhood. However, the invention is flexible enough to accommodate sub-neighborhood comparisons; that is, the actual calculations may be done for a subset of the window rather than for every single pixel in the neighborhood. So, for the example illustrated above, the census calculation may result in a bit string of a length less than 8 bits by comparing the center pixel to only some of the pixels in the neighborhood and not all 8 surrounding pixels.

These transforms exhibit stable values despite large variations in intensity value A for pixel P8 which may result from hardware gain or bias differences. Such variations are picked up by the transform, but do not unduly skew the results, as would occur if, for example, the raw intensity values were summed.

For the same reason, these transforms are also capable of tolerating factionalism, in which sharp differences exist in the underlying data, with such differences introduced not by errors or artifacts of the data gathering process, but by actual differences in the image. This may occur, for example, on the boundary line between pixels representing an object and pixels representing the background behind that object.

D. Census Transform

1. The Census Transform in General

The following nomenclature shall be used to describe variables, functions, and sets. Let P be a pixel. I(P) defines that particular pixel's intensity represented by an n-bit number, such as an 8-bit integer. N(P) defines the set of pixels in some square neighborhood of diameter d surrounding P. The census transform depends upon the comparative intensities of P versus the pixels in the neighborhood N(P). In one embodiment, the transform depends on the sign of the comparison. For example, define V(P,P')=1 if I(P')<I(P), and 0 otherwise. The non-parametric local transforms depend solely on the set of pixel comparisons, which is the set of ordered pairs $$\Xi(P) = \bigcup_{P' \in N(P)} (P', \xi(P, P'))$$

The census transform R\(P) maps the local neighborhood N(P) surrounding a pixel P to a bit string representing the set of neighboring pixels whose intensity is less than that of P. Thus, for the neighborhood (e.g., 3×3) around a center pixel P, the census transform determines if each neighbor pixel P' in that neighborhood has an intensity less than that center pixel P and produces an ordered bit string for this neighborhood surrounding P. In other words, the census transform computes a bit vector by comparing the core pixel P to some set of pixels in its immediate neighborhood. If the intensity of pixel P1 is lower than the core pixel P, then position 1 of the bit vector is 1, otherwise it is 0. Other bits of the vector are computed in a similar manner until a bit string is generated. This bit string is as long as the number of neighboring pixels in the set that are used in the comparison. This bit string is known as the census vector.

The number of pixels in the comparison set can vary. As the window gets larger, more information can be taken into account, but the negative effects of discontinuities are increased, and the amount of computation required is also increased. The currently preferred embodiment incorporates census vectors of 32 bits.

In addition, although the currently preferred embodiment uses intensity information as the basis for the non-parametric transform the transform could use any quantifiable information which can be used to compare a pixel to other pixels (including hue information). In addition, although the described embodiment uses a set of individualized comparisons of a single reference pixel to nearby pixels (a series of one-to-one comparisons), the transform could be based on one or a series of many-to-many comparisons, by comparing, for example, the summed intensity associated with a region with summed intensities associated with surrounding regions.

Let N(P)=PrD, where r represents the Minkowski sum operation and D represents a set of displacements. One embodiment of the census transform is as follows:

$$R_\tau(P) = \bigotimes_{[i,j]\in D} \xi(P, P+[i, j])$$

where □ represents concatenation. As is described further below, the census vector is used in the correlation step.

2. The Census Window

The currently preferred embodiment incorporates a 9×9 census window. This represents a tradeoff between the need to incorporate enough information to allow for a meaningful transform, versus the need to minimize the computations necessary. Other embodiments could include windows of a different size or shape, keeping in mind the necessity to balance these two considerations.

3. Image Areas which are not Processed

Figure 6A:
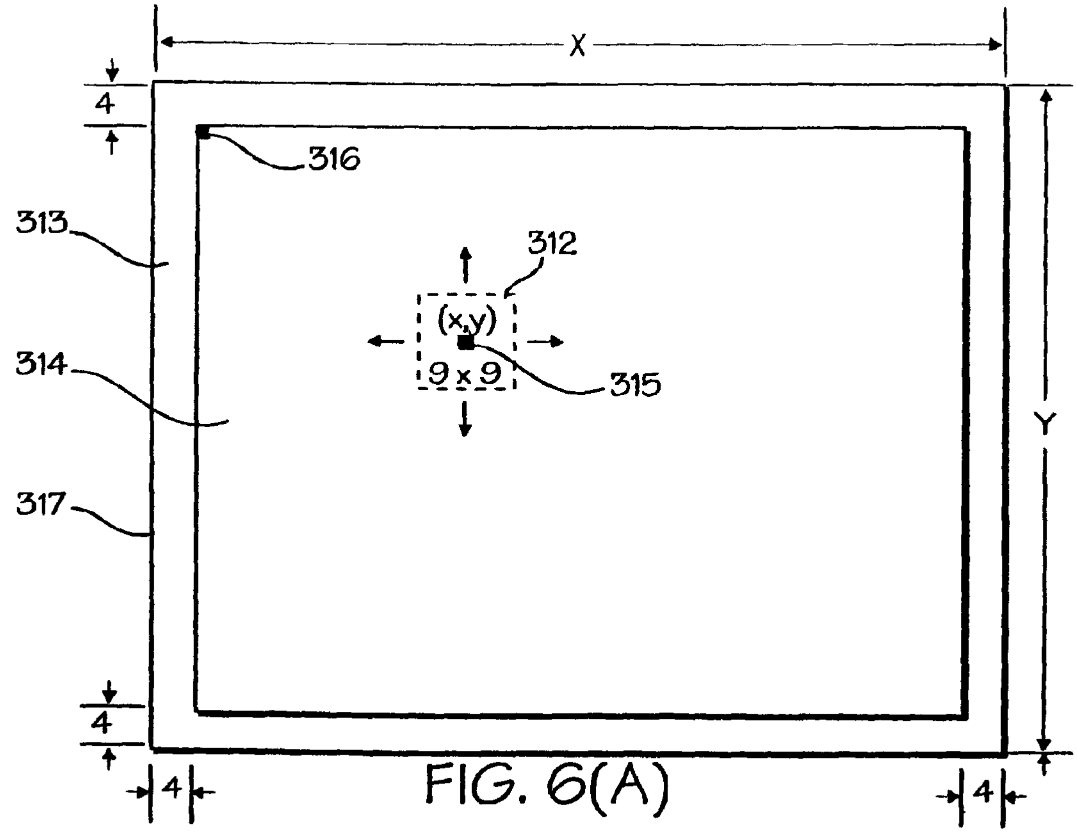
FIGS. 6(A) and 6(B) show two particular 9×9 transform windows with respect to the X×Y intensity image and their respective reference image elements.

Boundary conditions exist for reference pixels located close enough to an edge of the pixel map so that the census window surrounding the reference pixel would proceed off the edge of the map. For example, if the census window is 9×9, and the reference pixel is located in the middle of the window, a complete census window is impossible for any pixel located less than five pixels from the any edge of the overall image. This is illustrated in FIG. 6(A), in which reference pixel 315 is located in the middle of census window 312. A full census window would be impossible if reference pixel 315 were located within four pixels of any edge.

Figure 6B:
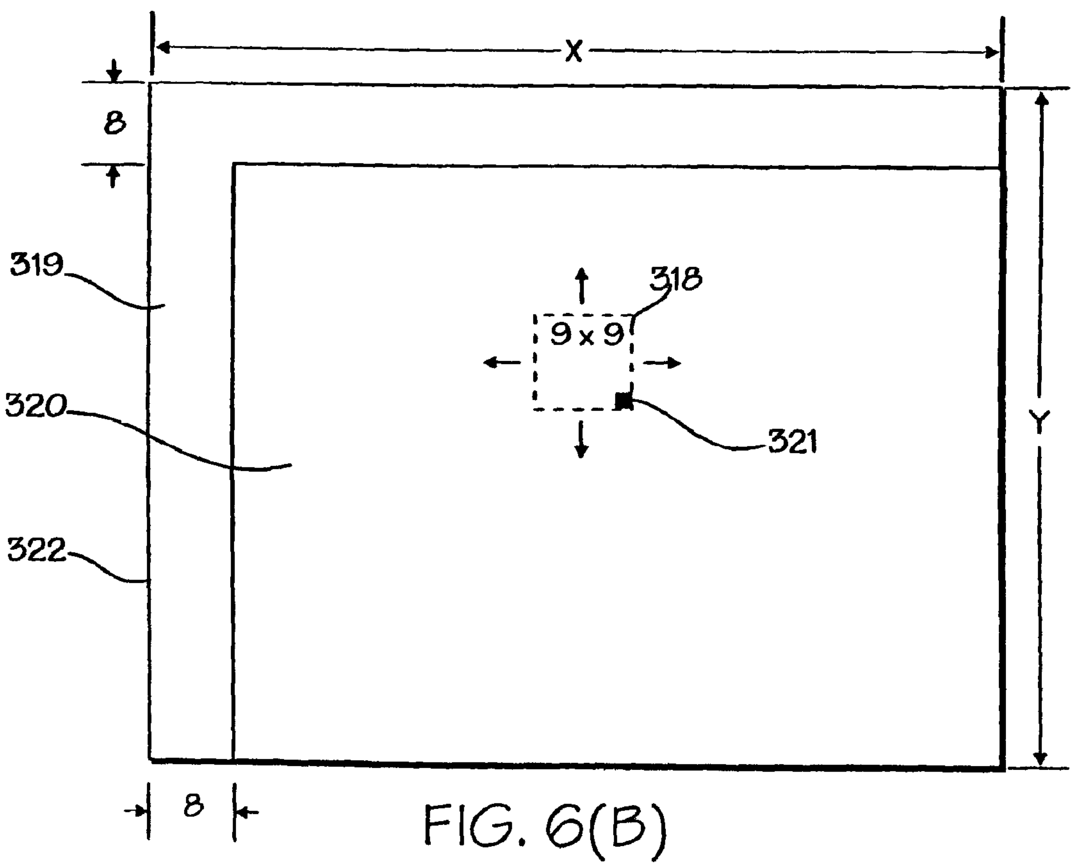

Similarly, as is shown in FIG. 6(B) if the reference pixel (318) is the bottom righthand pixel of a 9×9 window (321), pixels located at the right-hand edge or the bottom of the image will have full census windows, but pixels located less than eight pixels from the top or the left-hand side of the image will not include a full census window. Thus, full transform calculations are possible only for inner areas 314 (FIG. 6(A)) and 320 (FIG. 6(B)).

In the currently preferred embodiment, no census transform is performed for pixels which fall outside these inner areas. These pixels are instead ignored. As a consequence, those portions of the left and right images for which depth calculation may be performed actually represent a subset of the total available picture information. In another embodiment, pixels outside the inner areas could be subject to a modified census transform, though this would require special handling for boundary conditions. Such special handling would require additional computation, thereby impairing the ability of the system to provide high-quality depth data in real-time at a relatively low cost.

Although the entirety of inner areas 314 and 320 are available for the transform calculations, in the currently preferred embodiment, the user (or external software) is allowed to designate certain rows and columns which are to be skipped, so that no census transform is performed for these regions. This may be done, for example, if the user (or external software) determines that some portion of the image is likely to remain invariant, while interesting changes are likely to occur only in a subset of the image. If, for example, the cameras are recording a wall containing a door, and if the user is primarily interested in determining whether the door has been opened, the user might program the algorithm to calculate census transforms for the image region containing the door on every cycle, but perform such transforms for all other regions on a less frequent basis, or to avoid such transforms entirely.

By designating certain rows and columns in this manner, the user (or external software) can reduce the computations necessary, thereby allowing the system to operate more quickly or, alternatively, allowing a lower-cost system to perform adequately.

4. Selection of Pixels within the Census Window which are Used for the Census Vector.

In the currently preferred embodiment, the size of the census window or neighborhood is a 9×9 window of pixels surrounding the reference center point. In one embodiment, the census vector includes a comparison between the reference pixel and every pixel in the census window. In the case of a 9×9 window, this would result in an 80-bit census vector.

In the currently preferred embodiment, however, the census vector represents comparisons between the reference pixel and a subset of the pixels contained in the census window, resulting in a census vector of 32 bits. Although use of a subset decreases the information contained in the census vector, this approach has significant benefits, since it reduces the computational steps required to determine the census vector. Since the census vector must be separately calculated for each pixel in each image, reducing the time required to compute that vector may provide a very important speed-up in overall processing.

Figure 7:
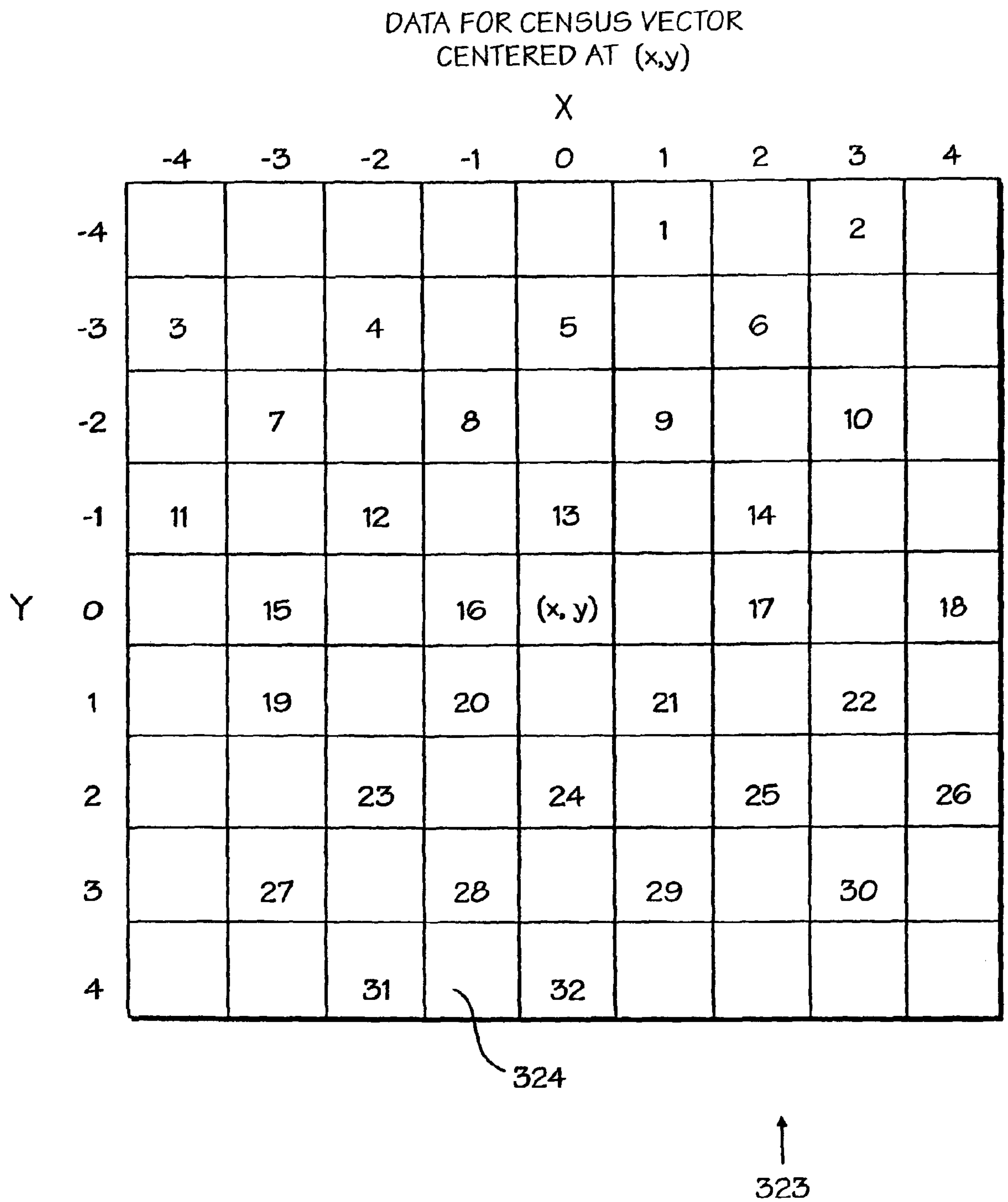
FIG. 7 shows one particular selection and sequence of image intensity data in the 9×9 census window used to calculate a census vector centered at the reference point (x,y).

FIG. 7 shows one particular selection and sequence of image intensity data in 9×9 census window used to calculate a census vector centered at the reference point (x,y). In this figure, locations containing a number represent pixels which are used for calculation of the census vector, with the number representing the location in the census vector which is assigned to that pixel. In the embodiment shown, the particular pixels used for the 32-bit census vector for the reference image element (x,y) are: (x+1,y−4), (x+3,y−4), (x−4,y−3), (x−2,y−3), (x,y−3), (x+2,y−3), (x−3,y−2), (x−1,y−2), (x+1,y−2), (x+3,y−2), (x−4,y−1), (x−2,y−1), (x,y−1), (x+2,y−1), (x−3,y), (x−1,y), (x+2,y), (x+4,y), (x−3,y+1), (x−1,y+1), (x+1,y+1), (x+3,y+1), (x−2,y+2), (x,y+2), (x+2,y+2), (x+4,y+2), (x−3,y+3), (x−1,y+3), (x+1,y+3), (x+3,y+3), (x−2,y+4), and (x,y+4). Thus, the first image data selected for comparison with the reference image element (x,y) is (x+1,y−4) which is designated by the numeral "1" in FIG. 7, the second image data selected for the comparison is (x+3,y−4) which is designated by the numeral "2," and so on until the final image data (x,y+4) is selected which is designated by the numeral "32." Pixels that are not designated with any numeral are ignored or skipped in the census vector calculation. In this embodiment, one such ignored image data is located at (x−1,y+4), represented as item 324.

In another embodiment, the particular pixels used for the 32-bit census vector for the reference image element (x,y) are: (x−1,y−4), (x+1,y−4), (x−2,y−3), (x,y−3), (x+2,y−3), (x−3,y−2), (x−1,y−2), (x+1,y−2), (x+3,y−2), (x−4,y−1), (x−2,y−1), (x,y−1), (x+2,y−1), (x+4,y−1), (x−3,y), (x−1,y), (x+2,y), (x+4,y), (x−3,1), (x−1,1), (x+1,y+1), (x+3,y+1), (x−4,y+2), (x−2,y+2), (x,y+2), (x+2,y+2), (x−3,y+3), (x−1,y+3), (x+1,y+3), (x+3,y+3), (x,y+4), and (x+2,y+4). Here, these points are mapped onto the same xy grid used in FIG. 7.

In the currently preferred embodiment, selection of the particular pixels used for the census vector is based on two principles: (1) anti-symmetry and (2) compactness. Each is explained below.

Anti-symmetry requires that, for each pixel A,B which is selected for the census vector, the corresponding pixel −A,−B is excluded. That is, in the comparison set which includes the center reference pixel (0, 0) and a comparison point (a, b), the point (−a, −b) is not in the comparison set in order to comply with the anti-symmetry property. Thus, since the pixel located at (1, −4) and designated by the numeral "1" is selected in FIG. 7, the pixel located at (−1, 4) and designated by number "324" will not be selected. Note that selection of (1, 4) or (−1, −4) would be permissible.

Anti-symmetry is designed to avoid double-counting of certain pixel relationships. Recall that the census vector for pixel (x, y) in FIG. 7 will represent relationships between the intensity of pixel (x, y) and the 32 pixels surrounding pixel (x, y) designated by numerals 1-32. Recall also that a census vector is calculated for each pixel in the image, and that this census vector will be based on a 9×9 census window around each pixel.

FIG. 7 shows the census window surrounding pixel (x, y). As is necessarily the case, this census window includes pixel (x, y), which constituted the center reference pixel for the census window shown in FIG. 7. In the census window shown in FIG. 7, pixel "1" is located at (1, −4). This necessarily represents the negation of the location of pixel 324 in FIG. 7, and is representative of a general principle: assuming census windows in which pixels are located at X and Y coordinates which represent positive and negative offsets from a center reference pixel (as in FIG. 7), if pixel Pa is contained in a census window surrounding pixel Pb, Pb must also necessarily be contained in the census window for Pa, and the location of Pa in the census window for Pb will be the exact negation of the location of Pb in the census window for Pa.

Anti-symmetry therefore avoids double-counting, since it insures that, if a pixel A is included in a census vector for a reference pixel B, the reference pixel B will never be included in the census vector for that pixel A. Thus, for a correlation window containing pixel (a,b), the correlation sum will not contain two computations of pixel (a,b). Avoiding double-counting is useful, since double-counting would assign a disproportionate weight to the double-counted relationships.

In the currently preferred embodiment, the selection of pixels for the census vector is also based on the principle of compactness. Compactness requires that pixels be selected which are as close to the reference pixel as is possible, subject to the requirements of anti-symmetry. Thus, four pixels are selected from the eight pixels which are located immediately adjacent to reference pixel (x, y) in FIG. 7: the pixels assigned numbers 13, 16, 20 and 21. This is the maximum number of pixels which could be selected at this distance from reference pixel (x, y) without violating anti-symmetry. Similarly, eight pixels are selected from the sixteen locations which are at a distance of one pixel from the reference pixel (these are assigned census vector bit locations 8, 9, 12, 14, 17, 23, 24 and 25), and twelve pixels are selected from the twenty-four locations which are at a distance of two pixels from the reference pixel (census vector bit locations 4, 5, 6, 7, 10, 15, 17, 19, 27, 28, 29 and 30). In each of these cases, half of the available pixels are selected. This represents the maximum number possible while still maintaining anti-symmetry.

Since the census vector is 32 bits, an additional eight bits are selected from the outside ring. Note that in other embodiments the census vector could include more or fewer than 32 bits. The length 32 is used in the preferred embodiment since it represents a length which is conveniently handled by most processing systems, and allows for incorporation of close to half of the available pixels, which appears adequate for depth correlation, while avoiding the processing overhead required if the next higher convenient number (64 bits) were used.

Other embodiments use a combination of different size census windows (e.g., 7×7, 7×9, 9×9, 10×12, 10×10), different location of the reference image element in the census window (e.g., center, bottom right corner, upper left corner, a location off center), different image data in the census window, different numbers of image data in the census window (e.g., 8, 10, 16, 24, 32), and different sequence of image data in the census window (e.g., every three image data per row, every other two adjacent image data). The same principle applies to the correlation window, interest window, and the mode filter window.

E. Correlation

Once the data sets have been transformed in a manner that represents the relationship of data elements to each other within each of the data sets (the census transform being one example), it is then necessary to correlate the transformed elements across the data sets. Again, the use of census transform to calculate depth from stereo images will be used as an illustrative embodiment.

1. Hamming Distances

In the preferred embodiment, Hamming distances are used to correlate pixels in the reference image with pixels in the other image. The Hamming distance of two bit strings is the number of bit positions that differ in these two bit strings. Correspondence of two pixels can be computed by minimizing the Hamming distance after applying the census transform. So, two pixel regions with nearly the same intensity structure will have nearly the same census transform, and the Hamming distance between their two representative census transformed values will be small.

Pixels P and Q represent two transformed pixels, where P is a census transformed pixel for one input image and Q is a census transformed pixel in a search window W(P) for a second input image. The Hamming distance between the two transformed pixels is computed by calculating the number of bit positions in the census vector which are different for the two pixels (i.e., a "0" in one census vector and a "1" in the other). Thus, for example, a 32-bit census value would result in Hamming distances in the range from 0 to 32, with a Hamming distance of 0 representing two census vectors which are identical, while a Hamming distance of 32 representing two census vectors in which every single bit position is different.

Since the Hamming distances will be used to determine census vectors which match as closely as is possible, it may be possible to increase computational efficiency by treating all relatively large Hamming distances as effectively equal. This can be done by saturation thresholding, in which, for example, all Hamming distances over 14 may be treated as indistinguishable. In this example, four bits could be used for storage of the Hamming distance, with 0000 representing a Hamming distance of 0, 0001 representing a Hamming distance of 1, 0010 representing a Hamming distance of 2, 0011 representing a Hamming distance of 3, and so on to 1111, representing a Hamming distance in the range 15-32. Since a Hamming distance in that range indicates a large difference between the two values, and therefore will almost certainly never be of interest, saturation thresholding may reduce storage space (using four bits rather than six) and computational resources without sacrificing quality.

F. Moving Window Sums and Box Filtering

In the simplest embodiment, each pixel in the reference image is compared to a specified number of pixels in the other image. The specified number of pixels used for comparison to the reference pixel is known as the disparity or search window. Thus, if the reference pixel is located in the right image, the disparity or search window would constitute some number of pixels in the left image. In one embodiment, the disparity window begins at the pixel in the other image which is located at the same X,Y address as the reference pixel, and extends in one direction for a number of pixels along the same line. In one embodiment, the disparity window for the left image extends to the right of the pixel which is at the same address as the reference pixel, while the disparity window for the right image extends to the left. This directionality results from the fact that, if the same object is shown in both images, the object will be offset to the right in the left image and to the left in the right image. In another embodiment, in which the cameras are oriented vertically, the disparity window would be vertical, and would extend down for the upper image and up for the lower image.

The number of disparities D represents the shifts of the left image data with respect to the right image data and is programmable. As stated before, the number of disparities is user selectable. In some embodiments, twenty-four (24) or sixteen (16) disparities are used.

In a simple embodiment, the census vector of each reference pixel is compared to the census vectors of those pixels in the other image which fall within the disparity window for the reference pixel. In one embodiment, this comparison is done by calculating the Hamming distance between the reference pixel and each of the pixels in the disparity window, and selecting the lowest Hamming distance.

The presently preferred embodiment uses a somewhat more complex system, in which correlation is determined by calculating summed Hamming distances over a window. In one embodiment, for each pixel in the reference image, the Hamming distances are calculated between the census vector of that pixel and the census vectors of the pixels in that pixel's disparity window in the other image. Assuming the disparity window is 24 (and ignoring boundary conditions for the moment), this results in 24 Hamming distances for each pixel in the reference image.

Optimal disparities for each reference pixel are then calculated by looking at each disparity in the disparity window, and summing the Hamming distance for that disparity across the pixels in a neighborhood of the reference pixel. The disparity associated with the lowest summed Hamming distance is then selected as the optimum disparity.

Figure 8A:
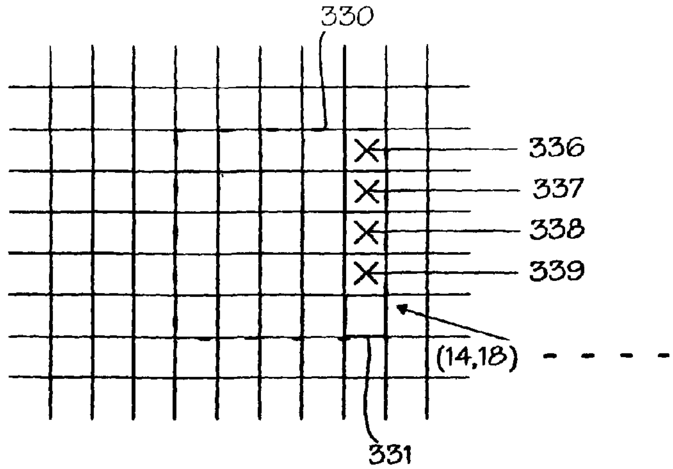
FIGS. 8(A)-8(C) illustrate the movement of the moving window across the image data.

The correlation window summation concept is illustrated in FIG. 8(A). Here, the window is 5×5 and the reference image element is located in the lower rightmost corner of the window. FIG. 8(A) shows one window 330 with reference image element 331 located at (14,18). For reference image element 331, 24 summed Hamming distances are calculated, with each summed Hamming distance representing the sum of the Hamming distance for one disparity across the window. Thus, the Hamming distance for element 331 at disparity 0 is added to the Hamming distances for disparity zero for all of the other elements in window 330. That total is represented as a summed Hamming distance, associated with disparity 0. This operation is repeated for disparities 1-23. After all of the summed Hamming distances have been calculated, the lowest summed Hamming distance is chosen. Thus, if the summed Hamming distance across the window is lowest at disparity 5, then disparity 5 is chosen as the optimum disparity for image element 331. Thus, image element 331 is determined to correspond to the image element in the other image which is at an offset, or disparity, of five. This process is repeated for each element in the reference image.

Note that separately calculating 24 summed Hamming distances across a 5×5 window for each reference pixel is quite wasteful, since each window overlaps those windows in the immediate vicinity. This inefficiency may be eliminated by using a box filtering concept, with each window calculation taking the previous calculation, adding new elements and subtracting old elements.

Figure 8B:
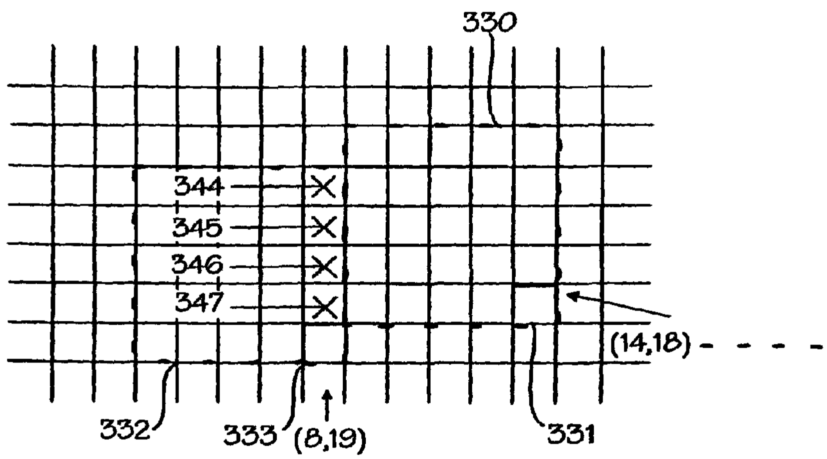
Figure 8C:
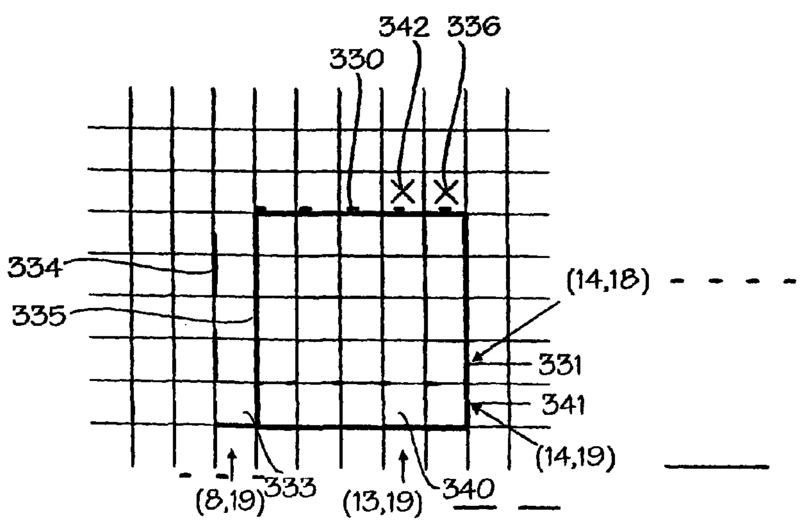

This box filtering principle of sliding windows is illustrated in FIGS. 8(A)-8(C). As before, FIG. 8(A) shows a 5×5 window 330 based on reference pixel 331, which is located at 14,18. In window 330, column sums are calculated and stored for each of the five columns of the window. In this embodiment, a column sum identified by reference image element 331 includes the sum of the data in 336, 337, 338, 339, and 331.

After this window 330 has traveled along the row occupied by reference image element 331 (row 18) and computed the sums for respective reference image elements, the window wraps around to the next row (row 19) and continues to compute its sums for each reference image element.

In FIG. 8(B), window 332, which is the same as window 330 but displaced in space (different row and column) and time (future calculation), is located at point (8,19). As before, a column sum associated with and identified by reference image element 333 is computed and stored in a column sum array. This column sum includes the sum of image data 344, 345, 346, 347, and 333.

As shown in FIG. 8(C), window 334 (which is the same as window 330 and 332 but displaced in space (different row and column) and time (future calculation), is located at point (13,19) at some future iteration. Again, a corresponding column sum and separate window sum associated with and identified by reference image element 340 is computed. For the next calculation, the window 335 moves over one column at reference image element 341 (location (14,19)). Again, window 335 is the same as window 330, 332, and 334 but displaced in space (different row and column) and time (future calculation). In calculating the window sum for window 335, the previously calculated window sum (for window 334) and the previously calculated column sum (for reference image element 331) are used. The image data located at the top rightmost corner of window 330 (image data 336) is subtracted from column sum 331. The contribution of image element 341 is added to the column sum to generate a new column sum associated with reference image element 341. The previously calculated column sum at reference image element 333 is subtracted from the current window sum (which was a window sum for window 334). Finally, the newly generated column sum associated with reference image element 341 is added to the window sum. These newly generated window sums and column sums will be used in subsequent calculations.

Thus in the currently preferred embodiment, window sums are calculated based on previous window sums. For reference pixel 341 in FIG. 8(C), window sum 335 will be calculated, based on the immediately preceding window 334. This is done as follows: (1) for the righthand column in window 335, take the column sum calculated for the same column when the window was one row higher (e.g., take the column sum for 336, 337, 338, 339 and 331 from FIG. 8(A)), subtract the topmost element from that column sum (336) and add the reference pixel (341); (2) add this modified column sum to the window sum for the preceding window (window 334); (3) subtract the leftmost column sum from the preceding window (e.g., the column sum for the column containing element 333 is subtracted from the window sum for window 334). Thus, the window sum for reference element 341 may be calculated based on the window sum for reference element 340, by sliding the window, adding new values and subtracting old values.

Figure 9A:
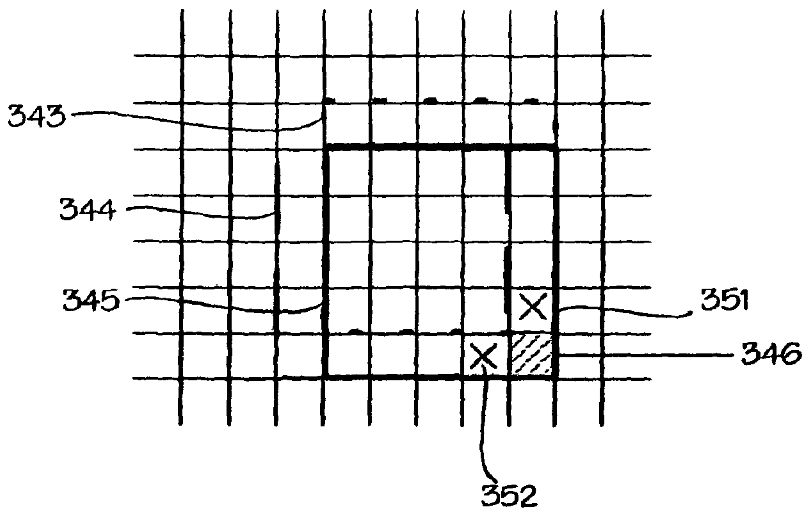
FIGS. 9(A)-9(C) illustrate in summary fashion one embodiment of the present invention.
Figure 9B:
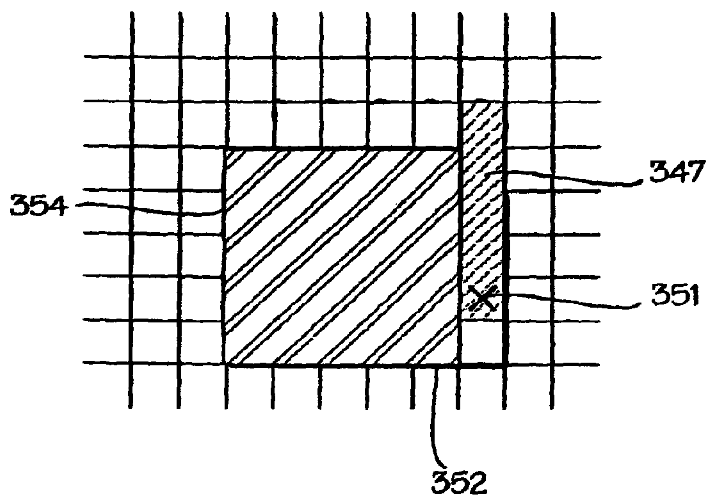
Figure 9C:
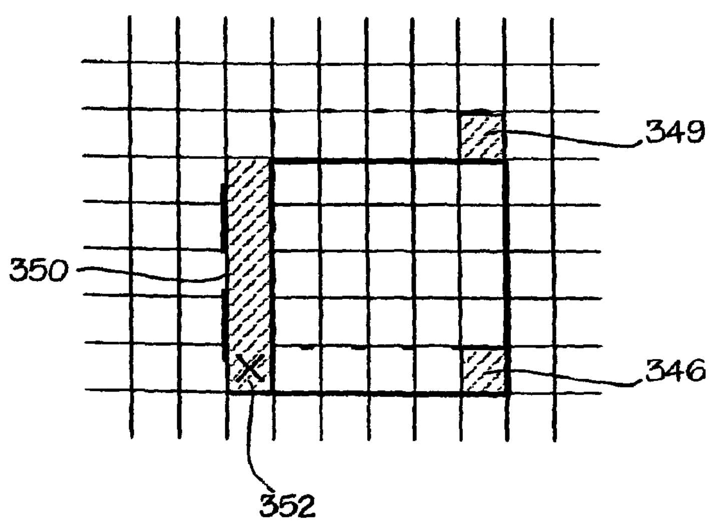

FIGS. 9(A)-9(C) illustrate in summary fashion one embodiment of the present invention. Again, these figures ignore boundary conditions. FIG. 9(A) shows the overlap of three windows 343, 344, and 345 during a window sum computation. These windows are actually the same window displaced from each other in space and time; that is, window 343 represents a particular past position of the window for the calculation of a window sum for reference image element 351, window 344 represents a more recent position of the window for the calculation of a window sum for reference image element 352, and window 345 represents the current position of the same window. The reference image element 346 identifies this window just as reference image elements 351 and 352 identify windows 343 and 344, respectively.

Referring to FIG. 9(B), the calculation of the window sum for window 345 requires the use of past calculations. The column sum 347 calculated for reference image element 351 and the recently calculated window sum 354 for window 344 are already stored in memory. As shown in FIG. 9(C), data for image element 349 and column sum 350 identified by reference image element 353 are also available in memory. To calculate the window sum for the current window 345, the following must be performed: (1) subtract data from image element 349 from column sum 347, (2) add data in image element 346 to the now modified column sum 347 (which now does not include data from 347), (3) subtract column sum 350 (previously calculated for reference image element 353) from window sum 354 (previously calculated for window 344), and (4) add the modified column sum (column sum 347−data 349+data 346) to the modified window sum (window sum 354−column sum 350) to generate the window sum for current window 345. As discussed later, subtractions of column sums or individual data elements may not be necessary for some regions.

G. Edge Regions 1-10

The preceding discussion excluded any discussion of edge conditions. Such conditions, must, however, be taken into account.

Figure 10A:
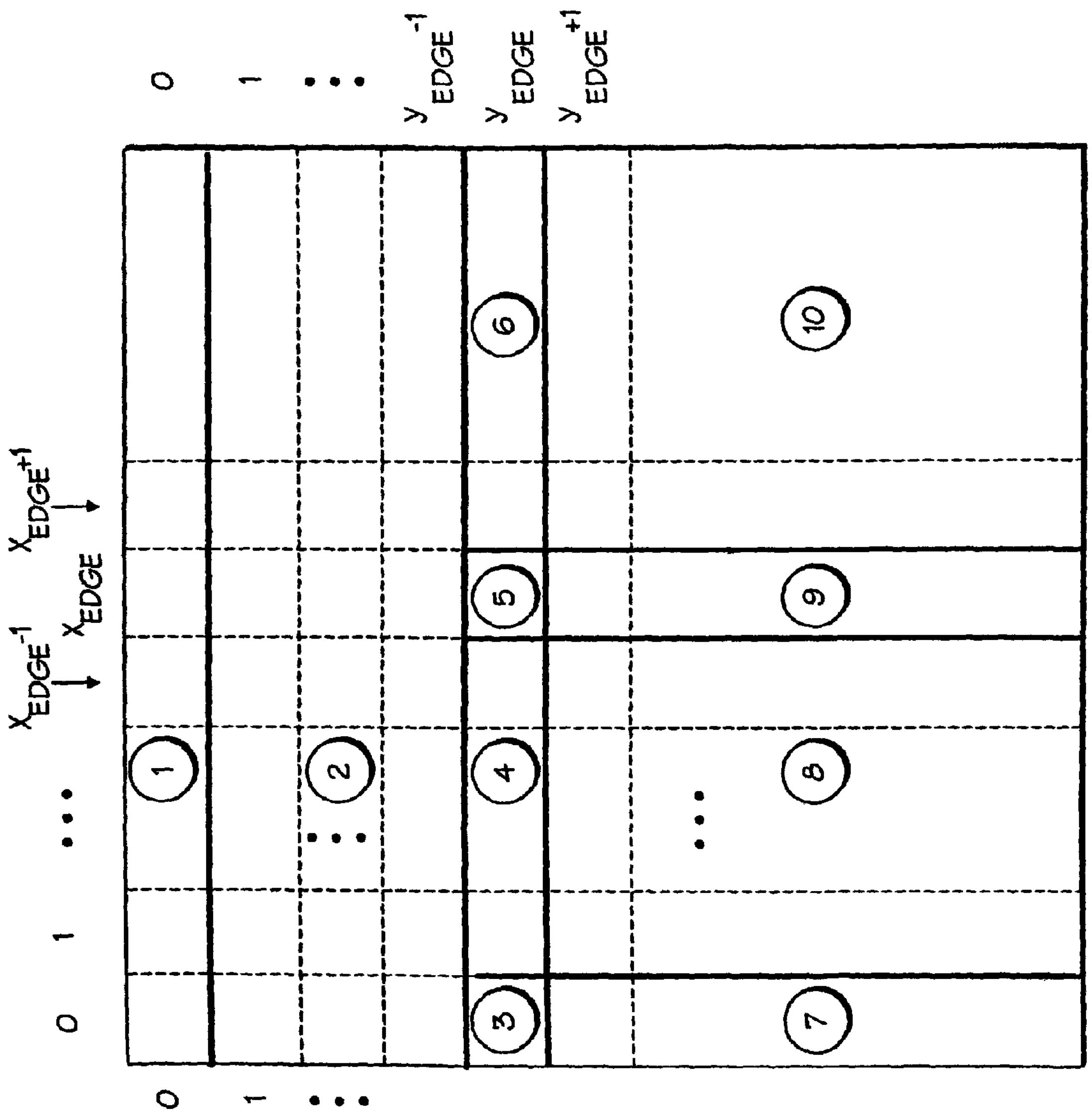
FIG. 10(A) shows the ten (10) specific regions associated with the numerous edge conditions which determine how one embodiment of the present invention will operate.
Figure 10B:
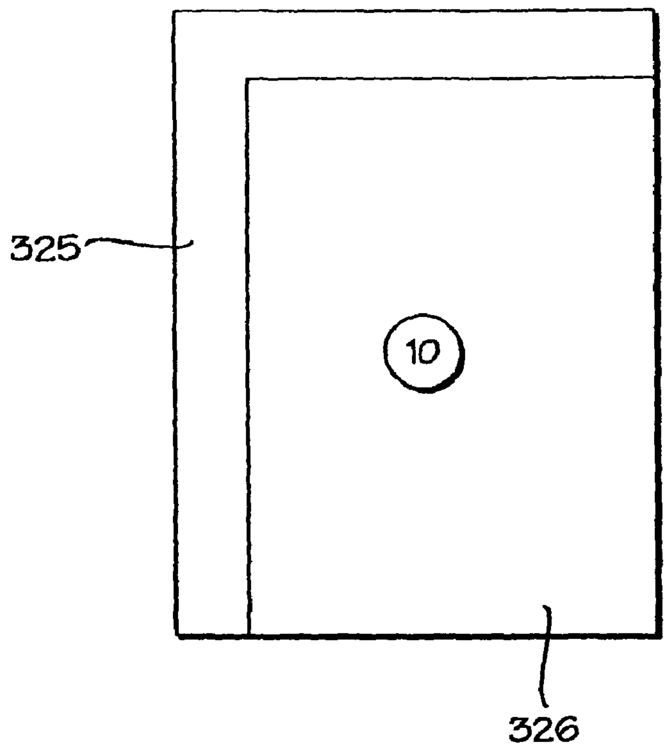
FIG. 10(B) shows the relative size of region 10 with respect to the other nine regions.
Figure 10C:
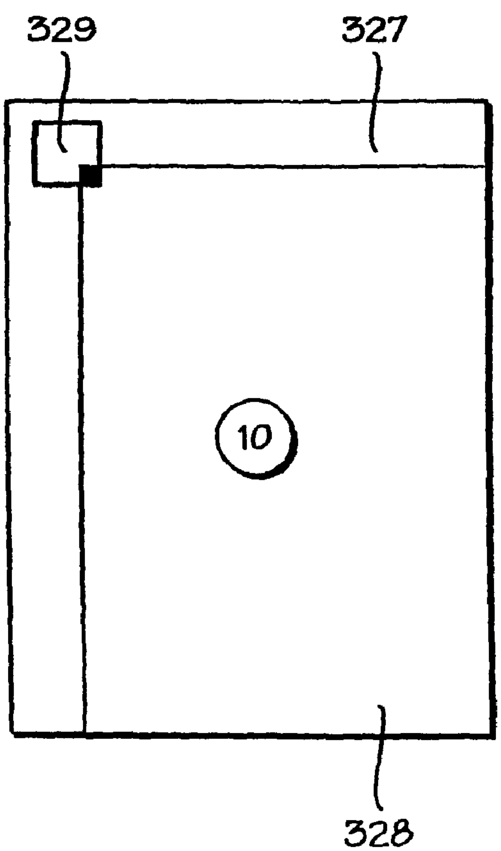
FIG. 10(C) shows the positioning of the applicable window in the upper leftmost corner of region 10.

FIGS. 10(A)-10(C) show the edge regions according to one embodiment of the present invention. FIG. 10(A) shows ten specific regions associated with the numerous edge conditions. These ten regions are generally relevant to the computations of the correlation sum, interest operation, and mode filter. The exact size and location of these ten regions will depend on the size of the moving window and the location of the reference image element in the window.

In one embodiment, the window size is 7×7 (width of the 7 image elements by height of 7 image elements) and the location of the reference image element is lower right corner of the window. These regions exist because of the use of the column sum buffer in the computations which increase processing speed and allow the various embodiments of the present invention to operate in real-time fashion. For the correlation and mode filter windows, these ten regions are located in the inner area 314 or 320 (see FIGS. 6(A) and 6(B)) which are populated with transform vectors. The correlation sums directly depend on the transform vectors and the mode filter indirectly depends on the correlation sums. For the interest window, the location of these ten regions is not limited to the same inner area 314 or 320 (see FIGS. 6(A) and 6(B)) because the interest calculation does not depend on the transform calculations; rather, the interest operation depends on the intensity images.

In all three cases, as is discussed above, some rows and columns on all sides of the image may be skipped such that these ten regions may actually occupy only a portion of the allowable area of the image. Thus, for the correlation and mode filter computations, only a portion of the inner area 314 or 320 (see FIGS. 6(A) and 6(B)) may be used, while for the interest operation calculations, only a portion of the intensity image may be used.

The following discussion assumes that the reference image element is located on the bottom rightmost corner of the window and the desired area for image processing has been determined (i.e., skipped rows and columns have been programmed). Thus, the row and column numberings are reset to (0,0) for the image element located on the upper leftmost corner of the desired image area of interest. As shown in FIG. 10(A), region 1 is the first row (row 0) and every column in that first row. This region initializes the column sum array.

Region 2 is rows 1 to $Y_{EDGE}-1$. For a 7×7 window, region 2 includes rows 1 to 5 and all columns in these rows. Here, the system builds up the column sum array.

Region 3 is the image element located at $(0, Y_{EDGE})$. For a 7×7 window, region 3 is located at (0,6). Here, the window sum (e.g., correlation sum, mode filter window sum, interest operation's sliding sum of differences (SSD)) is initialized.

Region 4 includes row $Y_{EDGE}$ and columns 1 to $X_{EDGE}-1$. For a 7×7 window, region 4 is the located on row 6 and bounded by columns 1 to 5. Here, the window sums are built up.

Region 5 is the image element located at $(X_{EDGE}, Y_{EDGE})$ and in one embodiment, this region is located at (6,6). Here, the entire window fits into the desired image processing area and an entire column sum and window sum are available for future computations.

Region 6 includes row $Y_{EDGE}$ from column $X_{EDGE}+1$ to the column at the end of the desired image processing area. Here, as is described above, a new window sum is calculated by subtracting a column sum associated with the immediately preceding window (e.g., for a 7×7 window, subtract the column located seven columns to the right of the current reference image element). The additional image element sum contribution by the lower rightmost corner of the window (the current reference image element) is added to the total window sum. For a 7×7 window, region 6 is located at row 6 and bounded by columns 7 to the end of the desired image processing area.

Region 7 includes rows $Y_{EDGE}+1$ to the bottom end of the desired image processing area in column 0. This translates to row 7 and below in column 0. Here, the top rightmost corner of the window located one row up is subtracted from the column sum array and the window sum is initialized.

Region 8 includes all image data located in rows $Y_{EDGE}+1$ to the bottom end of the desired image processing area from column 1 to column $X_{EDGE}-1$. This translates to row 7 to the end bounded by columns 1 to 5. Here, the top rightmost corner of the window located one row up is subtracted from the column sum array and the window sum is built up.

Region 9 includes rows $Y_{EDGE}+1$ to the bottom end of the desired image processing area in column $X_{EDGE}$. This translates to row 7 to the end in column 6. Here, the top rightmost corner of the window located one row up is subtracted from the column sum array and a complete window sum is available.

Region 10 includes rows $Y_{EDGE}+1$ to the bottom end of the desired image processing area and columns $X_{EDGE}+1$ to the end of the desired image processing area. Although it is only 1/10 of the number of regions, the bulk of the processing occurs in this region. The processing that occurs here represents the most general form of the computations. Indeed, regions 1-9 represent edge conditions or boundary value problems and are special cases for the general case in region 10.

FIG. 10(B) shows the relative size of region 10 with respect to the other nine regions. The bulk of the image data is found in region 10 as represented by item 326. The size of the edge regions 1-9 (represented by item 325) is small compared to the size of region 10 (represented by item 326).

FIG. 10(C) shows the positioning of the window in the upper leftmost corner of region 10. When the reference image element of the window 329 is placed in the upper leftmost corner of region 10 (represented by item 328), at most one row of image data in area 327 should be found above the window 329 and at most one column of image data in area 327 should be found to the left of window 329 in the desired image processing area.

H. Window Sums for 7×7 Window

FIGS. 11(A)-11(J) illustrate the location and size of the ten (10) regions if the moving window size is 7×7. These ten regions have previously been identified above with respect to FIGS. 10(A)-10(C). In FIGS. 11(A)-11(J), the matrix area represents the desired image processing area where the computations of the present invention will be executed. All other areas represent skipped areas despite the fact that these skipped areas may contain useful image data. Each "block" in the matrix represents a particular coordinate position for a single image data, transform vector, or extremal index data for a single image element. A 7×7 window has seven "blocks" in width and seven "blocks" in height. As stated above, the form and content of the computations are dictated by the location of the reference image element with respect to the ten regions. The window's location is also tied to the location of its reference image element.

Figure 11A:
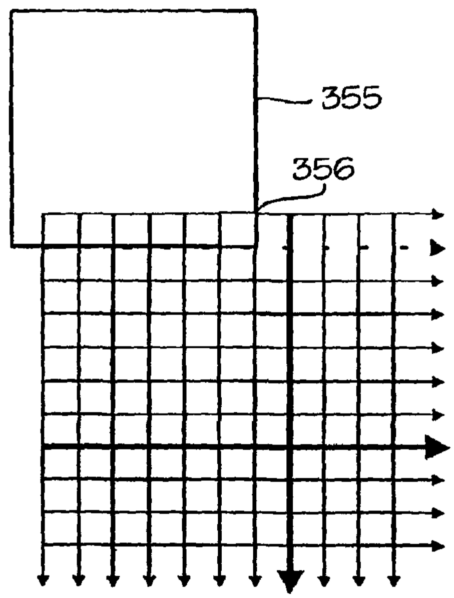
FIGS. 11(A)-11(J) illustrate the location and size of the ten (10) regions if the moving window size is 7×7.

FIG. 11(A) shows region 1, which includes the top row (row 0) in the matrix. Here, the window 355 does not have all the data necessary to calculate a window sum or a column sum. However, as the window 355 and its reference image element 356 move along this row, various arrays and variables that will be used later are initialized.

Figure 11B:
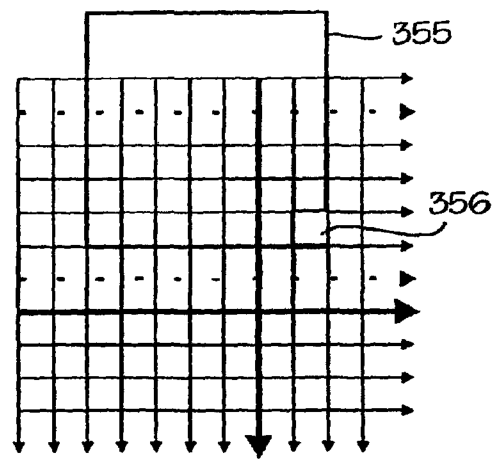

FIG. 11(B) shows region 2, which includes all columns of rows 1-5. As the window 355 and its reference image element 356 move along every row and column of this region, previously initialized variables and arrays are built up. Like region 1, the window is incomplete with image data.

Figure 11C:
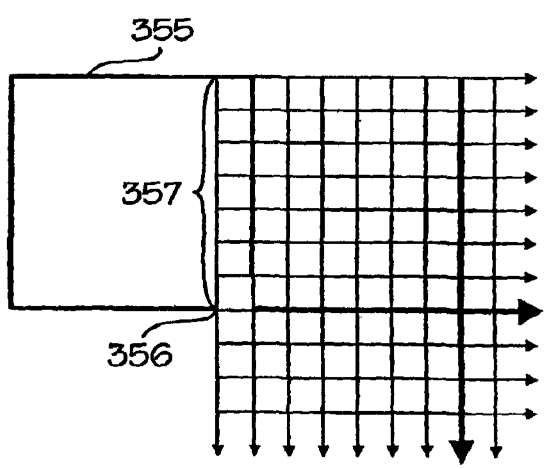

FIG. 11(C) shows region 3, which includes row 6, column 0. The reference image element 356 is located in this "block" of the matrix. At this point, an entire column sum 357 can and will be generated. This column sum 357 is the sum of all or a selected number of image data in this column in the window 355. Because of the existence of a column sum 357, a window sum for window 355 with respect to a particular reference image element 356 can and will be initialized. A window sum is the sum of all or a selected number of image data in this window.

Figure 11D:
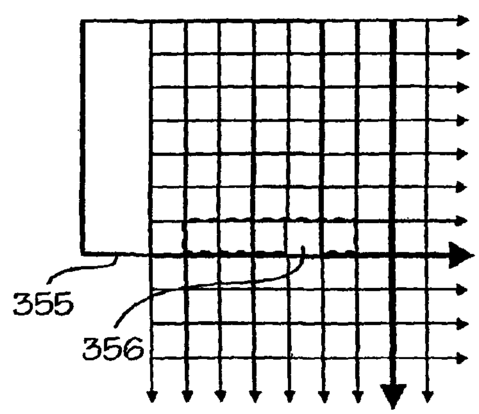
Figure 11:
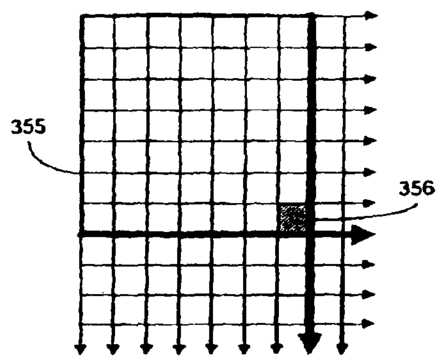
Figure 11:
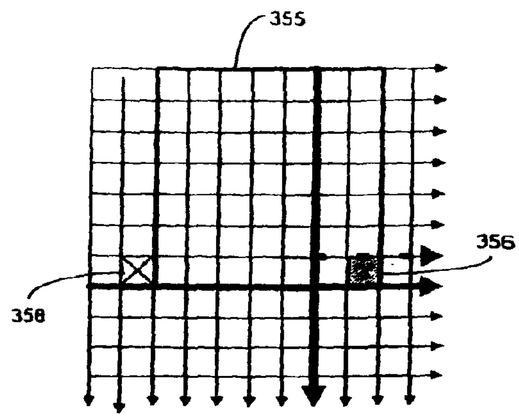
Figure 11:
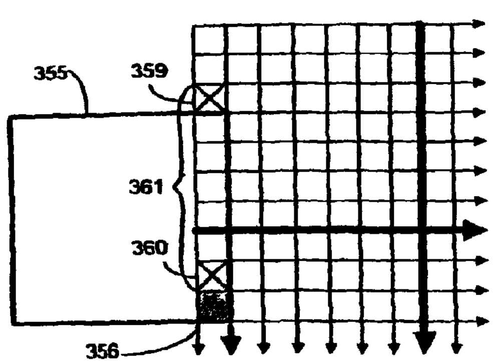
Figure 11:
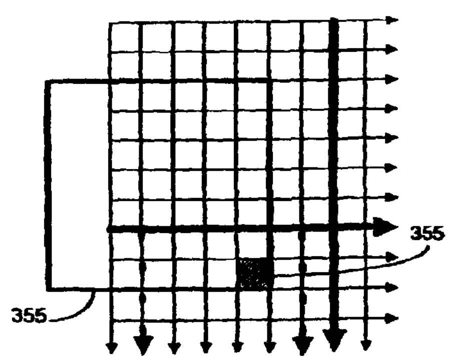
Figure 11:
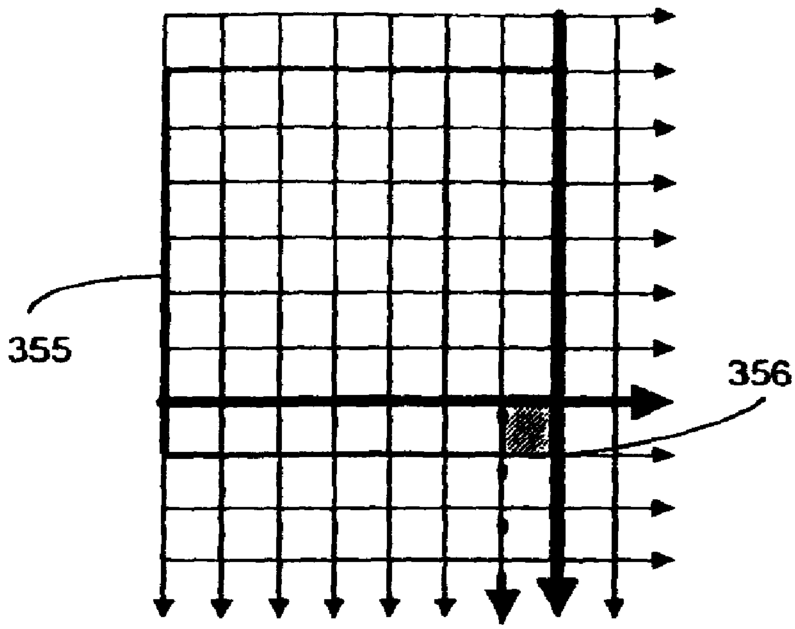
Figure 11:
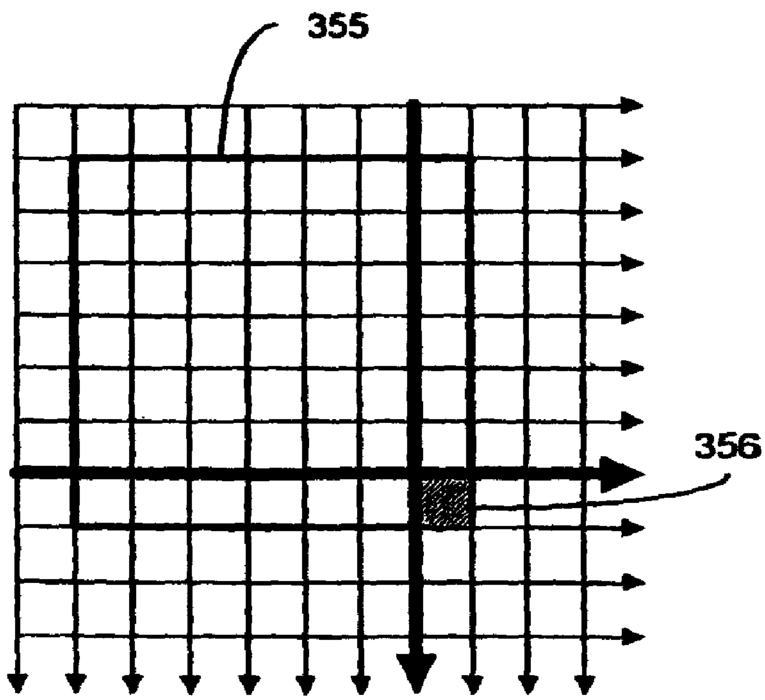

FIG. 11(D) shows region 4, which includes the area defined by row 6, columns 1-5. Individual column sums are generated and the window sum is built up. At this point however, a complete window sum is not available.

FIG. 11(E) shows region 5, which includes row 6, column 6. At this point, the entire window 355 can just fit into the upper leftmost corner of the desired image processing area. A complete window sum associated with reference image element 356 located at this coordinate is generated and stored. Individual column sums are also generated. After this region, the computations will involve a combination of additions and subtractions of previously calculated arrays and image data.

FIG. 11(F) shows region 6, which includes row 6 and columns 7 to the end of the desired image processing area to the right. Here, the column sum located seven columns to the left (x—window width) can be subtracted from the just previously calculated window sum. In this example, the column sum to be subtracted is associated with reference image element 358. The image data 356 is also added to the column sum as in previous iterations. Finally, the newly generated column sum associated with reference image element 356 is added to the newly generated window sum.

FIG. 11(G) shows region 7, which includes rows 7 to the bottom of the desired image processing area and column 0. Like region 3, a window sum for window 355 with respect to a particular reference image element 356 can and will be initialized. However, unlike region 3, a complete column sum 361 associated with reference image element 360 is available from a previous calculation. To calculate the column sum for reference image element 356, image data 359 is subtracted from column sum 361 and image data 356 is added to the modified column sum 361 (without data 359). This newly calculated column sum associated with reference image element 356 is now used to initialize the window sum for window 355. Note that a complete window sum is not available.

FIG. 11(H) shows region 8, which includes all image data located in rows 7 to the bottom end of the desired image processing area from column 1 to column 5. Here, the computation proceeds in a manner analogous to region 7 except that the window sum is now built up.

FIG. 11(I) shows region 9, which includes rows 7 to the bottom end of the desired image processing area in column 6. Like region 5, the entire window 355 can fit into the upper left corner of the desired image processing area. A complete window sum is now available with respect to reference image element 356. The computation proceeds in a manner analogous to regions 7 and 8.

FIG. 11(J) shows region 10, which includes rows 7 to the bottom end of the desired image processing area and columns 7 to the right end of the desired image processing area. The processing that occurs here represents the most general form of the computations. The nature of the computations in region 10 has been described with respect to FIGS. 8 and 9.

I. Alternative Embodiment

Row Sums

Although one embodiment of the present invention utilizes the individual image element computations, column sums, window sums, and the additions/subtractions associated with the data manipulation scheme described herein as the window moves along the rows, another embodiment utilizes the same scheme for movement of the window down columns. Thus, the window moves down a column in a row by row fashion until the end of the column is encountered, at which point, the window moves to the beginning of the next column and so on until all columns and rows of the desired image processing area have been traversed and the data therein processed. Here, the reference image point is the lower right corner of the window for most computations. Instead of column sums, row sums are computed in the line buffer. Window sums are computed by: subtracting the individual data located a window width columns to the left of the current reference point from the current row sum (if this operation is applicable in the current region), adding the current image reference point to this currently modified row sum, subtracting the row sum located a window height from the current reference point from the current window sum (if this operation is applicable in the current region), and adding the currently modified row sum to the just recently modified window sum to yield the new window sum for the location of the current window at the reference point. This embodiment utilizes the same concept described herein for column sums except that now the window moves down row by row within a column. The location of the ten regions can be determined by taking the regions as shown in FIG. 10(A). Assuming that this layout of the ten regions is in an xy-plane, the location of the ten regions for the alternate embodiment where the window moves down the columns in a row by row fashion can be determined by rotating it 90 degrees counterclockwise in the same xy-plane and flipping it 180 degrees in the z plane.

J. Description of Correlation Sum Buffer

Figure 13A:
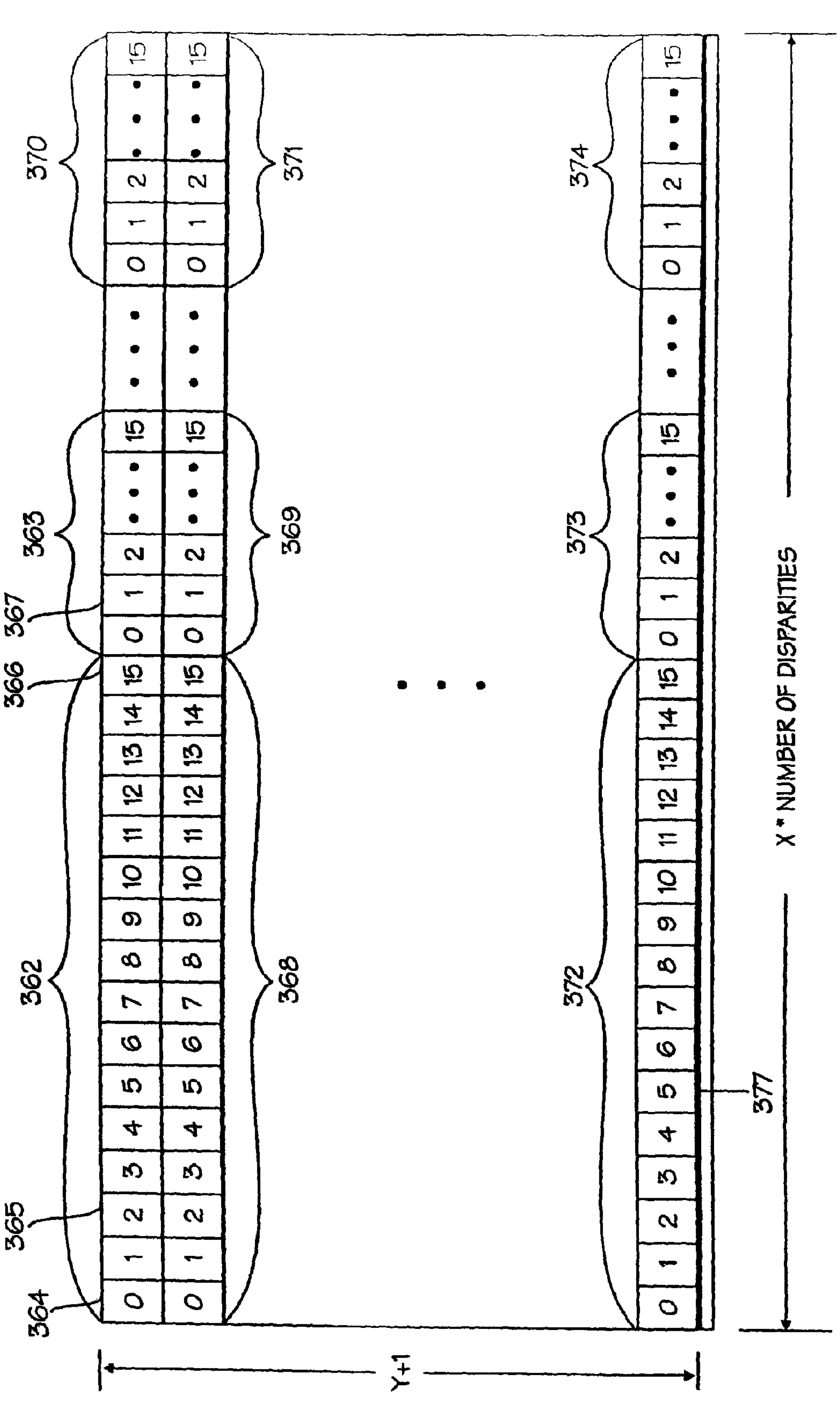
FIG. 13(A) shows the structure of the correlation sum buffer.

FIG. 13(A) shows the structure of the correlation sum buffer. The correlation sum buffer was first introduced in FIG. 4. The correlation sum buffer will ultimately hold correlation sum results for a correlation window in the reference image with a series of correlation windows offset by a disparity in the other non-reference image. The correlation operation is the Hamming distance between the two vectors. The width of the correlation sum buffer is image width (X) multiplied by the number of disparities (D), which shortens to X*D.

Portions of the correlation sum buffer can hold individual Hamming distances of pairs of transform vectors in the right and left images as the window moves along during the computations. These portions may be subsequently written over with window correlation sums after the image processing system has used these individual Hamming distances in its computations. Thus, in one correlation sum buffer, both individual census vector-to-census vector Hamming distances and correlation window sums of these Hamming distances within a window are stored in different time phases as the window moves along the rows and columns of the correlation buffer.

In this example, the right image is designated as the reference image. In the correlation sum buffer, a line 362 in a particular row contains D disparity correlation sum results for a single transform vector in the right image. Stated differently, line 362 contains the Hamming distances between the particular right image reference transform vector and each transform vector in the left image in the reference right transform vector's search window offset by a corresponding disparity for a 1×1 correlation window. For D=16, sixteen individual Hamming distances (i.e., d=0, 1, 2, . . . , 15) are contained in line 362. Usually, however, the correlation window is larger than 1×1. In one embodiment, the correlation window is 7×7. Thus, for a 7×7 correlation window, line 362 contains the summed Hamming distances between the correlation window associated with the particular right image reference transform vector and each correlation window associated with the transform vector in the left image in the reference right transform vector's search window offset by a corresponding disparity. Other lines of D disparity correlation sum results for the transform vectors in the same row include lines 363 and 370. Line 370 contains the last set of summed Hamming distances between the correlation windows associated with their respective transform vector in the search window and the correlation window associated with the last reference transform vector in the right image that has a complete set of transform vectors (i.e., D transform vectors) in its search window in the desired image processing area in the same row. In the next row, representative lines include 368, 369, and 371. In the last row of the desired image processing area, corresponding lines include 372, 373, and 374.

As stated above, line 362 contains the summed Hamming distances between the correlation window associated with the particular right image reference transform vector and each correlation window associated with the transform vector in the left image in the reference right transform vector's search window offset by a corresponding disparity. Thus, the correlation data in data element 364 represents the correlation of the correlation window associated with a reference transform vector in the right image with the correlation window associated with a transform vector in the left image that is located in the same row and column as the transform vector in the reference right image. Here, the disparity is zero (0) and hence, the two windows in the left image and reference right image are not offset with respect to each other.

The correlation data in data element 365 represents the correlation of the window associated with a reference transform vector in the right image with the window associated with a transform vector in the left image that is located in the same row but shifted two columns to the right from the location of the reference transform vector in the reference right image. Here, the disparity is two (2) and hence, the two windows in the left image and reference right image are offset by two columns with respect to each other.

Similarly, the correlation data in data element 366 represents the correlation of the window associated with a reference transform vector in the right image with the window associated with a transform vector in the left image that is located in the same row but shifted fifteen (15) columns to the right from the location of the reference transform vector in the reference right image. Here, the disparity is fifteen (15) and hence, the two windows in the left image and reference right image are offset with respect to each other by fifteen columns.

The same applies to other correlation results for other image elements and their respective disparities. For example, the correlation data in data element 367 represents the correlation of the window associated with a reference transform vector represented by line 363 in the right image with the window associated with a transform vector in the left image that is located in the same row but shifted one column to the right from the location of the transform vector represented by line 363 in the reference right image. Here, the disparity is one (1) and hence, the two windows in the left image and reference right image are offset by one column with respect to each other.

If the window size is 1×1 (a single coordinate position), the value calculated and stored in data element 364 (disparity=0) is the Hamming distance between the transform vector in the right image and the corresponding transform vector in the left image. If the window size is greater than 1×1 (e.g., 7×7), the value calculated and stored in data element 364 is the sum of the individual Hamming distances calculated between each transform vector in the window of the right image and the corresponding transform vector in the window of the left image.

Figure 13B:
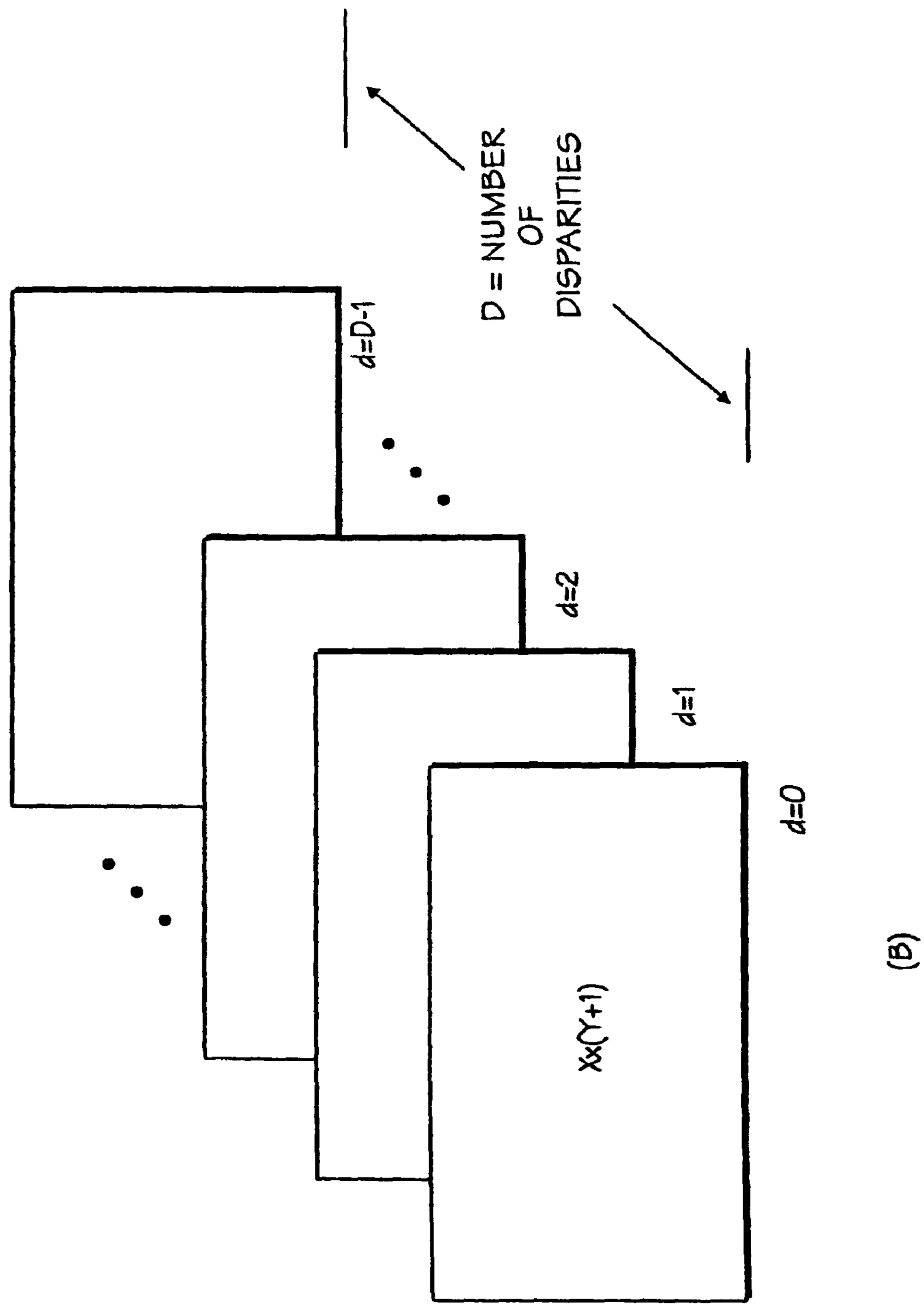
FIG. 13(B) shows an abstract three-dimensional representation of the same correlation buffer.

FIG. 13(B) shows an abstract three-dimensional representation of the same correlation buffer. As shown, each of the D correlation buffers is size X×Y and holds correlation sum values for each reference image element in the right image in the desired image processing area with respect to corresponding image elements in the left image for a given disparity. For D disparities, D such correlation buffers are provided.

K. Correlation Between Windows

Figure 12:
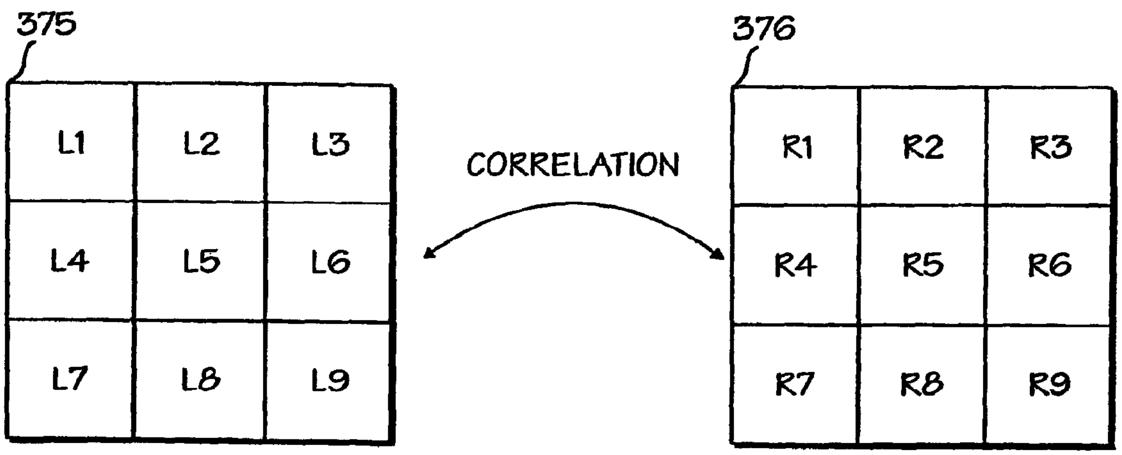
FIG. 12 shows the correlation matching of two windows.

Referring to FIG. 12, window 375 represents a 3×3 window in the left image offset by a particular disparity from the corresponding window 376 in the reference right image. If the correlation calculation is for data element 377 for image element 372 in FIG. 13(A), the disparity is five (5). Returning to FIG. 12, each data element L1-L9 represents a transform vector for a portion of the left image calculated from the left intensity image in a previous step. Similarly, each data element R1-R9 represents a transform vector for a portion of the reference right image calculated from the right intensity image in a previous step. The reference transform vector for the left window 375 is L9 and the reference transform vector for the reference right window 376 is R9. Transform vectors L9 and R9 are located on the same row in their respective transform images but L9 is shifted by 5 columns (disparity=5). The correlation for these two 3×3 windows is the sum of the individual Hamming distances between each transform vector; that is, the Hamming distances between the following sets of transform vectors are calculated: L1 with R1, L2 with R2, L3 with R3, L4 with R4, L5 with R5, L6 with R6, L7 with R7, L8 with R8, and L9 with R9. These nine individual sets of Hamming distance calculations are then summed. This sum is then stored and associated with reference transform vector R9. In one embodiment, the full correlation sum is available for regions 5, 6, 9, and 10.

This one-to-one matching of transform vectors in the windows is one embodiment of the present invention. Other embodiments may employ a different matching pattern including matching every transform vector in the right window 376 with every other transform vector in the left window 375. Still other embodiments include skipping or ignoring certain transform vectors in a manner analogous to the census transform calculations. Thus, to increase processing speed, the correlation operation may involve determining the Hamming distance between L1 with R1, L3 with R3, L5 with R5, L7 with R7, and L9 with R9, summing these individual Hamming distances, and storing them in the appropriate data element position for reference image element R9.

L. Column Sum Buffer

FIGS. 15(A)-15(D) show an exemplary update sequence of the column sum array[x][y] used in the correlation summation, interest calculation, and the disparity count calculation. FIGS. 14(A)-14(D) illustrate the use and operation of the column sum array[x][y] with respect to the moving window. For illustrative purposes, FIGS. 14(A)-14(D) should be reviewed during the discussion. The column sum array is a single line buffer that is updated as the moving window moves from one coordinate position to another. The column sum array is used in the correlation sum calculations, interest calculations, and mode filter calculations to facilitate window sum calculations and increase the processing speed. The width or length of this single line column sum array is the width of the image. More specifically, the width of the column sum buffer is the width of the desired image processing area which is usually less than the original image.

Figure 14A:
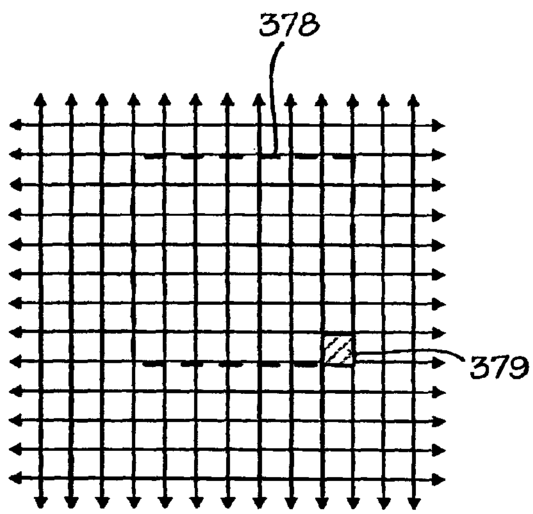
FIGS. 14(A)-14(D) illustrate the use and operation of the column sum array[x][y] with respect to the moving window.
Figures 15A, 15B, 15C, 15D:
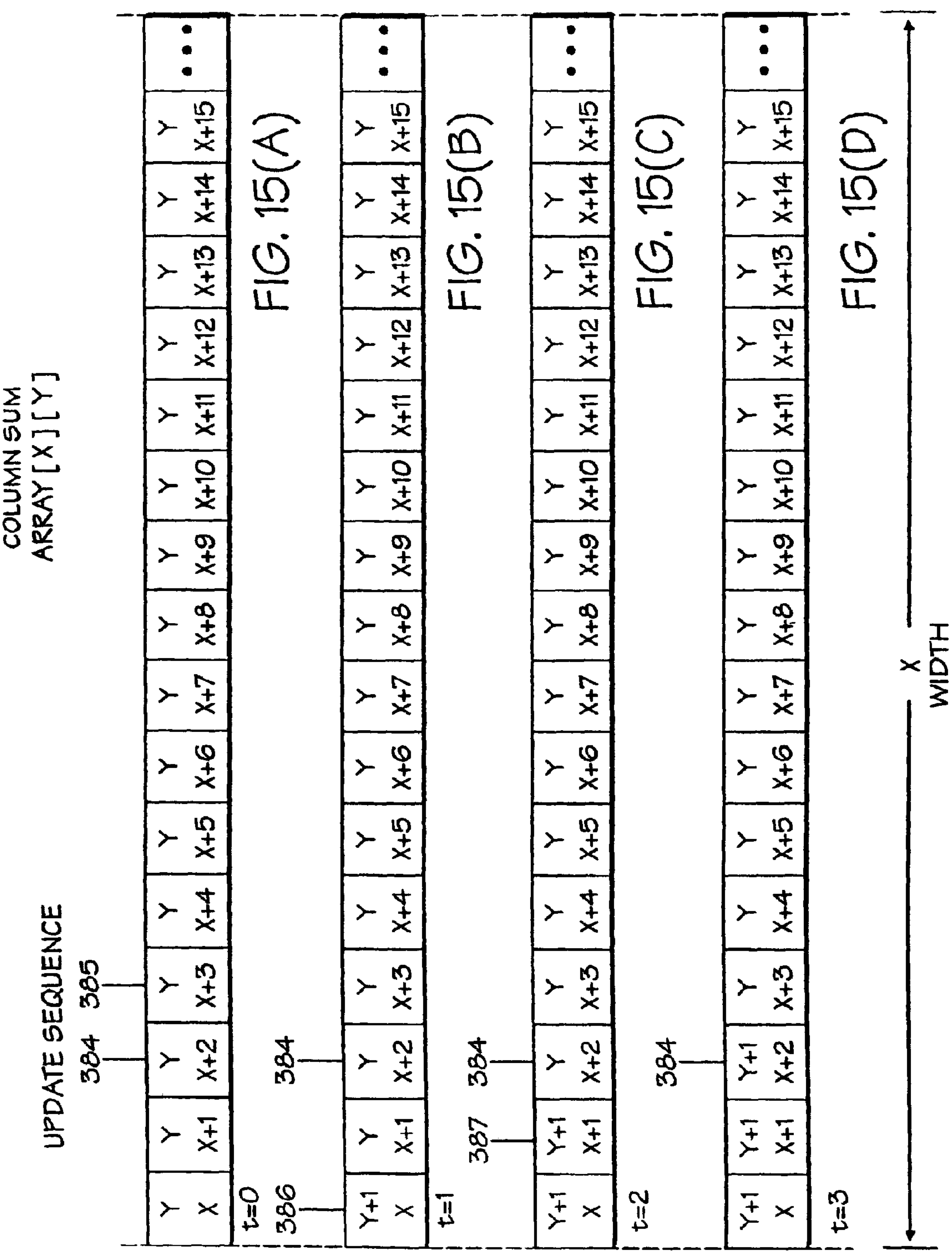
FIGS. 15(A)-15(D) show an exemplary update sequence of the column sum array[x][y] used in the correlation summation, interest calculation, and the disparity count calculation.

Referring to FIG. 14(A), window 378 and its reference image element 379 is located at (X+2, Y); that is, reference image element 379 is located at row Y and column X+2. The column sum buffer starts at X and ends at $2^*X_{WIDTH}-1$. Thus, the reference image element 379 is located two columns from the left edge of the desired image processing area. After calculating the column sum for reference image element 379, the column sum is stored in the column sum buffer at position 384, which writes over the existing column sum and replaces it with the column sum for reference image element 379 located at (X+2, Y), as shown in FIG. 15(A). The window in FIG. 14(A) moves along the rest of the row and calculates column sums and stores these column sums at respective locations in the column sum buffer. Thus, after X+2, the column sum is calculated for the image element at column X+3 and its column sum is stored at position 385 in the column sum buffer, as shown in FIG. 15(A). At the end of the row, the column sum buffer holds column sum values for each column (X, X+1, X+2, . . . , $2^*X_{WIDTH}-1$) in row Y. This is shown in FIG. 15(A). These are column sum values held in the column sum buffer at time t=0.

Figure 14B:
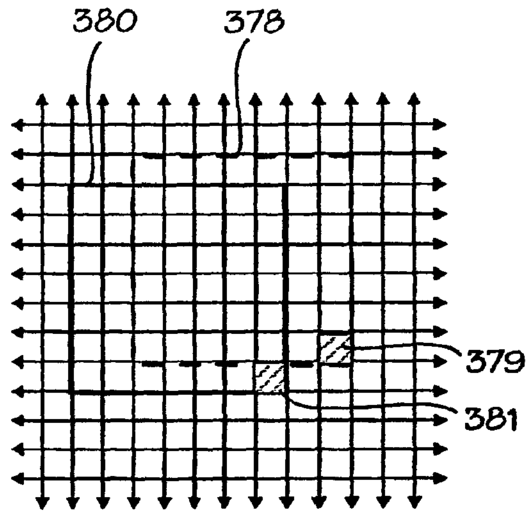

At time t=1, the column sum buffer is updated again. Referring to FIG. 14(B), window 380 and its reference image element 381 are located at the start of the new row at (X,Y+1) which is one row down and $2^*X_{WIDTH}-1$ columns to the left from the last calculation. Remember, the last calculation was performed for the window and its reference image element at the end of its row Y at location ($2^*X_{WIDTH}-1$, Y). At location (X, Y+1), the column sum is calculated and stored in the column sum buffer at position 386, as shown in FIG. 15(B). All other positions in the column sum buffer hold previously calculated column sum values from the previous row. Thus, position 386 (X, Y+1) in FIG. 15(B) holds the column sum value whose column is associated with reference image element 381 in FIG. 14(B) while the remaining positions in the column sum buffer hold column sum values from row Y. Indeed, the column sum calculated for reference image element 379 remains stored at position 384. This is for time t=1.

Figure 14C:
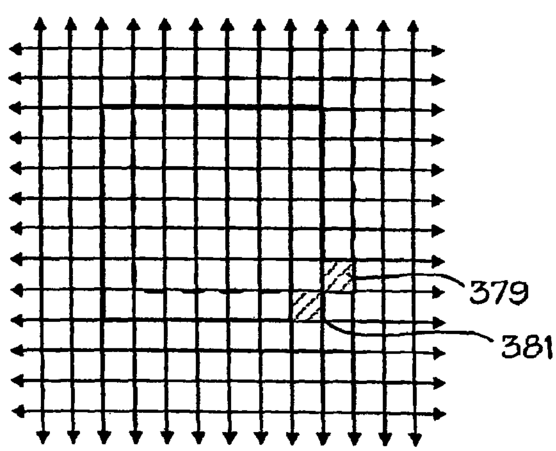

At time t=2, window 380 has moved to the right one column such that reference image element 381 is located at (X+1, Y+1) as shown in FIG. 14(C). After the column sum for this particular location (X+1, Y+1) is calculated, the column sum is stored at position 387 in the column sum buffer as shown in FIG. 15(C). The remainder of the column sum buffer to the right of position 387 holds previously calculated column sum values from the previous row. Thus, position 384 still holds the column sum calculated for reference image element 379.

Figure 14D:
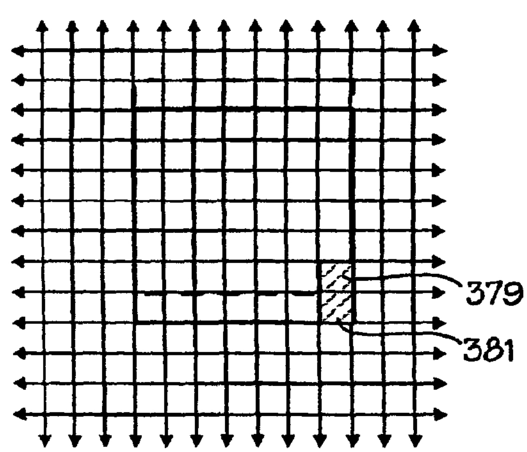

At time t=3, window 380 has moved over to the right one column such that reference image element 381 is located at (X+2, Y+1) as shown in FIG. 14(D). Reference image element 381 is located immediately below image element 379. After the column sum for this particular location (X+2, Y+1) is calculated, the column sum is stored at position 384 in the column sum buffer as shown in FIG. 15(D) by writing over the previously calculated column sum for image element 379 at a previous iteration. The remainder of the column sum buffer to the right of position 384 holds previously calculated column sum values from the previous row. Now, position 384 in the column sum buffer holds the column sum calculated for reference image element 381 rather than 379. Of course, the previous column sum value for image element 379 is used in the computation before the actual write operation onto position 384 occurs. As discussed before, subtraction of the upper rightmost corner image element from the column sum for 379 is executed. The addition of the image data 381 to the modified column sum is also performed prior to the write over operation. This computation of updating past column sums based on the current location of the window and its reference image element is accomplished repeatedly using the single line column sum buffer.

M. Left-Right Consistency Check

Figures 16A, 16B:
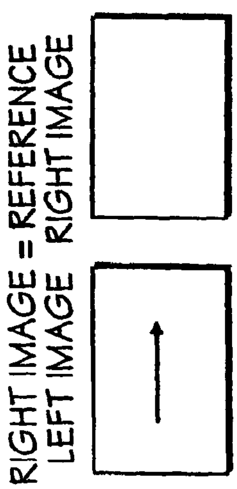
FIGS. 16(A)-(G) provide illustrations that introduce the left-right consistency check.
Figures 16C, 16D:
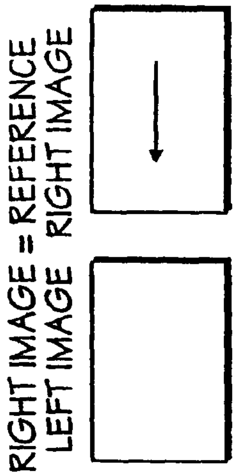
Figure 16E:
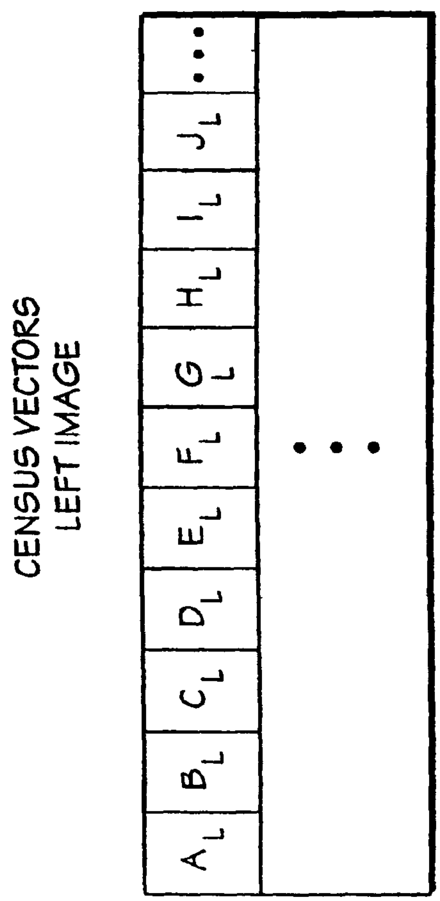
Figure 16F:
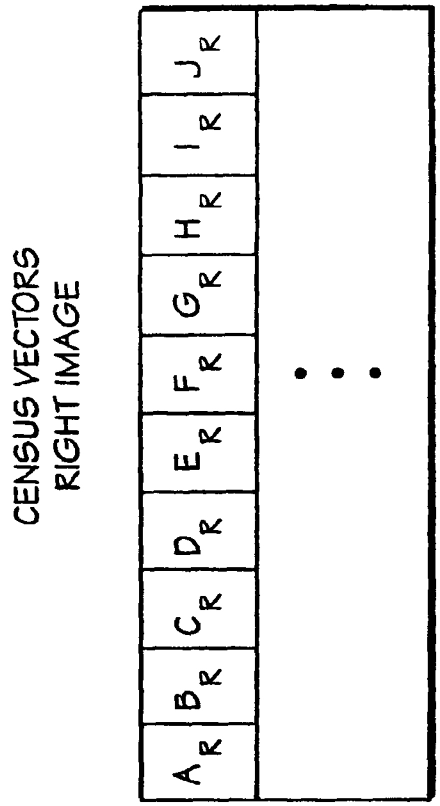
Figure 16G:
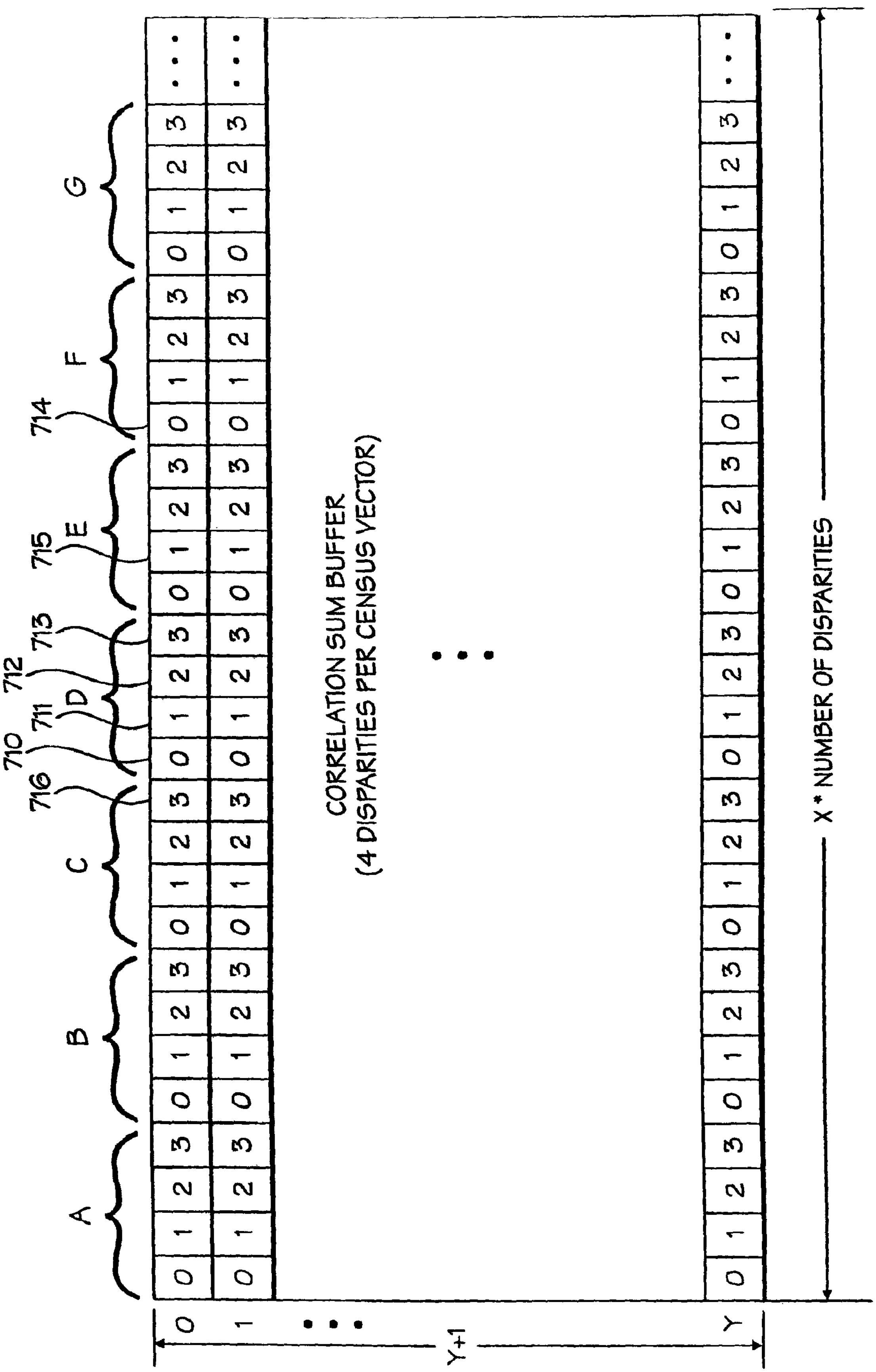

FIGS. 16(A)-16(G) illustrate the left-right consistency check. FIGS. 16(A)-16(D) show the relative window shifting for the disparities when either the right image or the left image is designated as the reference; FIGS. 16(E)-16(F) show a portion of an exemplary left and right census vectors; and FIG. 16(G) shows the structure of one embodiment of the correlation sum buffer and the image elements and corresponding disparity data stored therein.

The left-right consistency check is a form of error detection. This check determines and confirms whether an image element in the left image that has been selected as the optimal image element by an image element in the right image will also select that same image element in the right image as its optimal image element. Basically, if image element P in the right image selects a disparity such that P' in the left image is determined to be its best match (lowest correlation sum value among the disparities for that image element P), then image element P' in the left image should select a disparity value such that image element P in the right image is its best match. In cases where a scene element is not visible in both images, or where the scene does not have enough texture to obtain a plausible match, a minimum determined from one view may be less meaningful.

The left-right consistency check uses the already calculated data in the correlation sum buffer to perform its task. Although the correlation sum buffer was generated based on the right image serving as the reference, the design of the present invention ensures that data for the various disparities are included as if the left image was designated as the reference although ordered differently.

As depicted in FIGS. 16(A) and 16(B), when the right image is designated as the reference, the left image is shifted to the right as various correlation sums are computed for each shift or disparity from a corresponding position in the right image. The reference right image remains in place. As depicted in FIGS. 16(C) and 16(D), when the left image is designated as the reference, the right image is shifted to the left as various correlation sums are computed for each shift or disparity from a corresponding position in the left image. The reference left image remains in place.

FIG. 16(E) represents a census transform vector array for the left image of a particular scene. The census transform array includes census vectors computed from the left intensity image. The census vectors include, for example, $A_L$, $B_L$, $C_L$, $D_L$, $E_L$, $F_L$, $G_L$, $H_L$, $I_L$, $J_L$ and so on for the entire array. These particular left census vectors are located along a single row. FIG. 16(F) represents a census transform vector array for the right image of the same scene. The census transform array includes census vectors computed from the right intensity image. These census vectors include, for example, $A_R$, $B_R$, $C_R$, $D_R$, $E_R$, $F_R$, $G_R$, $H_R$, $I_R$, $J_R$ and so on for the entire array. These particular census vectors are located along a single and the same corresponding row as the census vectors $A_L$, $B_L$, $C_L$, $D_L$, $E_L$, $F_L$, $G_L$, $H_L$, $I_L$, and $J_L$ of the left image. In this example, the number of disparities chosen is 4 (D=4), so that the disparities run from 0 to 3, and the right image is designated as the reference image.

FIG. 16(G) shows a portion of the correlation sum buffer corresponding to these census vectors. Along the first row 0, the correlation sum data were computed for each reference image element in the reference right image and stored in appropriate positions in the correlation sum buffer. Other correlation sum data are stored in the remaining rows and columns of the buffer. Thus, the correlation sum data for each disparity (0, 1, 2, 3) of the first reference image element $A_R$ are stored in the first four data locations in row 0. Similarly, the correlation sum data for each disparity (0, 1, 2, 3) of the second reference image element $B_R$ are stored in the second four data locations in row 0. The data storage is implemented in this manner in the correlation sum buffer for the remainder of the reference right image elements (e.g., $C_R$, $D_R$, $E_R$, $F_R$, $G_R$, $H_R$, $I_R$, $J_R$) until all correlation sums are accounted for each of the reference image elements.

Note that the data in the correlation sum buffer were generated using the right image as the reference while the windows and points in the left image are shifted for each disparity. The data are stored and structured in a manner that reflects this concept. However, the stored data also reflect the correlation results for the left image as if the left image were designated as the reference, although ordered differently in the correlation sum buffer. In general, consecutive sequences of adjacent data in the buffer represent the reference right-to-left correlation, whereas consecutive sequences of D−1 offset data represent the reference left-to-right correlation.

For example, focusing on image element D of FIG. 16(G), the correlation sums for each of its disparities 0-3 have been calculated and stored in adjacent buffer locations. These particular data represent the correlation of the reference right image element $D_R$ (its transform vector) with respect to shifted image elements (corresponding transform vectors) in the left image. Thus, the correlation sum of the transform vectors in the correlation window of $D_R$ (see FIG. 16(F)) with the transform vectors in the correlation window of $D_L$ (see FIG. 16(E)) is stored in location 0 (d=0) of data element D in the correlation sum buffer. This location in the correlation sum buffer is represented in FIG. 16(G) as 710. Similarly, the correlation sum of the transform vectors in the correlation window of $D_R$ (see FIG. 16(F)) with the transform vectors in the correlation window of $E_L$ (see FIG. 16(E)) is stored in location 1 (d=1) of data element D in the correlation sum buffer. This location in the correlation sum buffer is represented in FIG. 16(G) as 711. Next, the correlation sum of the transform vectors in the correlation window of $D_R$ (see FIG. 16(F)) with the transform vectors in the correlation window of $F_L$ (see FIG. 16(E)) is stored in location 2 (d=2) of data element D in the correlation sum buffer. This location in the correlation sum buffer is represented in FIG. 16(G) as 712. Finally for the data element D, the correlation sum of the transform vectors in the correlation window of $D_R$ (see FIG. 16(F)) with the transform vectors in the correlation window of $G_L$ (see FIG. 16(E)) is stored in location 3 (d=3) of data element D in the correlation sum buffer. This location in the correlation sum buffer is represented in FIG. 16(G) as 713. These correlation sums are stored in adjacent locations in the correlation buffer associated with data element D. Other correlation sum data are stored in like fashion for other reference image elements (i.e., transform vectors) A, B, C, E, F, G, H, I, and J, etc.

Now, when the left image is designated as the reference, the right image is shifted to the left. As a result, not all left data elements in the left image have an entire set of correlation sums for all disparities. For example, left data element $A_L$ can only be matched with right data element $A_R$ for disparity 0. For disparity 1, $A_L$ does not have any corresponding data elements in the right image because each disparity is shifted to the left when the left image is designated as the reference.

Accordingly, the first data element in the left image that has a complete set of correlation sums for each of its disparities is located at D data elements in the left image. In other words, the left data element associated with the correlation sum of disparity D−1 of data element A in the correlation buffer is the first data element in the left image that has a complete set of correlation sums for each of its disparities. For 4 disparities (i.e., D=4), D−1=3, and thus, the data element located at 4 data elements in the left image is $D_L$. Conversely, for data element A in the correlation sum buffer, the left data element associated with the correlation sum for disparity 3 (i.e., D−1) is $D_L$.

For this example, D=4 and the first left data element that has a complete set of correlation sums for all disparities is $D_L$.

At disparity 3, data element A has the correlation sum between the window of $A_R$ and the window of $D_L$. Moving over D−1 (i.e., 3) locations, at disparity 2, data element B has the correlation sum between the window of $B_R$ and the window of $D_L$. Moving over D−1 (i.e., 3) locations, at disparity 1, data element C has the correlation sum between the window of $C_R$ and the window of $D_L$. Moving over D−1 (i.e., 3) locations, at disparity 0, data element D has the correlation sum between the window of $D_R$ and the window of $D_L$. As is evident from this example, the correlation sum buffer contains correlation sum data for the various left image data elements and disparity-shifted right image data elements even though the buffer was originally created with the right image as the reference.

The left-right consistency check involves comparing the correspondence selections of the right and left image and determining if they match. In the example above, if $D_R$ originally selects disparity 2 as its optimum disparity, it has selected $F_L$ as its corresponding image. The left-right consistency check confirms whether $F_L$ has selected $D_R$ as its best match. The best match is determined by the lowest correlation sums among the disparities for a given reference image element. For $F_L$, the correlation data for each of its disparities are located in location 714 (disparity 0, $F_R$), location 715 (disparity 1, $E_R$), location 712 (disparity 2, $D_R$), and location 716 (disparity 3, $C_R$). If location 712 contains the lowest correlation sum among all of these disparities for data element $F_L$ (locations 714, 715, 712, and 716), then a match occurs and the left-right consistency check confirms the original right-to-left selection. If a match does not occur, the selections from both views can be discarded, or alternatively, the disparity with the lowest correlation sum among the disparities for both views can be selected. Furthermore, the selection can depend on the results of the interest operation or the mode filter.

N. Interest Operation

Another check used in the exemplary program relates to the confidence value generated by the interest operator. A low value resulting from the interest operation represents little texture (or uniform texture) in the intensity images (and hence the scene) and accordingly, the probability of a valid correlation match is relatively low. A high value resulting from this interest operation means that a great deal of texture is evident in the intensity images, and hence the probability of a valid correlation match is relatively high. When the confidence value is low, the intensity of the image 1 neighborhood is uniform, and cannot be matched with confidence against image 2.

A threshold is used to decide when a disparity value has a high enough confidence. The threshold is programmable, and a reliably high value depends on the noise present in the video and digitization system relative to the amount of texture in a pixel neighborhood.

The interest operator described herein involves summing local intensity differences over a local area or window using sliding sums. It is called the summed intensity difference operator herein. The sliding sums method is a form of dynamic programming which computes, at each pixel in an image, the sum/difference of a local area. The interest operation uses this local area sum/difference method by computing intensity value differences between pixels over a rectangular local area of values surrounding that pixel, called the interest window, and summing these differences. Relatively small interest windows of about 7×7 are sufficient for one embodiment of the present invention. Other embodiments may utilize interest windows of different sizes. Although varying relative sizes of census windows and interest windows can be used without detracting from the spirit and scope of the present invention, the use of larger census windows and smaller interest windows results in better localization at depth or motion discontinuities.

O. Mode Filter

The mode filter selects disparities based on population analysis. Every optimal disparity stored in the extremal index array associated with an image element is examined within a mode filter window. The optimal disparities in the extremal index array were previously determined in MAIN. Typically, the optimal disparity values within a window or neighborhood of an image element should be fairly uniform for a single computation of the disparity image. These particular disparity values may vary from computation to computation, especially if the object in the scene or the scene itself is somewhat dynamic and changing. The disparity with the greatest count within the mode filter window of the reference image element is selected as the disparity for that image element and stored in the MF extremal index array. This negates the impact that a stray erroneously determined disparity value may have for a given image element. For example, for a 7×7 window, the optimal disparities in the window associated with an image element are:

| | | | | | | |
|---|---|---|---|---|---|---|
| 4 | 2 | 3 | 4 | 5 | 4 | 3 |
| 3 | 4 | 4 | 5 | 2 | 5 | 4 |
| 5 | 6 | 7 | 3 | 4 | 2 | 3 |
| 3 | 4 | 5 | 3 | 2 | 4 | 4 |
| 4 | 5 | 3 | 0 | 9 | 4 | 3 |
| 3 | 5 | 4 | 4 | 4 | 4 | 6 |
| 5 | 4 | 3 | 4 | 2 | 4 | **4** |

Each block in this 7×7 window represents the optimal disparity selected for each image element located in these blocks. The maximum number of disparities is 16 (D=16). The mode filter determines disparity consistency within a neighborhood or window with respect to the reference point in the lower rightmost corner of the window, shown here with larger font, underlined, and bolded having a disparity value of 4. The counts for the disparity values in this window are:

| |
|---|
| d = 0: 1 |
| d = 1: 0 |
| d = 2: 5 |
| d = 3: 11 |
| d = 4: 20 |
| d = 5: 8 |
| d = 6: 2 |
| d = 7: 1 |
| d = 8: 0 |
| d = 9: 1 |
| d = 10: 0 |
| d = 11: 0 |
| d = 12: 0 |
| d = 13: 0 |
| d = 14: 0 |
| d = 15: 0 |

The total number of counts for this window should equal 49 (7×7). In this example, the disparity 4 value occurred 20 times, which is the highest number of all the disparity values in this window. The disparity 3 is the second highest with a count of 11 in this window. Thus, the disparity value chosen for this window and assigned to the reference point in the lower rightmost corner of the window is disparity 4, which also happens to coincide with the optimum disparity value chosen for this image element at this location.

For ties in the disparity value, the program is skewed or biased to select the higher disparity value. Thus, in this example, if the count for disparity 4 was 14 and the count for disparity 5 was 14, then one embodiment of the present invention selects disparity 5 as the optimal disparity value for this window. In other embodiments, the lower disparity value in a tie situation will be selected as the optimal disparity value. Because the mode filter operation is a form of error detection, it need not be implemented to make the various embodiments of the present invention work.

P. Sub-Pixel Estimation

Up to this point, the algorithm aspect of the present invention generated an optimal disparity for each image element located in the desired image processing area. This discrete or integer optimal disparity may be characterized as an initial "guess," albeit a very accurate and intelligent one. This "guess" can be confirmed, modified or discarded using any combination of the interest operation, left-right consistency check, and the mode filter. In addition to these confidence/error checks, the initial "guess" of the optimal disparity can be further refined using sub-pixel estimation. Sub-pixel estimation involves estimating a more accurate disparity (if it exists) by reviewing the correlation sums for disparities adjacent to it on either side and then interpolating to obtain a new minimum correlation sum, and hence a more precise disparity. Thus, as an example, if disparity d=3 was selected as the optimal disparity, sub-pixel estimation involves fitting a set of mathematically related points such as a set of linear segments (e.g., a "V") or curve (e.g., a parabola) between the correlation sum points representing disparity d=2, d=3, and d=4. A minimum point on this "V" or parabola represents an equal or lower correlation sum than the correlation sum that corresponds to the discrete disparity that was initially selected through the main correlation program with appropriate confidence/error detection checks. The estimated disparity that is associated with the new minimum correlation sum is now selected as the new optimal disparity.

Figure 17A:
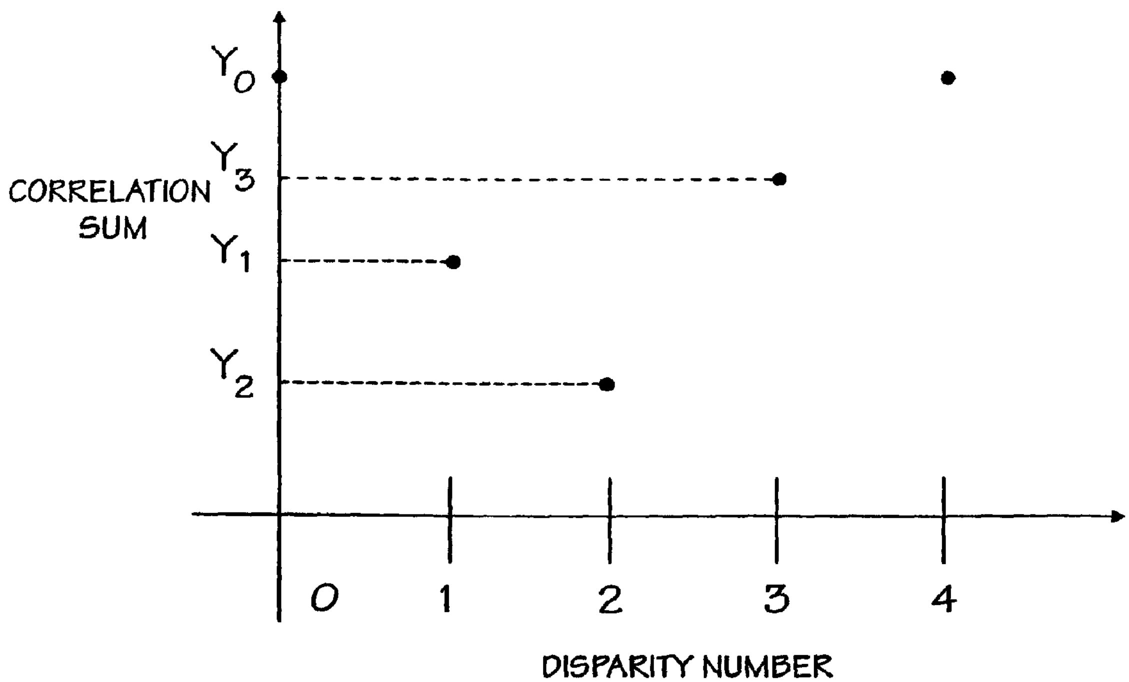
FIG. 17(A)-(B) illustrates the sub-pixel estimation in accordance with one embodiment of the present invention.

FIG. 17 illustrates the concept and operation of the sub-pixel estimation used to determine the refined optimal disparity number. FIG. 17(A) shows an exemplary distribution of disparity number v. correlation sum for one particular image element. The x-axis represents the allowable disparities for the given image element. Here, the maximum number of disparities is 5 (D=5). The y-axis represents the correlation sum calculated for each of the disparities shown in the x-axis for the particular image element. Thus, the correlation sum for disparity 0 is calculated to be $Y_0$, the correlation sum for disparity 1 is calculated to be $Y_1$, the correlation sum for disparity 2 is calculated to be $Y_2$, the correlation sum for disparity 3 is calculated to be $Y_3$, and the correlation sum for disparity 4 is calculated to be $Y_4$. For this example, $Y_2<Y_1<Y_3<Y_0<Y_4$. Initially, the algorithm selects disparity 2 as the optimum disparity because it has the lowest correlation sum. Assuming that this initial selection passes the interest operation, mode filter, and the left-right consistency check (if these confidence/error detection checks are utilized at all), this initial selection can be characterized as the optimal disparity. Note that in FIG. 17(A), because the disparity is an integer number, the correlation sums are plotted at discrete points. Assuming that some correlation pattern exists around the initially selected optimal disparity, interpolating through a number of these plotted points may yield an even lower correlation sum value than the one associated with the initially selected optimal disparity.

Figure 17B:
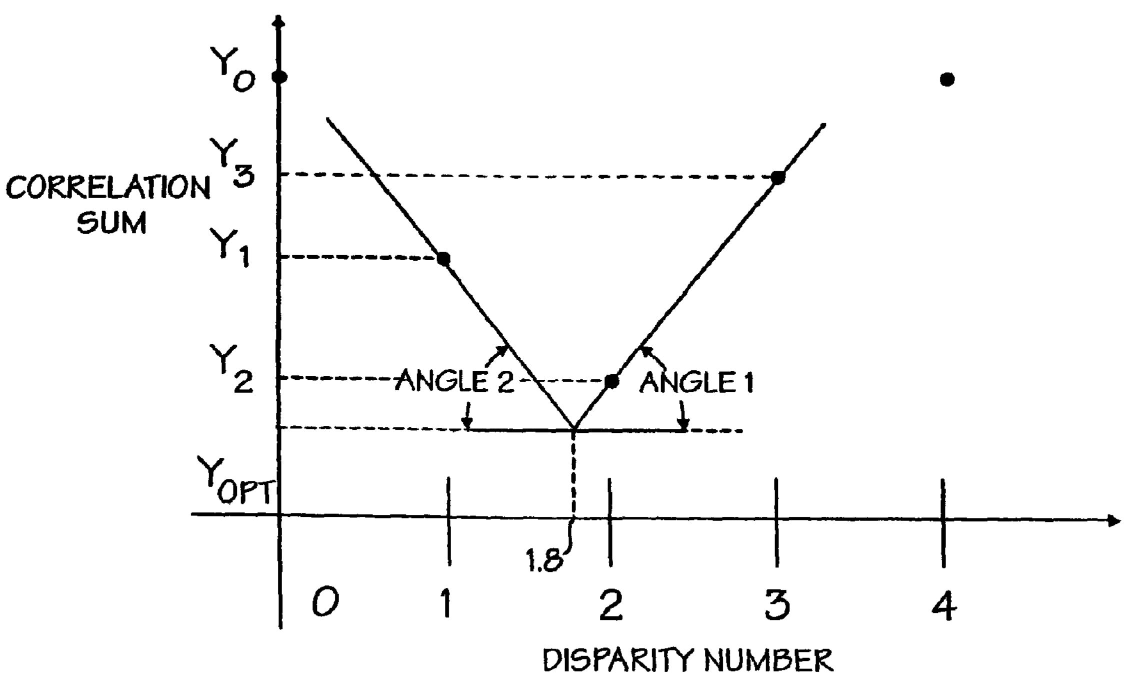

FIG. 17(B) shows one such interpolation method. Using the same plot in FIG. 17(A), the interpolation method in accordance with one embodiment of the present invention utilizes two line segments forming a "V" shape. The "V" is drawn through three points—the initially selected correlation sum point for disparity 2 (i.e., $Y_2$), and the two correlation sum points associated with the disparity numbers immediately before (i.e., correlation sum $Y_1$ for disparity 1) and immediately after (i.e., correlation sum $Y_3$ for disparity 3) this initially selected optimum disparity number (i.e., disparity 2). In this illustration, the refined optimum disparity number is 1.8 corresponding to correlation sum $Y_{OPT}$, which is smaller than the correlation sum Y2. With this refined disparity number, distance/motion/depth calculations can be more accurate.

The "V" can embody different shapes. In one embodiment, the "V" is a perfect "V;" that is, ANGLE1=ANGLE2 in FIG. 17(B). The particular values for the angles may vary however, from one plot to another. So long as ANGLE1=ANGLE2, a perfect "V" can be drawn through any three points in two-dimensional space. The location of the particular correlation sum values in the correlation sum v. disparity number plot with respect to the correlation sum value associated with the initially selected optimum disparity determines what angle values will be selected for ANGLE1 and ANGLE2.

A formula can be used to calculate this new optimal disparity. Referring still to FIG. 17(B):

$$\text{Offset} = 0.5 - \frac{\text{MIN}(Y_1 - Y_2,\ Y_3 - Y_2)}{2 \cdot \text{MAX}(Y_1 - Y_2,\ Y_3 - Y_2)}$$

The variable Offset represents the offset from the discrete optimal disparity initially selected prior to this sub-pixel estimation operation. The MIN(a, b) function selects the lower of the two values a or b. The MAX(a, b) function selects the higher of the two values a or b. Thus, in the example of FIG. 17(B), the initially selected discrete disparity is 2, the calculated offset is −0.2, and hence the new estimated disparity is 1.8.

Q. Concurrent Operation

Although the discussion has focused on sequential processing for purposes of clarity, in implementing the present invention, the various operations need not occur at separate times from each other. Rather, the operations can be performed concurrently to provide usable results to the end user as soon as possible. Indeed, some embodiments require parallel and pipelined operation. In other words, the system can process data in a systolic manner.

One embodiment of the present invention determines correlation for each of the disparities while also performing the left-right consistency check in a fully parallel and pipelined manner. For a more detailed discussion, refer to the hardware implementation below with reference to FIGS. 48, 49, 50, 52, 54, 55, and 57.

One embodiment computes the census transform for all the relevant image data in the desired image processing area first and then computes the correlation results from the generated array of census vectors. In another embodiment, the census transform is applied to the image data concurrently with the correlation computations to provide quick correlation results as the image data is presented to the system. Thus, when sufficient numbers of image intensity data are received by the system from the sensors, the census transform can be immediately applied to the image intensity data to quickly generate census vectors for the scene of interest. Usually, determining whether sufficient image intensity is available for the census calculation depends on the size of the census window, the location of the census window reference point, and the particular image intensity data in the census window selected for the census vector generation. If the last point in the census window that will be used for the census vector calculation is available for both the left and right images, then the census transform program can begin. This calculates a single census vector for the upper leftmost corner of the desired image processing area.

When sufficient census vectors are available to calculate correlation results for a given image element, the system can trigger or initiate the correlation summation program. Usually, when the first census vector for each of the left and right images is available, the correlation program can calculate the Hamming distance for theses two vectors immediately and initiate the column sums and window sum arrays. As more image intensity data are received by the system, more census vectors can be generated and the correlation sums are assembled column by column and window by window.

When sufficient window sums are available, the disparity optimization program can then begin. Thus, when the correlation summation program has calculated the correlation sums for each of the disparities for a given image element, the optimal disparity can be determined. The disparity optimization program selects the minimum correlation among the disparities for a given image element and stores it in the extremal index array.

Concurrently with either the correlation sum and optimal disparity determination or the reception of the image intensity data reception by the system, the interest operation can begin. If the interest operation commences along with the image intensity data reception, the interest results are stored for subsequent use. If the interest operation commences along with the correlation sum and optimal disparity determination programs, the interest results can be used immediately to evaluate the confidence of the optimal disparity selected for that image element.

When the extremal index array has selected sufficient optimal disparity data for the image elements, the mode filter and left-right consistency check can begin. These error detection checks can evaluate the selected optimal disparity (i.e., left-right consistency check) or the selected group of optimal disparities (i.e., mode filter) as the data becomes available. All of these concurrent processes can proceed data by data within a frame and the results transmitted to the user for real-time use.

The various operations of the present invention include the census transform, correlation summation, disparity optimization, interest operation, left-right consistency check, mode filter, and the particular caching operation. The bulk of these operations are implemented in the image processing system via column sums and window sums. In addition to the array of computing elements, the system may utilize computing and memory resources from the host system.

III. Exemplary Program

A. Main Program

The concepts discussed above may be illustrated by examination of an exemplary program which uses the census transform to calculate depth from stereo images.

Figure 18:
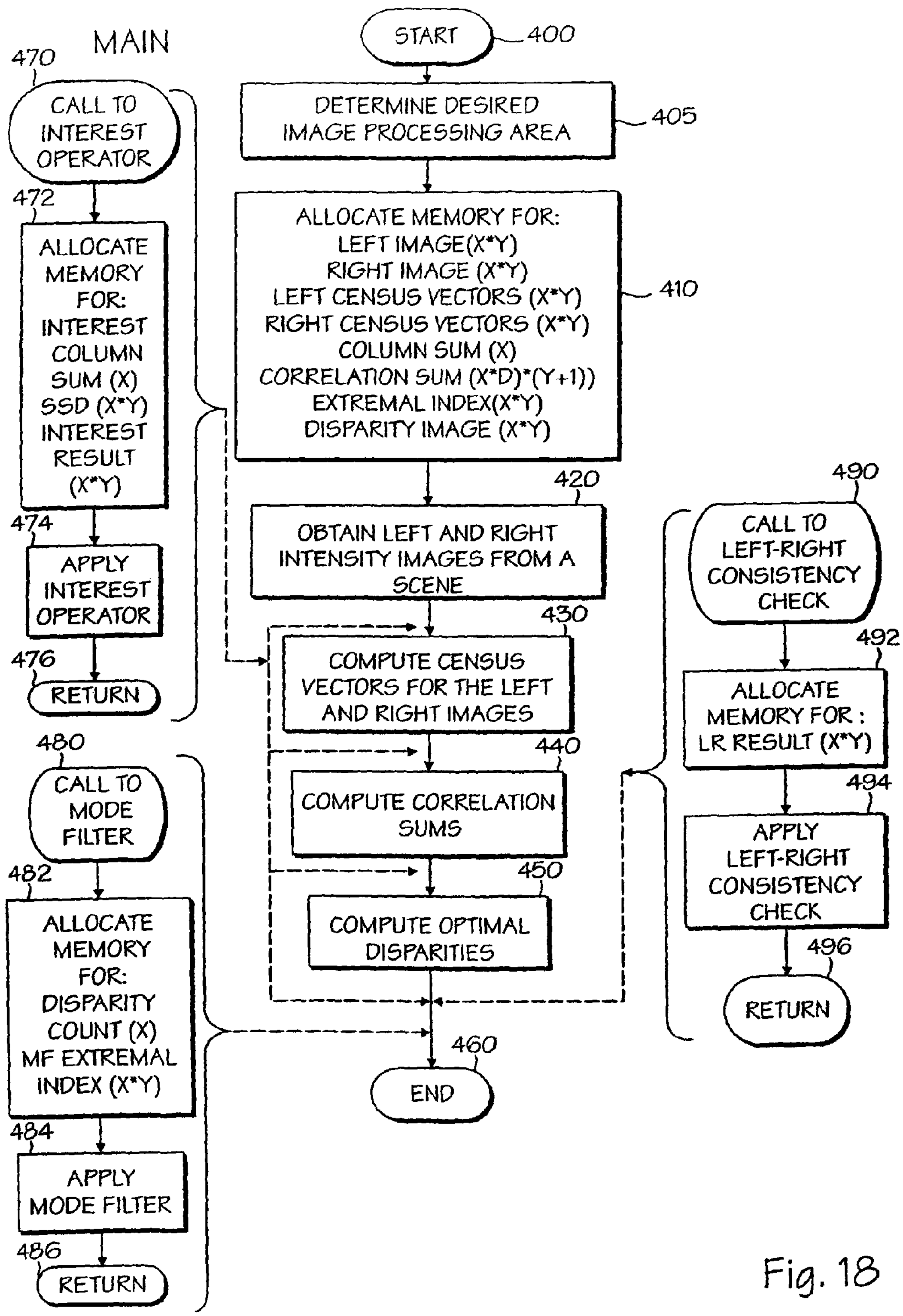
FIG. 18 shows a high level flow chart of one embodiment of the present invention with various options.

FIG. 18 shows a high level flow chart of one embodiment of the present invention with various options. In this embodiment, various operations are implemented using unrolled loops. Unrolled loops are known to those skilled in the art as iterative computations that substantially omit the "If . . . then . . . Next" loops to save processing time—if the program does not need to test loop-related conditions, then these steps are not incorporated and do not consume processing time and resources.

The program designated "MAIN" starts at step 400. Step 405 determines the desired image processing area. Usually, the object of interest is located in a small area of the screen while the remainder of the scene is merely static background. This permits frequent computations to focus on the desired image processing area for real-time updating while the static background is processed much less frequently, if at all, and transmitted to the display in non-real-time mode. In other cases, the user may want to focus on a particular area of the scene regardless of whether other parts of the scene are static or not, or the entire scene may be the desired image processing area.

Step 410 allocates memory space for the various arrays utilized in this embodiment of the present invention. The original intensity images for the left and right cameras are each X×Y. As discussed above, in other embodiments, X×Y may also represent the desired image processing area which is a fraction of the original intensity image of the scene.

Based on the intensity images, left and right transform vectors are generated. These vectors need memory space of X×Y each. The column sum line buffer needs a single line of length X to store the various column sums calculated for each reference image element along a line of the intensity image and transform image. The correlation sum buffer holds the ultimate correlation sum results for the left and right intensity images. The width or length of the correlation sum buffer is X*D, where X is the intensity image width and D is the number of the disparities. The height of the correlation sum buffer is Y+1. One more line or row is needed to store correlation sum results for regions 5 and 6. Based on the correlation calculations, an extremal index array of dimensions X×Y is generated and contains the optimal disparities. Finally, the disparity image of dimensions X×Y is generated from the optimal disparities.

Steps 405 and 410 may be reversed in other embodiments; that is, the memory allocation step 410 will occur before the image processing area determination step 405. This implies that the desired image processing area can only be the same as or smaller than the allocated memory space for the images.

Step 420 obtains the distinct left and right intensity images at the desired frame rate of the scene. Step 430 computes the local transform vectors for the left and right images and stores them in respective left and right transform vector arrays. In some embodiments, the transform is the census transform. In other embodiments, the transform is the rank transform. To compute such vectors, the size of the transform window and the location of the reference point in the transform window must be established. In one embodiment, the transform window is 9×9, while in other embodiments, different sizes may be used, such as 7×7. The location of the reference point is the center of the window. In other embodiments, a different reference point is used, such as the lower rightmost corner of the window.

Step 440 begins the correlation process, which depends on both the left and right images. At or before this time, the system decides which image is deemed the reference image. In one embodiment, the right image is designated as the reference image. Step 440 computes the correlation sum value for each transform vector (which is associated with an image element) of the reference right image within a correlation window with respect to the corresponding disparity-shifted transform vectors of the left image within the same size correlation window. Thus, each right image element has D correlation sum results with respect to the disparity-shifted left image elements. In one embodiment, the correlation operation is the Hamming distance. In other embodiments, the correlation operation is the Hamming weight. In one embodiment, the correlation window is 7×7; that is, 7 transform vectors by 7 transform vectors. In other embodiments, the correlation window may be a different size, such as 9×9. Correlation window size represents a balance between processing time required to process the data and the precision of the results obtained.

Step 450 determines the optimal disparity for each image element in the reference right image based on the correlation sum buffer generated in step 440. Because the correlation sum buffer contains the correlation sum value (i.e., Hamming distance) for each image element in the reference right image with respect to each desired shift or disparity of the left image, the optimal disparity of each image element in the right image is the lowest correlation sum value among the disparity-based correlation sum values calculated and stored for each image element of the reference right image. These optimal disparities are then used to generate the disparity image and are also useful for other applications. The program ends at step 460; however, the above steps may be repeated for the next frame of intensity images that may be captured. The next frame or series of subsequent frames may represent movement (or lack thereof) of an object in the scene or may also represent a different area of the scene. The program can repeat from step 405, 410, or 420.

FIG. 18 also shows three optional confidence/error detection checks—interest operation, mode filter, and left-right consistency check. The interest operation makes some decision of the confidence of the results obtained due to the nature of the scene or object in the scene depicted. If the scene or an object in the scene imaged has varying texture, the confidence that the correlation determination represents a reliable "match" for the left and right images may be high. On the other hand, if the scene or an object in the scene imaged has uniform or no texture, the confidence that the correlation determination represents a reliable "match" for the left and right images may be relatively low.

The call to the interest operation 470 may occur at any number of points in the program including, but not limited to, after step 420, after step 430, after step 440, and after step 450. Because the interest operation depends on intensity images, it cannot be called before the intensity images are obtained for the scene of interest. If called, the interest operation may either return to MAIN or proceed with the calculation if a requisite amount of the intensity image is available. The interest operation needs only one intensity image, either the left or right, such that if either one is available, the interest operation may be invoked. If the user predetermines that one or the other image, for example the right image, should be used for the interest calculation, then the call to the interest operation should be delayed until the desired intensity image is available.

Due to the nature of the interest operation, it need not be called for every frame scanned in to the image processing system. In some cases, the scene or an object in the scene is so static such that the need to perform the interest operation is relatively low. The image processing system may not want valuable computing resources diverted to the interest calculation if the interest result may not change frequently from frame to frame or from groups of frames to groups of frames. If, however, the scene is dynamic or the image processing system is concentrated in a small area of the scene where changes occur quite frequently, the interest operation may be called very frequently.

Step 472 allocates memory for the interest operation. These memory spaces are for the interest column sum line buffer (X), the sliding sum of differences (SSD) array (X×Y), and the interest result array (X×Y). Alternatively, the memory allocation step may be incorporated within the MAIN program at step 410 rather than in the interest operation.

At around this time, the size of the interest window and the location of the reference point in the window are determined. In one embodiment, the size of the interest window is 7×7 and the location of the reference point is the lower rightmost corner of the window. Alternatively, these parameters may be determined in MAIN rather than in the interest operation program.

The interest operation is performed on the selected intensity image, for example the right intensity image, at step 474. The thresholded confidence result is stored in the interest result array. At step 476, the interest operation program returns to MAIN.

The mode filter determines consistency of the optimal disparities chosen by the image processing system by selecting disparities based on population analysis. Every optimal disparity stored in the extremal index array associated with an image element is examined within a mode filter window. The optimal disparities in the extremal index array were previously determined in MAIN. Typically, the optimal disparity values within a window or neighborhood of an image element should be fairly uniform for a single computation of the disparity image. The disparity with the greatest count within the mode filter window of the reference image element is selected as the disparity for that image element and stored in the MF extremal index array. Because the mode filter operation is a form of error detection, it need not be implemented at all to make the various embodiments of the present invention work.

The call to the mode filter program, step 480, can be made at any time after the optimal disparities have been determined and stored in the extremal index array in MAIN, after step 450. At around this time, the size of the mode filter window and the location of the reference point in the window are determined. In one embodiment, the size of the mode filter window is 7×7 and the location of the reference point is the lower rightmost corner of the window. Alternatively, these parameters may be determined in MAIN rather than in the mode filter program.

At step 482, memory space is allocated for the single line column sum buffer (called the disparity count buffer (X) herein) and the MF extremal index array (X×Y). The MF extremal index array holds the disparity value selected by the mode filter for each image element. Alternatively, the memory allocation step may be incorporated within the MAIN program at step 410 rather than in the mode filter program. The mode filter operation is performed at step 484 and stores final results in the MF extremal index array. Step 486 returns to MAIN.

The left-right consistency check is also a form of error detection. If image element P in the right image selects a disparity such that P' in the left image is determined to be its best match (lowest correlation sum value among the disparities for that image element P), then image element P' in the left image should select a disparity value such that image element P in the right image is its best match. The left-right consistency check uses the already calculated data in the correlation sum buffer to perform its task. Although the correlation sum buffer was generated based on the right image serving as the reference, it necessarily includes data for the various disparities as if the left image was designated as the reference. The relevant data for each left image element, however, is structured differently.

The call to the left-right consistency check occurs at step 490. Because the left-right consistency check relies on the correlation sums and the optimal disparities, the program can be called at any point after step 450. Alternatively, the program may be called immediately after the computation of the correlation sums (step 440), temporarily store the optimal disparities for the left image elements in an intermediate buffer, and exit the left-right consistency check program until MAIN computes the optimal disparities (right-to-left) and stores them in the extremal index array. At this point, the final stage (comparing left-to-right with right-to-left) of the left-right consistency check may be performed.

The left-right consistency check allocates memory space for the LR Result array (X×Y) in step 492. Alternatively, the memory allocation step may be incorporated within the MAIN program at step 410 rather than in the left-right consistency check program. The left-right consistency check operation is performed at step 494. The program returns to MAIN at step 496.

The present invention uses a local transform to generate transform vectors from intensity images prior to computing the correlation sums. One such transform is the census transform. FIG. 19 shows a flow chart of the census transform operation and its generation of the census vectors. Although a single flow chart is shown, it is of course applicable to both the left and right intensity images. Generally, the census operation is applied to substantially every image element in the desired image processing area, taking into consideration the size of the census window and the location of the reference point in the census window. The census transform is a non-parametric operation that evaluates and represents in numerical terms the relative image intensities of the image elements in the census window with respect to a reference image element. As a result, the numerical evaluation of the image element is a vector.

In another embodiment of the software/algorithm aspect of the present invention, the census and correlation steps are performed in parallel and pipelined fashion. Thus, the census vectors (or the correlation window) in one image are correlated with each of their respective disparity-shifted census vectors (or the correlation window) in a search window of the other image in a parallel and pipelined manner. At the same time as this correlation step, the left-right consistency checks are performed. Thus, optimum disparities and left-right consistency checks of these disparities are calculated concurrently. The output of this parallel and pipelined system is a left-right optimal disparity number, a left-right minimum summed Hamming distance for a window, a right-left optimal disparity number, and a right-left minimum summed Hamming distance for a window for each data stream that has a complete search window.

B. Census Transform Program

Figure 19A:
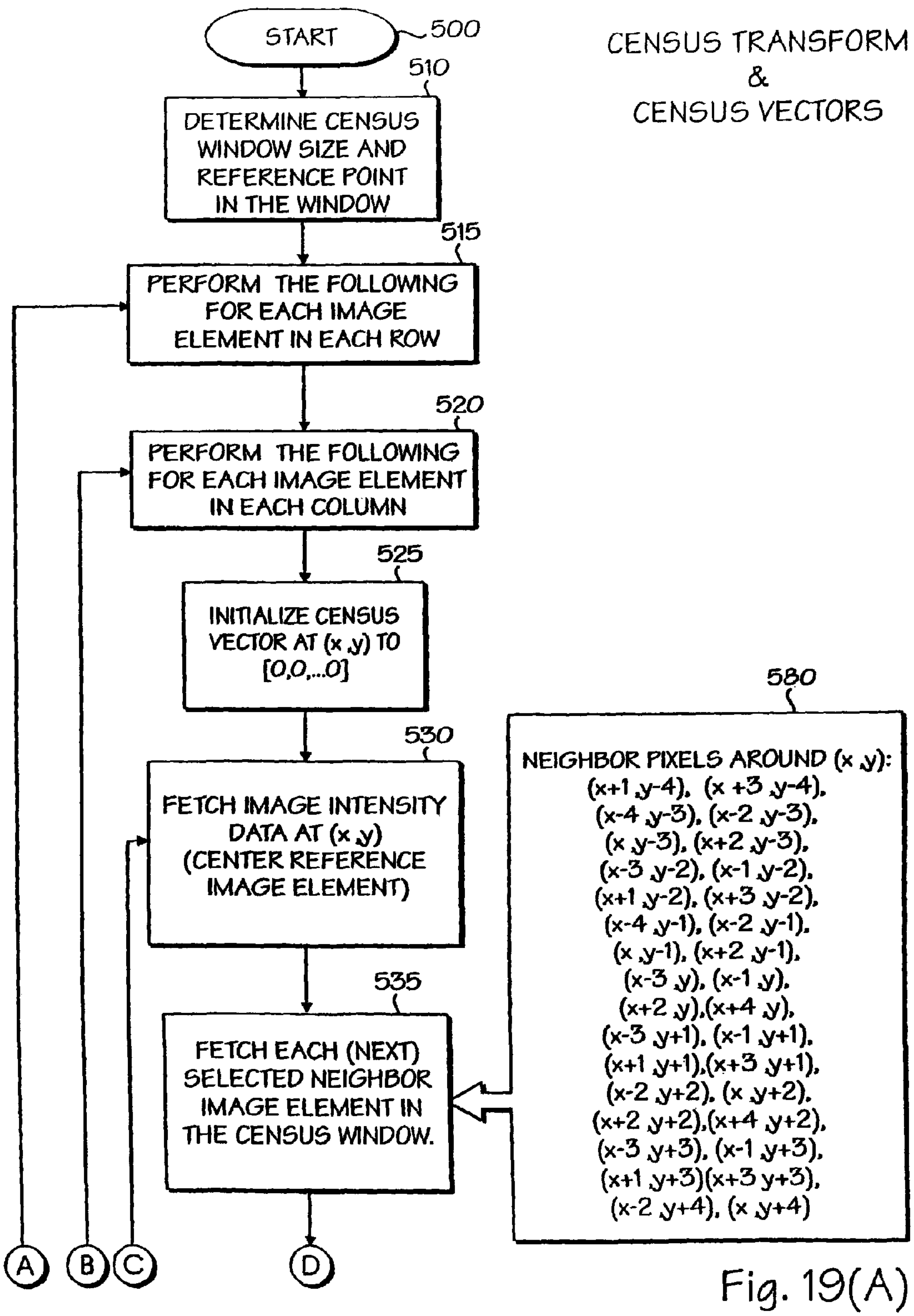
FIGS. 19(A)-(B) show a flow chart of the census transform operation and its generation of the census vectors.
Figure 19B:
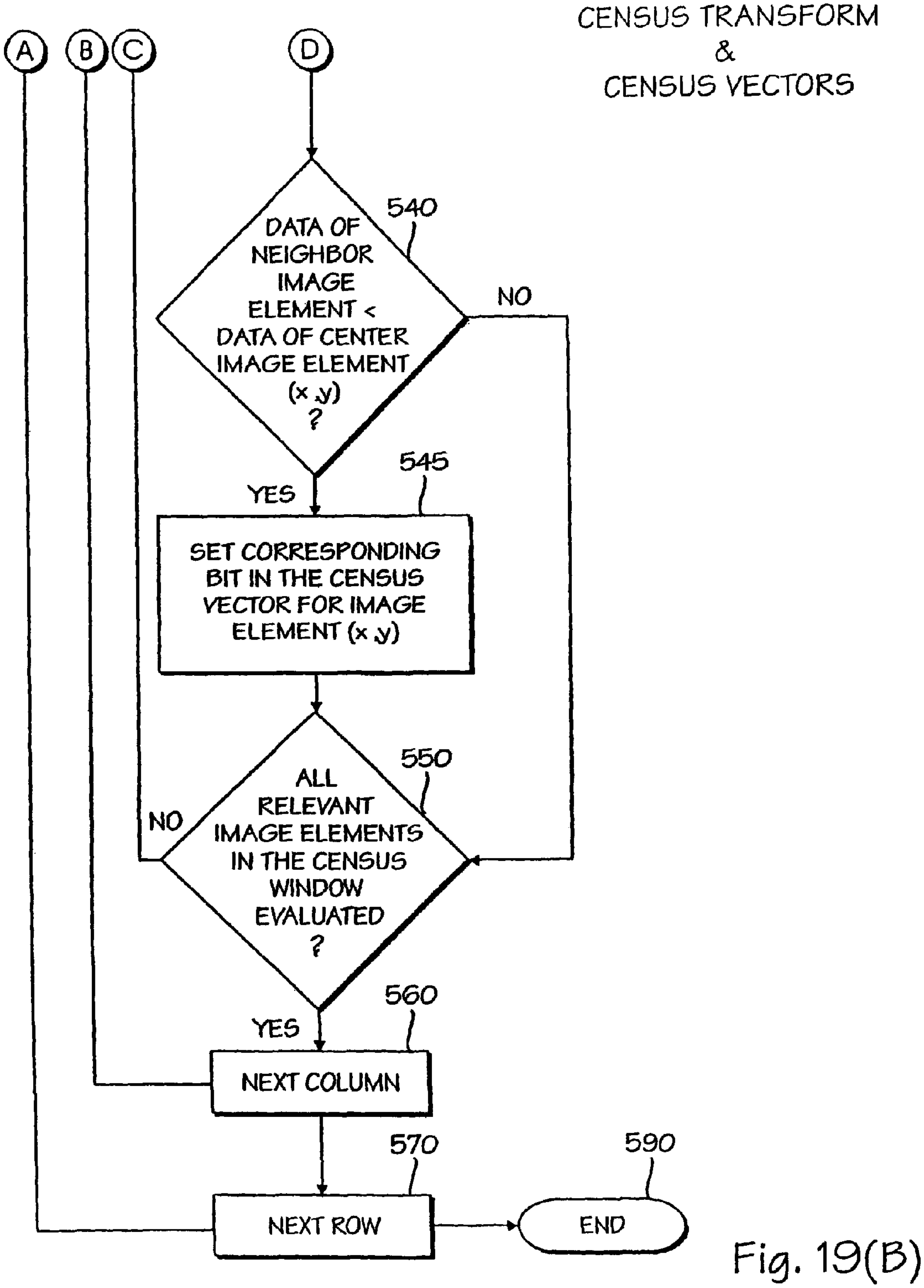

As shown in FIGS. 19(A)-(B), the census operation starts at step 500. Step 510 determines the census window size and the location of the reference point. In one embodiment, the census window is 9.times.9 and the location of the reference point is the center of the census window. The length of each census vector should also be determined. In one embodiment, the census vector is 32 bits long; that is, 32 image elements in the census window in addition to the reference point are used to generate the 32-bit census vector. In other embodiments, different census vector lengths may be used, including 16, 24 and 48. Of course, the selection of the census vector length can be closely linked to the size of the census window. If the census window is larger than 9.times.9, the census vector may be longer than 32 bits. Conversely, if the census window is smaller than 9.times.9, then the length of the census vector may be shorter than 32 bits.

Steps 515 and 520, in conjunction with steps 560 and 565, show the order in which the census transform is applied to the image data. The census window moves through every column within a row from left to right until the end of the row, at which point the census window will immediately move to the beginning of the next row and move through every column within this next row, and will generally continue in this fashion until the census transform for the image data in the last row and last column has been performed. As shown in the flow chart of FIGS. 19(A)-(B), the column loop is the inner loop to the outer row loop; that is, the row changes only after the census transform has been computed for image data in every column of that row.

For a given row and column location (x,y), which is also designated as the reference point for the census window, the census vector is initialized to all zeros as shown in step 525. Step 530 fetches the image intensity value for the center reference point at (x,y). Step 535 fetches the image intensity data for a selected image element in the current census window. The first selected point, in this embodiment, is (x+1,y−4) as shown in box 580. Intensity values for other image elements in this current census window will also be fetched later until all desired image element in the census window has been examined. In one embodiment, these neighbor image data in the census window selected for the census transform computations to generate the 32-bit census vector for the reference image element (x,y) are: (x+1,y−4), (x+3,y−4), (x−4,y−3), (x−2,y−3), (x,y−3), (x+2,y−3), (x−3,y−2), (x−1,y−2), (x+1, y−2), (x+3,y−2), (x−4,y−1), (x−2,y−1), (x,y−1), (x+2,y−1), (x−3,y), (x−1,y), (x+2,y), (x+4,y), (x−3,y+1), (x−1,y+1), (x+1,y+1), (x+3,y+1), (x−2,y+2), (x,y+2), (x+2,y+2), (x+4, y+2), (x−3,y+3), (x−1,y+3), (x+1,y+3), (x+3,y+3), (x−2,y+ 4), and (x,y+4). This pattern is shown in FIG. 7.

In another embodiment, the particular image data used for the 32-bit census vector for the reference image element (x,y) are: (x−1,y−4), (x+1,y−4), (x−2,y−3), (x,y−3), (x+2,y−3), (x−3,y−2), (x−1,y−2), (x+1,y−2), (x+3,y−2), (x−4,y−1), (x−2,y−1), (x,y−1), (x+2,y−1), (x+4,y−1), (x−3,y), (x−1,y), (x+2,y), (x+4,y), (x−3,1), (x−1,1), (x+1,y+1), (x+3,y+1), (x−4,y+2), (x−2,y+2), (x,y+2), (x+2,y+2), (x−3,y+3), (x−1, y+3), (x+1,y+3), (x+3,y+3), (x,y+4), and (x+2,y+4).

Step 540 determines whether the intensity data for the just fetched neighbor image element, (x+1,y−4) in this example, is less than the intensity data of the center reference image element located at (x,y). If so, step 545 sets the corresponding bit position in the census vector as "1." Because this was the first neighbor image element, the corresponding bit position in the census vector is bit0, the least significant bit (LSB). If the decision in step 540 is evaluated as "NO" (intensity value for the neighbor image element is equal to or greater than the intensity value for the reference image element), then the program branches to step 550, and the census vector at the corresponding bit position (bit0) remains "0."

Step 550 decides whether all relevant neighbor image elements in the census window have been evaluated. Step 550 is also the decision branching point after step 545, which set the corresponding bit position in the census vector. If step 550 evaluates to "YES," the program has computed the entire census vector for the reference image element in the census window as currently positioned and is now ready to proceed to the next column as directed by step 560. If step 550 evaluates to "NO," the census vector for the reference image element in the window is not complete yet and the next neighbor image element in the census window is fetched. In this example, the next image element is located at (x+3,y−4). The corresponding bit position in the census vector for this second image element is bit1. The corresponding bit position in the census vector for the next fetched neighbor image element is bit2, and so on. The corresponding bit position in the census vector for the last neighbor image element is bit31, the most significant bit (MSB). This loop 535-540-545-550 will cycle repeatedly until the entire census vector for the reference image element has been generated and if so, the decision at step 550 will evaluate to "YES."

As stated before, step 560 in conjunction with step 520 directs the program to branch to the next column in the same row. If the current column is the last column in the row, step 560 will proceed to step 570 to continue the computations to the next row and the column number will reset so that the image element at the beginning of the row is next data to be processed. As the reference image element moves to the next column in the row (or if in the last column of the row, the first column of the next row), the census window moves with it. The location of this next reference point will also be designated as (x,y) for the sake of FIGS. 19(A)-(B), to facilitate the understanding of the invention. Thus, the neighbor image elements selected around new reference point (x,y) will be as listed in box 580. When the census vectors for all image elements in the desired image processing area have been generated, the program ends at step 590.

C. Correlation Summation and Disparity Optimization Program

One embodiment of the present invention utilizes box filtering array data summation and manipulation as described above. When window summations are desired for a matrix or array of individual data, the following steps can be performed: (1) subtract data from the image element located a window height above in the same column from the location of the current reference point from the current column sum, (2) add the data in the current reference image element to the now modified column sum, (3) subtract the column sum located a window width from the current reference point from the current window sum, and (4) add the modified column sum to the modified window sum to generate the window sum for the current window. Depending on the location of the current window in the particular region, subtractions of column sums or individual data elements may not be necessary for some regions. This scheme by itself is advantageous in increasing the effective processing throughput given a particular processing speed. In addition to the array of window sums, this caching operation requires a single line column sum buffer with a width equal to the width of the desired image processing area. One embodiment of the correlation summation program uses these concepts.

In another embodiment of the software/algorithm aspect of the present invention, the census and correlation steps are performed in parallel and pipelined fashion. Thus, the census vectors (or the correlation window) in one image are correlated with each of their respective disparity-shifted census vectors (or the correlation window) in its search window of the other image in a parallel and pipelined manner. At the same time as this correlation step, the left-right consistency checks are also performed.

Figure 20A:
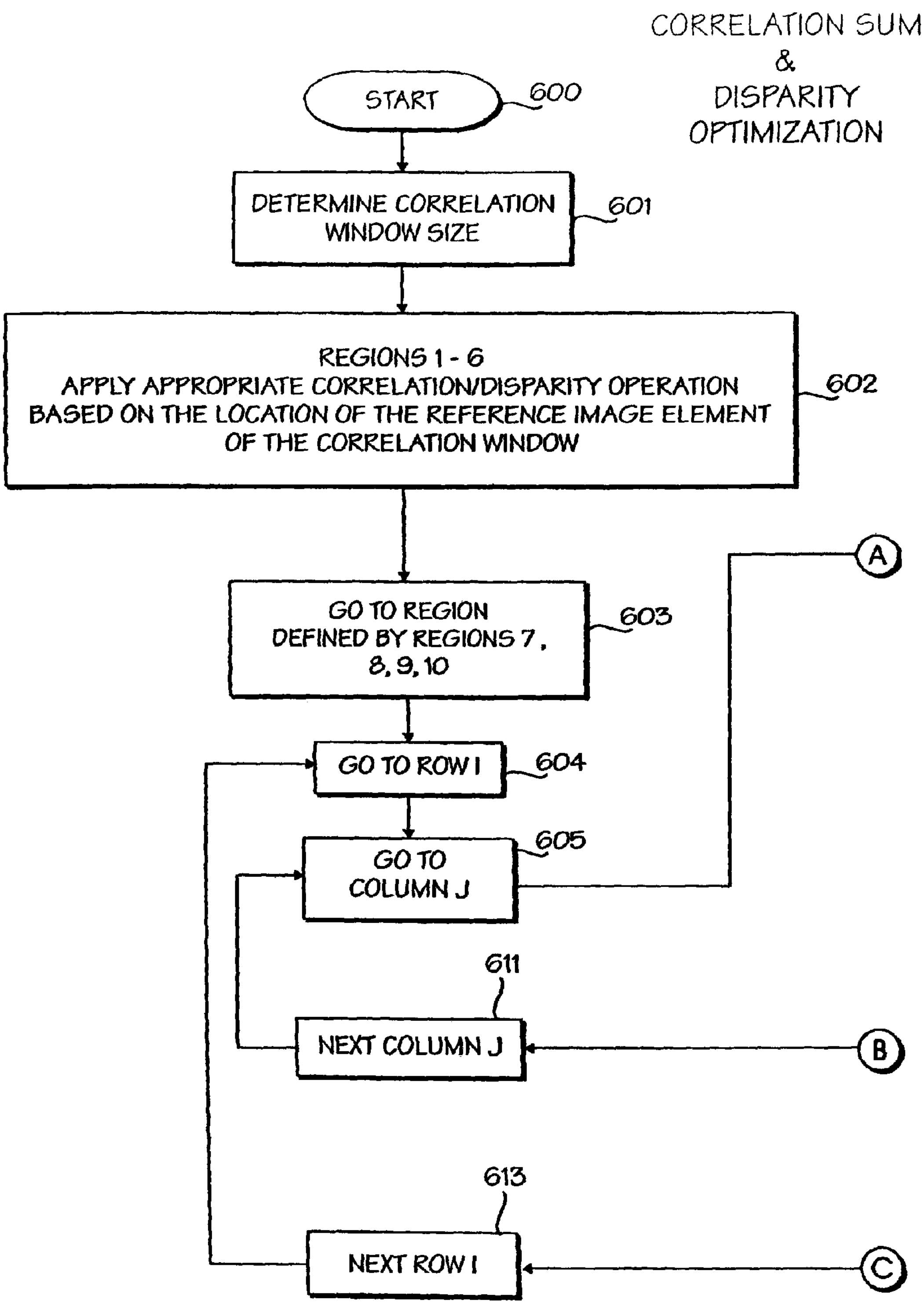
FIGS. 20(A)-(B) show a high level flow chart of one embodiment of the correlation sum and disparity optimization functionality for all regions 1-10.
Figure 20B:
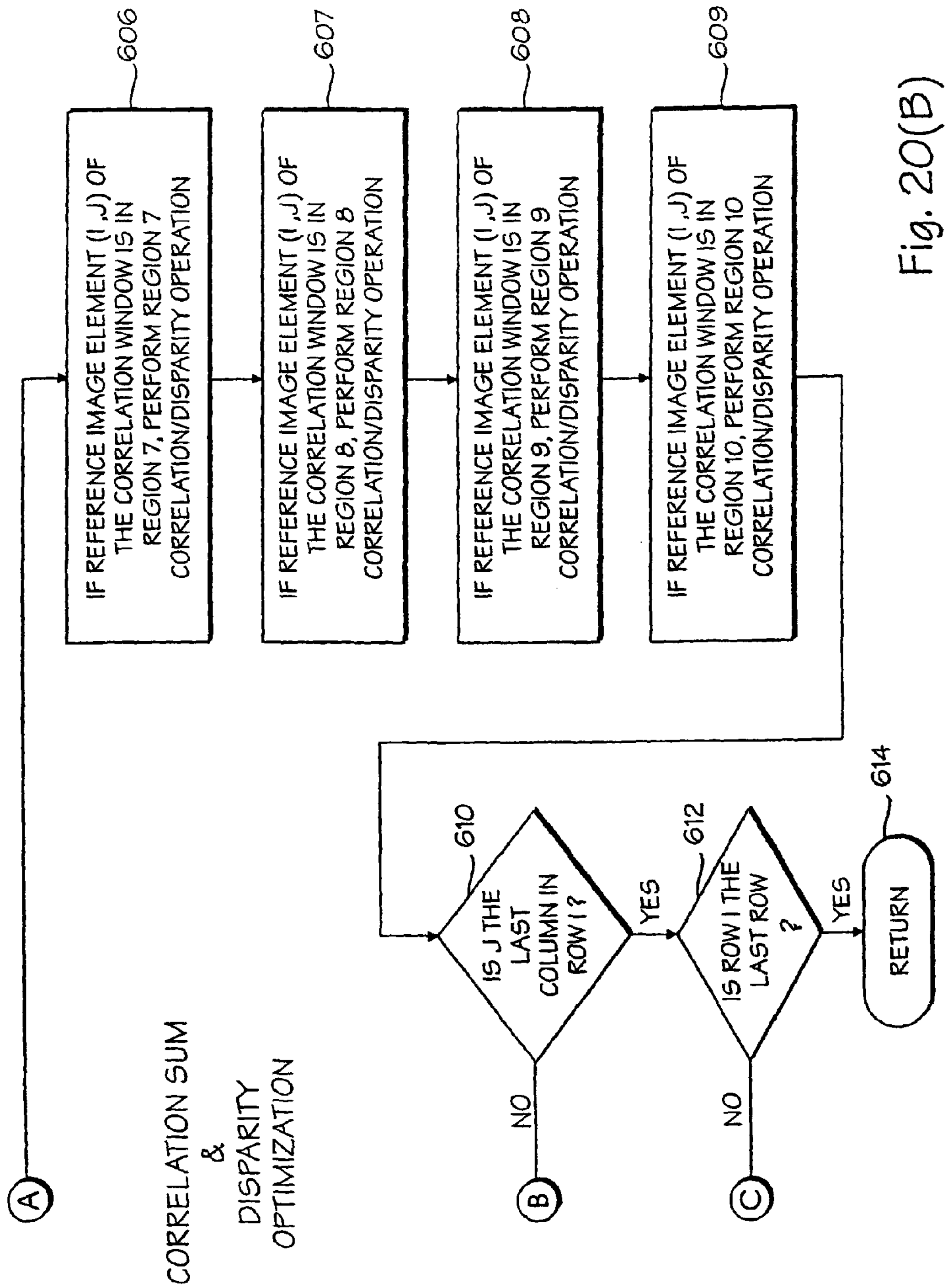

The correlation operation and optimal disparity determination scheme of one embodiment of the present invention will now be discussed. FIG. 20 shows a high level flow chart of one embodiment of the correlation sum and disparity optimization functionality for all regions 1-10. At this point in the program, the census vectors have been generated for the left and right images. Based on these census vectors, the image processing system will attempt to determine which image element in the left image corresponds with a given image element in the right image.

As shown in FIG. 20, the program starts at step 600. Step 601 determines the correlation window size and the location of the reference point in the window. In one embodiment, the correlation window is 7×7 and the reference point is located at the lower rightmost corner of the window.

Because of the existence of the nine (9) edge conditions and one general case, the computations execute differently. Regions 1-9 represent edge conditions while region 10 represents the general case. As discussed above for FIGS. 11(A)-11(J), correlation or window sums for the entire window are calculated for those regions where a complete window can fit in the desired image processing area; that is, image data is found in every portion of the window. Thus, entire window correlation sums are calculated for regions 5, 6, 9, and 10. The bulk of the processing will be take place in region 10. The location of the reference image element of the window with respect to the ten regions dictates how and what computations are accomplished. Step 602 applies to regions 1-6 where the correlation operation is executed. These regions set up the column sum buffer, intermediate correlation sums, and correlation window sums. When the correlation computations are completed, step 603 requires the program to proceed to regions 7-10.

The computations are performed for each transform vector in the reference right image column by column within a row, and at the end of the row, the program proceeds to the first column in the next row in the desired image processing area. This is reflected by steps 604, 605, 610, 612, 611, and 613. The less frequently occurring row loop defined by steps 604, 612, and 613 is the outer loop, whereas the more frequently occurring column loop defined by steps 605, 610, and 611 is the inner loop. As the program proceeds column by column within a row, the window passes through regions 7, 8, 9, and 10, in that order. When the program reaches the next row and proceeds to the end of the row, regions 7, 8, 9, and 10 are traversed by the window again as shown by FIGS. 11(G)-11(J).

Initially, the program proceeds to region 7 at row I and column J as shown by steps 604 and 605. If the window is in region 7, as it should be at the beginning of the row, the region 7 correlation operation is performed as required by step 606. If the window is in region 8, the region 8 correlation operation is performed as required by step 607. If the window is in region 9, the region 9 correlation operation is performed as required by step 608. If the window is in region 10, the region 10 correlation operation is performed as required by step 609.

Before proceeding, step 610 determines if the current reference image element at row I and column J is at the last column of row I. If this decision evaluates to "NO," the program proceeds to the next column J (steps 611 and 605) and performs one of the steps 606, 607, 608, or 609 depending on the location of the window. If the decision for step 610 evaluates to "YES," step 612 determines if this row is the last row in the desired image processing area. If not, steps 613 and 604 require the window to proceed to the next row I and the first column J in that row (the column and row numbers are reset after reaching the last column and row, respectively). If the decision in step 612 evaluates to "YES," the correlation program ends at step 614.

1. Regions 1 and 2

Figure 21:
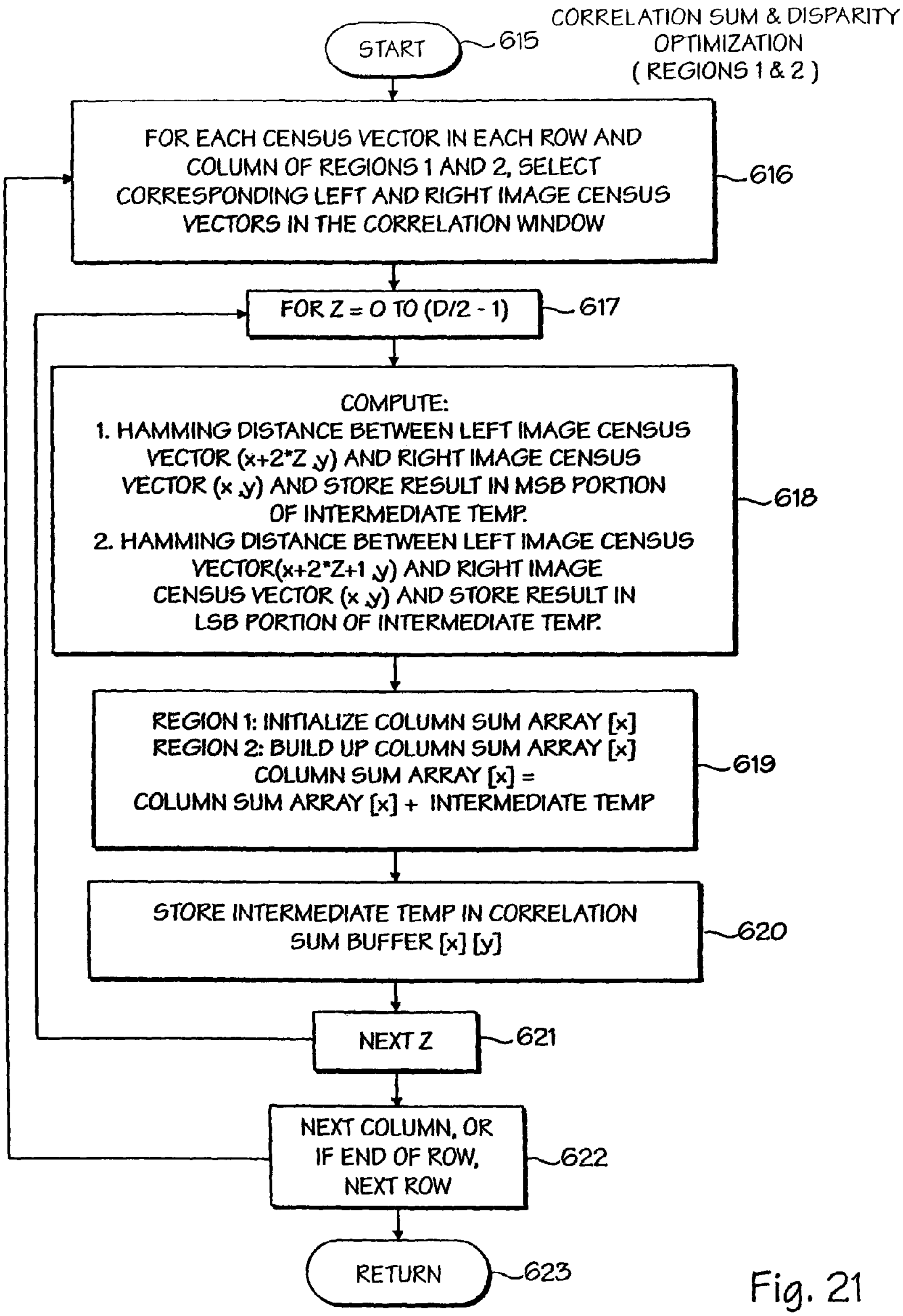
FIG. 21 shows a flow chart of one embodiment of the correlation sum and disparity optimization functionality for regions 1 and 2.

FIG. 21 shows a flow chart of one embodiment of the correlation sum and disparity optimization operation for regions 1 and 2. The program starts at step 615.

If the correlation window, and more specifically, the reference image element in the correlation window, is located in region 1 or 2, steps 616 and 622 require the following correlation sum to be executed for each row and column by proceeding column by column in the row. If the reference point of the correlation window has reached the end of the row, the reference point moves to the beginning of the next row.

Step 616 requires that a census vector in the right image within its correlation window and a corresponding census vector in the left image in its correlation window be selected. These left and right census vectors are located in the same row and column; that is, these windows are unshifted with respect to each other at disparity 0.

Steps 617 and 621 are the start and end, respectively, of a loop that allows the correlation sums to be computed for each of the disparities for each window in the reference right image. Here, z runs from 0 to D/2−1 so that for 16 disparities, D=16 and z runs from 0 to 7. A secondary reason why the z loop is used is for data packing purposes.

A variable called intermediate temp, which is 32 bits long in one embodiment, holds correlation sum values for two different disparities—16 bits in the MSB portion of the variable holds correlation sum values for disparity d1 and 16 bits in the LSB portion of the variable holds correlation sum values for disparity d2. Thus, for 16 disparities, 8 intermediate temp values will be used. Because a single intermediate temp variable is used in one embodiment of the present invention, each pair of disparity-based correlation sums will be computed substantially concurrently in one z loop. So, the correlation sums for disparity 0 and disparity 1 will be processed together, the correlation sums for disparity 2 and disparity 3 will be processed together, the correlation sums for disparity 4 and disparity 5 will be processed together, and so on until the correlation sums for disparity 14 and disparity 15 are processed, for a system implementing 16 disparities. A correlation sum associated with an even numbered disparity value is stored in the MSB half (16 bits) of the intermediate temp variable, whereas a correlation sum associated with an odd numbered disparity value is stored in the LSB half (16 bits) of the intermediate temp variable. Because the length of each half of the intermediate temp variable is 16 bits, it is more than sufficient to hold the largest correlation sum value for a given disparity. For example, the largest possible Hamming distance value between any two 32-bit census vectors is 32 (census vector x on the left is all 0s and census vector x' on the right is all 1s so that the Hamming distance between 1 and 1' is 32). Sixteen bits is more than long enough to accommodate this Hamming distance value of 32. Thus, the data packing scheme for intermediate temp has been designed so that the risk of a carry bit (or bit 17) from the LSB half moving into the MSB half or the MSB half moving outside of the bounds of the intermediate temp variable is nonexistent. This data packing concept for intermediate temp will be explained in more detail below with respect to FIG. 36.

The length of the intermediate temp variable can be made smaller (or larger) but ultimately, the design should accommodate the size of the column sum array, since intermediate temp is added to the column sum array which is 32 bits long per data. The respective data lengths of intermediate temp and the column sum buffer should accommodate their addition so that the addition result truly reflects the addition operation. To simplify, intermediate temp and column sum are both 32 bits.

The data packed intermediate temp is incorporated in some embodiments of the present invention. Other embodiments may not use the data packing concept and may, instead, use a single variable that holds the intermediate values, such as individual Hamming distance calculations between two image census vectors, to be subsequently stored in the correlation sum buffer and added to the column sum value. The correlation calculation may not be performed two disparities at a time; rather, the correlation sum may be determined for one disparity at a time until such sums for all D disparities have been calculated.

Step 618 uses a data packing concept of storing individual Hamming distances between corresponding pairs of census vectors. For 16 disparities, z loops from 0 to 7. For a given z value in the z loop, one embodiment of the present invention processes a pair of the correlation sums associated with distinct disparities together (disparity 2*z and disparity 2*z+1). For z=0, the Hamming distance is calculated between the census vector in the unshifted (d=0) correlation window located at (x,y) in the left image and the reference census vector in the reference correlation window located at (x,y) in the reference right image. The resulting Hamming distance for this disparity 0 case between these two census vectors is stored in the MSB half of the intermediate temp variable.

Similarly, the Hamming distance is calculated between the census vector in the one column-shifted (d=1) correlation window located at (x+1,y) in the left image and the reference census vector in the reference correlation window located at (x,y) in the reference right image. Note that the correlation window in the reference right image is not shifted because the right image is designated as the reference and the correlation value is determined for the various disparities or shifts of the left correlation window from the reference right correlation window. The resulting Hamming distance for this disparity 1 case is stored in the LSB half of the intermediate temp variable. At this point, the intermediate temp variable holds correlation results for a reference point in the right image correlation window at (x,y) for disparities 0 and 1 only. In subsequent computations, the intermediate temp variable will hold correlation results for other disparities: for z=1, correlation result for disparities 2 and 3 will be in intermediate temp; for z=2, correlation result for disparities 4 and 5 will be in intermediate temp; for z=3, correlation result for disparities 6 and 7 will be in intermediate temp; for z=4, correlation result for disparities 8 and 9 will be in intermediate temp; for z=5, correlation result for disparities 10 and 11 will be in intermediate temp; for z=6, correlation result for disparities 12 and 13 will be in intermediate temp; and for z=7, correlation result for disparities 14 and 15 will be in intermediate temp.

Step 619 initializes the column sum buffer [x] with the contents of intermediate temp if the reference correlation window in the reference right image is located in region 1. The column sum buffer [x] now holds correlation results for the reference right image point for disparities 0 and 1. Step 619 updates the column sum buffer [x] with the contents of the previous column sum buffer plus the intermediate temp if the reference correlation window in the reference right image is located in region 2. The column sum buffer [x] now holds column sum results for the reference right image points for disparities 0 and 1.

Step 620 requires storage of these individual Hamming distance results for these pairs of census vectors for the reference right correlation window at the reference point (x,y) in the correlation sum buffer [x][y]. The correlation sum buffer [x][y] will ultimately hold the correlation results associated with each image element in the desired image processing area of the reference right image. For region 1, the column sum is essentially the individual correlation result for the moment.

Step 621 requires the program to proceed to the next z, which is a different pair of disparities for the same reference point of the same correlation window. Upon calculating all correlation results for the D disparities, the program proceeds to step 622 which directs the system to select the next reference point in the next column of the same row or the beginning of the next row if the current reference point is located at the last column of the row. Then the same correlation calculations for the new reference point are performed for each disparity. Ultimately, the column sum array [x] is being built for each disparity, although a complete column sum (height of the correlation window) is not yet available, and the individual correlation result for each reference image element is also stored in correlation sum buffer[x][y]. This portion of the correlation sum and disparity optimization computation ends at step 623.

In other embodiments, the data packing concept and the intermediate temp variable are not used. Instead of handling pairs of Hamming distances together in the z loop from 0 to (D/2−1), a single Hamming distance between two points can be calculated and stored in correlation sum buffer[x][y] in a z loop that runs from 0 to D−1.

2. Regions 3 and 4

Figure 22A:
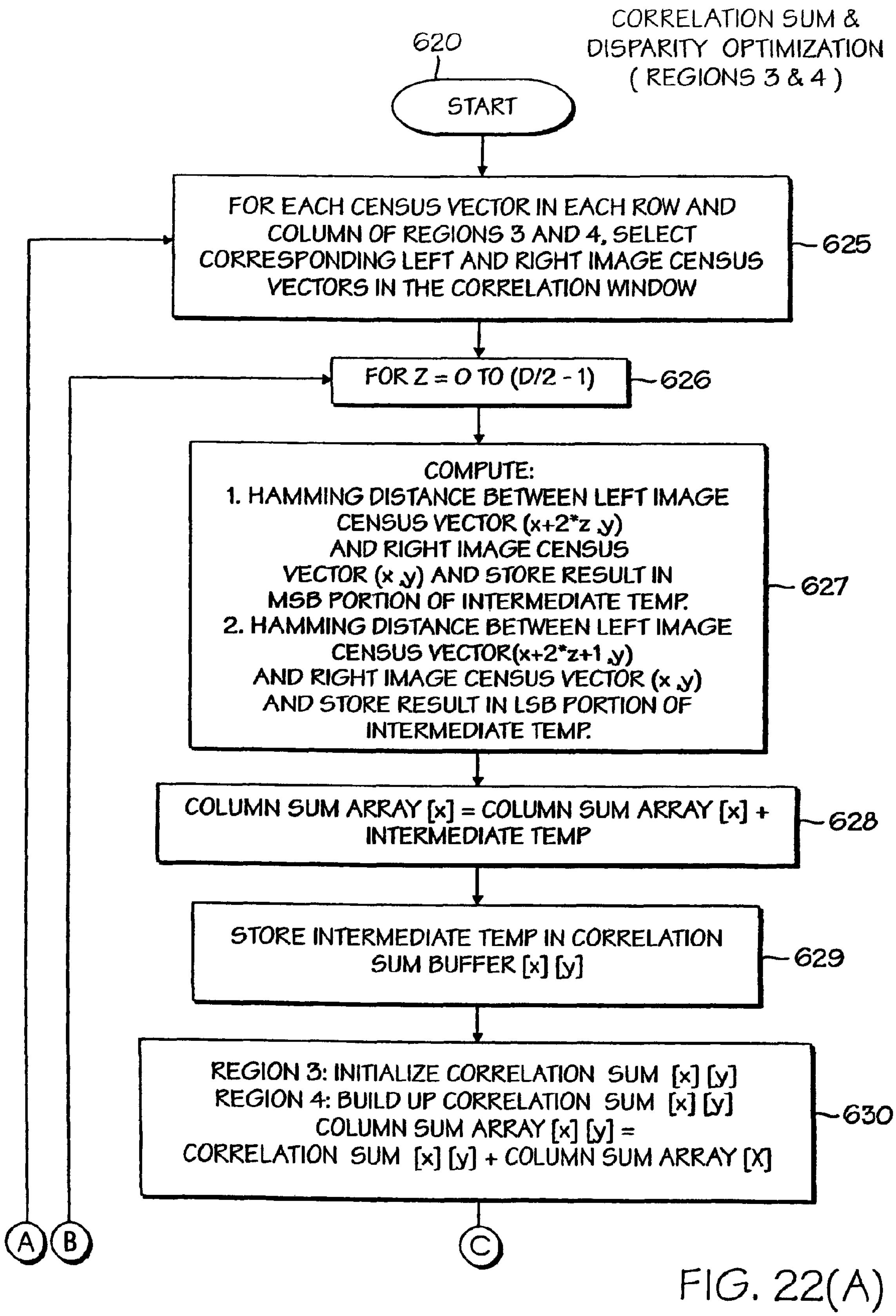
FIGS. 22(A)-(B) show a flow chart of one embodiment of the correlation sum and disparity optimization functionality for regions 3 and 4.
Figure 22B:
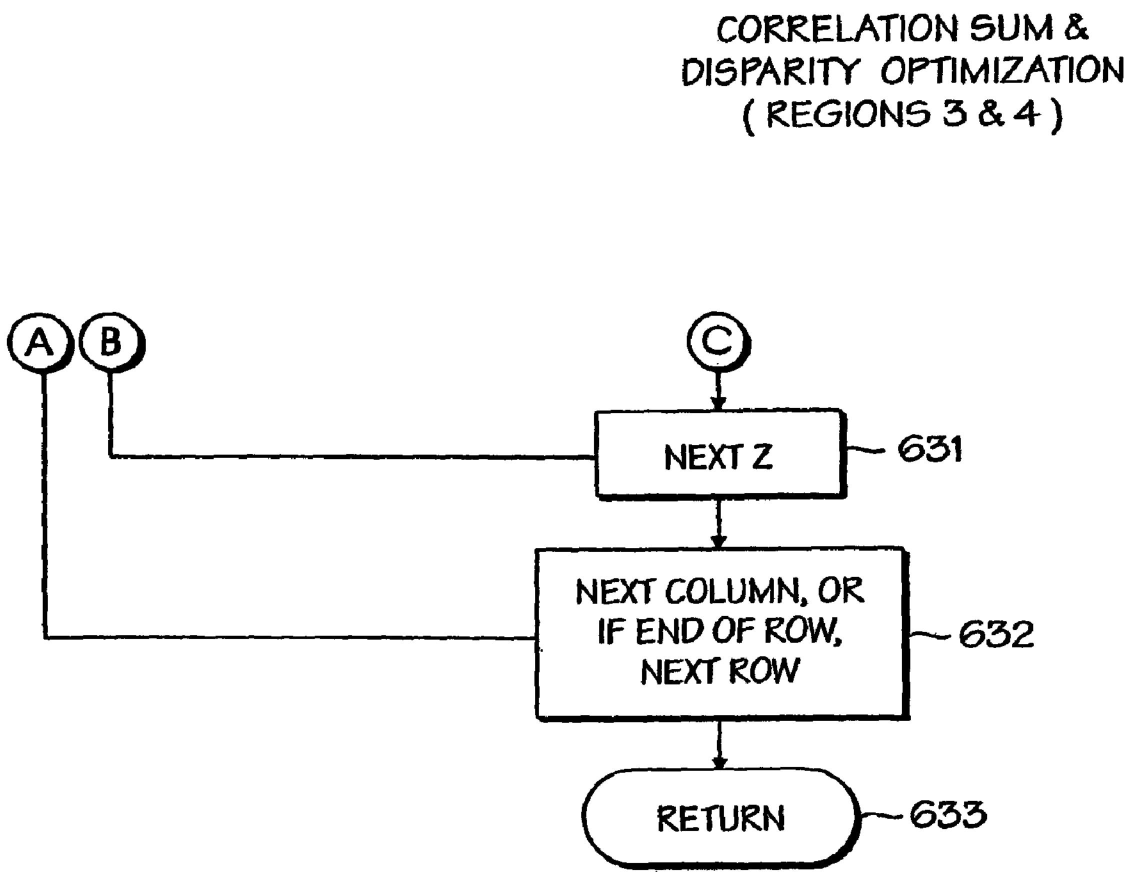

FIGS. 22(A)-(B) show a flow chart of one embodiment of the correlation sum and disparity optimization operation for regions 3 and 4. The program proceeds in basically the same way as for regions 1 and 2 with slight variations. Here, a full column is available so that correlation sums for an entire correlation window can be initialized and updated. The program starts at step 624.

If the correlation window, and more specifically, the reference image element in the correlation window, is located in regions 3 or 4, steps 625 and 632 require the following correlation sum to be executed for each row and column by proceeding column by column in the row and, if the reference point of the correlation window has reached the end of the row, the reference point moves to the beginning of the next row. Region 3 is a single image element location so that the next column will be region 4. Step 625 requires that a census vector in the right image within its correlation window and a corresponding census vector in the left image in its correlation window be selected. These left and right census vectors are located in the same row and column; that is, these windows are unshifted with respect to each other at disparity 0.

Steps 626 and 631 are the start and end, respectively, of a loop that allows the correlation sums to be computed for each of the disparities for each window in the reference right image. Here, z runs from 0 to D/2−1 so that for 16 disparities, D=16 and z runs from 0 to 7. A secondary reason why the z loop is used is for data packing purposes. A variable called intermediate temp, as explained above, may be used for data packing purposes.

Step 627 uses a data packing concept of storing individual Hamming distances between corresponding pairs of census vectors. For 16 disparities, z loops from 0 to 7. For a given z value in the z loop, one embodiment of the present invention processes a pair of the correlation sums associated with distinct disparities together (disparity 2*z and disparity 2*z+1). For z=0, the Hamming distance is calculated between the census vector in the unshifted (d=0) correlation window located at (x,y) in the left image and the reference census vector in the reference correlation window located at (x,y) in the reference right image. The resulting Hamming distance for this disparity 0 case between these two census vectors is stored in the MSB half of the intermediate temp variable. Similarly, the Hamming distance is calculated between the census vector in the one column-shifted (d=1) correlation window located at (x+1,y) in the left image and the reference census vector in the reference correlation window located at (x,y) in the reference right image. The resulting Hamming distance for this disparity 1 case is stored in the LSB half of the intermediate temp variable. At this point, the intermediate temp variable holds correlation results for a reference point in the right image correlation window at (x,y) for disparities 0 and 1 only. In subsequent computations, the intermediate temp variable will hold correlation results for other disparities.

Step 628 continues to update the column sum buffer [x] with the contents of the previous column sum buffer plus the intermediate temp. The column sum buffer [x] now holds column sum results for the reference right image points for disparities 0 and 1.

Step 629 requires storage of these individual Hamming distance results for these pairs of census vectors for the reference right reference point at the location (x,y) in the correlation sum buffer [x][y]. For regions 3 and 4, entire column sums are now available, but the correlation sums for an entire correlation window are not available.

Step 630 initializes the correlation sum [x][y] if the reference point is in region 3 by adding the column sum. If the reference point is in region 4, the correlation sum is built up by adding the current correlation sum to the column sum value.

Step 631 requires the program to proceed to the next z, which is a different pair of disparities for the same reference point of the same correlation window. Upon calculating all correlation results for the D disparities, the program proceeds to step 632 which directs the system to select the next reference point in the next column of the same row or the beginning of the next row if the current reference point is located at the last column of the row. Then the same correlation calculations for the new reference point are performed for each disparity. Ultimately, the correlation sum for the entire correlation window will be calculated in regions 5, 6, 9, and 10. Regions 3 and 4 builds up the appropriate column sums and correlation sums as a prelude the window calculation. This portion of the correlation sum and disparity optimization computation ends at step 633.

3. Region 5

Figure 23A:
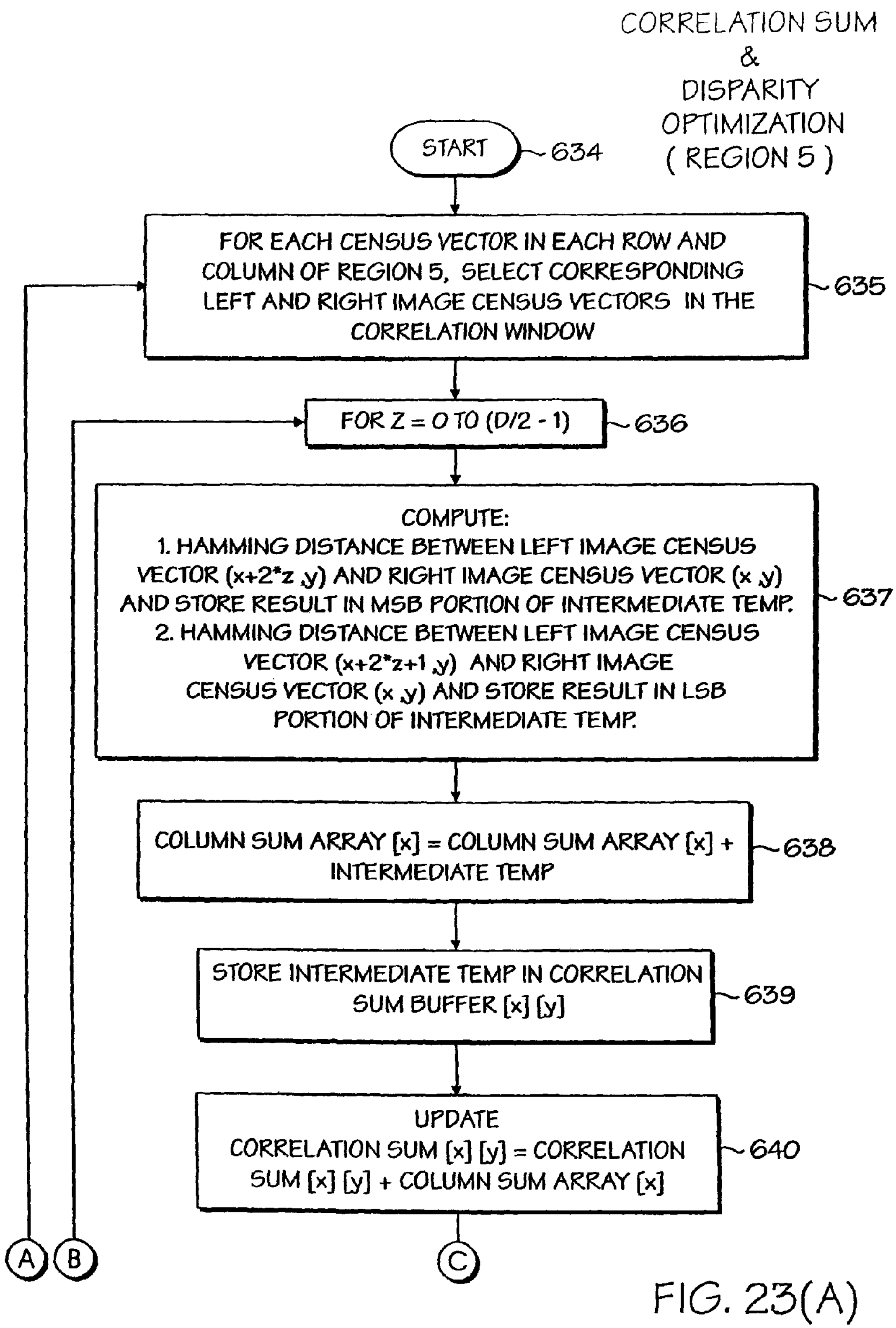
FIGS. 23(A)-(B) show a flow chart of one embodiment of the correlation sum and disparity optimization functionality for region 5.
Figure 23B:
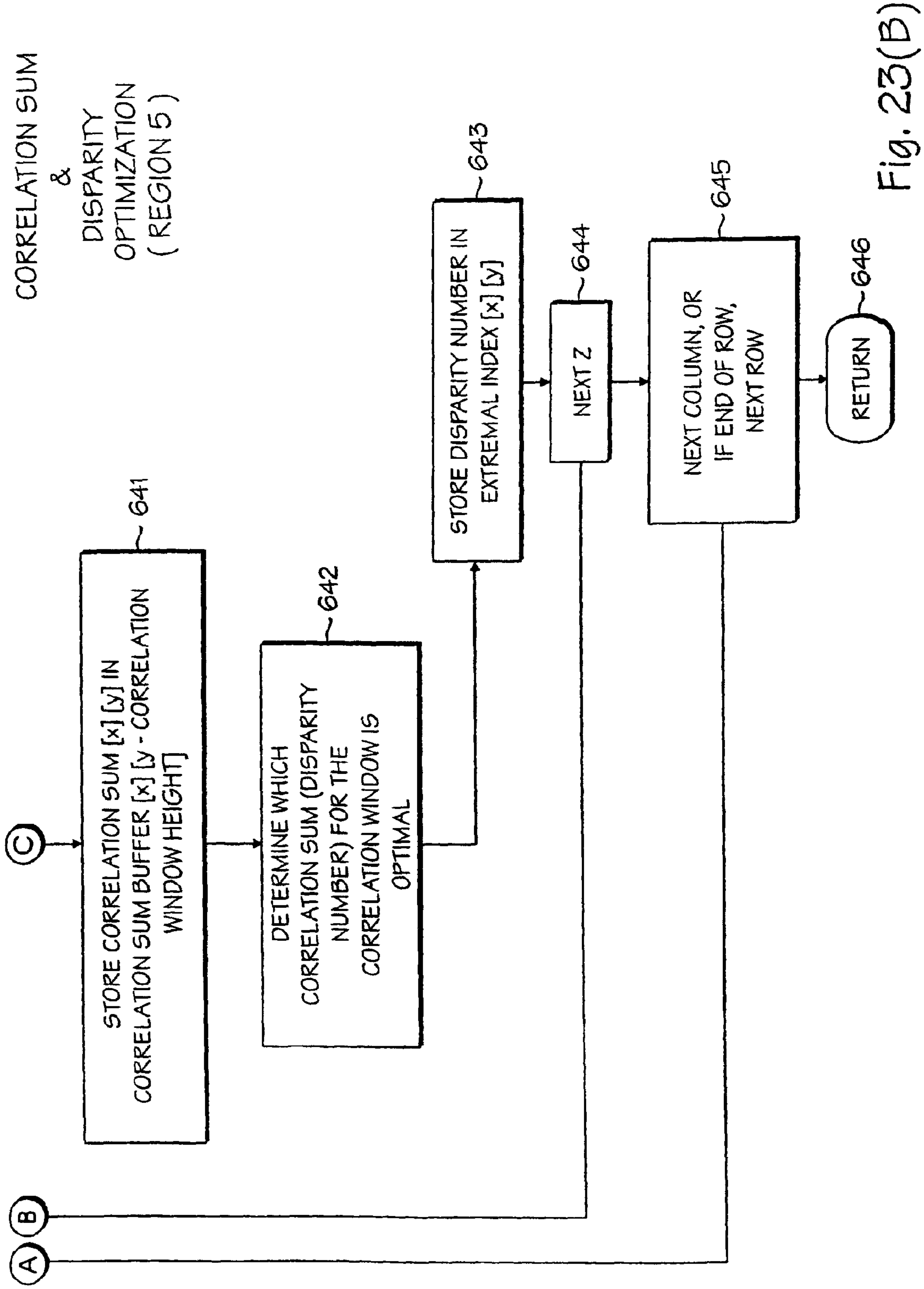

FIGS. 23 (A)-(B) show a flow chart of one embodiment of the correlation sum and disparity optimization operation for region 5. The program proceeds in basically the same way as for regions 1-4 with slight variations. Here, a correlation sum for a full correlation window can be computed and hence, the optimal disparity for the reference point can be determined. The program starts at step 634.

If the correlation window, and more specifically, the reference image element in the correlation window, is located in region 5, steps 635 and 645 require the following correlation sum to be executed for each row and column by proceeding column by column in the row and if the reference point of the correlation window has reached the end of the row, the reference point moves to the beginning of the next row. Region 5 is a single image element location so that the next column will be region 6. Step 635 requires that a census vector in the right image within its correlation window and a corresponding census vector in the left image in its correlation window be selected. These left and right census vectors are located in the same row and column; that is, these windows are unshifted with respect to each other at disparity 0.

Steps 636 and 644 are the start and end, respectively, of a loop that allows the correlation sums to be computed for each of the disparities for each window in the reference right image. Here, z runs from 0 to D/2−1 so that for 16 disparities, D=16 and z runs from 0 to 7. A secondary reason why the z loop is used is for data packing purposes. A variable called intermediate temp, as explained above, is used for data packing purposes.

Step 637 uses a data packing concept of storing individual Hamming distances between corresponding pairs of census vectors. For 16 disparities, z loops from 0 to 7. For a given z value in the z loop, one embodiment of the present invention processes a pair of the correlation sums associated with distinct disparities (disparity 2*z and disparity 2*z+1) together as discussed above with respect to regions 1-4.

Step 638 continues to update the column sum buffer [x] with the contents of the previous column sum buffer plus the intermediate temp. The column sum buffer [x] now holds column sum results for the reference right image point for each disparity.

Step 639 requires storage of these individual Hamming distance results for these pairs of census vectors for the reference right reference point at the location (x,y) in the correlation sum buffer [x][y]. For region 5, entire column sums and entire window correlation sums are now available.

Step 640 updates the correlation window sum [x][y] by adding the column sum value to the current correlation sum. Step 641 stores the correlation sum result, which is the sum of all individual Hamming distances in the correlation window, in the correlation sum buffer at a location which is a correlation window height rows above in the same column. Thus, the correlation sum is stored in correlation sum buffer[x][y-correlation window height]. In one embodiment, this is the top row of the correlation sum buffer.

Step 642 determines which of the current correlation sum data in the correlation sum buffer is smallest. Initially, the correlation sum is calculated for disparities 0 and 1, for z=0. Step 642 determines the smaller of the two correlation sum data and stores this disparity number (either 0 or 1, at this point) in the extremal index array. For the next iteration at z=1, the correlation sums are calculated for disparities 2 and 3. If either of the correlation sums for these two disparities is smaller than the correlation sum associated with the current low disparity number stored in the extremal index, then the disparity number for the smaller correlation sum data is stored in the extremal index array, as shown in step 643. This process of comparing the lowest correlation sum and storing the associated disparity number in the extremal index array continues until all z values have been evaluated. This embodiment incorporates the optimum disparity selection in the z loop such that the optimum disparity determination is made substantially concurrently with the correlation sum calculation for a pair of disparities. Alternatively, an intermediate array could hold the disparity value and its associated correlation sum until a final comparison yields the optimum disparity value with the lowest correlation sum. In another embodiment, the optimum disparity determination need not be made within the disparity-based z loop. Rather, the disparity determination may be made outside the loop so that the optimum disparity is selected only after a complete set of correlation sums for each of the disparities has been calculated. Intermediate disparity arrays may be utilized to hold temporary results. These variations apply to all other applicable regions (e.g., regions 6, 9, and 10).

Step 644 requires the program to proceed to the next z, which is a different pair of disparities for the same reference point of the same correlation window. Upon calculating all correlation results for the D disparities, the program proceeds to step 645 which directs the system to select the next reference point in the next column of the same row or the beginning of the next row if the current reference point is located at the last column of the row. Then the same correlation calculations for the new reference point are performed for each disparity. Ultimately, the correlation sum for the entire correlation window will be calculated in regions 5, 6, 9, and 10. This portion of the correlation sum and disparity optimization computation ends at step 646.

4. Region 6

Figure 24A:
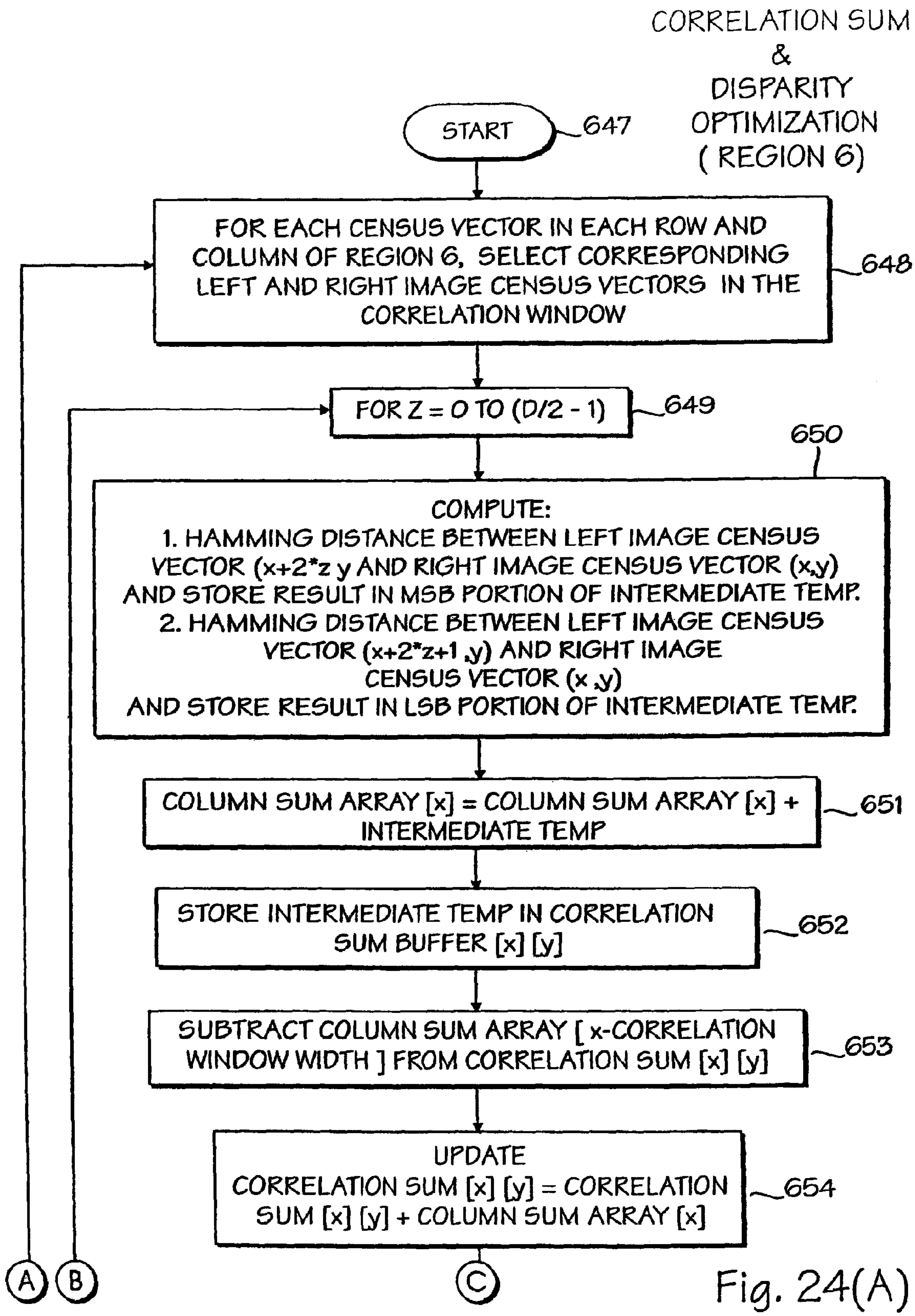
FIGS. 24(A)-(B) show a flow chart of one embodiment of the correlation sum and disparity optimization functionality for region 6.
Figure 24B:
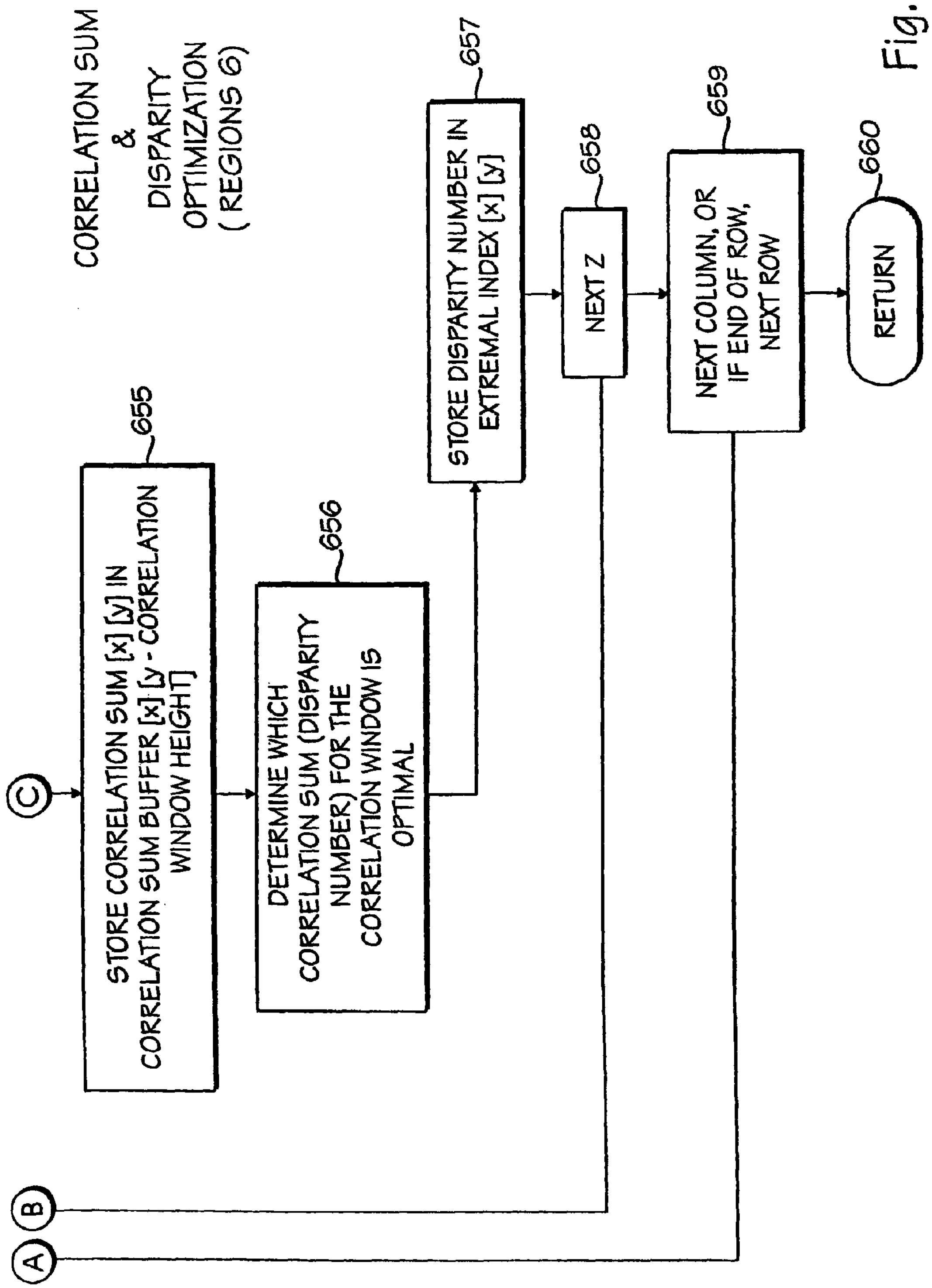

FIGS. 24(A)-(B) show a flow chart of one embodiment of the correlation sum and disparity optimization operation for region 6. Computations for region 6 are similar to that of region 5 except that column sums located to correlation window width columns to the left are subtracted from the current correlation sum. The program starts at step 647.

If the correlation window, and more specifically, the reference image element in the correlation window, is located in region 6, steps 648 and 659 require the following correlation sum to be executed for each row and column by proceeding column by column in the row and if the reference point of the correlation window has reached the end of the row, the reference point moves to the beginning of the next row. Step 648 requires that a census vector in the right image within its correlation window and a corresponding census vector in the left image in its correlation window be selected. These left and right census vectors are located in the same row and column; that is, these windows are unshifted with respect to each other at disparity 0.

Steps 649 and 658 are the start and end, respectively, of a loop that allows the correlation sums to be computed for each of the disparities for each window in the reference right image. Here, z runs from 0 to D/2−1 so that for 16 disparities, D=16 and z runs from 0 to 7. A secondary reason why the z loop is used is for data packing purposes. A variable called intermediate temp, as explained above, is used for data packing purposes.

Step 650 uses a data packing concept of storing individual Hamming distances between corresponding pairs of census vectors. For 16 disparities, z loops from 0 to 7. For a given z value in the z loop, one embodiment of the present invention processes a pair of the correlation sums associated with distinct disparities (disparity 2*z and disparity 2*z+1) together as discussed above with respect to regions 1-4.

Step 651 continues to update the column sum buffer [x] with the contents of the previous column sum buffer plus the intermediate temp, which holds the current Hamming distance calculations for the reference image point for the two disparities applicable in this z loop. The column sum buffer [x] now holds column sum results for the reference right image point for each disparity.

Step 652 requires storage of these individual Hamming distance results for these pairs of census vectors for the reference right reference point at the location (x,y) in the correlation sum buffer [x][y]. For region 6, entire column sums and entire window correlation sums are now available.

Step 653 subtracts the column sum value located a correlation window width columns to the left from the current correlation sum value. The only value needed now to make the window sum complete is the current column sum.

Step 654 updates the correlation window sum [x][y] by adding the column sum value to the current correlation sum. This result will be useful in later computations. Step 655 stores the correlation sum result, which is the sum of all individual Hamming distances in the correlation window obtained in a manner described with respect to FIG. 12, in the correlation sum buffer at a location which is a correlation window height rows above in the same column. Thus, the correlation sum is stored in the correlation sum buffer[x][y-correlation window height].

Step 656 determines which of the current correlation sum data in the correlation sum buffer is smallest and this optimal disparity result is stored in the extremal index. The process is similar to that of region 5.

Step 658 requires the program to proceed to the next z, which is a different pair of disparities for the same reference point of the same correlation window. Upon calculating all correlation results for the D disparities, the program proceeds to step 659 which directs the system to select the next reference point in the next column of the same row or the beginning of the next row if the current reference point is located at the last column of the row. Then the same correlation calculations for the new reference point are performed for each disparity. Ultimately, the correlation sum for the entire correlation window will be calculated in regions 5, 6, 9, and 10. This portion of the correlation sum and disparity optimization computation ends at step 660.

5. Regions 7 and 8

Figure 25A:
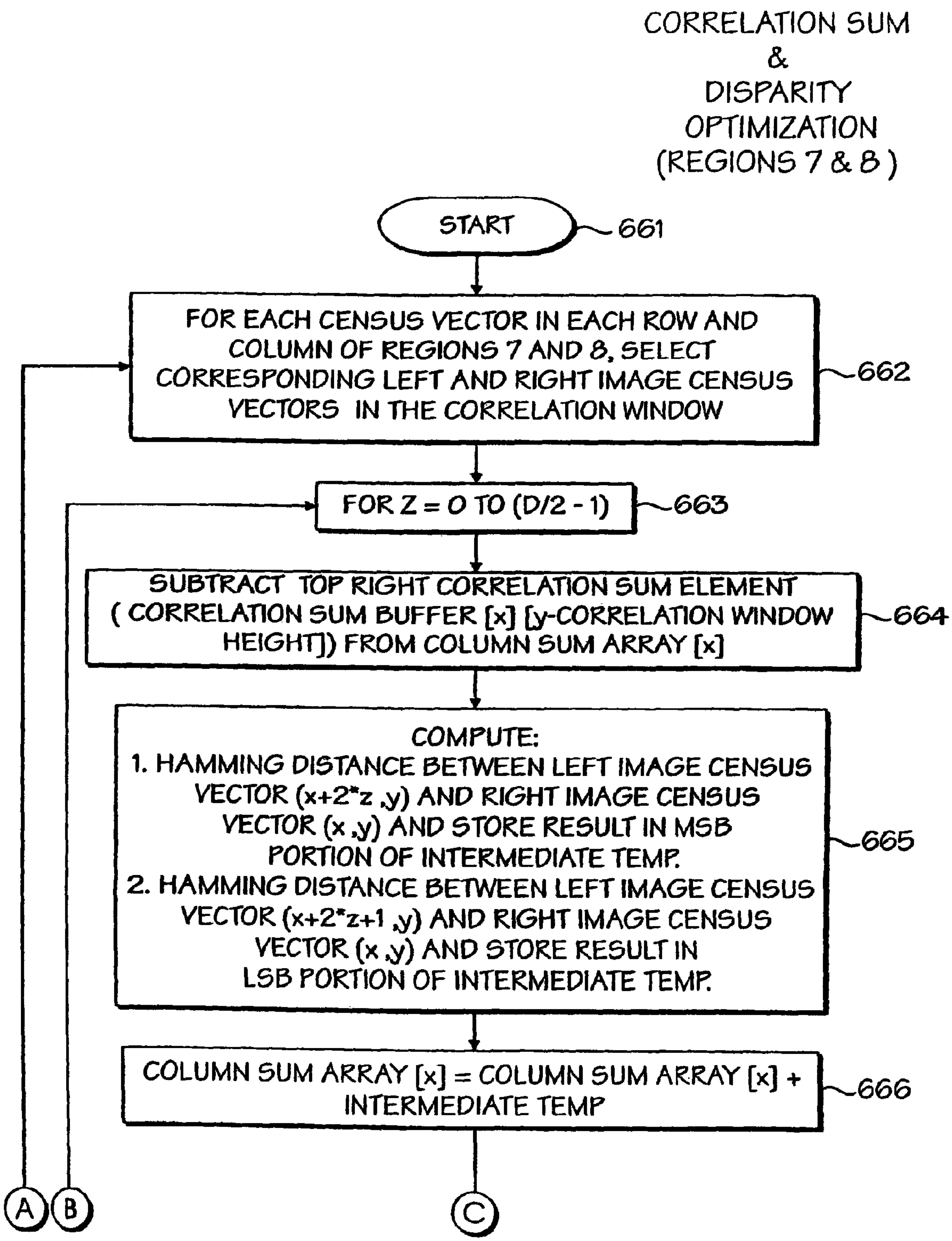
FIGS. 25(A)-(B) show a flow chart of one embodiment of the correlation sum and disparity optimization functionality for regions 7 and 8.
Figure 25B:
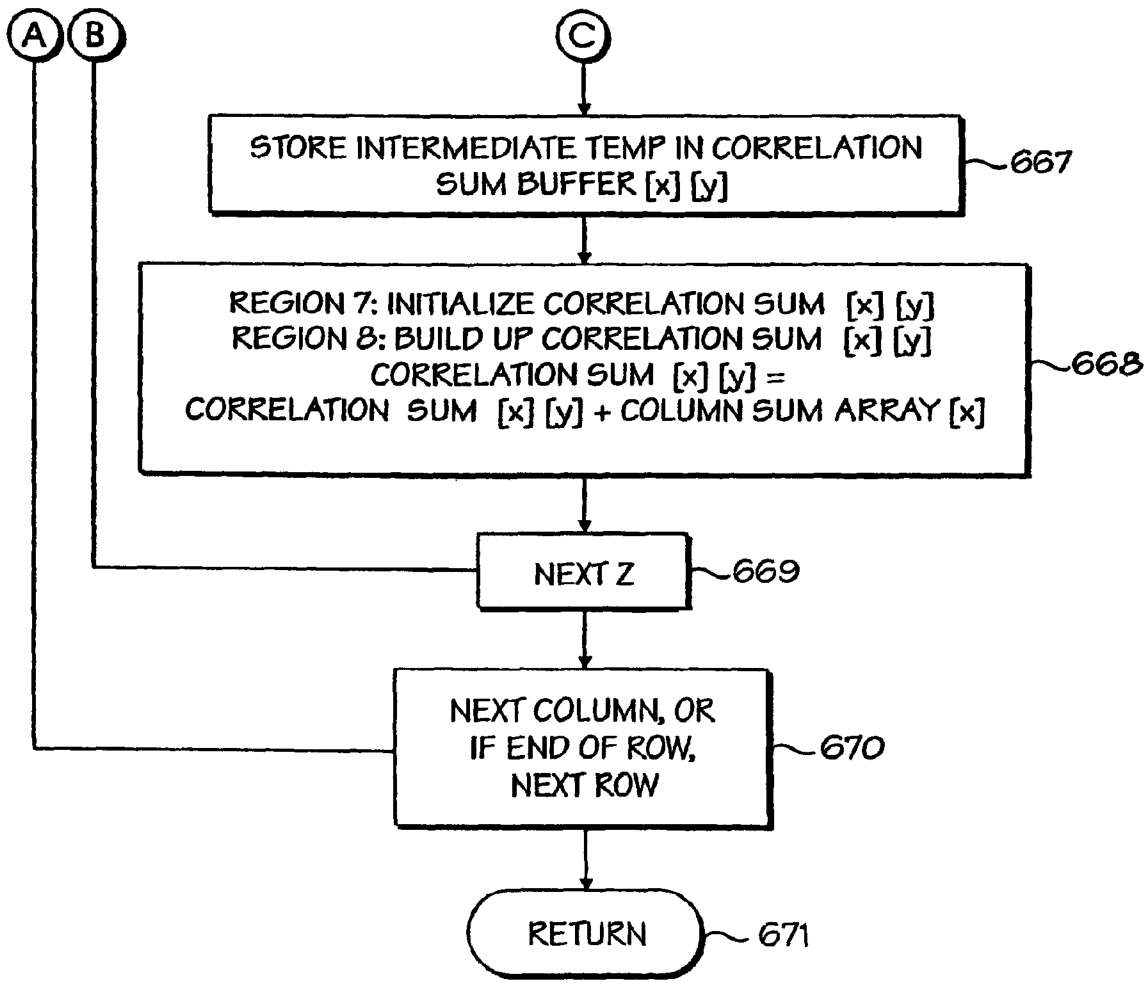

FIGS. 25(A)-(B) show a flow chart of one embodiment of the correlation sum and disparity optimization operation for regions 7 and 8. The computations for these two regions are similar to that of regions 3 and 4 except for slight variations. Here, the top rightmost image element of the window located one row up in the same column should be subtracted from current calculations. The program starts at step 661.

If the correlation window, and more specifically, the reference image element in the correlation window, is located in regions 7 or 8, steps 662 and 670 require the following correlation sum to be executed for each row and column by proceeding column by column in the row and if the reference point of the correlation window has reached the end of the row, the reference point moves to the beginning of the next row. Step 662 requires that a census vector in the right image within its correlation window and a corresponding census vector in the left image in its correlation window be selected. These left and right census vectors are located in the same row and column; that is, these windows are unshifted with respect to each other at disparity 0.

Steps 663 and 669 are the start and end, respectively, of a loop that allows the correlation sums to be computed for each of the disparities for each window in the reference right image. Here, z runs from 0 to D/2−1 so that for 16 disparities, D=16 and z runs from 0 to 7. A secondary reason why the z loop is used is for data packing purposes. A variable called intermediate temp, as explained above, is used for data packing purposes.

Step 664 subtracts the top right correlation sum element (correlation sum buffer[x][y-correlation window height]) from the value in the column sum array[x]. Now, the column sum array needs the contribution from the current reference point to make the column sum complete.

Step 665 uses a data packing concept of storing individual Hamming distances between corresponding pairs of census vectors. For 16 disparities, z loops from 0 to 7. For a given z value in the z loop, one embodiment of the present invention processes a pair of the correlation sums associated with distinct disparities (disparity 2*z and disparity 2*z+1) together as discussed above with respect to regions 1-4.

Step 666 continues to update the column sum buffer [x] with the contents of the previous column sum buffer plus the intermediate temp, which holds the current Hamming distance calculations for the reference image point for the two disparities applicable in this z loop. The column sum buffer [x] now holds column sum results for the reference right image point for each disparity.

Step 667 requires storage of these individual Hamming distance results for these pairs of census vectors for the reference right reference point at the location (x,y) in the correlation sum buffer [x][y]. Step 668 initializes the correlation sum for region 7 and updates the correlation window sum [x][y] by adding the column sum value to the current correlation sum for region 8. This result will be useful in later computations.

Step 669 requires the program to proceed to the next z, which is a different pair of disparities for the same reference point of the same correlation window. Upon calculating all correlation results for the D disparities, the program proceeds to step 670 which directs the system to select the next reference point in the next column of the same row or the beginning of the next row if the current reference point is located at the last column of the row. Then the same correlation calculations for the new reference point are performed for each disparity. Ultimately, the correlation sum for the entire correlation window will be calculated in regions 5, 6, 9, and 10. This portion of the correlation sum and disparity optimization computation ends at step 671.

6. Region 9

Figure 26A:
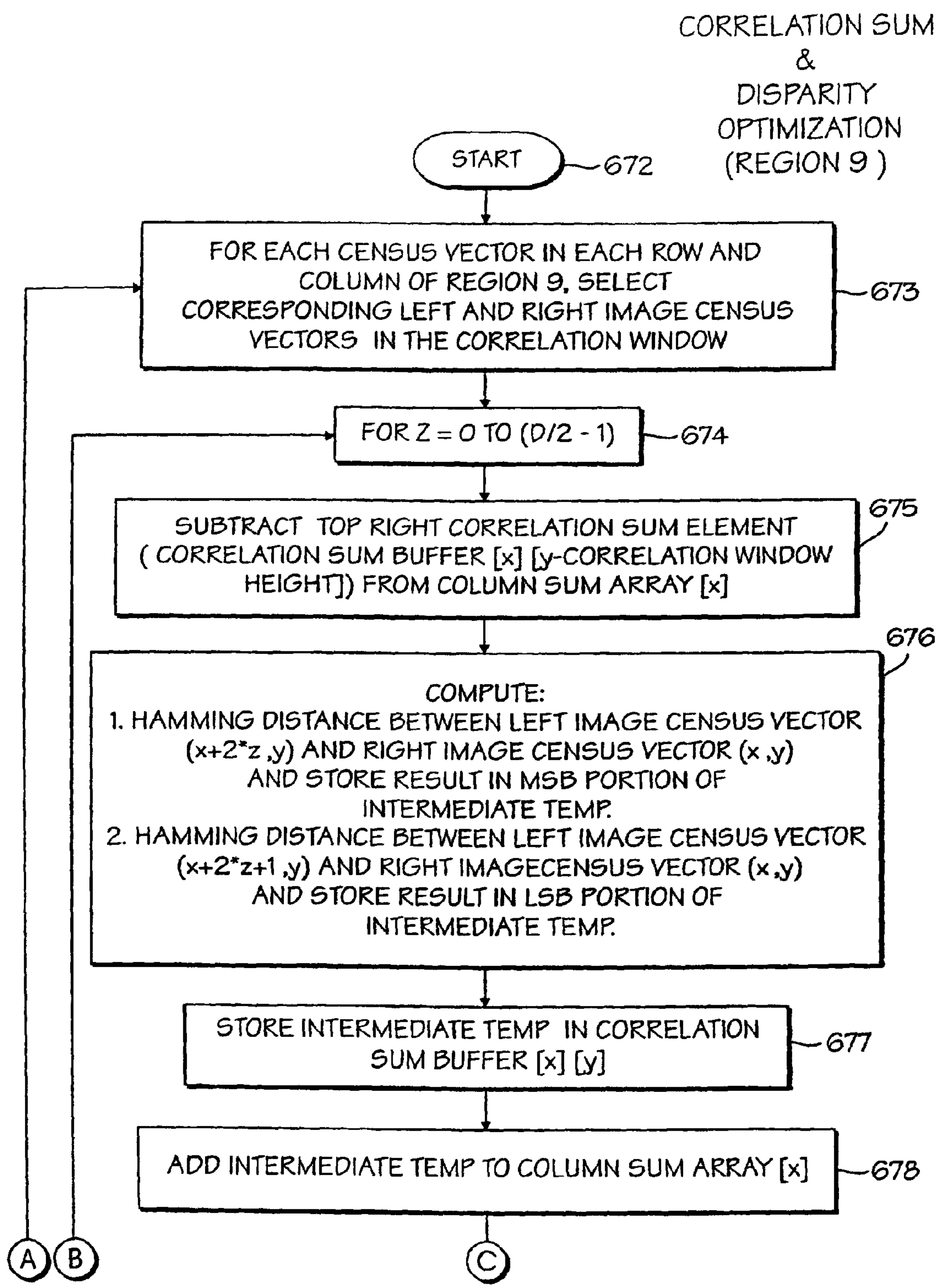
FIGS. 26(A)-(B) show a flow chart of one embodiment of the correlation sum and disparity optimization functionality for region 9.
Figure 26B:
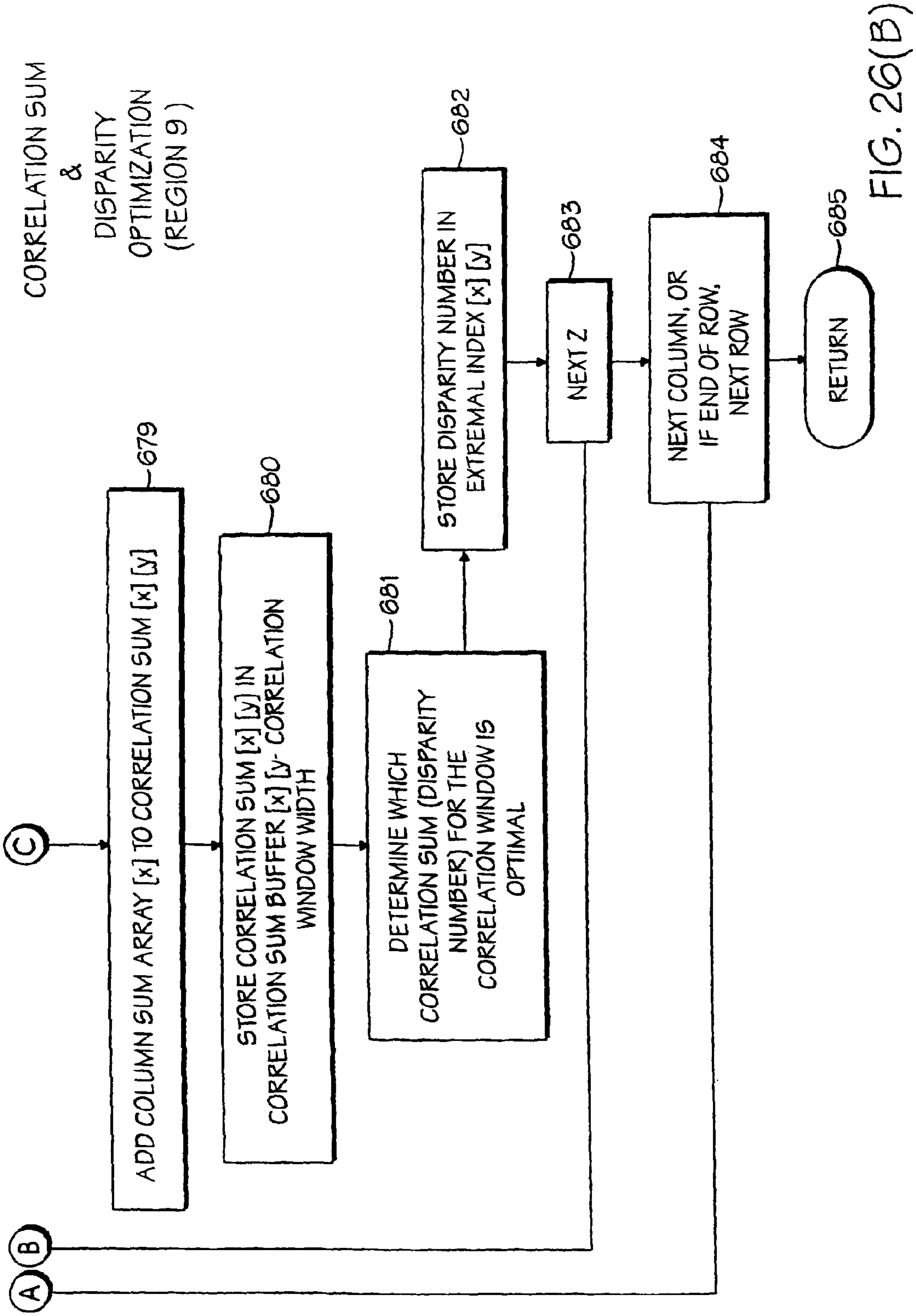

FIGS. 26(A)-(B) show a flow chart of one embodiment of the correlation sum and disparity optimization operation for region 9. The computations for this region are similar to that of region 5 except for slight variations. Here, the top rightmost image element of the window located one row up in the same column should be subtracted from current calculations. The program starts at step 672.

If the correlation window, and more specifically, the reference image element in the correlation window, is located in region 9, steps 673 and 684 require the following correlation sum to be executed for each row and column by proceeding column by column in the row and if the reference point of the correlation window has reached the end of the row, the reference point moves to the beginning of the next row. Step 673 requires that a census vector in the right image within its correlation window and a corresponding census vector in the left image in its correlation window be selected. These left and right census vectors are located in the same row and column; that is, these windows are unshifted with respect to each other at disparity 0.

Steps 674 and 683 are the start and end, respectively, of a loop that allows the correlation sums to be computed for each of the disparities for each window in the reference right image. Here, z runs from 0 to D/2−1 so that for 16 disparities, D=16 and z runs from 0 to 7. A secondary reason why the z loop is used is for data packing purposes. A variable called intermediate temp, as explained above, is used for data packing purposes.

Step 675 subtracts the top right correlation sum element (correlation sum buffer[x][y-correlation window height]) from the value in the column sum array[x]. Now, the column sum array needs the contribution from the current reference point to make the column sum complete.

Step 676 uses a data packing concept of storing individual Hamming distances between corresponding pairs of census vectors. For 16 disparities, z loops from 0 to 7. For a given z value in the z loop, one embodiment of the present invention processes a pair of the correlation sums associated with distinct disparities (disparity 2*z and disparity 2*z+1) together as discussed above with respect to regions 1-4.

Step 677 requires storage of these individual Hamming distance results for these pairs of census vectors for the reference right reference point at the location (x,y) in the correlation sum buffer [x][y]. Thus, intermediate temp is stored in the correlation sum buffer[x] [y].

Step 678 continues to update the column sum buffer [x] with the contents of the previous column sum buffer plus the intermediate temp, which holds the current Hamming distance calculations for the reference image point for the two disparities applicable in this z loop. The column sum buffer [x] now holds column sum results for the reference right image point for each disparity.

Step 679 updates the correlation window sum [x][y] by adding the column sum value to the current correlation sum. This result will be useful in later computations. Step 680 stores the correlation sum result, which is the sum of all individual Hamming distances in the correlation window obtained in a manner described with respect to FIG. 12, in the correlation sum buffer at a location which is a correlation window height rows above in the same column. Thus, the correlation sum is stored in the correlation sum buffer[x][y-correlation window height].

Step 681 determines which of the current correlation sum data in the correlation sum buffer is smallest and this optimal disparity result is stored in the extremal index as required in step 682. The process is similar to that of region 5.

Step 683 requires the program to proceed to the next z, which is a different pair of disparities for the same reference point of the same correlation window. Upon calculating all correlation results for the D disparities, the program proceeds to step 684 which directs the system to select the next reference point in the next column of the same row or the beginning of the next row if the current reference point is located at the last column of the row. Then the same correlation calculations for the new reference point are performed for each disparity. Ultimately, the correlation sum for the entire correlation window will be calculated in regions 5, 6, 9, and 10. This portion of the correlation sum and disparity optimization computation ends at step 685.

7. Region 10

Figure 27A:
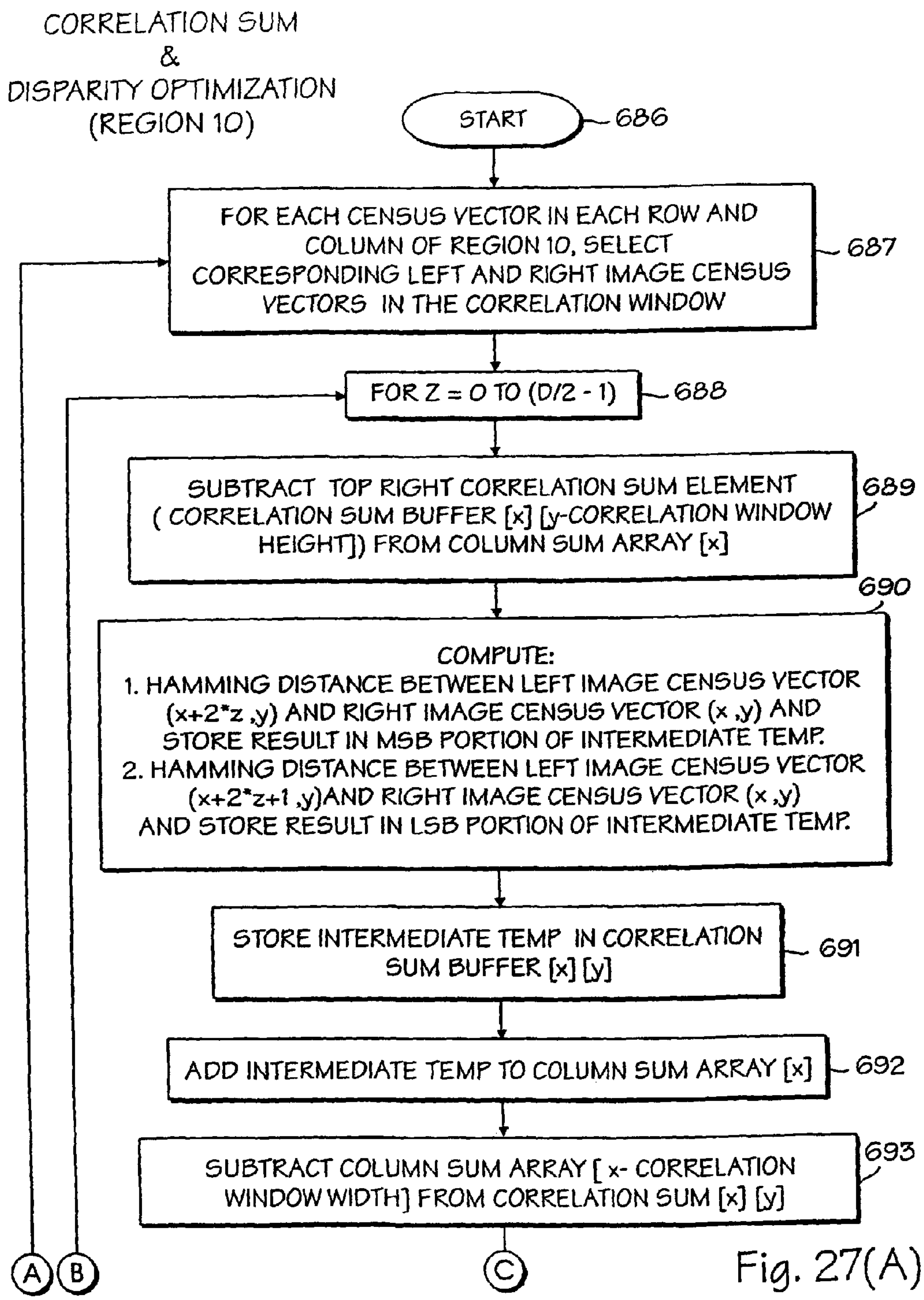
FIGS. 27(A)-(B) show a flow chart of one embodiment of the correlation sum and disparity optimization functionality for region 10.
Figure 27B:
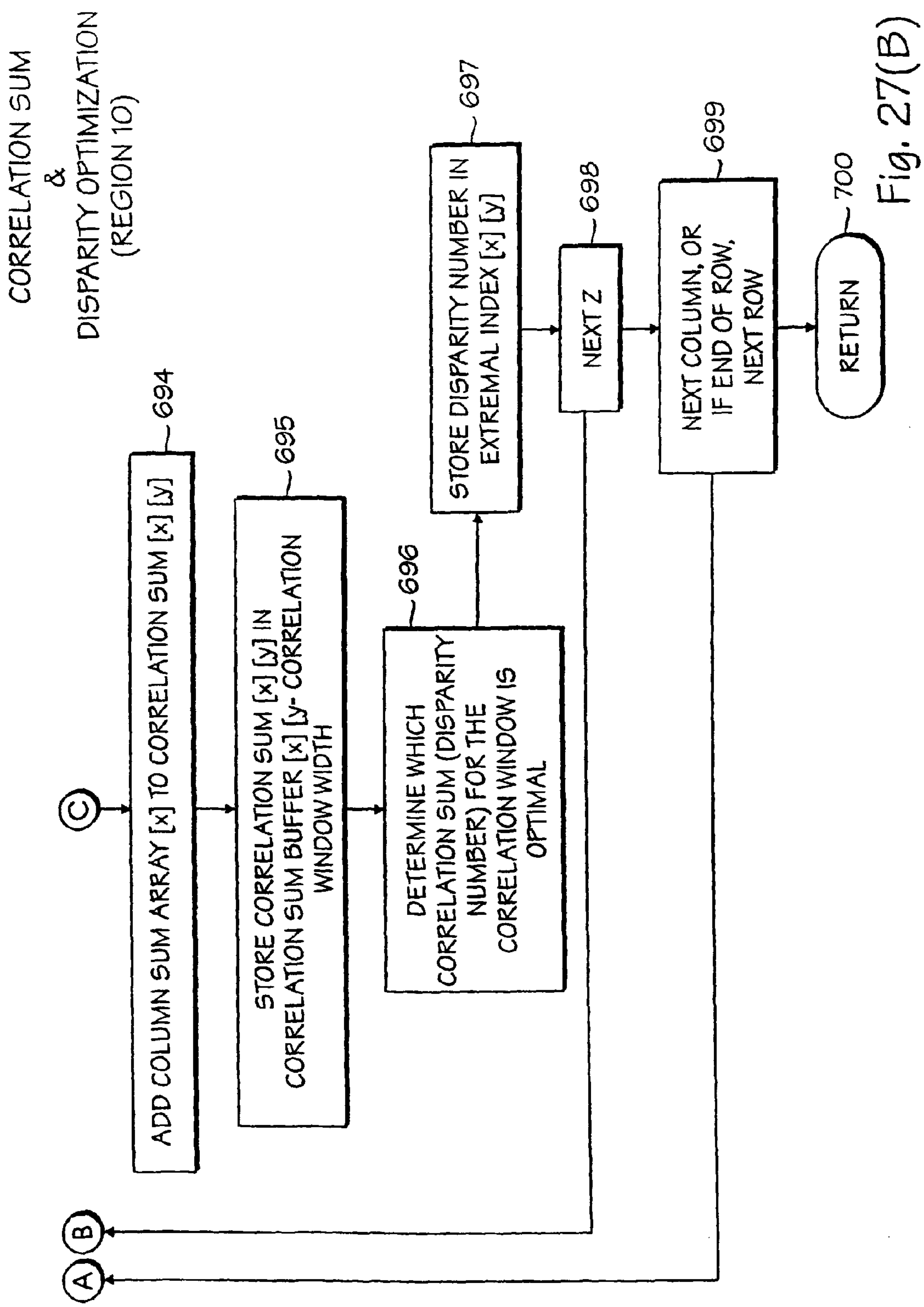

FIGS. 27(A)-(B) show a flow chart of one embodiment of the correlation sum and disparity optimization operation for region 10. The computations for region represent the general form of the program. The computations for this region are similar to that of regions 6 and 9 except for slight variations. Here, the computation includes: subtraction of the upper rightmost corner of one window above in the same column from the column sum, adding the current reference image element to the column sum, subtracting the column sum located a window width columns to the left from the window sum, and adding the current modified column sum to the modified window sum. The program starts at step 686.

If the correlation window, and more specifically, the reference image element in the correlation window, is located in region 10, steps 687 and 699 require the following correlation sum to be executed for each row and column by proceeding column by column in the row and if the reference point of the correlation window has reached the end of the row, the reference point moves to the beginning of the next row. Step 687 requires that a census vector in the right image within its correlation window and a corresponding census vector in the left image in its correlation window be selected. These left and right census vectors are located in the same row and column; that is, these windows are unshifted with respect to each other at disparity 0.

Steps 688 and 698 are the start and end, respectively, of a loop that allows the correlation sums to be computed for each of the disparities for each window in the reference right image. Here, z runs from 0 to D/2−1 so that for 16 disparities, D=16 and z runs from 0 to 7. A secondary reason why the z loop is used is for data packing purposes. A variable called intermediate temp, as explained above, is used for data packing purposes.

Step 689 subtracts the top right correlation sum element (correlation sum buffer[x][y-correlation window height]) from the value in the column sum array[x]. Now, the column sum array needs the contribution from the current reference point to make the column sum complete.

Step 690 uses a data packing concept of storing individual Hamming distances between corresponding pairs of census vectors. For 16 disparities, z loops from 0 to 7. For a given z value in the z loop, one embodiment of the present invention processes a pair of the correlation sums associated with distinct disparities (disparity 2*z and disparity 2*z+1) together as discussed above with respect to regions 1-4.

Step 691 requires storage of these individual Hamming distance results for these pairs of census vectors for the reference right reference point at the location (x,y) in the correlation sum buffer [x][y]. Thus, intermediate temp is stored in the correlation sum buffer[x] [y].

Step 692 continues to update the column sum buffer [x] with the contents of the previous column sum buffer plus the intermediate temp, which holds the current Hamming distance calculations for the reference image point for the two disparities applicable in this z loop. The column sum buffer [x] now holds column sum results for the reference right image point for each disparity.

Step 693 subtracts the column sum value located a correlation window width columns to the left from the current correlation sum value. The only value needed now to make the window sum complete is the current column sum.

Step 694 updates the correlation window sum [x][y] by adding the column sum value to the current correlation sum. This result will be useful in later computations. Step 695 stores the correlation sum result, which is the sum of all individual Hamming distances in the correlation window obtained in a manner described with respect to FIG. 12, in the correlation sum buffer at a location which is a correlation window height rows above in the same column. Thus, the correlation sum is stored in the correlation sum buffer[x][y-correlation window height].

Step 696 determines which of the current correlation sum data in the correlation sum buffer is smallest and this optimal disparity result is stored in the extremal index as required in step 697. The process is similar to that of region 5.

Step 698 requires the program to proceed to the next z, which is a different pair of disparities for the same reference point of the same correlation window. Upon calculating all correlation results for the D disparities, the program proceeds to step 699 which directs the system to select the next reference point in the next column of the same row or the beginning of the next row if the current reference point is located at the last column of the row. Then the same correlation calculations for the new reference point are performed for each disparity. Ultimately, the correlation sum for the entire correlation window will be calculated in regions 5, 6, 9, and 10. This portion of the correlation sum and disparity optimization computation ends at step 700.

The stereo computation for a pair of images requires performing a census transform at each pixel in each image, followed by a search over some search window at each pixel. The Census transform involves comparing the center pixel with N other pixels surrounding it in the neighborhood. Thus, the transform takes one load for the center pixel, followed by N loads, N compares, N−1 shifts, and N logic operations to form the final N-long bit vector. Thus, for a N-bit Census transform on images of width X and height Y, the Census transform takes approximately X*Y*(1+N) loads, and X*Y stores and X*Y*3N operations, for a total of X*Y*(2+4N) operations (ignoring pointer arithmetic, and loop overheads).

The search for the best disparity is restricted to D possible disparities for each pixel. The computation for each pixel involves loading the transformed Census pixel for one image and D transformed pixels for the other image. To compute the Hamming distance, each of the latter pixels must be applied with an exclusive-OR operation (XOR) with the former pixel. The number of bits in the result can be counted using a lookup table. If the number N of the N-bit Census bits is greater than 8 or 16 bits, this bit counting may require multiple loads, and additional operations to extract the relevant bytes. This Hamming distance can be stored for subsequent use. Once the Hamming distance is computed, the area sum needs to be computed for an area of $X_{WIN}$ by $Y_{WIN}$ using a box filter. The following must be loaded: (1) the sum for the same disparity on the previous pixel, (2) the column sum for the same disparity on the previous row, (3) the column sum for the same disparity $X_{WIN}$ pixels ago, and (4) the Hamming distance for the same disparity $Y_{WIN}$ rows ago. Once these are loaded, a new column sum is formed by subtracting the old Hamming distance from the previous row's column sum, and adding in the new Hamming distance. This new column sum is stored for subsequent use. The new area sum is computed by subtracting the column sum from $X_{WIN}$ pixels ago, and adding the new column sum. Finally, the area sum can be compared with the previous minimum score. If the new score is less than the previous minimum, the new score is stored as the minimum, and the current disparity is stored.

D. Interest Operation

1. All Regions

Figure 28A:
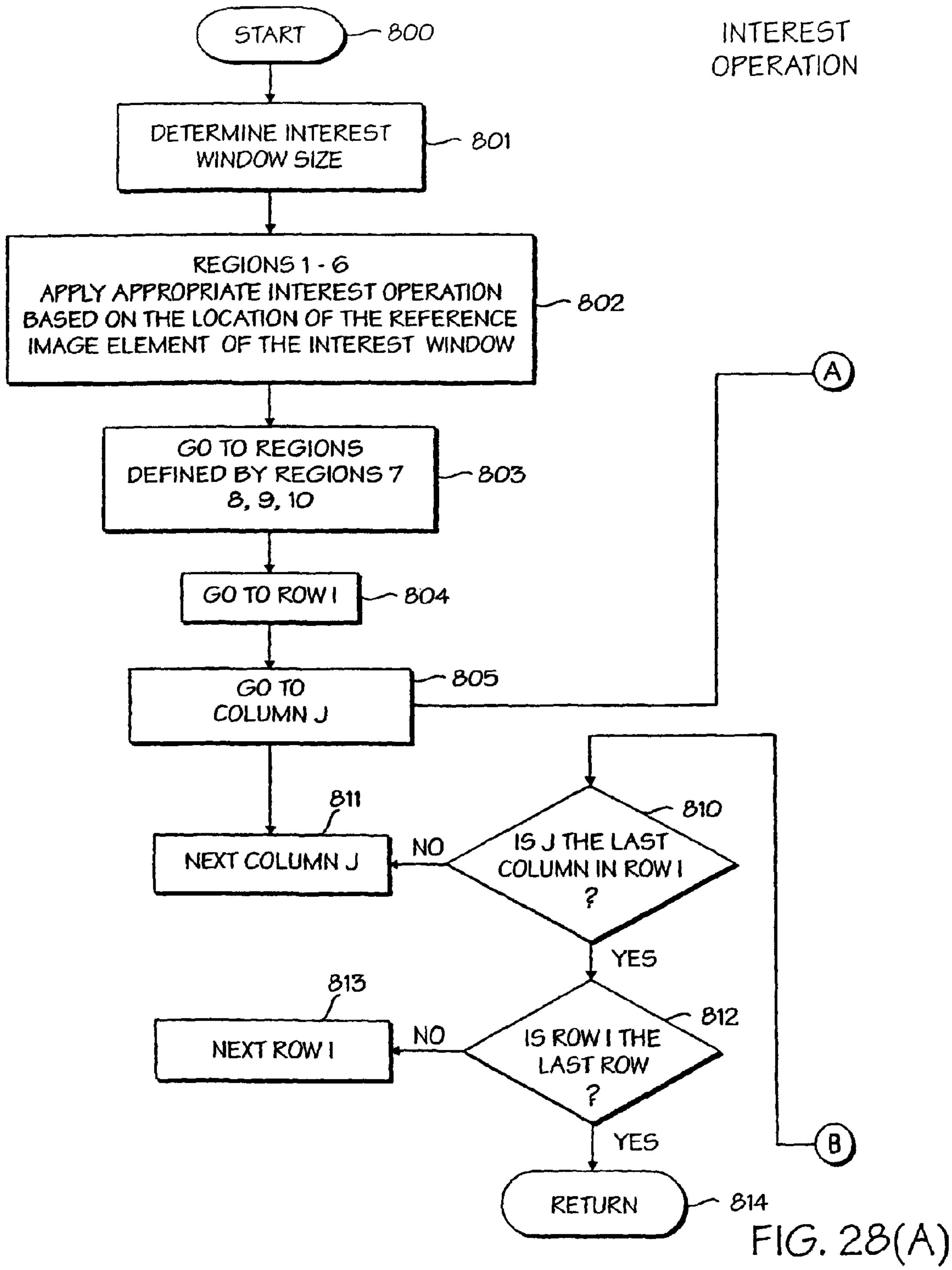
FIGS. 28(A)-(B) show a high level flow chart of one embodiment of the interest operation for regions 1-10.
Figure 28B:
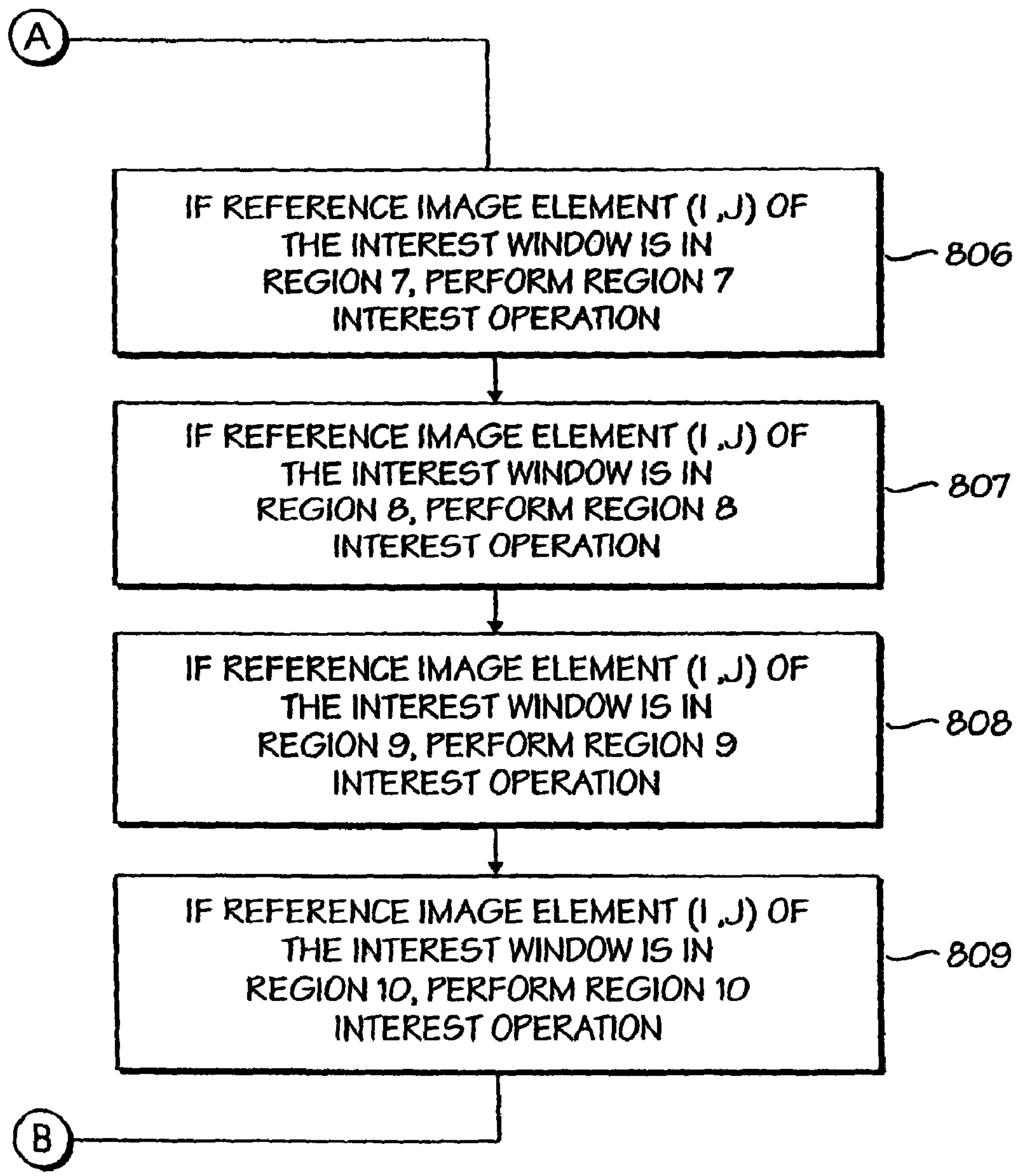

FIGS. 28(A)-(B) show a high level flow chart of one embodiment of the interest operation for regions 1-10. In general, the interest computation includes those elements previously described with respect to regions 1-10 of the correlation summation and disparity optimization operation: subtraction of the upper rightmost corner of one interest window above in the same column from the column sum, adding the difference calculation for the current reference image element to the column sum, subtracting the column sum located a window width columns to the left from the window sum, and adding the current modified column sum to the modified window sum.

At this point in the program, at least one of the intensity images is available. In one embodiment, if the intensity image for the reference image (either right or left) is available, then the interest calculation can proceed. As shown in FIGS. 28(A)-(B), the program starts at step 800.

Step 801 determines the interest window size and the location of the reference point in the window. In one embodiment, the interest window is 7×7 and the reference point is located at the lower rightmost corner of the window.

Because of the existence of the nine (9) edge conditions and one general case, the computations execute differently. Regions 1-9 represent edge conditions while region 10 represents the general case. As discussed above for FIGS. 11(A)-11(J), interest sums for the entire window are calculated for those regions where a complete window can fit in the desired image processing area; that is, image data is found in every portion of the interest window. Thus, entire window sums are calculated for regions 5, 6, 9, and 10. The bulk of the processing will be take place in region 10. The location of the reference image element of the window with respect to the ten regions dictates how and what computations are accomplished. Step 802 applies to regions 1-6 where the interest operation is executed. These regions set up the column sum buffer, difference variables, and interest window sums. When the interest computations are completed, step 803 requires the program to proceed to regions 7-10.

The computations are performed for each image element in the reference right image column by column within a row, and at the end of the row, the program proceeds to the first column in the next row in the desired image processing area. This is reflected by steps 804, 805, 810, 812, 811, and 813. The less frequently occurring row loop defined by steps 804, 812, and 813 is the outer loop, whereas the more frequently occurring column loop defined by steps 805, 810, and 811 is the inner loop. As the program proceeds column by column within a row, the window passes through regions 7, 8, 9, and 10, in that order. When the program reaches the next row and proceeds to the end of the row, regions 7, 8, 9, and 10 are traversed by the window again as shown by FIGS. 11(G)-11(J).

Initially, the program proceeds to region 7 at row I and column J as shown by steps 804 and 805. If the window is in region 7, as it should be at the beginning of the row, the region 7 interest operation is performed as required by step 806. If the window is in region 8, the region 8 interest operation is performed as required by step 807. If the window is in region 9, the region 9 interest operation is performed as required by step 808. If the window is in region 10, the region 10 interest operation is performed as required by step 809.

Before proceeding, step 810 determines if the current reference image element at row I and column J is at the last column of row 1. If this decision evaluates to "NO," the program proceeds to the next column J (steps 811 and 805) and performs one of the steps 806, 807, 808, or 809 depending on the location of the window. If the decision for step 810 evaluates to "YES," step 812 determines if this row is the last row in the desired image processing area. If not, steps 813 and 804 require the window to proceed to the next row I and the first column J in that row (the column and row numbers are reset after reaching the last column and row, respectively). If the decision in step 812 evaluates to "YES," the interest program ends at step 814.

In some embodiments, the interest operation can be performed at the same time as the correlation step is proceeding by generating a confidence value over the same correlation window. The results of the interest operator for each new line are stored in one line of the window summation buffer. This necessitates either the use of the interest operator buffer or the use of the same correlation buffer. The interest calculations are stored in the next line of the correlation buffer, used to generate the interest results (i.e., confidence "1" or no confidence "0"), and the interest values in this line is written over with data generated from the correlation summation and disparity optimization scheme.

2. Regions 1 and 2

Figure 29:
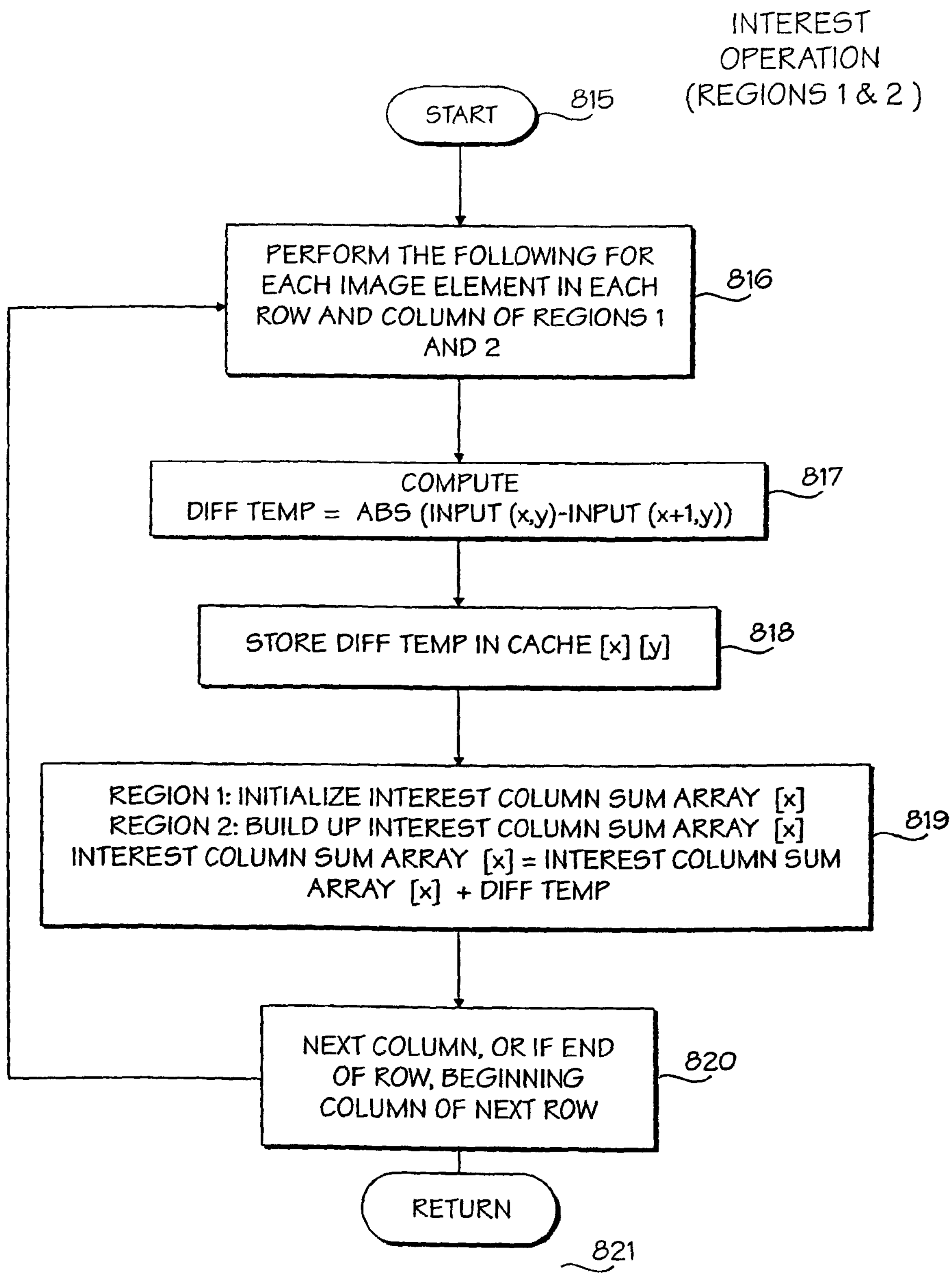
FIG. 29 shows a flow chart of one embodiment of the interest operation for regions 1 and 2.

FIG. 29 shows a flow chart of one embodiment of the interest operation for regions 1 and 2. The program starts at step 815 in the desired image processing area. If the interest window, and more specifically, the reference image element in the interest window, is located in region 1 or 2, steps 816 and 820 require the following interest calculation to be executed for each row and column by proceeding column by column in the row and if the reference point of the interest window has reached the end of the row, the reference point moves to the beginning of the next row.

Step 817 uses a variable called diff temp which is 32 bits long in one embodiment and holds difference values between two adjacent image elements. The length of the diff temp variable can be made smaller (or larger) but ultimately, the design should accommodate the size of the interest column sum array because diff temp is added to the interest column sum array which is 32 bits long per data. The respective data lengths of diff temp and the interest column sum buffer should accommodate their addition so that the addition result truly reflects the addition operation. To simplify, diff temp and interest column sum are both 32 bits. Like intermediate temp from the correlation summation and disparity optimization operation, data packing can also be used for diff temp.

Step 817 computes the absolute value of the difference between the intensity value of the current reference image element (input(x,y)) and the intensity value of the adjacent image element (input(x+1,y)). In some embodiments, the absolute value is calculated as a function call. In other embodiments, a difference is calculated and depending on whether the result is negative or not, the positive version of the same value is chosen for the diff temp variable. If the reference image element reaches the last column of the desired image processing area, the difference calculation for diff temp is still performed because intensity data at a location immediately to the right of this reference image element (and hence outside the desired image processing area) will invariably be available because of the skipped rows and columns determined at the beginning of the program.

Step 818 stores the value of diff temp in cache[x][y]. This cache may also be the sliding sum of differences (SSD) array [x][y].

Step 819 initializes the interest column sum buffer [x] with the contents of diff temp if the reference interest window is located in region 1. The interest column sum buffer [x] now holds interest results for the reference image element. Step 819 also updates the interest column sum buffer [x] with the contents of the previous interest column sum buffer plus the diff temp if the reference interest window is located in region 2. The interest column sum buffer [x] now holds interest column sum results for each column defined by the reference image element in the column which is the bottom-most image element in the column. The size of the column is the height of the interest window. In regions 1 and 2, entire columns are not available so the column sums are only partial.

The program proceeds to step 820 which directs the system to select the next reference point in the next column of the same row or the beginning of the next row if the current reference point is located at the last column of the row. Then the same interest calculations for the new reference point are performed. Ultimately, the interest column sum array [x] is being built for each column for the height of the interest window, although a complete interest column sum (entire height of the interest window) is not yet available. This portion of the interest operation ends at step 821.

3. Regions 3 and 4

Figure 30:
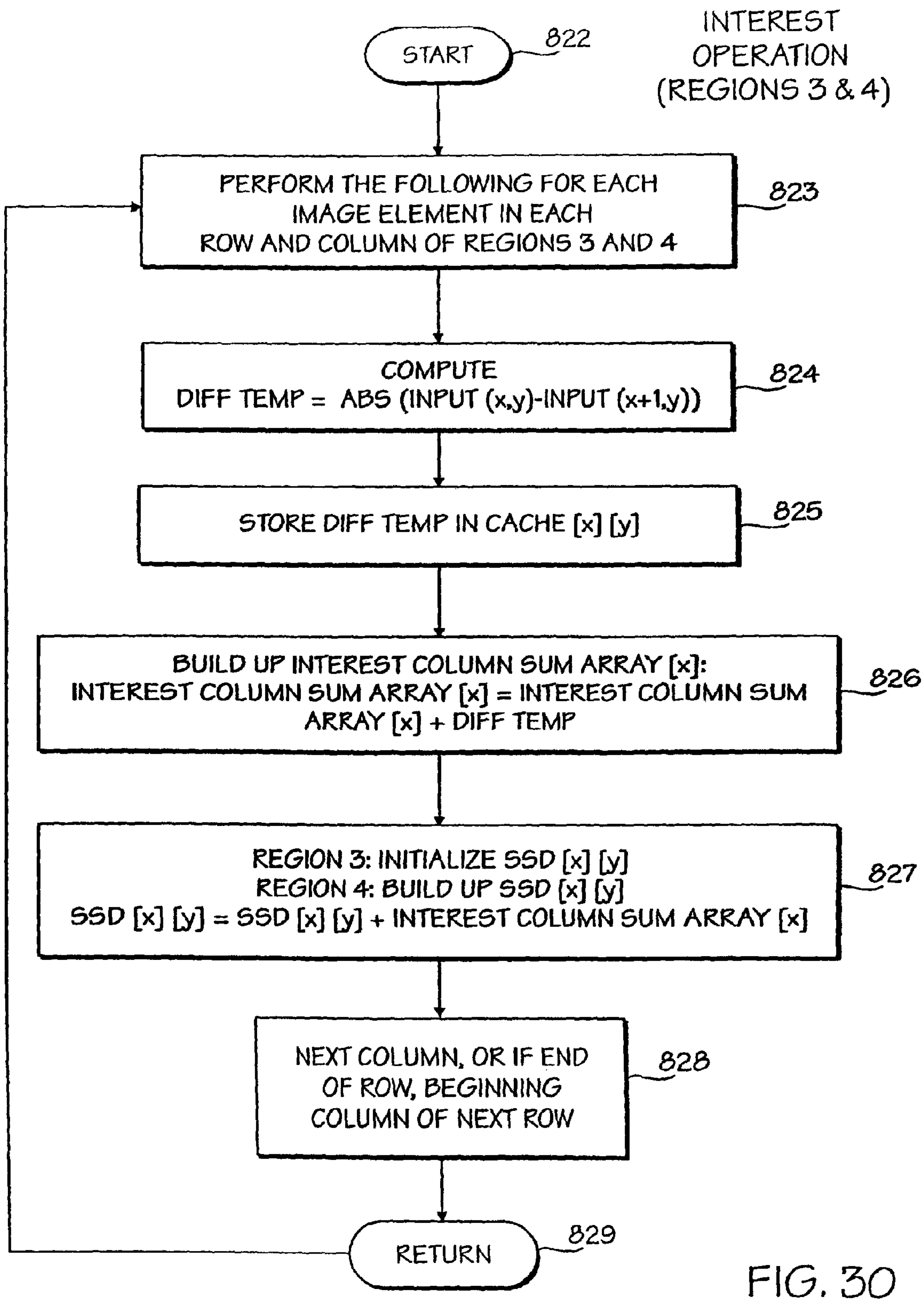
FIG. 30 shows a flow chart of one embodiment of the interest operation for regions 3 and 4.

FIG. 30 shows a flow chart of one embodiment of the interest operation for regions 3 and 4. The computations are similar to that of regions 1 and 2 except that now, an entire interest column sum is available. The program starts at step 822 in the desired image processing area. If the interest window, and more specifically, the reference image element in the interest window, is located in region 3 or 4, steps 823 and 828 require the following interest calculation to be executed for each row and column by proceeding column by column in the row and if the reference point of the interest window has reached the end of the row, the reference point moves to the beginning of the next row.

Step 824 computes the absolute value of the difference between the intensity value of the current reference image element (input(x,y)) and the intensity value of the adjacent image element (input(x+1,y)). Step 825 stores the value of diff temp in cache[x][y]. This cache may also be the sliding sum of differences (SSD) array[x][y].

Step 826 builds up the interest column sum buffer [x] with the contents of the previous interest column sum buffer plus the diff temp. The interest column sum buffer [x] now holds complete interest column sum results for each column defined by the reference image element in the column which is the bottom-most image element in the column. The size of the column is the height of the interest window.

Step 827 initializes the SSD[x][y] array with the value in the interest column sum array[x][y] if the interest window is located in region 3. Step 827 builds up the SSD[x][y] array with the current value of the SSD array plus the value in the interest column sum array for the current location of the image element if the interest window is located in region 4.

The program proceeds to step 828 which directs the system to select the next reference point in the next column of the same row or the beginning of the next row if the current reference point is located at the last column of the row. Then the same interest calculations for the new reference point are performed. Ultimately, the SSD[x][y] array is being built for each image point. This portion of the interest operation ends at step 829.

4. Region 5

Figure 31:
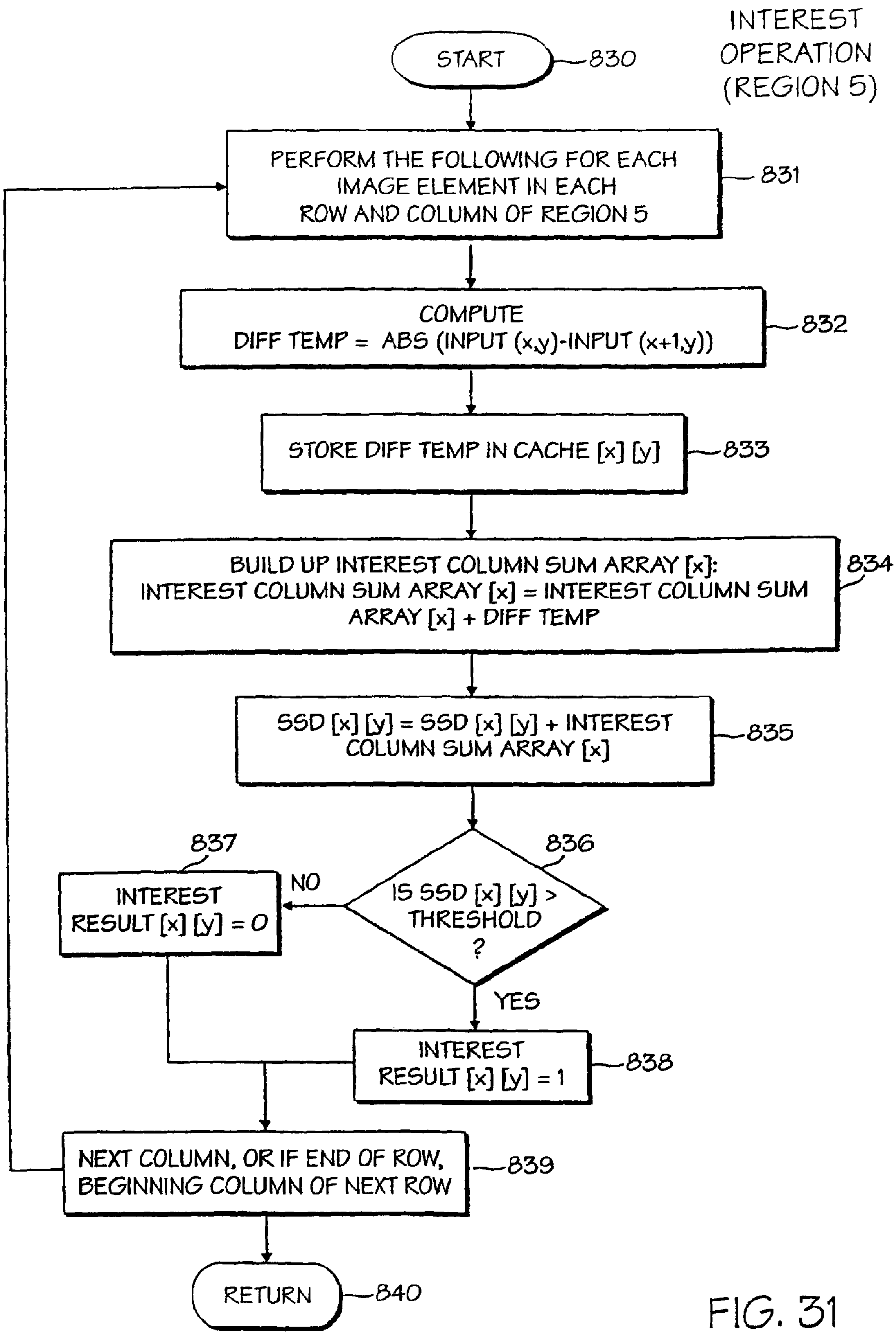
FIG. 31 shows a flow chart of one embodiment of the interest operation for region 5.

FIG. 31 shows a flow chart of one embodiment of the interest operation for region 5. The computations are similar to that of regions 3 and 4 except that now, an entire interest window sum is available. The program starts at step 830 in the desired image processing area. If the interest window, and more specifically, the reference image element in the interest window, is located in region 5, steps 831 and 839 require the following interest calculation to be executed for each row and column by proceeding column by column in the row and if the reference point of the interest window has reached the end of the row, the reference point moves to the beginning of the next row.

Step 832 computes the absolute value of the difference between the intensity value of the current reference image element (input(x,y)) and the intensity value of the adjacent image element (input(x+1,y)). Step 833 stores the value of diff temp in cache[x][y]. This cache may also be the sliding sum of differences (SSD) array[x][y].

Step 834 builds up the interest column sum buffer [x] with the contents of the previous interest column sum buffer plus the diff temp. The interest column sum buffer [x] now holds complete interest column sum results for each column defined by the reference image element in the column which is the bottom-most image element in the column.

Step 835 completes the SSD[x][y] array at this reference point with the current value of the SSD array plus the value in the interest column sum array for the current location of the image element. In this region, the contents of SSD[x][y] now represents a complete window sum.

Step 836 decides whether the interest window sum value, which is now available for this region, is greater than a particular preprogrammed threshold. Note that the interest window sum represents the texture of the intensity image at that particular reference image point. The threshold level determines texture-based quality of the output and this output indicates to the image processing system the confidence measure of the correlation computations. If the threshold is very low or set to 0, almost every interest window sum calculation will exceed this level. Thus, even a very uniform scene such as a white board may pass this threshold. If the threshold is set very high, very little interest window sums will exceed this threshold and the output will indicate to the image processing system that very little of the output has a high enough confidence of the reliability of the correlation results. If the decision in step 836 evaluates to "YES," then the value in interest result[x][y] is set to 1 as shown in step 838, indicating a measure of confidence for the correlation results. If the decision in step 836 evaluates to "NO," then the value in interest result[x][y] is set to 0 as shown in step 837, indicating a measure of no confidence for the correlation results.

After setting the appropriate confidence value for the interest result array [x][y], the program proceeds to step 839 which directs the system to select the next reference point in the next column of the same row or the beginning of the next row if the current reference point is located at the last column of the row. Then the same interest calculations for the new reference point are performed. This portion of the interest operation ends at step 840.

5. Region 6

Figure 32:
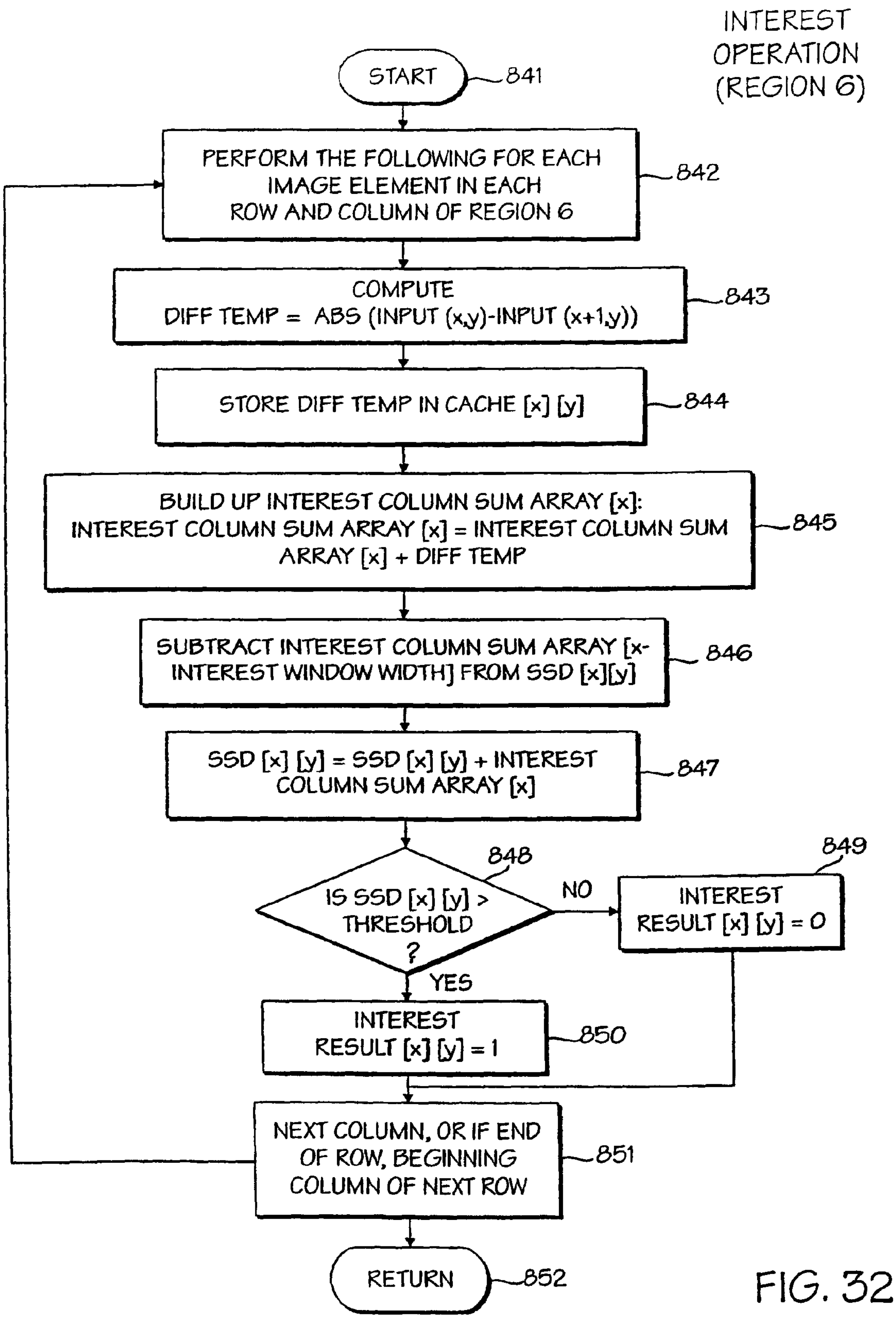
FIG. 32 shows a flow chart of one embodiment of the interest operation for region 6.

FIG. 32 shows a flow chart of one embodiment of the interest operation for region 6. The computations are similar to that of region 5 except that now, the column sum located interest window width columns to the left can be subtracted from the interest window sum. The program starts at step 841 in the desired image processing area. If the interest window, and more specifically, the reference image element in the interest window, is located in region 6, steps 842 and 851 require the following interest calculation to be executed for each row and column by proceeding column by column in the row and if the reference point of the interest window has reached the end of the row, the reference point moves to the beginning of the next row.

Step 843 computes the absolute value of the difference between the intensity value of the current reference image element (input(x,y)) and the intensity value of the adjacent image element (input(x+1,y)). Step 844 stores the value of diff temp in cache[x][y]. This cache may also be the sliding sum of differences (SSD) array[x][y].

Step 845 builds up the interest column sum buffer [x] with the contents of the previous interest column sum buffer plus the diff temp. The interest column sum buffer [x] now holds complete interest column sum results for each column defined by the reference image element in the column which is the bottom-most image element in the column.

Step 846 subtracts the column sum value in the interest column sum array [x-interest window width] from the current value in the SSD[x][y] array. That current value is the window sum associated with image element located at (x−1,y). To make the interest window sum complete, the interest column sum [x] is added to SSD[x][y] as shown in step 847. In this region, the contents of SSD[x][y] now represent a complete interest window sum.

Step 848 decides whether the interest window sum value, which is now available for this region, is greater than a particular preprogrammed threshold. If the decision in step 846 evaluates to "YES," then the value in interest result[x][y] is set to 1 as shown in step 850, indicating a measure of confidence for the correlation results. If the decision in step 848 evaluates to "NO," then the value in interest result[x][y] is set to 0 as shown in step 849, indicating a measure of no confidence for the correlation results.

After setting the appropriate confidence value for the interest result array [x][y], the program proceeds to step 851 which directs the system to select the next reference point in the next column of the same row or the beginning of the next row if the current reference point is located at the last column of the row. Then the same interest calculations for the new reference point are performed. This portion of the interest operation ends at step 852.

6. Regions 7 and 8

Figure 33:
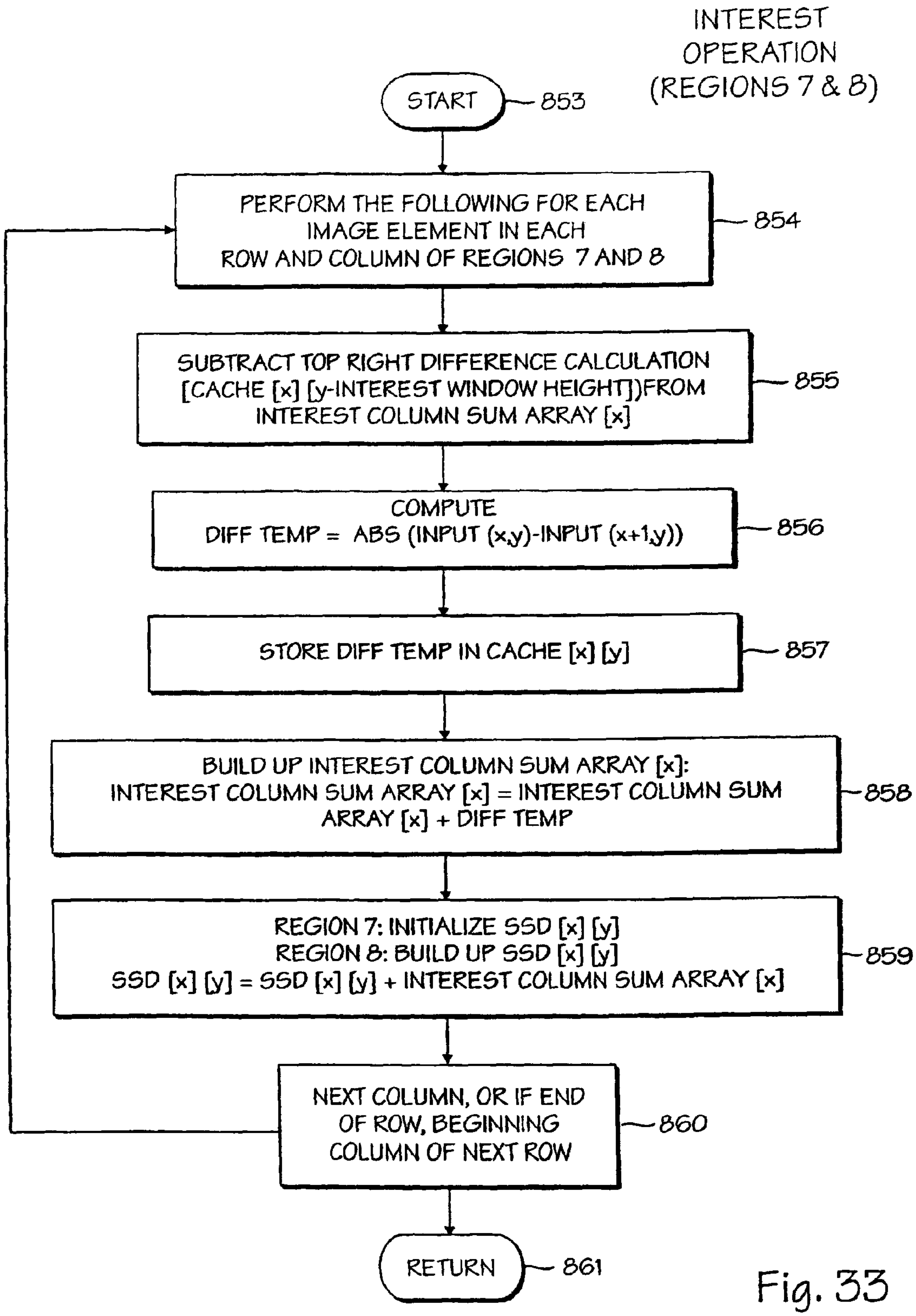
FIG. 33 shows a flow chart of one embodiment of the interest operation for regions 7 and 8.

FIG. 33 shows a flow chart of one embodiment of the interest operation for regions 7 and 8. The computations are similar to that of regions 3 and 4 except that now, the single difference calculation for the image point located an interest window height above the current reference point in the same column should be subtracted from the value in interest column sum [x]. The program starts at step 853 in the desired image processing area. If the interest window, and more specifically, the reference image element in the interest window, is located in region 7 or 8, steps 854 and 860 require the following interest calculation to be executed for each row and column by proceeding column by column in the row and if the reference point of the interest window has reached the end of the row, the reference point moves to the beginning of the next row.

Step 855 subtracts the difference calculation for a single image element located in cache[x][y-interest window height] from the value in the interest column sum array[x]. The cache array is the SSD[x][y] array in one embodiment.

Step 856 computes the absolute value of the difference between the intensity value of the current reference image element (input(x,y)) and the intensity value of the adjacent image element (input(x+1,y)). Step 857 stores the value of diff temp in cache[x][y], which may also be the SSD array[x][y].

Step 858 builds up the interest column sum buffer [x] with the contents of the previous interest column sum buffer plus the diff temp. The interest column sum buffer [x] now holds complete interest column sum results for each column defined by the reference image element in the column which is the bottom-most image element in the column.

Step 859 initializes the SSD[x][y] array with the value in the interest column sum array[x][y] if the interest window is located in region 7. Step 859 builds up the SSD[x][y] array with the current value of the SSD array plus the value in the interest column sum array for the current location of the image element if the interest window is located in region 8.

The program proceeds to step 860 which directs the system to select the next reference point in the next column of the same row or the beginning of the next row if the current reference point is located at the last column of the row. Then the same interest calculations for the new reference point are performed. Ultimately, the SSD[x][y] array is being built for each image point. This portion of the interest operation ends at step 861.

7. Region 9

Figure 34:
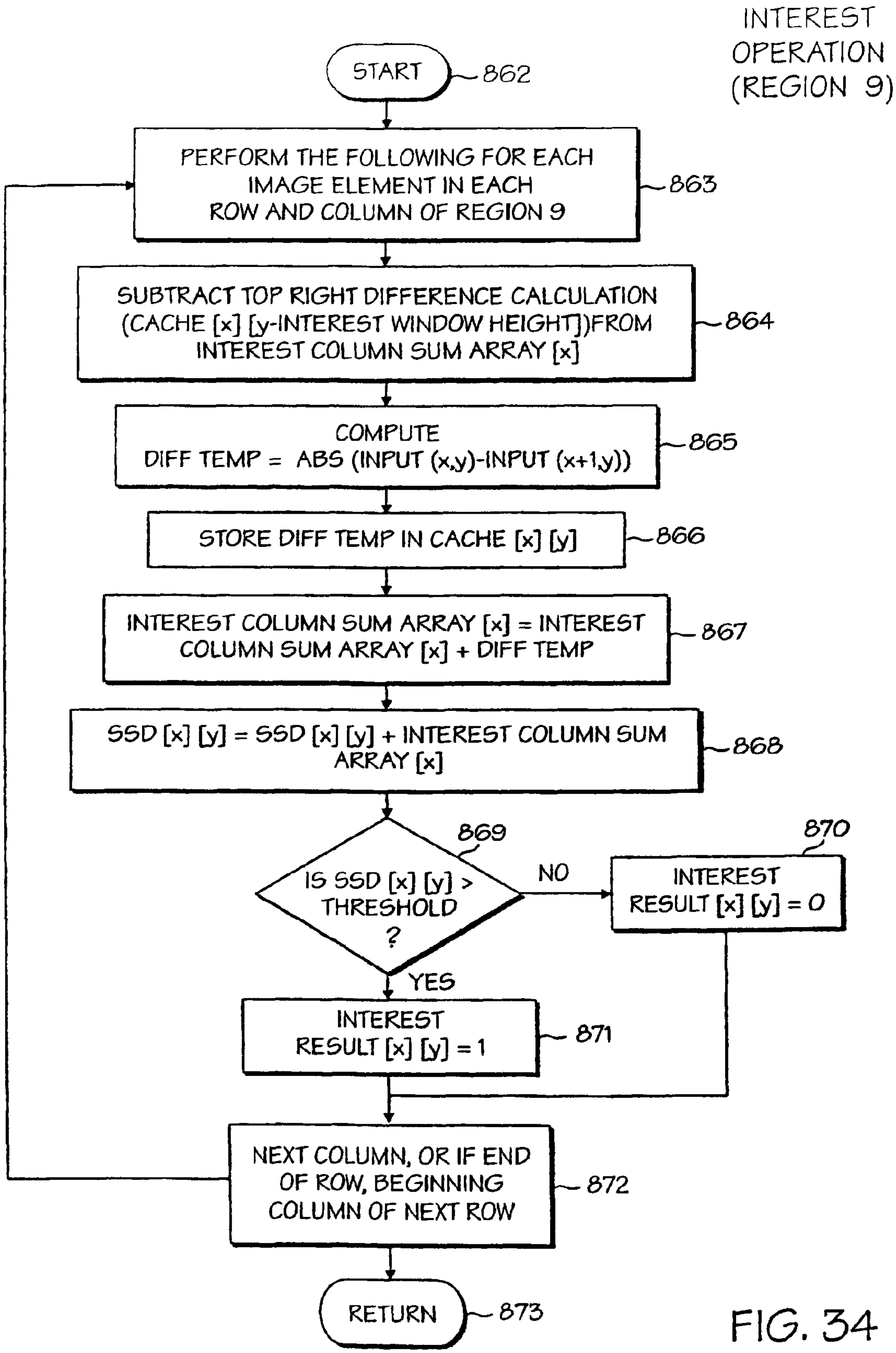
FIG. 34 shows a flow chart of one embodiment of the interest operation for region 9.

FIG. 34 shows a flow chart of one embodiment of the interest operation for region 9. The computations are similar to that of region 5 except that now, the single difference calculation for the image point located an interest window height above the current reference point in the same column should be subtracted from the value in interest column sum [x]. The program starts at step 862 in the desired image processing area. If the interest window, and more specifically, the reference image element in the interest window, is located in region 9, steps 863 and 872 require the following interest calculation to be executed for each row and column by proceeding column by column in the row and if the reference point of the interest window has reached the end of the row, the reference point moves to the beginning of the next row.

Step 864 subtracts the difference calculation for a single image element located in cache[x][y-interest window height] from the value in the interest column sum array[x]. The cache array is the SSD[x][y] array in one embodiment.

Step 865 computes the absolute value of the difference between the intensity value of the current reference image element (input(x,y)) and the intensity value of the adjacent image element (input(x+1,y)). Step 866 stores the value of diff temp in cache[x][y]. This cache may also be the sliding sum of differences (SSD) array[x][y].

Step 867 builds up the interest column sum buffer [x] with the contents of the previous interest column sum buffer plus the diff temp. The interest column sum buffer [x] now holds complete interest column sum results for each column defined by the reference image element in the column which is the bottom-most image element in the column.

Step 868 completes the SSD[x][y] array at this reference point with the current value of the SSD array plus the value in the interest column sum array for the current location of the image element. In this region, the contents of SSD[x][y] now represents a complete window sum.

Step 869 decides whether the interest window sum value, which is now available for this region, is greater than a particular preprogrammed threshold. Note that the interest window sum represents the texture of the intensity image at that particular reference image point. The threshold level determines texture-based quality of the output and this output indicates to the image processing system the confidence measure of the correlation computations. If the decision in step 869 evaluates to "YES," then the value in interest result[x][y] is set to 1 as shown in step 871, indicating a measure of confidence for the correlation results. If the decision in step 869 evaluates to "NO," then the value in interest result[x][y] is set to 0 as shown in step 870, indicating a measure of no confidence for the correlation results.

After setting the appropriate confidence value for the interest result array [x][y], the program proceeds to step 872 which directs the system to select the next reference point in the next column of the same row or the beginning of the next row if the current reference point is located at the last column of the row. Then the same interest calculations for the new reference point are performed. This portion of the interest operation ends at step 873.

8. Region 10

Figure 35A:
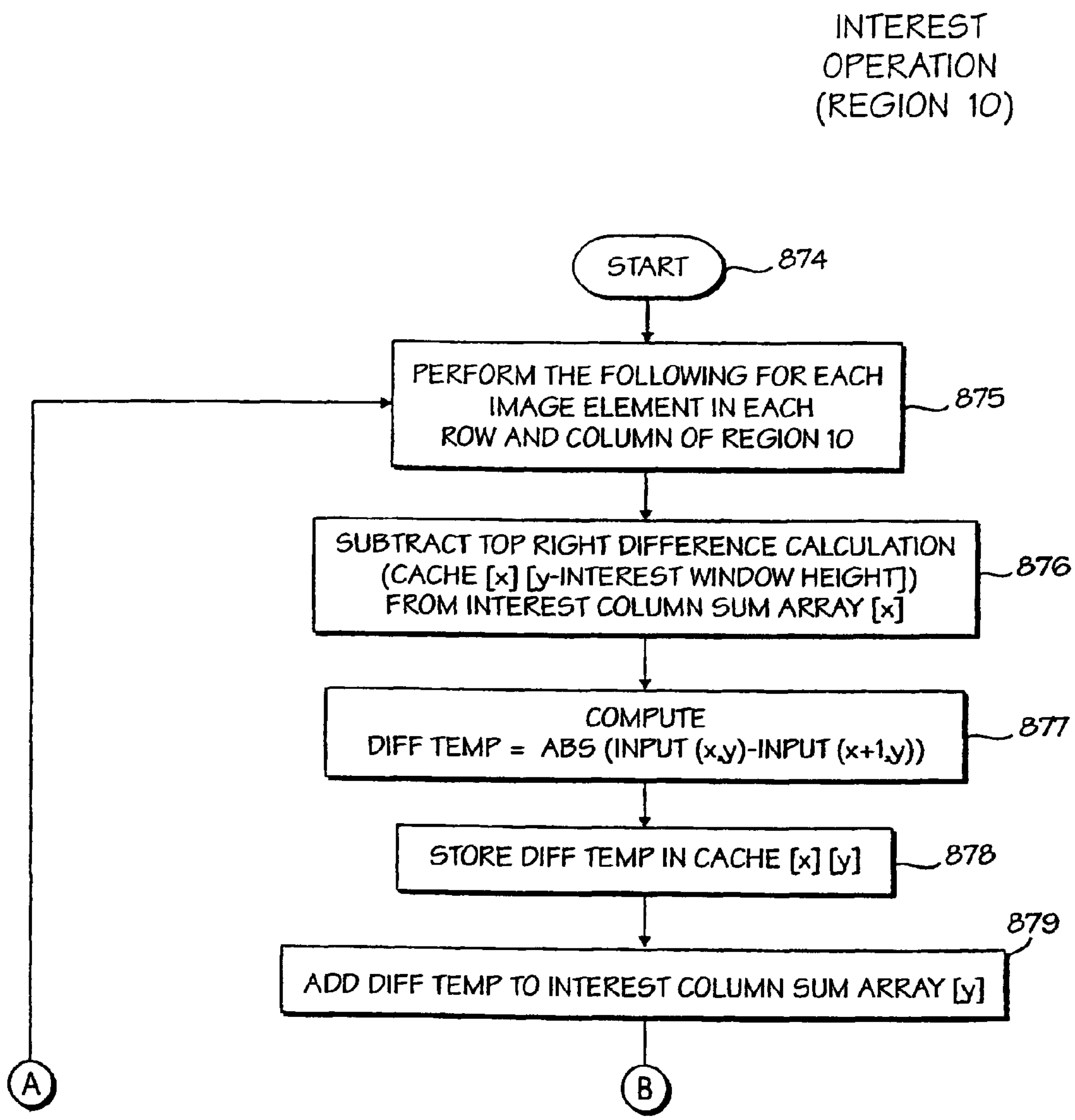
FIGS. 35(A)-(B) show a flow chart of one embodiment of the interest operation for region 10.
Figure 35B:
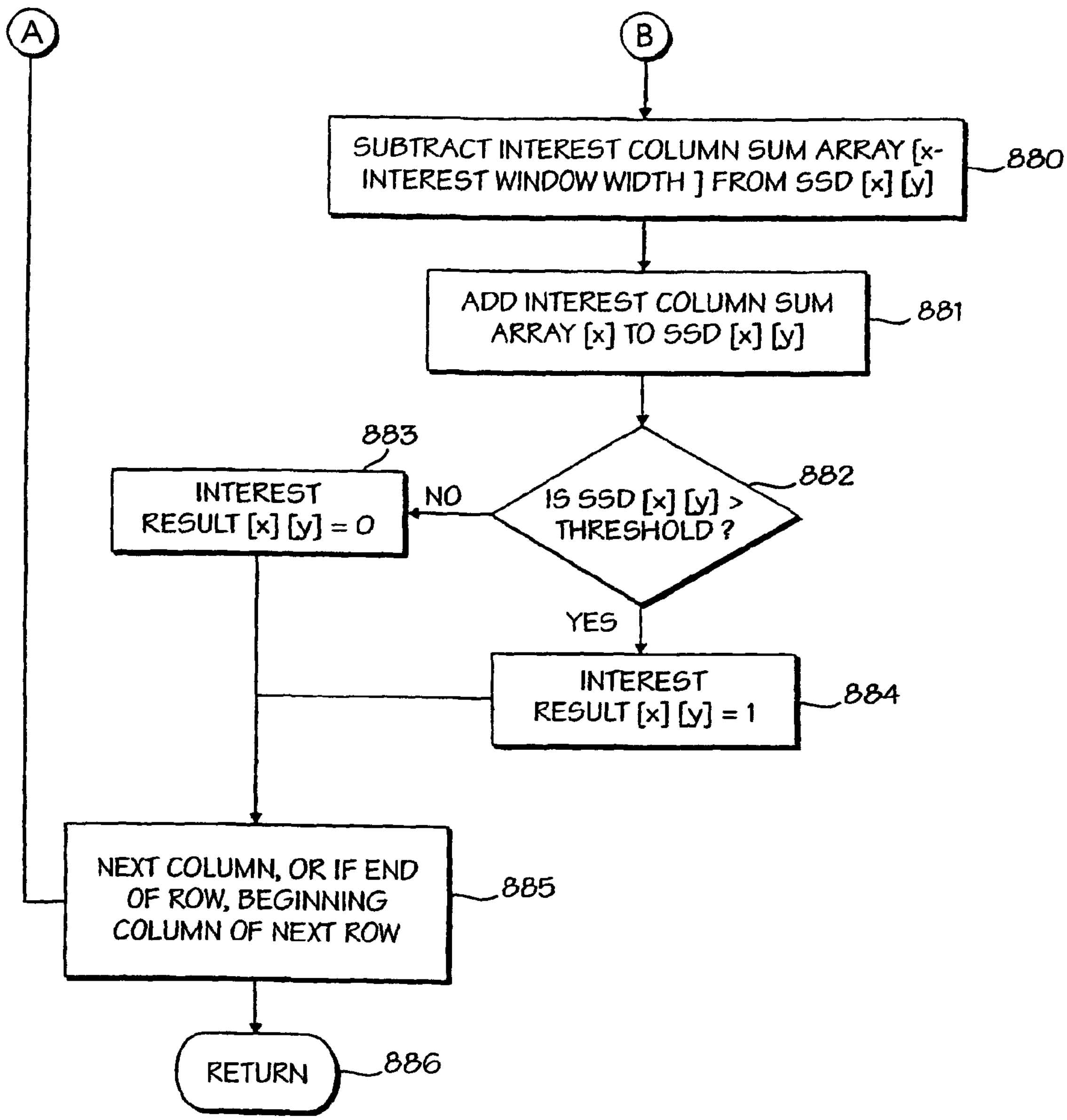

FIGS. 35(A)-(B) show a flow chart of one embodiment of the interest operation for region 10. The computations are similar to that of regions 6 and 9 except that now, the general case of the algorithm is invoked. Here, the computation includes: subtraction of the upper rightmost corner of one window above in the same column from the column sum, adding the current reference image element to the column sum, subtracting the column sum located a window width columns to the left from the window sum, and adding the current modified column sum to the modified window sum.

The program starts at step 874 in the desired image processing area. If the interest window, and more specifically, the reference image element in the interest window, is located in region 10, steps 875 and 885 require the following interest calculation to be executed for each row and column by proceeding column by column in the row and if the reference point of the interest window has reached the end of the row, the reference point moves to the beginning of the next row.

Step 876 subtracts the difference calculation for a single image element located in cache[x][y-interest window height] from the value in the interest column sum array[x]. The cache array is the SSD[x][y] array in one embodiment.

Step 877 computes the absolute value of the difference between the intensity value of the current reference image element (input(x,y)) and the intensity value of the adjacent image element (input(x+1,y)). Step 878 stores the value of diff temp in cache[x][y]. This cache may also be the sliding sum of differences (SSD) array[x][y].

Step 879 builds up the interest column sum buffer [x] with the contents of the previous interest column sum buffer plus the diff temp. The interest column sum buffer [x] now holds complete interest column sum results for each column defined by the reference image element in the column which is the bottom-most image element in the column.

Step 880 subtracts the column sum value in the interest column sum array [x-interest window width] from the current value in the SSD[x][y] array. That current value in the SSD [x][y] array is the window sum associated with image element located at (x−1,y). To make the interest window sum complete, the interest column sum [x] is added to SSD[x][y] as shown in step 881. In this region, the contents of SSD[x][y] now represent a complete interest window sum.

Step 882 decides whether the interest window sum value, which is now available for this region, is greater than a particular preprogrammed threshold. Note that the interest window sum represents the texture of the intensity image at that particular reference image point. The threshold level determines texture-based quality of the output and this output indicates to the image processing system the confidence measure of the correlation computations. If the decision in step 882 evaluates to "YES," then the value in interest result[x][y] is set to 1 as shown in step 884, indicating a measure of confidence for the correlation results. If the decision in step 882 evaluates to "NO," then the value in interest result[x][y] is set to 0 as shown in step 883, indicating a measure of no confidence for the correlation results.

After setting the appropriate confidence value for the interest result array [x][y], the program proceeds to step 885 which directs the system to select the next reference point in the next column of the same row or the beginning of the next row if the current reference point is located at the last column of the row. Then the same interest calculations for the new reference point are performed. This portion of the interest operation ends at step 886.

E. Data Packing

Figure 36:
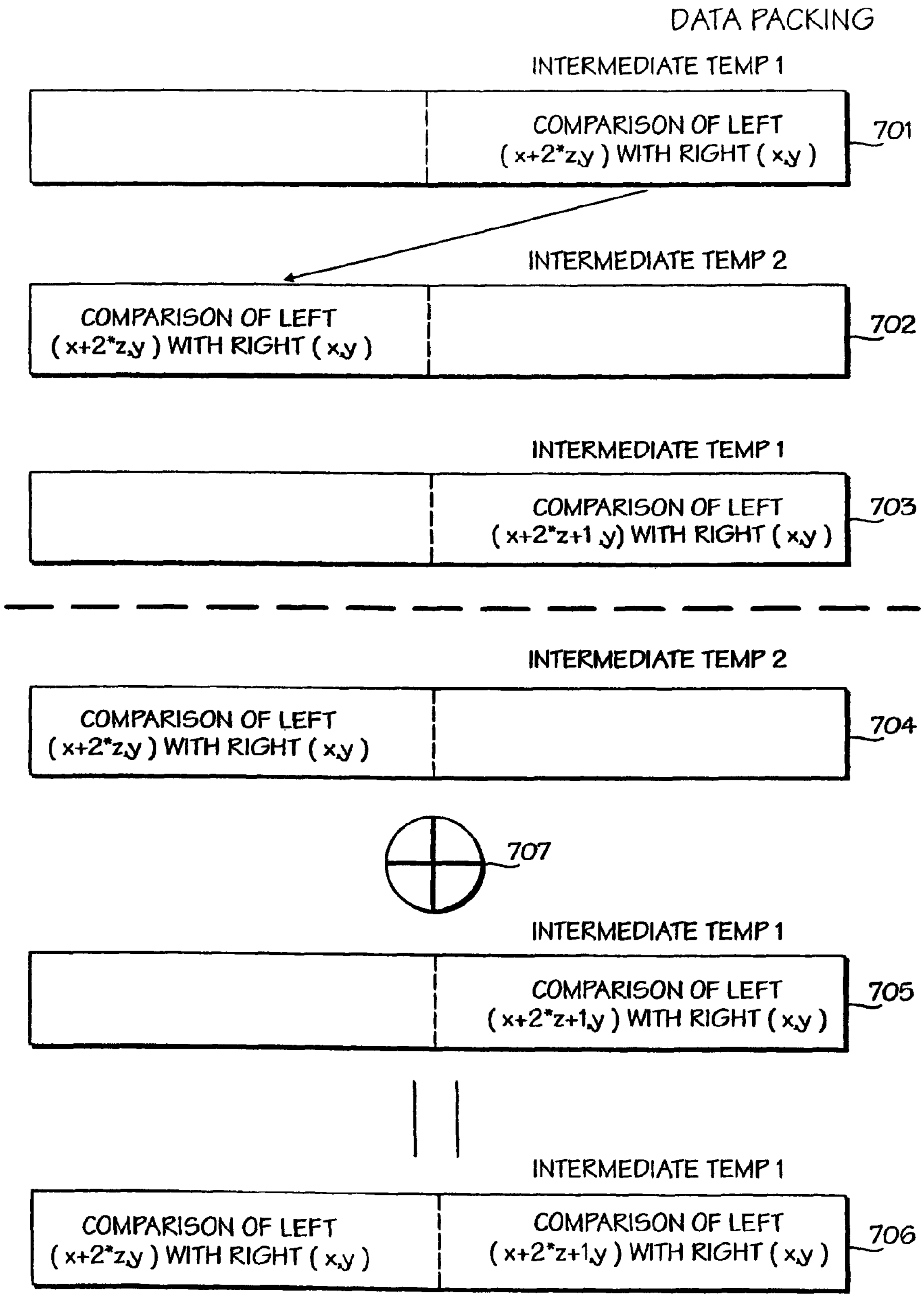
FIG. 36 illustrates the data packing concept as used in one embodiment of the correlation sum and disparity optimization functionality.

FIG. 36 illustrates the data packing concept as used in one embodiment of the correlation sum and disparity optimization operation. A variable called intermediate temp, which is 32 bits long in one embodiment, holds individual transform vector-to-transform vector Hamming distance values for two different disparities—16 bits in the MSB portion of the variable holds correlation sum values for disparity d1 and 16 bits in the LSB portion of the variable holds correlation sum values for disparity d2. Thus, for 16 disparities, 8 intermediate temp values will be used over the course of a z loop as discussed above with respect to FIGS. 21-27. Because a single intermediate temp variable is used in one embodiment of the present invention, each pair of disparity-based correlation sums will be computed substantially concurrently in one z loop. Intermediate temp is 32 bits long so that it can be added simply to the 32-bit column sum values without undue data manipulation.

In one embodiment, two intermediate temp variables called intermediate temp 1 and intermediate temp 2 are used to pack the data. The Hamming distance between two census vectors, left (x+2*z,y) and reference right (x,y), is computed and temporarily stored in the LSB half of intermediate temp 1 as represented in FIG. 36 as 701. This value is moved over to the MSB half of intermediate temp 2 as represented here as 702. The Hamming distance between two census vectors, left (x+2*z+1,y) and reference right (x,y), is computed and temporarily stored in the LSB half of intermediate temp 1 as represented here as 703. Thus, for z=0, the MSB half portion of intermediate temp 2 holds the Hamming distance between left (x,y) and reference right (x,y), while the LSB half portion of intermediate temp 1 holds the Hamming distance between left (x+1,y) and reference right (x,y). The z loop runs from 0 to (D/2−1), so that D=16 disparities yields z=0 to 7.

A logic OR operation as represented by 707 is performed between intermediate temp 1 (705) and intermediate temp 2 (704) and stored in intermediate temp 1 (706) As shown in item 706, intermediate temp 1 now contains the Hamming distance between the left (x+2*z,y) and reference right (x,y) in the MSB half of intermediate temp 1, and the Hamming distance between left (x+2*z+1,y) and reference right (x,y) in the LSB half of the same intermediate temp 1.

F. Left-Right Consistency Check

Figure 37A:
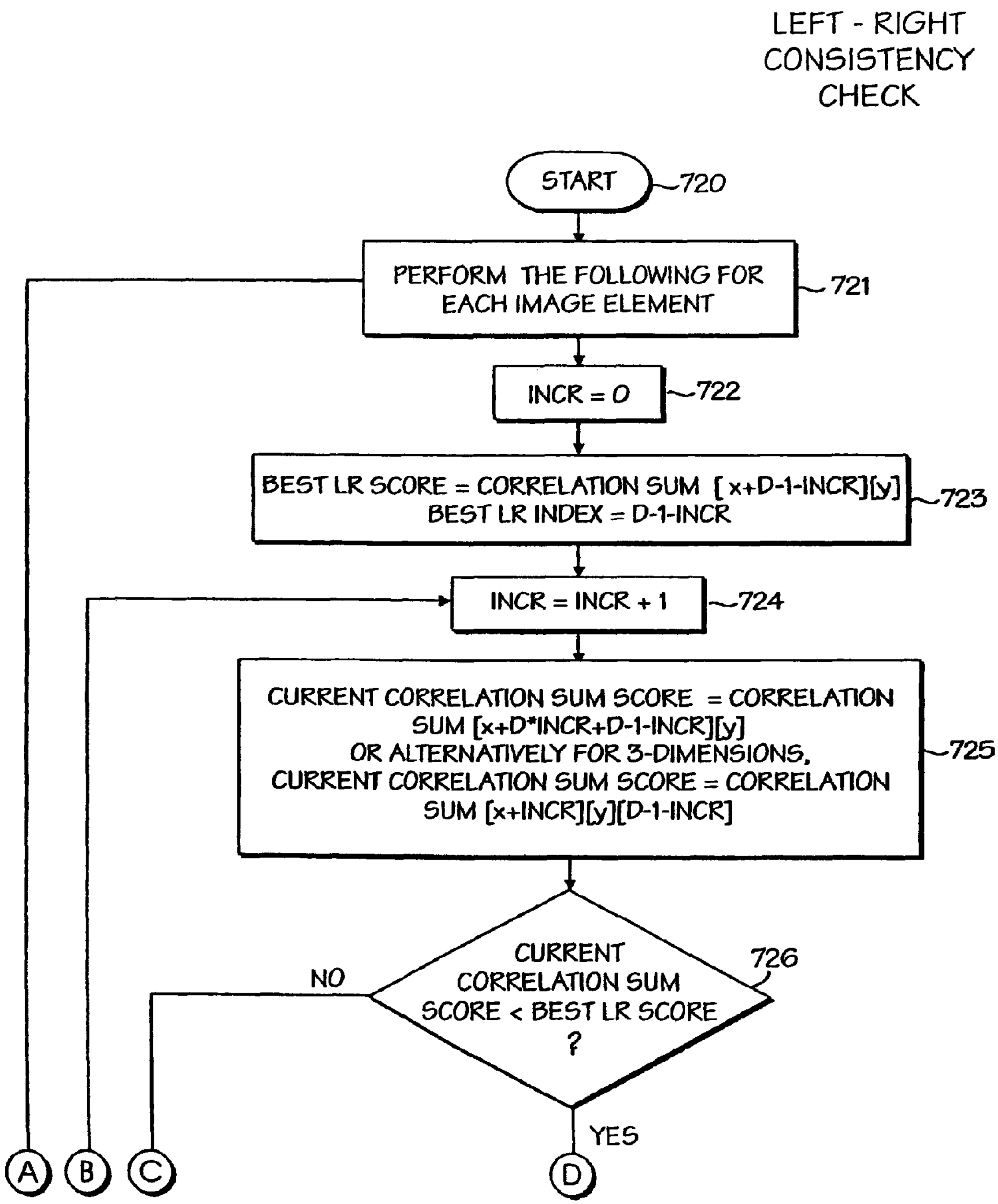
FIGS. 37(A)-(B) show a flow chart of one embodiment of the left-right consistency check.
Figure 37B:
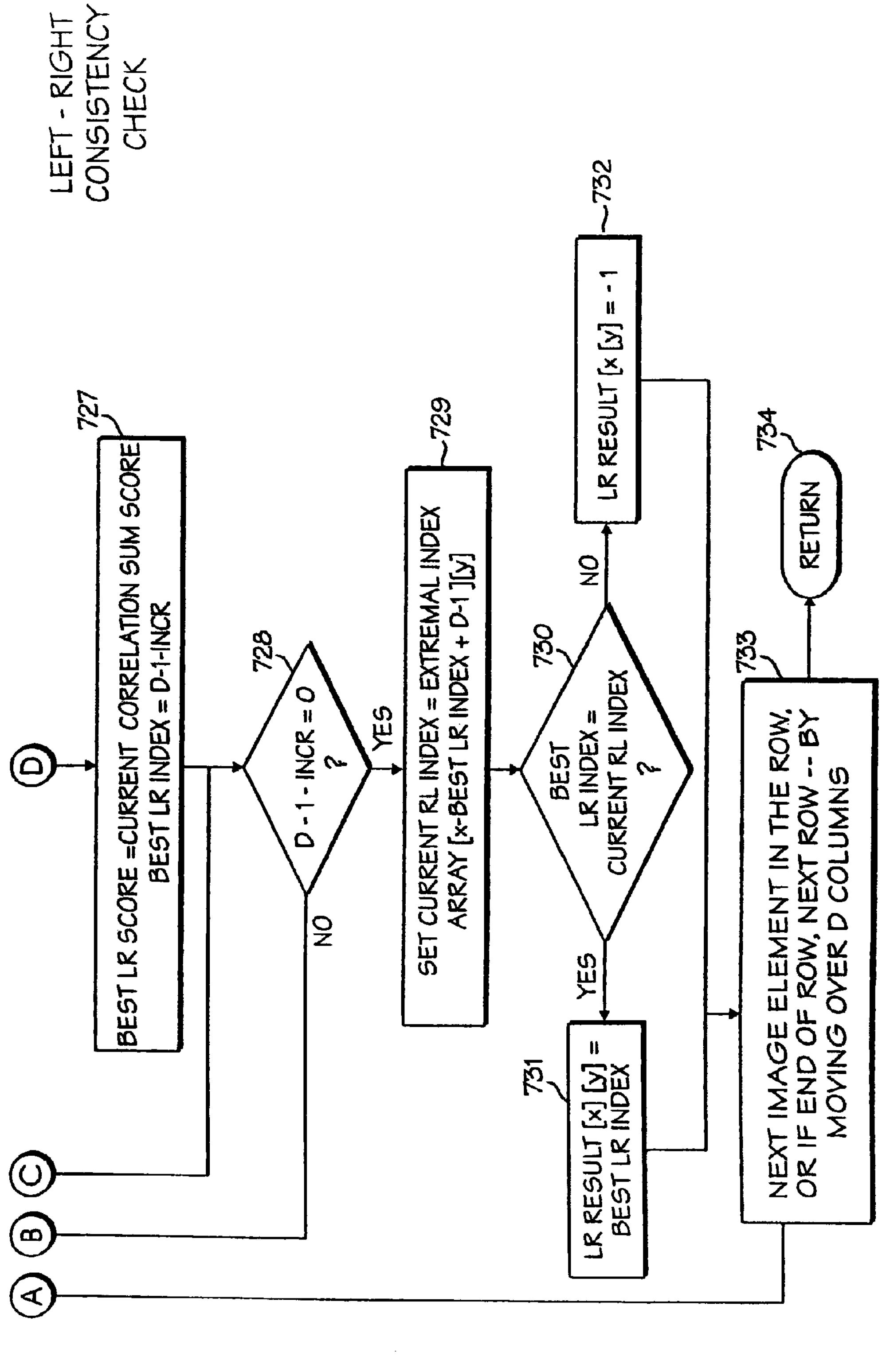

FIGS. 37(A)-(B) show a flow chart of one embodiment of the left-right consistency check. The program ultimately determines the best disparity value and the correlation sum associated with it, which are stored in BEST LR INDEX and BEST LR SCORE, respectively, for each "reference" left image element. The program starts at step 720.

Steps 721 and 733 require the following consistency check to be executed for each row and column by proceeding from one transform vector associated with an image element to another transform vector associated with another image element by D columns at a time in the row and if the reference image element of the has reached the end of the row, the reference image element moves to the beginning of the next row. Because of the data structure of the correlation sum buffer, moving one column at a time will generally result in moving from a correlation sum of one disparity to another correlation sum for another disparity within the same image element, or in some cases, moving from a correlation sum for disparity D−1 of one image element to the correlation sum for disparity 0 of the next adjacent image element. To move from one image element to another for a given disparity, the system starts off at the disparity 0 location and designate it as location [x][y]. It must then move D−1 columns to the right. If the current image element is the last image element in the row, then the system must move to the first image element of the next row. For each image element, the system must first move to disparity D−1 of each image element and obtain the correlation data therein for the initial calculation. Each next reference image element involves moving over D columns from the location of the previous image element.

Step 722 sets the incrementing variable INCR to 0. This value will be used to check for all disparities from D−1 to 0 until all correlation sum data for a given "reference" left image element has been checked.

Step 723 temporarily stores the optimal disparity number and the correlation sum value associated with that disparity number for future comparisons. Step 723 temporarily stores the correlation sum value found in the correlation sum buffer [x+D−1−INCR][y] into the variable BEST LR SCORE. For the first image element, D−1 is the initial shift to find the first left image element that has a complete set of correlation sums for each disparity. For 16 disparities, the first image element is located in correlation sum buffer[x+15][y], which is the correlation sum data for disparity 15 for the first image element of the right image. This disparity number, D−1−INCR, which is 15 at the moment, is stored in the variable BEST LR INDEX. Thus, the system is skewed or biased to keep the higher disparity numbers as the optimum disparity number in case of ties in the correlation value. Other embodiments may bias the system so that lower disparity numbers are favored in case of ties.

Step 724 increments the INCR variable by one, e.g., INCR=1. With this increment, the next lower disparity number can be examined.

Step 725 sets the variable CURRENT CORRELATION SUM SCORE to be the correlation sum value stored in correlation sum buffer [x+D*INCR+D−1−INCR][y]. Currently, this value is located in correlation sum buffer [x+30][y], which corresponds to the location holding the correlation sum data for the next adjacent image element for disparity 14. The term D*INCR allows the system to move over to the next image element or a plurality of image elements over to the right, while the term D−1-INCR selects the particular disparity under examination.

Step 726 decides if the BEST LR SCORE, which holds the correlation sum value for the data element that is at disparity 14 from the "reference" left image element, is less than the value in the variable BEST LR SCORE, which holds the correlation sum value for the image element at disparity 15 from the "reference" left image. If the decision evaluates to "NO," then system does not make any changes to the value in CURRENT CORRELATION SUM SCORE and BEST LR INDEX and proceeds to step 728 which checks if all disparities for the current "reference" left image element has been examined.

If the decision in step 726 evaluates to "YES," then the variables BEST LR INDEX and BEST LR SCORE are updated in step 727. The BEST LR INDEX is replaced by the current disparity number D−1-INCR and the BEST LR SCORE is replaced by the current lower correlation sum value stored in CURRENT CORRELATION SUM SCORE.

Step 728 checks if all disparities for the current "reference" left image element have been examined by deciding if D−1-INCR=0. If this expression resolves to 0, then the last disparity value and its associated correlation sum value have been examined for optimality and the program proceeds to step 729. If this expression does not resolve to 0, then the program proceeds to step 724, which increments INCR by 1. The loop defined by 724-725-726-727-728 continues until all disparities and their associated correlation sums for a given "reference" left image element have been examined.

If all disparities for a given "reference" left image element have been examined, step 728 evaluates to "YES" and step 729 sets the variable CURRENT RL INDEX with the disparity number determined to be optimal in the right-to-left analysis and currently stored in extremal index[x-BEST LR INDEX+D−1][y]. After all, the extremal index contains the optimal disparities for the image elements in the reference right image.

Step 730 decides if the BEST LR INDEX is equal to the CURRENT RL INDEX; that is, if the current "reference" left image element selected a disparity such that its best match is a particular right image, did that particular right image select the current "reference" left image element? If the step evaluates the decision as "NO," the left-right check result is inconsistent with the original right-left result and the LR RESULT [x][y] is set at −1 in step 732. This means that the data will be discarded in one embodiment. In other embodiments, the data is conditionally discarded depending on the mode filter and/or the interest operation results. If step 730 evaluates the decision as "YES," the left-right check result is consistent with the original right-left result and the LR RESULT [x][y] is set with the value in the variable BEST LR INDEX in step 731. Thus, for each "reference" left image element, the LR RESULT[x][y] contains data that reflects the consistency between the left-right and the right-left.

After the data storage steps 731 and 732 in LR RESULT [x][y], step 733 selects the next image element in the row to be processed. The next image element is located at D columns from the current location of the current image element. If the current image element is the last image element in the row, the next image element is the first image element in the next row. The program ends at step 734.

G. Mode Filter

1. All Regions

Figure 38A:
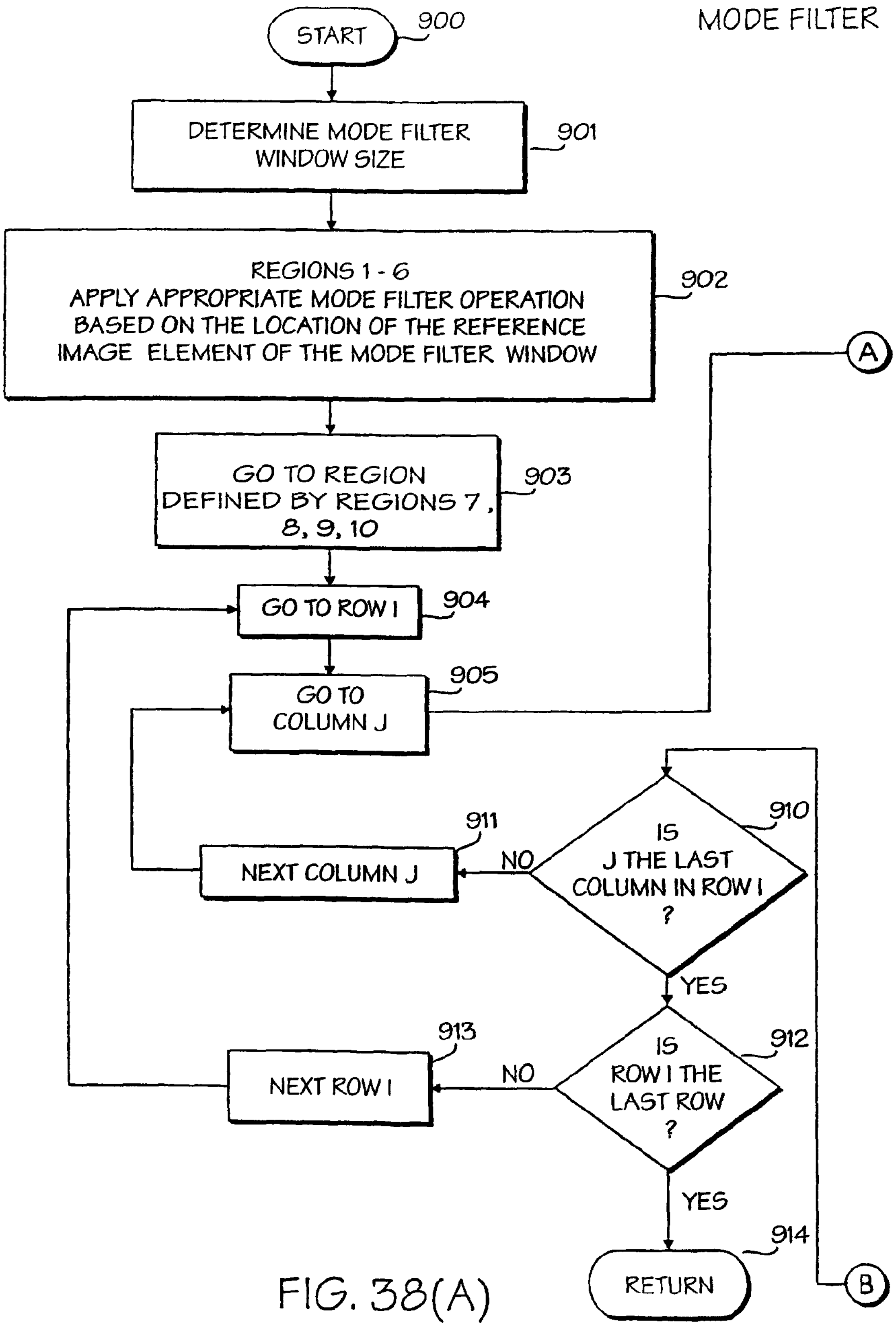
FIGS. 38(A)-(B) show a high level flow chart of one embodiment of the mode filter operation for regions 1-10.
Figure 38B:
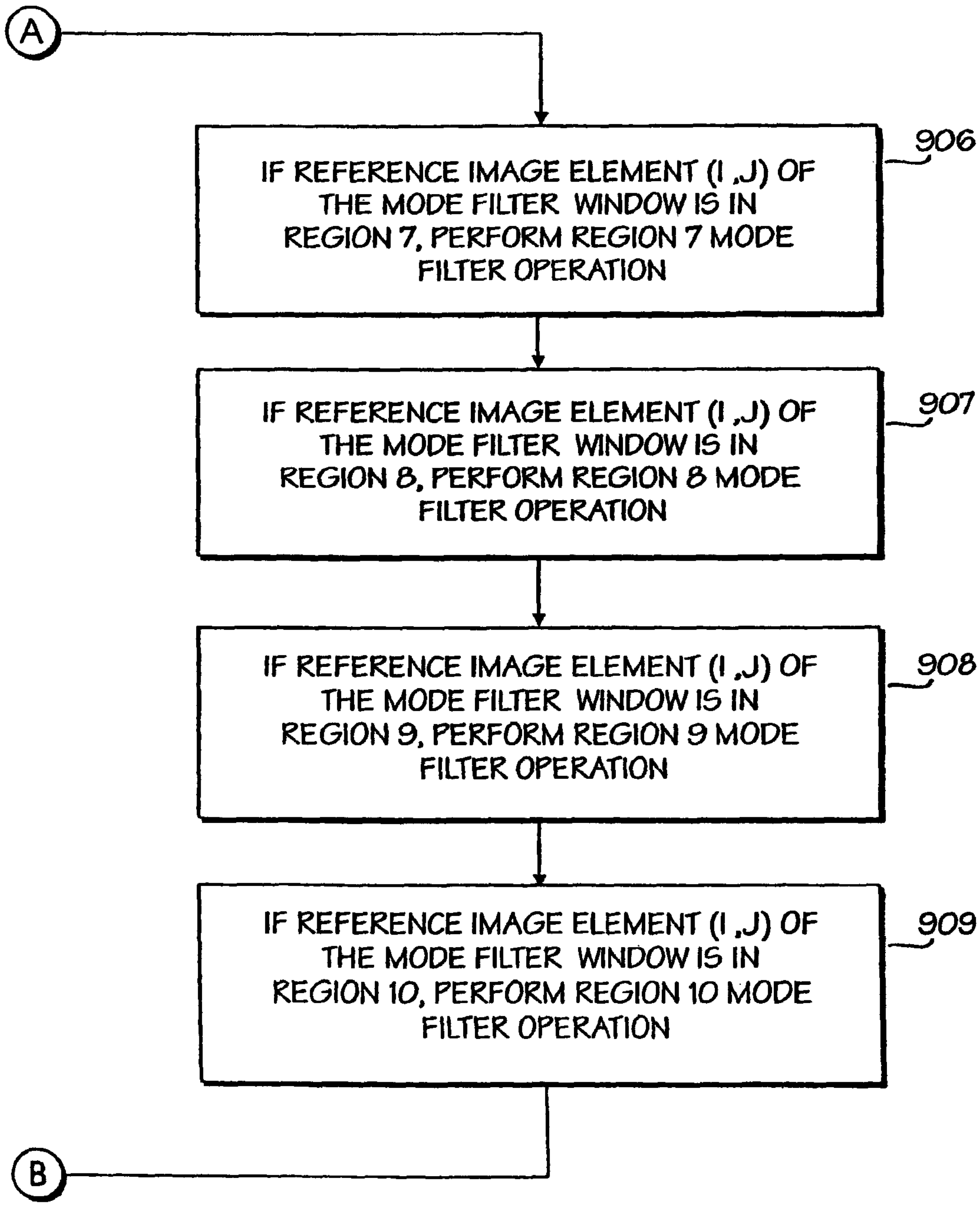

FIGS. 38(A)-(B) show a high level flow chart of one embodiment of the mode filter operation for regions 1-10. In general, the mode filter computation includes those elements previously described with respect to regions 1-10 of the correlation summation and disparity optimization operation: subtraction of the mode filter count of the upper rightmost corner of one mode filter window above in the same column from the column sum, adding the mode filter count calculation for the current reference image element to the column sum, subtracting the column sum located a window width columns to the left from the window sum, and adding the current modified column sum to the modified window sum.

At this point in the program, the extremal index is available. As shown in FIGS. 38(A)-(B), the program starts at step 900.

Step 901 determines the mode filter window size and the location of the reference point in the window. In one embodiment, the mode filter window is 7×7 and the reference point is located at the lower rightmost corner of the window.

Because of the existence of the nine (9) edge conditions and one general case, the computations execute differently. Regions 1-9 represent edge conditions while region 10 represents the general case. As discussed above for FIGS. 11(A)-11(J), mode filter sums for the entire window are calculated for those regions where a complete window can fit in the desired image processing area; that is, image data is found in every portion of the mode filter window. Thus, entire window sums are calculated for regions 5, 6, 9, and 10. The bulk of the processing will be take place in region 10. The location of the reference image element of the window with respect to the ten regions dictates how and what computations are accomplished. Step 902 applies to regions 1-6 where the mode filter operation is executed. These regions set up the column sum buffer, individual disparity count, and mode filter window sums. When the mode filter computations are completed, step 903 requires the program to proceed to regions 7-10.

The computations are performed for each image element in the reference right image column by column within a row, and at the end of the row, the program proceeds to the first column in the next row in the desired image processing area. This is reflected by steps 904, 905, 910, 912, 911, and 913. The less frequently occurring row loop defined by steps 904, 912, and 913 is the outer loop, whereas the more frequently occurring column loop defined by steps 905, 910, and 911 is the inner loop. As the program proceeds column by column within a row, the window passes through regions 7, 8, 9, and 10, in that order. When the program reaches the next row and proceeds to the end of the row, regions 7, 8, 9, and 10 are traversed by the window again as shown by FIGS. 11(G)-11(J).

Initially, the program proceeds to region 7 at row I and column J as shown by steps 904 and 905. If the window is in region 7, as it should at the beginning of the row, the region 7 mode filter operation is performed as required by step 906. If the window is in region 8, the region 8 mode filter operation is performed as required by step 907. If the window is in region 9, the region 9 mode filter operation is performed as required by step 908. If the window is in region 10, the region 10 mode filter operation is performed as required by step 909.

Before proceeding, step 910 determines if the current reference image element at row I and column J is at the last column of row I. If this decision evaluates to "NO," the program proceeds to the next column J (steps 911 and 905) and performs one of the steps 906, 907, 908, or 909 depending on the location of the window. If the decision for step 910 evaluates to "YES," step 912 determines if this row is the last row in the desired image processing area. If not, steps 913 and 904 require the window to proceed to the next row I and the first column J in that row (the column and row numbers are reset after reaching the last column and row, respectively). If the decision in step 912 evaluates to "YES," the mode filter program ends at step 914.

2. Regions 1 and 2

Figure 39A:
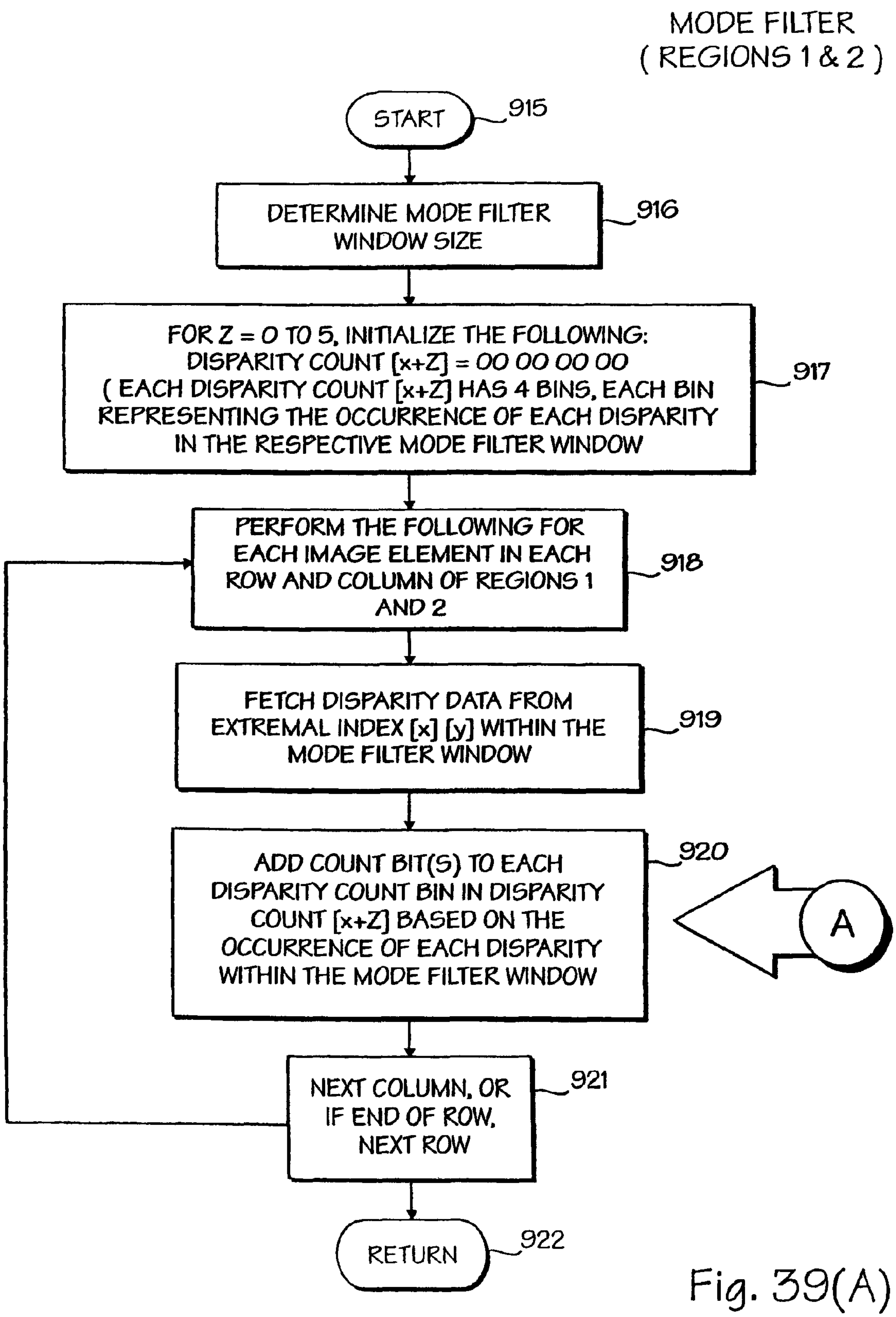
FIGS. 39(A)-(B) show a flow chart of one embodiment of the mode filter for regions 1 and 2.
Figure 39B:
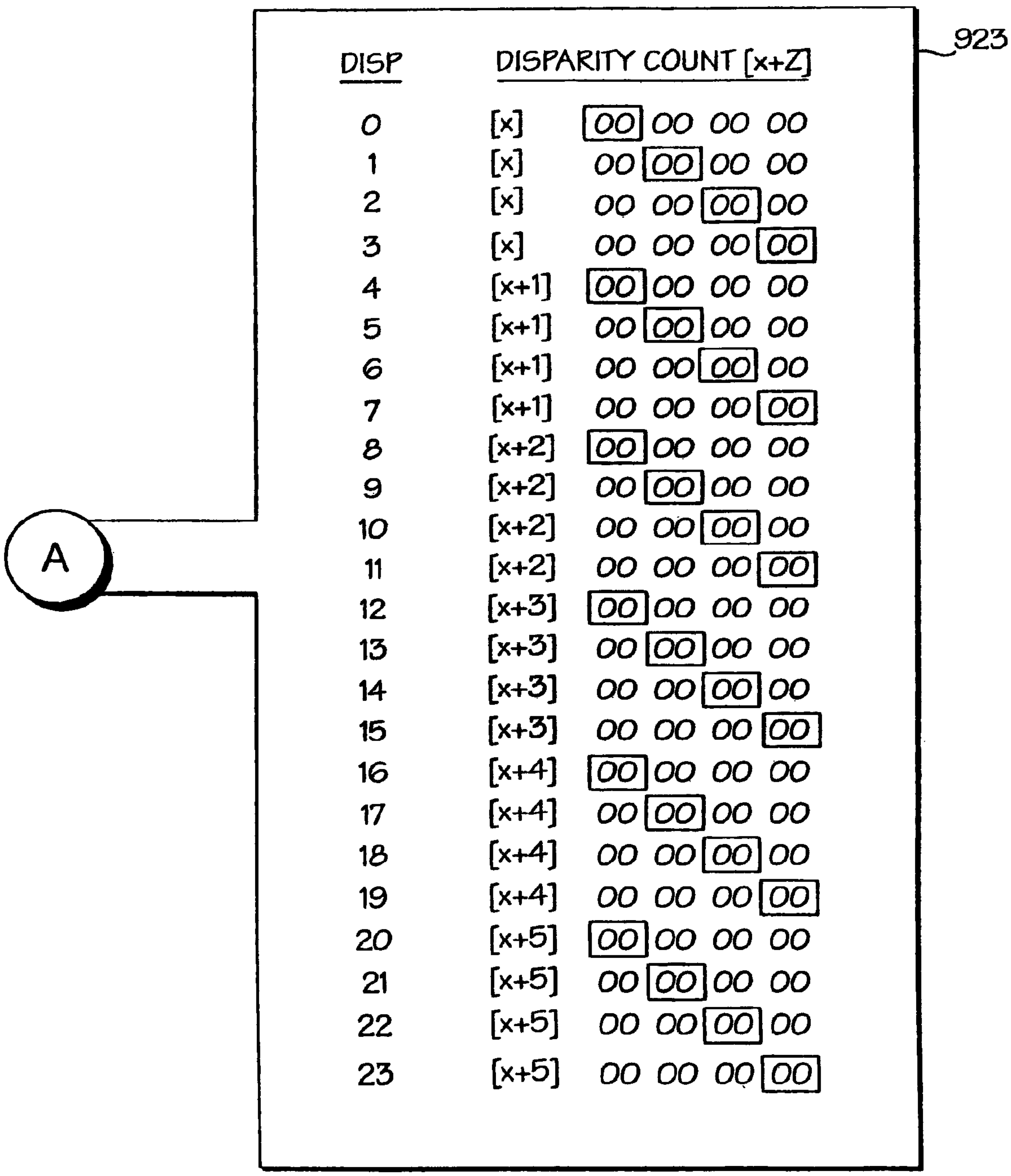

FIGS. 39(A)-(B) show a flow chart of one embodiment of the mode filter for regions 1 and 2. In region 1, the column sums are initialized. In region 2, the column sums are built up. However, in both regions, a full column sum or window sum are not available yet. The program starts at step 915.

Step 916 determines the mode filter window size and the location of the reference point in the window. In one embodiment, the window size is 7×7 (width of the 7 image elements by height of 7 image elements) and the location of the reference image element is lower right corner of the window. Because the mode filter window "moves" across the extremal index array established in the correlation sum and disparity optimization portion of the invention, each image element contains a disparity value (i.e., d=0, 1, 2, . . . , or D−1). This disparity value represents the optimum disparity selected by the image processing system of the present invention as representing the best match or correspondence between the reference right image and the disparity-shifted left image. The determination or selection of the mode filter size and reference point location in the window can be done in the main body of the program (MAIN) without a subprogram call to this mode filter operation.

Step 917 initializes the disparity count [x+Z] variables. The "Z" that is used herein within the context of the mode filter is distinguished from the "z" used in the correlation summation and disparity optimization scheme described above with respect to FIGS. 21-27 to describe the processing of correlation data for a pair of disparities. In one embodiment, disparity count [x+Z] is 32 bits long and can be conceptualized as having 4 "bins," where each bin is a byte long. The use of this structure is analogous to the data packed structure of the column sum array and intermediate temp variable of the correlation sum and disparity optimization scheme of the present invention. The concept of the disparity count [x+Z] array is somewhat similar to the single line column sum array buffer. Indeed, other embodiments do not use the structure of the disparity count [x+Z] array to count the disparities in the column.

Disparity count [x+Z] runs from Z=0 to 5, so this array represents 6 variables, where each variable disparity count [x+Z] for a particular value of Z contains 4 bins. A total of 24 bins are available. Each bin represents a single disparity value. The image processing system of the present invention counts the occurrence of each disparity by adding a bit to the bin associated with that occurring disparity. In one embodiment of the present invention, 16 disparities are used (D=16). Thus, not all 24 bins will be used; rather, only 16 bins will be used to count disparity occurrences. The table below facilitates the understanding of disparity count [x+Z] for each value of Z and these bins:

| DISP | DISPARITY COUNT[x + Z] | |
|---|---|---|
| 0 | [x] | 00 00 00 00 |
| 1 | [x] | 00 00 00 00 |
| 2 | [x] | 00 00 00 00 |
| 3 | [x] | 00 00 00 00 |
| 4 | [x + 1] | 00 00 00 00 |
| 5 | [x + 1] | 00 00 00 00 |
| 6 | [x + 1] | 00 00 00 00 |
| 7 | [x + 1] | 00 00 00 00 |
| 8 | [x + 2] | 00 00 00 00 |
| 9 | [x + 2] | 00 00 00 00 |
| 10 | [x + 2] | 00 00 00 00 |
| 11 | [x + 2] | 00 00 00 00 |
| 12 | [x + 3] | 00 00 00 00 |
| 13 | [x + 3] | 00 00 00 00 |
| 14 | [x + 3] | 00 00 00 00 |
| 15 | [x + 3] | 00 00 00 00 |
| 16 | [x + 4] | 00 00 00 00 |
| 17 | [x + 4] | 00 00 00 00 |
| 18 | [x + 4] | 00 00 00 00 |
| 19 | [x + 4] | 00 00 00 00 |
| 20 | [x + 5] | 00 00 00 00 |
| 21 | [x + 5] | 00 00 00 00 |
| 22 | [x + 5] | 00 00 00 00 |
| 23 | [x + 5] | 00 00 00 00 |

As shown in the table, the following represents the six variables of disparity count [x+Z]: disparity count [x], disparity count [x+1], disparity count [x+2], disparity count [x+3], disparity count [x+4], and disparity count [x+5]. Each variable disparity count [x+Z] is 4 bytes long and each byte represents a bin. The "00" symbol is in hexadecimal notation so that in bits, it is actually 8 bits long—0000 0000. Accordingly, each bin or byte position can hold the worst case maximum number of disparity counts without affecting the adjacent bins or byte positions (i.e., no carries).

The underline represents the particular bin or byte position that holds the disparity counts. Thus, for variable disparity count [x+3], disparity 13 counts are stored in the second MSB byte. So, if a given disparity, say disparity 7, occurs 3 times within a window column, the value 3 is stored in the LSB byte of disparity count [x+1]. If disparity 14 occurred 10 times within a window column 10 times, disparity count [x+3] would hold the value A (hexadecimal for the base ten numeral 10) in the second LSB byte.

If the mode filter window, and more specifically, the reference image element in the mode filter window, is located in region 1 or 2, steps 918 and 921 require the following mode filter calculation to be executed for each row and column by proceeding column by column in the row and if the reference point of the mode filter window has reached the end of the row, the reference point moves to the beginning of the next row.

Step 919 fetches the disparity data from the extremal index array[x][y] within the mode filter window. Step 920 adds count bit(s) to each disparity count bin in disparity count [x+Z], which is essentially a column sum, based on the occurrence of each disparity in the mode filter window. The count bit(s) represent the number of times that a particular disparity appears in the extremal index array within the mode filter window. These count bits are placed in the appropriate disparity count [x+Z] bin as shown in box 923.

The program proceeds to step 921 which directs the system to select the next reference point in the next column of the same row or the beginning of the next row if the current reference point is located at the last column of the row. Then the same mode filter calculations for the new reference point are performed. This portion of the mode filter operation ends at step 922.

3. Regions 3 and 4

Figure 40A:
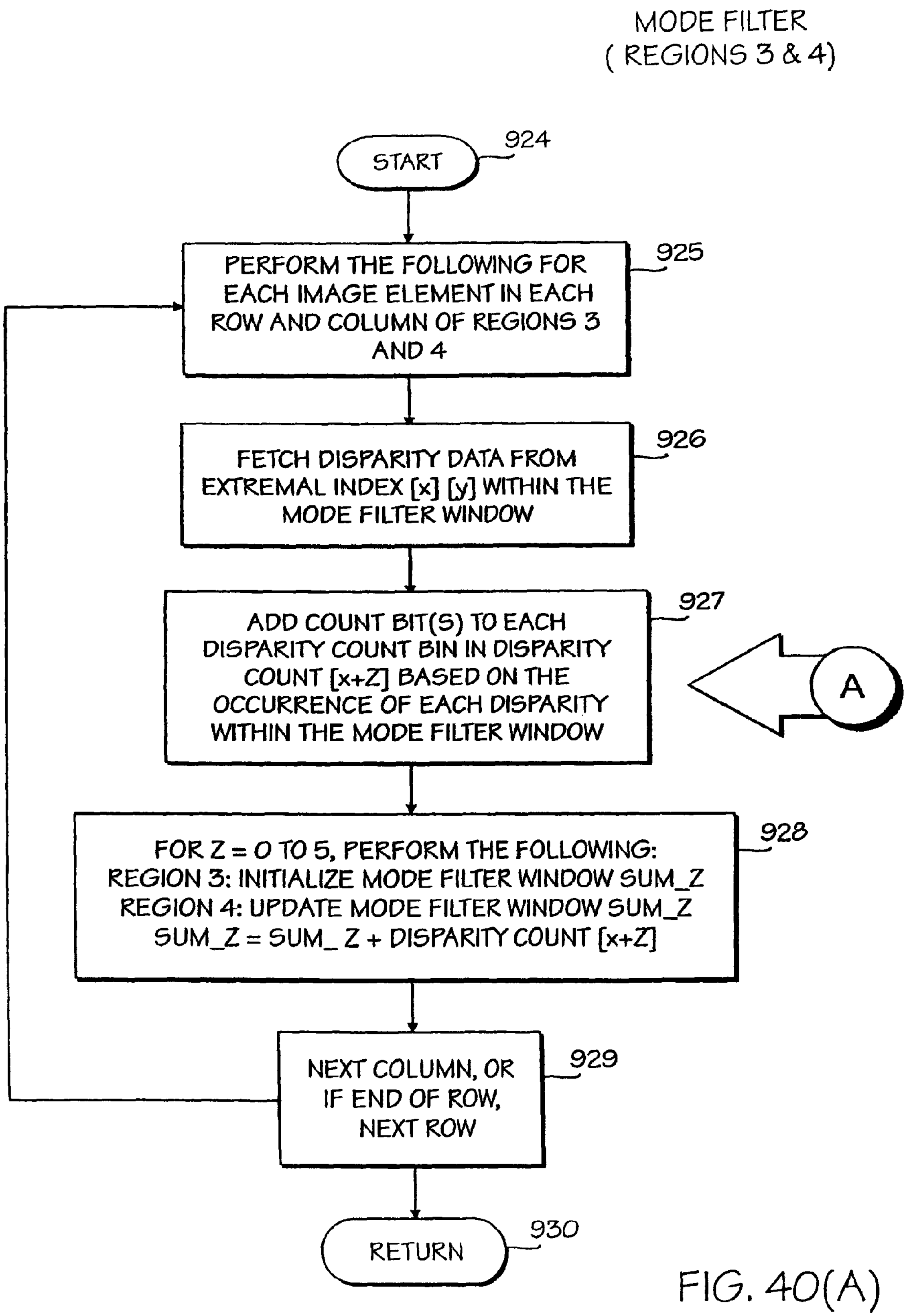
FIGS. 40(A)-(B) show a flow chart of one embodiment of the mode filter for regions 3 and 4.
Figure 40B:
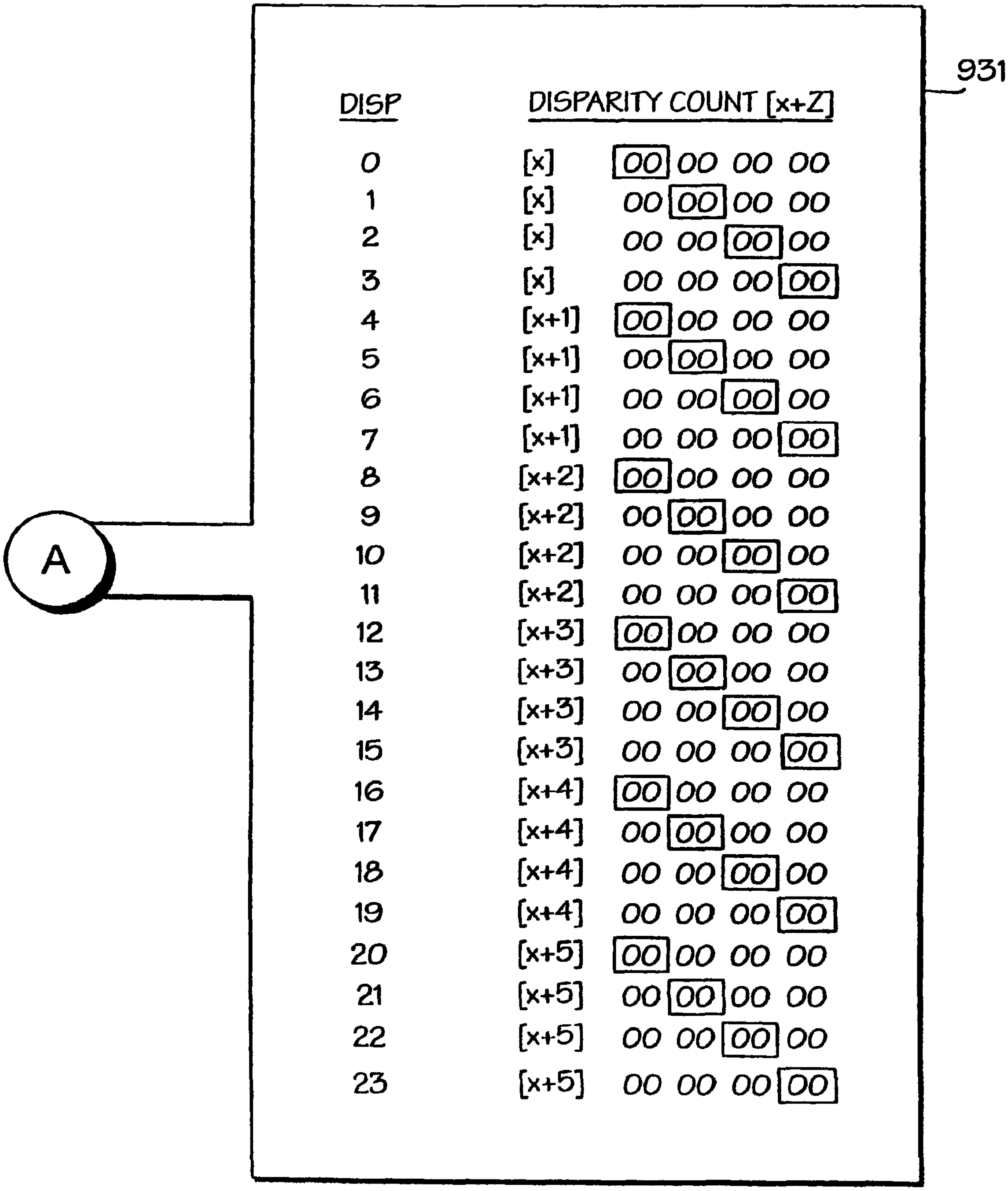
Figure 41A:
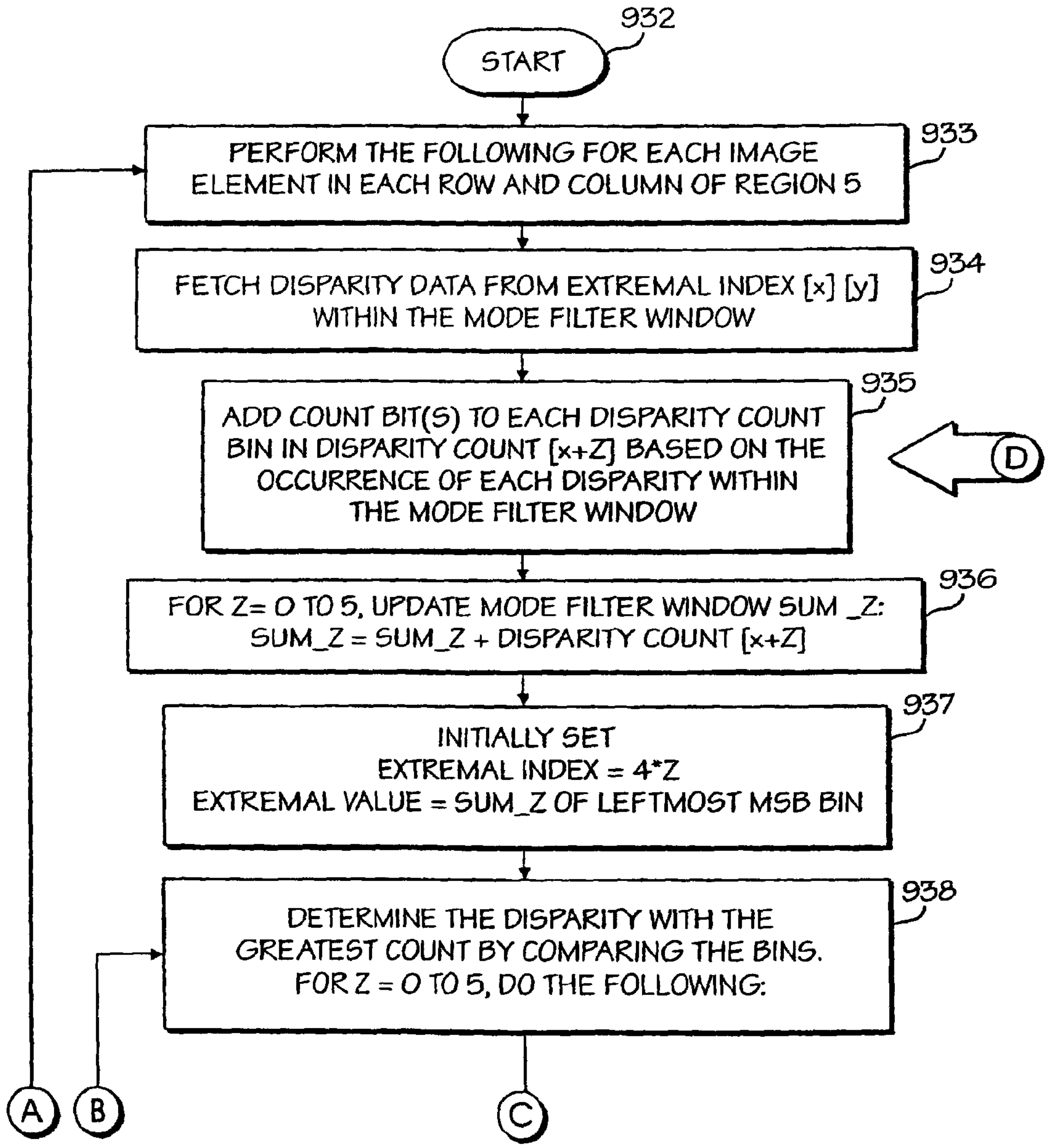
Figure 41C:
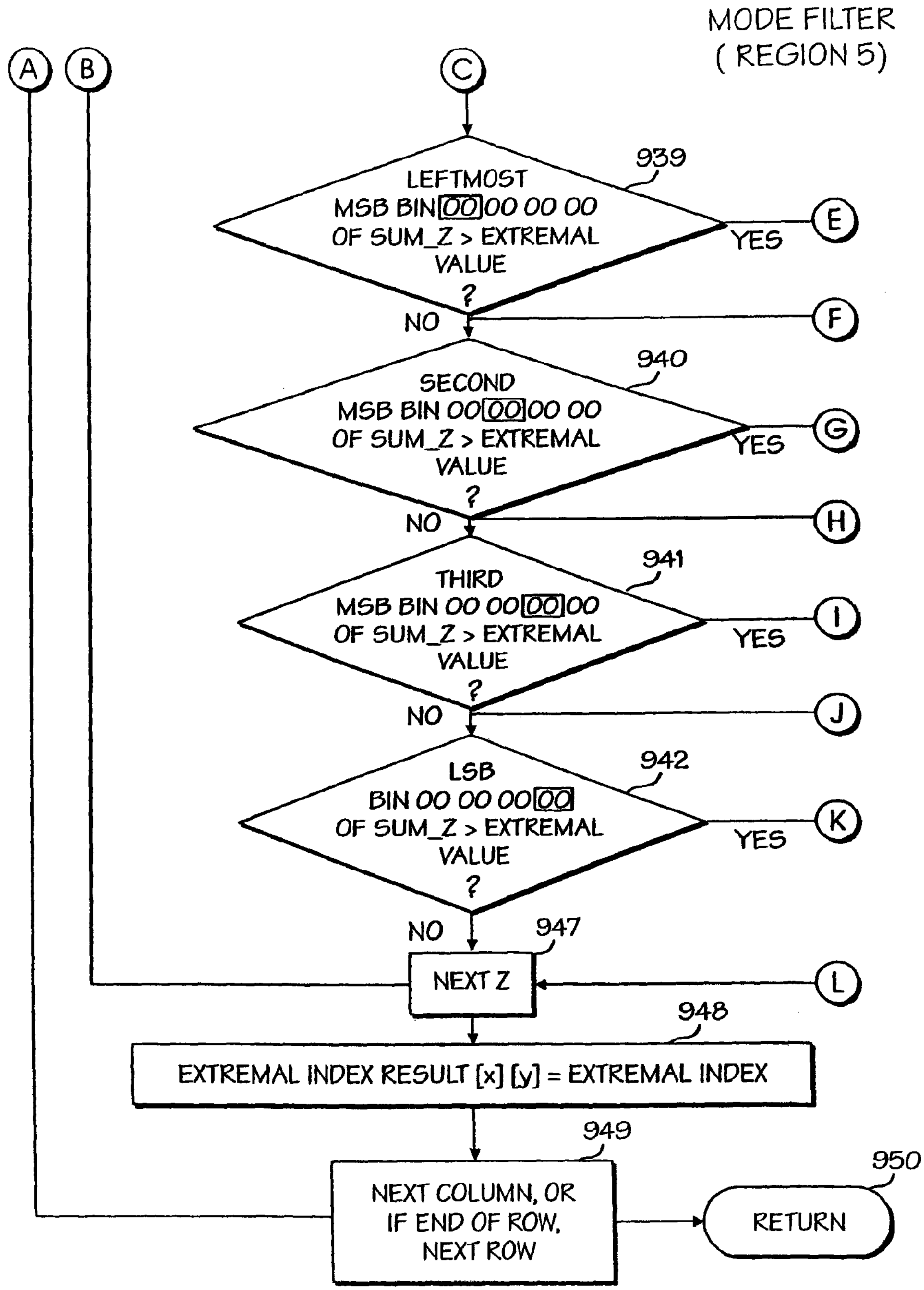
Figure 41D:
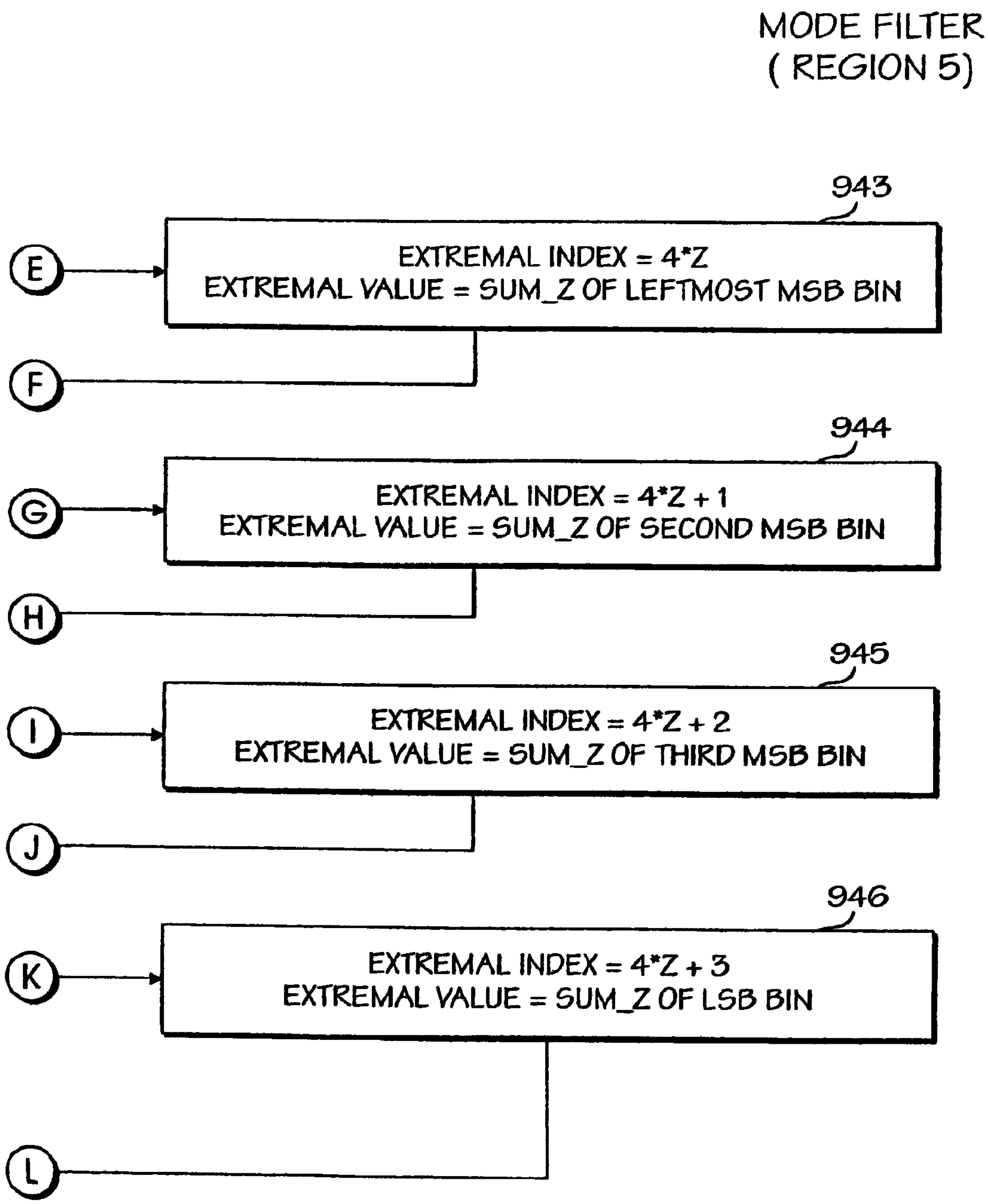
Figure 42A:
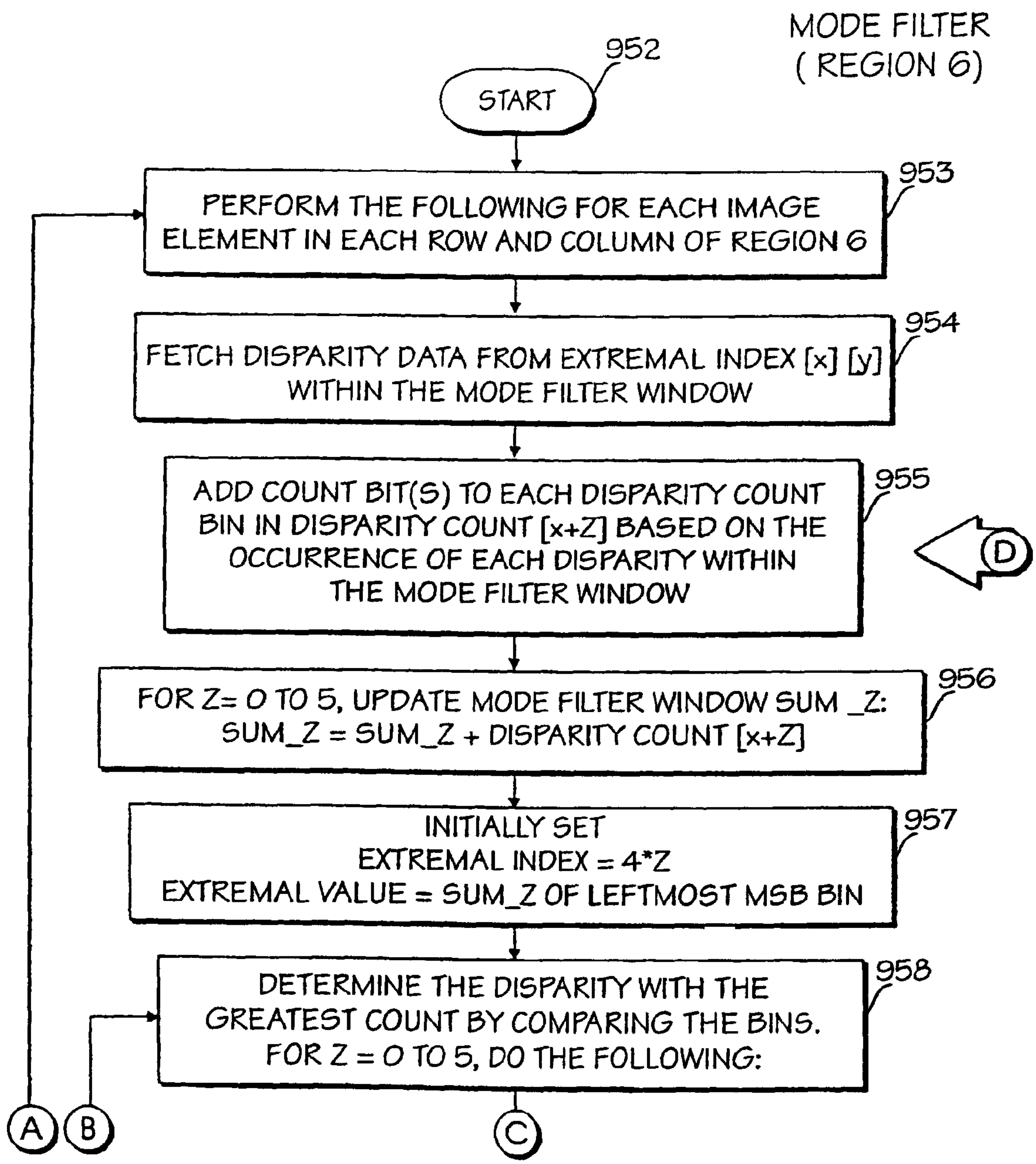
FIGS. 42(A)-(D) show a flow chart of one embodiment of the mode filter for region 6.
Figure 42B:
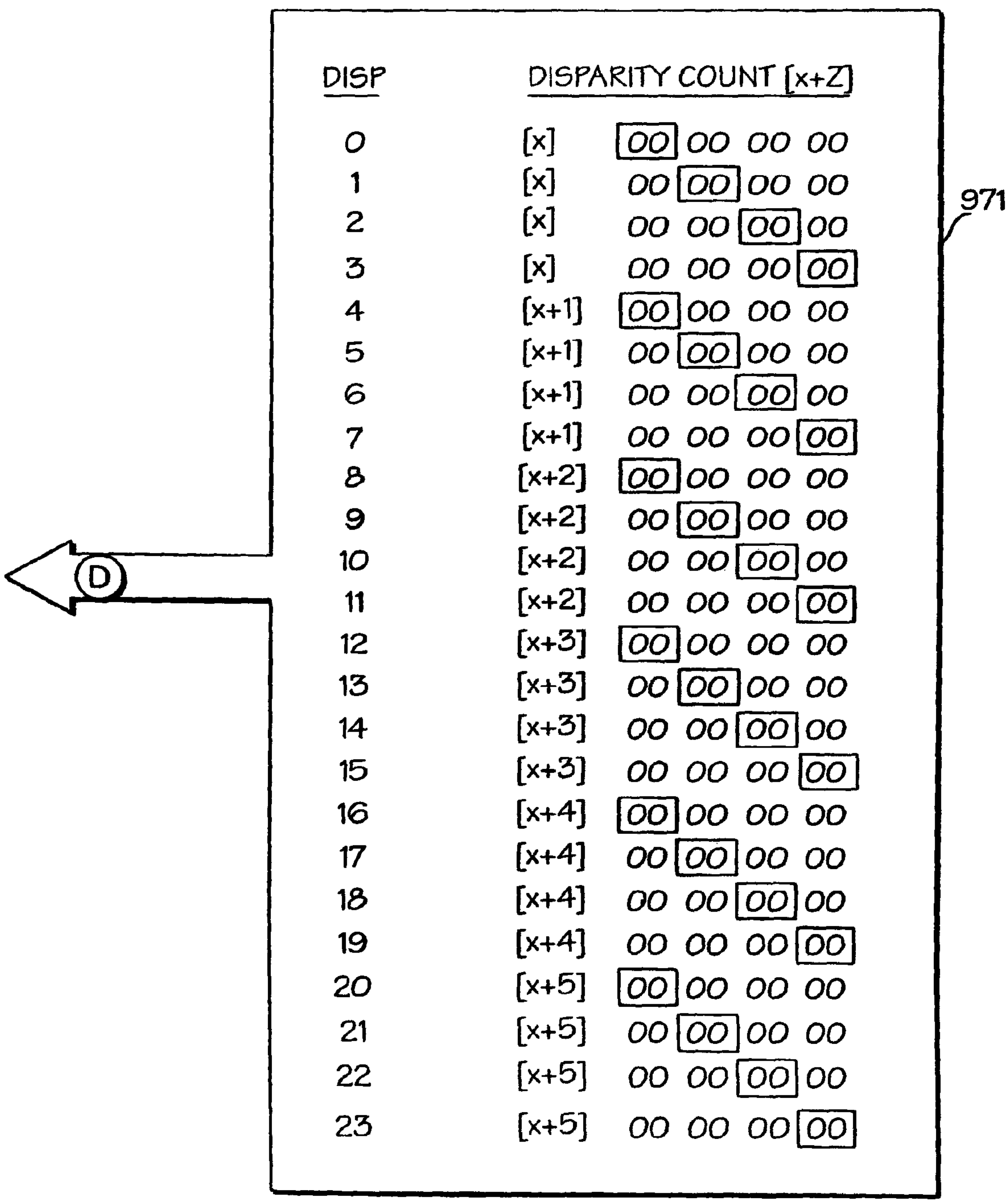
Figure 42C:
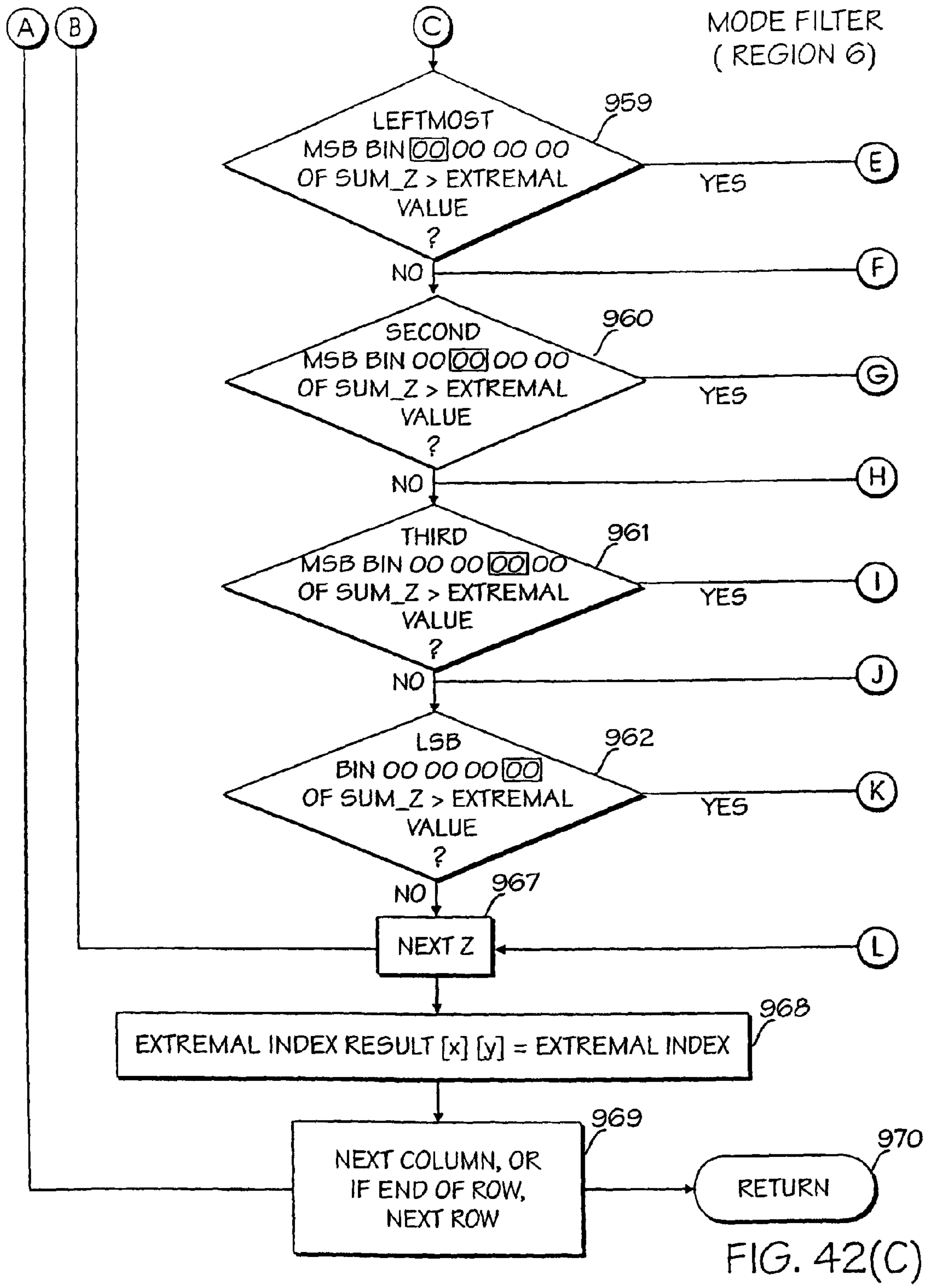
Figure 42D:
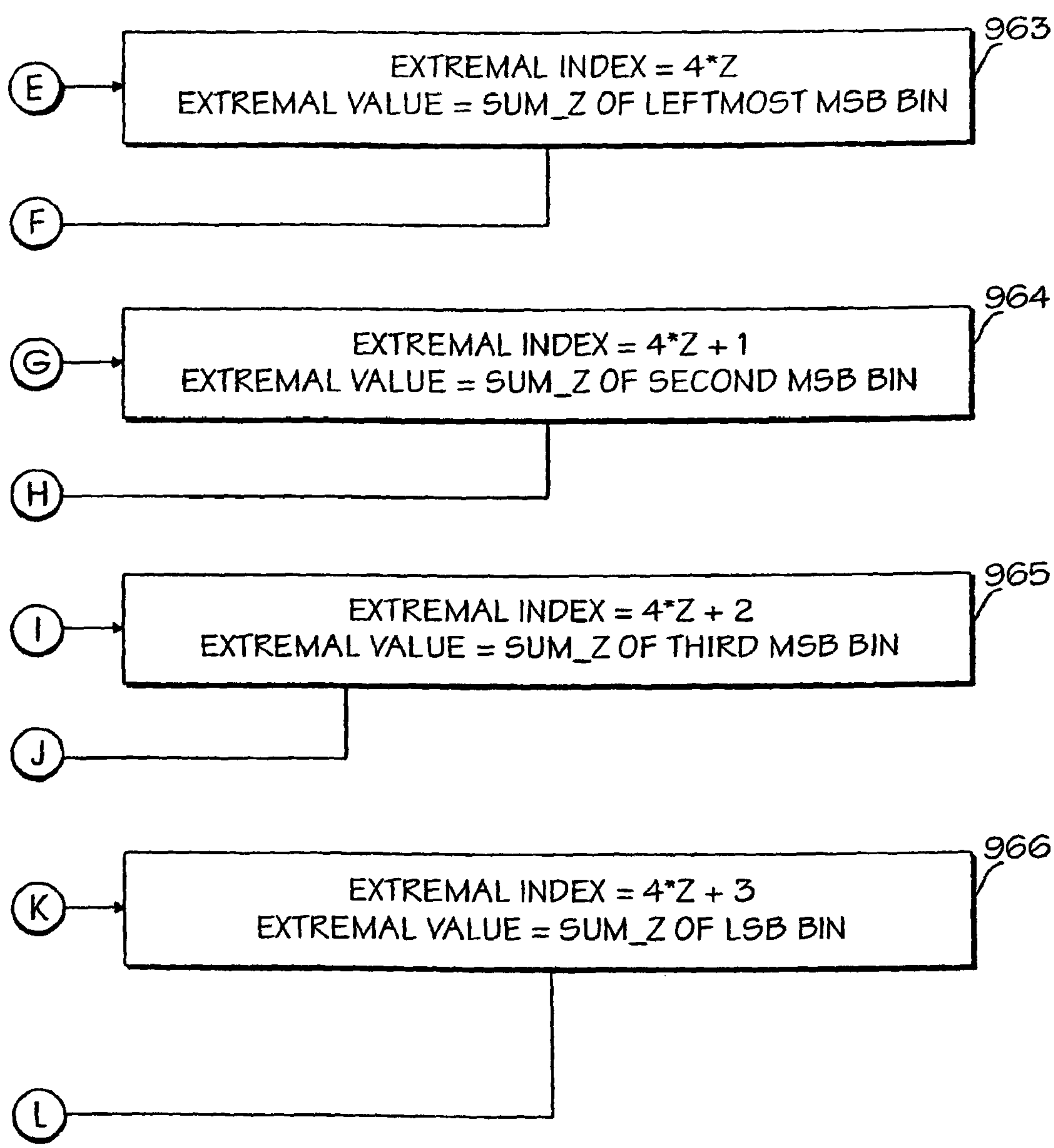

FIGS. 40(A)-(B) show a flow chart of one embodiment of the mode filter for regions 3 and 4. In region 3, a complete column sum is available and thus, a mode filter window sum_Z is initialized. In region 4, the mode filter window sum_Z is built up. However, in both regions, a full mode filter window sum_Z is not available yet. The program starts at step 924.

If the mode filter window, and more specifically, the reference image element in the mode filter window, is located in region 3 or 4, steps 925 and 929 require the following mode filter calculations to be executed for each row and column by proceeding column by column in the row and if the reference point of the mode filter window has reached the end of the row, the reference point moves to the beginning of the next row.

Step 926 fetches the disparity data from the extremal index array[x][y] within the mode filter window. Step 927 adds count bit(s) to each disparity count bin in disparity count [x+Z], which is essentially a column sum, based on the occurrence of each disparity in the mode filter window. The count bit(s) represent the number of times that a particular disparity appears in the extremal index array within the mode filter window. These count bits are placed in the appropriate disparity count [x+Z] bin as shown in box 931.

Just as the mode filter uses 6 variables disparity count [x+Z] to count the occurrence(s) of 4 disparities each for a total of 24 possible disparities, the window sums are calculated by using 4 window sum variables—mode filter window sum_Z (for Z=0 to 5). Each mode filter window sum_Z holds the window sums for 4 disparities. Thus, window sum_0 holds the window sum occurrences for disparities 0-3; window sum_1 holds the window sum occurrences for disparities 4-7; window sum_2 holds the window sum occurrences for disparities 8-11; window sum_3 holds the window sum occurrences for disparities 12-15; window sum_4 holds the window sum occurrences for disparities 16-19; and window sum_5 holds the window sum occurrences for disparities 20-23.

An inner Z loop (to be distinguished from the "z" loop used in the correlation summation and disparity optimization scheme described above with respect to FIGS. 21-27 to describe the processing of correlation data for a pair of disparities) is performed in step 928. For each Z from 0 to 5, region 3 initializes the mode filter window sum_Z variable and region 4 updates the mode filter window sum_Z by adding the column sum which is disparity count [x+Z] to the current values of mode filter window sum_Z.

The program proceeds to step 929 which directs the system to select the next reference point in the next column of the same row or the beginning of the next row if the current reference point is located at the last column of the row. Then the same mode filter calculations for the new reference point are performed. This portion of the mode filter operation ends at step 930.

4. Region 5

FIGS. 41(A)-(D) show a flow chart of one embodiment of the mode filter for region 5. In region 5, a complete window sum is available because the window just fits the upper left corner of the desired image processing area. Accordingly, the disparity consistency can be determined in this region. The program starts at step 932.

If the mode filter window, and more specifically, the reference image element in the mode filter window, is located in region 5, steps 933 and 949 require the following mode filter calculations to be executed for each row and column by proceeding column by column in the row and if the reference point of the mode filter window has reached the end of the row, the reference point moves to the beginning of the next row.

Step 934 fetches the disparity data from the extremal index array[x][y] within the mode filter window. Step 935 adds count bit(s) to each disparity count bin in disparity count [x+Z], which is essentially a column sum, based on the occurrence of each disparity in the mode filter window. The count bit(s) represent the number of times that a particular disparity appears in the extremal index array within the mode filter window. These count bits are placed in the appropriate disparity count [x+Z] bin as shown in box 951.

An inner Z loop (to be distinguished from the "z" loop used in the correlation summation and disparity optimization scheme described above with respect to FIGS. 21-27 to describe the processing of correlation data for a pair of disparities) is performed in step 936. For each Z from 0 to 5, region 5 updates the mode filter window sum_Z by adding the column sum which is disparity count [x+Z] to the current values of mode filter window sum_Z. At this point, a complete window sum of all disparities represented in the window is available.

Step 937 initially sets the extremal index at 0, where 4*Z=0 for Z=0, and the extremal value to the window sum_Z of the leftmost MSB bin. This skews or biases the disparity with the greatest count toward disparity 0 and the count value to the number of occurrences of disparity 0 in the window. Thus, ties are skewed toward the lower disparity number. Other embodiments skew ties to higher disparity numbers.

A second inner Z loop defined by steps 938 and 947 is used to determine the greatest disparity count. The greatest disparity count is determined by comparing the individual count values in the 24 bins (in other cases, only 16 bins are compared because only 16 disparities are used) within the window. The worst case count is 49 occurrences (hex notation=31) of a single disparity for a 7×7 window. For Z=0 to 5, steps 939 to 946 are performed. For a given Z, steps 939 to 942 determine if the various bins of sum_Z is greater than the extremal value. If so, then the extremal index is replaced by the extremal index of the greater count disparity value, and the extremal value is replaced by the sum_Z of the appropriate bin. Thus, the extremal index is represented by the disparity with the greatest count and the extremal value is represented by the count(s) or quantity of the greatest occurring disparity number (the number of times that the particular disparity appears in the window).

In step 939, if the leftmost MSB bin of sum_Z is greater than the extremal value, then step 943 requires the extremal index to be replaced by 4*Z. The extremal value is also replaced by the leftmost MSB bin of sum_Z. The program then proceeds to step 940 to make the next comparison with the newly updated extremal index and extremal value. If step 939 evaluates to "NO," then the current extremal index and extremal value is not updated and will be used for the next comparison at step 940.

In step 940, if the second leftmost MSB bin of sum_Z is greater than the extremal value, then step 944 requires the extremal index to be replaced by 4*Z+1. The extremal value is also replaced by the second leftmost MSB bin of sum_Z. The program then proceeds to step 941 to make the next comparison with the newly updated extremal index and extremal value. If step 940 evaluates to "NO," then the current extremal index and extremal value is not updated and will be used for the next comparison at step 941.

In step 941, if the third leftmost MSB bin of sum_Z is greater than the extremal value, then step 945 requires the extremal index to be replaced by 4*Z+2. The extremal value is also replaced by the third leftmost MSB bin of sum_Z. The program then proceeds to step 942 to make the next comparison with the newly updated extremal index and extremal value. If step 941 evaluates to "NO," then the current extremal index and extremal value is not updated and will be used for the next comparison at step 942.

In step 942, if the LSB bin of sum_Z is greater than the extremal value, then step 946 requires the extremal index to be replaced by 4*Z+3. The extremal value is also replaced by the LSB bin of sum_Z. The program then proceeds to step 947 to increment Z and make the next comparison with the newly updated extremal index and extremal value. If step 942 evaluates to "NO," then the current extremal index and extremal value is not updated and will be used for the next comparison after Z is incremented at step 947.

This second Z loop that makes the comparison with the extremal value and updates the extremal index and extremal value if the comparison yields a greater sum_Z value than the current extremal value continues to loop for all Z values (0 to 5). The end result is an extremal index which holds the particular disparity number (i.e., d=0, 1, 2, . . . , or D−1) that has the greatest count among all other optimal disparities found in the window, and an extremal value that holds the actual count itself. After all sum_Z values have been compared for all Z, an extremal index result array [x][y] stores the extremal index in the corresponding position as shown in step 948.

The program proceeds to step 949 which directs the system to select the next reference point in the next column of the same row or the beginning of the next row if the current reference point is located at the last column of the row. Then the same mode filter calculations for the new reference point are performed. This portion of the mode filter operation ends at step 950.

5. Region 6

FIGS. 42(A)-(D) show a flow chart of one embodiment of the mode filter for region 6. In region 6, the computations are similar to that of region 5 except that now, the column sum located mode filter window width columns to the left can be subtracted from the interest window sum. A complete window sum is also available. Accordingly, the disparity consistency can be determined in this region. The program starts at step 952.

If the mode filter window, and more specifically, the reference image element in the mode filter window, is located in region 6, steps 953 and 969 require the following mode filter calculations to be executed for each row and column by proceeding column by column in the row and if the reference point of the mode filter window has reached the end of the row, the reference point moves to the beginning of the next row.

Step 954 fetches the disparity data from the extremal index array[x][y] within the mode filter window. Step 955 adds count bit(s) to each disparity count bin in disparity count [x+Z], which is essentially a column sum, based on the occurrence of each disparity in the mode filter window. The count bit(s) represent the number of times that a particular disparity appears in the extremal index array within the mode filter window. These count bits are placed in the appropriate disparity count [x+Z] bin as shown in box 971.

An inner Z loop (to be distinguished from the "z" loop used in the correlation summation and disparity optimization scheme described above with respect to FIGS. 21-27 to describe the processing of correlation data for a pair of disparities) is performed in step 956. For each Z from 0 to 5, region 6 updates the mode filter window sum_Z. First, the column sum located a window width to the left of the current reference point is subtracted from the current window sum.

Thus, the value in disparity count [x+Z-mode filter window width] is subtracted from sum_Z. Second, the current column sum which is disparity count [x+Z] is added to the current values of mode filter window sum_Z. At this point, a complete window sum of all disparities represented in the window is available.

Step 957 initially sets the extremal index at 0, where 4*Z=0 for Z=0, and the extremal value to the window sum_Z of the leftmost MSB bin. This skews or biases the disparity with the greatest count toward disparity 0 and the count value to the number of occurrences of disparity 0 in the window. Thus, ties are skewed toward the lower disparity number. Other embodiments skew ties to higher disparity numbers.

A second inner Z loop defined by steps 958 and 967 is used to determine the greatest disparity count. The greatest disparity count is determined by comparing the individual count values in the 24 bins (in other cases, only 16 bins are compared because only 16 disparities are used) within the window. For Z=0 to 5, steps 959 to 966 are performed. For a given Z, steps 959 to 962 determine if the various bins of sum_Z is greater than the extremal value and the consequences that follow from either decision as described with respect to mode filter calculations of region 5.

In step 959, if the leftmost MSB bin of sum_Z is greater than the extremal value, then step 963 requires the extremal index to be replaced by 4*Z. The extremal value is also replaced by the leftmost MSB bin of sum_Z. The program then proceeds to step 960 to make the next comparison with the newly updated extremal index and extremal value. If step 959 evaluates to “NO,” then the current extremal index and extremal value is not updated and will be used for the next comparison at step 960.

In step 960, if the second leftmost MSB bin of sum_Z is greater than the extremal value, then step 964 requires the extremal index to be replaced by 4*Z+1. The extremal value is also replaced by the second leftmost MSB bin of sum_Z. The program then proceeds to step 961 to make the next comparison with the newly updated extremal index and extremal value. If step 960 evaluates to “NO,” then the current extremal index and extremal value is not updated and will be used for the next comparison at step 961.

In step 961, if the third leftmost MSB bin of sum_Z is greater than the extremal value, then step 965 requires the extremal index to be replaced by 4*Z+2. The extremal value is also replaced by the third leftmost MSB bin of sum_Z. The program then proceeds to step 962 to make the next comparison with the newly updated extremal index and extremal value. If step 961 evaluates to “NO,” then the current extremal index and extremal value is not updated and will be used for the next comparison at step 962.

In step 962, if the LSB bin of sum_Z is greater than the extremal value, then step 966 requires the extremal index to be replaced by 4*Z+3. The extremal value is also replaced by the LSB bin of sum_Z. The program then proceeds to step 967 to increment Z and make the next comparison with the newly updated extremal index and extremal value. If step 962 evaluates to “NO,” then the current extremal index and extremal value is not updated and will be used for the next comparison after Z is incremented at step 967.

This second Z loop that makes the comparison with the extremal value and updates the extremal index and extremal value if the comparison yields a greater sum_Z value than the current extremal value continues to loop for all Z values (0 to 5). The end result is an extremal index which holds the particular disparity number (i.e., d=0, 1, 2, . . . , or D−1) that has the greatest count among all other optimal disparities found in the window, and an extremal value that holds the actual count itself. After all sum_Z values have been compared for all Z, an extremal index result array [x][y] stores the extremal index in the corresponding position as shown in step 968.

The program proceeds to step 969 which directs the system to select the next reference point in the next column of the same row or the beginning of the next row if the current reference point is located at the last column of the row. Then the same mode filter calculations for the new reference point are performed. This portion of the mode filter operation ends at step 970.

6. Regions 7 and 8

Figure 43A:
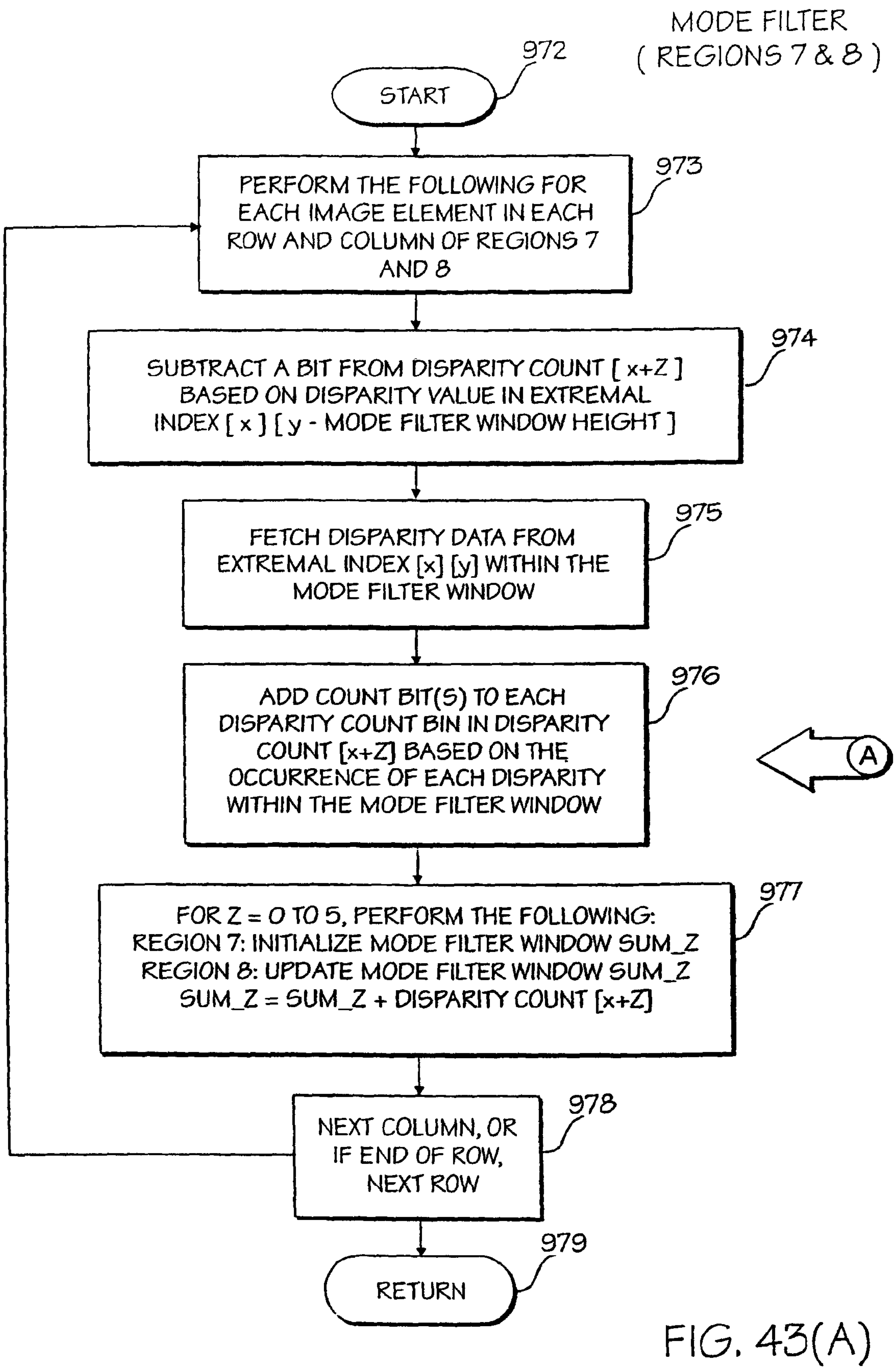
Figure 44A:
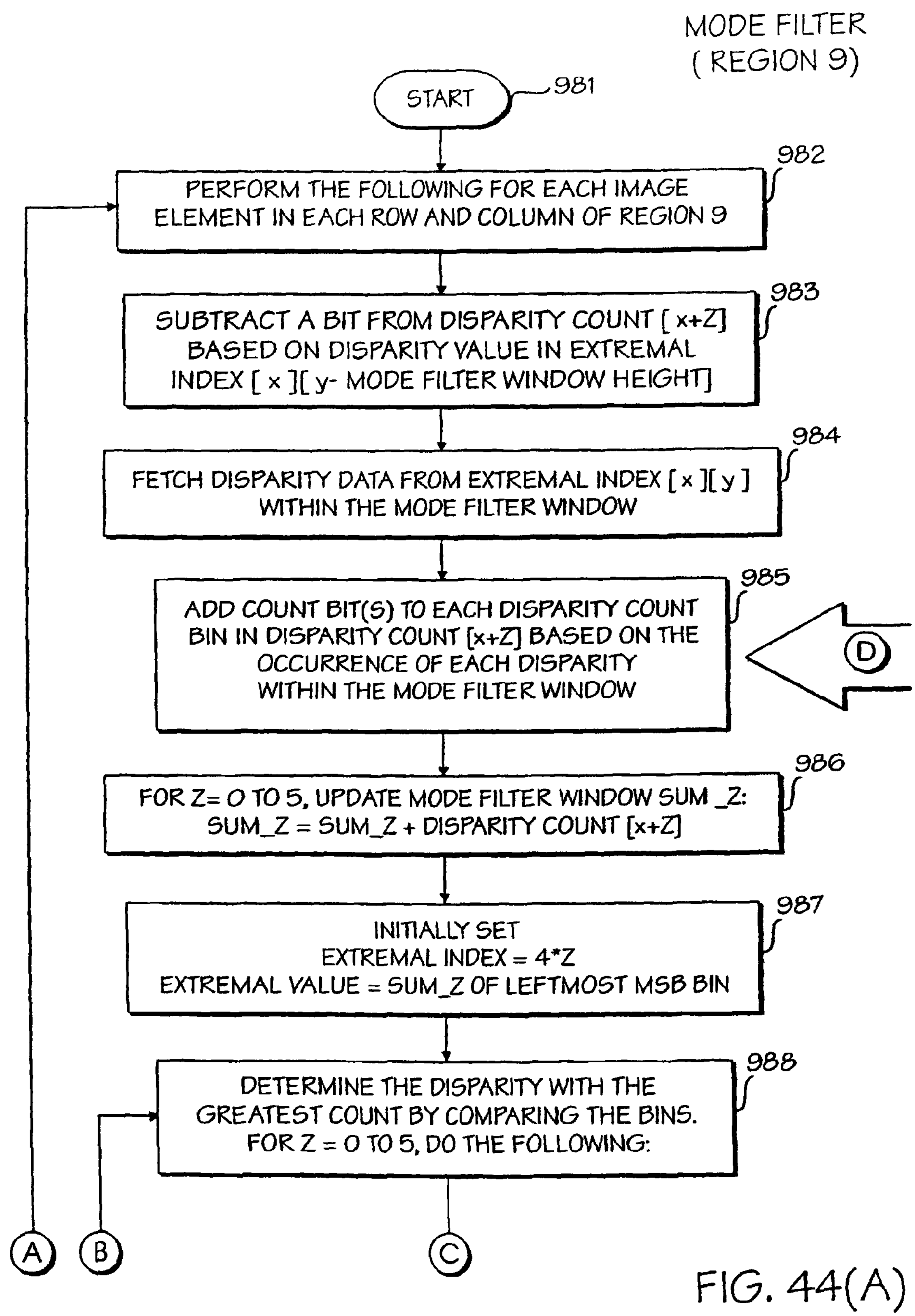
FIGS. 44(A)-(D) show a flow chart of one embodiment of the mode filter for region 9.
Figure 44B:
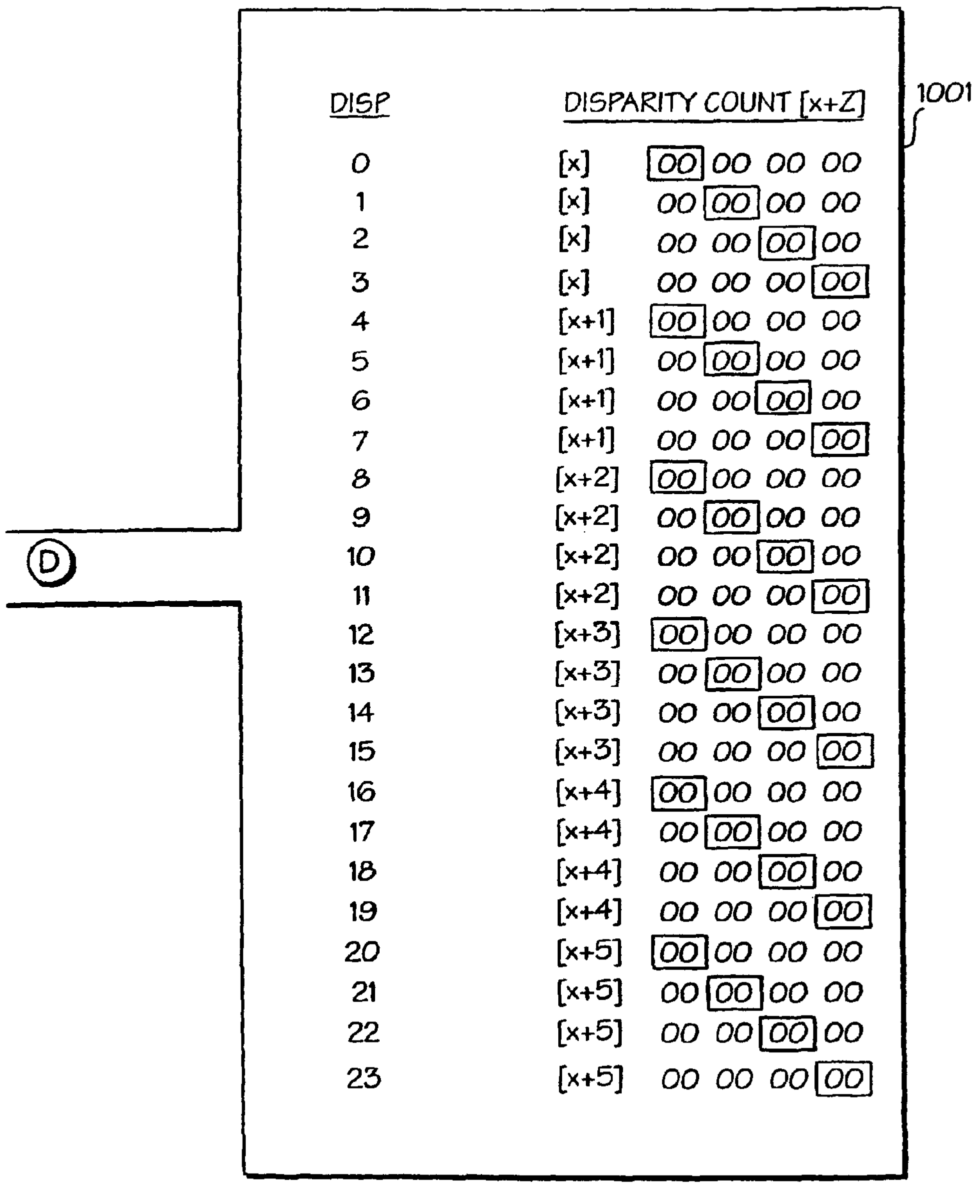
Figure 44C:
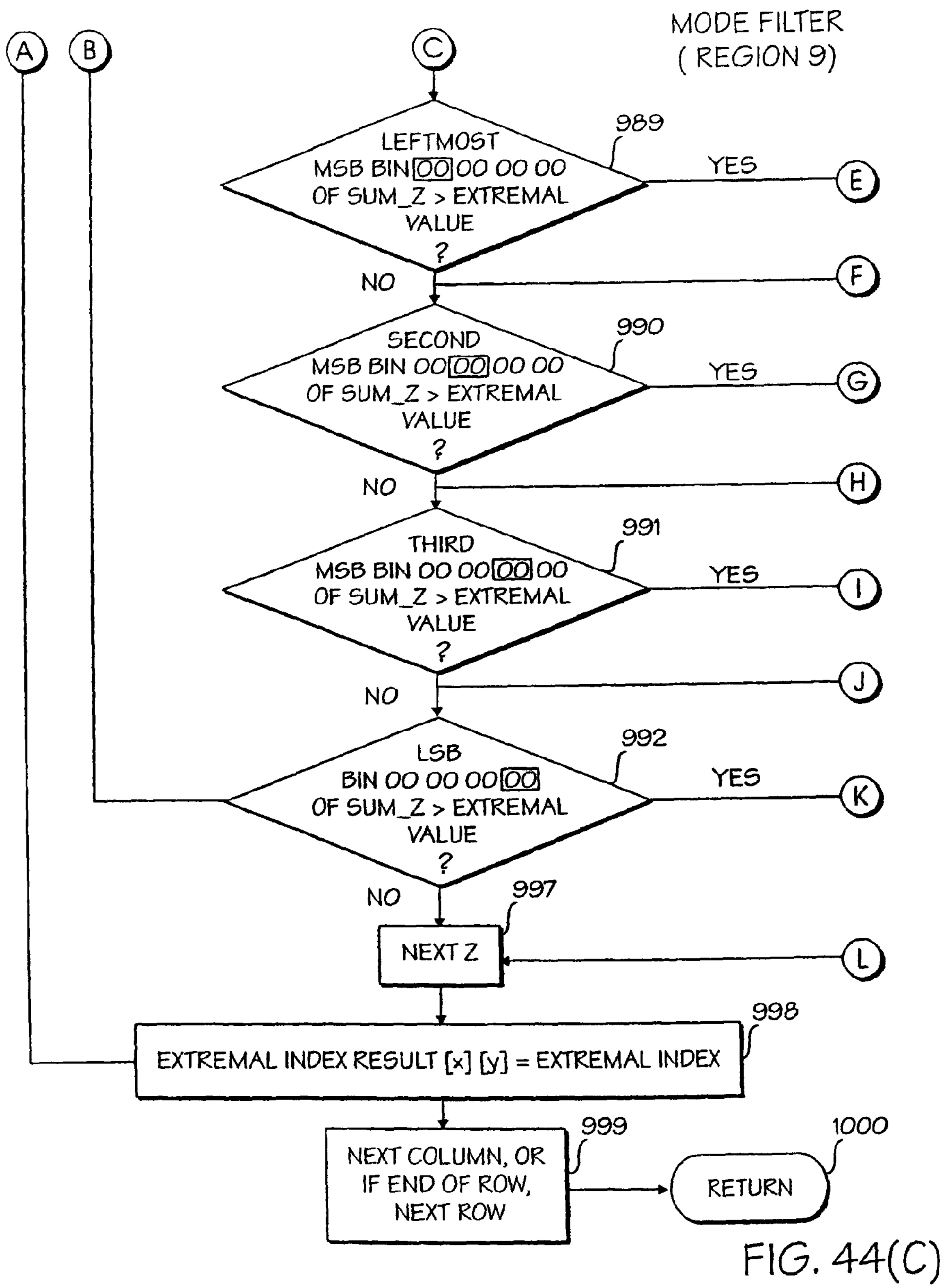
Figure 44D:
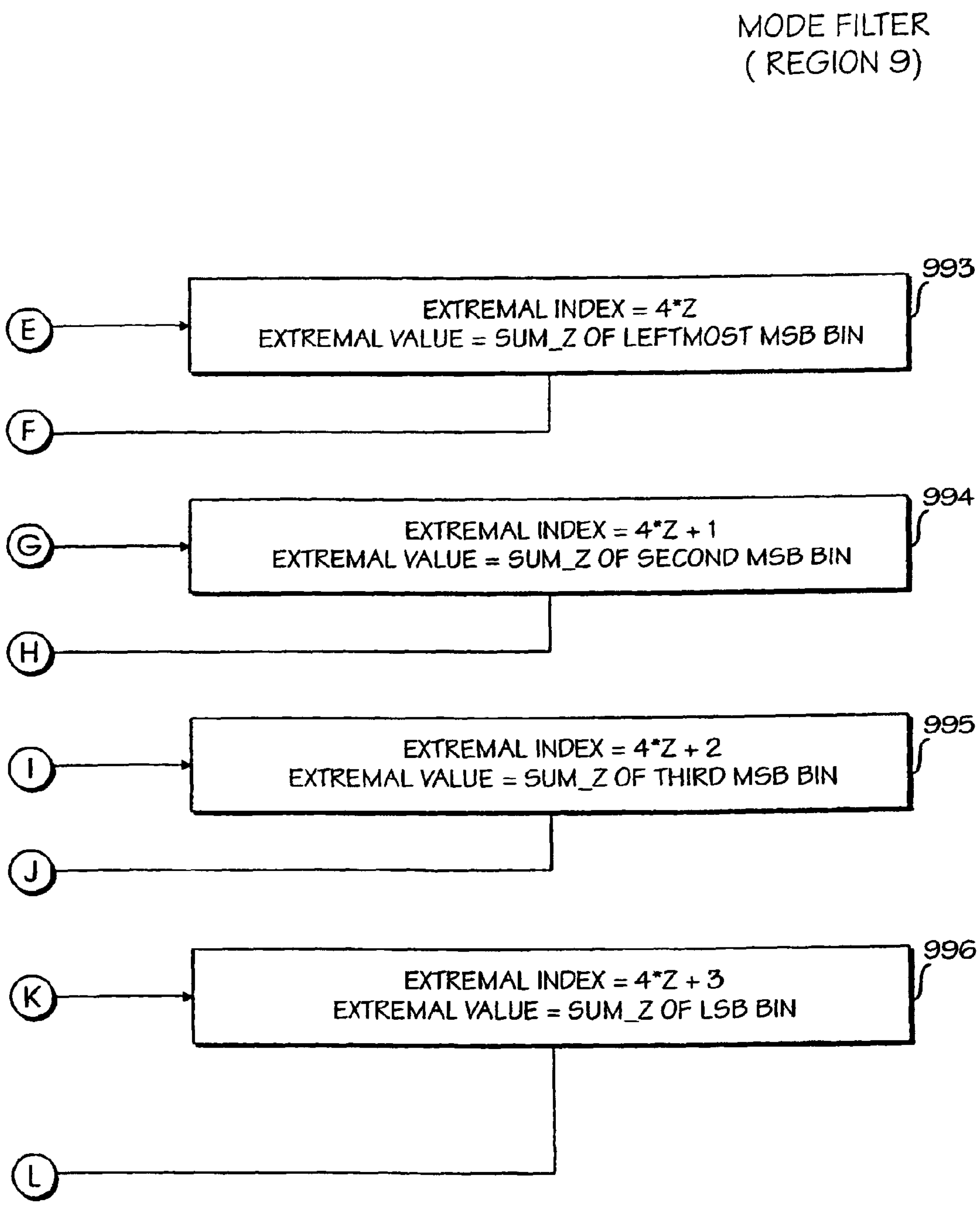
Figure 45A:
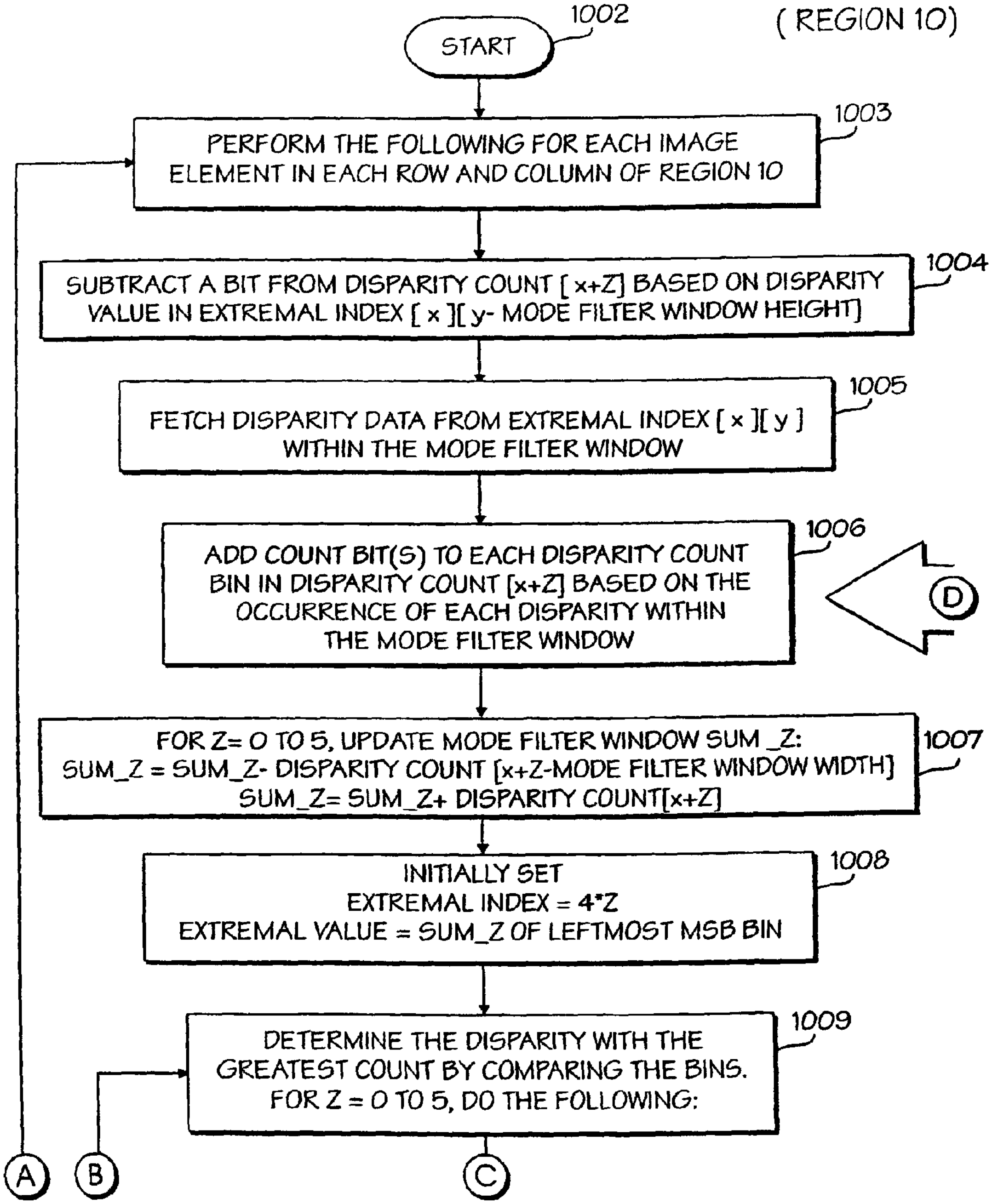
Figure 45C:
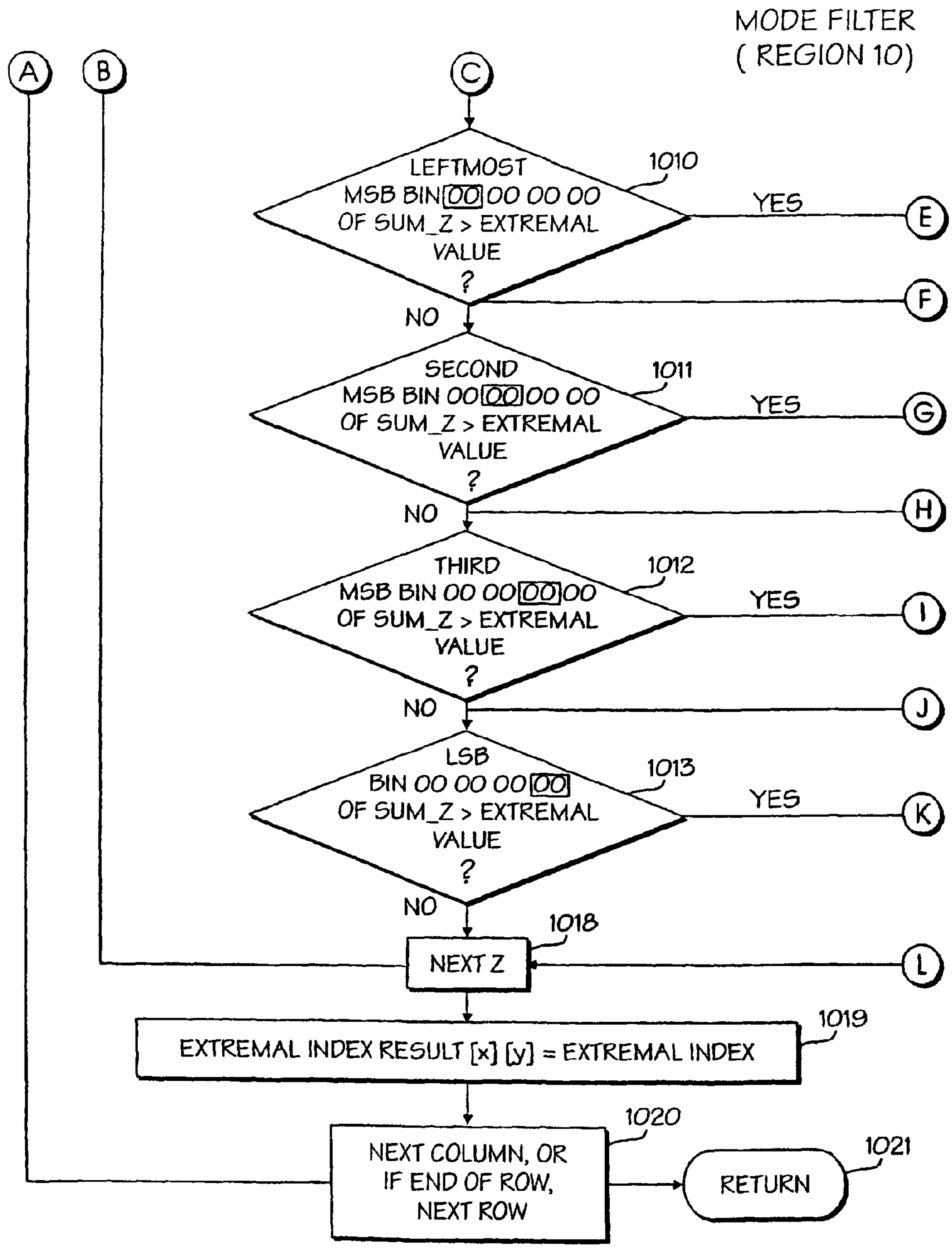
Figure 45D:
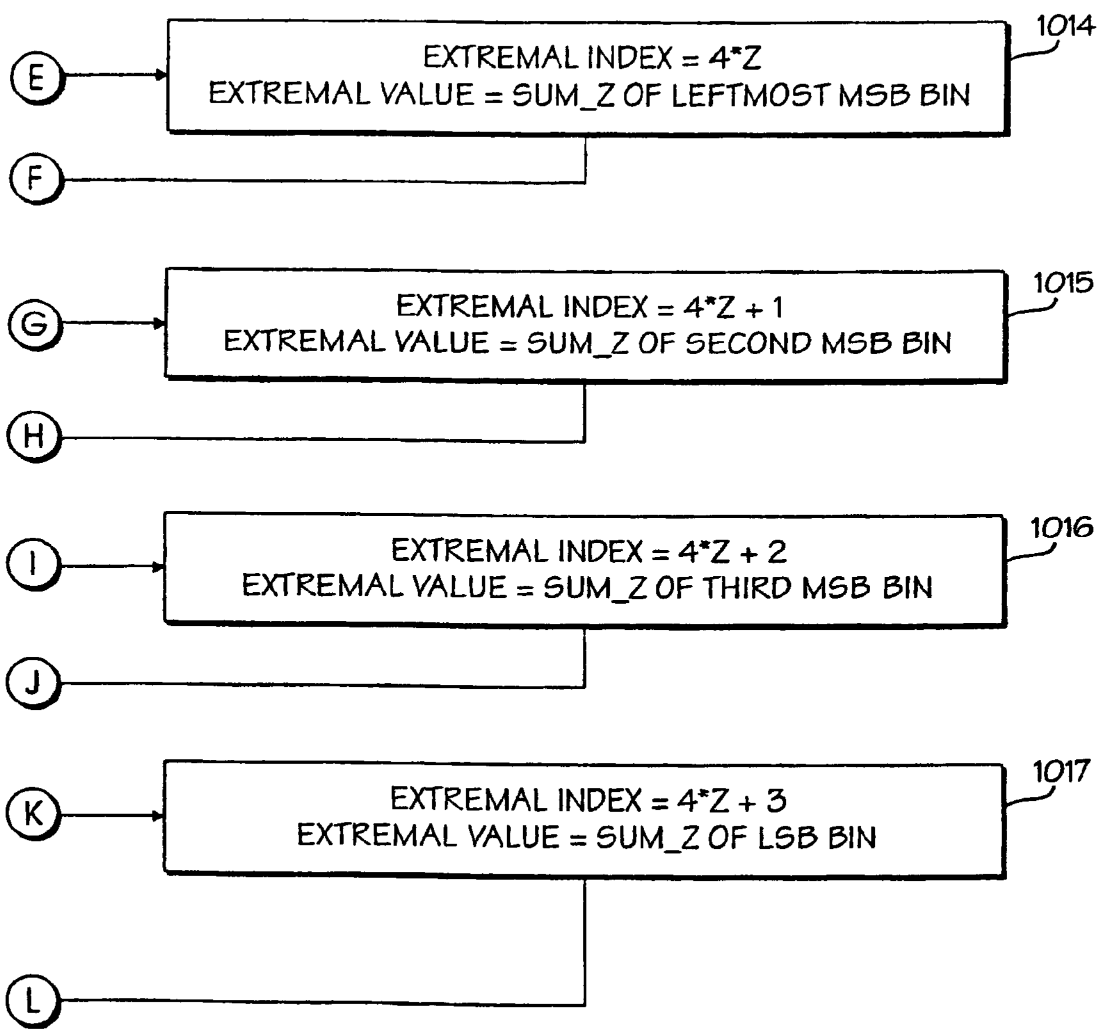

FIGS. 43(A)-(B) show a flow chart of one embodiment of the mode filter for regions 7 and 8. The computations are similar to that of regions 3 and 4 except that now, the single disparity occurrence for the image point located a mode filter window height above the current reference point in the same column should be subtracted from the value in disparity count [x+Z], which is the mode filter column sum. This single disparity occurrence is a single bit in one of the bins of disparity count [x+Z] for all Z. In region 7, a complete column sum is available and thus, a mode filter window sum_Z is initialized. In region 8, the mode filter window sum_Z is built up. However, in both regions, a full mode filter window sum_Z is not available yet. The program starts at step 972.

If the mode filter window, and more specifically, the reference image element in the mode filter window, is located in region 7 or 8, steps 973 and 978 require the following mode filter calculations to be executed for each row and column by proceeding column by column in the row and if the reference point of the mode filter window has reached the end of the row, the reference point moves to the beginning of the next row.

Step 974 subtracts a bit from disparity count[x+Z] located in extremal index array [x][y-mode filter window height]. Based on the specific disparity number found in extremal index array [x][y-mode filter window height], a single count or bit is subtracted from the bin in disparity count[x+Z] that corresponds to the disparity number. Thus, if disparity 6 was found to be optimal for the image element corresponding to the location extremal index array [x][y-mode filter window height], the disparity optimization program stores the value 6 (representing disparity 6) in the extremal index array at this location. Thus, a bit from the third MSB bin of disparity count [x+1] is subtracted from the value (or count) currently found in that bin.

Step 975 fetches the disparity data from the extremal index array[x][y] within the mode filter window. Step 976 adds count bit(s) to each disparity count bin in disparity count [x+Z], which is essentially a column sum, based on the occurrence of each disparity in the mode filter window. The count bit(s) represent the number of times that a particular disparity appears in the extremal index array within the mode filter window. These count bits are placed in the appropriate disparity count [x+Z] bin as shown in box 980.

An inner Z loop (to be distinguished from the “z” loop used in the correlation summation and disparity optimization scheme described above with respect to FIGS. 21-27 to describe the processing of correlation data for a pair of disparities) is performed in step 977. For each Z from 0 to 5, region 7 initializes the mode filter window sum_Z variable and region 8 updates the mode filter window sum_Z by adding the column sum which is disparity count [x+Z] to the current values of mode filter window sum_Z.

The program proceeds to step 978 which directs the system to select the next reference point in the next column of the same row or the beginning of the next row if the current reference point is located at the last column of the row. Then the same mode filter calculations for the new reference point are performed. This portion of the mode filter operation ends at step 979.

7. Region 9

FIGS. 44(A)-(D) show a flow chart of one embodiment of the mode filter for region 9. In region 9, the computations are similar to that of region 5 except that now, the single disparity occurrence for the image point located a mode filter window height above the current reference point in the same column should be subtracted from the value in disparity count [x+Z], which is the mode filter column sum. This single disparity occurrence is a single bit in one of the bins of disparity count [x+Z] for all Z. A complete window sum is also available. Accordingly, the disparity consistency can be determined in this region. The program starts at step 981.

If the mode filter window, and more specifically, the reference image element in the mode filter window, is located in region 9, steps 982 and 999 require the following mode filter calculations to be executed for each row and column by proceeding column by column in the row and if the reference point of the mode filter window has reached the end of the row, the reference point moves to the beginning of the next row.

Step 983 subtracts a bit from disparity count[x+Z] located in extremal index array [x][y-mode filter window height]. Based on the specific disparity number found in extremal index array [x][y-mode filter window height], a single count or bit is subtracted from the bin in disparity count[x+Z] that corresponds to the disparity number.

Step 984 fetches the disparity data from the extremal index array[x][y] within the mode filter window. Step 985 adds count bit(s) to each disparity count bin in disparity count [x+Z], which is essentially a column sum, based on the occurrence of each disparity in the mode filter window. The count bit(s) represent the number of times that a particular disparity appears in the extremal index array within the mode filter window. These count bits are placed in the appropriate disparity count [x+Z] bin as shown in box 1001.

An inner Z loop (to be distinguished from the "z" loop used in the correlation summation and disparity optimization scheme described above with respect to FIGS. 21-27 to describe the processing of correlation data for a pair of disparities) is performed in step 986. For each Z from 0 to 5, region 9 updates the mode filter window sum_Z by adding the column sum which is disparity count [x+Z] to the current values of mode filter window sum_Z. At this point, a complete window sum of all disparities represented in the window is available.

Step 987 initially sets the extremal index at 0, where 4*Z=0 for Z=0, and the extremal value to the window sum_Z of the leftmost MSB bin. This skews or biases the disparity with the greatest count toward disparity 0 and the count value to the number of occurrences of disparity 0 in the window. Thus, ties are skewed toward the lower disparity number. Other embodiments skew ties to higher disparity numbers.

A second inner Z loop defined by steps 988 and 997 is used to determine the greatest disparity count. The greatest disparity count is determined by comparing the individual count values in the 24 bins (in other cases, only 16 bins are compared because only 16 disparities are used) within the window. For Z=0 to 5, steps 988 to 997 are performed. For a given Z, steps 989 to 996 determine if the various bins of sum_Z is greater than the extremal value and the consequences that follow from either decision as described with respect to mode filter calculations of region 5.

In step 989, if the leftmost MSB bin of sum_Z is greater than the extremal value, then step 993 requires the extremal index to be replaced by 4*Z. The extremal value is also replaced by the leftmost MSB bin of sum_Z. The program then proceeds to step 990 to make the next comparison with the newly updated extremal index and extremal value. If step 989 evaluates to "NO," then the current extremal index and extremal value is not updated and will be used for the next comparison at step 990.

In step 990, if the second leftmost MSB bin of sum_Z is greater than the extremal value, then step 994 requires the extremal index to be replaced by 4*Z+1. The extremal value is also replaced by the second leftmost MSB bin of sum_Z. The program then proceeds to step 991 to make the next comparison with the newly updated extremal index and extremal value. If step 990 evaluates to "NO," then the current extremal index and extremal value is not updated and will be used for the next comparison at step 991.

In step 991, if the third leftmost MSB bin of sum_Z is greater than the extremal value, then step 995 requires the extremal index to be replaced by 4*Z+2. The extremal value is also replaced by the third leftmost MSB bin of sum_Z. The program then proceeds to step 992 to make the next comparison with the newly updated extremal index and extremal value. If step 991 evaluates to "NO," then the current extremal index and extremal value is not updated and will be used for the next comparison at step 992.

In step 992, if the LSB bin of sum_Z is greater than the extremal value, then step 996 requires the extremal index to be replaced by 4*Z+3. The extremal value is also replaced by the LSB bin of sum_Z. The program then proceeds to step 997 to increment Z and make the next comparison with the newly updated extremal index and extremal value. If step 992 evaluates to "NO," then the current extremal index and extremal value is not updated and will be used for the next comparison after Z is incremented at step 997.

This second Z loop that makes the comparison with the extremal value and updates the extremal index and extremal value if the comparison yields a greater sum_Z value than the current extremal value continues to loop for all Z values (0 to 5). The end result is an extremal index which holds the particular disparity number (i.e., d=0, 1, 2, . . . , or D−1) that has the greatest count among all other optimal disparities found in the window, and an extremal value that holds the actual count itself. After all sum_Z values have been compared for all Z, an extremal index result array [x][y] stores the extremal index in the corresponding position as shown in step 998.

The program proceeds to step 999 which directs the system to select the next reference point in the next column of the same row or the beginning of the next row if the current reference point is located at the last column of the row. Then the same mode filter calculations for the new reference point are performed. This portion of the mode filter operation ends at step 1000.

8. Region 10

FIGS. 45(A)-(D) show a flow chart of one embodiment of the mode filter for region 10. The computations are similar to that of regions 6 and 9 except that now, the general case of the algorithm is invoked. Here, the computation includes: subtraction of the upper rightmost corner of one window above in the same column from the column sum, adding the current reference image element to the column sum, subtracting the column sum located a window width columns to the left from the window sum, and adding the current modified column sum to the modified window sum. A complete window sum is also available. Accordingly, the disparity consistency can be determined in this region. The program starts at step 1002.

If the mode filter window, and more specifically, the reference image element in the mode filter window, is located in region 10, steps 1003 and 1020 require the following mode filter calculations to be executed for each row and column by proceeding column by column in the row and if the reference point of the mode filter window has reached the end of the row, the reference point moves to the beginning of the next row.

Step 1004 subtracts a bit from disparity count[x+Z] located in extremal index array [x][y-mode filter window height]. Based on the specific disparity number found in extremal index array [x][y-mode filter window height], a single count or bit is subtracted from the bin in disparity count[x+Z] that corresponds to the disparity number.

Step 1005 fetches the disparity data from the extremal index array[x][y] within the mode filter window. Step 1006 adds count bit(s) to each disparity count bin in disparity count [x+Z], which is essentially a column sum, based on the occurrence of each disparity in the mode filter window. The count bit(s) represent the number of times that a particular disparity appears in the extremal index array within the mode filter window. These count bits are placed in the appropriate disparity count [x+Z] bin as shown in box 1022.

An inner Z loop (to be distinguished from the "z" loop used in the correlation summation and disparity optimization scheme described above with respect to FIGS. 21-27 to describe the processing of correlation data for a pair of disparities) is performed in step 1007. For each Z from 0 to 5, region 10 updates the mode filter window sum_Z. First, the column sum located a window width to the left of the current reference point is subtracted from the current window sum. Thus, the value in disparity count [x+Z-mode filter window width] is subtracted from sum_Z. Second, the current column sum which is disparity count [x+Z] is added to the current values of mode filter window sum_Z. At this point, a complete window sum of all disparities represented in the window is available.

Step 1008 initially sets the extremal index at 0, where 4*Z=0 for Z=0, and the extremal value to the window sum_Z of the leftmost MSB bin. This skews or biases the disparity with the greatest count toward disparity 0 and the count value to the number of occurrences of disparity 0 in the window. Thus, ties are skewed toward the lower disparity number. Other embodiments skew ties to higher disparity numbers.

A second inner Z loop defined by steps 1009 and 1018 is used to determine the greatest disparity count. The greatest disparity count is determined by comparing the individual count values in the 24 bins (in other cases, only 16 bins are compared because only 16 disparities are used) within the window. For Z=0 to 5, steps 1009 to 1018 are performed. For a given Z, steps 1010 to 1017 determine if the various bins of sum_Z is greater than the extremal value and the consequences that follow from either decision as described with respect to mode filter calculations of region 5.

In step 1010, if the leftmost MSB bin of sum_Z is greater than the extremal value, then step 1014 requires the extremal index to be replaced by 4*Z. The extremal value is also replaced by the leftmost MSB bin of sum_Z. The program then proceeds to step 1011 to make the next comparison with the newly updated extremal index and extremal value. If step 1010 evaluates to "NO," then the current extremal index and extremal value is not updated and will be used for the next comparison at step 1011.

In step 1011, if the second leftmost MSB bin of sum_Z is greater than the extremal value, then step 1015 requires the extremal index to be replaced by 4*Z+1. The extremal value is also replaced by the second leftmost MSB bin of sum_Z. The program then proceeds to step 1012 to make the next comparison with the newly updated extremal index and extremal value. If step 1011 evaluates to "NO," then the current extremal index and extremal value is not updated and will be used for the next comparison at step 1012.

In step 1012, if the third leftmost MSB bin of sum_Z is greater than the extremal value, then step 1016 requires the extremal index to be replaced by 4*Z+2. The extremal value is also replaced by the third leftmost MSB bin of sum_Z. The program then proceeds to step 1013 to make the next comparison with the newly updated extremal index and extremal value. If step 1012 evaluates to "NO," then the current extremal index and extremal value is not updated and will be used for the next comparison at step 1013.

In step 1013, if the LSB bin of sum_Z is greater than the extremal value, then step 1017 requires the extremal index to be replaced by 4*Z+3. The extremal value is also replaced by the LSB bin of sum_Z. The program then proceeds to step 1018 to increment Z and make the next comparison with the newly updated extremal index and extremal value. If step 1013 evaluates to "NO," then the current extremal index and extremal value is not updated and will be used for the next comparison after Z is incremented at step 1018.

This second Z loop that makes the comparison with the extremal value and updates the extremal index and extremal value if the comparison yields a greater sum_Z value than the current extremal value continues to loop for all Z values (0 to 5). The end result is an extremal index which holds the particular disparity number (i.e., d=0, 1, 2, . . . , or D−1) that has the greatest count among all other optimal disparities found in the window, and an extremal value that holds the actual count itself. After all sum_Z values have been compared for all Z, an extremal index result array [x][y] stores the extremal index in the corresponding position as shown in step 1019.

The program proceeds to step 1020 which directs the system to select the next reference point in the next column of the same row or the beginning of the next row if the current reference point is located at the last column of the row. Then the same mode filter calculations for the new reference point are performed. This portion of the mode filter operation ends at step 1021.

IV. Hardware Implementation

A. Array of Computing Elements

Returning to the hardware implementation of the present invention, the correspondence algorithms described herein can be implemented in various embodiments including microprocessor-based computer systems, reconfigurable computing systems using various FPGAs, application specific integrated circuit (ASIC) implementations, and custom integrated circuit implementations. In particular, ASIC and custom integrated circuit implementations facilitate mass production of the data processing system of the present invention. Aside from its applicability to image processing for stereo vision computations, the hardware aspect of the present invention can be applied to any algorithm that processes data sets to determine their relatedness. In light of the teachings of the hardware implementation herein, one ordinarily skilled in the art will be able to readily extend the present invention to various hardware forms.

Although some figures below do not show a clock source, one ordinarily skilled in the art would know how to incorporate a clock source to practice the invention. Indeed, use of registers and some digital logic to process digital data implies that a clock signal is available.

Figure 46:
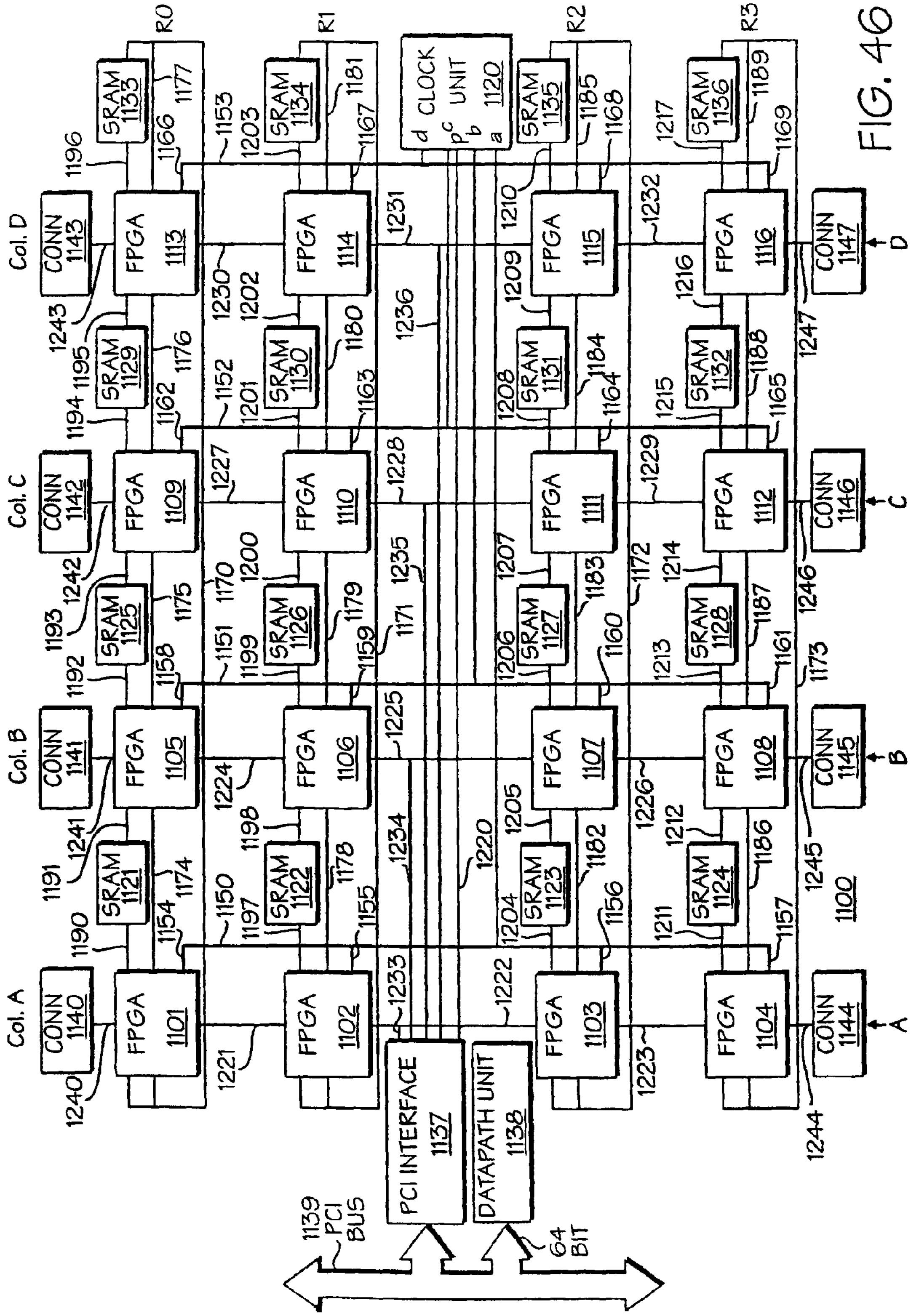
FIG. 46 shows one embodiment of the image processing system of the present invention in which a 4.times.4 array of FPGAs, SRAMs, connectors, and a PCI interface element are arranged in a partial torus configuration.

In the context of image processing, FIG. 46 shows one embodiment of the hardware system of the present invention, in which a 4×4 array 1100 of FPGAs, SRAMs, connectors, a datapath unit, a clock unit, a PCI interface element, and various buses are arranged in a partial torus configuration. The FPGAs, with support from the other elements, generate the census vectors and determine correlation for each element in each data set. Although this particular embodiment shows a reconfigurable system, other embodiments are not necessarily reconfigurable. Indeed, some embodiments utilize non-FPGA hardware components. Still other embodiments are in ASIC form.

In its various embodiments, the present invention processes data in a parallel and pipelined manner allowing a number of different image data from different time periods to be processed concurrently. Indeed, the systolic nature of processing data in this system promotes efficiency and throughput. Thus, image data for each line in each image is provided to the system, which then computes and generates the census vectors and determines correlation. For correlation, the pairs of image data from the left and right cameras are processed concurrently where each image element of one image is compared with each image element in the other image within its respective search window. Regardless of the form taken for the hardware aspect of the present invention, the following principles and enabling discussion applies.

In one embodiment, the particular homogeneous array of 16 FPGAs and 16 SRAMs arranged in a partial torus configuration results in a 4×4 two-dimensional array of computing elements. The 4×4 array is structured into columns A, B, C, and D, and rows 0, 1, 2, and 3. The 4×4 array includes computing elements 1101, 1102, 1103, and 1104 in column A; computing elements 1105, 1106, 1107, and 1108 in column B; computing elements 1109, 1110, 1111, and 1112 in column C; and computing elements 1113, 1114, 1115, and 1116 in column D. The array also include memory elements 1121 to 1124 in column A; memory elements 1125 to 1128 in column B; memory elements 1129 to 1132 in column C; and memory elements 1133 to 1136 in column D. For the partial control of the computing elements, the array includes a clock unit 1120 and datapath unit 1138. For interface to the PCI bus system 1139, a PCI interface 1233 is provided.

In one embodiment, the array can be thought of as four columns of four computing elements (e.g., FPGAs) and memory elements connected in a cylindrical mesh of circumference four. The central axis of the cylinder is vertical. Along the vertical axis, the computing elements in the array are coupled to each other. Along column A, computing element 1101 is coupled to computing element 1102 via connector/bus 1221; computing element 1102 is coupled to computing element 1103 via connector/bus 1222; computing element 1103 is coupled to computing element 1104 via connector/bus 1223; and computing element 1104 can be coupled to computing element 1101 at the top of the column via connectors 1140 and 1144 or a cable therebetween. Along column B, computing element 1105 is coupled to computing element 1106 via connector/bus 1224; computing element 1106 is coupled to computing element 1107 via connector/bus 1225; computing element 1107 is coupled to computing element 1108 via connector/bus 1226; and computing element 1108 can be coupled to computing element 1105 at the top of the column via connectors 1141 and 1145 or a cable therebetween. Along column C, computing element 1109 is coupled to computing element 1110 via connector/bus 1227; computing element 1110 is coupled to computing element 1111 via connector/bus 1228; computing element 1111 is coupled to computing element 1112 via connector/bus 1229; and computing element 1112 can be coupled to computing element 1109 at the top of the column via connectors 1142 and 1146 or a cable therebetween. Along column D, computing element 1113 is coupled to computing element 1114 via connector/bus 1230; computing element 1114 is coupled to computing element 1115 via connector/bus 1231; computing element 1115 is coupled to computing element 1116 via connector/bus 1232; and computing element 1116 can be coupled to computing element 1113 at the top of the column via connectors 1143 and 1147 or a cable therebetween.

The computing elements in the array are also coupled to each other along the horizontal access. Along row 0, computing element 1101 is coupled to computing element 1105 via connector/bus 1174; computing element 1105 is coupled to computing element 1109 via connector/bus 1175; computing element 1109 is coupled to computing element 1113 via connectors/bus 1176; and computing element 1113 can be coupled to computing element 1101 at the West end of the row via connectors/bus 1177 and 1170. Along row 1, computing element 1102 is coupled to computing element 1106 via connector/bus 1178; computing element 1106 is coupled to computing element 1110 via connector/bus 1179; computing element 1110 is coupled to computing element 1114 via connectors/bus 1180; and computing element 1114 can be coupled to computing element 1102 at the West end of the row via connectors/bus 1181 and 1171. Along row 2, computing element 1103 is coupled to computing element 1107 via connector/bus 1182; computing element 1107 is coupled to computing element 1111 via connector/bus 1183; computing element 1111 is coupled to computing element 1115 via connectors/bus 1184; and computing element 1115 can be coupled to computing element 1103 at the West end of the row via connectors/bus 1185 and 1172. Along row 3, computing element 1104 is coupled to computing element 1108 via connector/bus 1186; computing element 1108 is coupled to computing element 1112 via connector/bus 1187; computing element 1112 is coupled to computing element 1116 via connectors/bus 1188; and computing element 1116 can be coupled to computing element 1104 at the West end of the row via connectors/bus 1189 and 1173.

Figure 57:
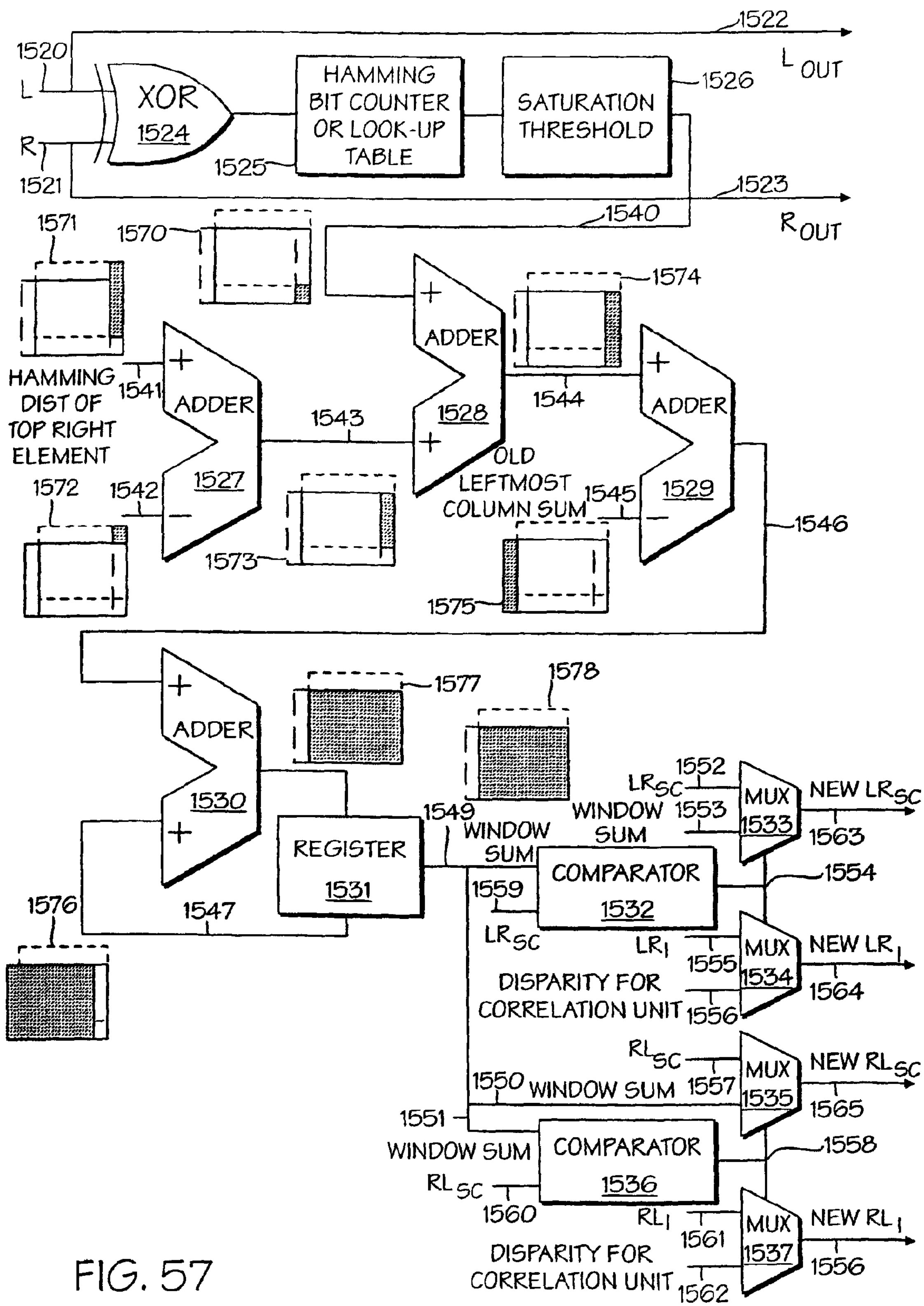
FIG. 57 shows the hardware implementation of one embodiment of the correlation unit of the present invention.

Some computing elements generate the census vectors while still others are used solely for transmission of data from one point to another. In one embodiment, twenty-four (24) disparities are selected and hence, the search window includes twenty-four pixels and twenty-four comparisons must be performed for each pixel. Each comparison (i.e., a single disparity) is performed in a single correlation unit; that is, each correlation unit performs a correlation operation between the left census vectors and the right census vectors for a particular disparity. To compute the correlation results for all twenty-four disparities, twenty-four correlation units are needed. To accomplish this, eight (8) computing elements are provided. Thus, three (3) correlation units are implemented in each computing element. The correlation units will be described further below with respect to the data flow description. In particular, FIG. 57 shows the internal hardware implementation of each correlation unit.

Continuing with FIG. 46, placed between each pair of computing elements on the horizontal axis is a memory element. In one embodiment, the memory element is a 1 MB×8 bit on-chip SRAM, so that the 16 SRAMs provide 16 megabytes of memory. Along row 0, memory element 1121 is coupled between computing elements 1101 and 1105 via connectors/bus 1190 and 1191, respectively; memory element 1125 is coupled between computing elements 1105 and 1109 via connectors/bus 1192 and 1193, respectively; memory element 1129 is coupled between computing elements 1109 and 1113 via connectors/bus 1194 and 1195, respectively; and memory element 1133 is coupled between computing elements 1113 and 1101 via connectors/bus 1196 and 1170, respectively. Along row 1, memory element 1122 is coupled between computing elements 1102 and 1106 via connectors/bus 1197 and 1198, respectively; memory element 1126 is coupled between computing elements 1106 and 1110 via connectors/bus 1199 and 1200, respectively; memory element 1130 is coupled between computing elements 1110 and 1114 via connectors/bus 1201 and 1202, respectively; and memory element 1134 is coupled between computing elements 1114 and 1102 via connectors/bus 1203 and 1171, respectively. Along row 2, memory element 1123 is coupled between computing elements 1103 and 1107 via connectors/bus 1204 and 1205, respectively; memory element 1127 is coupled between computing elements 1107 and 1111 via connectors/bus 1206 and 1207, respectively; memory element 1131 is coupled between computing elements 1111 and 1115 via connectors/bus 1208 and 1209, respectively; and memory element 1135 is coupled between computing elements 1115 and 1103 via connectors/bus 1210 and 1172, respectively. Along row 3, memory element 1124 is coupled between computing elements 1104 and 1108 via connectors/bus 1211 and 1212, respectively; memory element 1128 is coupled between computing elements 1108 and 1112 via connectors/bus 1213 and 1214, respectively; memory element 1132 is coupled between computing elements 1112 and 1116 via connectors/bus 1215 and 1216, respectively; and memory element 1136 is coupled between computing elements 1116 and 1104 via connectors/bus 1217 and 1173, respectively.

A 32-bit census transform requires eight scanlines of data for a 9×9 census window in order to form the census vector for a pixel in one cycle. The FPGA computing elements need access to several pixels from each of these scanlines on each cycle. This translates to several bytes of memory read, and one write per transform per transform pixel. Each transform operation is performed in two FPGAs, since eight 640 pixel scanlines cannot fit on one XC4025. In one embodiment, the memory elements (e.g., SRAMs) have a 25 nanosecond (ns) cycle time and a clock speed of 33 MHz. This particular SRAM cycle time allows memory to be read or written at the 33 MHz clock speed of the image processing system array board. However, in changing operations from reading to writing, this particular embodiment of the present invention encounters an additional delay which does not make it feasible to cycle between reading and writing at the 33 MHz clock speeds. The sustained read or write bandwidth of the board is 533 megabytes per second. Other embodiments employ SRAMs of different cycle times and different clock speeds. The particular clock speeds and memory cycle times should not limit the spirit and scope of the present invention.

As described above, the FPGAs are connected in a partial torus where each FPGA is associated with two adjacent SRAMs. The SRAMs are tightly coupled to the FPGAs so that all the SRAMs can be accessed concurrently to maximize memory bandwidth and engine regularity. This image processing system utilizes a minimum number of edge conditions and heterogeneous resources. Usually, when an edge condition is encountered in computing, a special case is necessary. Heterogeneous resources create contention and bottlenecks for those computing resources. By distributing resources evenly throughout the image processing system, for example the SRAM resources, overall throughput can be improved in general purpose computations. Moreover, translation invariance can be obtained so that if an FPGA configuration works on one of the FPGAs, it will work on any of the FPGAs in the array. For increased memory bandwidth, the image processing system is designed and implemented so that each FPGA can control its own megabyte of memory locally. Each memory is 8 bits wide and can operate at 33 MHz, providing peak external memory bandwidth of over 500 MB/sec.

The PCI interface unit 1137 is coupled to the PCI bus system 1139 to allow the image processing system of the present invention to allow connectivity and communication with a number of PCI-compliant systems, including the host processor, networks, graphics peripherals, video peripherals, audio peripherals, mass storage, SCSI units, and frame grabbers. In some embodiments, the PCI interface unit 1137 is not coupled directly to the computing elements. Rather, the PCI interface unit 1137 is coupled to the datapath unit 1138 which is itself coupled to the various computing elements. In other embodiments, and as shown in FIG. 46, the PCI interface unit 1137 is also coupled to the computing elements of each column (i.e., A, B, C, and D). The PCI interface 1137 is coupled to column A via connector/bus 1233, column B via connector/bus 1234, column C via connector/bus 1235, and column D via connector/bus 1236. These connectors/bus 1233, 1234, 1235, and 1236 are part of the central bus of the array.

Similarly, the datapath unit 1138, which controls the main data connection from the array to the host computer and manages the 64-bit PCI bus extension, is coupled to the PCI bus system 1139. The PCI interface unit 1137 and the datapath unit 1138 are also connected to each other via connector/bus 1237. In some embodiments, the datapath unit 1138 is coupled to each column (i.e., A, B, C, and D) of computing elements. For read operations, data from the PCI bus comes in through the PCI interface 1137 which is channeled to the datapath unit 1138. The datapath unit 1138 controls the transmission of the data to the proper computing elements in the array. For write operations, data from the array comes into the datapath unit 1138. The datapath unit transmits the data to the PCI bus via the PCI interface unit 1137.

To control the cycling of the various parallel processing that occurs in the array, a clock unit 1120 is provided. Clock unit 1120 has a plurality of clock outputs a, b, c, d, and p. Clock signals from port a of the clock unit 1120 to the ports 1154, 1155, 1156, and 1157 of the computing elements of column A are delivered via clock connector/bus 1150. Clock signals from port b of the clock unit 1120 to the ports 1158, 1159, 1160, and 1161 of the computing elements of column B are delivered via clock connector/bus 1151. Clock signals from port c of the clock unit 1120 to the ports 1162, 1163, 1164, and 1165 of the computing elements of column C are delivered via clock connector/bus 1152. Clock signals from port d of the clock unit 1120 to the ports 1166, 1167, 1168, and 1169 of the computing elements of column D are delivered via clock connector/bus 1153. These different clock lines are provided to compensate for skewing of clock signals. This usually occurs at the higher frequencies. For the most part, however, the clock signals are substantially similar to each other.

Clock signals from port p of the clock unit 1120 to the PCI interface unit 1137 and the datapath unit 1138 are delivered via connector/bus 1220. In some embodiments, a direct line from the clock control unit 1120 to the PCI interface unit 1137 is provided in addition to line 1220.

The array has vertical and horizontal connectors. The computing elements on the top and bottom ends of each column have connectors at the top and bottom respectively. Column A has connectors 1140 and 1144, which are coupled to computing elements via connector/bus 1240 and 1244, respectively. Column B has connectors 1141 and 1145, which are coupled to computing elements via connector/bus 1241 and 1245, respectively. Column C has connectors 1142 and 1146, which are coupled to computing elements via connector/bus 1242 and 1246, respectively. Column D has connectors 1143 and 1147, which are coupled to computing elements via connector/bus 1243 and 1247, respectively. These vertical connectors can either be connected together to close the torus or connected to another image processing system board to extend the array to 4×8, 4×12, 8×8, or any number of array sizes. These connectors can also be used to make each column into a ring, creating a torus, or the columns can be connected in series to form a 16-element chain in the North-South axis. Many other combinations are possible.

The array itself has horizontal connections that wrap around the edge of the board. These connectors are structured similarly to the vertical connectors. These connectors also support daughter cards for peripheral I/O.

The partial torus arrangement allows computations to be easily relocated to any site in the array. This flexibility facilitates the mix and match of various computations across the array. As stated above, the torus may be extended in one dimension to form a 4×4 N torus using N boards. Each element in the array has a wide communication channel to its four nearest neighbors. The right edge of the rightmost chip talks to the left edge of the leftmost chip in the array, forming the torus in the horizontal direction. All communication channels in the array are between the four nearest neighbors of each element. The communication channels consist of 26-30 array pins plus 8 pairs of "superpins" described later. These connections are capable of communicating at 25-50 MHz, implying a direct communication speed of roughly 100-200 MB/sec between each adjacent pair of 16 computing elements.

In one embodiment, the computing elements are field programmable gate arrays (FPGA). Illustrative FPGAs used in one embodiment of the present invention are Xilinx XC4025. The Xilinx XC4000 series of FPGAs can be used, including the XC4000, XC4000A, XC4000D, XC4000H, XC4000E, XC4000EX, XC4000L, and XC4000XL. Particular FPGAs include the Xilinx XC4005H, XC4025, and Xilinx 4028EX.

A brief general description of the XC4025 FPGA will be provided. Each array computing element consists of a 240-pin Xilinx chip and a 1 MB×8 bit static RAM (SRAM). The array board populated with Xilinx XC4025 elements contains approximately 440,000 configurable gates, and is capable of performing computationally-intensive tasks such as video convolution or stereo disparity algorithms. The Xilinx XC4025 FPGA consists of 1024 configurable logic blocks (CLBs). Each CLB can implement 32 bits of asynchronous SRAM, or a small amount of general Boolean logic, and two strobed registers. On the periphery of the chip, unstrobed I/O registers are provided. An alternative to the XC4025 is the XC4005H. This is a relatively low-cost version of the array board with 120,000 configurable gates. The XC4005H devices have high-power 24 mA drive circuits, but are missing the input/output flip/flops of the standard XC4000 series. Internal flip/flops in the FPGA array are used instead for the pipelining operations between chips. Three additional FPGAs, the Xilinx 4013 FPGAs, are used for clock distribution, data distribution, and PCI bus interface. The PCI interface unit is rotated 90 degrees from the Xilinx standard. Details of these and other Xilinx FPGAs can be obtained through their publicly available data sheets, which are incorporated herein by reference.

The functionality of Xilinx XC4000 series FPGAs can be customized by loading configuration data into internal memory cells. The values stored in these memory cells determine the logic functions and interconnections in the FPGA. The configuration data of these FPGAs can be stored in on-chip memory and can be loaded from external memory. The FPGAs can either read its configuration data from an external serial or parallel PROM, or the configuration data can be written into the FPGAs from an external device. These FPGAs can be reprogrammed an unlimited number of times especially where hardware is changed dynamically or where users desire the hardware to be adapted to different applications.

Generally, the XC4000 series FPGAs has up to 1024 CLBs. Each CLB has two levels of look-up tables, with two four-input look-up tables (or function generators F and G) providing some of the inputs to a third three-input look-up table (or function generator H), and two flip-flops or latches. The outputs of these look-up tables can be driven independent of these flip-flops or latches. The CLB can implement the following combination of arbitrary Boolean functions: (1) any function of four or five variables, (2) any function of four variables, any second function of up to four unrelated variables, and any third function of up to three unrelated variables, (3) one function of four variables and another function of six variables, (4) any two functions of four variables, and (5) some functions of nine variables. Two D type flip-flops or latches are available for registering CLB inputs or for storing look-up table outputs. These flip-flops can be used independently from the look-up tables. DIN can be used as a direct input to either one of these two flip-flops or latches and H1 can drive the other through the H function generator.

Each four-input function generators in the CLB (i.e., F and G) contains dedicated arithmetic logic for the fast generation of carry and borrow signals, which can be configured to implement a two-bit adder with carry-in and carry-out. These function generators can also be implemented as read/write random access memory (RAM). The four-input lines would be used as address lines for the RAM.

In one embodiment, the image processing system requires a three-level bootstrapping process to completely configure the board. The PCI-32 chip directly connects the image processing system to the PCI bus. This PCI-32 chip programs the datapath and clock control chips, which in turn program the entire array. The PCI-32 chip can accept configuration bits over the PCI bus and transmits them to the datapath and clock control chips. This multistage process provides run-time flexibility in determining how the array is programmed and accessed. The entire array on the board can be programmed in the same time as a single FPGA. A single Xilinx XC4025 FPGA takes roughly 50 msec to program at the highest speeds; the entire array of the present invention can be programmed at that speed, theoretically permitting configuration overlays.

The PCI-32 chip controls the entire image processing system and can be programmed either with a Xilinx Xchecker cable connected to the 50-pin connector on the image processing system, or a serial PROM on power-up. The Xchecker method allows a design to be easily modified, downloaded, and tested from a host personal computer or workstation. Once the configuration of the PCI-32 chip has been determined, a serial PROM can be configured to program the image processing system reliably, rapidly, and automatically.

Once the clock control and datapath chips are configured, the clock control chip can configure the rest of the array. It passes configuration data to the array directly, sending 16 bits at a time, one bit to each of the 16 array chips (FPGAs and SRAMs). When the array has been fully programmed, the clock control chip manages the clock distribution to the entire array.

The software connection to the array board is managed through an interface library. This interface allows configuration of the array board by means of specifying a Xilinx bit file for each FPGA that is going to be programmed. Once the FPGAs are configured, it is possible to read and write data to the central connections of any column on the array board from the host processor. This reading and writing is implemented with mapped memory across the PCI bus, and is supported either through a library call, or directly through pointer assignments.

The design tool used is primarily Viewlogic Viewdraw, a schematic capture system, and Xilinx Xact place and route software.

An alternate source of memory bandwidth is the on-chip SRAM features of the configurable logic blocks (CLB) within the FPGAs. This memory can have very high bandwidth because the memory is internal to the FPGA and can be directly connected to other components without using up external connectivity. Only 32 bits can be stored in one CLB in the Xilinx XC4025 and hence an entire 1024 CLB FPGA can hold four thousand bytes. Other computing elements can store more bits such that memory resource should not be a significant limiting factor in the various embodiments of the present invention.

The correspondence algorithm requires considerable communication bandwidth so that transform vectors can be transported around the system. The correlation utilizes Hamming distances in one embodiment. Summing Hamming distances requires considerable memory bandwidth. Camera pixels can be conveniently assumed to come at about 12.5 MHz, while the present invention is capable of interfacing with its bus and external SRAM at 33 MHz. A model of using a strobe for pixel data has been implemented, which can go high at most once every two clock cycles. This two-step policy allows two communications and two external SRAM accesses per pixel.

The image processing system uses the HQ240 footprint for the FPGA chips. The Xilinx XC4028EX FPGA engines approach half a million gates in capacity on a single PCI board. Furthermore, the PCI host can contain two or three such image processing systems resulting in over a million configurable gates in a single standard personal computer.

The hardware implications for the box filtering operations in accordance with some embodiments of the present invention will now be discussed. Box filtering Hamming distances requires storing one scanline of column sums, and reading and writing one element each pixel clock. This also requires storing 2 BOX_RADIUS+1 rows of Hamming distances that are read and written once per pixel clock. Using 32 bits of Census, Hamming distances can range up to 32. However, by using a saturating threshold on Hamming distances, the distances can be limited to 4 bits. Summing Hamming distances requires reading and writing data each cycle. However, since switching from reading to writing external SRAM costs a clock cycle, the system cannot afford to switch during the active pixels in a scanline. Thus, the system uses eight of the FPGAs for correlation, but each FPGA uses two SRAMs, one for reading, and one for writing. Every 2 BOX_RADIUS+1 scanlines, the roles of these memories reverse.

B. Data Flow Through the Array

Figure 47:
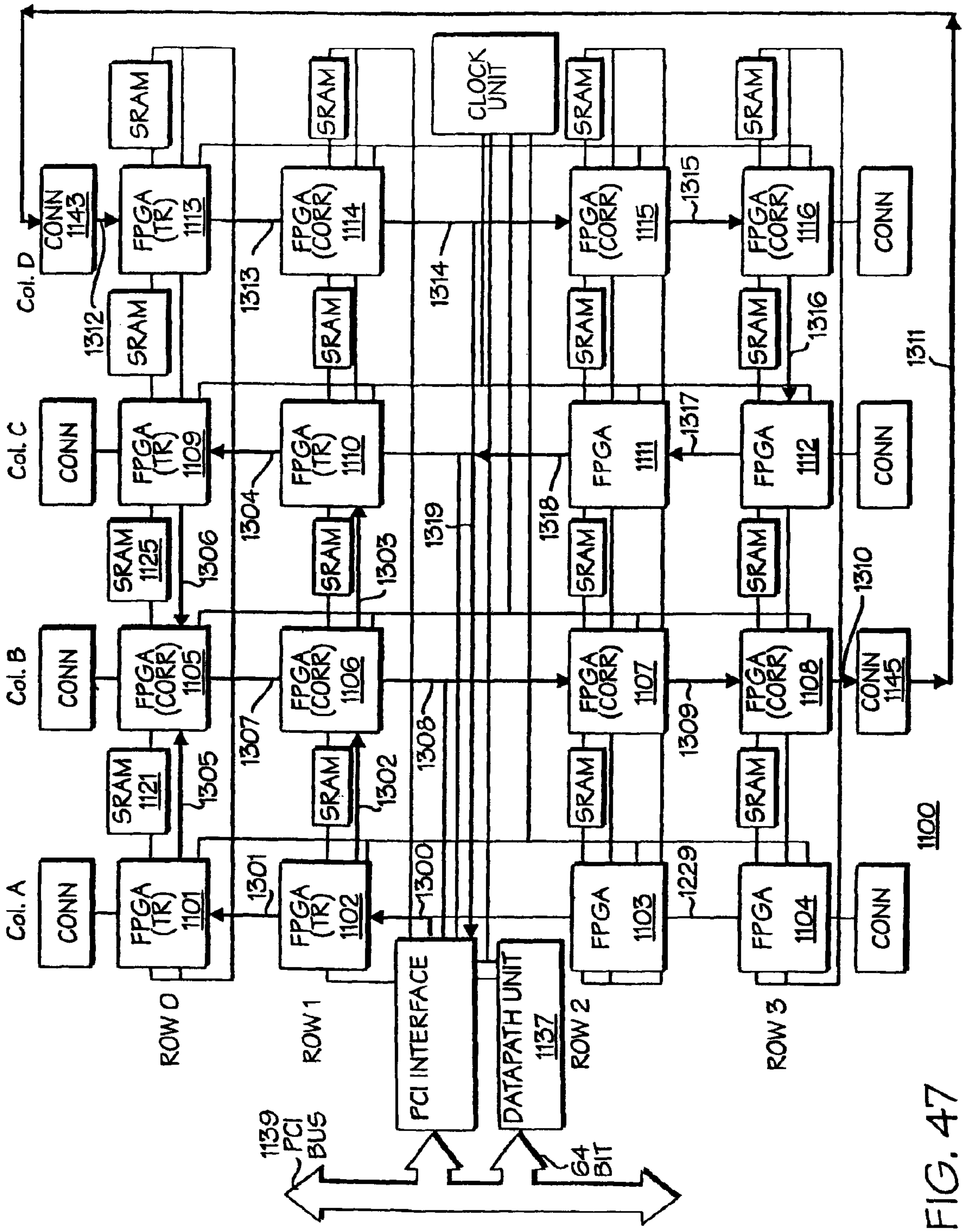
FIG. 47 shows the data flow in the array of the image processing system.

FIG. 47 shows the data flow in the array of the image processing system, while FIGS. 48, 52, 54, and 55 show high level data flow diagrams of the image data and census vectors through the census vector generator and the correlation units as the census transform, correlation operation, and left-right consistency checks are performed in parallel. FIGS. 48, 49, 50, and 51 show one embodiment of the census vector generator of the present invention. FIG. 57 shows one embodiment of the hardware implementation of the correlation unit. Together, these figures show the pipelined and parallel operation of the image processing system of the present invention.

FIG. 47 shows the data flow in the array originally introduced and discussed with respect to FIG. 46. The heavy arrows indicate the flow of data in the array 1100. Left sensor/camera and right sensor/camera provide left and right image data information to the PCI bus 1139 via frame grabbers (not shown in FIG. 47). The PCI interface 1137 (via the datapath unit 1138) provides these left and right image data to the computing elements of columns A and C, where the respective census transform vectors of these image data are computed and generated for further storage and processing. In one embodiment, the PCI interface 1137 provides one of the image data to computing elements 1101 and 1102 in column A of the array 1100, where the census transform is applied, via paths 1300 and 1301. In one embodiment, this image data is for a pixel from either the left or right camera. Assuming the pixel data is from the right camera, the other image data from the left camera is delivered sideways via paths 1302 and 1303 to computing element 1110 in column C and to computing element 1109 via path 1304, for census transformation.

In some embodiments, the PCI interface unit 1137 is not coupled directly to the computing elements. Rather, the PCI interface unit 1137 is coupled to the datapath unit 1138 which is itself coupled to the various computing elements. In some embodiments, the datapath unit 1138 is coupled to each column (i.e., A, B, C, and D) of computing elements. For read operations, data from the PCI bus comes in through the PCI interface 1137 which is channeled to the datapath unit 1138. The datapath unit 1138 controls the transmission of the data to the proper computing elements in the array. For write operations, data from the array comes into the datapath unit 1138. The datapath unit transmits the data to the PCI bus via the PCI interface unit 1137.

These top two computing elements in each of columns A and C output census data at double speed to computing element 1105 in column B over the 16 wires available on the left and right of computing element 1105. The right census data from computing elements 1101 and 1102 in column A are delivered to computing element 1105 via path 1305, and the left census data from computing elements 1109 and 1110 in column C are delivered to the same computing element 1105 via path 1306.

The correlation computation is performed next. Computing element 1105 in column B performs 3 stages of the correlation algorithm, using the memory elements 1121 and 1125 available on both sides along its horizontal axis. From here on, data flows down through the rest of column B, is cabled over to the top of column D, proceeds down to the bottom of column D, proceeds sideways to the bottom of column C, and is channeled up along column C to the central bus, where the resulting data are delivered to the host system via PCI interface 1137 and PCI bus 1139. The computing elements in correlation portion of this path include computing elements 1105, 1106, 1107, and 1108 in column B, and computing elements 1113, 1114, 1115, and 1116 in column D. This correlation portion of the path is represented by paths 1307 to 1315.

Each computing element in this path 1307 to 1315 computes 3 stages of the correlation computation, while using adjacent memory elements. Each stage is a correlation determination between two census vectors. For 8 computing elements in the path, the 24 stages represent the correlation between the reference census vector and its 24 disparities. For 16 disparities, each computing element can be programmed and configured to perform 2 stages of the correlation computation. Alternatively, the 8 computing elements can perform the D (i.e., disparities) stages of the correlation computation in any combination. Note that all 8 computing elements need not be involved in the correlation computation so long as some of the computing elements are computing the correlation sums for the entire set of D disparities.

The resulting data is, in one embodiment, a 5-bit result because for a pair of 32-bit census vectors, the maximum number for a Hamming distance calculation between two 32-bit census vectors is 32 and more than likely, the value 32 will not occur, so that the values 0-31, which can be stored in 5 bits, should be sufficient. However, in some embodiments, use of saturation threshold can reduce the number of bits or wirelines needed to represent the Hamming distance. Thus, instead of 5 bits, the Hamming distance may need only 3 or 4 bits since any Hamming distance greater than 7 or 15 can be represented by the ceiling number of 7 or 15, respectively. The result is passed up to the central bus via paths 1316 to 1318. The computing elements along this path, computing elements 1112 and 1111, serve as delivery agents.

The PCI interface unit 1137 receives the result via path 1319 and provides it to the PCI bus 1139. Once available on the PCI bus, the appropriate PCI agent, usually the host processor and its memory, will read the data.

Using FPGAs, the architecture of the image processing system of the present invention can be designed to implement the desired logic operation. Using appropriate programming tools, the logic blocks in these FPGAs, and combinations of these logic blocks and FPGAs, can be configured to generate the census vectors and perform the correlation operation of the present invention.

C. Census Vector Generator

Figure 48:
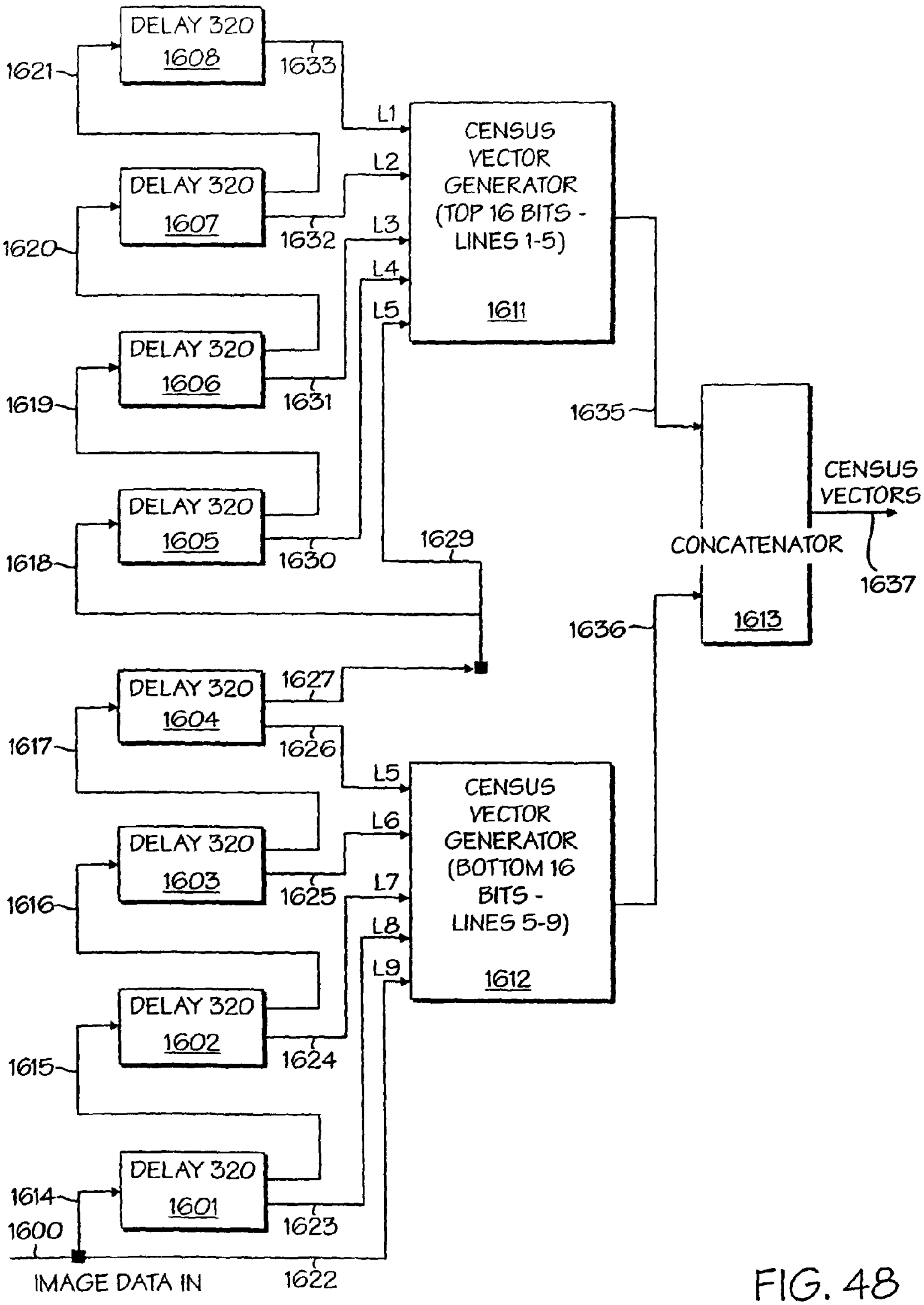
FIG. 48 shows a high level block diagram of one embodiment of the hardware implementation of the census vector generator in accordance with the present invention.

FIGS. 48-51 show one embodiment of the census vector generator in accordance with the present invention. FIG. 48 shows a high level block diagram of one embodiment of the hardware implementation of the census vector generator in accordance with the present invention. This figure shows the census vector generator for a single image. Needless to say, for a pair of images captured from two cameras, two of these census vector generators would be provided.

This census vector generator includes the image scanline delay elements, the 16-bit census vector generator for those image elements located in substantially the upper half of the census window, the 16-bit census vector generator for those image elements located in substantially the lower half of the census window, a delay element to compensate for timing differences between these two 16-bit generators, and a concatenator which combines the two separate 16-bit results to generate a 32-bit census vector. The concatenator can simply be a series of buses coming together to form a larger bus. The concatenator need not be a specific device; rather, it can represent several bus lines merging to form a larger bus line. So, for example, a pair of 16-bit wide buses put together adjacent to each other forms a larger 32-bit bus.

In the following discussion, the census vector generator will generate a 32-bit census vector by comparing the center reference image element in the census window to other image elements surrounding it in the census window. The particular image elements selected for the comparison are those shown in FIG. 7, where (x, y) is (5, 5) for the generation of the first 32-bit census vector. However, in light of the teachings below, one ordinarily skilled in the art could manipulate the circuitry described below in such a manner to select other image elements in the census window for the comparisons; that is, a different set of points in the census window could be used to generate the 32-bit census vector.

The census vector generator receives image data serially via line 1600 and outputs a 32-bit census vector on line 1637. Although the image data comes in serially, these image data on the different lines of the census window are processed in parallel. For a 9×9 census window, select image elements on nine lines must be processed to generate the 32-bit census vector for each center image element as the census window moves through the image. Appropriate delay elements 1601 to 1608 are provided to ensure that image data for all nine lines are processed substantially together in 16-bit census vector generators 1611 and 1612. That is, image data for each line (L1 to L9) are entering these 16-bit census vector generators 1611 and 1612 substantially in parallel. Because image data for these nine lines (L1 to L9) are entering in parallel, a 32-bit census vector can be generated substantially each time a new pixel of image data enters this 32-bit census vector generator. After the last census vector has been generated for a particular line of the image, reception of the next pixel of image data along the IMAGE DATA IN line 1600 results in lines L1 to L9 containing the first pixel of image data from the beginning of lines 2 to 10. Thus, this corresponds to a shift of the census window to the beginning of the next line and hence a change in the center reference image element.

This census vector generator has eight delay elements 1601 to 1608. Each delay element delays the input data for 320 time units, which is the length of a single scanline. The inputs 1614 to 1621 to each delay element 1601 to 1608, respectively, come from the outputs of the previous delay element. Thus, image data from line 1600 enters delay element 1601 via line 1614. Delay element 1601 outputs delayed image data on line 1615 to delay element 1602. Delay element 1602 outputs delayed image data on line 1616 to delay element 1603. Delay element 1603 outputs delayed image data on line 1617 to delay element 1604. Delay element 1604 outputs delayed image data on line 1627 to node 1634, line 1618, and line 1629. Node 1634 will be explained below. Image data on line 1628 and 1618 are input to delay element 1605. Delay element 1605 outputs delayed image data on line 1619 to delay element 1606. Delay element 1606 outputs delayed image data on line 1620 to delay element 1607. Delay element 1607 outputs delayed image data on line 1621 to delay element 1608. Delay element 1608 outputs image data on line 1633 to 16-bit census vector generator 1611.

The incoming image data is also input to the low 16-bit census vector generator 1612 via lines 1600 and 1622 without any intervening delay element. This input to the 16-bit census vector generator 1612 represents the image data on line 9 of the census window. Each delay element 1601 to 1608 also outputs image data directly into the respective 16-bit census vector generators 1611 or 1612. Thus, delay element 1601 outputs delayed image data on line 1623 to 16-bit low census vector generator 1612. This input to the 16-bit census vector generator 1612 represents the image data on line 8 of the census window. Delay element 1602 outputs delayed image data on line 1624 to 16-bit low census vector generator 1612. This input to the 16-bit census vector generator 1612 represents the image data on line 7 of the census window. Delay element 1603 outputs delayed image data on line 1625 to 16-bit low census vector generator 1612. This input to the 16-bit census vector generator 1612 represents the image data on line 6 of the census window.

Line 5 (L5) represents the line in the census window where the center reference image element is located in this 9×9 census window. Note that 16-bit census vector generators 1611 and 1612 both process image data on line 5 of the census window. Each 16-bit census vector generator handles image data on either the left side or the right side of the center reference image element. For the lower half of the census window, delay element 1604 outputs delayed image data on line 1626 to 16-bit low census vector generator 1612. For the upper half of the census window, delay element 1604 outputs delayed image data on lines 1627, 1628, and 1629 to 16-bit low census vector generator 1611. This input to the 16-bit census vector generator 1611 represents the image data on line 5 of the census window.

Continuing with the inputs to the top 16-bit census vector generator 1611, delay element 1605 outputs delayed image data on line 1630 to 16-bit low census vector generator 1611. This input to the 16-bit census vector generator 1611 represents the image data on line 4 of the census window. Delay element 1606 outputs delayed image data on line 1631 to 16-bit low census vector generator 1611. This input to the 16-bit census vector generator 1611 represents the image data on line 3 of the census window. Delay element 1607 outputs delayed image data on line 1632 to 16-bit low census vector generator 1611. This input to the 16-bit census vector generator 1611 represents the image data on line 2 of the census window. Delay element 1608 outputs delayed image data on line 1633 to 16-bit low census vector generator 1611. This input to the 16-bit census vector generator 1611 represents the image data on line 1 of the census window.

When the stream of image data from the ninth line enters on line 1600, the inputs L1-L5 to 16-bit census vector generator 1611 represent image data from lines 1 to 5, respectively, in the census window, and the inputs L5-L9 to 16-bit census vector generator 1612 represent image data from lines 5 to 9, respectively, in the census window. The 16-bit census vector generator 1611 generates a 16-bit vector at the output on line 1635 from a comparison of the center reference image element with 16 other image elements located in the upper half (lines 1-5) of the census window. Similarly, the 16-bit census vector generator 1612 generates a 16-bit vector at the output on line 1636 from a comparison of the center reference image element with 16 other image elements located in the lower half (lines 5-9) of the census window. In most embodiments, the upper 16 bits from generator 1611 are generated substantially at the same time as the bottom 16 bits from generator 1612.

In other embodiments, the upper 16 bits from generator 1611 are generated one time unit ahead of the bottom 16 bits from generator 1612. To compensate for this timing difference, a register or delay element can be provided on line 1635. The top 16 bits on line 1635 and the bottom 16 bits on line 1636 are concatenated in concatenator 1613 to generate the 32-bit census vector on line 1637.

By the time the census window has reached the end of the line and the 32-bit census vectors have been generated for each center image element in the moving census window, the next set of image data that is input at line 1600 represents image data from the beginning of line 10. Thus, at this point, line L9 contains line 10 image data, line L8 has line 9 image data, line L7 has line 8 image data, line L6 has line 7 image data, line L5 has line 6 image data, line L4 has line 5 image data, line L3 has line 4 image data, line L2 has line 4 image data, and line L1 has line 2 image data. Thus, the census window has now moved to the beginning of the row on the next line. As more image data come in, the census window moves down the line and more census vectors are generated. This cycle repeats until stopped by the user or no more image data enters the census vector generator.

In one embodiment, the census vector generator shown in FIG. 48 is implemented in two FPGA units. One FPGA unit generates the upper 16 bits (lines 1-5) in components and lines that process image data above node 1634. The other FPGA unit generates the lower 16 bits (lines 5-9) in components and lines that process image data below node 1634. Indeed, node 1634 represents the boundary between two FPGA units. In other embodiments, the entire 32-bit census vector generator as shown in FIG. 48 is implemented in one FPGA unit. Of course, in ASIC and custom integrated circuit implementations, FPGAs are not utilized and thus, node 1634 may merely be integral with a conducting line.

To compensate for timing differences as a result of various delays in the communication path(s), appropriate delay elements or shift registers can be provided. Exemplary locations for these shift registers include lines 1635, 1636, and/or 1627.

Figure 49:
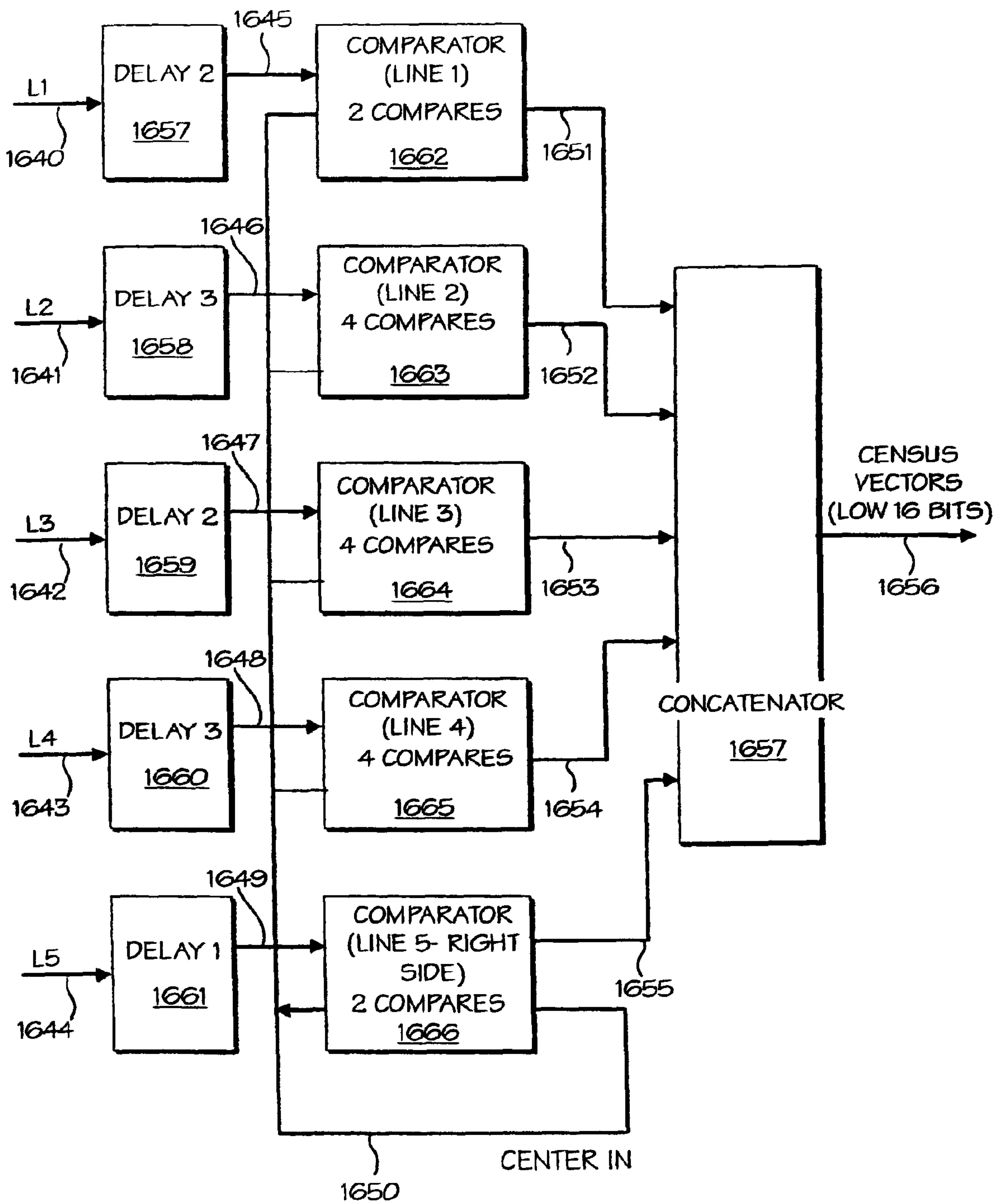
FIG. 49 shows the census vector generator for the least significant 16 bits representing the comparison result between the center reference image element with image elements located in substantially the upper half of the census window.

FIG. 49 shows the census vector generator 1611 (see FIG. 48) for the least significant 16 bits representing the comparison result between the center reference image element and the image elements located in substantially the upper half (lines 1-5) of the census window. The census vector generator 1611 (see FIG. 48) has 5 inputs (L1, L2, L3, L4, and L5) and generates the 16 least significant bits of the 32-bit census vector at output line 1665. These 16 bits are derived from a comparison of the center reference image element to the other image elements located in the upper half of the census window. In particular, image elements from lines 1 to 4 and two image elements in line 5 from the right side of the center reference image element are used for the comparison.

The 16-bit census vector generator includes several delay elements 1657-1661, comparators 1662-1666, and a concatenator 1667. The delay elements 1657-1661 ensure that the desired combination of image elements in lines 1 to 5 are selected for the census comparison. The comparators 1662-1666 perform the comparison operation to generate the bits for the census vectors. These comparators also incorporate relatively varying numbers of delay elements to ensure that the particular desired image elements in lines 1 to 5 are selected for the census comparison. The concatenator combines the various output census bits from each line and orders them to generate the 16-bit census vector for lines 1-5 of this census window.

Image data from each line enters this 16-bit census vector generator through lines 1640-1644. Thus, image data from line 1 enters delay element 1657 via line 1640, image data from line 2 enters delay element 1658 via line 1641, image data from line 3 enters delay element 1659 via line 1642, image data from line 4 enters delay element 1660 via line 1643, and image data from line 5 enters delay element 1661 via line 1644.

The delay elements 1662-1666 control the timing of the image data entry into the comparators 1662-1666. Thus, delay element 1657 outputs image data to comparator 1662 on line 1645, delay element 1658 outputs image data to comparator 1663 on line 1646, delay element 1659 outputs image data to comparator 1664 on line 1647, delay element 1660 outputs image data to comparator 1665 on line 1648, and delay element 1661 outputs image data to comparator 1666 on line 1649. The comparators themselves incorporate their own set of delay elements so that the particular image data among the image data that have already entered these comparators can be selected for the census comparison. In one embodiment, the delay elements are registers or D flip-flops which outputs the input data at selected clock edges.

The amount of delay in each of the delay elements 1657-1661 is carefully selected so that the entry of image data into the comparators 1662-1666 relative to the other image elements in the other lines is controlled. The delays shown in FIG. 49 have been selected for this particular embodiment so that the particular image data selected for the census comparison ultimately coincides with that of FIG. 7. This particular 16-bit census vector generator selects points 1-14, 17, and 18 in FIG. 7. Thus, delay element 1657 provides two time unit delays, delay element 1658 provides three time unit delays, delay element 1659 provides two time unit delays, delay element 1660 provides three time unit delays, and delay element 1661 provides one time unit delay. In one embodiment, one time unit is one clock cycle and the delay element changes at every rising edge of the clock. In other embodiments, the delay element is triggered at every falling edge of the clock.

Comparators 1662-1666 compare selected image elements in lines 1-5 of the census window to the center reference image element in the census window. Depending on the number of image elements that are selected for each line in the census window, different numbers of individual comparator units are implemented in each comparator 1662-1666. Thus, comparator 1662 includes 2 comparator units because 2 image elements are selected in line 1 of the census window, comparator 1663 includes 4 comparator units because 4 image elements are selected in line 2 of the census window, comparator 1664 includes 4 comparator units because 4 image elements are selected in line 3 of the census window, comparator 1665 includes 4 comparator units because 4 image elements are selected in line 4 of the census window, and comparator 1666 includes 2 comparator units because 2 image elements are selected in line 5 of the census window.

The comparisons are conducted for each selected image element in the census window with the center reference image element. The center reference image element for each census window is provided at the output 1650 of comparator 1666, which also processes line 5 of the census window where the center reference image element is located. This output is fed back into another set of inputs to each of the comparators 1662-1666 so that the requisite comparisons can be made. When a new set of image data enters the comparators 1662-1666, the census window has shifted to a new location and hence, a new center reference image element is used for the comparisons.

The results of the comparisons are output on lines 1651-1655. Concatenator 1667 arranges these bits in order so that the output at line 1656 contains the LSB 16-bit census vector. Thus, half of the full 32-bit census vector has been generated.

Figure 50:
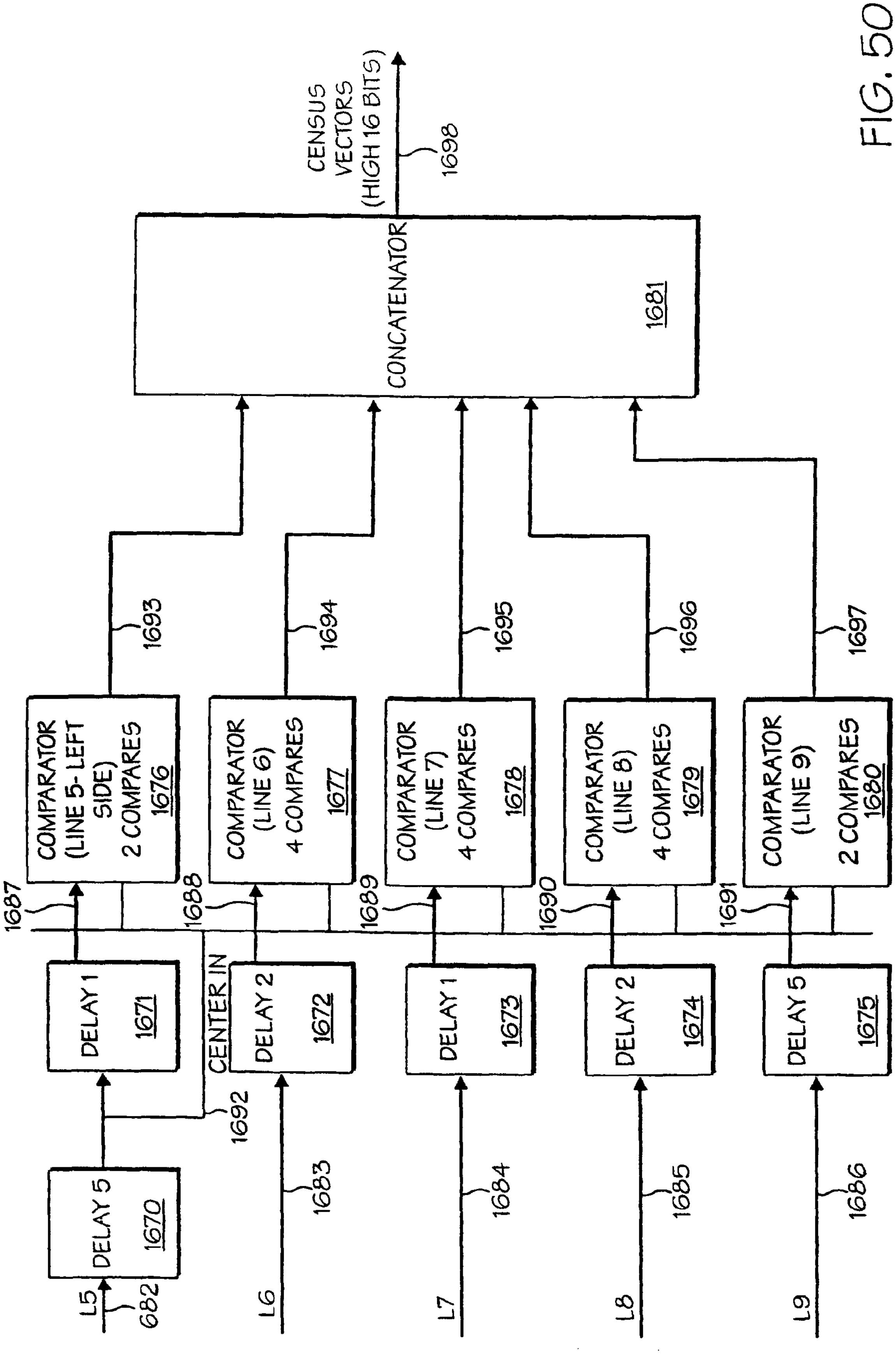
FIG. 50 shows the census vector generator for the most significant 16 bits representing the comparison result between the center reference image element with image elements located in substantially the lower half of the census window.

FIG. 50 shows the census vector generator 1612 (see FIG. 48) for the most significant 16 bits representing the comparison result between the center reference image element with image elements located in substantially the lower half (lines 5-9) of the census window. The census vector generator 1612 (see FIG. 48) has 5 inputs (L5, L6, L7, L8, and L9) and generates the 16 most significant bits of the 32-bit census vector at output line 1698. These 16 bits are derived from a comparison of the center reference image element to the other image elements located in the lower half of the census window. In particular, image elements from lines 6 to 9 and two image elements in line 5 from the left side of the center reference image element are used for the comparison.

The 16-bit census vector generator includes several delay elements 1670-1675, comparators 1676-1680, and a concatenator 1681. The delay elements 1670-1675 ensure that the desired combination of image elements in lines 5 to 9 are selected for the census comparison. The comparators 1676-1680 perform the comparison operation to generate the MSB bits for the census vectors. These comparators also incorporate relatively varying numbers of delay elements to ensure that the particular desired image elements in lines 5 to 9 are selected for the census comparison. The concatenator 1681 combines the various output census bits from each line and orders them to generate the 16-bit census vector for lines 5-9 of this census window.

Image data from each line enters this 16-bit census vector generator through lines 1682-1686. Thus, image data from line 5 enters delay element 1670 via line 1682, image data from line 6 enters delay element 1672 via line 1683, image data from line 7 enters delay element 1673 via line 1684, image data from line 8 enters delay element 1674 via line 1685, and image data from line 9 enters delay element 1675 via line 1686.

A further delay element 1671 is provided at the output of delay element 1670. Although 6 delay elements are required for this line 5, the image data at the output of delay element 1970 must be extracted via line 1692 for use as the center reference image element in the comparisons.

The delay elements 1670-1675 control the timing of the image data entry into the comparators 1676-1680. Thus, delay element 1670 and 1671 output image data to comparator 1676 on line 1687, delay element 1672 outputs image data to comparator 1677 on line 1688, delay element 1673 outputs image data to comparator 1678 on line 1689, delay element 1674 outputs image data to comparator 1679 on line 1690, and delay element 1675 outputs image data to comparator 1680 on line 1691. The comparators themselves incorporate their own set of delay elements so that the particular image data among the image data that has already entered these comparators can be selected for the census comparison. In one embodiment, the delay elements are registers or D flip-flops which outputs the input data at selected clock edges.

The amount of delay in each of the delay elements 1670-1675 is carefully selected so that the entry of image data into the comparators 1676-1680 relative to the other image elements in the other lines is controlled. The delays shown in FIG. 50 has been selected for this particular embodiment so that the particular image data selected for the census comparison ultimately coincides with that of FIG. 7. This particular 16-bit census vector generator selects points 15, 16, and 19-32 in FIG. 7. Thus, delay element 1670 provides five time unit delays, delay element 1671 provides one time unit delay, delay element 1672 provides two time unit delays, delay element 1673 provides one time unit delay, delay element 1674 provides two time unit delays, and delay element 1675 provides five time unit delays.

Comparators 1676-1680 compare selected image elements in lines 5-9 of the census window to the center reference image element in the census window. Depending on the number of image elements that are selected for each line in the census window, different numbers of individual comparator units are implemented in each comparator 1676-1680. Thus, comparator 1676 includes 2 comparator units because 2 image elements are selected in line 5 of the census window, comparator 1677 includes 4 comparator units because 4 image elements are selected in line 6 of the census window, comparator 1678 includes 4 comparator units because 4 image elements are selected in line 7 of the census window, comparator 1679 includes 4 comparator units because 4 image elements are selected in line 8 of the census window, and comparator 1680 includes 2 comparator units because 2 image elements are selected in line 9 of the census window.

The comparisons are conducted for each selected image element in the census window with the center reference image element. The center reference image element for each census window is provided at the output 1692 of delay element 1970 on line 5 of the census window. This output is provided to another set of inputs to each of the comparators 1676-1680 so that the requisite comparisons can be made. When a new set of image data enters the inputs 1682-1686, the census window has shifted to a new location and hence, a new center reference image element is used for the comparisons.

The results of the comparisons are output on lines 1693-1697. Concatenator 1681 arranges these bits in order so that the output at line 1698 contains the MSB 16-bit census vector. Thus, the other half of the full 32-bit census vector has been generated.

Figure 51:
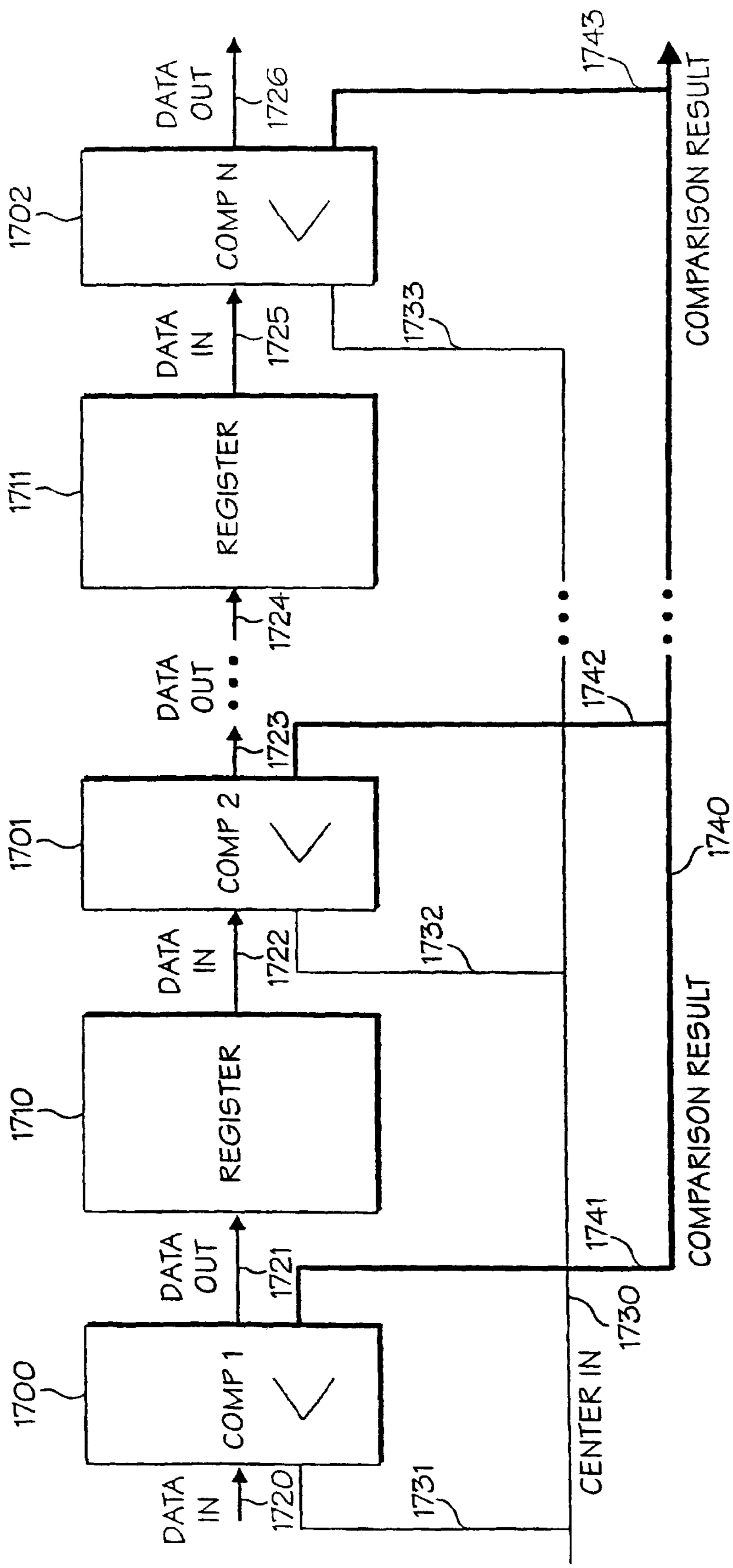
FIG. 51 shows the series of comparators and register elements that are used to compute the 32-bit census vector for each line in the census window.

FIG. 51 shows a more detailed view of the comparators 1662-1666 (see FIG. 49) and 1676-1680 (see FIG. 50) used to compute the 32-bit census vector for each line in the census window. Image data enters at line 1720, comparisons are performed with the center reference image element which enters at lines 1730-1733, and the result of the census comparison is provided at lines 1740-1743 at the output of each comparator unit 1700-1702. Unprocessed image data are also passed through the comparator units to output 1726.

Each comparator includes a number of comparator units 1700, 1701, and 1702 for comparator unit 1, comparator unit 2, and comparator unit N, respectively, where N is the number of image elements in a line that will be used for the comparisons. Thus, for lines 1 and 9, only two image elements are selected for the census comparisons so N=2 and only two comparator units 1700 and 1701 are provided. For line 3, four image elements are selected for the census comparisons so N=4 and only four comparator units are provided.

To ensure that the particular desired image element in each line is selected for the census comparisons for each census window, delay elements 1710 and 1711 are provided. These delay elements may be registers or D flip-flops. In one embodiment, the amount of the delay in each delay unit is a single time unit. Other embodiments may incorporate other time unit delays depending on the particular image data desired for the comparison. In this embodiment, a delay element is provided between each comparator unit 1700-1702. In other embodiments, some delay elements may not be present between some comparator units 1700-1702. These delay elements and comparator units are coupled to each other via lines 1721-1725.

For comparator 1666 in line 5 of FIG. 49, an additional delay element is provided at the output 1726 in the comparator circuit diagram of FIG. 51 so that the correct center reference image element is fed back to the input of each of the comparators 1662-1666.

To illustrate the operation of this comparator circuit in FIG. 51, assume a 9×9 census window and first 32-bit census vector is now being generated. The center reference point is at location (5, 5); that is, the center point is located at column 5 and row/line 5. Image data associated with image element 5 is provided at lines 1730-1733 to each of the comparator units 1700-1702. Thus, for line 2, image data associated with image element 7 is provided at input 1720 to comparator unit 1700, image data associated with image element 5 is provided at input 1722 to comparator unit 1701, image data associated with image element 3 is provided at the input to the next comparator unit (not shown), and finally, image data associated with image element 1 is provided at input 1725 to comparator unit 1702. If the center reference image data is less than the input image data, then a logic "1" is output on the comparison result lines 1740-1743. If not, a logic "0" is provided at these comparison result lines. These comparison result data are concatenated to generate the 32-bit census vectors.

D. Correlation Sum Generator

Figure 52:
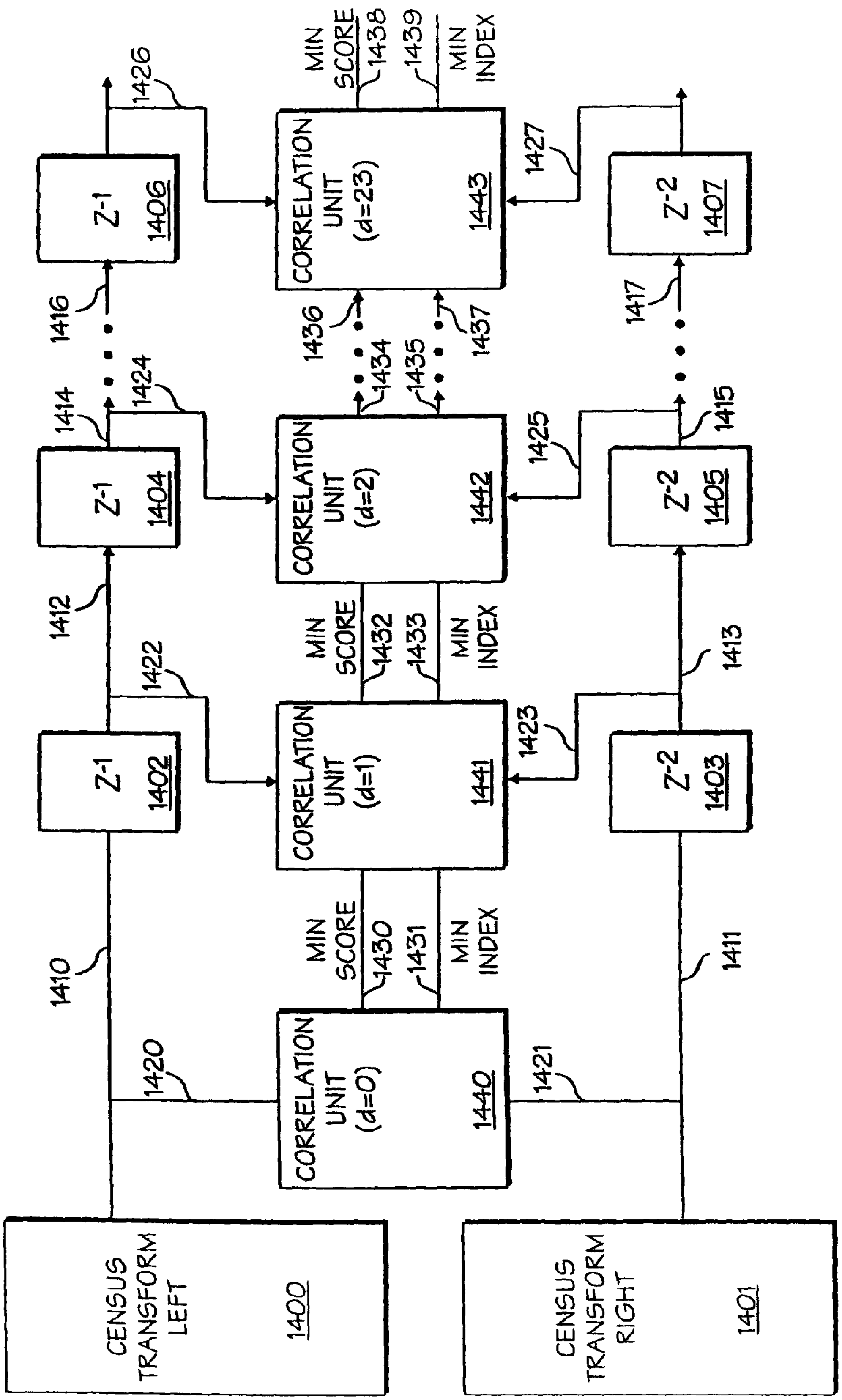
FIG. 52 shows a high level data flow of the correlation computation and optimal disparity determination.
Figure 54:
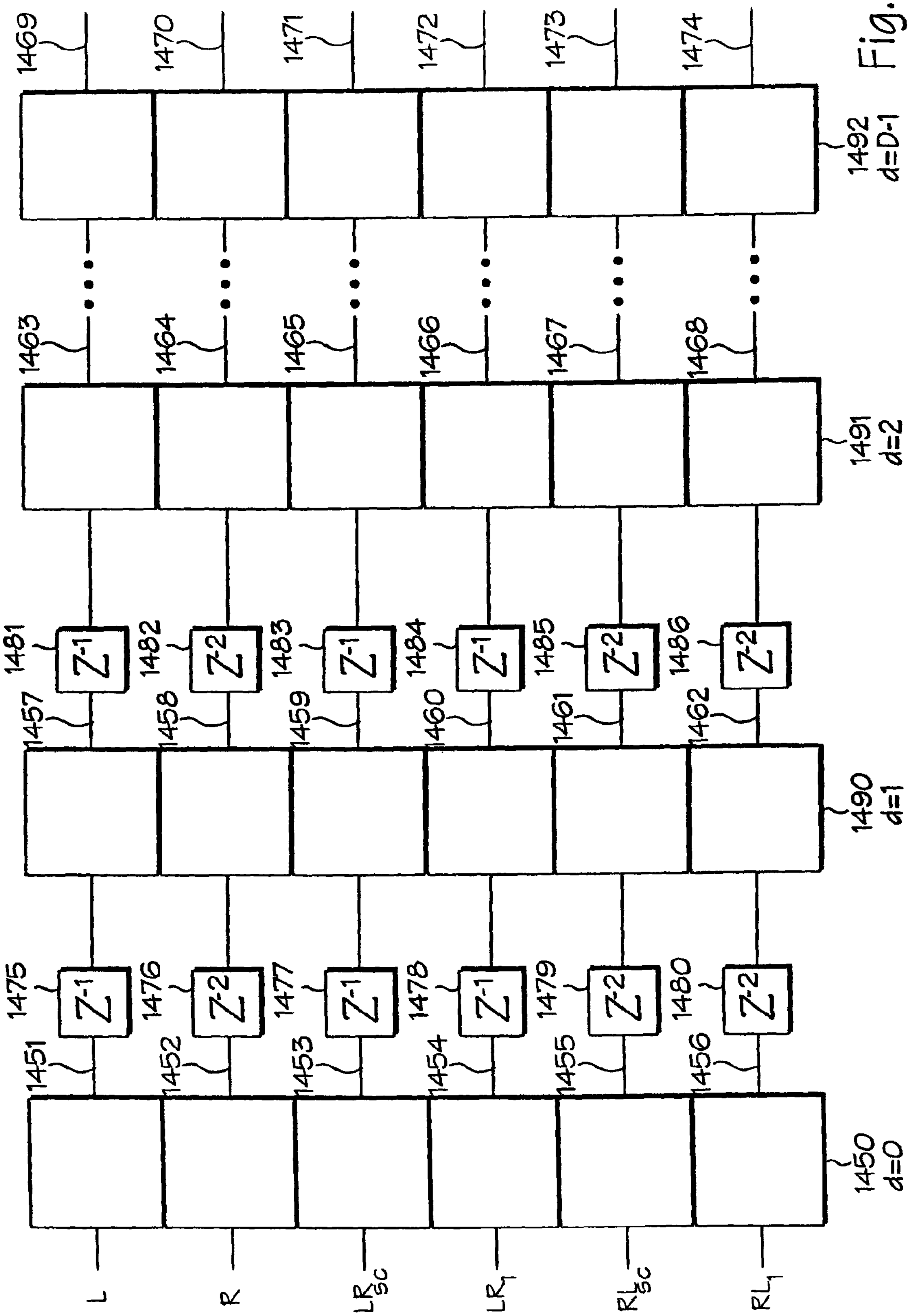
FIG. 54 shows a block diagram of the parallel pipelined architecture of one embodiment of the present invention.

As shown in FIGS. 52 and 54, one embodiment of the present invention can be implemented in a fully pipelined, parallel, and systolic fashion. The particular embodiment illustrated in FIG. 52 assumes standard form. FIG. 52 shows 24 stages of the correlation computation. For 24 disparities, 24 stages are provided in this embodiment. However, in other embodiments, the number of stages do not need to correspond to the number of disparities.

The computing elements in FIGS. 46 and 47, particularly the ones in columns B and D, perform the computations in these 24 stages. Typically, each of the eight computing elements in columns B and D performs the computations for three of the stages. Using census transform units, correlation units, and delay elements, this embodiment of the present invention compares the census vectors of each pixel of one image with the census vectors of each pixel in the other image within each pixel's search window. That is, the search window for a pixel in one image contains shifted pixels in the other image for each of the allowable disparities. For 24 disparities, the farthest pixel displacement between a pixel in one image with a pixel in the other image within the search window is 23 pixel displacements. Ultimately, this embodiment outputs the min score which represents the lowest summed Hamming distance determination from the comparisons and the min index which represents the disparity number associated with this lowest summed Hamming distance determination.

Image data from the left camera are designated as the reference. As pixels from the left and right cameras come into the image processing system, the system provides the data to two parallel census transform units 1400 and 1401. Census transform unit 1400 generates the census vector for the left pixel and census transform unit 1401 generates the census vector for the right pixel. Indeed, census transform units 1400 and 1401 generate streams of census vectors for each pair of pixel data in corresponding locations in the left and right images. In the first stage, the census vectors are delivered to correlation unit 1440 via lines 1410 and 1420 for the left pixel, and lines 1411 and 1421 for the right pixel. The correlation unit 1440 computes the Hamming distance between these two vectors which represent the disparity 0 correlation of these two census vectors. The correlation unit 1440 also generates the Hamming distance and outputs it at line 1430 and outputs the disparity number at line 1431 for the minimum summed Hamming distance and the associated disparity number, respectively, for all comparisons performed up to this point. Up to this point, the min score is the Hamming distance of the two vectors for disparity 0. This same census transform vector for the left pixel is compared to all other census vectors in its search window representing the D disparities of this left pixel as it moves down the pipe to other correlation units. In one embodiment, 24 disparities are used so 24 comparisons must be made for each pixel for the right image. In other embodiments, 16 disparities are used. However, the number of disparities can be any number and is user selectable.

In this embodiment, each correlation unit also includes a single delay element ($z^{-1}$) for the data path carrying the minimum summed Hamming distance (MIN SCORE) and another delay element ($z^{-1}$) for the data path carrying its associated disparity number (MIN INDEX). In other embodiments, the delay elements ($z^{-1}$) are external to the correlation units and positioned between the correlation units in the data paths of the MIN SCORE and MIN INDEX. Thus, every two clock cycles, the same left pixel (through its census vector) is compared with a different right pixel (through its census vector), the minimum summed Hamming distance is updated, and the disparity number associated with the minimum summed Hamming distance is also updated. These operations are performed in the pipeline as the stream of left and right census vectors are fed into the correlation units and delay elements. The single and double delays of the left and right census vectors, respectively, allow such comparisons in each pixel's respective search windows to be made. At the end of the last correlation unit 1443, all comparisons that are required for the various right pixels in the search window of a left pixel have been made and the MIN SCORE and MIN INDEX are output.

In one embodiment, the output is stored in an extremal index array which keeps track of all optimal disparities for all relevant right-to-left comparisons. This extremal index array can be used later for the left-to-right consistency check, mode filtering, and generating the disparity image for various applications.

In another embodiment, the right-to-left and left-to-right comparisons are performed concurrently in parallel using the same data path as shown in FIG. 52 and the outputs of the last correlation unit 1443 store the optimal disparities selected for each left and right pixel in a queueing buffer so that a consistency check can be performed in real-time as the data is processed and passes through the parallel pipelined data paths. This will be described below in conjunction with FIGS. 53, 54, 55, and 57. In this embodiment, no such storage of all left-right consistency check results is necessary unless the results are being passed on to another processor for some application or some historical record is desired.

In one embodiment, logic blocks such as the configuration logic blocks of the Xilinx FPGAs implement the logic functions. As known to those skilled in the art, these logic blocks and logic functions can be represented in other ways. At a lower level, the delay elements can be represented by a register or a D flip-flop per bit of data. If a single clocking signal is used, appropriate divide-by-two circuitry can be implemented at the clock input to the single time unit delay elements (i.e., the delay elements along the path used by the census vectors for the disparity-shifted left pixels) and no such division circuitry is used at the clock input to the two time unit delay elements so that the proper shifting can occur and the correct pair of data are compared at each stage. Alternatively, appropriate multiply circuits can be used at the clock input to the two time unit delay elements and no such multiply circuitry is used at the clock input to the single time unit delay elements. These clock signal modifying circuits ensure that the data at the input to the D flip flops are shifted to the output at the appropriate time for the comparison operation.

The correlation elements can be represented by an exclusive-OR logic operation to determine the differing bit positions, a bit counter to add the differing bits to compute the Hamming distance bits and represent them with an n-bit (e.g., n=5) number, several adders for the box filtering operation, and several comparators and multiplexers to compare the value of the current min score with the newly generated Hamming distance to determine the lower of the two values. Alternatively, a saturation threshold device can be used to reduce the number of bits from n=5 to n=3 or n=4 to represent the Hamming distance. Appropriate clocking circuitry can be provided to ensure that the correlation operation is performed for the input data at every two time units, so that the census vectors for the appropriate pixels are shifted in for the comparison. In another embodiment, no such clocking circuitry is needed to ensure the proper relative delays between the left and right image census vectors; rather, two delay elements for the right image data path while only a single delay element is used for the left image data path at the inputs to each correlation unit (except for the first correlation unit 1440 which represents the disparity 0 unit).

Figure 53A:
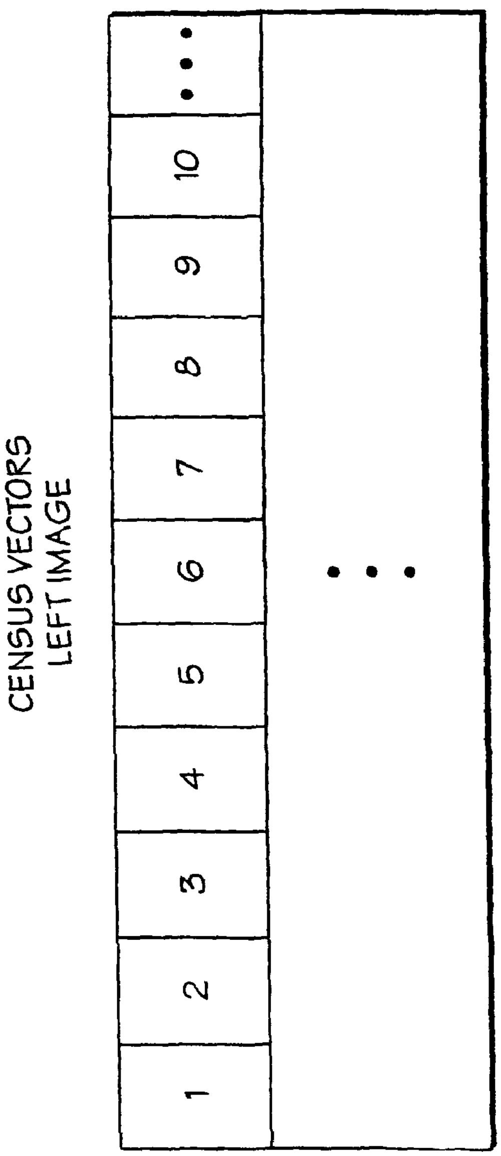
FIGS. 53(A) and 53(B) show the left and right census vectors for the left and right images which will be used to describe the parallel pipelined data flow of one embodiment of the present invention.
Figure 53B:
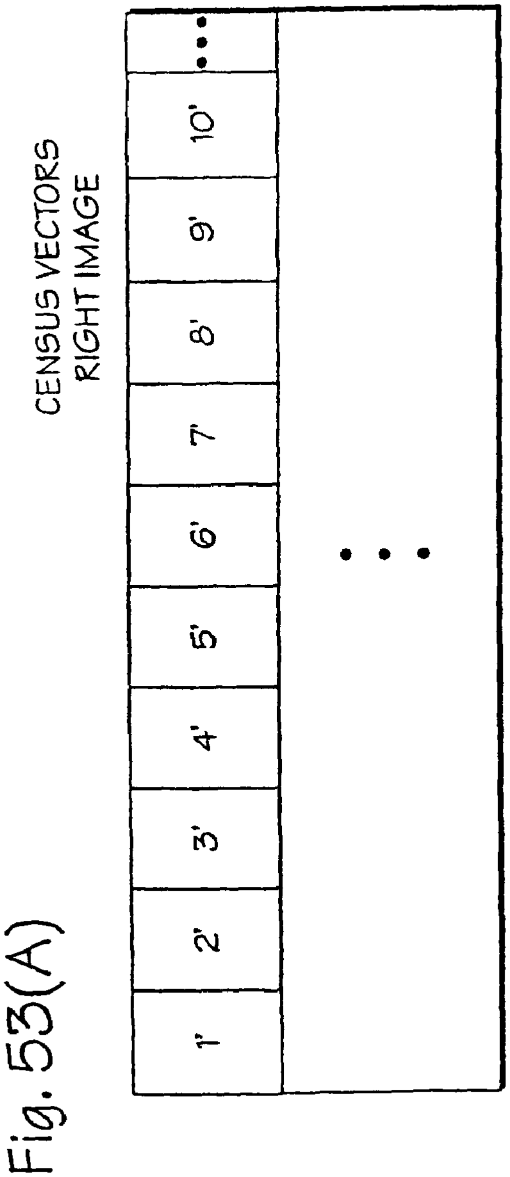

FIGS. 53(A) and 53(B) show the left and right census vectors for the left and right images for two cameras that are spaced from each other but viewing and capturing the same scene. These figures will be used to describe the parallel pipelined data flow of one embodiment of the present invention. FIG. 53(A) shows the left census vectors. Each vector is represented by a number. For pedagogic purposes, only 15 left census vectors, 1-15, are provided in a scan line. Similarly, the FIG. 53(B) shows the right census vectors 1'-15'. In this illustration and accompanying discussion, the primed (') numbers represent the right image and the unprimed numbers represent the left image. Also for pedagogic purposes, the discussions with respect to FIGS. 54 and 55 will assume that the search window is only disparity 5 (D=5) long; that is, each relevant census vector in one image will be compared with only 5 other census vectors (disparities d=0, 1, 2, 3, and 4) in the other image.

FIG. 54 shows a block diagram of the parallel pipelined correlation architecture of one embodiment of the present invention. Correlation units 1450, 1490, 1491, 1492, and other correlation units (as necessary depending on the size of the search window, i.e., disparity) are shown receiving data and outputting other data. The 15 left census vectors shown in FIG. 53(A) and the 15 right census vectors shown in FIG. 53(B) will be delivered to these correlation units. For disparity D=5, 5 correlation units will be used. Thus, correlation unit 1450 performs the correlation operation for disparity 0 (d=0), correlation unit 1490 performs the correlation operation for disparity 1 (d=1), correlation unit 1491 performs the correlation operation for disparity 2 (d=2), and so on until correlation unit 1492 which performs the correlation operation for disparity D−1 (d=D−1). For D=5, correlation unit 1492 performs the correlation operation for disparity 4 (d=4).

The inputs to each correlation unit is the left census vector (L), right census vector (R), the left-to-right minimum summed Hamming distance score (LRsc), the left-to-right disparity number or index associated with the left-to-right minimum summed Hamming distance ($LR_I$), the right-to-left minimum summed Hamming distance score ($RL_{SC}$), and the right-to-left disparity number or index associated with the right-to-left minimum summed Hamming distance ($RL_I$). The initial values for $LR_{SC}$, $LR_I$, $RL_{SC}$, and $RL_I$ prior to processing in the correlation units can be set to a very high number that is higher than the highest possible number for these values. This way, the calculated results from the first correlation unit will be selected as the optimal values after the first correlation comparison which can then be updated by other correlation units as more optimal values are determined down the pipeline.

Between the correlation units, several delay elements are provided. These delay elements are typically D flip-flops. Single delay elements are provided between the respective data paths for the left census vectors (L), and the left-to-right index ($LR_I$) and score ($LR_{SC}$). Double delay elements are provided between the respective data paths for the right census vectors (R), and the right-to-left index ($RL_I$) and score ($RL_{SC}$). Thus, output 1451 is coupled to single delay element 1475; output 1452 is coupled to double delay element 1476; output 1453 is coupled to single delay element 1477; output 1454 is coupled to single delay element 1478; output 1455 is coupled to double delay element 1479; output 1456 is coupled to double delay element 1480. The outputs of these delay elements are coupled to inputs to their respective L, R, $LR_{SC}$, $LR_I$, $RL_{SC}$, and $RL_I$ for the next correlation unit 1490. Similarly, output 1457 is coupled to single delay element 1481; output 1458 is coupled to double delay element 1482; output 1459 is coupled to single delay element 1483; output 1460 is coupled to single delay element 1484; output 1461 is coupled to double delay element 1485; output 1462 is coupled to double delay element 1486. The outputs of these delay elements are coupled to inputs to their respective L, R, $LR_{SC}$, $LR_I$, $RL_{SC}$, and $RL_I$ for the next correlation unit 1491. This same delay element configuration is used between correlation units for the remaining correlation units. The final outputs 1469, 1470, 1471, 1472, 1473, and 1474 are shown at the output of correlation unit 1492.

Figure 55:
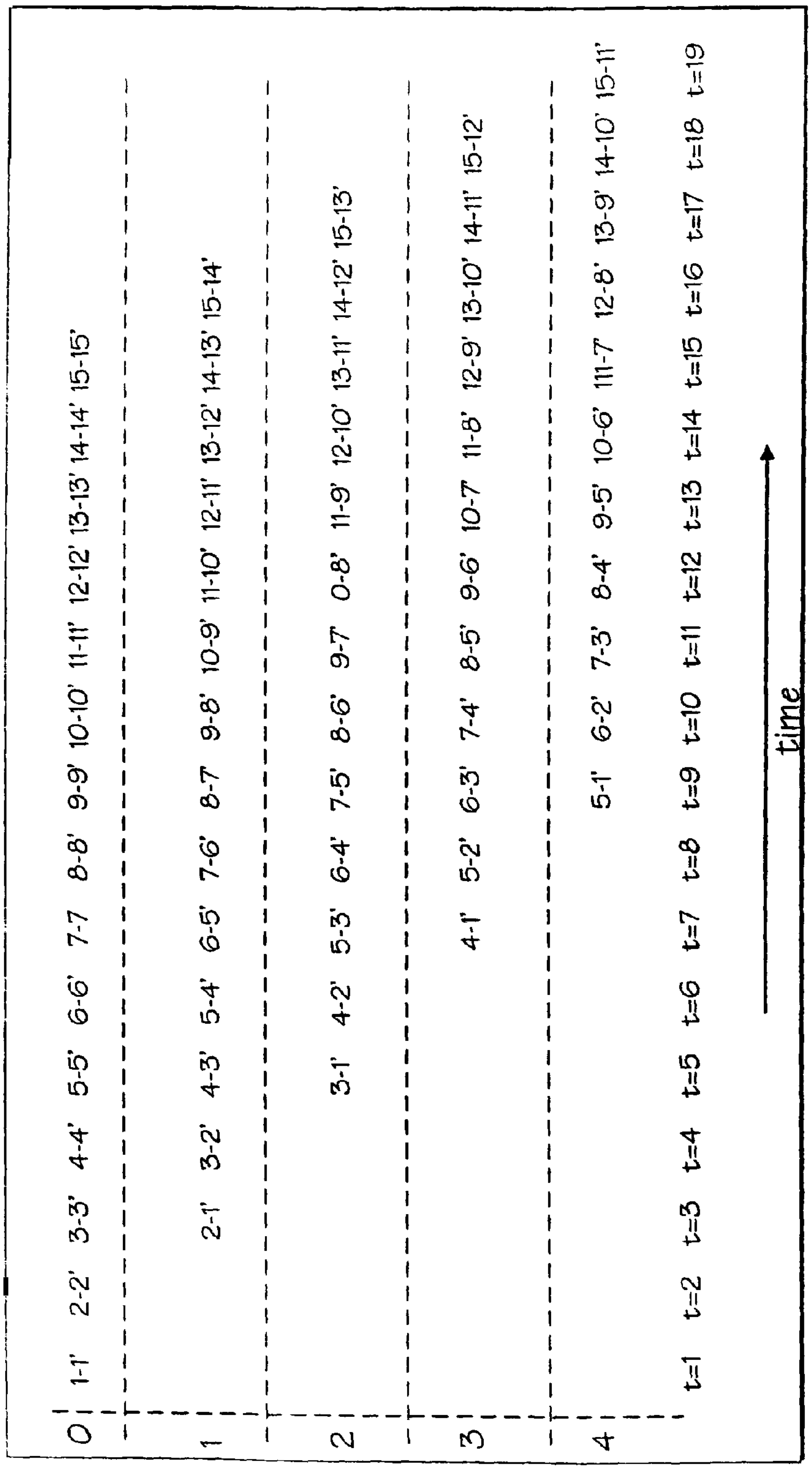
FIG. 55 shows a pseudo-timing diagram of how and when the left and right census vectors advance through the correlation units when D=5.

FIG. 55 shows the pipelining and parallel operation of one embodiment of the present invention. This figure shows a pseudo-timing diagram of how and when the left and right census vectors advance through the correlation units when disparity D=5. As indicated, the horizontal "axis" is time while the vertical "axis" is the correlation units. Thus, for any given instant in time, this figure shows which census vectors of one image are compared to the census vectors within its search window of the other image in each correlation unit. Referring also to FIG. 53 in this example, 15 left census vectors and 15 right census vectors will be used for the scan line. Thus, only left census vectors 5 to 15 and right census vectors 1' to 11' will have disparity-shifted census vectors in their respective search windows. So, for example, left census vector 5 will have right census vectors 1', 2', 3', 4', and 5' in its search window for the correlation computation. Left census vector 4 has only 1', 2', 3', and 4' in its search window and because this is not a complete set for 5 disparities, left census vector 4 will be ignored for the left-to-right comparisons. Similarly, right census vector 1' will have left census vectors 1, 2, 3, 4, and 5 in its search window for the correlation computation. Right census vector 12' has only 12, 13, 14, and 15 in its search window and because this is not a complete set for 5 disparities, right census vector 12' will be ignored for the right-to-left comparisons. In the discussion below, reference is also made to FIG. 54.

At time t=1 in FIG. 55, left census vector 1 (input at L) and right census vector 1' (input at R) are compared with each other in the disparity 0 correlation unit (i.e., correlation unit 1450 in FIG. 54). In addition to the comparison, saturation threshold, edge condition identification, and box filtering (to be discussed below) are performed. At this point, the Hamming sum calculated for 1-1' is considered the most optimal since this is the only comparison that was performed thus far. The other correlation units down the pipe either contain census vectors from a previous set of census vector data streams (e.g., a previous scan line) or nothing. Hence LRsc is the Hamming sum for 1-1', $LR_I$ is 0, $RL_{SC}$ is the Hamming sum for 1-1', and $RL_I$ is 0.

At time t=2 in FIG. 55, left census vector 1 along with the minimum left-right score and index ($LR_{SC}$, $LR_I$) have traveled to the next correlation unit (d=1) while the right census vector 1' along with the minimum score and index ($RL_{SC}$, $RL_I$) are in the double delay element 1476 between correlation unit 1450 (disparity 0) and correlation unit 1490 (disparity 1). No usable correlation operation is performed in correlation unit 1490 because it contains only the left census vector 1 and no right census vector. Similarly, the left-right index and score are not usable because left census vector 1 does not have any usable right census vectors in its search window. Correlation unit 1450 now contains the next pair of left and right census vectors, 2-2'. The correlation operation is performed for this new pair of census vectors in correlation unit 1450.

At time t=3 in FIG. 55, left census vector 2 has traveled to correlation unit 1490 (disparity 1). Right census vector 1', which was previously in the double delay element 1476, has also traveled to this same correlation unit. The right-to-left minimum score and index ($RL_{SC}$, $RL_I$) in this double delay element 1476 have also moved into this same correlation unit. The correlation operation between left census vector 2 and right census vector 1' is performed. Note that at this point, right census vector 1' has been compared with left census vectors 1 and 2 in correlation units 1450 (at time 0) and correlation unit 1490 (at current time 3). Thus, two of the five vectors in its search window have been processed. The newly calculated correlation result is compared with the previously calculated right-to-left minimum score and index ($RL_{SC}$, $RL_I$) and updated if the newly calculated correlation result is lower than the previously calculated correlation result. Left census vector 3 is also compared with right census vector 3' in correlation unit 1450.

At time 4 in FIG. 55, left census vector 4 is compared with right census vector 4' in correlation unit 1450. Left census vector 3 is also compared with right census vector 2' in correlation unit 1490. Right census vector 1' along with the minimum score and index ($RL_{SC}$, $RL_I$) have traveled to the double delay element 1486.

At time 5 in FIG. 55, left census vector 3 has traveled to correlation unit 1491 (disparity 2). Right census vector 1', which was previously in the double delay element 1486, has also traveled to this same correlation unit. The right-to-left minimum score and index ($RL_{SC}$, $RL_I$) in this double delay element 1486 have also moved into this same correlation unit. The correlation operation between left census vector 3 and right census vector 1' is performed. Note that at this point, right census vector 1' has been compared with left census vectors 1, 2, and 3 in correlation units 1450 (at time 0), correlation unit 1490 (at time 3), and correlation unit 1491 (at current time 5). Thus, three of the five vectors in its search window have been processed. The newly calculated correlation result is compared with the previously calculated right-to-left minimum score and index ($RL_{SC}$, $RL_I$) and updated if the newly calculated correlation result is lower than the previously calculated correlation result. Left census vector 5 is also compared with right census vector 5' in correlation unit 1450, and left census vector 4 is compared with right census vector 3' in correlation unit 1490.

Here, at time t=5 in FIG. 55, the first usable comparison for a left census vector with a right census vector in its search window has been performed. Here, left census vector 5 has been compared with right census vector 5' which is a disparity 0 census vector in its search window. Like the right census vectors and the right-to-left minimum score and index ($RL_{SC}$, $RL_I$) which travel down the pipeline to be updated by each correlation unit, the left census vector 5 also travels down the pipe with left-to-right index ($LR_I$) and score (LRsc) while it is updated with each right census vector in its search window. Unlike the right census vectors, the correlation and updating for the left census vectors occur at each time period because these vectors and their corresponding left-to-right data ($LR_{SC}$, $LR_I$) are traveling down through only single delay elements, while the right census vectors and their corresponding right-to-left data ($RL_{SC}$, $RL_I$) are traveling down the data path through double delay elements.

Note that at times t=2 and t=4 in FIG. 55, right census vector 2' has been compared with left census vectors 2 and 3 in correlation units 1450 (disparity 0) and 1490 (disparity 1). These left census vectors 2 and 3 are two of the five left census vectors in the search window for right census vector 2'. These correlation operations for right census vector 2' have been performed concurrently with the correlation operations for 1'. The right-to-left minimum score and index ($RL_{SC}$, $RL_I$) have also been traveling with right census vector 2' down the pipeline delayed from that of right census vector 1'.

Analogously, note that at times t=3 and t=5 in FIG. 55, right census vector 3' has been compared with left census vectors 3 and 4 in correlation units 1450 (disparity 0) and 1490 (disparity 1). These left census vectors 3 and 4 are two of the five left census vectors in the search window for right census vector 3'. These correlation operations for right census vector 3' have been performed concurrently with the correlation operations for 1' and 2'. The right-to-left minimum score and index ($RL_{SC}$, $RL_I$) have also been traveling with right census vector 3' down the pipeline delayed from those of right census vectors 1' and 2'.

These parallel pipelined correlation operations are performed for the stream of census vectors entering from inputs L and R. The correlation operations are performed in the various correlation units and at various times as shown in FIG. 55 from t=1 to t=19 for this particular example where only 15 census vectors for the left and right images are compared in this scanline for disparity D=5.

Beginning at time t=9 in FIG. 55, a complete set of correlation results are available for a right census vector and each of the left census vectors in its search window. Thus, right census vector 1' has been compared to left census vectors 1, 2, 3, and 4 in previous correlation units and left census vector 5 in the current correlation unit. The output of correlation unit 1492 is the left census vector (L), right census vector (R), the left-to-right minimum summed Hamming distance score (LRsc), the left-to-right disparity number or index associated with the left-to-right minimum summed Hamming distance ($LR_I$), the right-to-left minimum summed Hamming distance score ($RL_{SC}$), and the right-to-left disparity number or index associated with the right-to-left minimum summed Hamming distance ($RL_I$). From this point forward, optimal left-right and right-left indices (disparities) are output for storage in a queueing buffer which will be used for the left-right consistency check.

The queueing buffers for the left-right consistency check will now be discussed with reference to FIG. 56. The left-to-right minimum summed Hamming distance index ($LR_I$) and the right-to-left minimum summed Hamming distance index ($RL_I$) at the output of this last correlation unit 1492 is stored in two queueing buffers, one for the left-to-right index ($LR_I$) and the other for the right-to-left index ($RL_I$). In one embodiment of this queueing buffer, a pointer is used to designate the storage location. In another embodiment, the queueing buffer is a first-in first-out (FIFO) buffer where the data being stored is entered at the top of the stack and is shifted down toward the bottom of the stack as new data comes in at the top. In one embodiment, the size of each buffer is the disparity height (D) so that for five disparities (D=5), 5 buffer locations are provided. In other embodiments, the size of the queueing buffer is twice the disparity D so that for D=5, the queueing buffer has 10 memory locations.

Figure 56A:
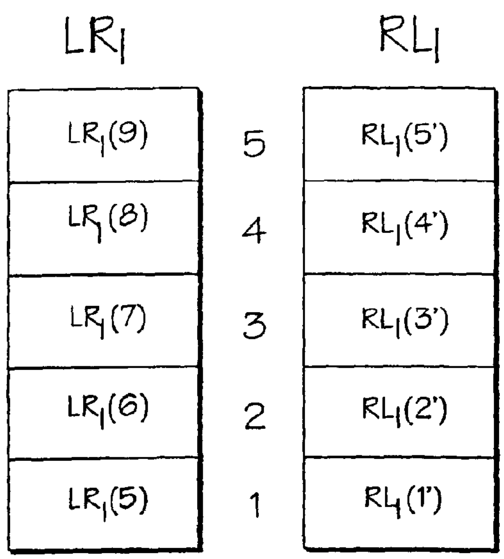
FIGS. 56(A)-(D) show one embodiment of the queueing buffers of the present invention.

At time t=9 in FIG. 55, the left-right and right-left optimal disparities ($LR_I$, $RL_I$) for left census vector 5 and right census vector 1', respectively, are output from correlation unit 1492 and placed in their respective queueing buffers as shown in FIG. 56(A). At time t=10, the left-right and right-left optimal disparities ($LR_I$, $RL_I$) for left census vector 6 and right census vector 2', respectively, are output from correlation unit 1492 and placed at the top of the queueing buffers pushing the previously stored disparities down. This proceeds until all memory locations in the queueing buffers are filled as shown in FIG. 56(A), which corresponds with time t=13 in FIG. 55. The memory locations are provided in the figure as the numbers 1 to 5 between the two buffers. Thus, the oldest indices, $LR_I(5)$ and $RL_I(1')$, are located at memory location 1 and the newest indices, $LR_I(9)$ and $RL_I(5')$, are located at memory location 5.

Once full, the oldest left-right index $LR_I(5)$ for left census vector 5 is compared with the right-left index of the right census vector that corresponds with the optimal disparity selected by left census vector 5. In other words, the following relation is checked: $LR_I(x)=RL_I(D-LR_I(x))$, where x is the census vector at memory location 1 and $LR_I(x)$ is the index or optimal disparity selected by that census vector x as it finally made its way down the pipeline to the output of correlation unit 1492. D represents the maximum number of disparities in the search window and $RL_I(y)$ represents the index or optimal disparity selected by the census vector in memory location y.

For example, assume that the optimal disparity selected by left census vector 5 for its search window is 2. This corresponds with right census vector 3'. Thus, x=5, $LR_I(x)=2$, and $D-LR_I(x)=3$. The right census vector at memory location 3 (i.e., $D-LR_I(x)=3$) is right census vector 3'. If $RL_I(3')=2$, a match exists because $LR_I(x)=RL_I(y)$ and the left-right consistency check has confirmed the optimal disparity selections. On the other hand, if $RL_I(3')$□2, a match does not exist because $LR_I(x)$□$RL_I(y)$ and the left-right consistency check has detected an error. In the case of a mismatch, a dummy value (e.g., −1) can be assigned to the disparity for this right census vector.

Alternatively, the absolute value of the difference $LR_I(x)-(RL_I(D-LR_I(x)))$ is checked to determine if this result is less than or equal to 1. If so, the selected optimal discrete disparity passes the left-right consistency check and this disparity is retained. By providing for this alternate relation, some "slop" or tolerance is provided; that is, even if the left-right and right-left disparities differ by one, the selected disparity will be acceptable anyway.

Figure 56B:
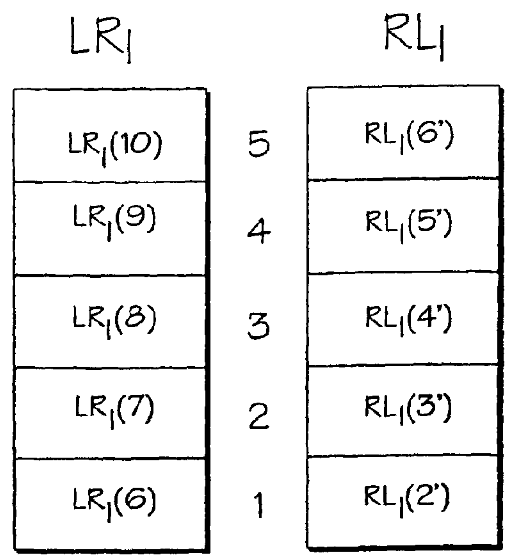
Figure 56C:
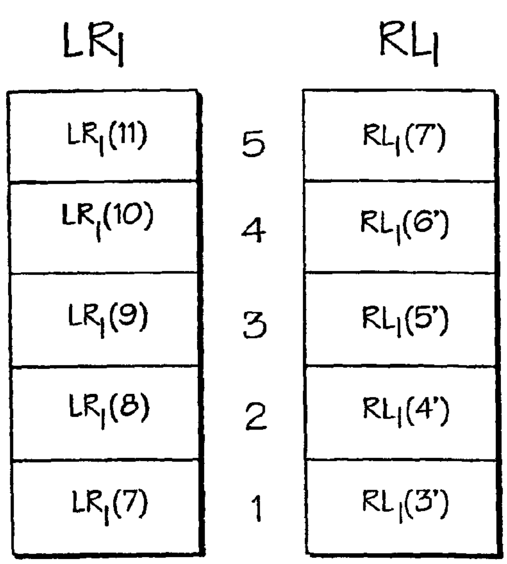

Upon completing this left-right consistency check for this pair of data in memory location 1, a new pair of data can be placed at the top of the queueing buffer which pushes the old pair of data (i.e., $LR_I(5)$ and $RL_I(1')$) out of the queueing buffer. The contents of the queueing buffer at this point are shown in FIG. 56(B). The next pair of $LR_I(x)$ and $RL_I(x)$ at memory location 1, which is now $LR_I(6)$ and $RL_I(2')$, will now be checked for left-right consistency. After this pair of data is checked, this pair at memory location 1 is shifted out while a new pair is shifted in at the top of the queueing buffer. This is shown in FIG. 56(C).

Figure 56D:
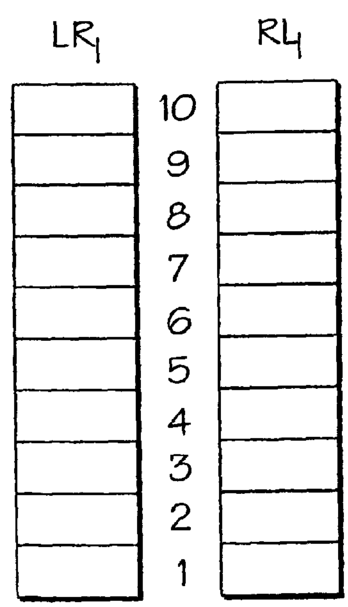

As shown in FIG. 56(D), the size of the queueing buffers can also be twice the total number of disparities (D). For D=5, the queueing buffer is 10 memory locations high.

FIG. 57 shows the hardware implementation of one embodiment of the correlation unit of the present invention. Each correlation unit 1450, 1490, 1491, and 1492 are built the same way. Left and right census vectors are input at lines 1520 and 1521, respectively. These census vectors are also sent out of the correlation unit via $L_{OUT}$ lines 1522 and $R_{OUT}$ 1523 to the next correlation unit, if another correlation unit exists. In this stage however, the left and right census vectors are compared through the exclusive-OR gate 1524 which outputs a logic "1" when the inputs are different. For 32-bit census vectors, 32 such XOR operations are performed in parallel and output to Hamming bit counter or look-up table 1525, which merely counts the number of logic "1" are present at its input. The output value of this bit counter 1525 can be as low as 0 (no differences in the left and right census vectors) to as high as 32 (every bit position between the left and right census vectors is different).

This value is output to a saturation threshold unit 1526. If the input to the saturation threshold is a value between 0 and 15, inclusive, the output value is the input value. If the input to the saturation threshold is a value greater than 15, the output value is set at 15. Because the maximum value output from the saturation threshold unit 1526 is 15, fewer output lines are necessary to convey the Hamming distance. Here, only four lines are used to represent Hamming distances 0 to 15. In most cases, if the Hamming distance is 15 or greater, the correlation unit will probably not select it as the optimal disparity and hence the precision of a large (>15) Hamming distance is not necessary. Other embodiments may not use such a saturation threshold so that the output represents exactly the Hamming distance between two census vectors.

By using the saturation threshold unit, 3 or 4 bits (and hence 3 or 4 lines) can be used to represent the Hamming distance which would otherwise need 5 bits to convey the maximum Hamming distance of 32. Three bits can be used if the maximum Hamming distance of 7 is used; that is, if the calculated Hamming distance prior to the saturation threshold is between 0 and 7, inclusive, the calculated Hamming distance value will be used, whereas if the calculated Hamming distance prior to the saturation threshold is between 7 to 32, inclusive, the calculated Hamming distance value will be 7. Four bits can be used if the ceiling used is 15, instead of the three-bit case of 7.

In the correlation unit, the specific row and column information for the input left and right census vectors are also noted for edge condition determinations. This is particularly relevant for the box filtering operations.

The next sequence of addition/subtraction operations represent the box filtering operation which ultimately calculates a window sum for each moving correlation window. The output 1540 of the saturation threshold unit 1526 represents the lower rightmost corner image element of the correlation window. This is represented by the shaded portion of the window illustration 1570 of the moving correlation window. Before this portion is contributed to the window sum computation, one other operation is performed. Adder 1527 subtracts the value in line 1542 from the value in line 1541 and outputs the result at line 1543. The Hamming distance which was calculated for the image element located a window height above the current image element as shown in window illustration 1572 is on line 1541. The column sum in the column sum line buffer, which is located immediately above the current image element location, as shown in window illustration 1571, is on line 1542. The output line 1543 provides the modified column sum as shown in window illustration 1573.

Adder 1528 adds the value on line 1540 to the value on line 1543 to generate the new column sum on line 1544. The current Hamming distance for the current pair of left and right census vectors as shown in window illustration 1570 is provided on line 1540. The output line 1543 provides the modified column sum as shown in window illustration 1573. The output of adder 1528 is the new column sum as shown in window illustration 1574.

Adder 1529 subtracts the value on line 1545 from the value on line 1544 to generate output 1546. Line 1544 contains the new column sum as shown in window illustration 1574. Line 1545 contains the column sum located a window length from the new column sum location as shown in window illustration 1575. This differential will be used to generate the window sum.

Adder 1530 adds the value on line 1546 to the value on line 1547 to generate the new window sum on line 1548. This output window sum value is also stored in the register 1531 and placed on line 1549. Prior to this addition, the output of register 1531 on line 1547 contains the window sum from the immediately previous calculation. At the next clock cycle, the contribution from the value on line 1546 updates the window sum so that the new window sum representing the current left and right census vectors (L and R) is generated at the output line 1548 and 1549. The loop configuration defined by line 1548, register 1531, line 1547, and adder 1530 allows the window sum to be calculated in one cycle.

Because the left-right score and index ($LR_{SC}$, $LR_I$) travel down the pipeline with its corresponding left census vector (L) and the right-left score and index ($RL_{SC}$, $RL_I$) travel down the pipeline with its corresponding right census vector (R), the window sum at lines 1549, 1553, 1550, and 1551 represent the left-right score and right-left score for this correlation unit (and hence, this disparity) which are used in the comparisons to determine whether they also represent the minimum left-right and right-left scores.

The output of comparator 1532 provides the selector signal for the multiplexers used to generate the $LR_{SC}$ and $LR_I$ values for the next correlation unit. Similarly, the output of comparator 1536 provides the selector signal for the multiplexers used to generate the $RL_{SC}$ and $RL_I$ values for the next correlation unit. Comparator 1532 compares the window sum at line 1549 with the input LRsc which was determined from the previous correlation unit. If the new window sum is less than the previously calculated $LR_{SC}$, then the comparator 1532 generates a logic "1." If not, a logic "0" is output from the comparator 1532. Comparator 1536 compares the window sum at line 1551 with the input $RL_{SC}$ which was determined from the previous correlation unit. If the new window sum is less than the previously calculated $RL_{SC}$, then the comparator 1536 generates a logic "1" at line 1554. If not, a logic "0" is output from the comparator 1536 at line 1558.

The inputs to multiplexer 1533 include the previously calculated LRsc at line 1552 and the new window sum at line 1553 calculated in this correlation unit. If the selector signal on line 1554 from comparator 1532 is a logic "1," then the output 1563 of the multiplexer 1533 is the window sum because this new window sum represents a lower window sum than the previously calculated window sum from the previous correlation unit. If the selector signal on line 1554 is a logic "0," then the output 1563 of the multiplexer 1533 is the same LRsc as output from the previous correlation unit. Similarly, the inputs to multiplexer 1534 include the previously calculated $LR_I$ at line 1555 and the current disparity number for the correlation unit at line 1556 calculated in this correlation unit. If the selector signal on line 1554 from comparator 1532 is a logic "1," then the output 1564 of the multiplexer 1534 is the disparity number for this correlation unit because this disparity number is associated with a lower window sum than the previously calculated window sum from the previous correlation unit. If the selector signal on line 1554 is a logic "0," then the output 1564 of the multiplexer 1534 is the same $LR_I$ as output from the previous correlation unit.

The inputs to multiplexer 1535 include the previously calculated $RL_{SC}$ at line 1557 and the new window sum at line 1550 calculated in this correlation unit. If the selector signal on line 1558 from comparator 1536 is a logic "1," then the output 1565 of the multiplexer 1535 is the new window sum because this new window sum represents a lower window sum than the previously calculated window sum from the previous correlation unit. If the selector signal on line 1558 is a logic "0," then the output 1565 of the multiplexer 1535 is the same $RL_{SC}$ as output from the previous correlation unit. Similarly, the inputs to multiplexer 1537 include the previously calculated $RL_I$ at line 1561 and the current disparity number for the correlation unit at line 1562 calculated in this correlation unit. If the selector signal on line 1558 from comparator 1536 is a logic "1," then the output 1566 of the multiplexer 1537 is the disparity number for this correlation unit because this disparity number is associated with a lower window sum than the previously calculated window sum from the previous correlation unit. If the selector signal on line 1558 is a logic "0," then the output 1566 of the multiplexer 1537 is the same $RL_I$ as output from the previous correlation unit.

As explained above, each correlation unit is associated with a particular disparity number. For 24 disparities, 24 correlation units (one for each disparity number) are provided. To ensure that the correlation units are identically fabricated to facilitate the manufacturing process, the circuitry for generating the disparity number for each correlation unit must be identical. As explained above, this disparity number associated with a correlation unit will be used for the inputs to multiplexers 1534 and 1537. The circuit is an adder which receives the disparity number propagated from the previous correlation unit and adds it to an incremental value (usually "1") to generate the current index or disparity number assigned to the correlation unit. The correlation unit compares census vectors at this disparity. To save wire lines, the disparity number from the previous correlation unit will be transmitted on the same line used to transmit the new $LR_I$ value. Thus, during times when the new $LR_I$ value is not transmitted to the next correlation unit, the propagating disparity number is transmitted to the next correlation unit first and then the new $LR_I$ value is transmitted next.

The input to the first correlation unit will be hard wired with the value −1. Thus, the first correlation unit will be assigned the disparity number 0 and all comparisons conducted in this correlation unit will be between census vectors at disparity 0. This propagating disparity number, which is 0 at the first correlation unit, is now transmitted to the next correlation unit on the line used to transmit the new $LR_I$ value. This transmission occurs before the new $LR_I$ value is transmitted to the next correlation unit. As it enters the next correlation unit, and hence the adder, the propagating disparity number is now 1 for the second correlation unit. This continues until the last correlation unit in the pipeline.

As described above with respect to FIG. 54, for disparity D=5, 5 correlation units will be used. In other words, the number of correlation units corresponds with the number of the disparities D used in the search window. In other embodiments, however, the number of correlation units utilized need not correspond with the number of disparities D. Indeed, a single correlation unit can process data for more than one disparity. Thus, for systems implementing disparity 24 search windows, 12 correlation units can be provided where each correlation unit processes image data offset from each other by 2 of the 24 different disparities. So, for example, one correlation processes image data offset from each other at disparity 0 and 1, another correlation unit processes image data offset from each other at disparities 2 and 3, a third correlation unit processes image data offset from each other at disparities 4 and 5, and so on until correlation unit 12 which processes image data offset from each other at disparities 22 and 23.

The above description, however, does not incorporate the sub-pixel estimation feature of the present invention. The following discussion provides the details necessary to incorporate the sub-pixel estimation in the parallel pipeline. As explained earlier, the sub-pixel estimation operation estimates a better and more precise disparity number given the initially selected discrete optimal disparity number. Conceptually, the estimation is accomplished by analyzing a graph of disparity number (x-axis) v. summed Hamming distance (y-axis) and interpolating among the initially selected optimal discrete disparity and the two disparity numbers on either side of this optimal discrete disparity number. In one embodiment, a "V" is used for the interpolation. The particular disparity number can also be calculated by using the relation:

$$\text{Offset} = 0.5 - \frac{\text{MIN}(Y_1 - Y_2,\ Y_3 - Y_2)}{2 \cdot \text{MAX}(Y_1 - Y_2,\ Y_3 - Y_2)}$$

The sub-pixel estimation can also be implemented in the parallel and pipelined system described above for the correlation units. In FIG. 54, the left census vector (L), the right census vector (R), the left-right score, the left-right index, the right-left score, and the right-left index are passed along the parallel pipeline system. For the sub-pixel estimation, the following values are passed through the pipeline: (1) the correlation sum from the previous disparity (represented by $Y_1$ in FIG. 17), which will be used if the current correlation sum is the minimum sum, (2) the optimal disparity number ($LR_I$), (3) the minimum correlation sum, and (4) the sub-pixel estimate. The minimum correlation sum is the left-right score ($LR_{SC}$). These values will be processed at each correlation unit. The delay for these variables between correlation units is a single delay. Note that $LR_I$ and LRsc are already passed along for the correlation portion of the pipeline as described above.

Thus, as the data travels down the pipeline through the correlation units, the sub-pixel estimate is updated as new and lower correlation sums are encountered. If, at one point in the pipeline, a new minimum correlation sum is reached, the minimum correlation sum ($LR_{SC}$) is updated, the optimal disparity number ($LR_I$) is updated, and the correlation sum from the previous disparity is stored and passed along. At this point, a sub-pixel estimate cannot be generated because correlation sum data from the next disparity has not been processed yet. In case no other data is anticipated (thus, the optimal discrete disparity is D and the current correlation unit is also the last correlation unit), the discrete disparity number will be treated as the optimal disparity from the sub-pixel estimation operation. If more correlation units are available (i.e., every image element in the search window of this left reference image element has not been compared with this left reference image element), at the next time unit in the next correlation unit, the sub-pixel estimate can be calculated because the current correlation sum (if not a minimum) is the other adjacent point that will fit a "V" interpolation curve; that is, this next correlation sum represents $Y_3$ in FIG. 17. At the next time unit in the next correlation unit (if present), the correlation sum will be ignored if it's not a new minimum correlation sum because it is not one of the two points adjacent to the optimal discrete disparity number.

E. Vertical and Horizontal Translation for Motion

For motion analysis, vertical movement must also be considered. The disparities range over vertical offsets as well, and the system must read in more lines of image data (i.e., census vectors) in order to have windows with vertical offsets. To parallel process vertical motion, the teachings above for each scanline can be used. Thus, for a given image element located at coordinates ($x_1$, $y_1$) in one image, the corresponding image element at location ($x_2$, $y_2$) in the other image can be determined with the present invention. Because vertical offsets are considered, the optimum match may not necessarily be found in the same line. The search window is now not a set of image elements along a line or row corresponding to the line or row of the reference image element; rather, the search window now encompasses several rows and columns of image elements.

Figure 58:
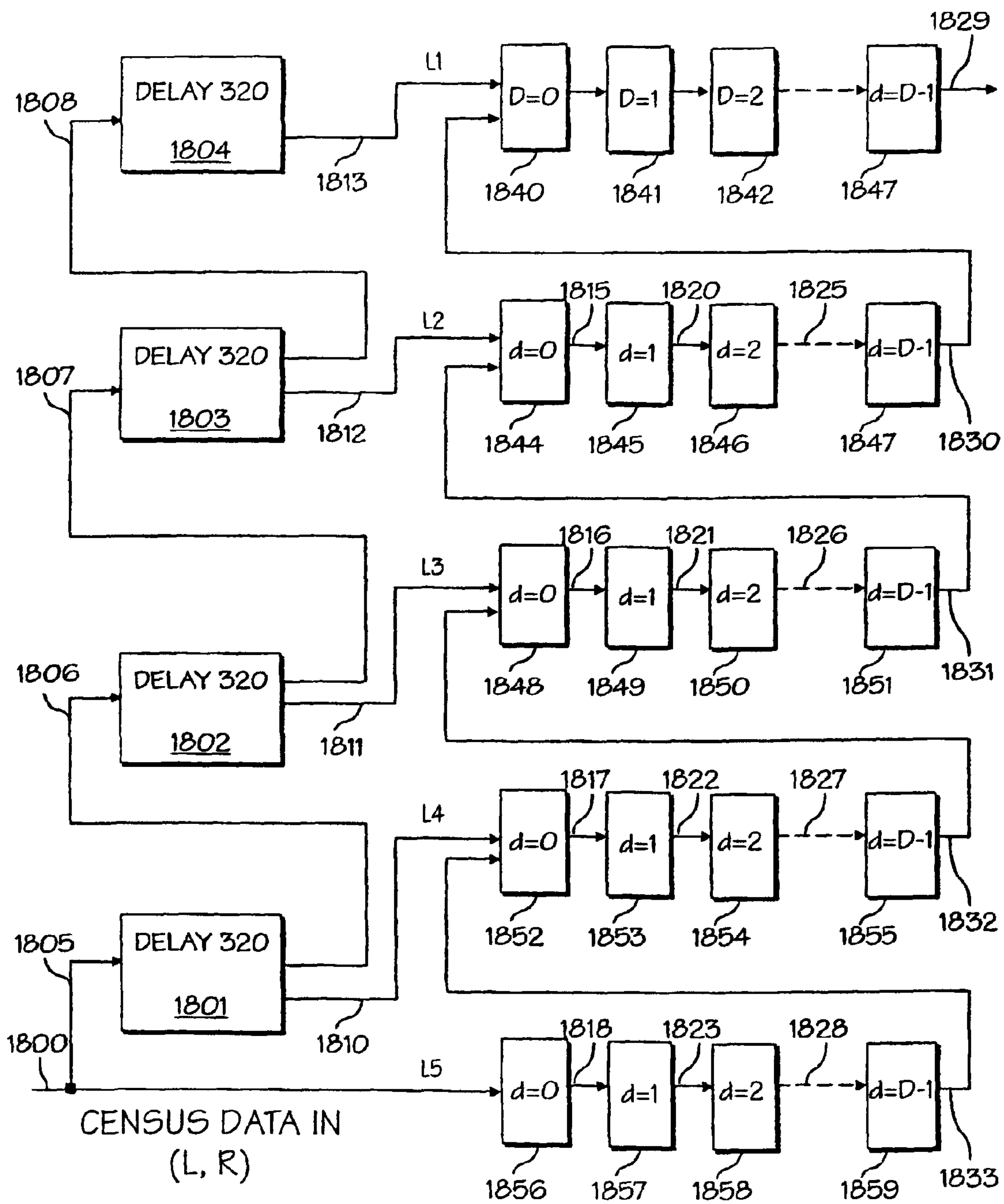
FIG. 58 shows one embodiment of the parallel pipelined system for motion analysis where the vertical movement of the object can be processed in real-time.

FIG. 58 shows one embodiment of the present invention. The inputs at line 1800 are the streams of left and right census vectors from the census vector generators. Data at the output on line 1829 is the optimum disparities at a particular row and column for each selected image element in the left and right images. In one embodiment, the output includes the minimum left-right score ($LR_{SC}$), left-right index ($LR_I$), minimum right-left score ($RL_{SC}$), and right-left index ($RL_I$). The left (L) and right (R) census vectors output from the census generators (not shown in FIG. 58) at line 1800 may also be output at line 1829 along with $LR_{SC}$, $LR_I$, $RL_{SC}$, and $RL_I$.

The output 1829 at line 1 in this parallel pipelined system are coupled to the queueing buffers for the left-right and right-left consistency checking, the extremal index array or disparity map, and/or directly to another application/system for processing of the disparity data. As stated above, the disparity data represents the optimum offset between a selected image element in one image and an image element in the other image located at a row and column from each other. This is accomplished by providing the "output" lines 1830 to 1833 for lines 2 to 5 to the input of the first correlation unit at the line immediately above. For example, line 1833 couples the output of line 5 correlation unit 1859 to a second set of inputs to the line 4 correlation unit 1852. Line 1832 couples the output of line 4 correlation unit 1855 to a second set of inputs to the line 3 correlation unit 1848. Line 1831 couples the output of line 3 correlation unit 1851 to a second set of inputs to the line 2 correlation unit 1844. Line 1830 couples the output of line 2 correlation unit 1847 to a second set of inputs to the line 1 correlation unit 1840. These lines 1830 to 1833 include the $LR_{SC}$, $LR_I$, $RL_{SC}$, and $RL_I$.

As shown in FIG. 58, and discussed previously with respect to FIGS. 53 to 57, five disparities (D=5) are used for this example and accordingly, five lines of census vectors can be processed. For each line or row, five correlation units can be provided to compute the correlation results. So, the last correlation unit for each line (L1 to L5) is for disparity 4 (d=D−1, where D=5 and hence, d=5−1=4). Note that other disparities D can be selected and depending on the particular disparity D selected, the number of scan lines processed through this parallel pipelined system will also vary.

For each line (L1-L5), five correlation units with a structure similar to that shown in FIGS. 54 and 57 are provided. The delay elements between the correlation units are also as shown in FIG. 54, although these delay elements are not shown in FIG. 58 for simplicity and pedagogic purposes. These delay elements with their appropriate delays, however, are indeed present in this embodiment to handle the data processing between each reference image element in one image with every image element in a search window of the reference image element in the other image. Again, this is described with respect to FIGS. 53-57.

For line 1 (L1), correlation units 1840 to 1843 process pairs of image data (left and right) through data paths 1813, 1814, 1819, 1824, and 1829. For line 2 (L2), correlation units 1844 to 1847 process pairs of image data (left and right) through data paths 1812, 1815, 1820, 1825, and 1830. For line 3 (L3), correlation units 1848 to 1851 process pairs of image data (left and right) through data paths 1811, 1816, 1821, 1826, and 1831. For line 4 (L4), correlation units 1852 to 1855 process pairs of image data (left and right) through data paths 1810, 1817, 1822, 1827, and 1832. For line 5 (L5), correlation units 1856 to 1859 process pairs of image data (left and right) through data paths 1809, 1818, 1823, 1828, and 1833. For each line, the left and right census vectors (L, R) come into the correlation units via lines 1809 to 1813.

To ensure that the appropriate lines (L1-L5) enter through this parallel pipelined system, delay elements 1801 to 1804 are provided. The set-up here is analogous to the set-up for the census generator as described in FIG. 48. Thus, census vectors for the left and right images enter at line 1800. Although a single line is illustrated here for simplicity sake, a pair of lines are actually implemented—one for the left image and the other for the right image. The five lines of image data that enter this system at line 1800 ultimately enter the correlation units at lines 1809 to 1813. Lines 1810 to 1813 are the outputs from delay elements 1801 to 1804, respectively. Thus, left and right census vectors from line 1800 enter delay element 1801 via line 1805. Left and right census vectors from delay element 1801 enter delay element 1802 via line 1806. Left and right census vectors from delay element 1802 enter delay element 1803 via line 1807. Left and right census vectors from delay element 1803 enter delay element 1804 via line 1808.

Note that although lines 1 to 5 (L1 to L5) have been illustrated, this does not limit the invention to the first 5 lines of the image or the first 5 lines of the desired image processing area. L1 to L5 refer to any 5 lines within the search window of a reference image element. Thus, for example, L1 to L5 may correspond to image data located on lines 78 to 82.

Thus, this configuration allows system to determine the optimum matches between an image element in one image with an image element for another image located at a row and column offset from each other. The output 1829 at line 1 in this parallel pipelined system are coupled to the queueing buffers for the left-right and right-left consistency checking, the extremal index array or disparity map, and/or directly to another application/system for processing of the disparity data.

F. "Superpin" Buses

Figure 59:
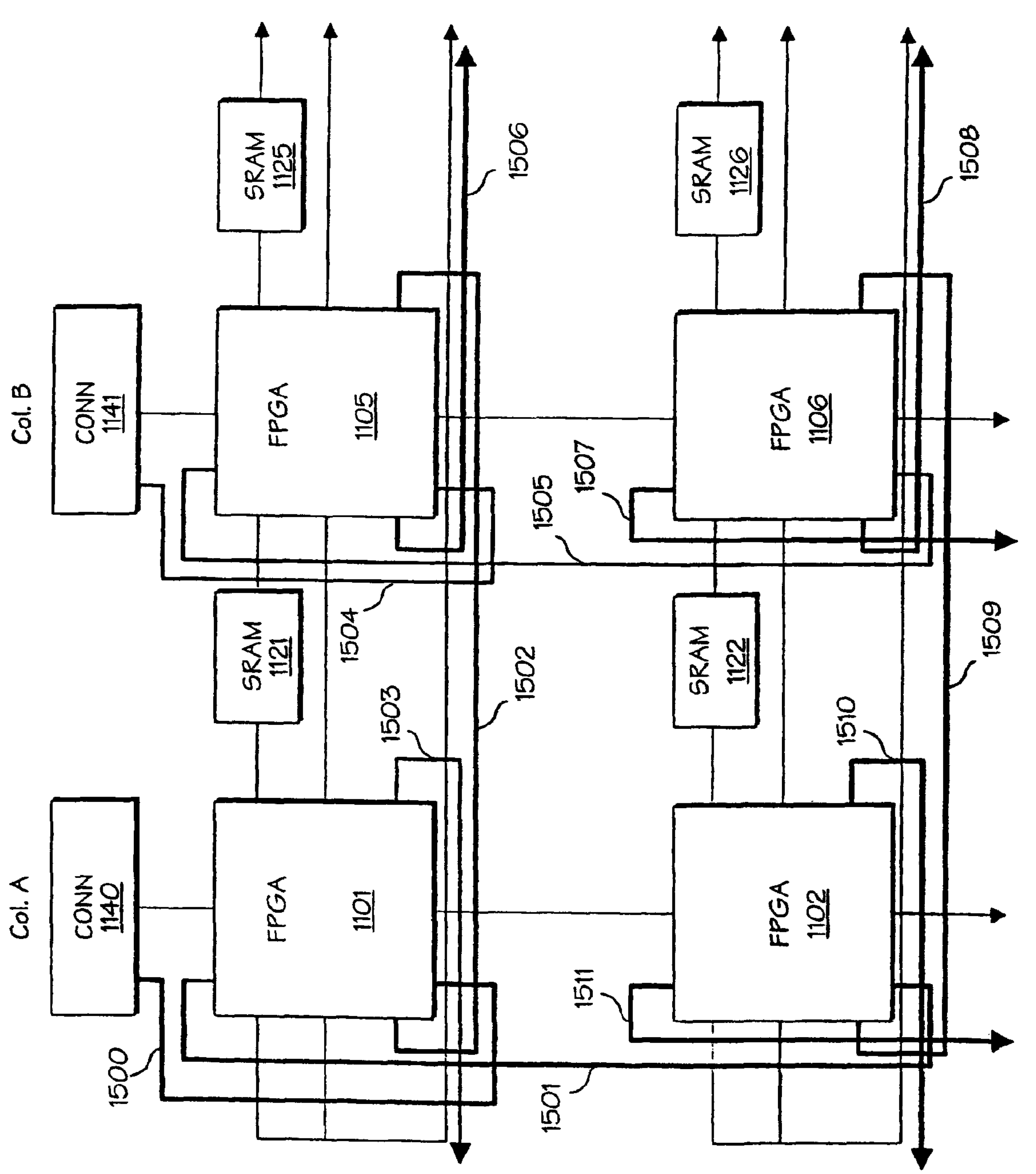
FIG. 59 shows some of the "superpin" buses and connectors associated with a portion of the image processing system of the present invention.

FIG. 59 shows some of the "superpin" buses and connectors associated with a portion of the image processing system of the present invention. As shown in FIG. 59, the 4×4 array not only has nearest-neighbor mesh connections, but also a set of eight "superpin" connections on each side of each computing element to form superpin buses. These superpin connections allow data to travel from one chip to the next using a single connection between adjacent pins. Thus, soft pipeline buses, token rings, or other distribution networks can be constructed without using many of the routing resources on the computing elements. These superpins can be used for local interconnections for local communications and pipelined busing. Any data that can be passed through the North-South and East-West buses can be passed through the superpin buses.

FIG. 59 shows only a portion of array originally shown in FIGS. 46 and 47. Adjacently located computing elements 1101, 1102, 1105, and 1106 are connected to each other and to connectors via superpin buses. Other computing elements that are not shown are also connected to each other, to connectors, and to the computing elements shown here in like fashion. Superpin bus 1500 is connected between computing element 1101 and connector 1140. Superpin bus 1501 is connected between computing element 1101 and computing element 1102. Superpin bus 1502 is connected between computing element 1101 and computing element 1105. Superpin bus 1503 is connected between computing element 1101 and a computing element (not shown) located to its immediate left, if any. Superpin bus 1504 is connected between computing element 1105 and connector 1141. Superpin bus 1505 is connected between computing element 1105 and computing element 1106. Superpin bus 1506 is connected between computing element 1105 and a computing element (not shown) located to its immediate right, if any. Superpin bus 1507 is connected between computing element 1106 and a computing element (not shown) located to its bottom, if any. Superpin bus 1508 is connected between computing element 1106 and a computing element (not shown) located to its immediate right, if any. Superpin bus 1509 is connected between computing element 1106 and computing element 1102. Superpin bus 1510 is connected between computing element 1102 and a computing element (not shown) located to its immediate left, if any. Superpin bus 1511 is connected between computing element 1102 and a computing element (not shown) located to its immediate bottom, if any.

G. Schematics

Figure 60:
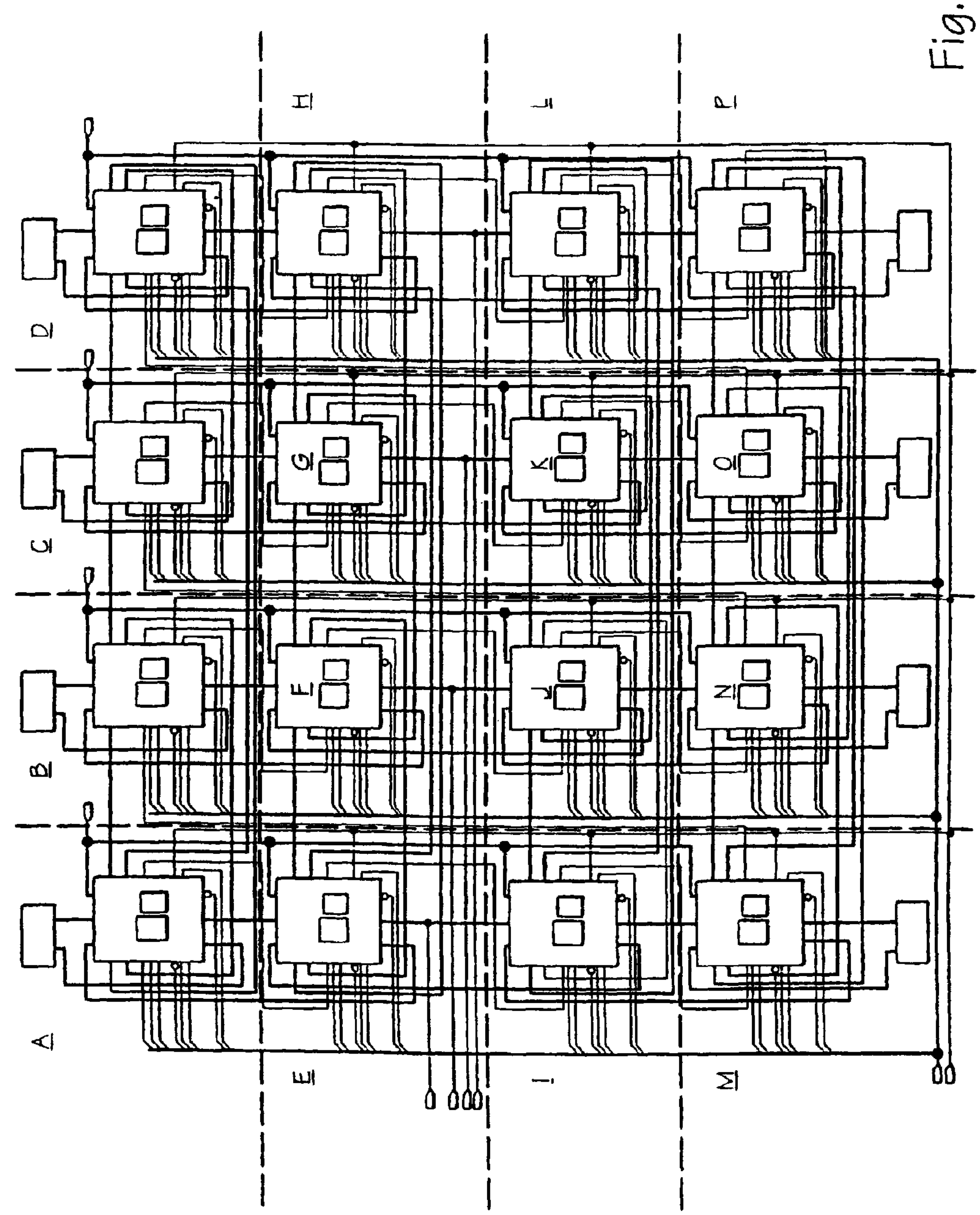
FIGS. 60(A)-(P) show a detailed view of the array structure of the image processing system of the present invention.
Figure 60A:
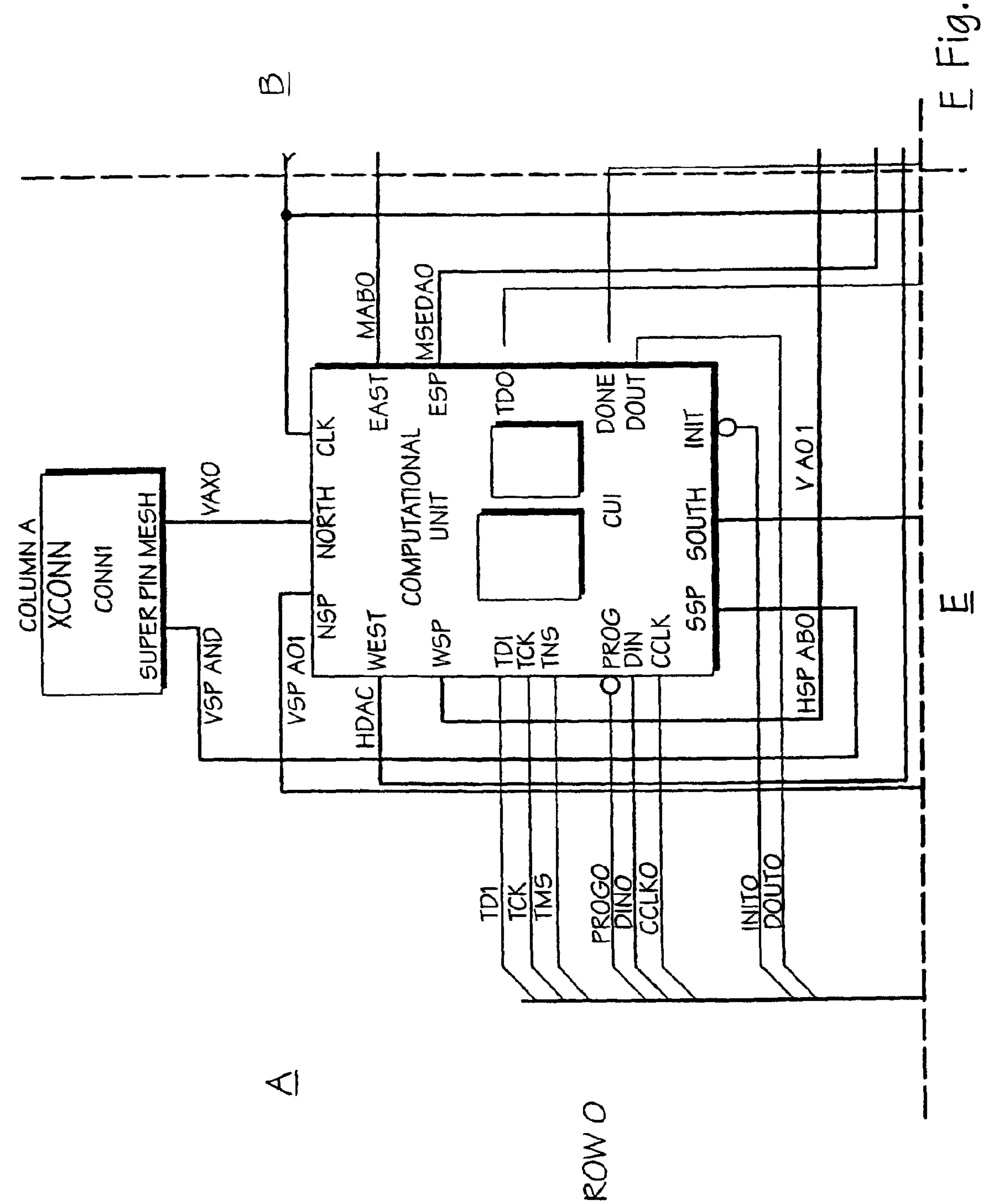
Figure 60B:
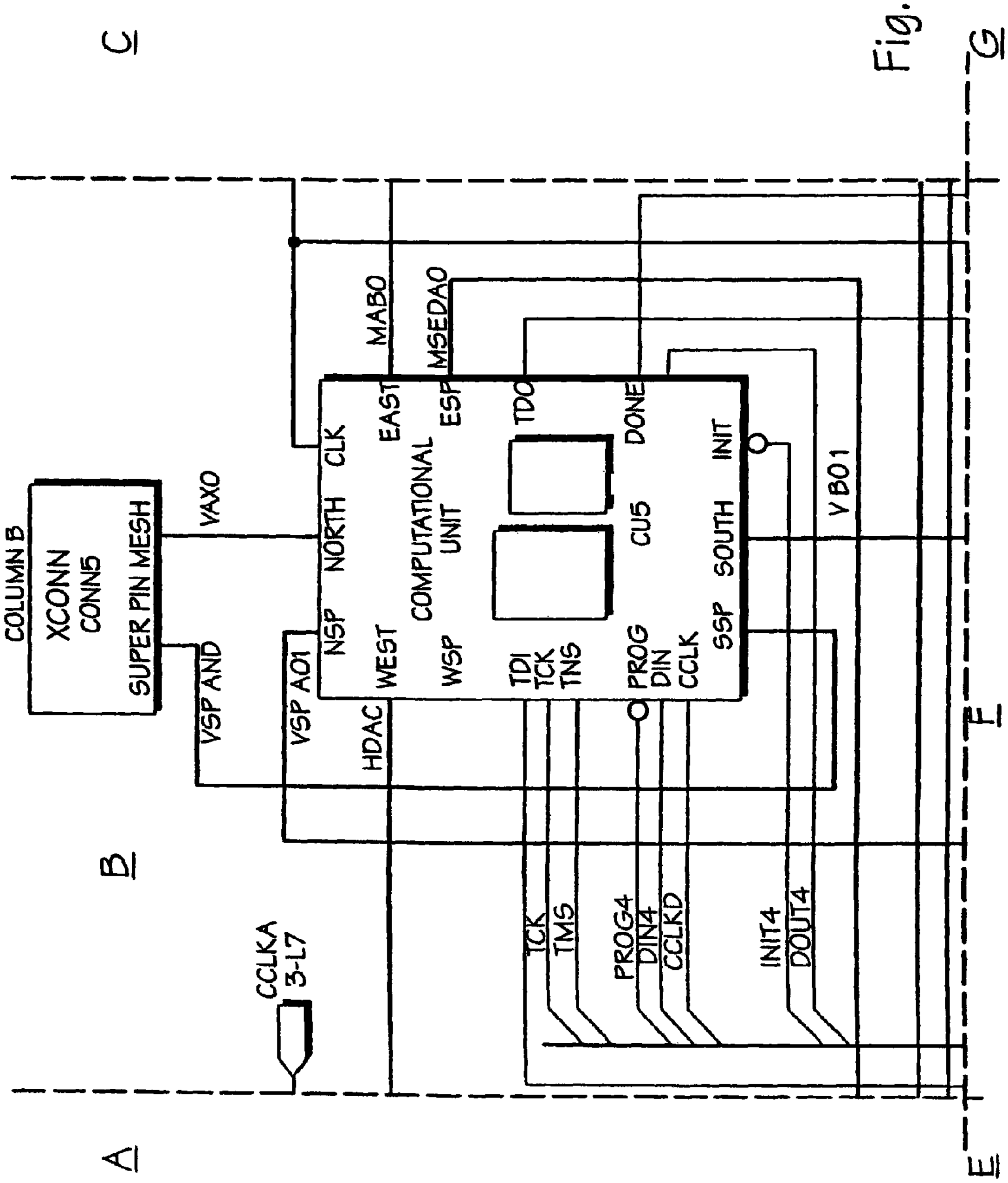
Figure 60C:
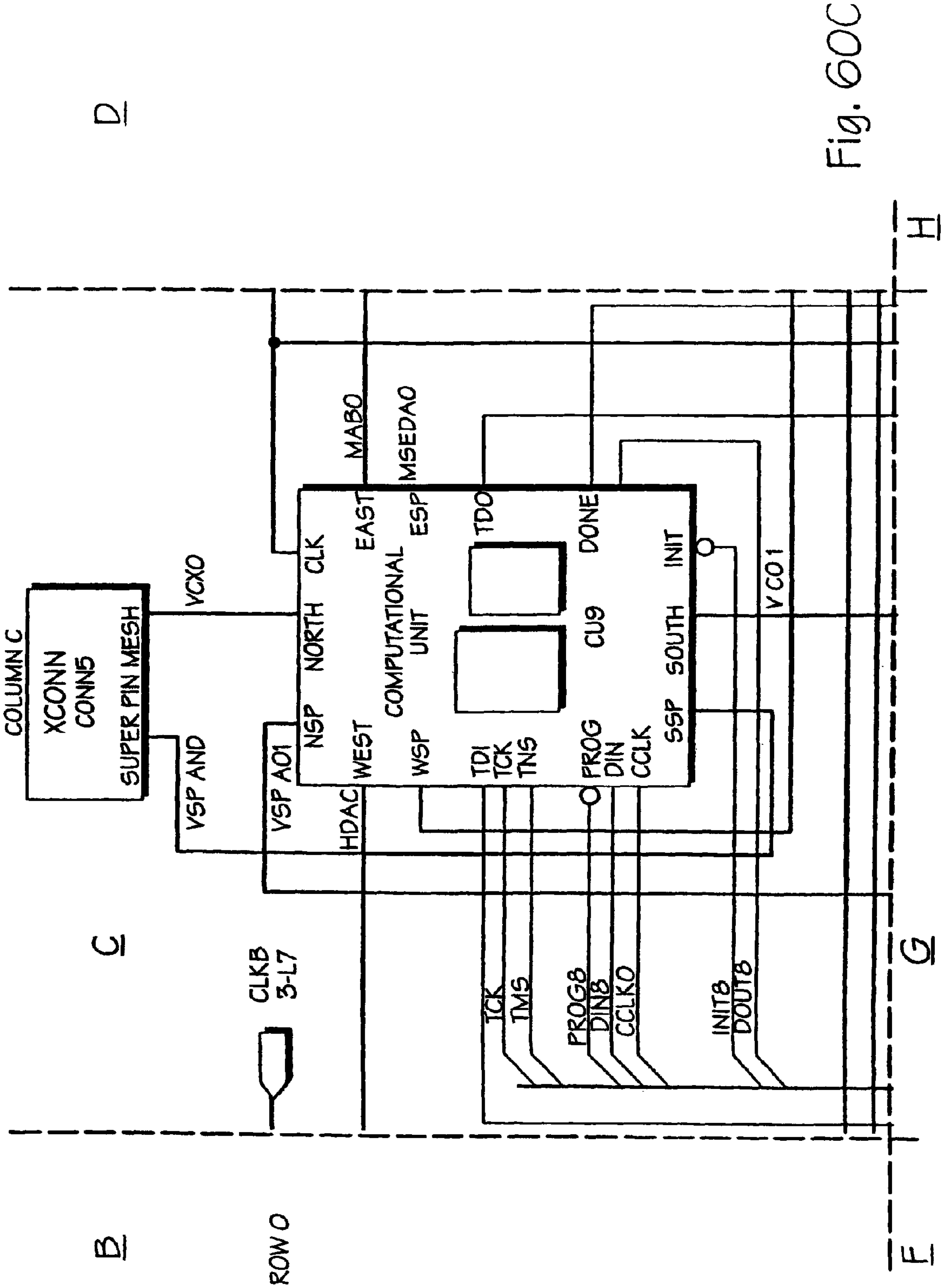
Figure 60D:
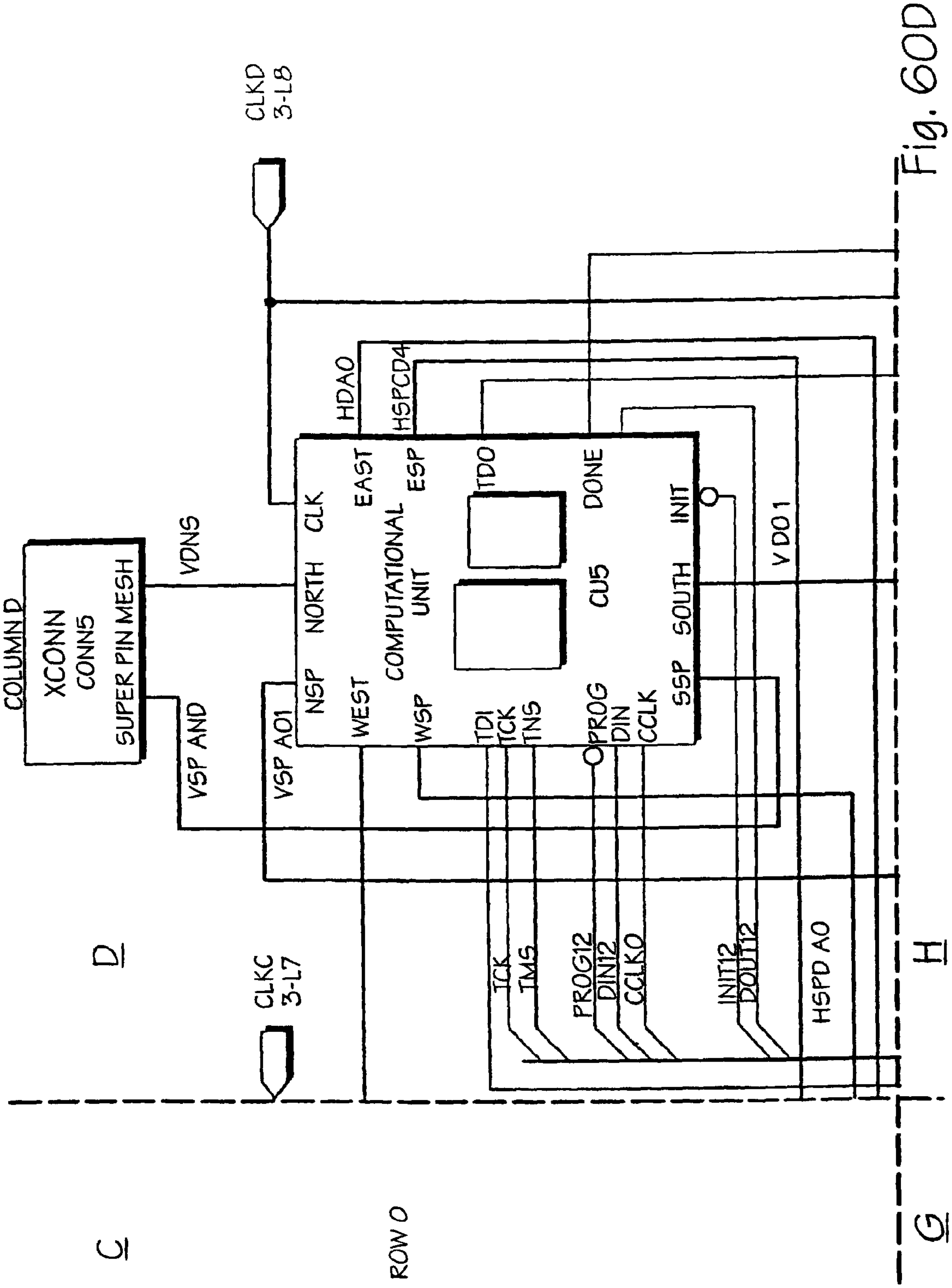
Figure 60E:
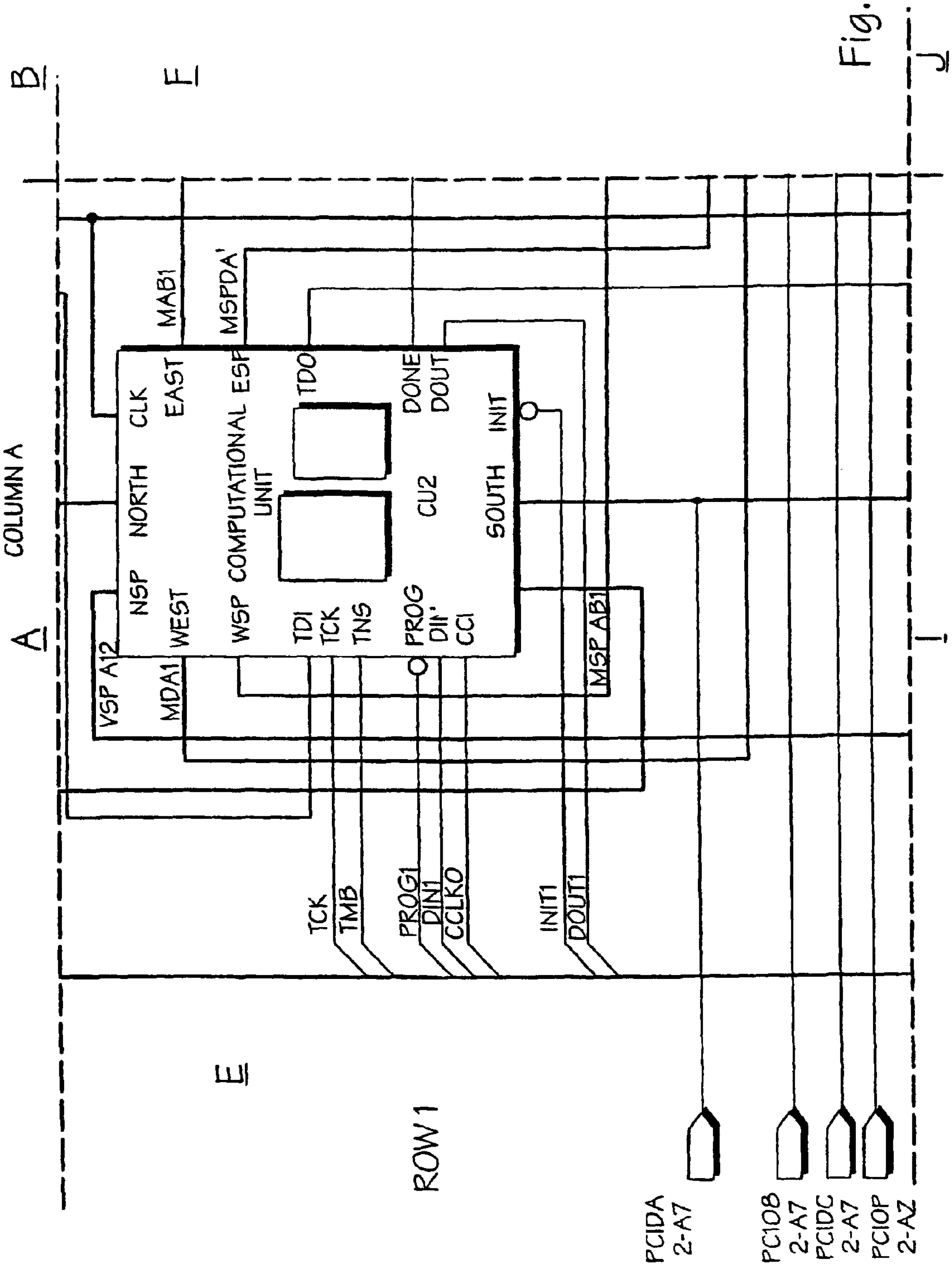
Figure 60F:
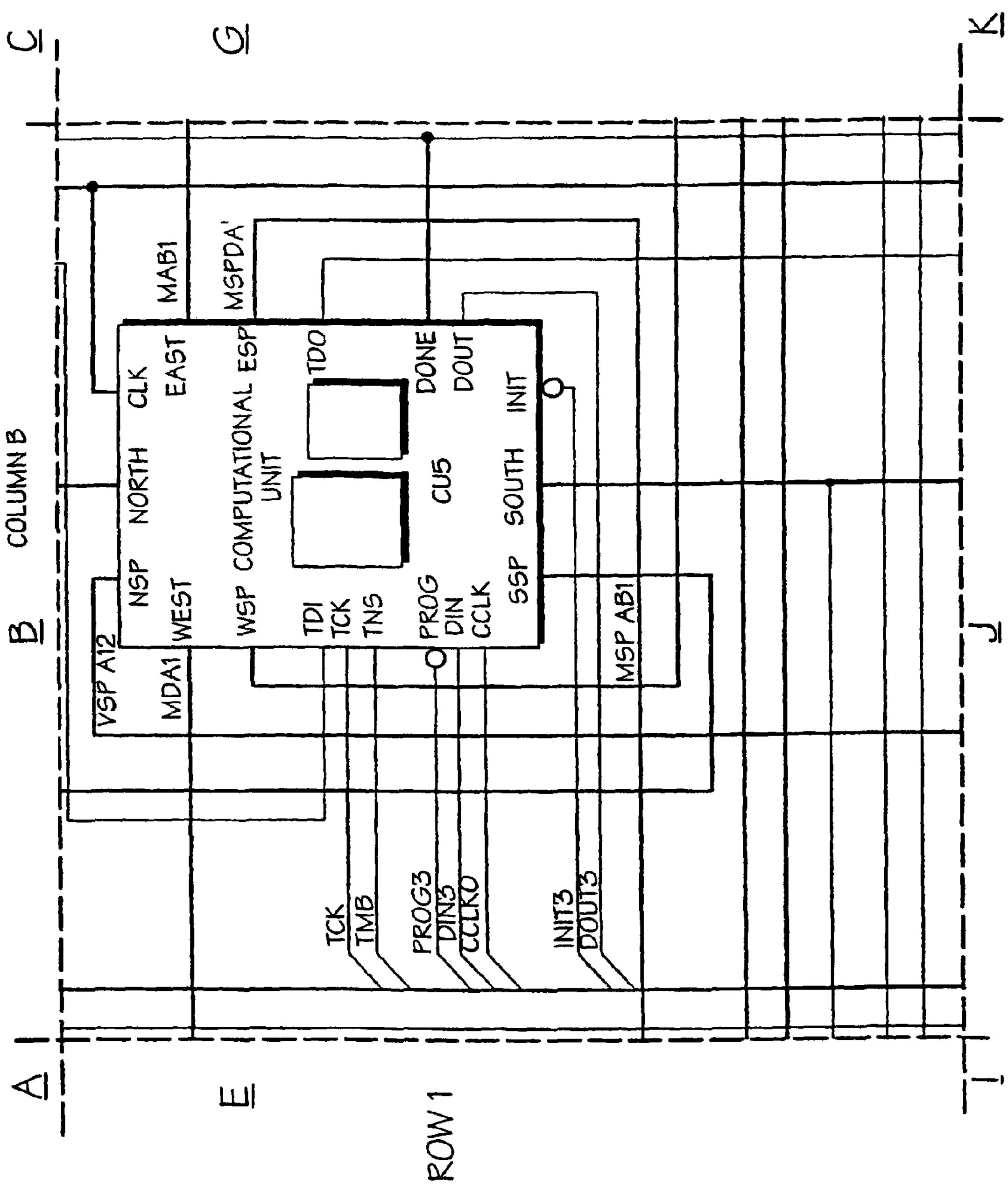
Figure 60G:
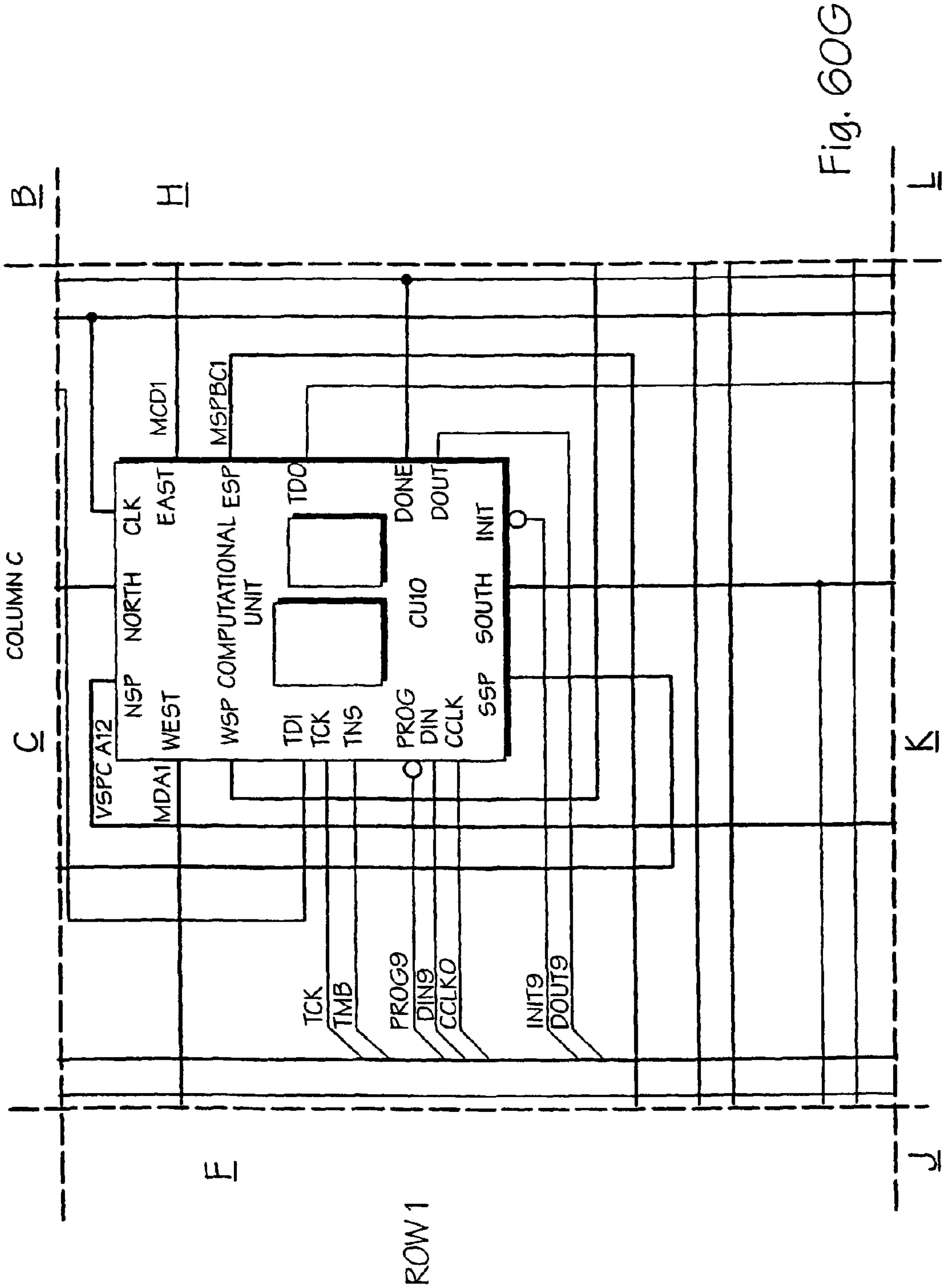
Figure 60H:
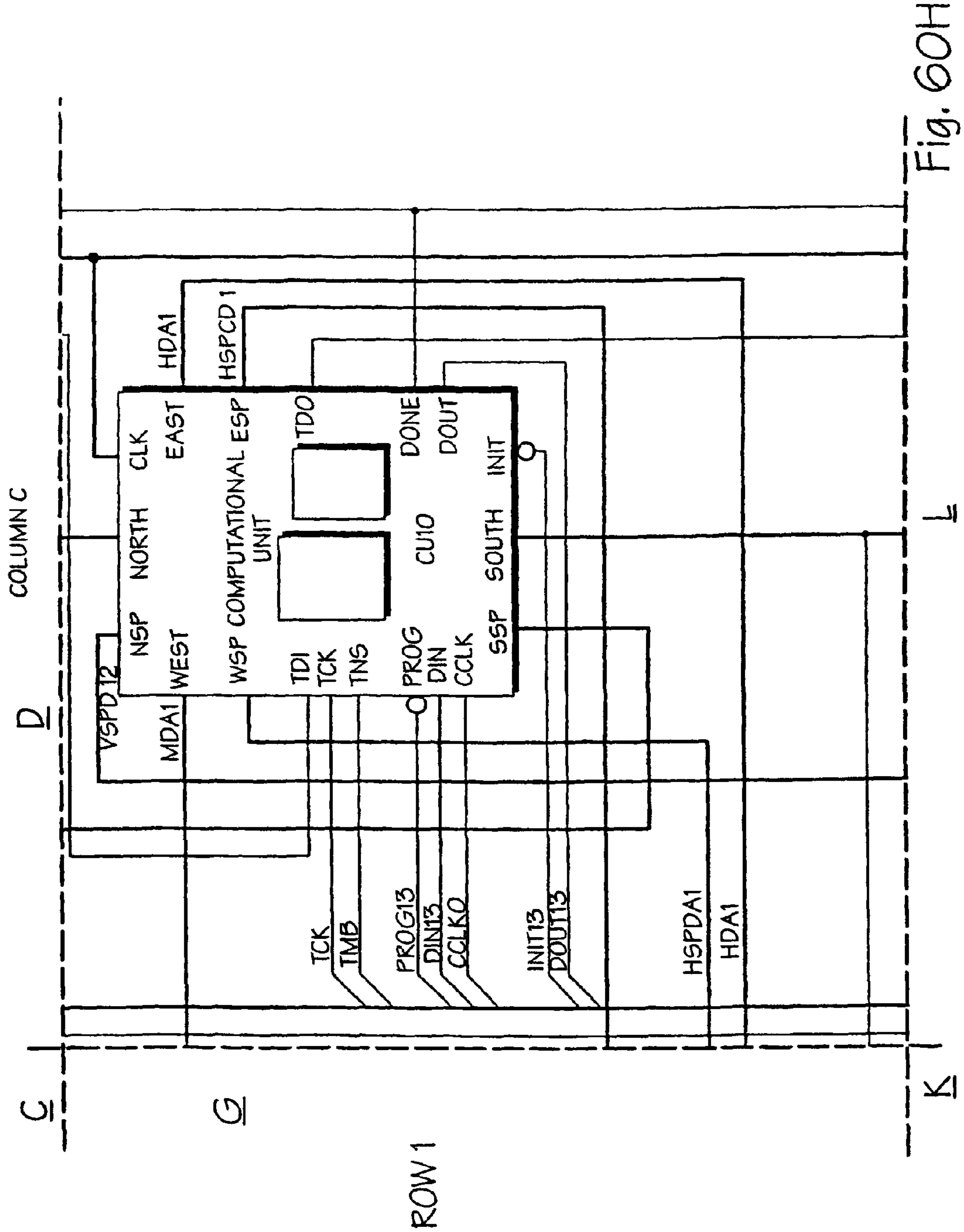
Figure 60I:
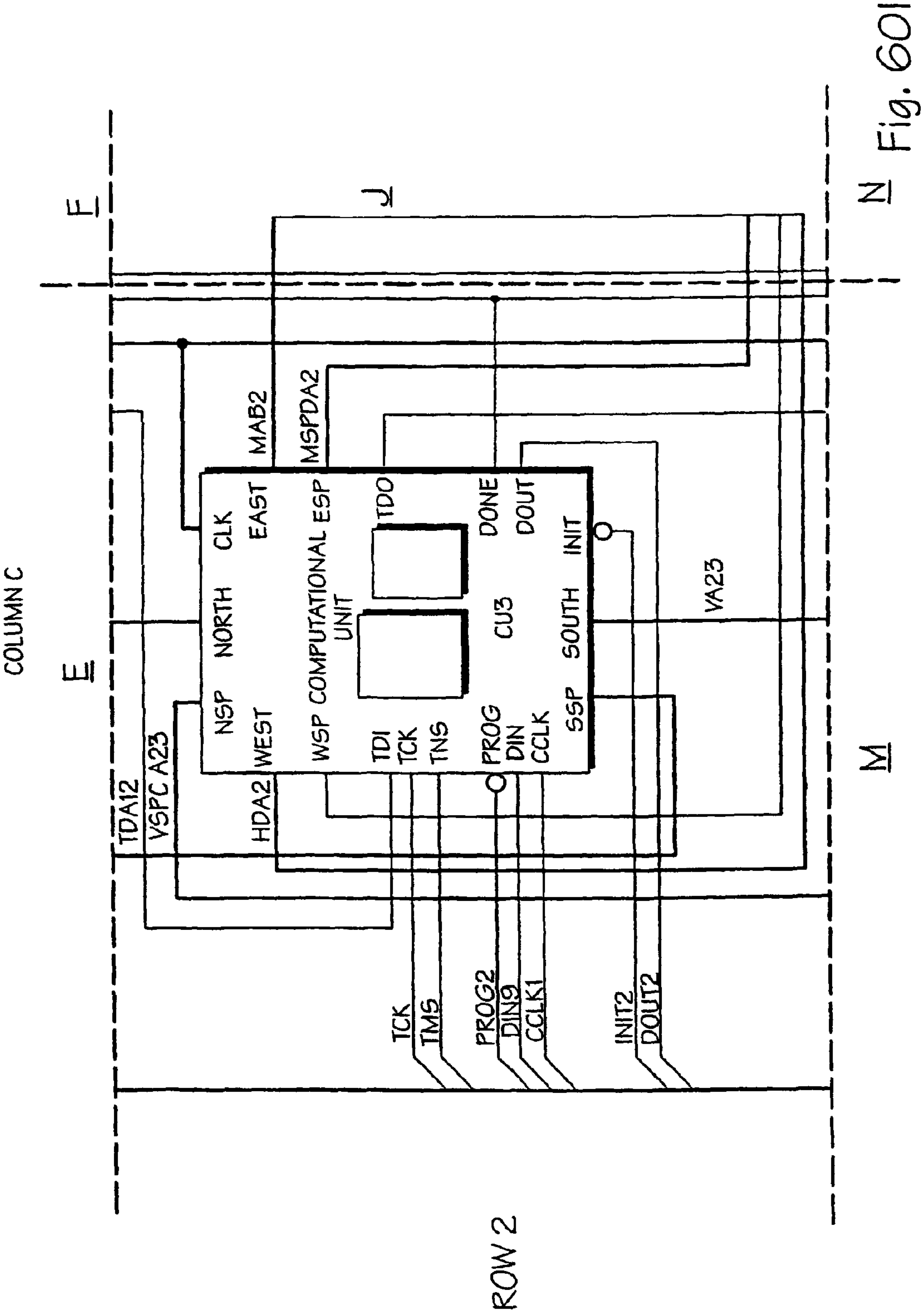
Figure 60J:
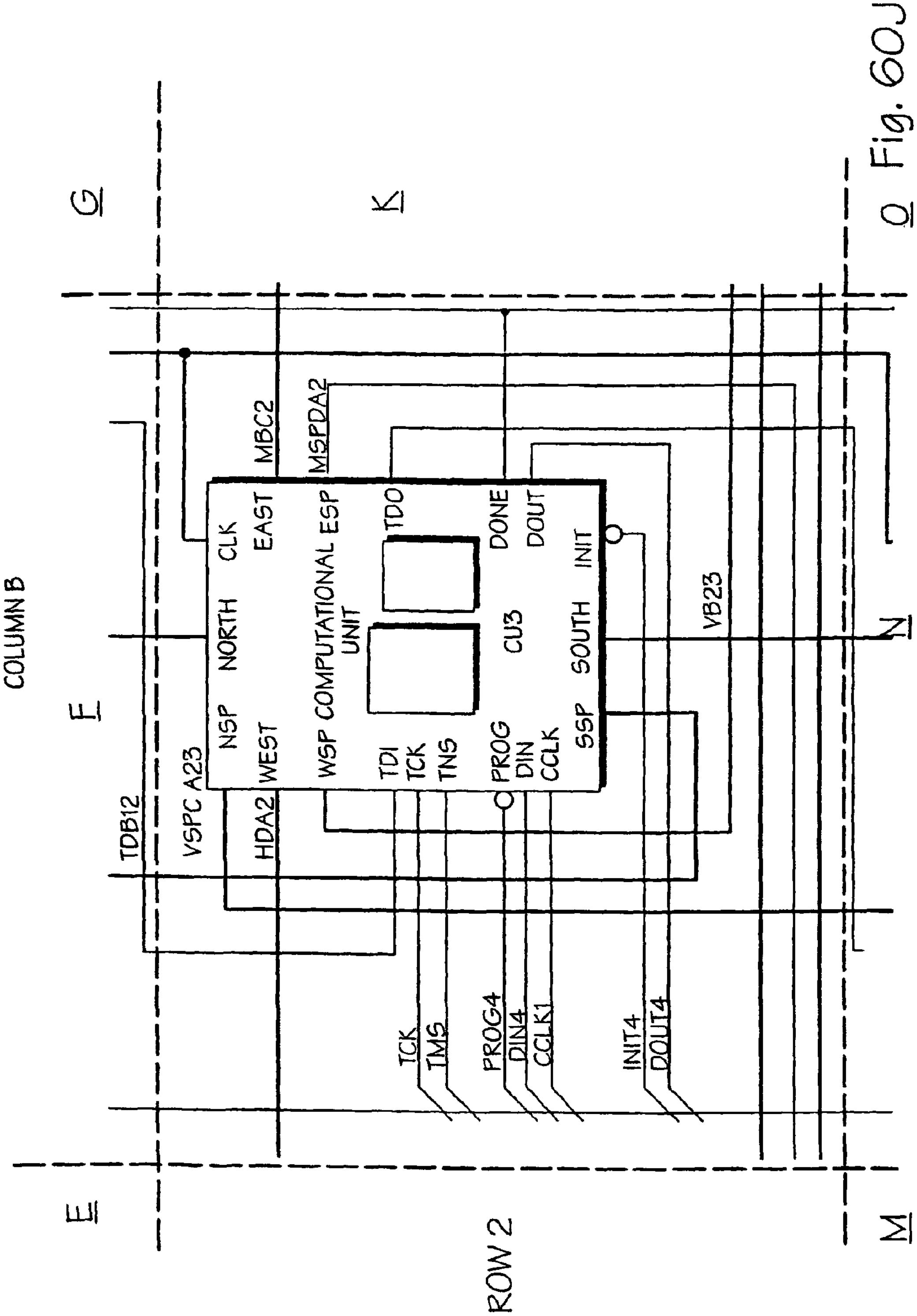
Figure 60K:
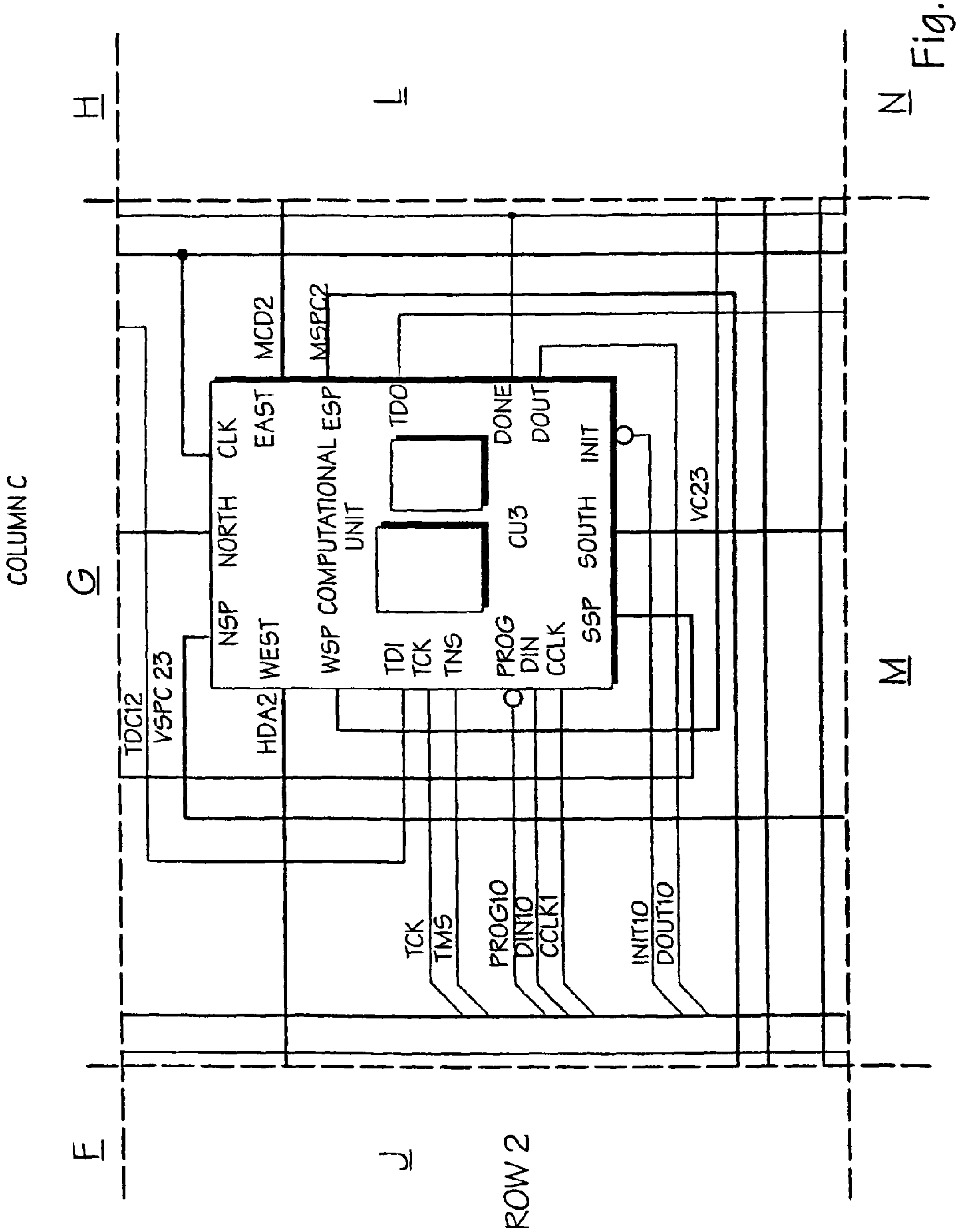
Figure 60L:
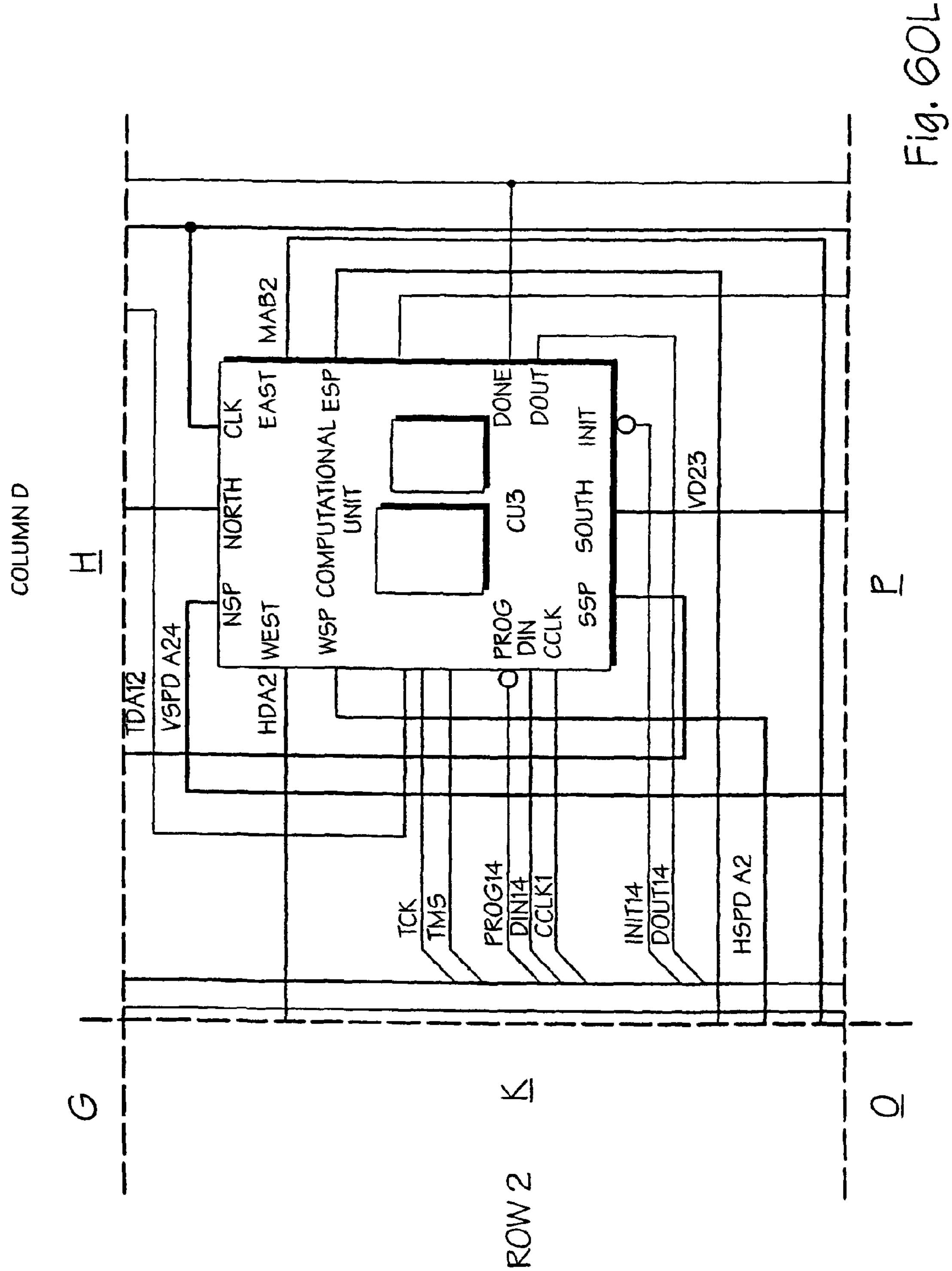
Figure 60M:
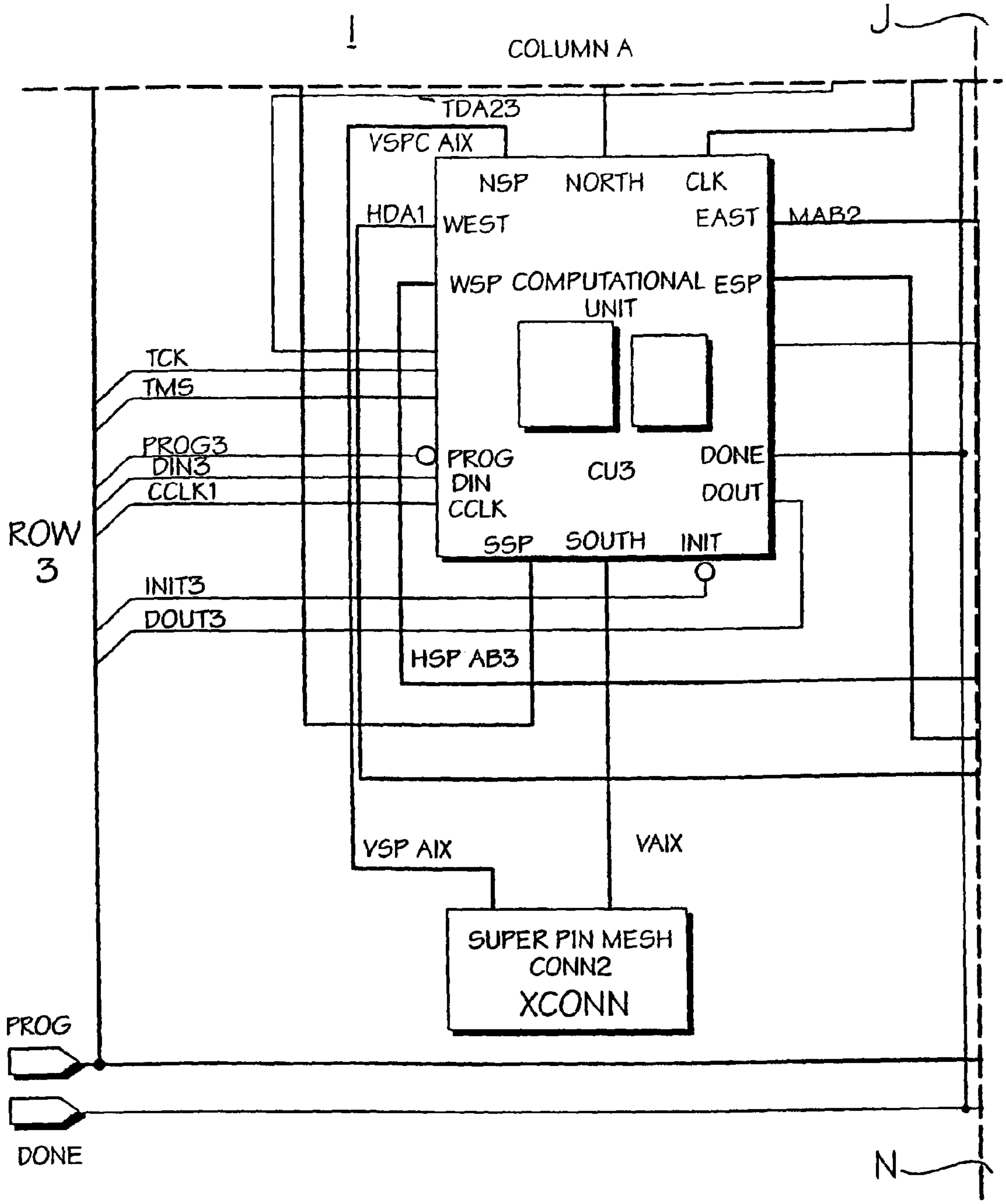
Figure 60N:
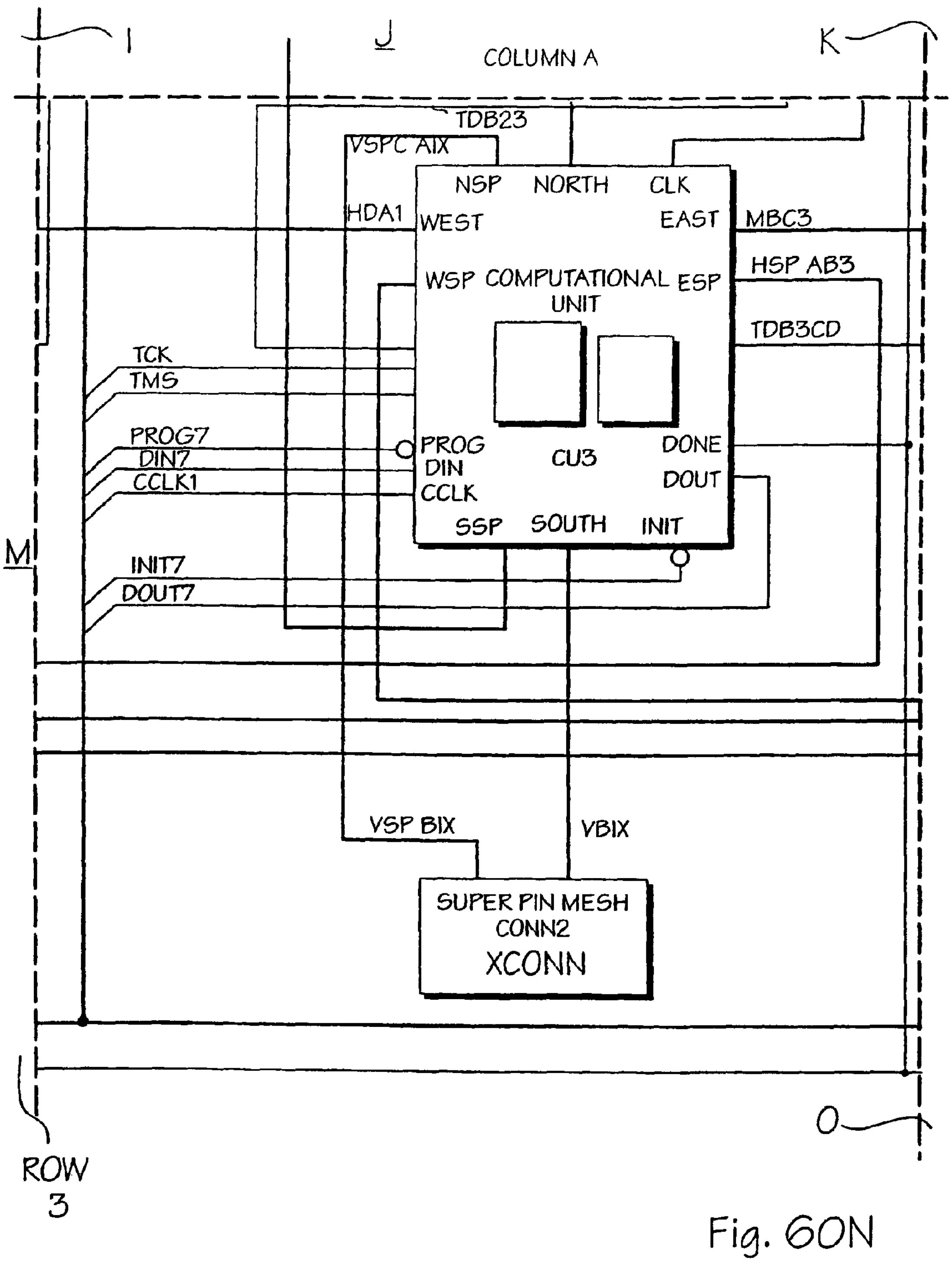
Figure 600:
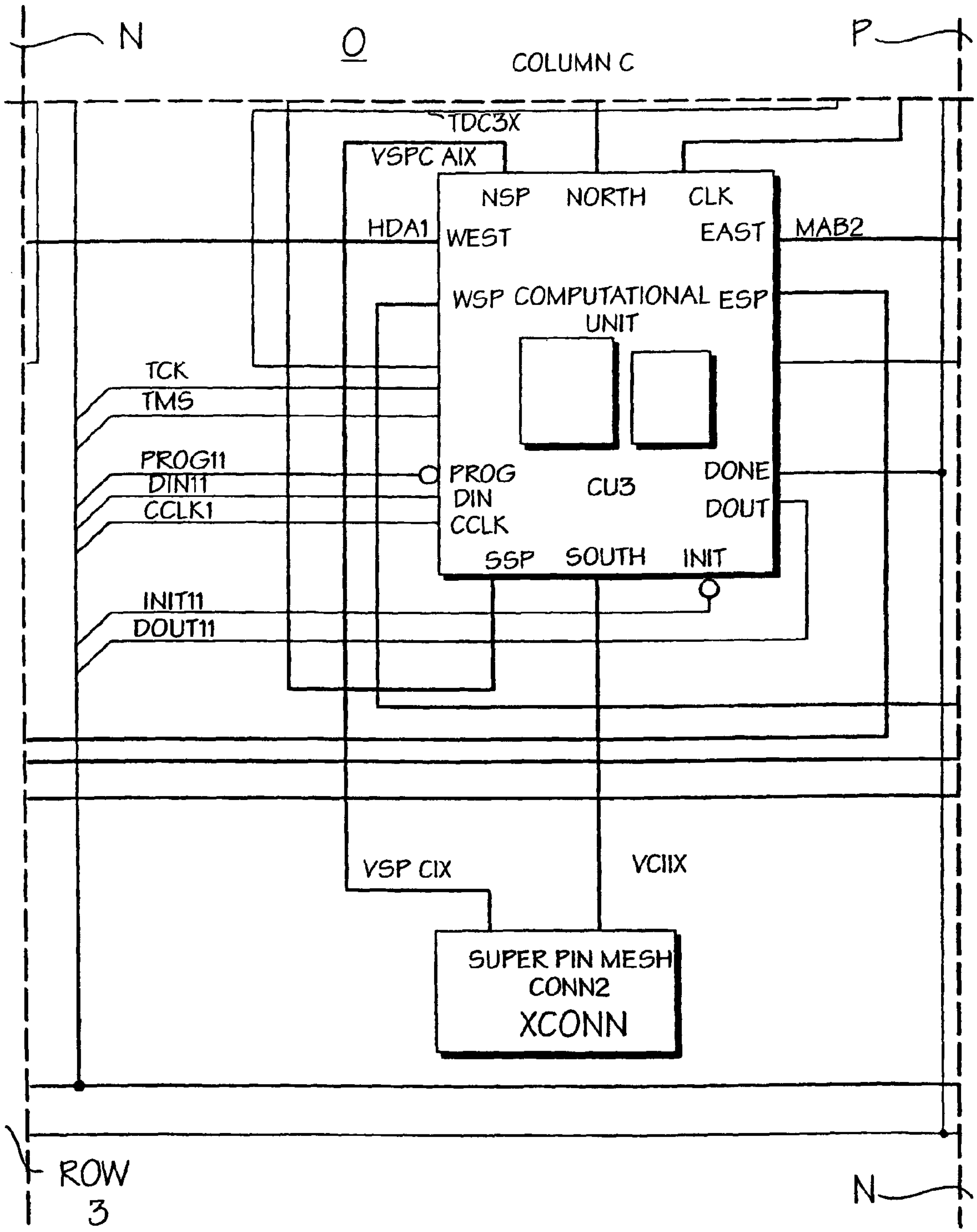
Figure 60P:
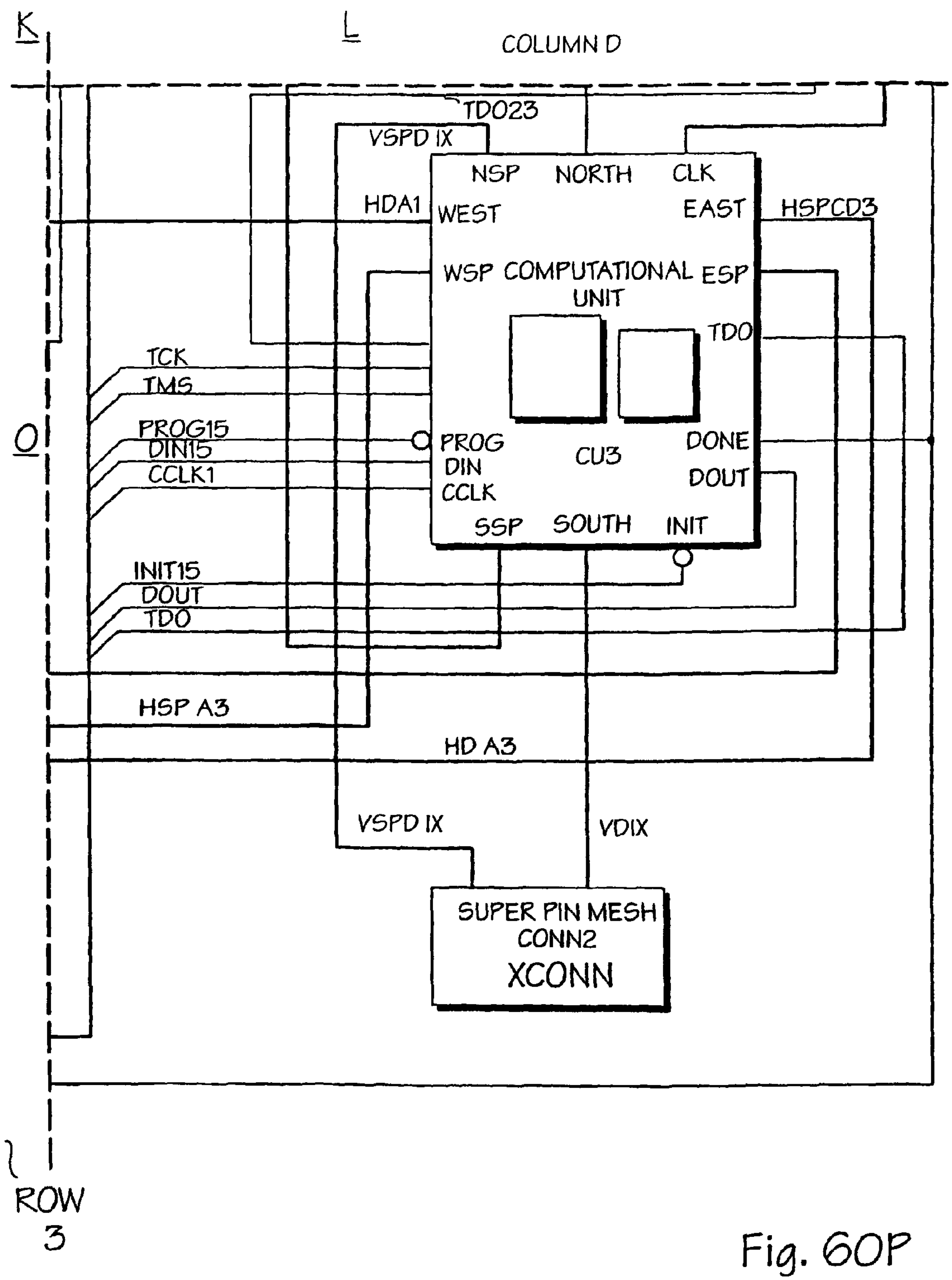
Figure 61:
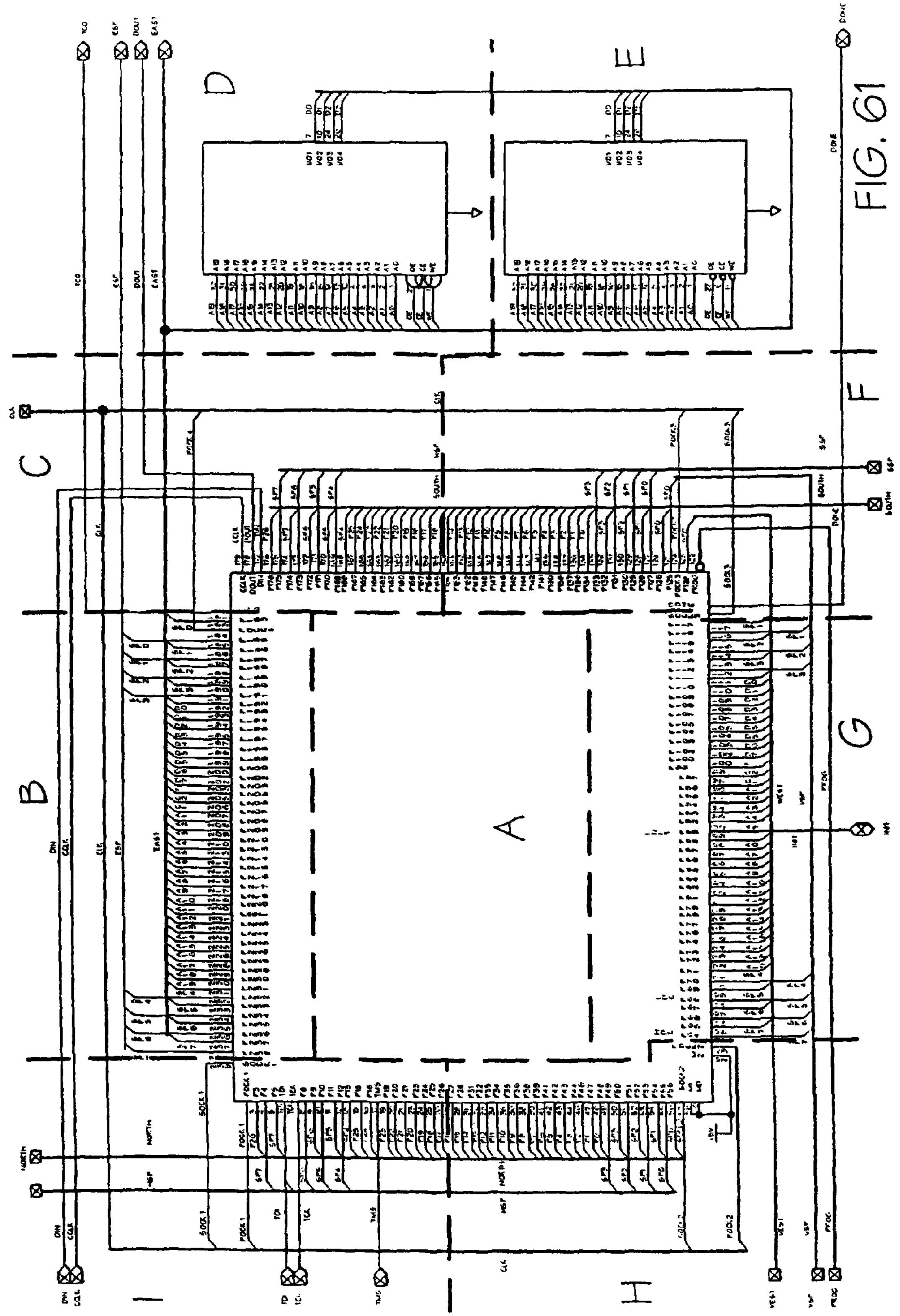
FIGS. 61(A)-(I) show a detailed view of one FPGA computing element and a pair of SRAMs.
Figure 61A:
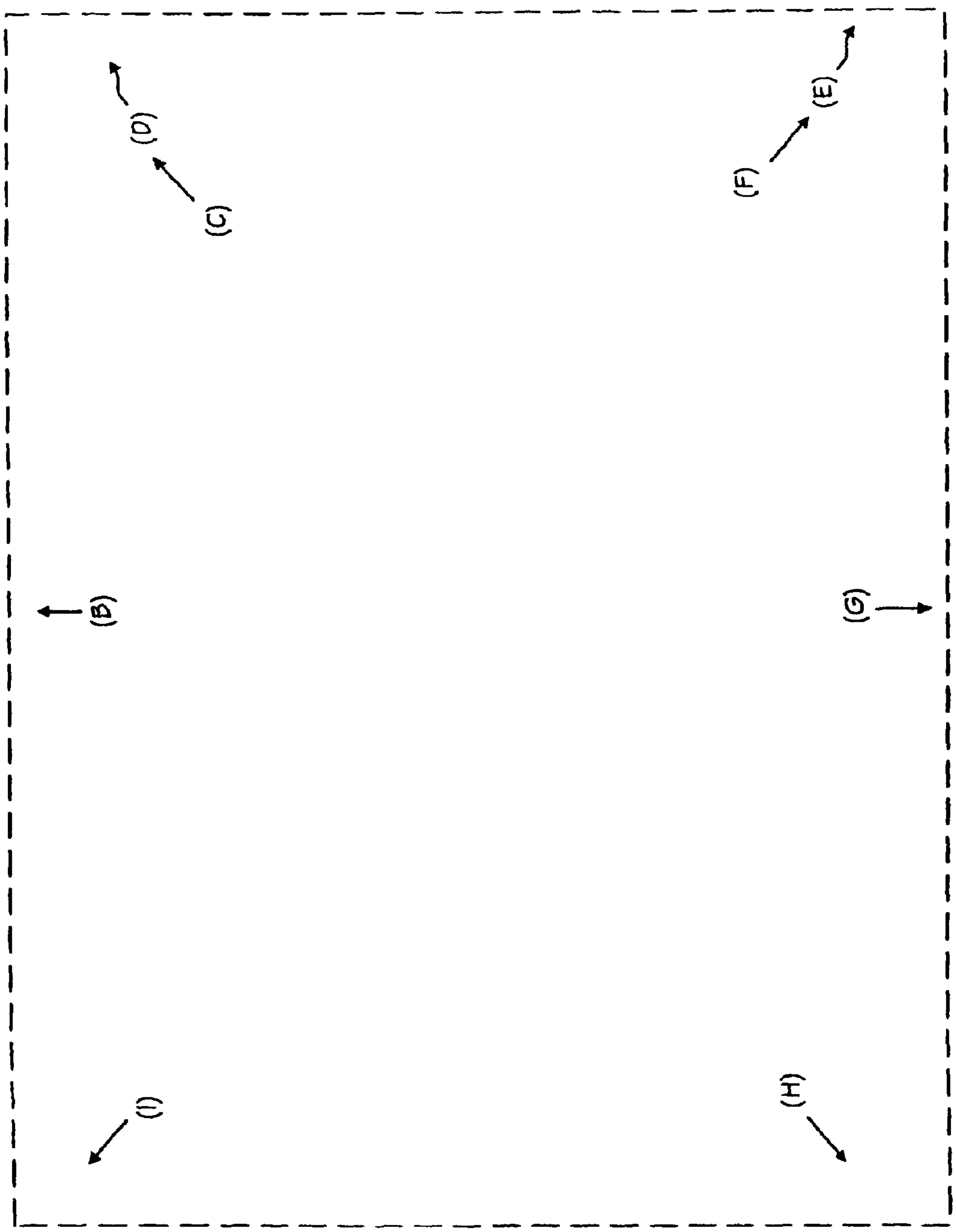
Figure 61B:
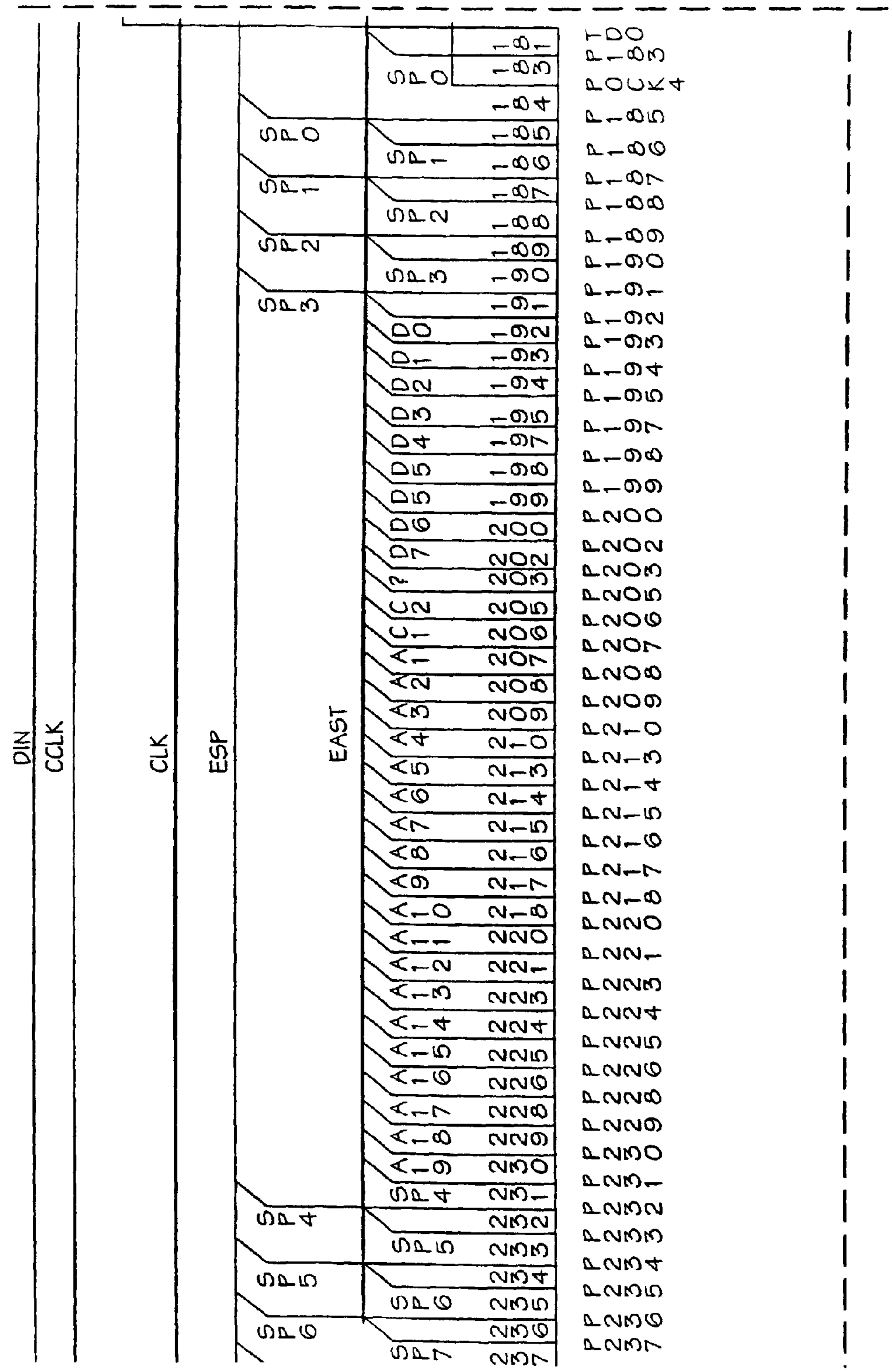
Figure 61C:
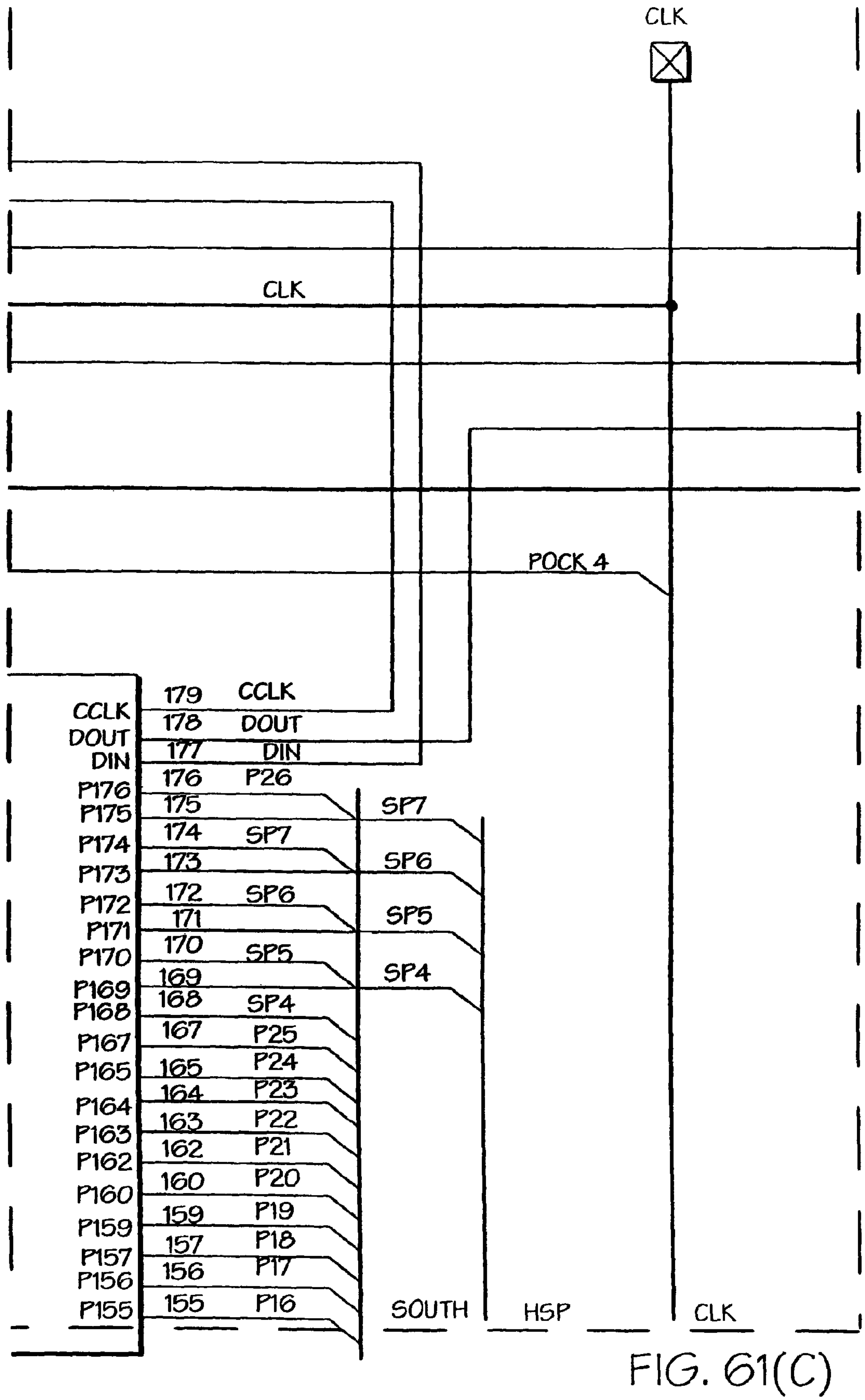
Figure 61D:
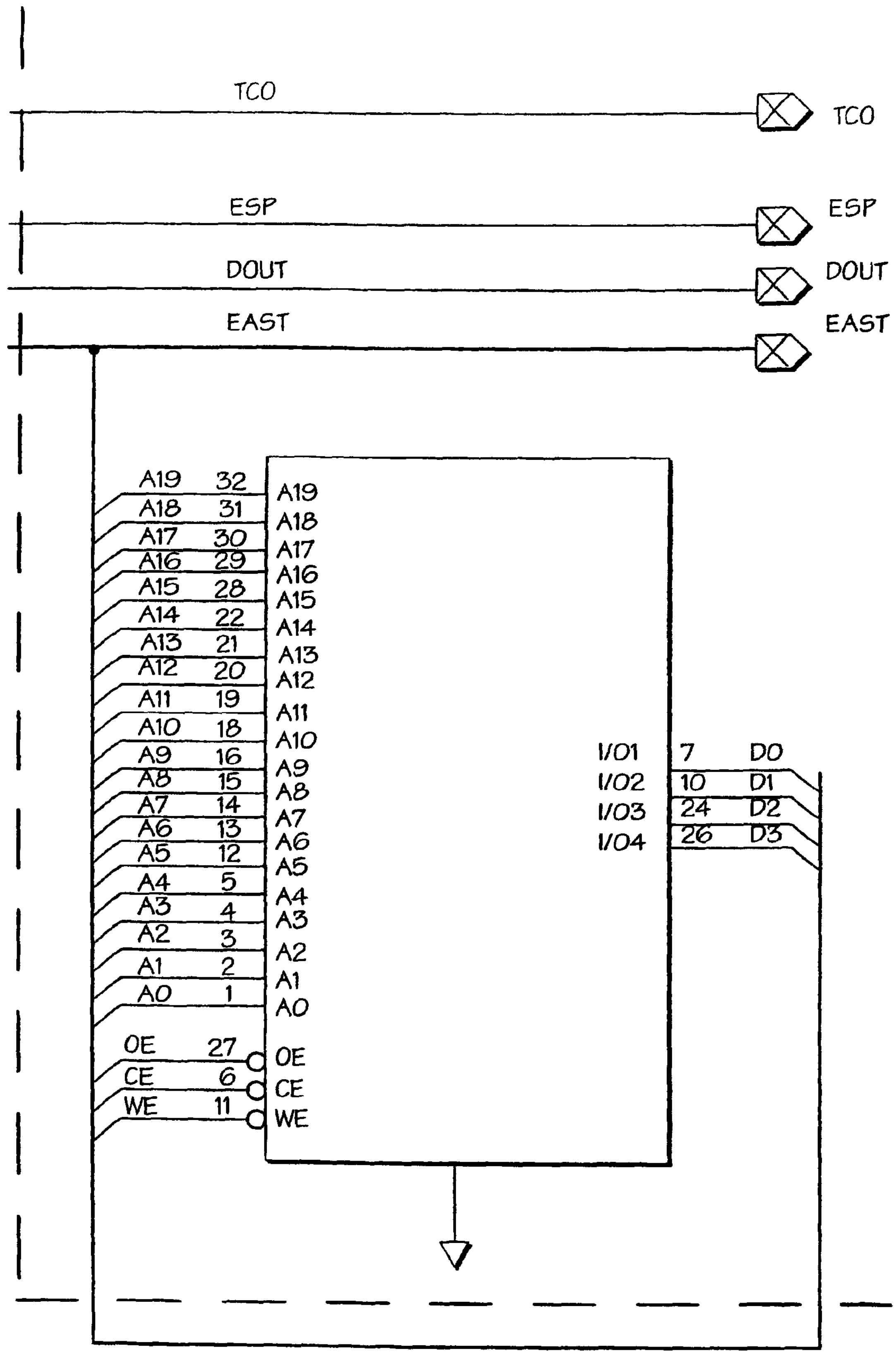
Figure 61E:
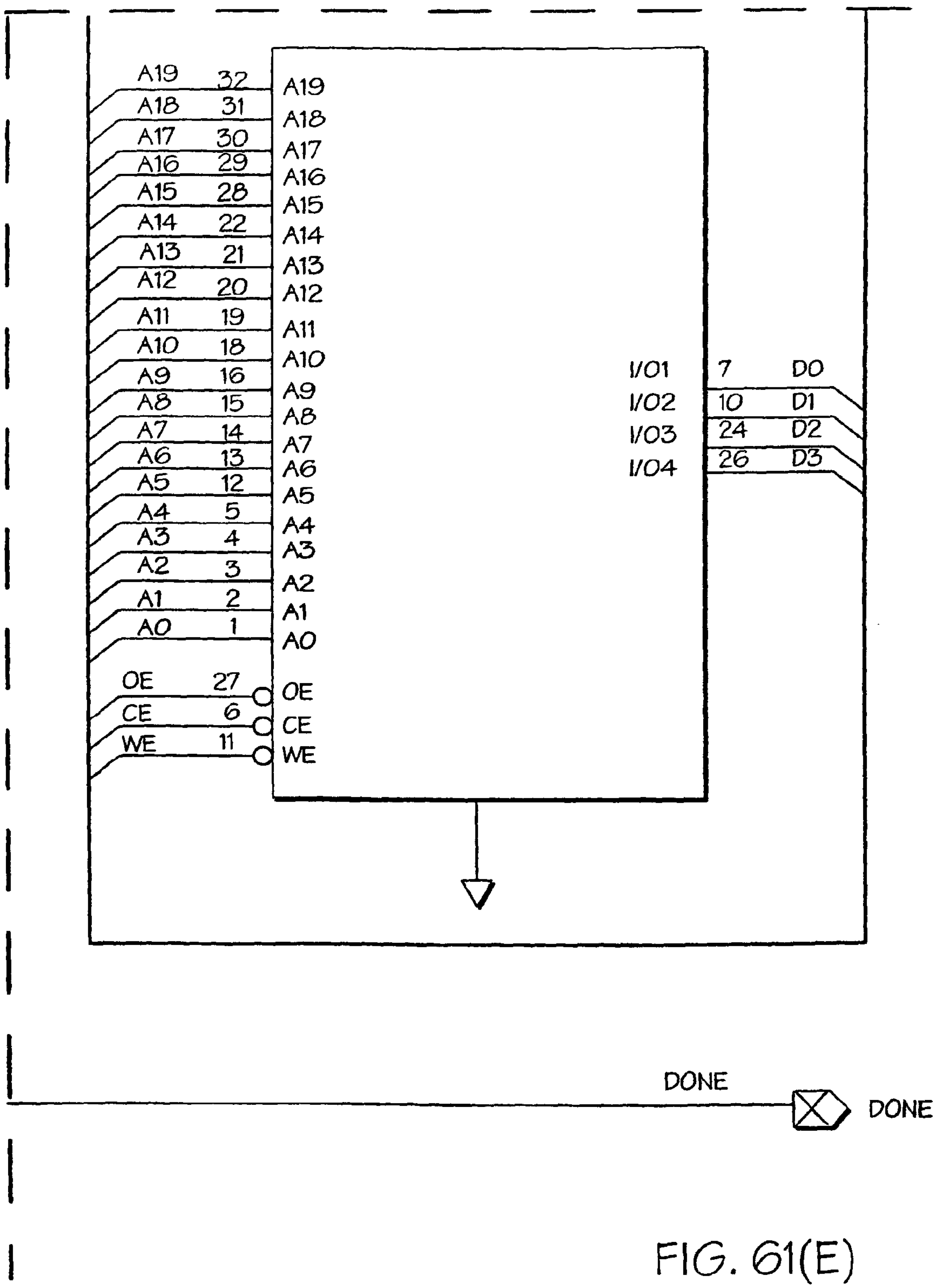
Figure 61F:
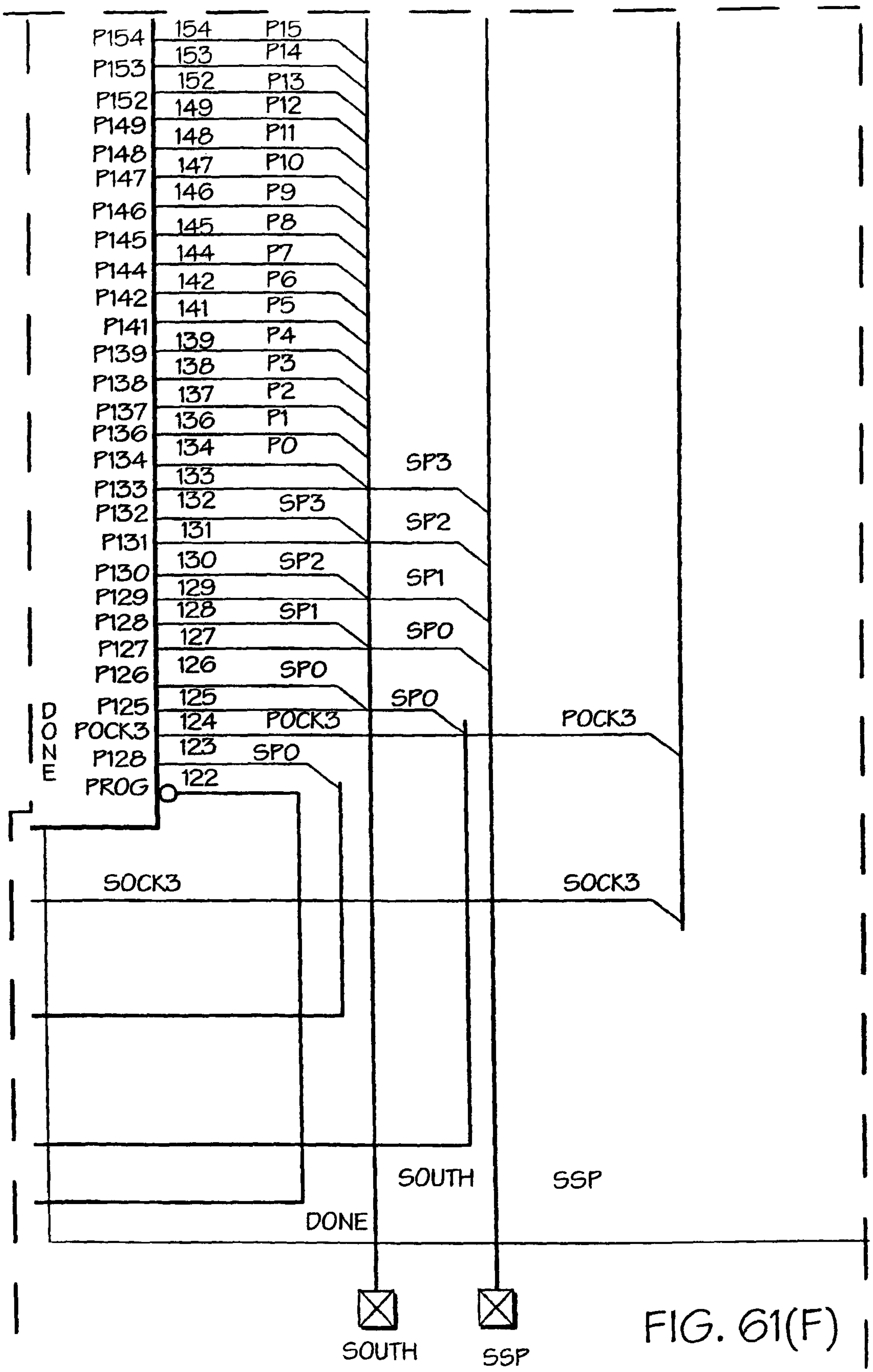
Figure 61G:
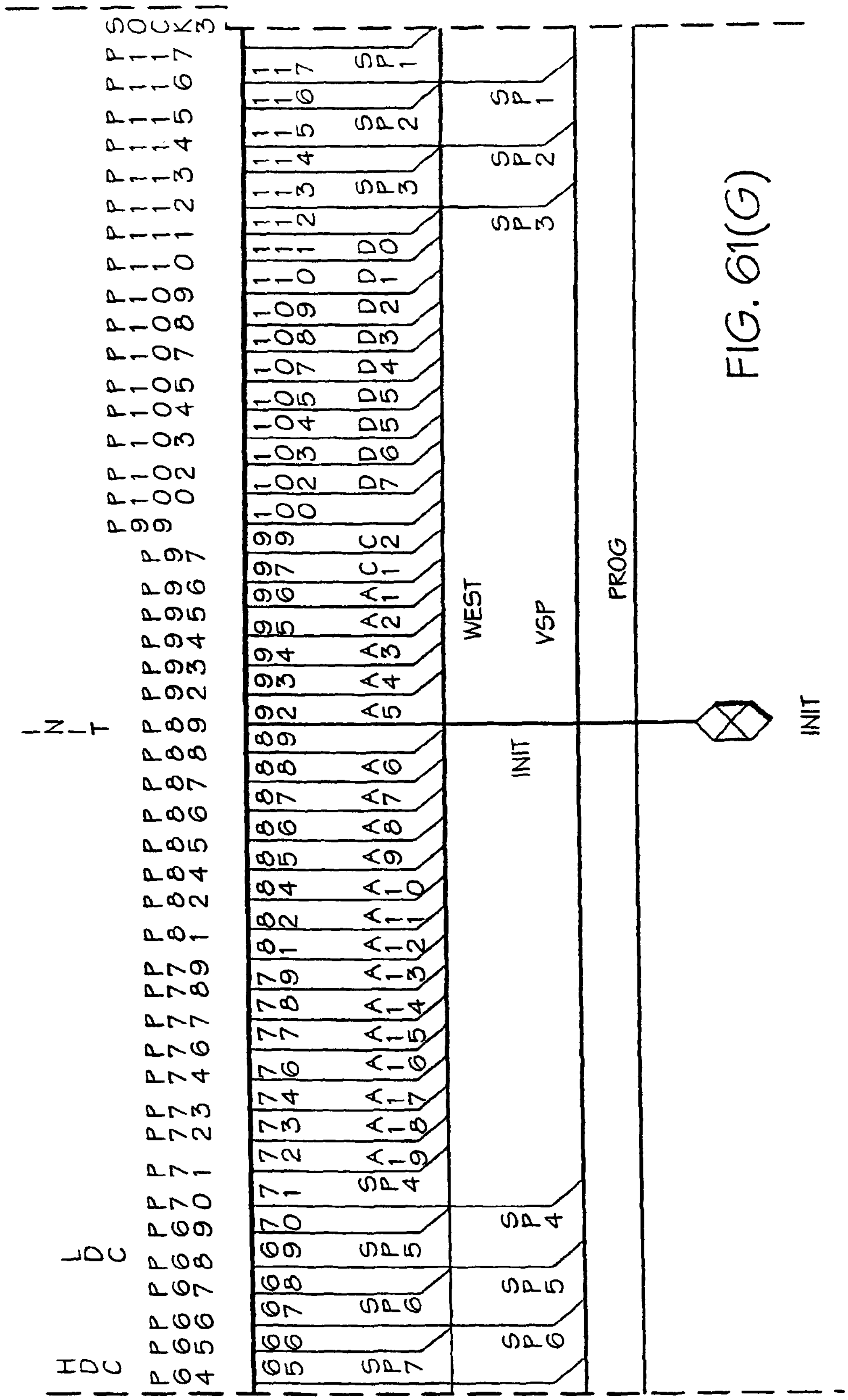
Figure 61H:
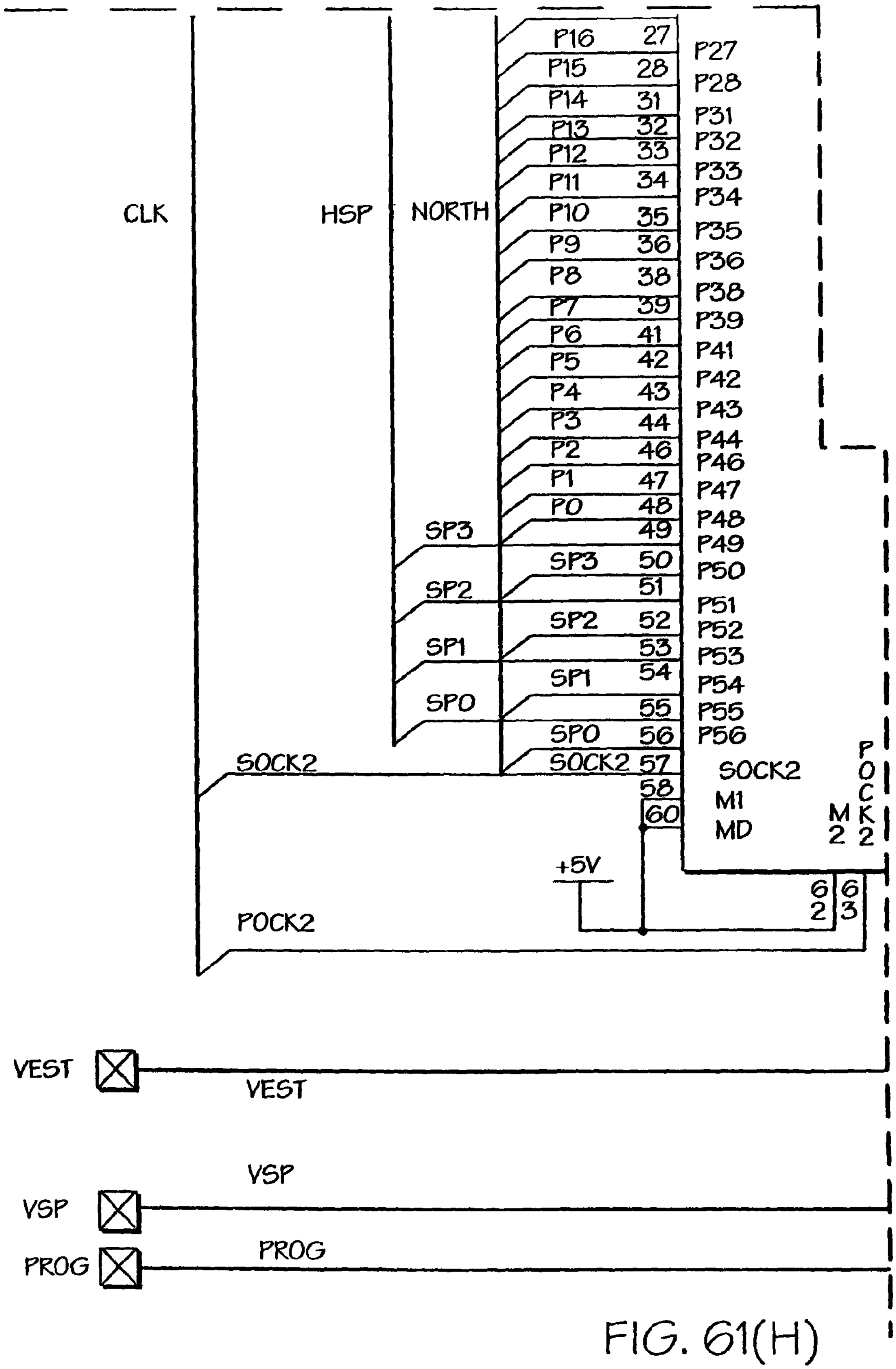
Figure 61I:
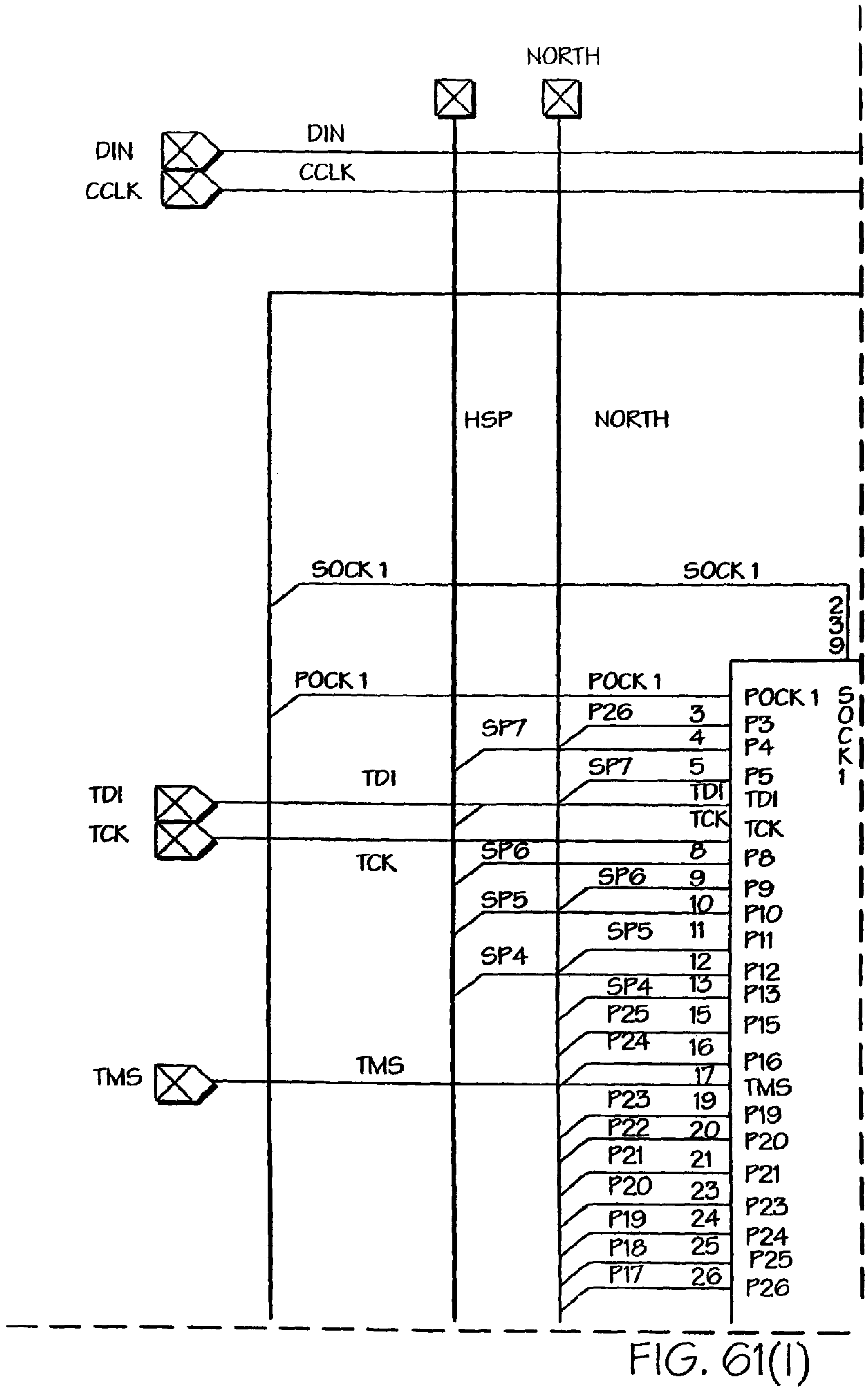

FIGS. 60(A)-(P) show a more detailed version of the 4.times.4 array described with respect to FIG. 46. FIGS. 60(A)-(P) also shows the superpin buses, test pins, and programming pins. The datapath unit, the PCI interface unit, and the clock unit, however, are not shown. The layout and pins of the computing modules CU1 to CU16 are substantially identical. Their functions, however, are different. As explained above, the fully pipelined architecture provides for some computing modules to compute the census transform, others to compute correlation sums, and still others to provide a transmission path to the PCI bus.

An exemplary computing module is computing module CU6, which is located at row 1 and column B. In one embodiment, computing module CU6 contains a Xilinx XC4000 series FPGA chip and external SRAM. The North-South axis pins are shown as NORTH for the North pin and SOUTH as the South pin. The West-East axis pins are shown as WEST for the West pin and EAST for the East pin. NSP, SSP, WSP, and ESP are the North, South, West, and East superpin bus pins, respectively.

Several pins are used for configuration purposes. TDI, TCK, and TMS are the Test Data In, Test Clock, and Test Mode Select inputs for boundary scan purposes for board-level testing of these electronic subassemblies. If boundary scan is not used, these pins can be used as inputs to the CLB logic after completing configuration. TDO is the Test Data Output if boundary scan is used. TDO is a 3-state output without a register after configuration if boundary scan is not used. PROG is an input that forces the computing module CU6 to clear its configuration memory to initiate a configuration cycle. DONE is a bidirectional signal; as an input, it can be used to delay the global logic initialization and the enabling of outputs, while as an output, it indicates the completion of the configuration process. INIT is a bidirectional signal during and after configuration. It is an output during the power stabilization and internal clearing of the configuration memory. As an input, it can be used to hold the FPGA in the internal WAIT state before the start of configuration. During configuration, it can be used to indicate a configuration data error.

Some pins provide configuration functions while also providing other functions after configuration. DIN serves as the serial configuration data input during slave/master serial configuration, and serves as an output D0 during parallel configuration. After configuration, DIN serves as a user-programmable I/O pin. Typically, DIN is an H function generator input 2. DOUT is a serial configuration data output that can drive the DIN pin of daisy-chained slave FPGAs during configuration (except Express mode). After configuration, DOUT is a user programmable I/O pin.

Two clock signals are used. During configuration, CCLK can serve as an output during master modes or asynchronous peripheral mode, but it is an input in slave mode, synchronous peripheral mode, and Express mode. After configuration, CCLK can be selected as the Readback Clock. CLK is the main clocking signal that controls the synchronization of the computing modules CU1 to CU16 in the array. The clocking signals for CLK are unique to the columns A to D of the array. Details of these Xilinx FPGAs can be obtained in their data book, Xilinx, The Programmable Logic Data Book (9/96), which is incorporated herein by reference.

As discussed earlier, the top and bottom of the array have 50-pin connectors that are suitable for extending the array, closing the torus, or adding peripheral (I/O) devices. The connectors XCONN above the row 0 computing modules (i.e., CU1, CU5, C9, CU13) and below the row 3 computing modules (i.e., CU4, CU8, CU12, CU16) provide connections to the North-South axis superpins (i.e., NSP, SSP) and the North-South mesh connections (i.e., NORTH, SOUTH). For a 4×4 array, only eight connectors are needed. Arrays of different sizes may have different numbers of connectors.

Inter-chip communication is divided into North-South communications and East-West communications. The array has 43 pins between any two vertically adjacent FPGAs on the board. If the North and South end connectors are connected by means of a ribbon cable, then the top and bottom chip in each column are also connected by 43 pins. The middle two rows are connected by 43 pins, but if any column is communicating with the host processor, 20 of these pins are devoted to this communication. For East-West communications, the array has 42 pins. However, if external SRAM is being used, 20 of these pins are devoted to address, and 8 pins are devoted to data, leaving only 16 pins for communication on the East-West axis.

The communication between each stage of the correlation pipeline includes two 32-bit census vectors, a 5-bit index, a 10-bit summed Hamming distance, and a couple of bits of control information. This adds up to 81 bits of communication that need to occur all the way through the pipeline. This is more than the 43 pins available to provide such communication on the North-South axis. However, the model of one pixel for two clock cycles allows communication at twice per pixel. Hence, 86 bits can be communicated by multiplexing the outputs and inputs on these North-South 43 pin connections. The negative effects from lossy communications and the high volume of register usage will decrease with the use of strobed I/O registers and multiplexed I/O pins. The Xilinx XC4028EX provides such functionality.

The pins between adjacent elements are lightly loaded capacitively and are able to pass data very quickly across the gap between chips. The XC4025 chips have I/O registers that can latch data as it passes off of and onto each chip, allowing high-speed pipelining to occur. In fact, using the clock enables allows a simple bundled request/acknowledge communication scheme to be set up as long as the delay over the data wires is roughly equal to the delay along the control wires. Requiring a round-trip request/acknowledge usually ensures adequate time for data transmission by the time the control signal completes a round trip.

The slowest lines on the array board are the lines that run from the right edge of the board to the left edge of the board, joining the far sides of the edge chips together. These lines are capable of data transmission at 25 MHz provided some skewing of the receiving register timing is performed. Higher-speed devices eliminate the need for skewing. Indeed, use of these faster devices at the edge of the array evens out the performance across the array.

FIGS. 61(A)-(I) show a detailed view of one FPGA computing module (i.e., U8) and a pair of SRAMs (U9 and U10). In one embodiment, the SRAMs are Toshiba TC551402 chips. Memory elements U9 and U10 are coupled to computing module U8 via the EAST mesh bus lines. Address lines A0 to A19 in memory element U9 are used to access data in the SRAM chip by reading data which can then be read on LSB data lines D0 to D3 or writing to specific memory locations identified by the address lines. CE represents chip enable and WE represents write enable. Memory element U10 provides MSB data lines D4 to D7.

Each FPGA computational element of the array board connects to its four nearest neighboring computational elements and also to a pair of SRAM chips that together make a 1 MB×8 bit memory available to each FPGA. The connections are laid out to be as short as possible across the array to minimize capacitive loading. However, at the end of the mesh, longer wires are required to close the torus. These longer wires operate somewhat slower than the array wires.

Each computational element of the array board has a 1 MB memory using two 1 MB×4 bit chips per element. The two chips are organized in parallel to give a 1 MB×8 bit memory as seen from the FPGA computational element chip. The SRAM sits on the East-West interconnect channel between FPGA chips, and can be ignored by holding the CE pin high, or can be activated by lowering the CE line. The current boards use a speed grade of 25 ns. Some manufacturers, such as Toshiba, can provide 20 ns versions of the SRAM chip for higher performance. A total of 16 MB of static memory is provided on the array board.

The array board contains a memory hierarchy both on and off the FPGA devices that is very useful for managing the real-time processing and flow of data elements such as video pixels. The memory can be organized according to speed of access and memory size, and include the registers in the FPGA devices, the FPGA on-chip SRAM, the off-chip SRAM, and the host computer DRAM. The speed and memory access of each of these will be discussed in turn.

Each FPGA chip consists of a two-dimensional array of configurable logic blocks, or CLBs. Each CLB has two registers and three lookup tables in the Xilinx XC4000 series. The registers are very useful for pipelining data operations between and within FPGA chips. The registers can be accessed in 3-5 nanoseconds, depending on the speed grade of the Xilinx device. Wire delay must be added to this figure to get total propagation time to the desired location. The XC4025-based array board has 32K registers in the computational array, and 3456 registers in the PCI and clock chips. For video applications, the registers are very useful for storing individual pixels. The aggregate bandwidth of the registers is 3 trillion bits/sec assuming operation at a maximum speed of 100 MHz.

The on-chip SRAM on the Xilinx devices have a read/write cycle time of less than 10 nanoseconds, and are sixteen times denser than the registers. These SRAMS use the lookup tables in the CLBs to store the bits. Each CLB in the Xilinx chips can be configured as 32 bits of SRAM. The total capacity of the XC4025-based array board is 512 Kbits of SRAM, or 64 Kbytes. These internal SRAMs are very useful as line buffers for storing scanlines of data on-chip. For example, convolutional filters can use this SRAM to create multi-tap FIR filters. Theoretically, the on-chip SRAM has an aggregate bandwidth of 1.5 trillion bits per second on the entire array board using all of the SRAM. The address lines of the SRAM can operate at a maximum speed of about 50 MHz given routing constraints.

The external SRAM, which is available through many manufacturers such as Toshiba, has an access time of 25 nanoseconds and a capacity of 1 Megabyte, for a total of 16 MB on the board. This memory is suitable for storing entire frames of images. The bandwidth of this stream is much more limited because only 1 byte is available every 25-40 ns out of the entire megabyte. The aggregate memory bandwidth for this SRAM is 3-5 billion bits/sec, down by 3 orders of magnitude from the on-chip SRAM.

The DRAM on the host CPU is suitable for storing sequences of images or program overlays for the array board. Over the PCI bus, 130 MB/sec with a 32-bit interface and 260 MB/sec with a 64-bit interface can be achieved. Practically, speeds of up to 80 MB/sec have been achieved to date with PCs. The off-board RAM can provide an order of magnitude more capacity with an order of magnitude slower bandwidth.

Finally, a RAID array can provide capacities of 10 or more gigabytes (GB) and access speeds of roughly 10-20 megabytes per second. This provides two orders of magnitude more capacity at one order of magnitude less speed than off-board DRAM.

One configuration of the array board use a custom-designed PCI interface that executes non-burst bus transfers at a maximum speed of 25 MHz. All of the PCI chips on the existing boards can be replaced with XC4013E-2 devices which are capable of burst transfers at the full speed of the PCI bus (33 MHz). The PCI bus is able to operate using single-word transfers or multiple burst-mode transfers to transfer data. The single-word transfers tend to have less critical timing on the target interface. Much higher speeds are possible with burst transfers, because the time spent sending an address is amortized over a number of data cycles. The timing and control logic for burst-mode transfers is more critical than for single-word transfers. A Xilinx LogiCore PCI interface design can be adapted for use on the array board. The array board will be capable of burst writes at 132 MB/sec and burst reads at 66 MB/sec.

Figure 62:
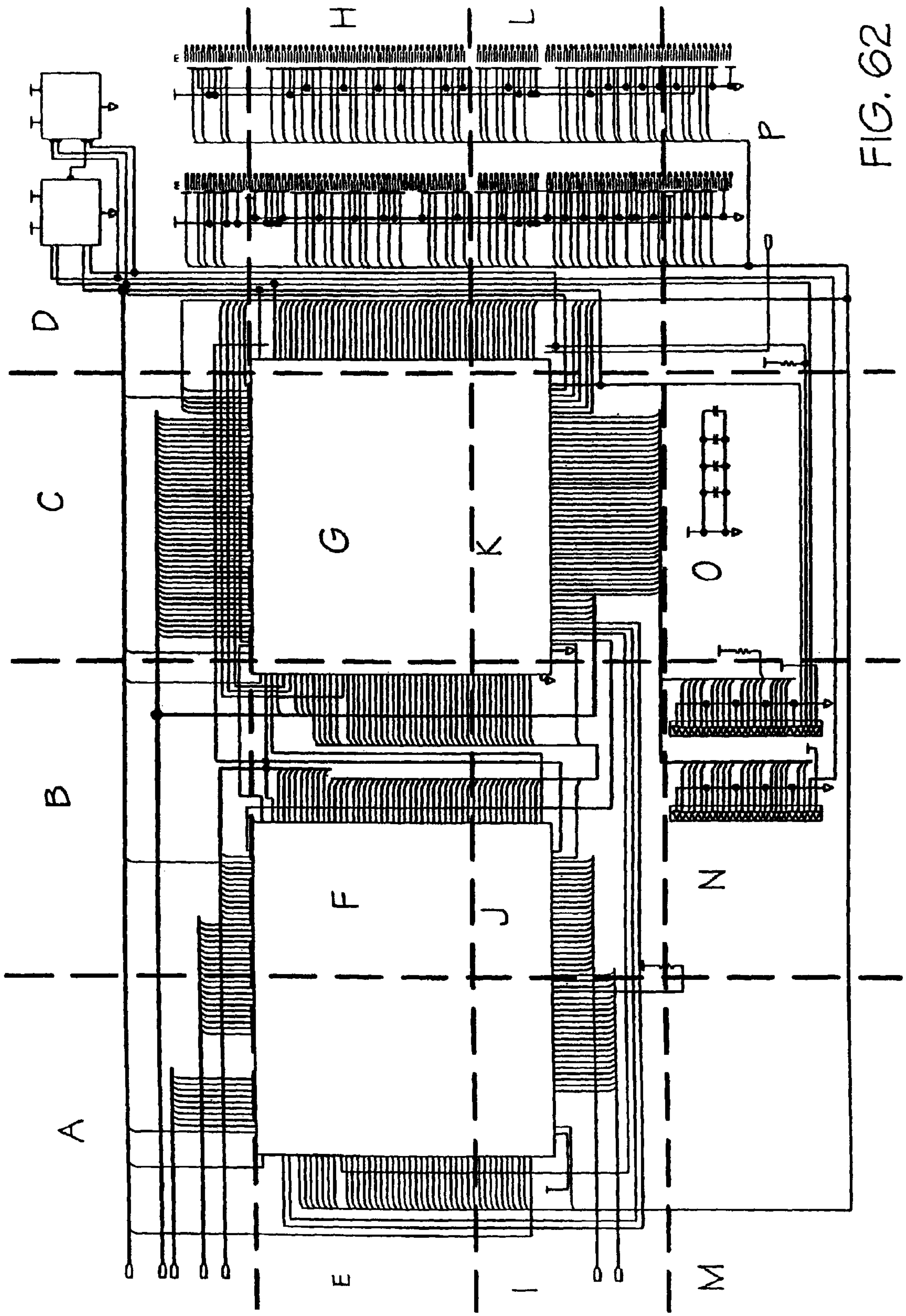
FIGS. 62(A)-(P) show a detailed view of the PCI interface chip and the datapath chip.
Figure 62A:
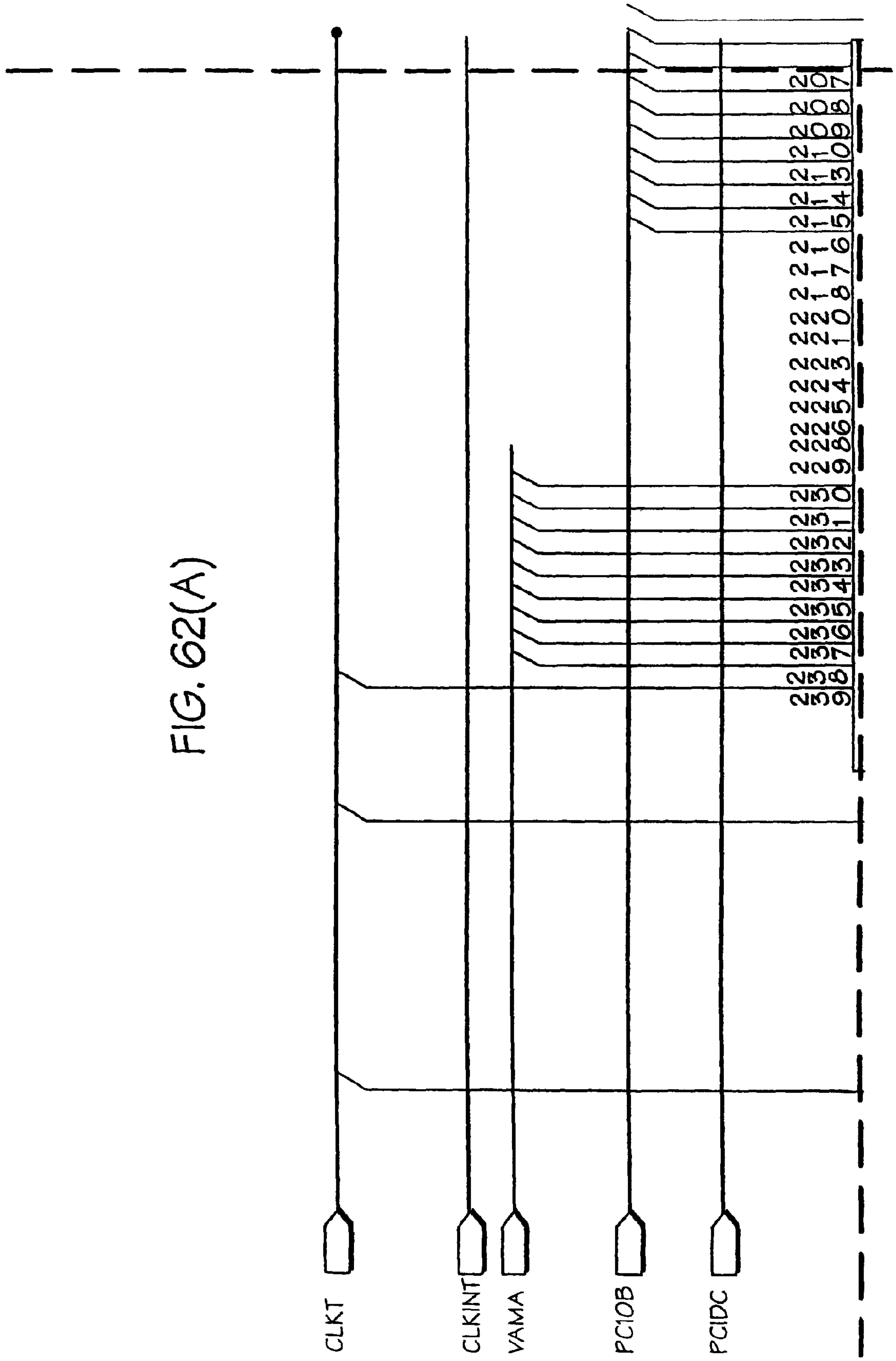
Figure 62B:
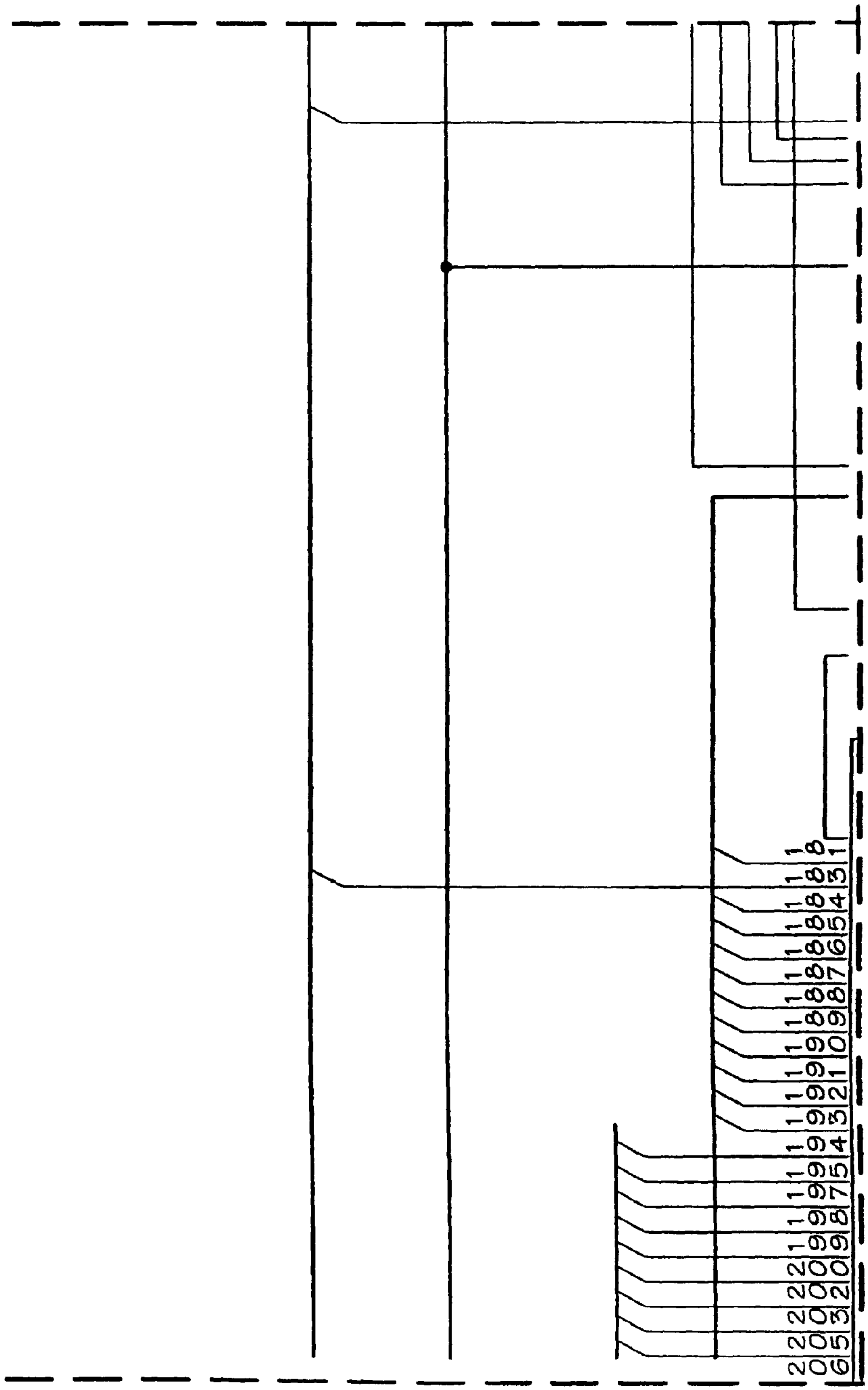
Figure 62C:
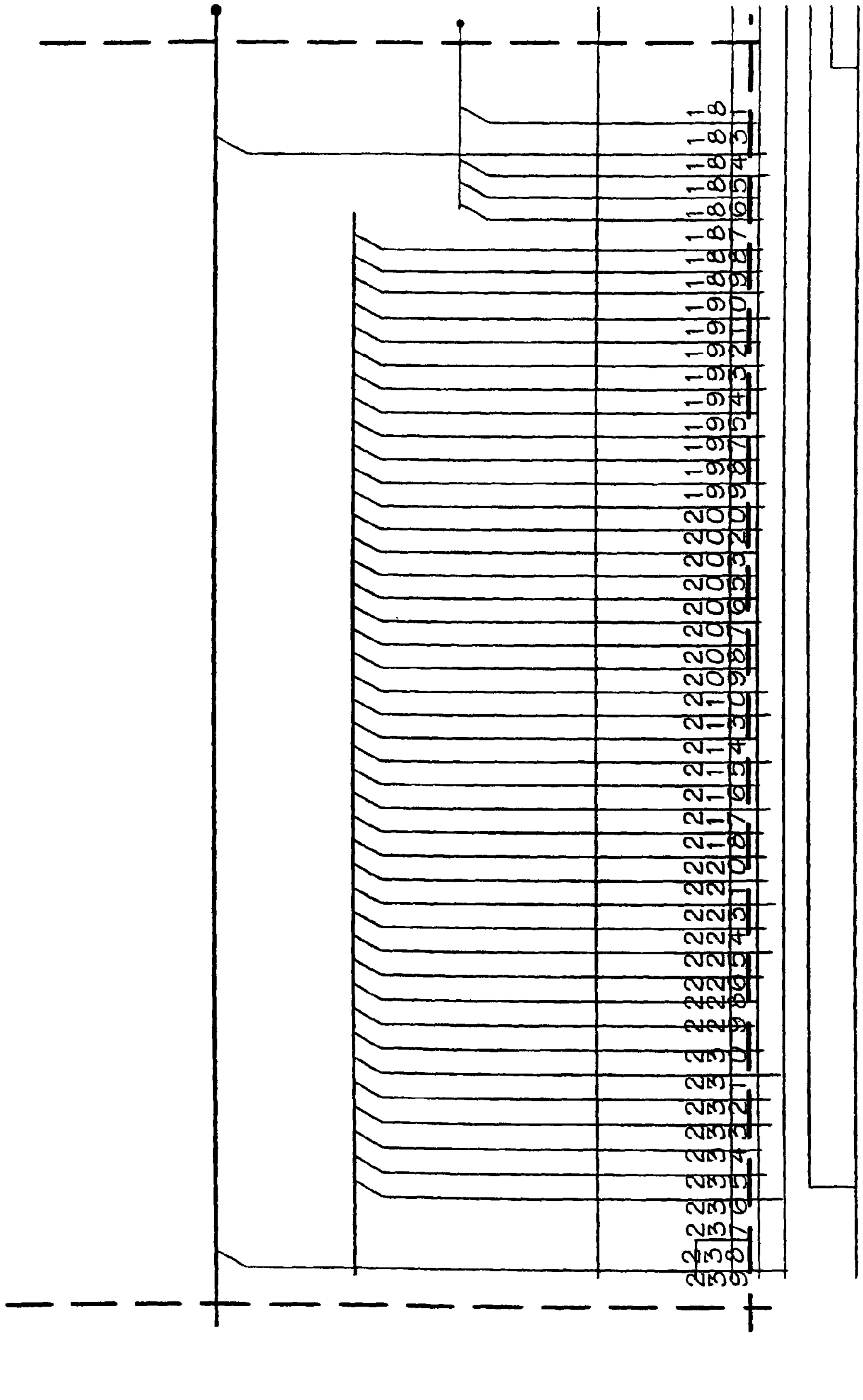
Figure 62D:
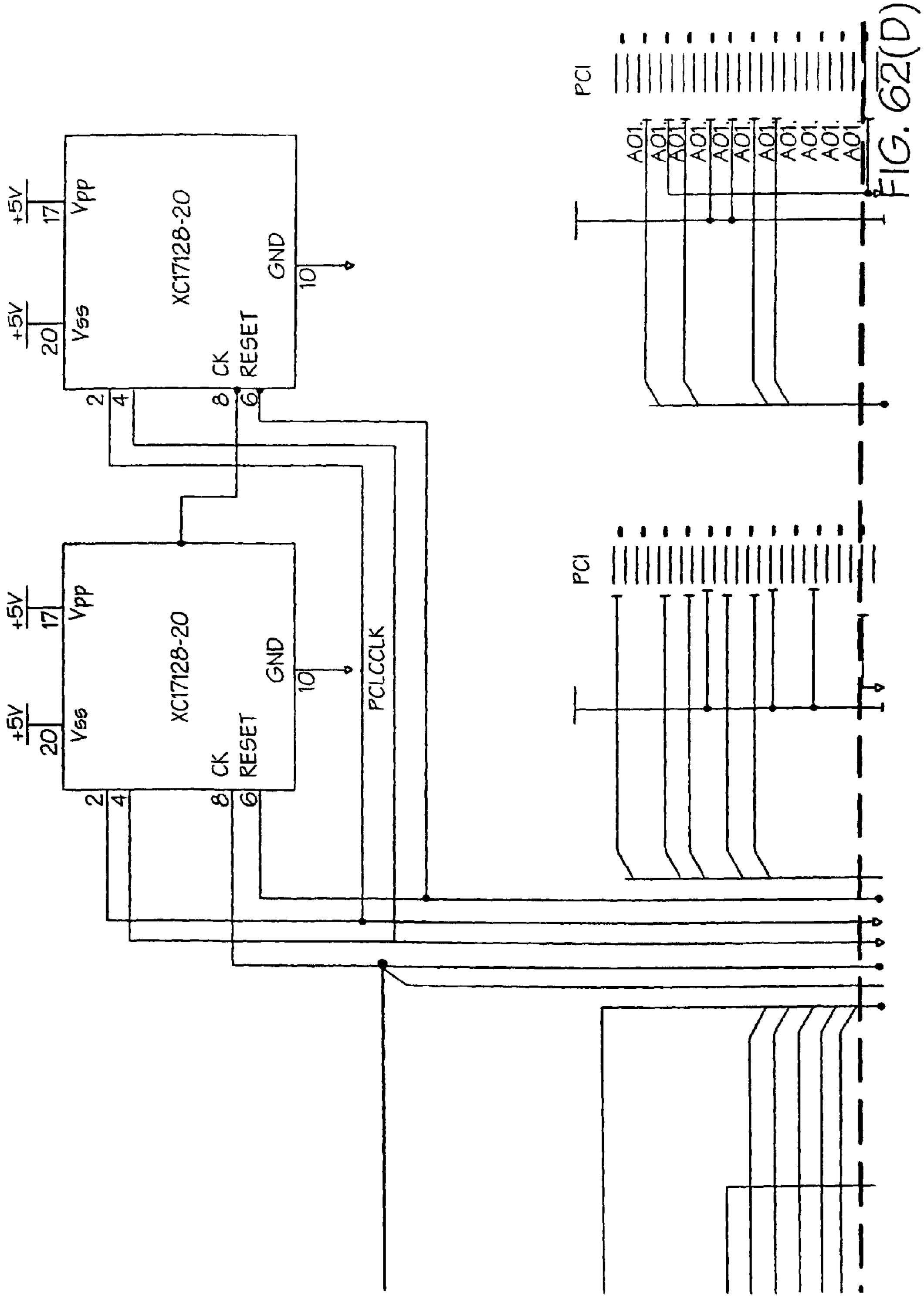
Figure 62E:
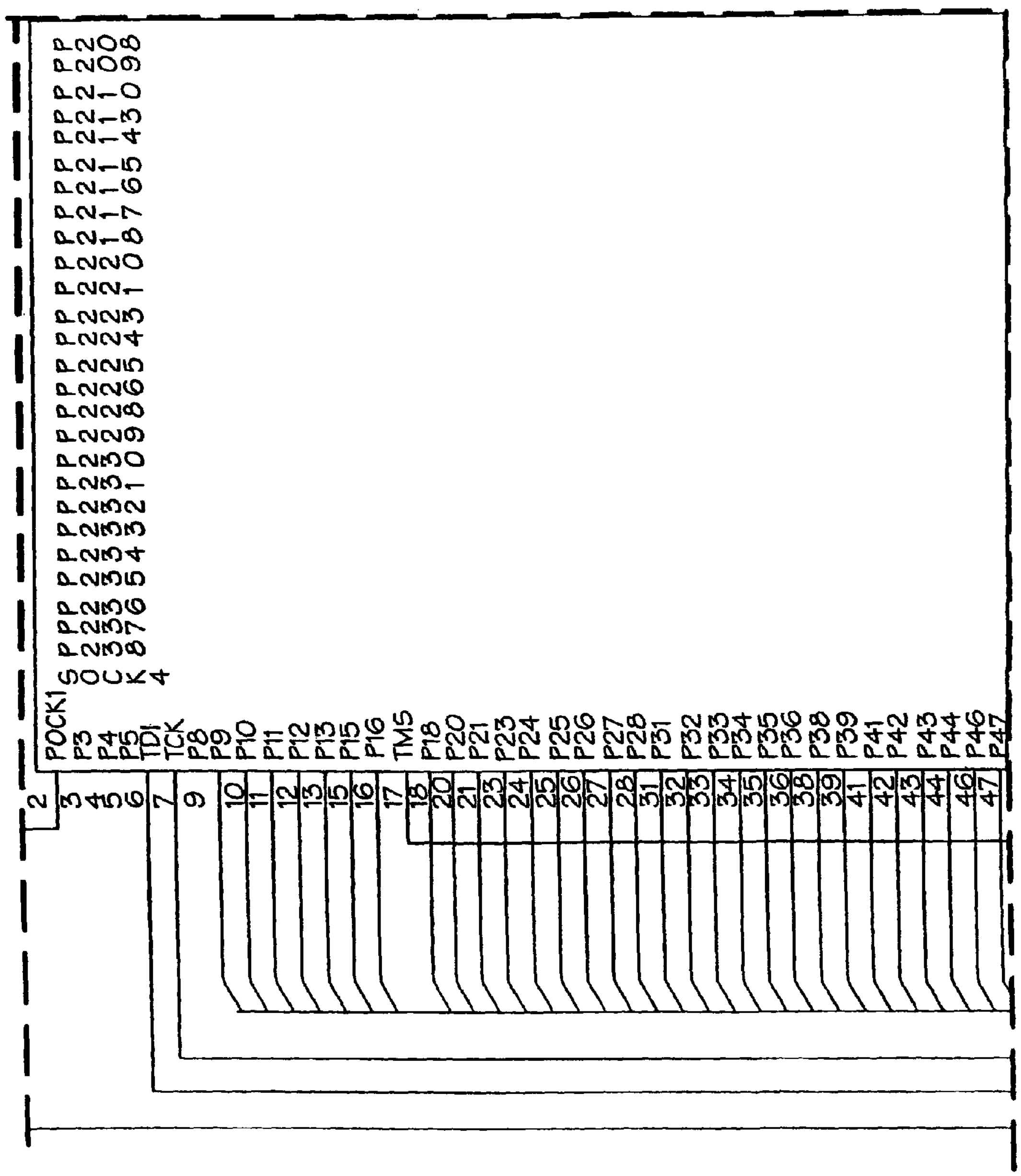
Figure 62F:
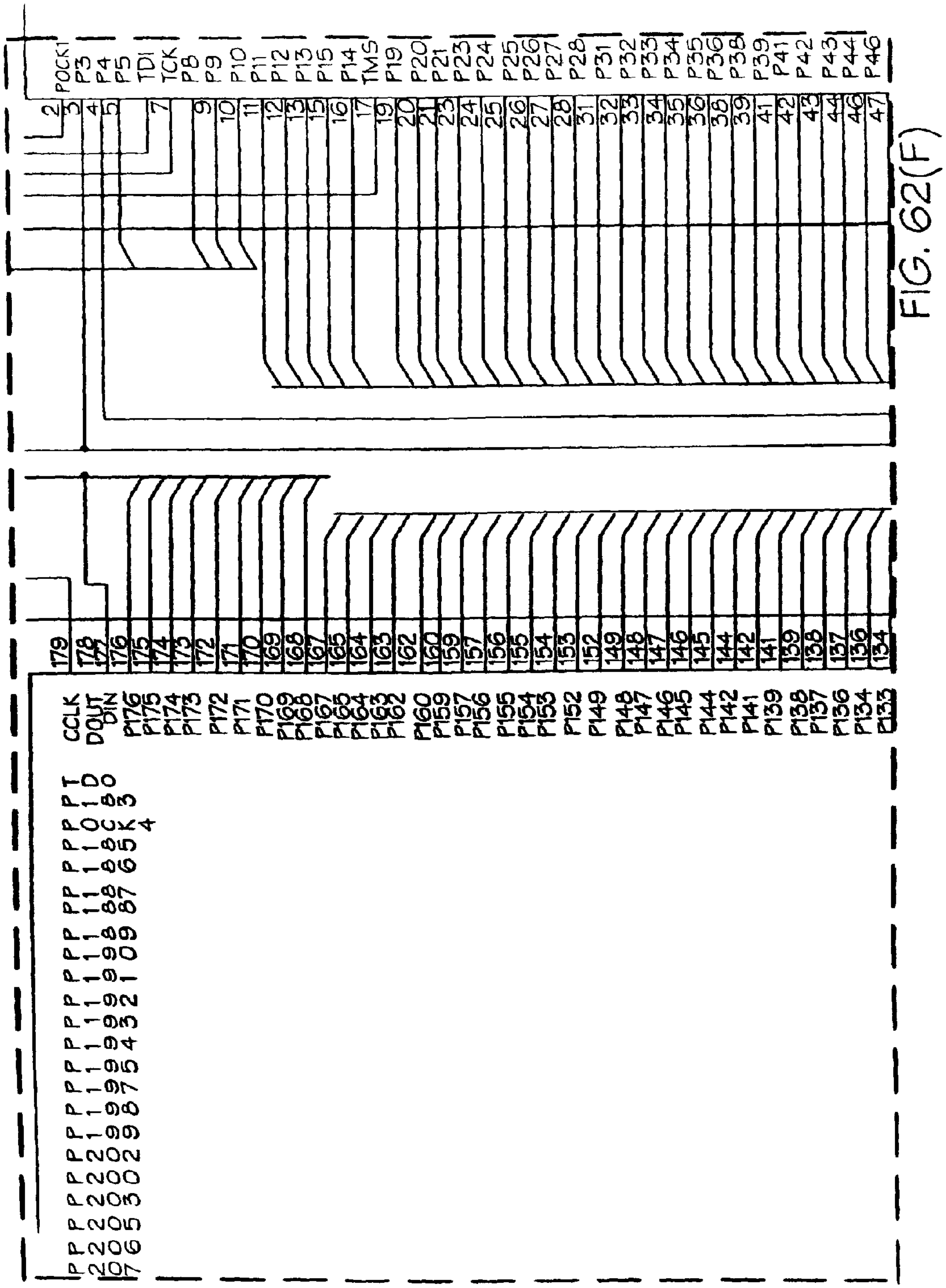
Figure 62G:
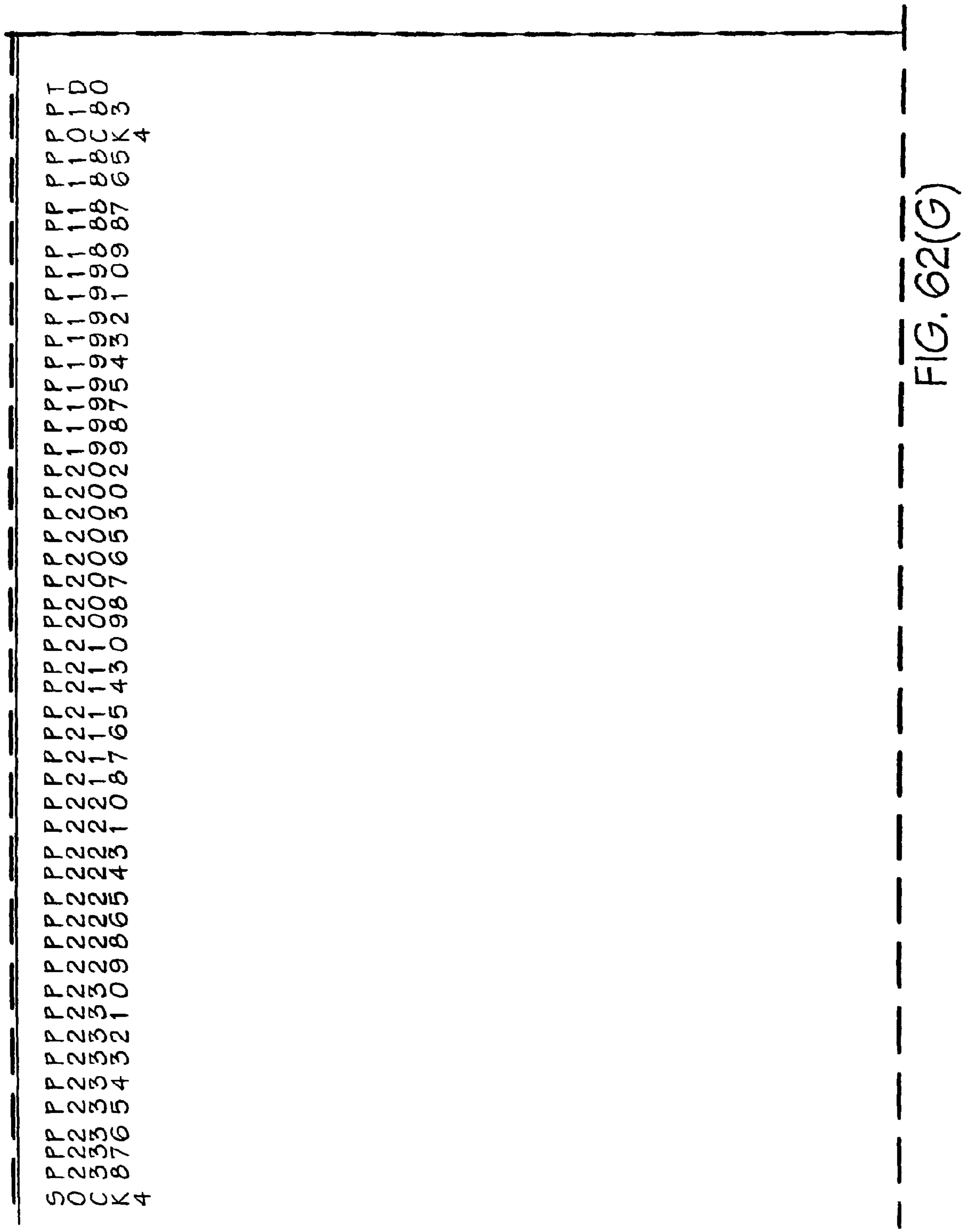
Figure 62H:
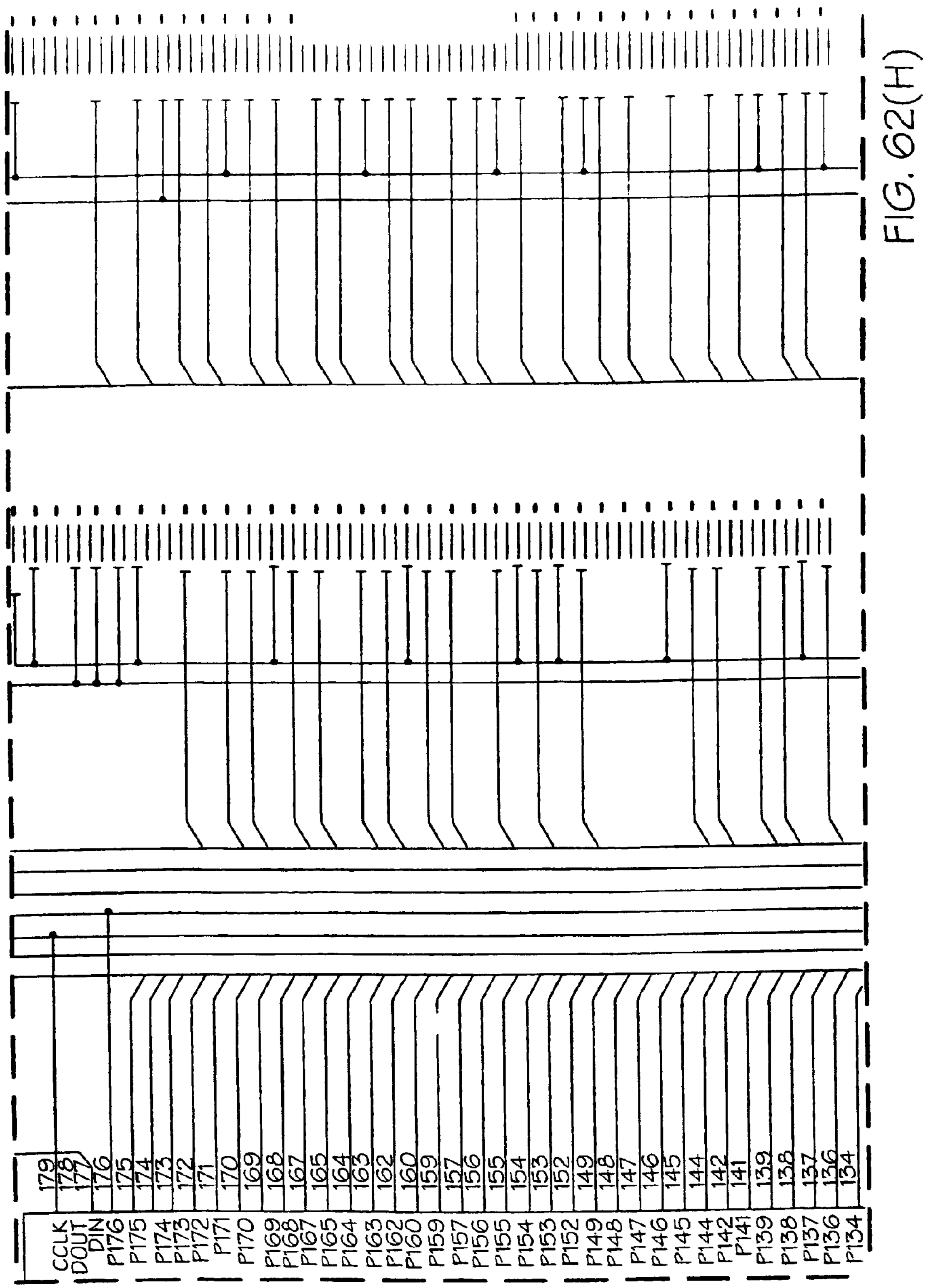
Figure 62I:
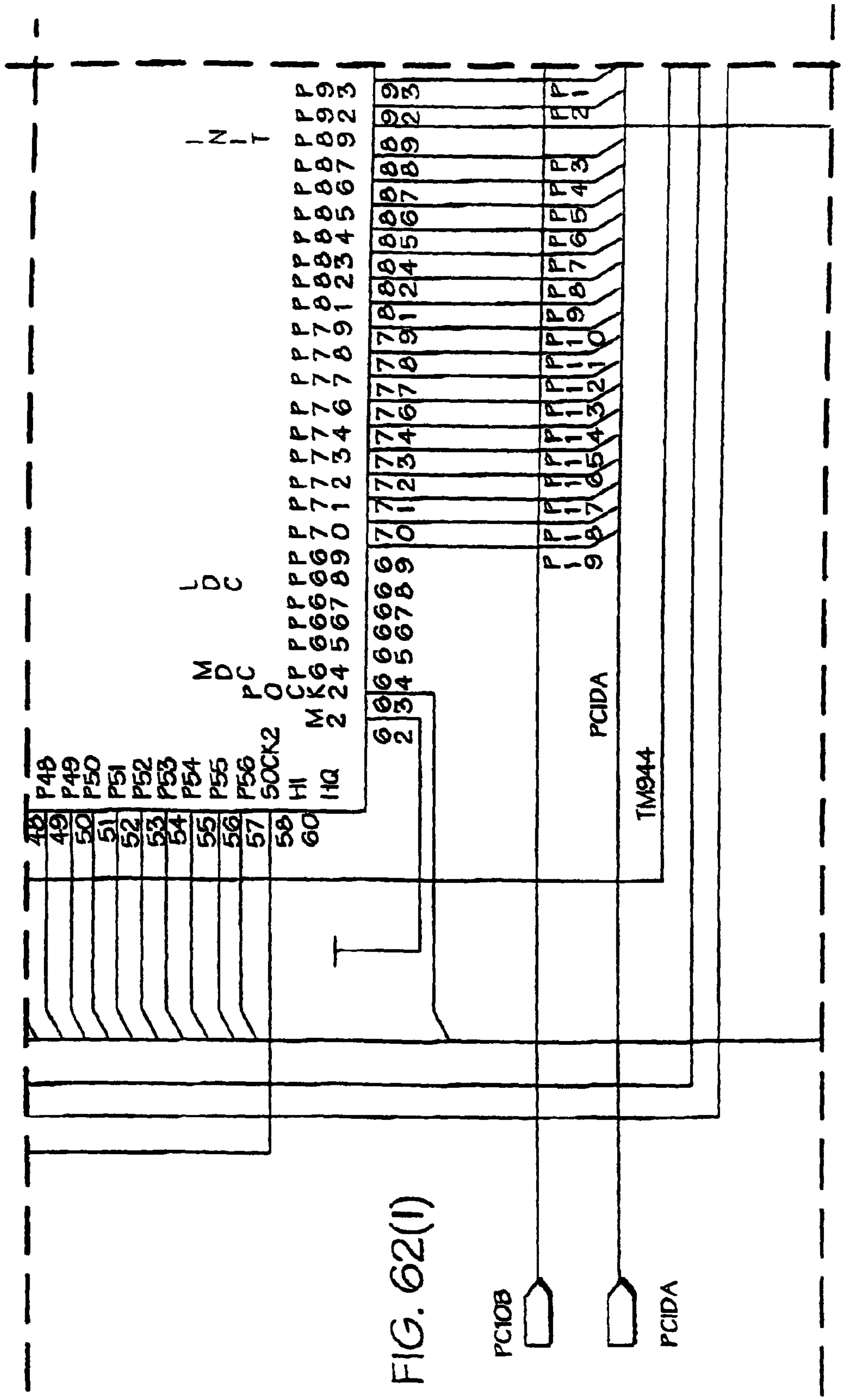
Figure 62J:
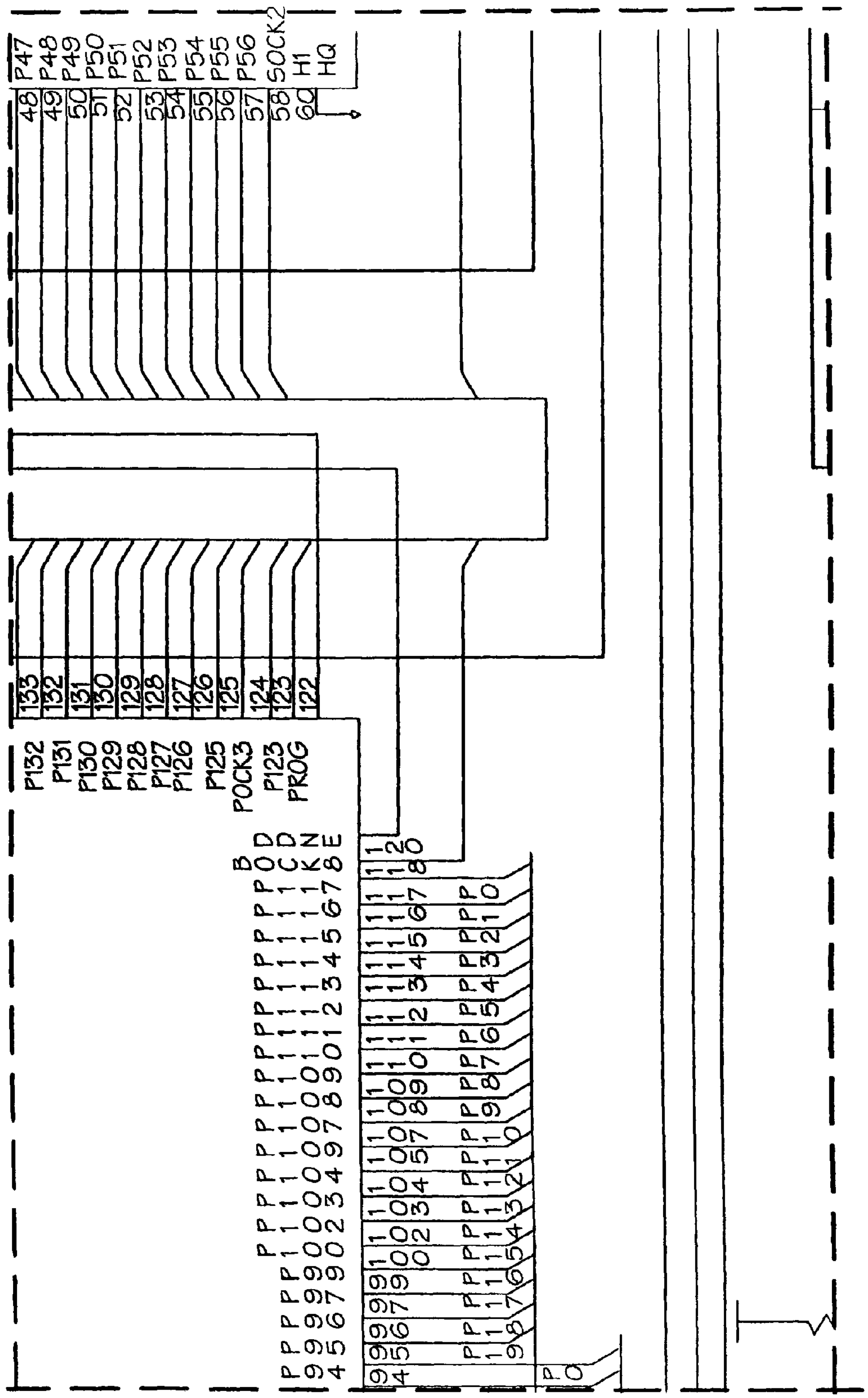
Figure 62K:
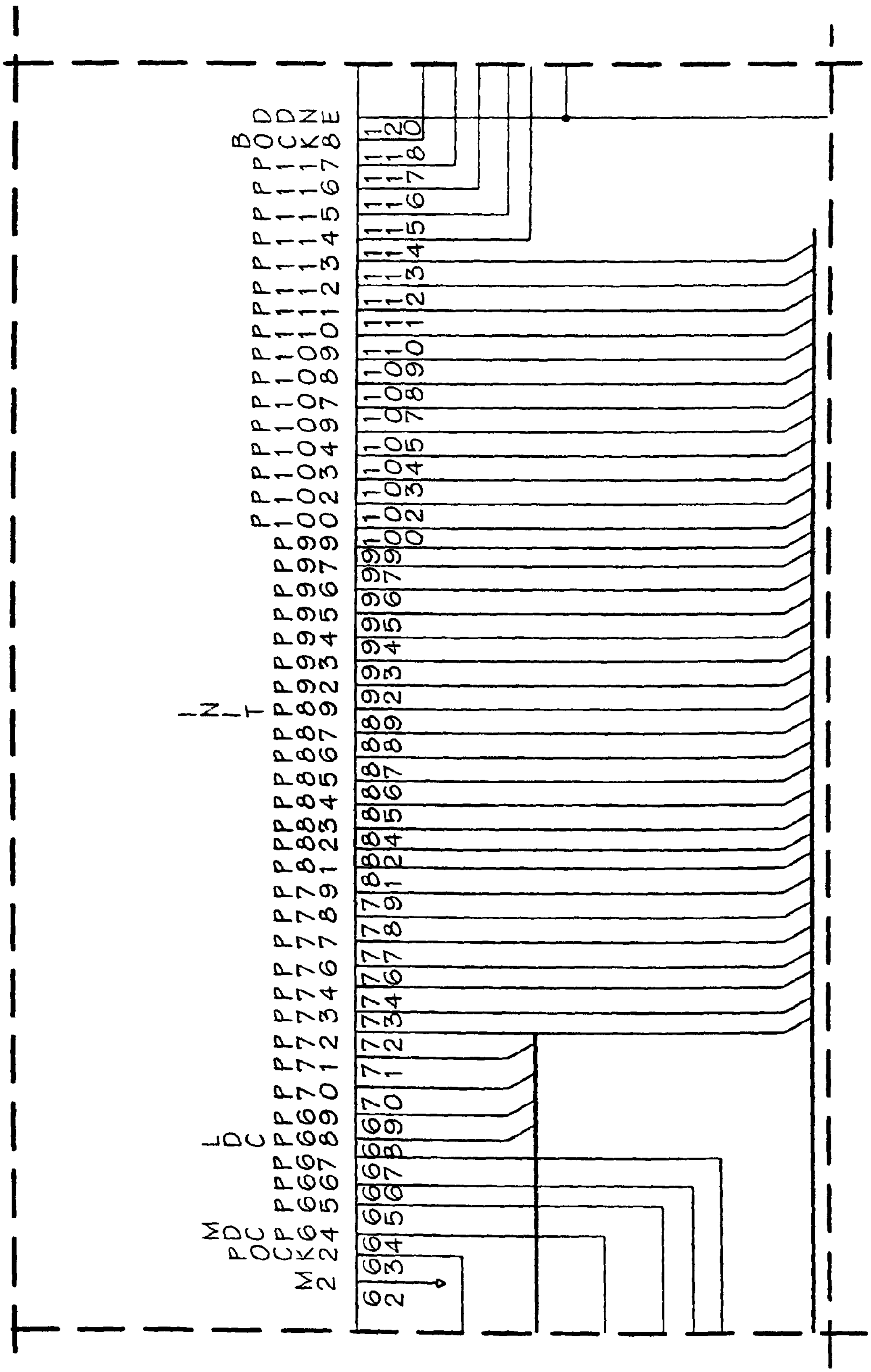
Figure 62L:
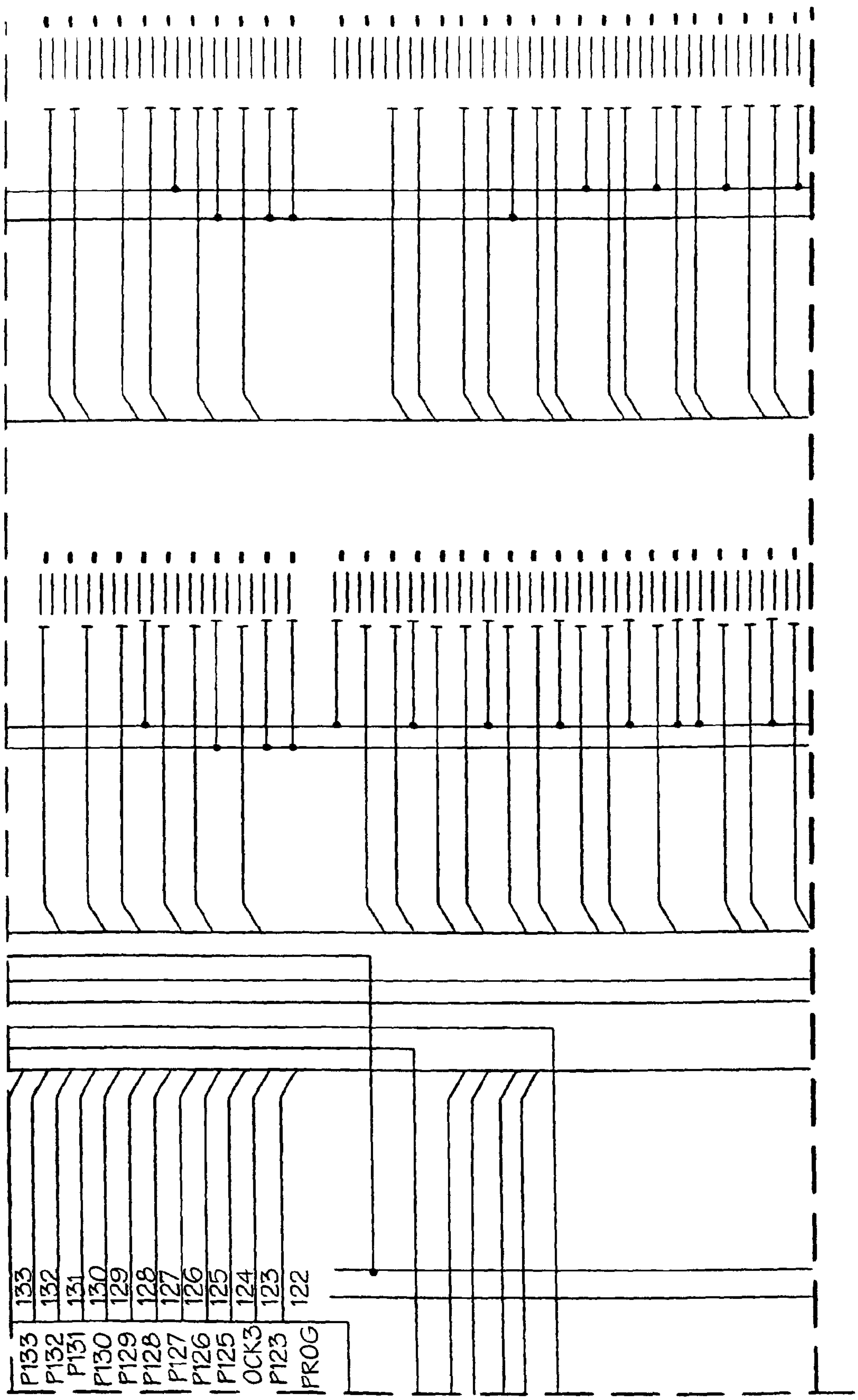
Figure 62M:
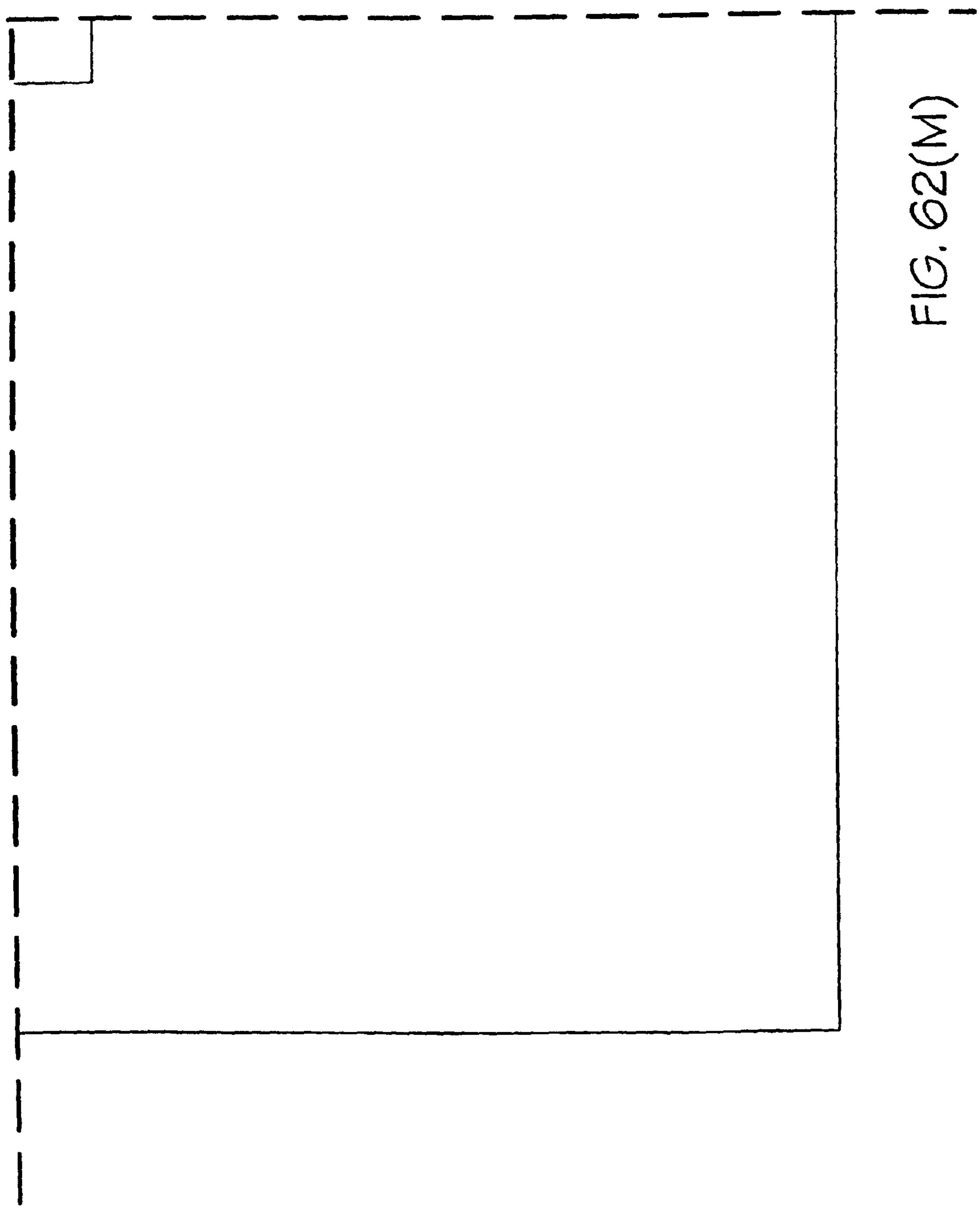
Figure 62N:
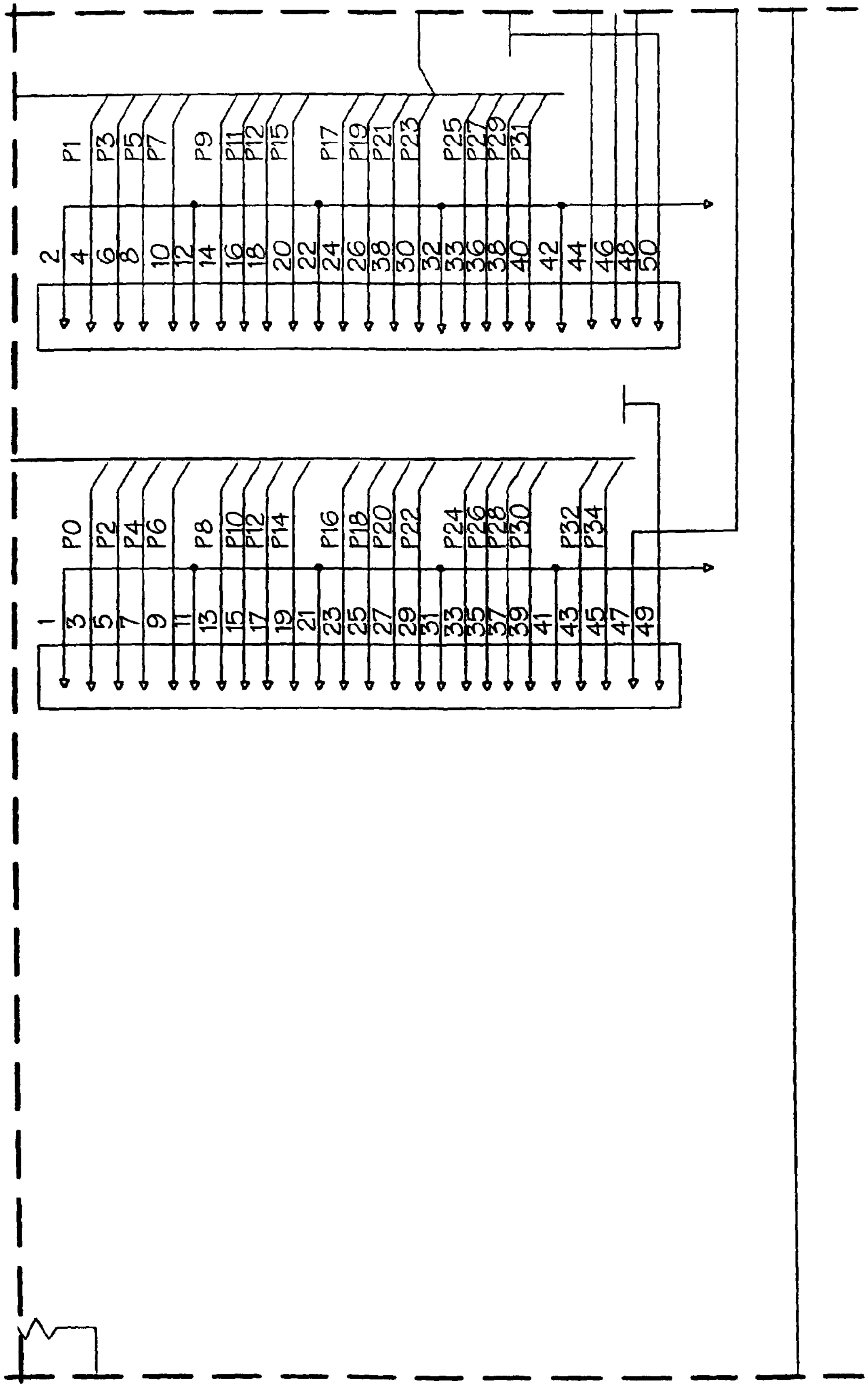
Figure 62O:
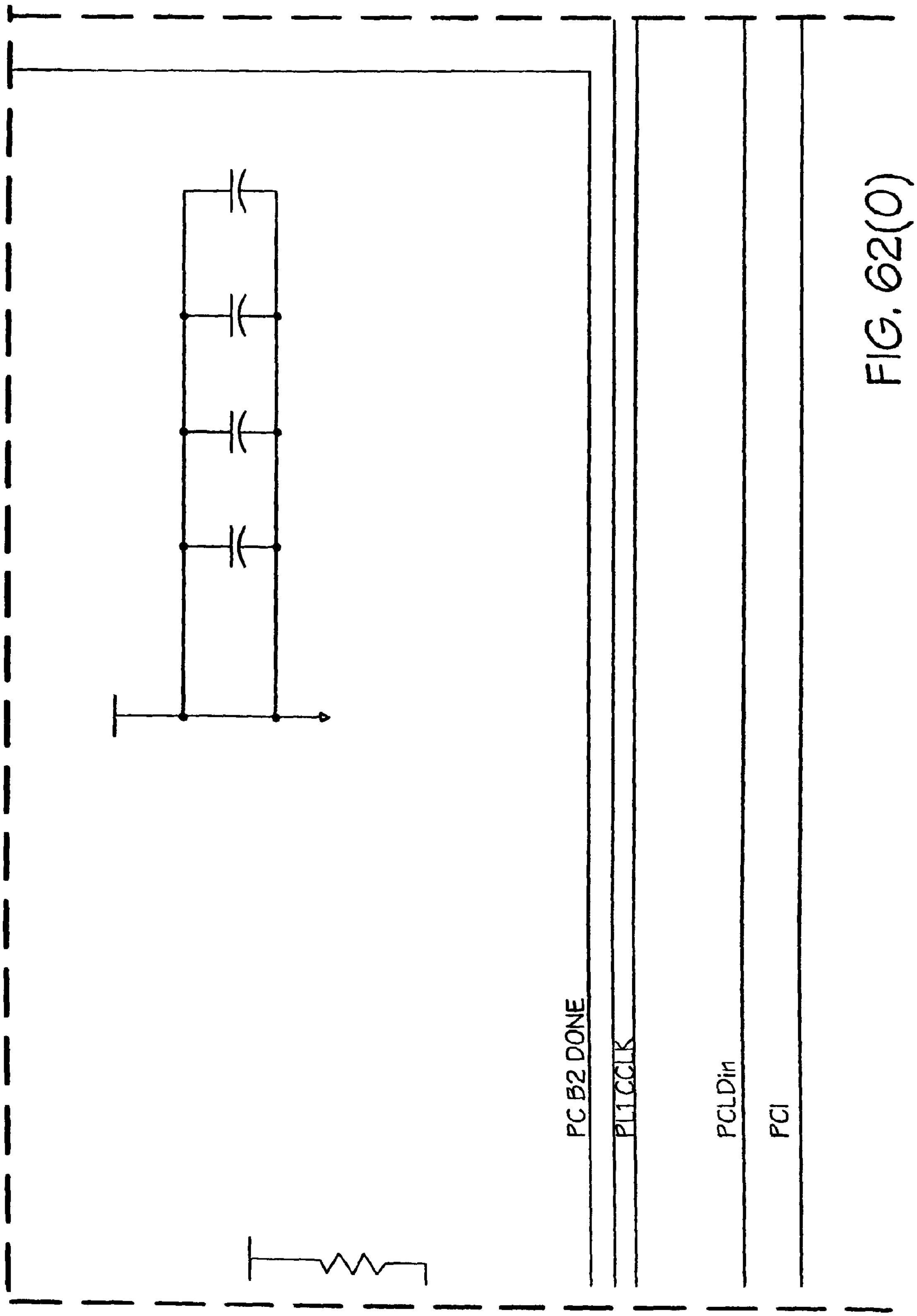
Figure 62P:
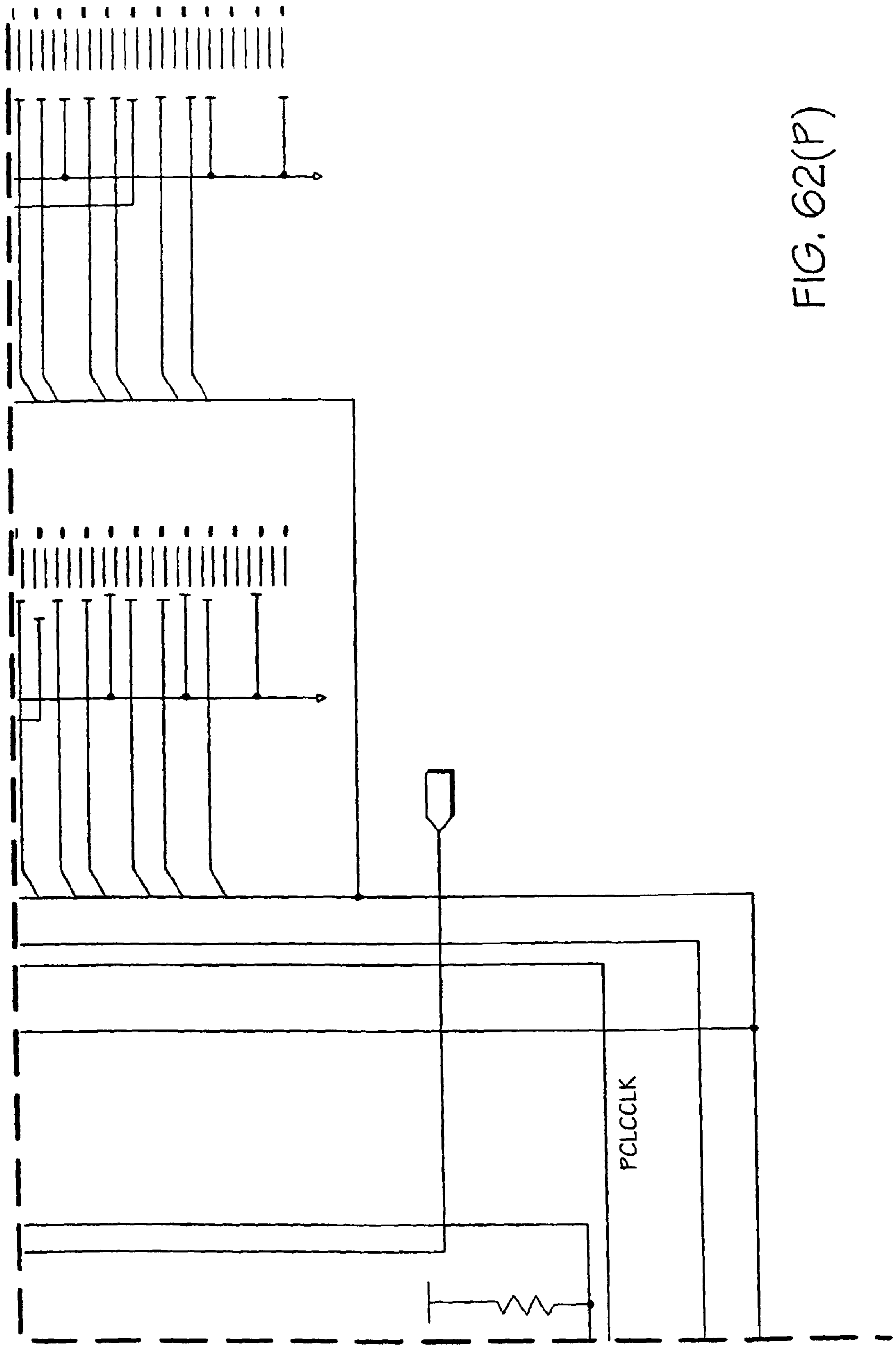
Figure 63:
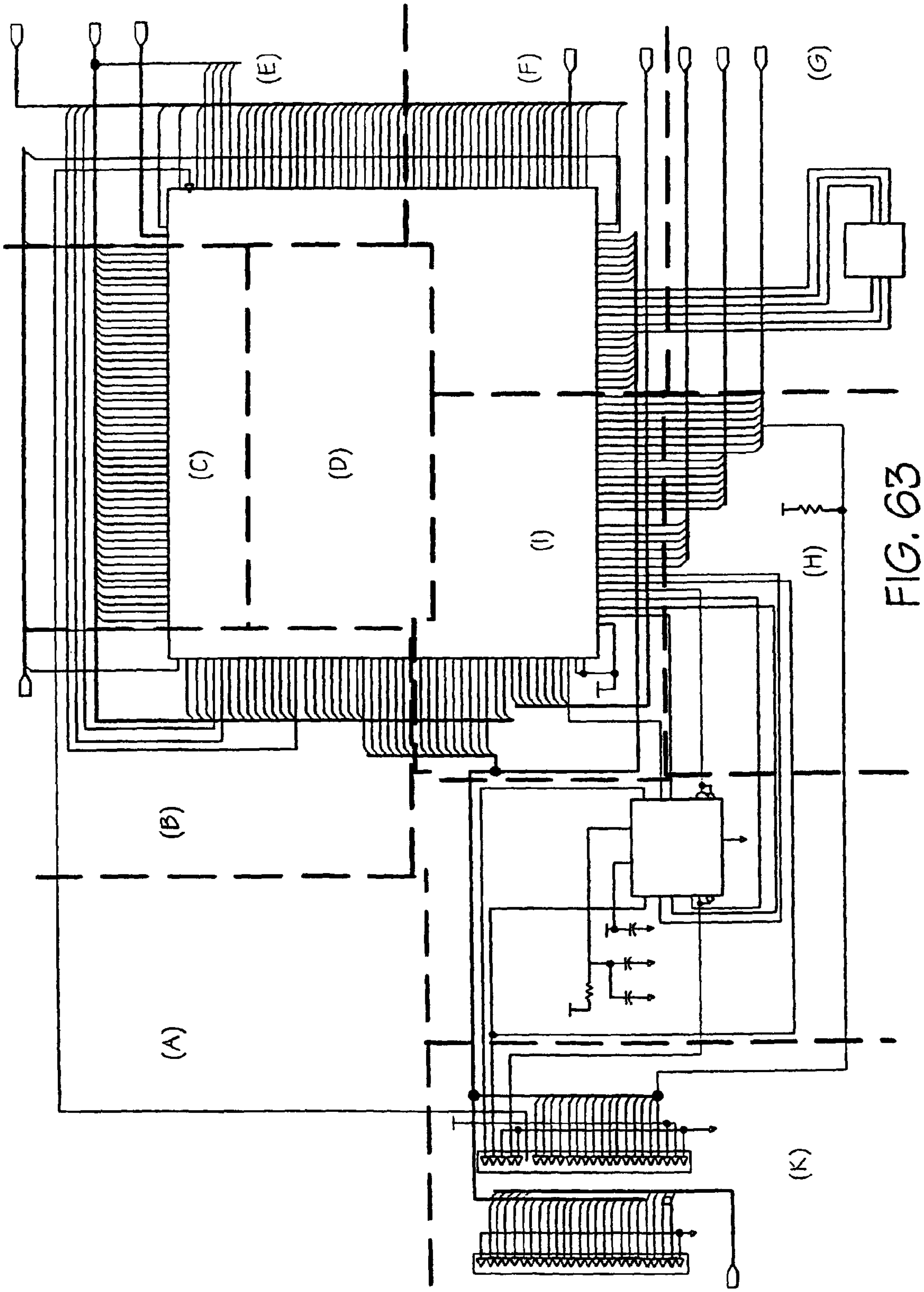
FIGS. 63(A)-(K) show a detailed view of the clock control chip.
Figure 63A:
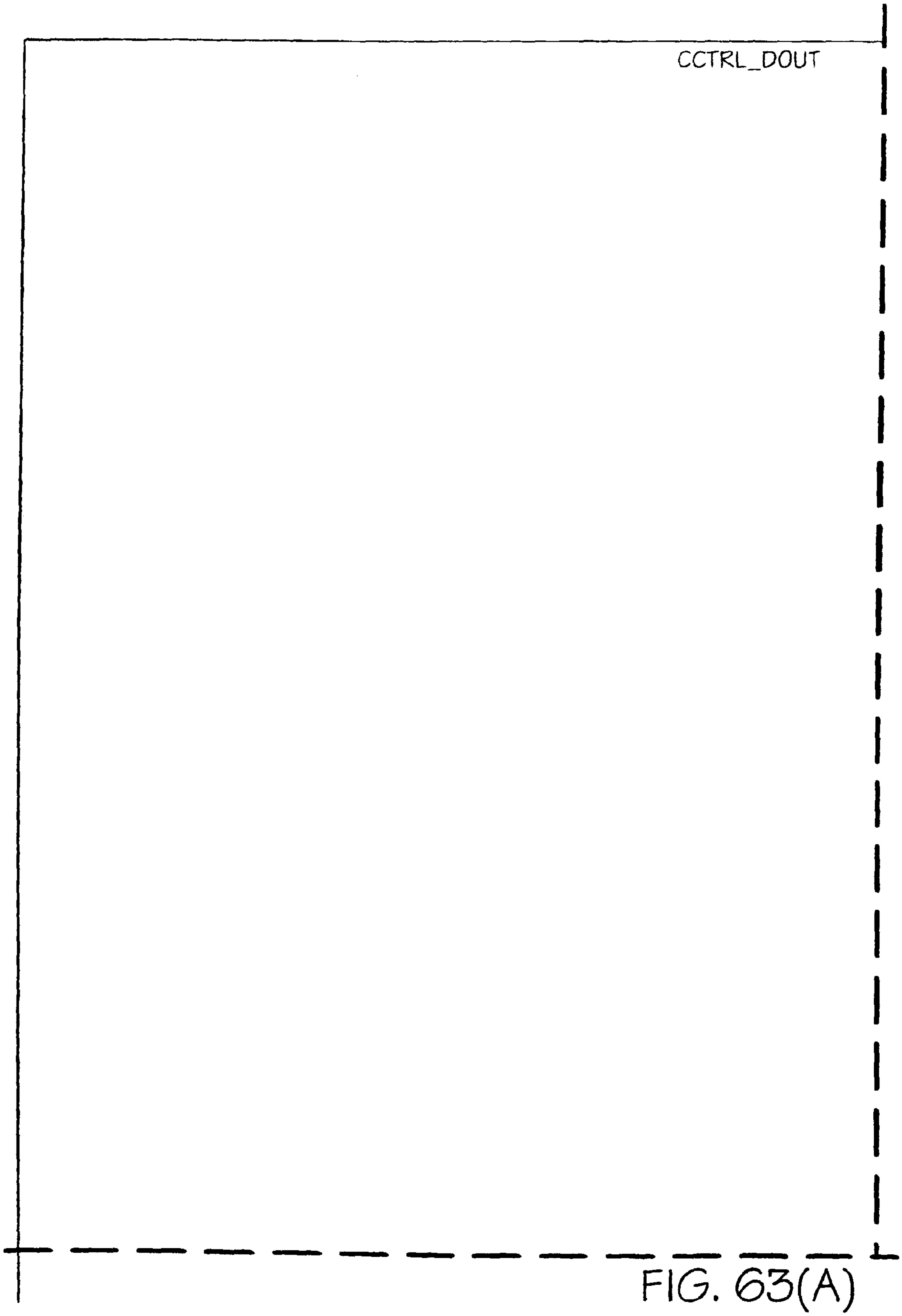
Figure 63B:
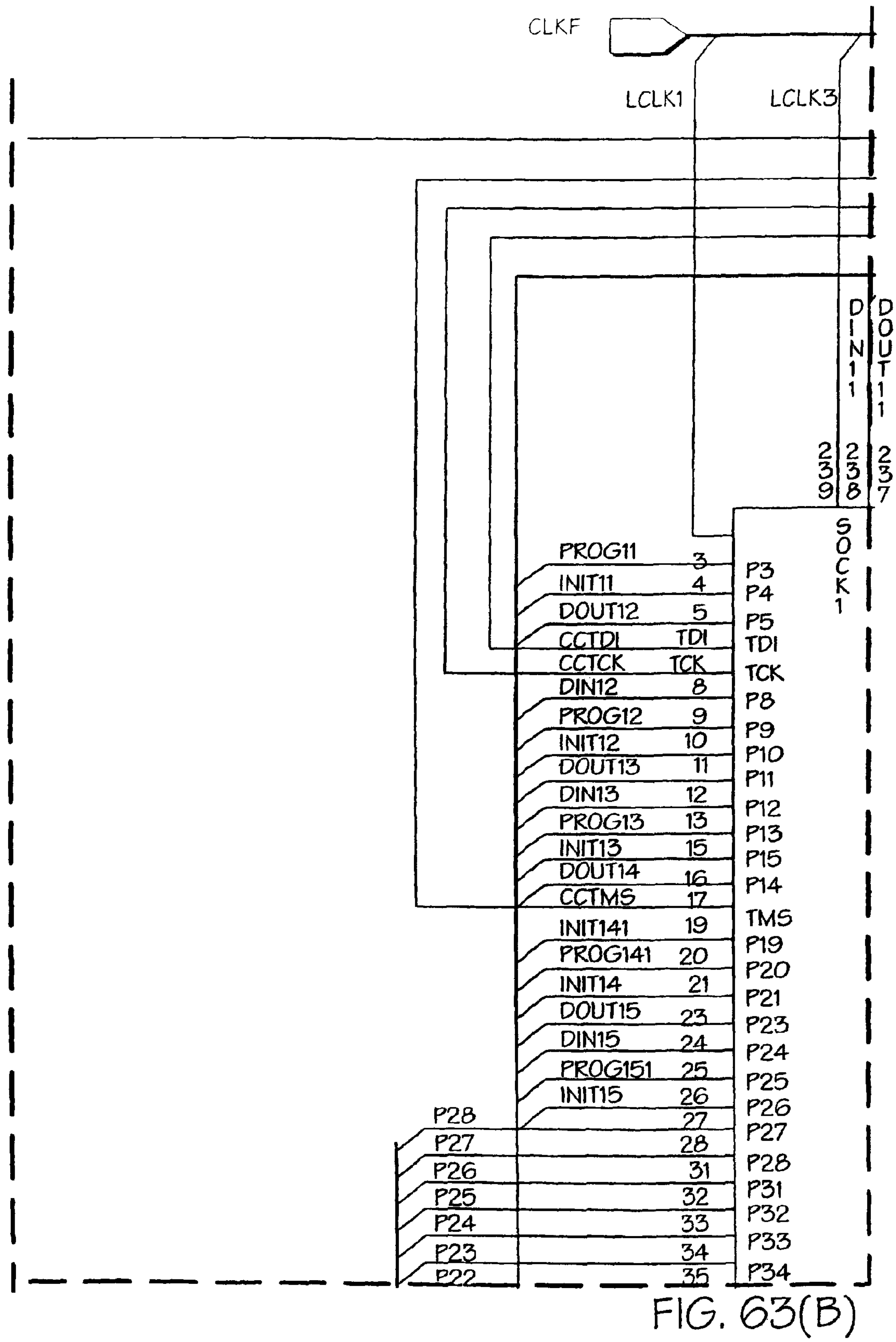
Figure 63C:
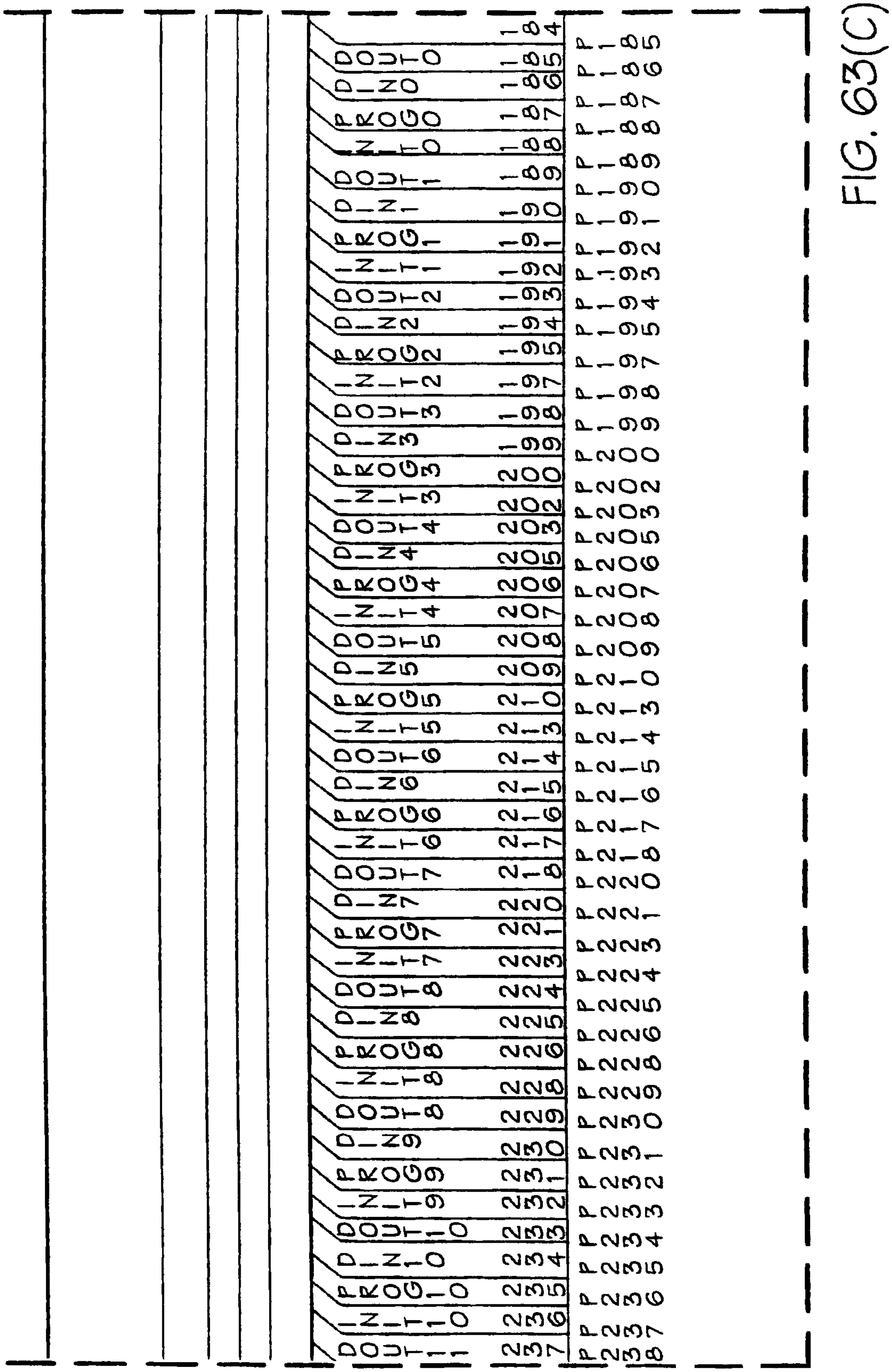
Figure 63D:
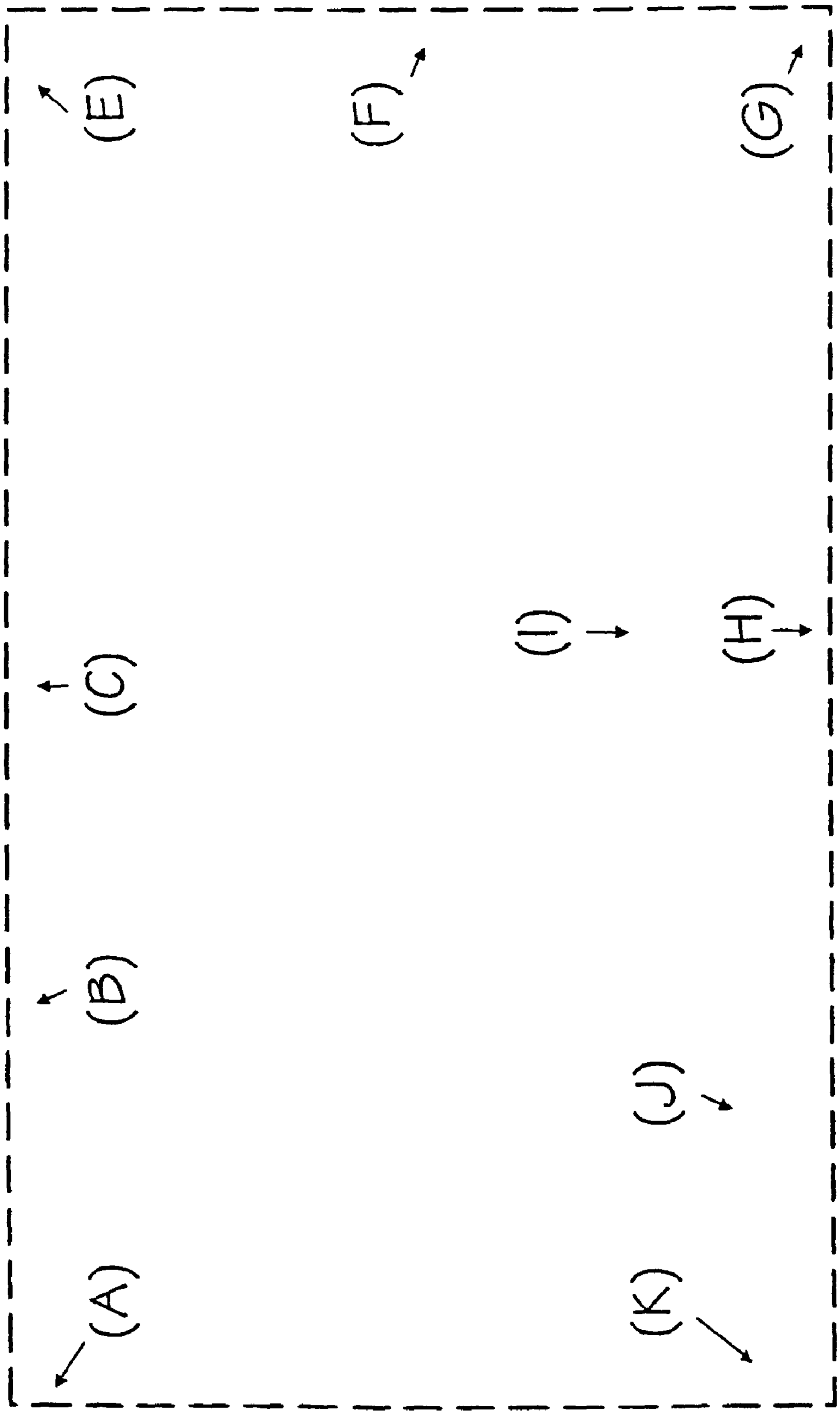
Figure 63E:
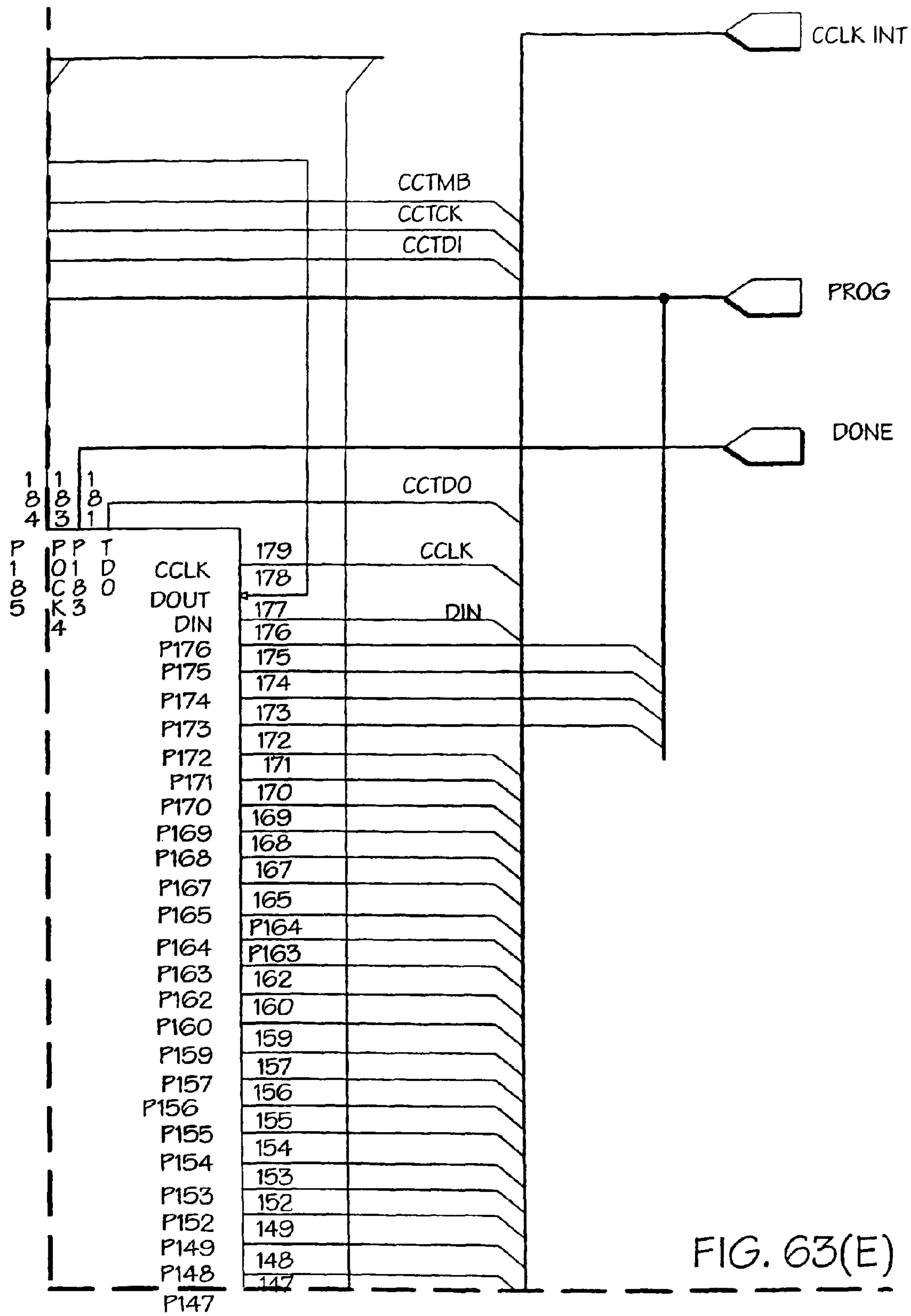
Figure 63F:
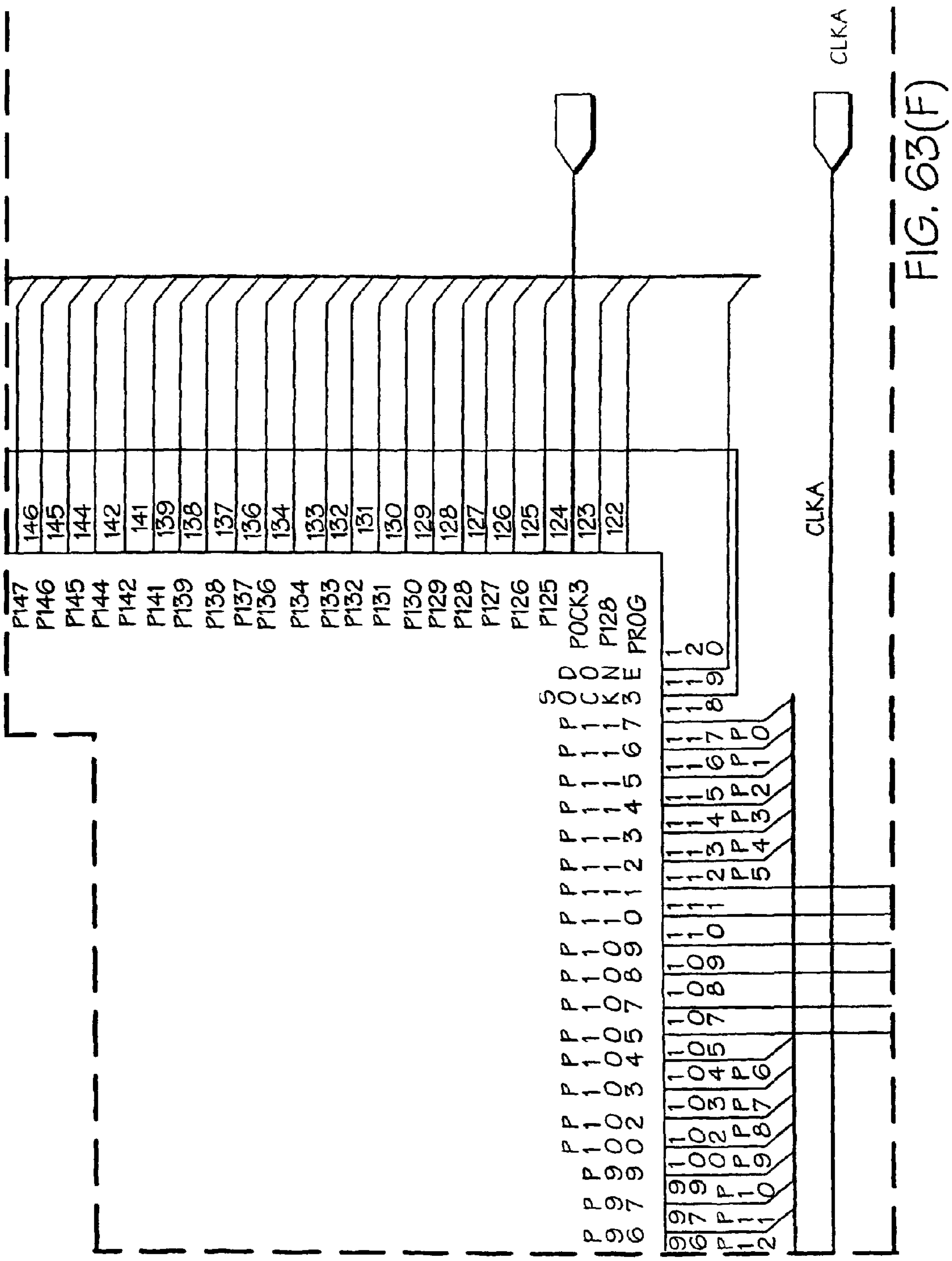
Figure 63G:
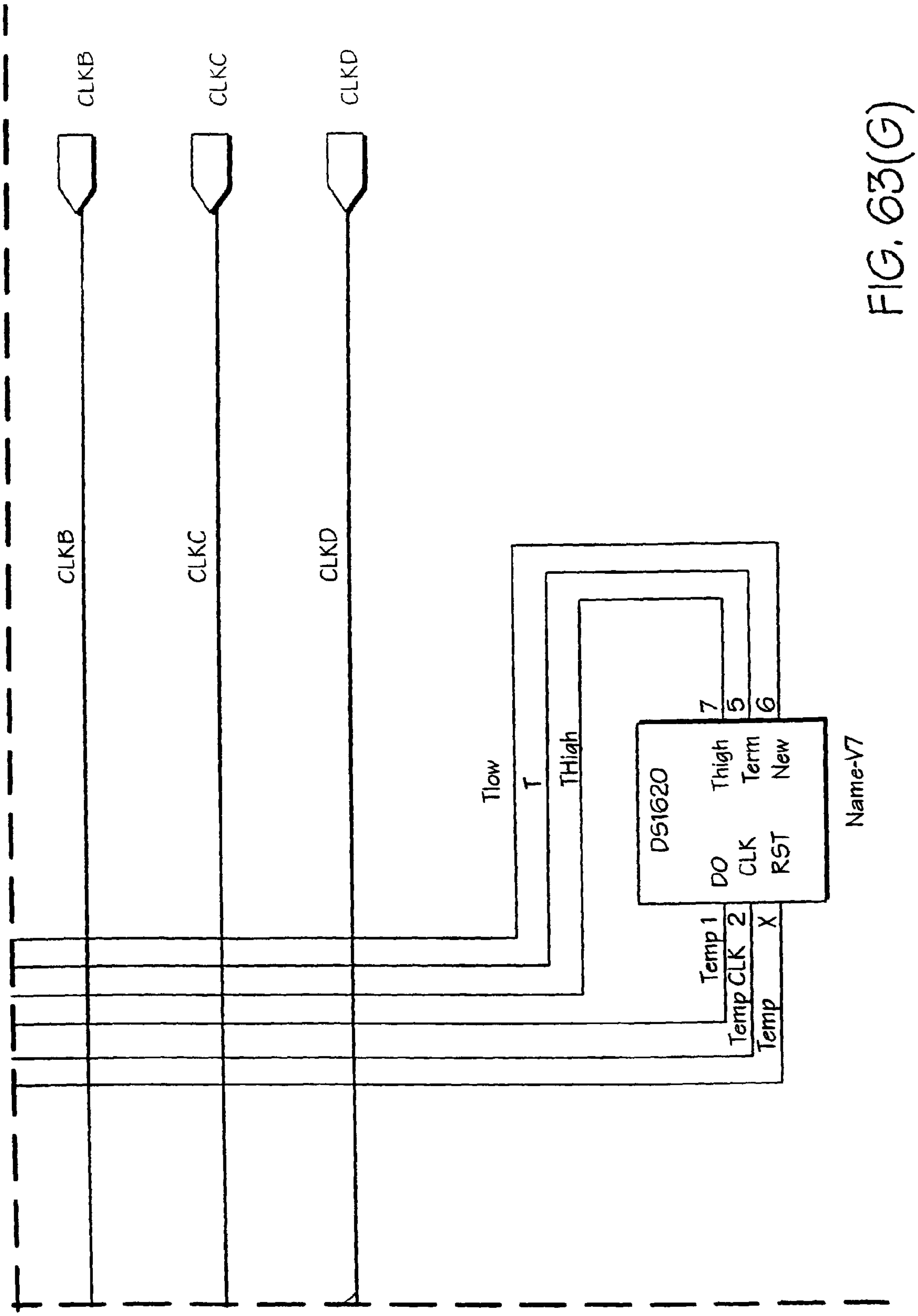
Figure 63H:
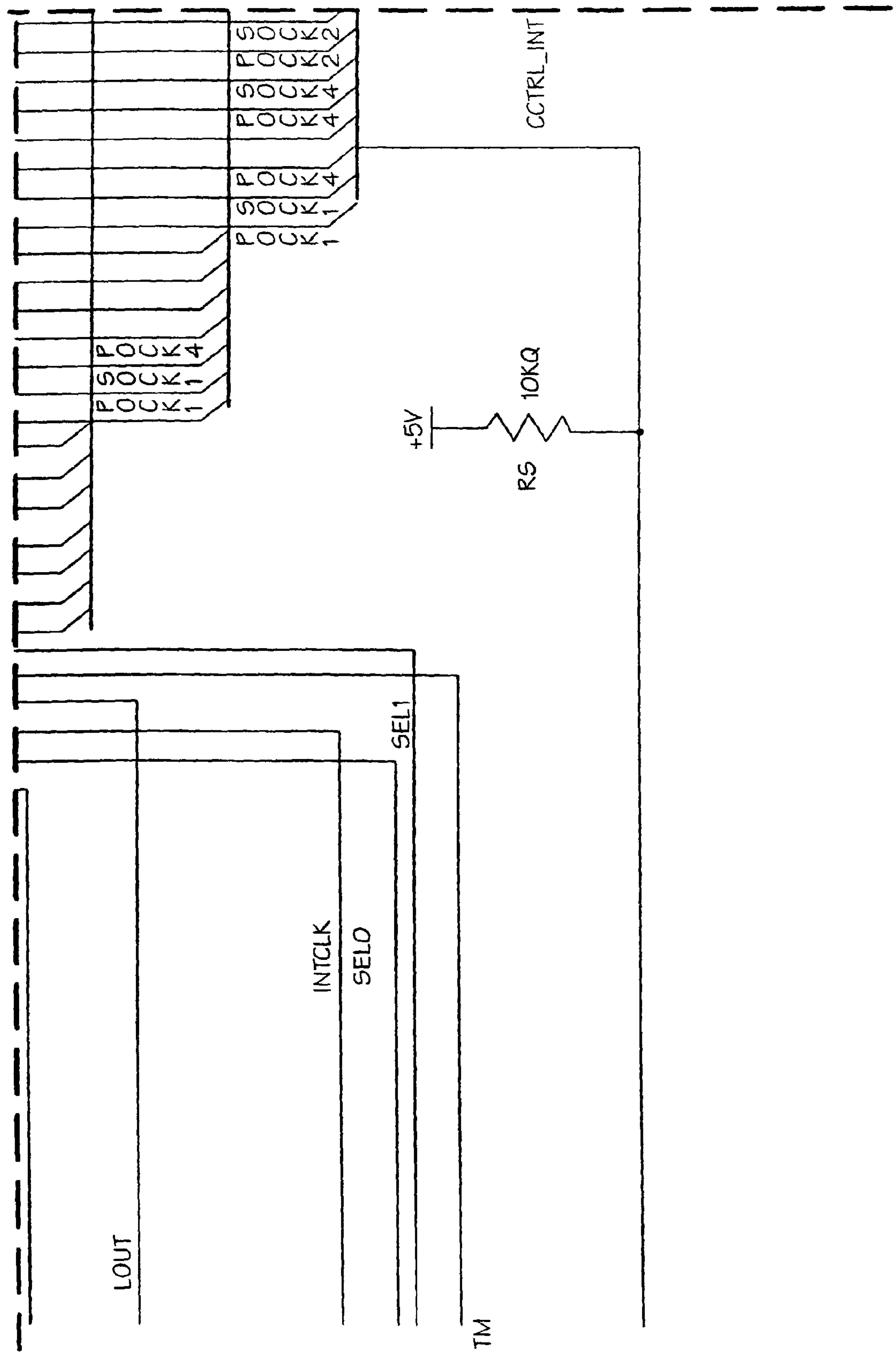
Figure 63I:
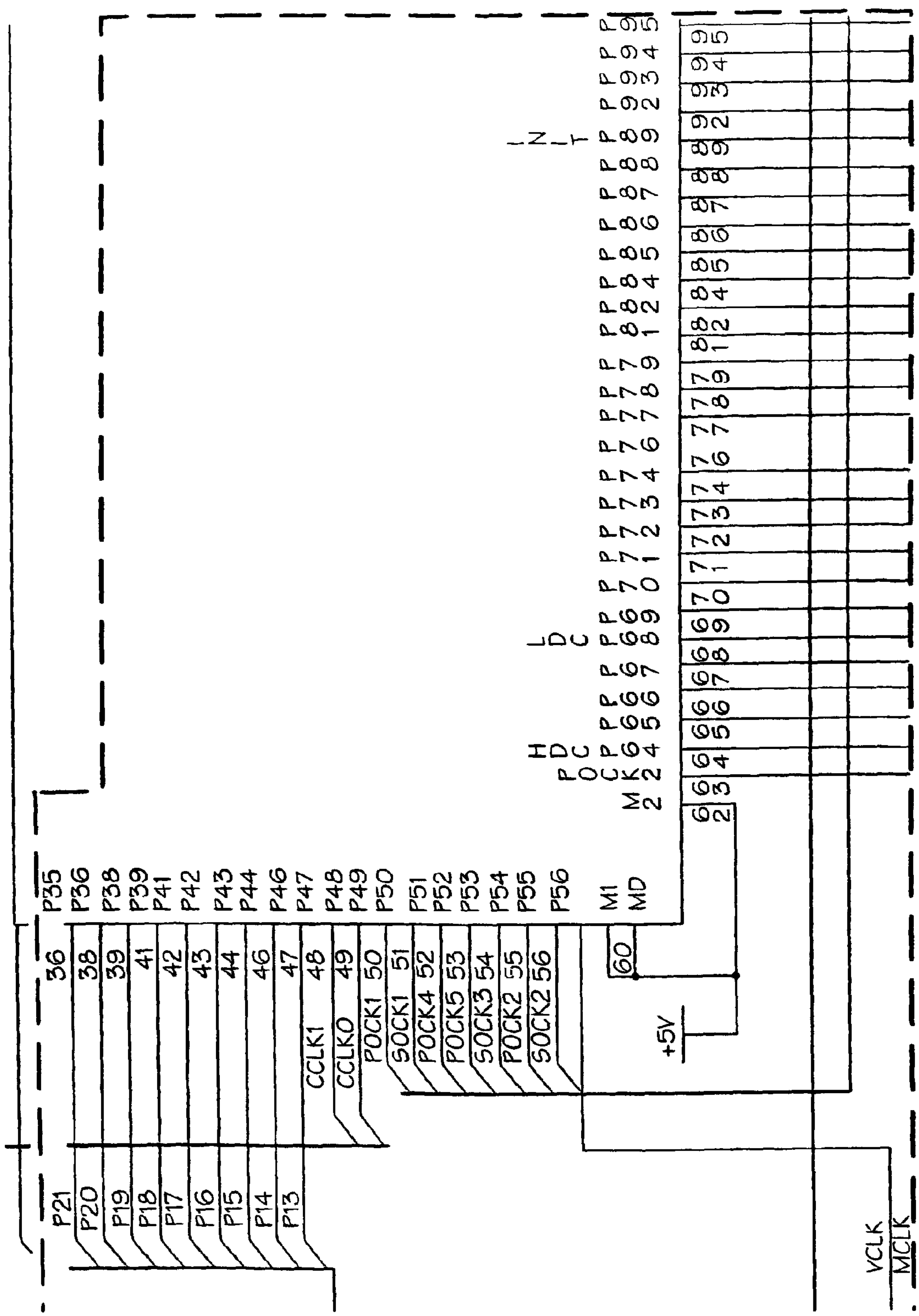
Figure 63J:
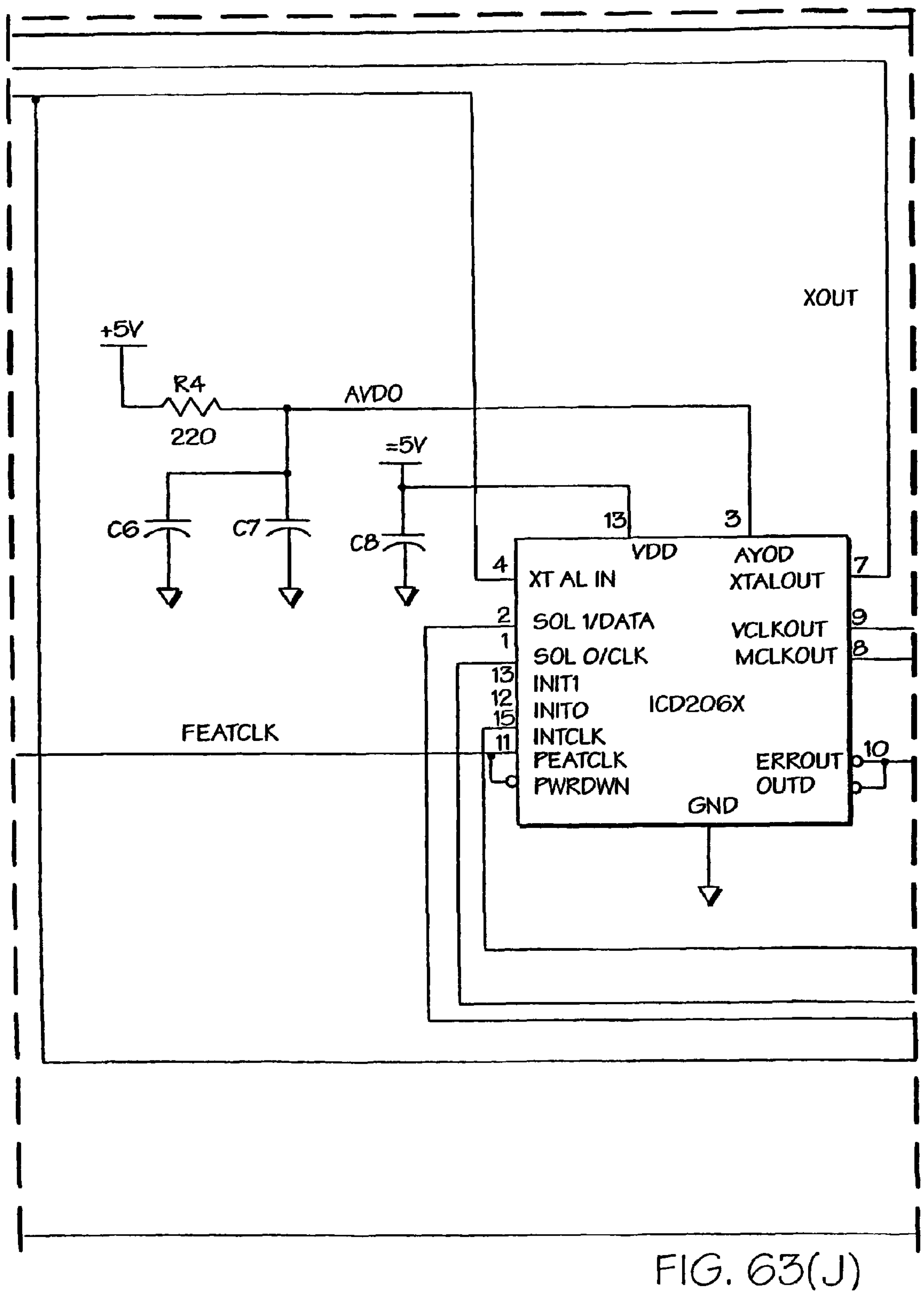
Figure 63K:
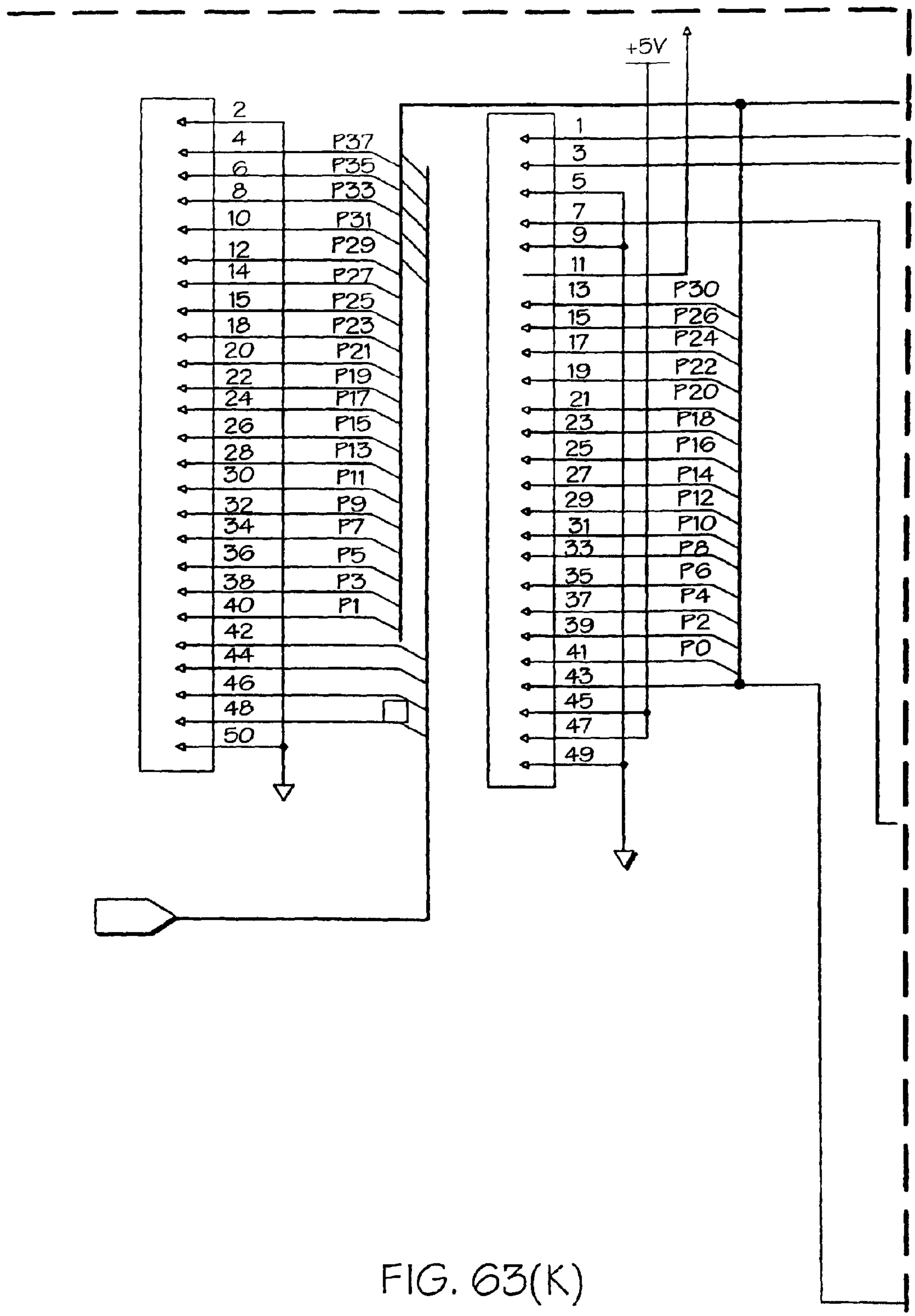

FIGS. 62(A)-(P) show a detailed view of the PCI interface chip, the datapath chip, and bus connections. The PCI bus requires several thousand gates to provide a target interface. The interface consists of a 32-bit multiplexed address and data bus combined with a set of control signals for initiating and managing data transactions. The turnaround time for the control signals represent the critical path for the PCI-32 bus interface. Using Xilinx XC4000-4 series chips, the system can operate at speeds of 25 MHz to the full PCI speed of 33 MHz.

The PCI64 chip connects to the 64-bit extension of the PCI bus and also serves as the datapath chip that controls the main data connection from the array to the host computer. The datapath chip is responsible for shipping data to and from the array and for managing the 64-bit PCI bus extension. It has a structure similar to the clock control chip, and like the clock control chip it is programmed by the PCI-32 chip. Control structures permit bi-directional data transmission across the array and manage data communications tasks.

FIGS. 63(A)-(K) show a detailed view of the clock control chip. The clock control chip controls the control-signal distribution tree to the entire array. These signals include one or more clock signals, as well as global control signals and data from the array. The lines are bi-directional so that any array chip can be configured to send data to the clock control chip or receive signals from the data management chip. One set of signals is responsible for programming the array chips. Each chip has several dedicated programming lines that lead directly from the clock control chip in a 16-way star pattern. After configuration, some of these lines (DIN and DOUT) can be used for general-purpose data I/O.

In addition, each column of the array receives eight signals from the clock control chip. These eight signals go to each of 4 primary and 4 secondary clock signals on the FPGA chips. Each clock signal connects to the same pin in each chip in a column. The columns in the array represent roughly equi-temporal regions on the board, so that the clock control chip layout can be designed to provide the right amount of skew from one column to the next to create a synchronous clock across the whole board with minimum net skew.

The Cypress frequency synthesizer is capable of taking a 1 MHz to 60 MHz clock source and multiplying/dividing the frequency to a desired frequency in the range of 350 KHz to at least 115 MHz. The array board has two synthesizers, which are capable of synthesizing different frequencies off the same clock source. The PCI bus clock is able to provide basic clock sourcing for the array board. However, many PC systems have jitter of 1% or greater, requiring an external clock source for precision timing applications such as video timing generation. External clock sources may be accommodated with an external 50-pin connector that connects directly to the clock control chip. This feature provides a great amount of flexibility when dealing with external interfaces to the array board.

Figure 64:
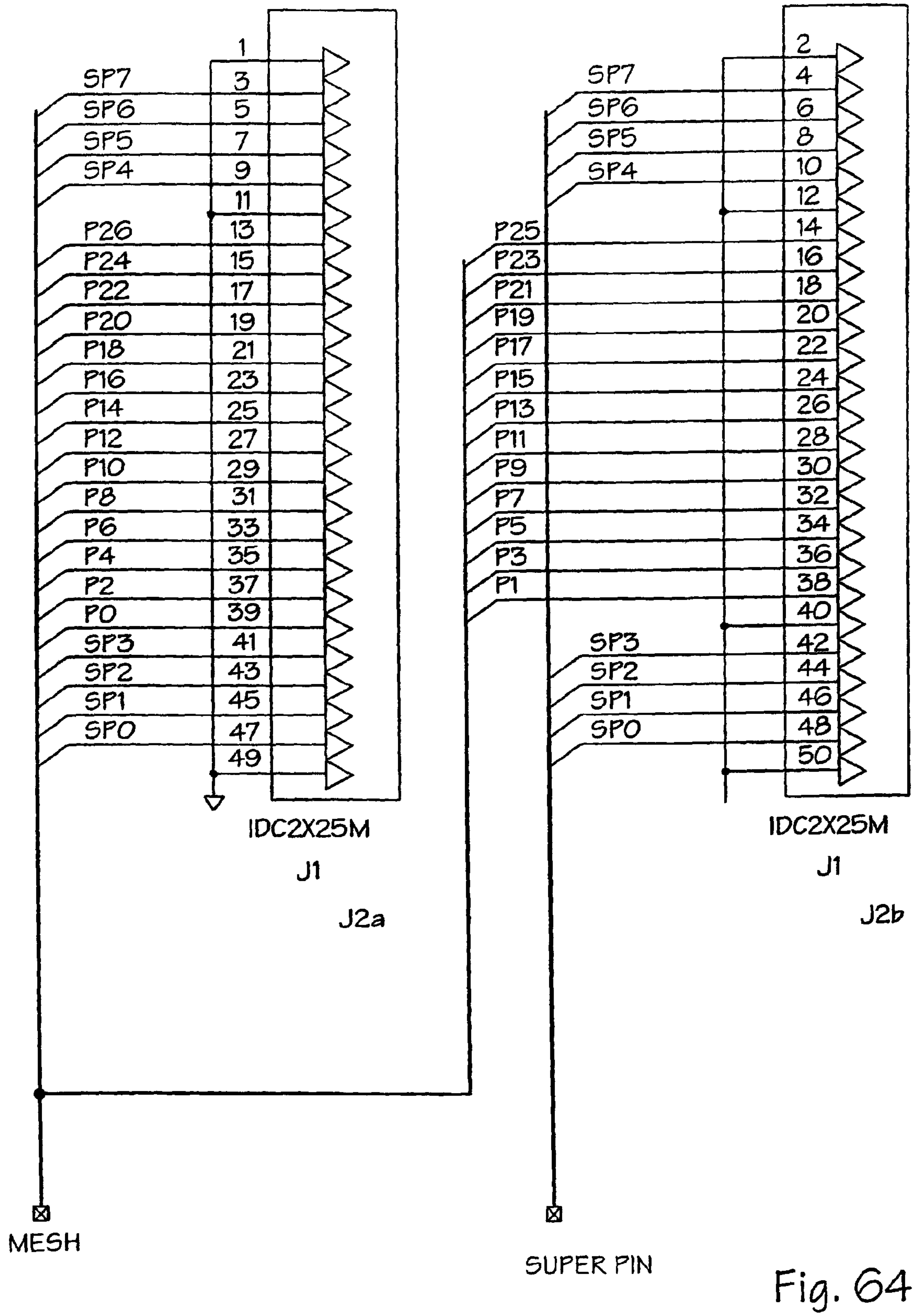
FIG. 64 shows a detailed view of the top and bottom external connectors and their pins.

FIG. 64 shows a detailed view of the top and bottom external connectors and their pins. The top and bottom of the array have 50-pin connectors that are suitable for extending the array, closing the torus, or adding peripheral (I/O) devices. For a 4×4 array, only eight connectors are needed. Arrays of different sizes may have different numbers of connectors. In some embodiments, camera or video data can be fed directly into the array through these top and bottom connectors. Closing the torus involves attaching short 1-cm long jumper cables between adjacent connectors. Multiple image processing system boards can be daisy-chained together to form larger tori. Other applications can attach other ribbon cables and peripheral devices that need special controls or signal conditioning.

An aggregate bandwidth of over 2 gigabytes per second is available using the 4 pairs of 50-pin connectors on the array board, assuming transfer rates of 50 MHz. This bandwidth is suitable for the most demanding applications, such as video holography. The architecture of the array board is flexible enough to extend to multiple boards, connect to external equipment using ribbon cables, or to support daughter-boards that would fit on top of the array board. The 50-pin connectors can make ribbon cable connections to external equipment. A short ribbon cable connection can close the torus on a single array board, or may connect to other array boards for toroidal daisy-chaining. The array board connectors could also connect to daughter-boards to provide specialized hardware for external interfacing.

The most power-consuming function in an FPGA is driving an output pin. Since one embodiment of the present invention requires 43 communication pins, and up to 56 memory pins on each of the correlation computing elements to drive output pins at 33 MHz, the whole image processing system can consume considerable power. The PCI specification allows for up to 5 amps power consumption on the bus. One embodiment of the present invention requires a steady-state power consumption of 4.5 amps with 24 disparities at resolution of 320×240 pixels.

Since it is possible to program the board to consume hundreds of watts of power, the array board includes a DS1620 Digital Thermometer/Relay that can sense an increase in temperature. This chip is attached to the clock control chip, which can reset all of the array chips to their initial low-power state if necessary to keep the board from over-heating. Airflow should be directed over the board to the DS1620 to ensure that it is able to sense increases in the temperature of the array.

To detect heating in a single chip, the frequency of a ring oscillator on each chip can be measured when the chips are at room temperature. As the temperature of a chip rises, the operating frequency of the ring oscillator decreases predictably. By measuring the decrease in frequency of the ring oscillator, temperature changes can be sensed and reliably predict when any given array chip is overheating. Chips that exceed threshold temperature can be shut down to prevent damage to the system. Accordingly, users can operate the array boards on PCs directly without worrying about over-power situations.

An alternative embodiment of the present invention is an extension to 640 long scanlines. This can be achieved by placing two correlation stages in 12 FPGAs, each using only half of each adjacent SRAM element. Optical flow algorithms are also another important application for the present invention.

The algorithm of the present invention was designed to be implemented on small, low-power embedded processors with limited memory resources. The present invention envisions many different hardware implementations of the algorithm, including a one-for-one substitution of existing components with other components, a wholesale substitution of many components with a single component, a one-for-many substitution of one component with many components, or a completely different design concept so long as the spirit and scope of the invention, as recited in the claims, are satisfied. The particular embodiments described herein are efficient both in terms of the size, the speed, and the power consumed.

V. Industrial Applications

The technology described in the present invention applies to a variety of task areas in a broad range of disciplines. In many cases the results produced by the ranging method and its embodied means provide for immediate standalone application. In other situations the means and method are combined with existing methods established in their respective disciplines to bring significant advances in capability.

A. Z-Keying

Z-keying consists of the use of Z, or depth, information to edit or otherwise manipulate a video scene or image. Z-keying may have uses in a number of video applications, including the following:

(a) Blue-Screening

A common requirement of video processing is the superpositioning of image signals, e.g., a single person moving before a synthesized display (consider a weather presenter before a map). This illusory display is currently achieved using a method called "blue-screening"—where the near-ground video (i.e., the presenter) is distinguished and extracted from its surround based on color—with the background being a specific color, say blue. Isolation of the desired character is obtained by simple color thresholding, with the remaining signal (the presenter) being superpositioned on the desired background (the weather map).

Figure 68:
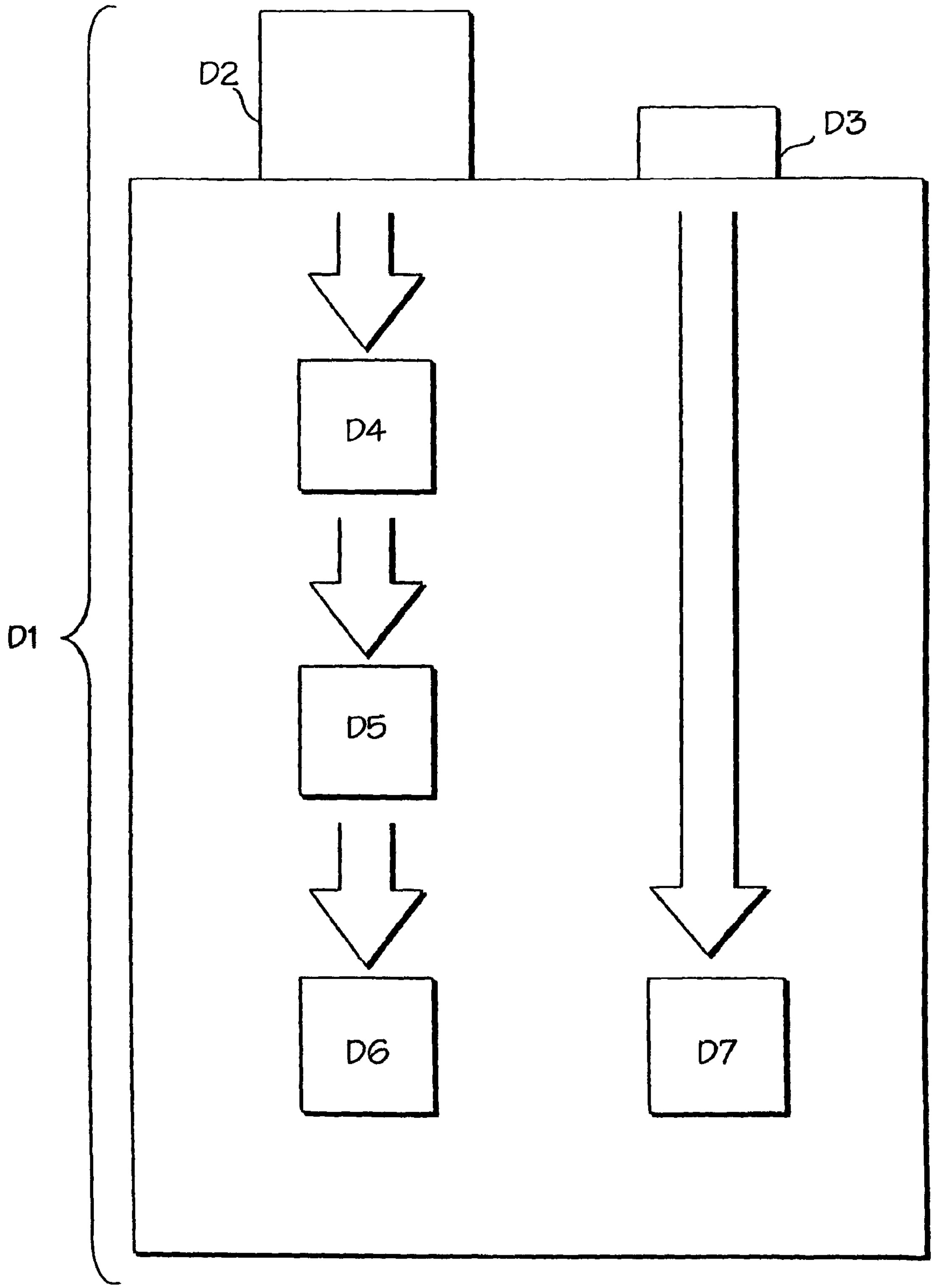
FIG. 68 shows the use of the present invention to improve blue-screening applications.
Figure 69A:
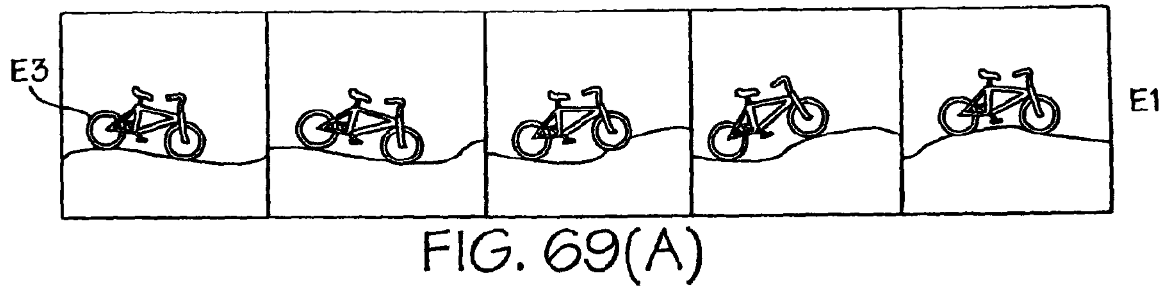
FIGS. 69(A)-(D) show the use of the present invention in several image compositing scenarios.
Figure 69B:
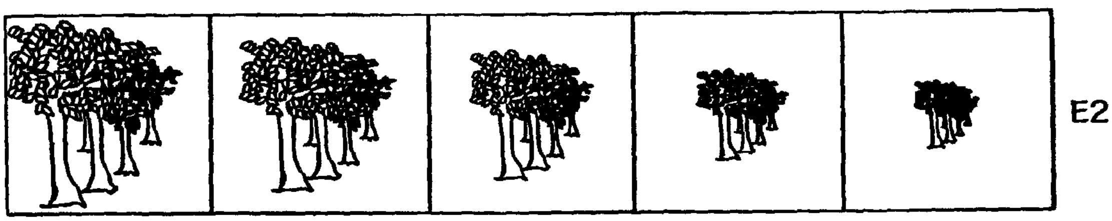
Figure 69C:
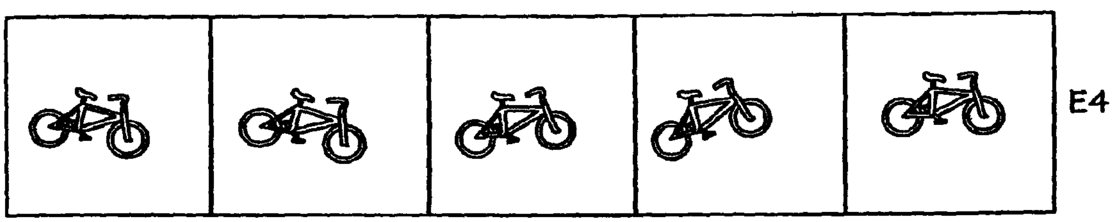
Figure 69D:
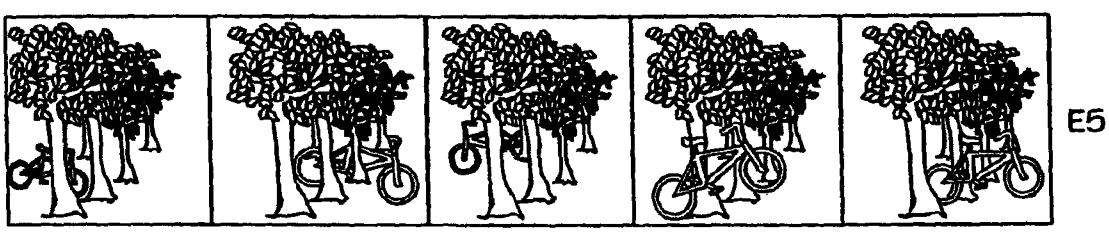

The disclosed invention can be used to perform such applications in a manner which is more accurate and less expensive than traditional blue-screening. FIG. 68 illustrates one such embodiment. In this Figure, a stereo video camera D1 is shown, consisting of main camera D2 and secondary camera D3.

Main camera D2 is used to capture video information in either analog or digital form. If such information is recorded in digital form, it is downloaded directly to frame buffer D4. If such information is recorded in analog form, it is converted to digital form through an analog to digital conversion process which is well-known in the art. The digital representation is then stored in pixel buffer D5. Note that, although these elements are shown as part of stereo video camera D1, the elements could be present in a separate computer connected to stereo video camera D1 by a bus or some other connection mechanism.

As is well-known in the art, the digital representation of video data includes values for chrominance and luminance of each recorded pixel. In one embodiment, luminance information for each pixel is extracted from pixel buffer D5 and is stored in intensity map D6, thereby creating a map of intensity values for each pixel. In other embodiments, other information could be used, including chrominance.

In one embodiment, secondary camera D3 is used solely for depth calculation. In this embodiment, secondary camera D3 may be of lower quality than main camera D3, and may be designed so that it captures and stores only that component of pixel data which will be relevant to the depth calculation process, in this example luminance. In other embodiments, secondary camera D3 may be equal in quality to main camera D2 and may capture the full range of available video information, thereby enabling 3D video.

If secondary camera D3 is designed so that it only captures luminance information, that information may be captured and transferred directly to intensity map D7 for secondary camera D3, thereby avoiding the necessity for storing video information in a separate pixel buffer and for extracting luminance information.

Once an intensity map has been created for each camera, disparity values are calculated in accordance with the teachings outlined above, and from those values, as is described above, depth or disparity measurements are derived. Those measurements are then used to mask certain portions of pixel buffer D5, representing video information from the main camera. Such masking may be designed to mask out information which is beyond a certain depth from the camera, for example, all information which is more than four feet from the camera, or information within a certain range of depths, or in a volume of space defined in some other manner. Pixels which are not masked out may then be overlaid onto another image, which may represent a stored image or may represent live video.

To take one possible application, the disclosed invention could be used to pick out the image of a weather forecaster and display that image superimposed over an image of a weather map.

Reliability of the depth calculations used in such Z-keying applications may be increased in two ways. First, the video image which is to be used for the extraction (e.g., the picture of the weather forecaster) may be taken with a background designed to maximize contrast within the background as well as contrast between the background and the foreground picture which is to be extracted. Second, in a case such as the extraction of the image of a weather forecaster from a background, an additional post-processing step may be added in the depth calculation in which a pixel or pixel group which does not match the depth calculated for surrounding pixels is assigned that depth. In this manner, errant pixel calculations may be eliminated.

Note that, if main camera D2 has an adjustable focal length (as will ordinarily be the case), secondary camera D3 must use the same focal length at all times, since otherwise the focus of the two cameras will diverge, so that objects in one image will appear nearer (and larger) than objects in the other image. Techniques for synchronizing the focus of two cameras are well known in the art, and may include mechanical techniques, whereby movement of the focal length of one camera directly controls movement of the focal length of the other camera, as well as electronic techniques, whereby circuitry monitors the focal length of the main camera, and automatically adjusts the focal length of the secondary camera when the main camera focal length changes. Such techniques may be used for any application using dual cameras, if the focal length of the cameras is adjustable.

(b) Background Subtraction.

Interactive computer/video games currently employ background subtraction, a variant on blue-screening, to isolate the participant from his or her surround for reinsertion into a synthesized display (in which the participant or an icon representing him is superpositioned in the game imagery). Background subtraction is further described in S. Ahmad, "A Usable Real-Time 3D Hand Tracker," 28th Asilomar Conference on Signals, Systems and Computers, IEEE Computer Society Press 1995, and T. Darrell, B. Moghaddam, and A. Pentland, "Active Face Tracking and Pose Estimation in an Interactive Room," Computer Vision and Pattern Recognition Conference, San Francisco, 67-72, 1996.

The disclosed invention can be used to implement such an application, in a manner similar to that used for replacing blue screening. In this application, two relatively inexpensive cameras of the type normally used for videoconferencing applications may be used. Such cameras may be mounted directly on a computer monitor.

(c) Multi-Layer Display.

Numerous similar image compositing scenarios also benefit from this technology. The depth- or "Z-keying" described in this document (as opposed to blue-screening (see T. Kanade, A. Yoshida, K. Oda, H. Kano, and M. Tanake, "A Stereo Machine for Video-rate Dense depth Mapping and Its New Applications," Computer Vision and Pattern Recognition Conference, IEEE Computer Society Press, 196-202, 1996), is one such application. Multi-layer display with multiple-clipping planes is a more general form of this Z-keying.

Consider, for example, the two video sequences shown in FIGS. 69(A)-(D). Video sequence E1 shows several frames of motorcycle E3 proceeding down a street, while video sequence E2 shows several frames of a forest scene. Compositing these two scenes, so that motorcycle E3 is shown moving through the forest from video sequence E2, would ordinarily involve considerable effort, since the motorcycle must be shown as passing in front of some of the trees from video sequence E2, but behind other trees.

This compositing problem may be solved through the use of the present invention. Assume that video sequence E1 and video sequence E2 have been taken with digital cameras (or with analog cameras whose output has been converted to digital), and further assume that each such camera has included a main camera and a secondary camera, as described above. In such a case, depth information for each frame of each video sequence can be stored either as an attribute of the digital representation of each pixel (other attributes include luminance and chrominance) or in a separate depth map which corresponds to each frame. That depth information can be used to composite multiple frames of video sequence E1 with multiple frames of video sequence E2, using the following steps:

(1) extract the motorcycle from video sequence E1 as is described above, resulting in video sequence E4

(2) in a frame buffer, combine the extracted pixels with the pixels from video sequence E2, resulting in video sequence E5. Where there is no overlap in pixels, (i.e., the portion of video sequence E2 which does not overlap the motorcycle), use pixels from video sequence E2. Where there is an overlap in pixels (i.e., the portion of video sequence E2 which overlaps motorcycle E3, use that pixel which is closer to the camera. Thus, a frame will be built up which shows motorcycle E3 as behind those trees which are "closer" to the camera but in front of those trees which are "farther away."

The disclosed technology allows such compositing to be done in real time for a number of video stream frames. The present invention leads to a number of obvious improvements in compositing, including: no requirement that the background be of fixed or uniform color distribution; no requirement that the subject avoid the background color (otherwise producing holes in the display); an ability to distinguish the subject based on position, which can vary with motion; an ability to select multiple overlays from a variety of positions in a video scene; and others. Such compositing can be used to create final work product, or to allow a video editor to quickly see which video streams may be best used for conventional compositing.

(d) Videoconferencing.

The Z-keying technology disclosed above can easily be applied to desktop videoconferencing applications. In such applications, the information of interest is generally located relatively close to the camera(s). Background information is generally irrelevant, but may be difficult to screen out, since both the foreground and background may contain motion. Capturing and transmitting background information leads to significant performance problems, since the available processing power and bandwidth may be insufficient to transmit an entire scene at acceptable resolution.

Z-keying may be used in such applications, by screening out all background information which is beyond a certain distance (e.g., five feet) from the stereo camera pair, which will ordinarily be located on the user's video display screen. This allows only the relevant information to be sent. At the receiver's location, the foreground information may be combined with static background information captured from the sender's site, or with a selectable background (e.g., a solid gray background, a background showing a forest scene, etc.)

B. Spatial Information

The present information can be used to present spatial information to users otherwise unable to determine such information, because of visual impairments, darkness, or obstructions. In such applications, a stereo camera pair is mounted in a location which is otherwise visually inaccessible to the user at that time. Distance information is then used to inform the user about objects falling within a defined field of vision.

In each case, these applications use a stereo camera pair, which inputs digital information from the environment and uses census stereo (or other nonparametric local transform) to create a depth map. That depth map is then processed for presentation to the user.

Note that this object detection does not require object recognition. Instead, object detection may simply indicate the location of structures present in a predetermined path or field of vision, thereby alerting the user to their presence. A number of potential applications exist.

1. Object Detection in Darkness

Infrared cameras are well-known in the art. Such cameras record a scene based not on the color or luminance of the scene, but on the infrared signals received from various portions of the scene.

The disclosed non-parametric local transform may be used to extract depth information from infrared input. In such an application, the intensity of the infrared signal is recorded on a pixel-by-pixel basis, and is then used to create a local transform. In all other respects, such an application operates in a manner similar to that disclosed above, though with infrared intensity used in place of visible light intensity.

Once depth information has been extracted, objects falling within a particular distance, or in a particular region of space, may be distinguished from the background. Information about such objects may be presented to a user on a video screen, with the infrared pixels representing the object being pulled out of the overall image for display. Such information may also be presented to an automatic system, such as an alarm. Such a use allows an alarm system to operate passively, with no user intervention and no visible illumination, in distinguishing objects by their location and, in the use of motion analysis, by their movement.

2. Object Detection for Obscured Views

The disclosed invention may be used for object detection in areas not otherwise visible to a user because of obscured views. This may be particularly useful for applications in which a number of significant obscured views exist, and the user is required to make decisions in realtime. Under such circumstances, full video may be of limited use, since the user may be unable to observe and analyze real-time pictures on a number of screens simultaneously. By using depth information for Z-keying purposes, the disclosed invention may resolve this problem, by triggering an alarm when an object comes within a pre-set distance, and then displaying only that portion of the image which falls within a certain distance.

For example, reversing long or articulated big rigs is a difficult task, made harder yet by the inability of the operator to acquire an adequate spatial model of the relationship between potential obstacles and his vehicle. An overhead view (elevation-compressed) of the output of the ranging sensor provides him with a displayed aerial perspective of the objects in his vicinity and the position and orientation of his vehicle with respect to them. A cab display will allow the operator optimal attention to his controls and the environment for safe maneuvering.

Figure 65:
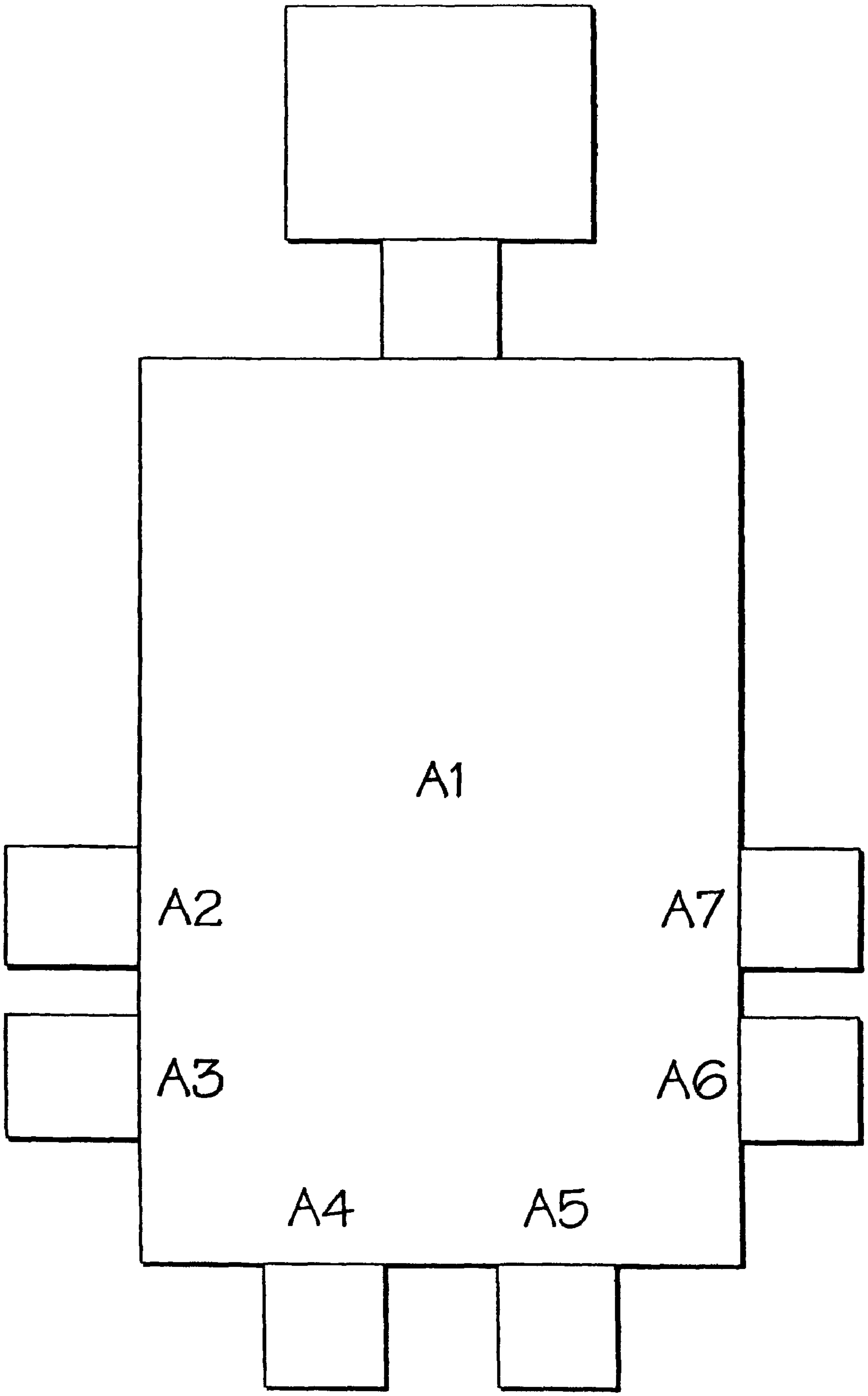
FIG. 65 shows the use of the present invention for object detection for obscured views.

Such a system is illustrated in FIG. 65, which shows big-rig A1. Arrayed around the rear of big-rig A1 are stereo camera pairs A2-A7. These cameras are deployed in such a manner that they provide continuous coverage of the rear of big-rig A1, as well as the portions of the side of big-rig A1 which are closest to the rear.

When big-rig A1 is placed in reverse, camera pairs A2-A7 begin range processing. By using depth as a filter, as is disclosed above, the camera pairs only notify the user of objects which fall within a certain range (e.g., five feet).

Figure 66:
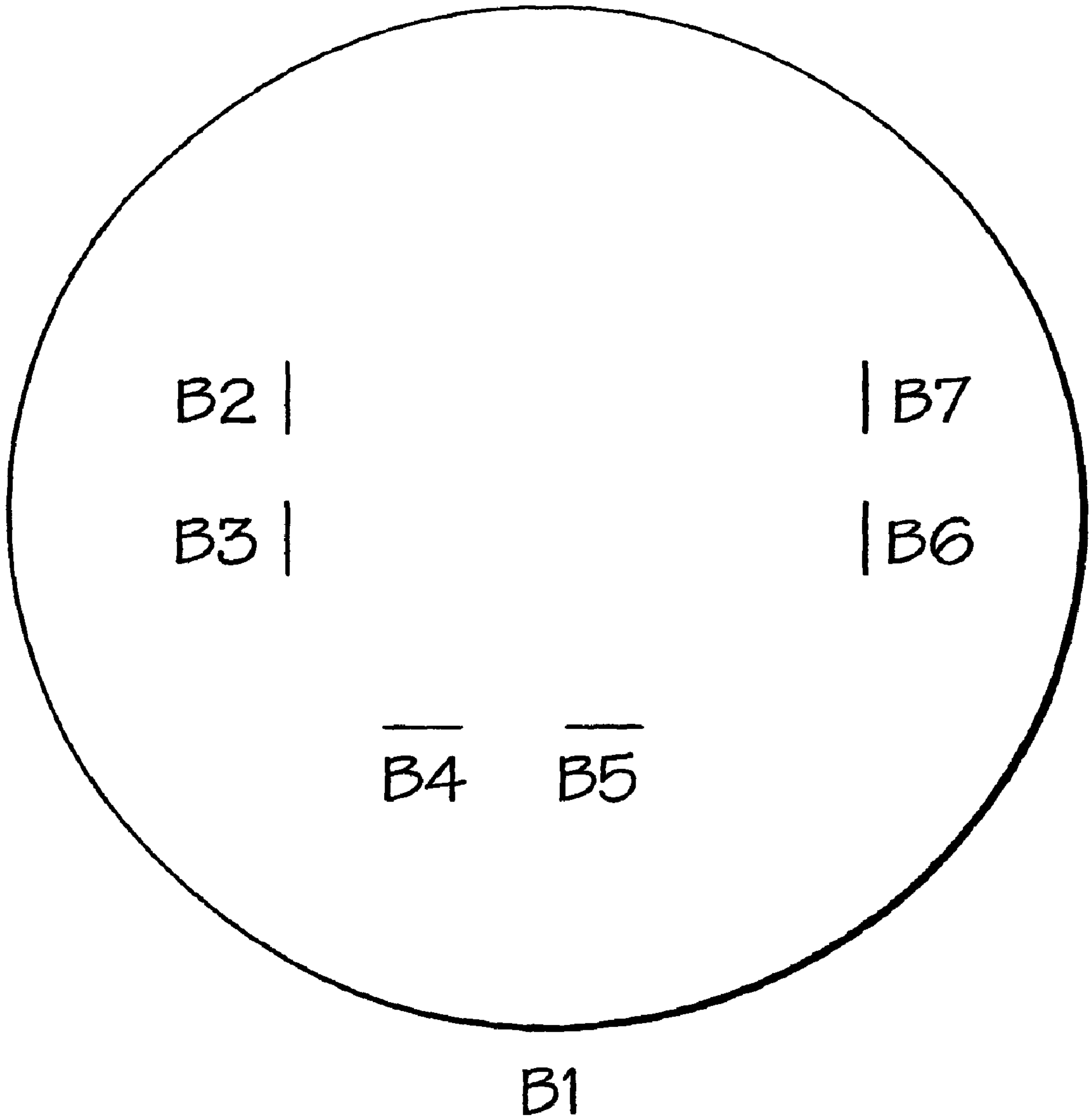
FIG. 66 shows a segmented display for the embodiment shown in FIG. 65.

Big-rig A1 may be designed to include a video display which outputs only those pixels from cameras A2-A7 which are within the preset range. Alternatively, big-rig A1 may be designed to include a simple and inexpensive segmented display, as is shown as B1 in FIG. 66. In this segmented display, each of the segments represents the field of view of one of the stereo pairs. Thus, segment B2 represents information from camera pair A2, segment B3 represents information from camera segment B3, and so on. The display could also combine all observed segments into a unified display Display B1 may be designed so that a segment is initially illuminated when an object comes within a certain distance of the corresponding camera (e.g., five feet). Display B1 may further be designed so that the presence of an object at a closer distance (e.g., four feet) is displayed to the user in a visually distinct manner, such as by increasing the illumination of the segment, causing the segment to blink, changing the color of the segment, and so on. Display B1 may further be designed so that the segments are altered as objects come even closer (e.g., three feet, two feet and one foot), with an audible alarm to be triggered if an object comes within a certain minimum distance (e.g., six inches).

Displays such as B1 are well-known in the art, and may employ many different mechanisms for informing the driver of big-rig A1 of object proximity. The use of a non-parametric local transform algorithm for depth calculation has significant advantages in this application. Merely displaying video data from cameras located at the rear and sides of big-rig A1 would require several expensive video displays, and would present the driver with a great deal of information, most of which would be irrelevant to the driver at any given time. In addition, it might be very difficult for a driver to determine distance to an object based merely on a flat video display showing the object and the background, or to attend adequately to relatively small structures in the scene. The disclosed hardware and software may alleviate these problems.

Although big-rig A1 has been used as an exemplary application, the disclosed invention may be used in any application which requires real-time obstacle detection and avoidance in areas where a user's view may be obscured. In addition, the invention could be practiced with a larger or smaller number of cameras, which could be disposed differently than is illustrated in FIG. 65.

3. Object Detection for the Visually Impaired

A range map produced by this system will present a tactile or auditorily perceived representation of the environment to a visually impaired person. Advanced "scene understanding" is not necessary for utilizing these data, as the person is quite capable of directing the acquisition of the range measurements and interpreting them. An immediate use is in providing a range-measuring "Long Cane" to a visually handicapped person. Directing the ranging system by head or other motions delivers depth values for everything perceivable over some selectable range of distances in that area of the scene. Feedback can be through auditory means (pitch, intensity, etc) in a sequential or parallel (two-dimensional) fashion, tactile coding (single or multiple-fingering devices (T. H. Massie and J. K. Salisbury, "The Phantom Haptic Interface: A Device for Probing Virtual Objects," ASME Winter Annual Meeting, Symposium on Haptic Interfaces for Virtual Environment and Teleoperator Systems, Chicago, November 1994; J. P. Fritz, T. P. Way, and K. E. Barner, "Haptic representation of scientific data for visually impaired or blind persons," Proceedings of CSUN Technology and Persons with Disabilities Conference, 1996), arrays positioned for touch sensing or configured for finger feedback (see J. Fricke and Baehring, H., "Design of a tactile graphic I/O tablet and its integration into a personal computer system for blind users," Electronic proceedings of the 1994 EASI High Resolution Tactile Graphics Conference), and other means of communicating the depth signal in either sequential or parallel fashion. See T. Heyes, "Sonic Pathfinder: Electronic Travel Aids for the Vision Impaired. Remote sensing using Ultra-Sonics," Perceptual Alternatives, Melbourne, Australia; P. Meijer, "An Experimental System for Auditory Image Representations," IEEE Trans. Biomedical Engineering, V39, N2, 1992, 112-121.

4. Depth Estimation for Digital Mapping

There are also numerous applications of the present invention in tasks of rather traditional direct mensuration, such as photogrammetric analysis in architecture, industrial inspection, and distance measurement at both macro and micro levels, for example in digital terrain mapping and microscopic surface assessment. In all of the these, the introduction of real-time census depth computation enables faster and cheaper mapping solutions, which in turn facilitates new opportunities for exploitation.

C. Auto-Focusing

Prior art auto-focusing techniques tend to be relatively crude. In television or film production, for example, focusing on a moving object (e.g., an actor) often requires manual control by the camera operator, or pre-set focusing at certain distances, with the actors required to move in precise and pre-set ways. Auto-focusing in home video cameras often consists of circuitry which interprets the degree of "fuzziness" in an image, and changes the focus so as to reduce fuzziness and produce sharp borders between objects.

The disclosed invention may be used to auto-focus a main camera. In one such application, a main camera and secondary camera similar to those described in connection with FIG. 68, above, may be used. At the beginning of a shot, main camera D2 and secondary camera D3 may be focused on an aspect of a moving object, for example the eyes of an actor. The disclosed non-parametric local transform may be used to track that focal object from frame to frame. In each case, the focal object may be identified in frames produced by the master camera and the secondary camera, by comparing each frame to preceding frames from the same camera, and using the local transform to determine which nearby pixel in a later frame is the same as the reference pixel in the earlier frame. If a properly calibrated camera arrangement is used, such comparisons will not require image rectification.

Once the focal object has been identified in a subsequent frame, depth measurement may be used to determine whether the distance to the focal object has changed from one frame to the next. If the depth changes, the focal length of the cameras may then be automatically altered to reflect such changes. In the same manner, multiple features may be tracked for optimal focus control on the collection.

D. Video Compression

The compression of video images for storage and transmission represents one of the most difficult and important problems facing the computer and video industries. Prior art systems, such as MPEG and MPEG 2, are designed to store and transmit those portions of a frame which represent changes from other nearby frames, with unchanged portions of the scene being recreated based on earlier frames.

Such compression algorithms have difficulties when confronted with video sequences in which the background contains a great deal of clutter and/or movement. Although the background may be insignificant for purposes of the video sequence, prior-art compression systems have difficulty in distinguishing between "important" foreground movement and "unimportant" background movement, and may therefore process both types of information equally, thereby requiring a great deal of bandwidth. If the available processing power and/or bandwidth are unable to handle such video sequences, picture quality may be visibly degraded.

The disclosed invention may be useful in compression algorithms, by allowing background features to be easily distinguished from those in the foreground. A dual camera system of the type described above may be used to both calculate and store depth information for a video sequence. Such depth information may be stored as an attribute of each pixel, in a manner similar to that used to store luminance and chrominance information.

Where only limited bandwidth is available, such information would allow a compression algorithm to concentrate on sending more important foreground information. For example, in a preprocessing step, pixels representing the background of a scene (e.g., everything beyond ten feet from the cameras) might be stripped out of every other frame, and replaced with background pixels from the immediately preceding frame. thus, an entire image (background and foreground) would be stored for frame 1, but frame 2 would represent the frame 2 foreground overlaid on the frame 1 background. Background pixels obscured in frame 1, but visible in frame 2 due to foreground movement could be taken from the frame 2 background. The system could be designed to allow a user to select video sequences in which background movement is particularly important, and exempt such sequences from the described process.

These modified frames could then be presented to a standard compression device, such as an MPEG encoder. By minimizing changes in the background from frame to frame, the disclosed invention could allow such an encoder to operate more quickly and to output an encoded video stream requiring less bandwidth.

Alternatively, depth information could be used directly by an algorithm designed to take such information into account. The Z-keying described above constitutes an extreme example of one such algorithm, in which background information may be entirely removed from a video sequence prior to transmission. This may be particularly useful for applications in which background information is of no significance, such as desktop videoconferencing.

Alternatively, background information which is changing in a relatively static and uniform manner could be transmitted using a single uniform vector for each frame. For example, if a camera is moving in such a manner as to track an actor in a close-up or medium shot, background information may be completely static, except for changes introduced by the fact that the field of vision of the camera is changing. Under such circumstances, changes in the background imagery may represent a relatively simple shift in one direction. Such a shift may be easily represented by a single vector, which informs a decoding algorithm that the previous background should be used, but translated in a specified manner, with information that has been shifted in since the previous frame being supplied.

E. Immersive Displays

Virtual reality, and immersive display in general, has as its basic requirement that the position and direction of gaze of a participant be known at each instant that an image is produced for his or her viewing. Only when the visual display is very tightly coupled with the viewer's perceptual expectation—that is, when the images he or she sees are consistent with his motions—will the experience be convincing. This coupling is currently achieved through the use of externally mounted sensors on the user which are an encumbrance and distracting to the experience.

Such sensors may be replaced by a video orientation system based on the disclosed invention. In such a system, one or more stereo camera pairs would be used to precisely determine the location and orientation of the user's head in space. The disclosed non-parametric local transform could be used to track movement of specified locations on the user's head, in a manner similar to that described above. Such real-time head tracking would eliminate the need for sensors designed to precisely locate the position and orientation of the head.

F. Gaze Tracking

Tracking subject gaze direction has been an area of scientific study for a number of years. It had its beginnings in psychophysics research (see, e.g., H. D. Crane and C. M. Steele, "Generation-V Dual-Purkinje-Image Eyetracker," Applied Optics 24(4) 527-537 (1985); H. D. Crane, "The Purkinje Image Eyetracker," Visual Science and Engineering, ed. D. Kelly, Dekker Publishing, 1994), and has more recently been attempted in human-computer interface areas (see, e.g., R. J. K. Jacob, "Eye Tracking in Advanced Interface Design," *Virtual Environments and Advanced Interface Design,* 258-288, ed. W. Barfield and T. A. Furness, Oxford University Press, New York (1995)). Much of this work has used externally mounted sensing devices (see, e.g., Skalar Instruments, Inc. (now Bruxton Corporation), Electromagnetic scleral search coil system for eye tracking) or active illumination (such as LED emitters).

Unobtrusive monitoring of gaze is less common and more difficult, although preferred. Gaze tracking is made rather difficult by the need for rapid processing—the eye moves very quickly, and humans are perceptive to latencies on the order of much less than 30 milliseconds (one frame of video). Delays in knowing the position and view direction of the eyes leads to delays in determining and presenting the appropriate information, and this causes eye strain, fatigue, nausea, and irritation on the part of the viewer.

Precision is another difficulty. Many gaze-related tasks are qualitative in nature because of lack of resolution in gaze estimation. Subjects are required to position themselves within a narrow region of space, and analysis is based on assumptions about this position (see, e.g., R. J. K. Jacob, "Eye Tracking in Advanced Interface Design," *Virtual Environments and Advanced Interface Design,* 258-288, ed. W. Barfield and T. A. Furness, Oxford University Press, New York (1995)).

The present invention also enables simultaneous tracking of both eyes, so that points of fixation as well as gaze can be determined.

Prior art gaze tracking systems require either intrusive sensors, or that users be located in a small predetermined area. The disclosed invention may be used to avoid such restrictions, by allowing the gaze tracking system to quickly and accurately identify the location of a user's head and eyes. This can be accomplished by identifying the head as an object separate from the background (which is at a greater distance), and by providing accurate information regarding the shape and orientation, and localizing iris pointing and direction.

Any task where knowledge of viewer position and direction of gaze is required would benefit from the system described here. At the near range end of these applications, a computer operator could be sitting before his display using his eyes rather than a hand-operated mouse pointing device for controlling the locale of his actions, lifting and moving virtual pages, selecting objects, invoking interactive editing commands. When he moves to a Web site, his attention could be monitored for accounting purposes. At the more distant end of these applications, a three-dimension movie observer, moving about in a display environment, could be viewing an autostereoscopic display system (see, e.g., R. Ezra, et al, Sharp Labs, "Observer Tracking autostereoscopic 3D display system," Photonics West Conference, San Jose Calif., 3012-23, 1997) directing appropriate pixel data at his eyes at whatever their location.

Knowledge of view direction can also be used to reduce the bandwidth of display by presenting varying data quality selected to match the visual sensitivity of the viewer. For example, high resolution could be presented for the viewer's foveal viewing, with lower resolution presented with decreasing quality toward the periphery. In an autostereoscopic display system, this could save considerable computational and communication bandwidth.

G. Viewpoint-Dependent Displays

Virtual-reality systems generally allow a user to navigate through an artificial environment. Such environments, however, are generally constructed of animated objects. The creation of virtual worlds based on video-quality images is generally considered to be difficult to perform in an economically rational manner.

1. View Synthesis Using Range Maps

The present invention allows for the creation of video quality virtual world displays, including displays which enable view interpolation, which makes it possible to display a scene perspective that has never been acquired by a camera. See, for example, M. Levoy and P. Hanrahan, "Light Field Rendering," SIGGRAPH 97. ACM; D.Scharstein, "Stereo Vision for View Synthesis," Computer Vision and Pattern Recognition Conference, San Francisco, 852-858, 1996.

Image pixels associated with range estimates can be positioned on an image as though viewed from another perspective. This enables synthesis of viewpoint-dependent displays. Consider situations where real data is being acquired of a remote site, for example a nature preserve in Africa, with viewers located elsewhere given an experience of moving about in what appears to be the same space through this range-based view synthesis. Two or more cameras collect the imagery, and range is computed among pairs of them. We and others (see, e.g., D.Scharstein, "Stereo Vision for View Synthesis," Computer Vision and Pattern Recognition Conference, San Francisco, 852-58, 1996) have demonstrated this perceptual reconstruction off-line. The use of real-time ranging can be expected by those familiar with such methods to be a fairly direct development from these previously-demonstrated non-real-time displays.

2. 3D Scene Modeling

Constructing three-dimension representations of particular locales can be facilitated by the ranging system described above. The interior of a building, for example, could be observed in sequence by a stereo imaging system, with the successive range descriptions being integrated using both the distance measures and motion-tracked features for establishing the correspondence between range sets (see, e.g., H. Baker, R. Bolles, and J. Woodfill, "Realtime Stereo and Motion Integration for Navigation," ISPRS Spatial Information from Digital Photogrammetry and OCmputer Vision, September 1994, Munich Germany, 17-24). Such successive accumulation of range and intensity information is equally applicable to the modeling of object geometry, such as would be demonstrated in successive real-time observations of an automobile or a house from a variety of perspectives.

Figure 67:
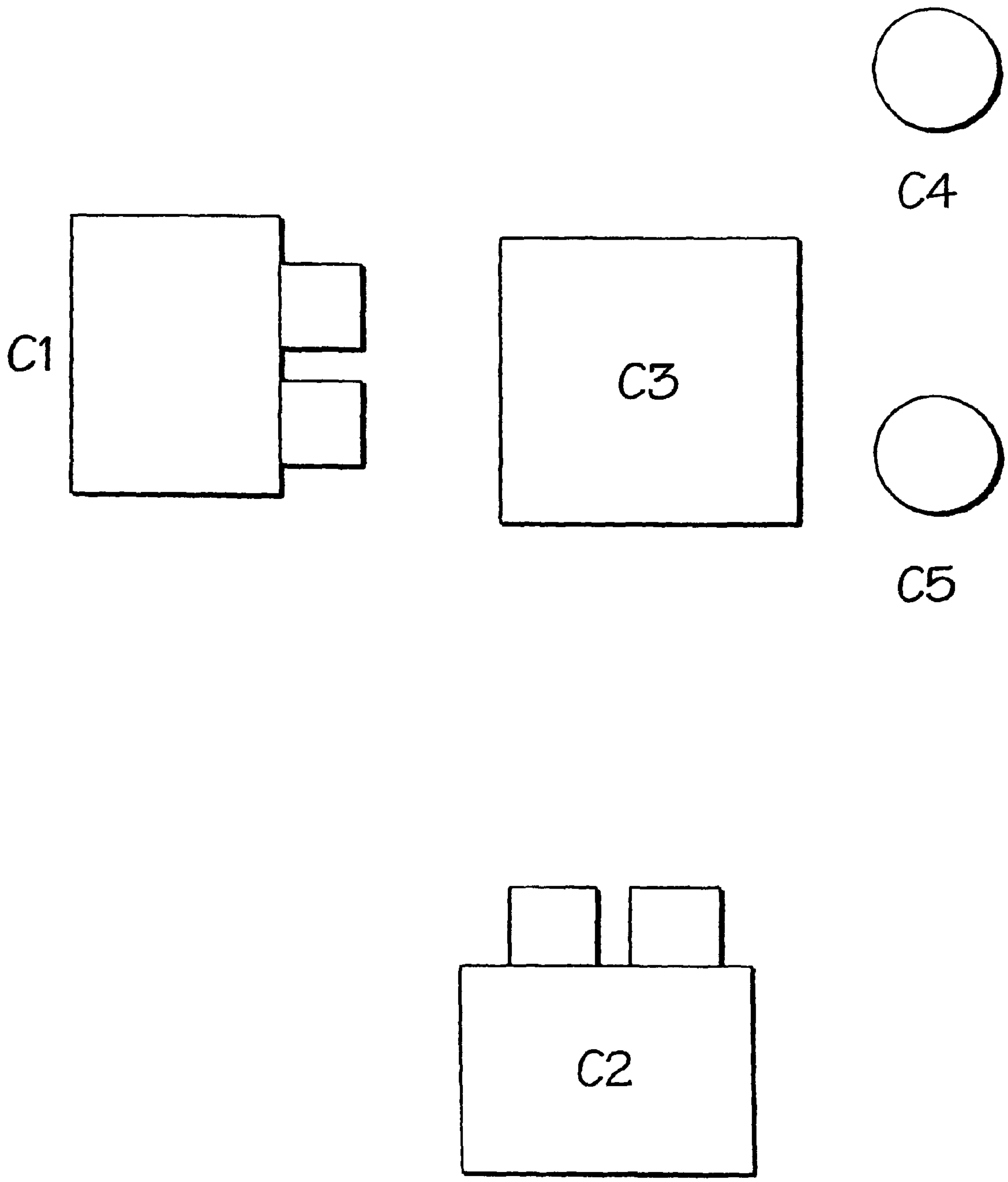
FIG. 67 shows the use of the present invention for video quality virtual world displays.

FIG. 67 represents a simple example of the use of the present invention in this application. In this Figure, stereo camera pairs C1 and C2 are disposed such that the field of view of the camera pairs crosses in, for example, a perpendicular fashion. This field of view includes building C3 and trees C4 and C5.

As is described above, each camera pair captures and stores a digital image of the scene. Each camera pair also calculates depth information for each pixel. An object in one field of view may be correlated with the same object in the other field of view by taking into account the relationship of the two camera pairs, and the distance to each object. In this way, the image of building C3 captured by stereo camera pair C1 may be correlated with the image of the same building captured by stereo camera C2. By capturing depth information efficiently and in real-time, the disclosed invention allows such correlation, which requires knowledge of the distance of each object from each camera pair, such distance information then being used to correlate the objects as shown in each image.

Once an object has been correlated in the two fields of view, a three-dimensional image of that object may be created. In FIG. 67, for example, an image of the front and one side of building C3 may be available. Capturing the other sides of this building might require camera pairs disposed at the other sides of the image.

Once a three dimensional image has been built up, a user can be allowed to navigate through that image, taking into account the perceived physical location of the user within the frame, as well as the proper perceived distance to each object.

In this example, the registration of range information was obtained by fitting two pairs of simultaneously acquired depth data sets. Another approach is to calibrate the camera sets beforehand so the data can be integrated directly, or, as mentioned above, to use camera motion to track individual features, where observed motion reveals the acquisition camera locations for data integration.

H. Motion Analysis

The motion tracking capability of the presented real-time system opens areas of application where analysis methods have been hindered by the lack of reliable and rapid spatial information. Our range and motion results taken together with dynamic models of particular processes enables advanced annotation, control, and measurement possibilities.

Consider the study of a sport or physical activity requiring specific sequences of actions, for example swimming, running, karate, or dance. It is often useful to correlate such sequences with idealized sequences representing the "proper" method of performing the activity. A two dimensional image of such an activity will fail to capture certain valuable information, since such an image does not allow for precise calculation of the distance to a portion of, for example, an athlete's body.

The disclosed range-finding invention can be used in such applications, particularly when used with stereo camera pairs oriented with perpendicular fields of view, as is illustrated in FIG. 67. Such cameras can be used to record image and depth information representing an expert athlete. Such information can then be overlaid on image and depth information representing an athlete in training. This could result, for example, in overlaid images shown from the front, back, sides, and a top-down view. In each case, differences between the expert's movements and the trainee's movements could be highlighted.

Such a capability would be equally effective for evaluation of dysfunction, such as in gait analysis (see D. A. Meglan, "Enhanced Analysis of Human Locomotion," Ohio State University, PhD Thesis, 1991) or physical therapy assessment.

I. Use of Hands as Input Devices

If a stereo camera pair is located on or near a user's video screen display, the disclosed invention would allow real-time recognition of hand gestures occurring within a defined field of view in front of the display. Thus, for example, the stereo cameras could be used to identify the location and orientation of a user's hand in a virtual sculpting application, in which the hand location and orientation is tracked to allow the user to "mold" a virtual object represented on the screen. Similarly, particular user gestures (e.g., pointing at the screen) could be used as a control mechanism for the visual display, in combination with or as a replacement for a standard mouse. See, e.g., R. J. K. Jacob, "Eye Tracking in Advanced Interface Design," *Virtual Environments and Advanced Interface Design,* 258-288, ed. W. Barfield and T. A. Furness, Oxford University Press, New York (1995).

J. Advanced Navigation and Control

Advanced navigation and control possibilities become feasible with the real-time ranging and motion analysis system described here attached to moving vehicles. In simple navigation tasks, the ranging system could act as an alert if the surface before a vehicle is not planar and horizontal. This could be used to identify obstacles (such as potholes), or to determine when a vehicle is in danger of running off of a paved surface.

Analysis of the more complex shape described by the ranging system would enable detection and discrimination of obstacles, tracking of moving objects, and coordination of multiple moving devices. Positioned at an intersection, the ranging and motion system could monitor traffic (N. Ferrier, S. Rowe, and A. Blake, "Real Time Traffic Monitoring," 2nd IEEE Workshop on Applications of Computer Vision, Sarasota, Fla., 5-7 Dec. 1994; D. Beymer, P. McLauchlan, B. Coifman and J. Malik, "A Real-time Computer Vision System for Measuring Traffic Parameters," Computer Vision and Pattern Recognition Conference, Puerto Rico, 1997), pedestrians, and other interacting street elements, function as a specialized alarm, invoking specific actions for certain predetermined situations (such as moderating the force of an airbag when a child is determined to be sitting in the car seat; directing sound or water at an intruder determined to be a cat, deer, etc.; alerting a person entering a controlled zone to the danger of his presence or redirecting hazardous activity around him; inspecting and evaluating a variety of materials such as garbage, recyclables, fruit, etc.,).

Installed on the periphery of a vehicle, the present invention will provide information for navigation and obstacle-avoidance control. Forward range and motion measurements indicate the presence, position, and velocity of other vehicles and potential obstacles, as well as the position with respect to the road of the vehicle itself. Side and rear range measurements provide equally important information about vehicle lateral drift, other approaching vehicles, and general maneuvering status. The real-time high-bandwidth nature of the present invention's processing will enable vehicle convoys to be safely coupled for high-speed travel at close proximity. It may also be used as the basis for autonavigation in close-range maneuvering, such as parking and docking.

VI. Summary

In summary, the various aspects of the present invention include the software/algorithm, hardware implementations, and applications, either alone or in combination. These embodiments analyze data sets, determine their relatedness, and extract substantive attribute information contained in these data sets. In one form, the data sets are obtained internal to some process or from some external stimuli. In another form, these data sets are image data from two spatially-displaced cameras viewing the same scene. The various embodiments transform the data into a more usable form (e.g., census transform) and then correlate the transformed data to generate an output that represents some desired substantive information that can be derived from the relationship of the two data sets.

Some embodiments of the present invention in the image processing field define and apply a local transform that tolerates factionalism. Furthermore, the present invention possesses other properties that reveals its advance over the current state of the art: (1) High sensitivity—the local transform produces data that provide significant local variation within a given image; it produces a dense set of result values. Some other methods produce sparse results; (2) High stability—the scheme produces similar results near corresponding points between the two images; (3) The transform produces results that are invariant of sensor or camera hardware differences in image gain or bias to adequately handle stereo imagery; (4) The present invention is more space-efficient than other algorithms. It requires only a small set of storage buffers along with the two images for processing. This space-efficient feature reduces the overhead required for the hardware implementation, and increases processing speed by using more local references; (5) The present invention is more time-efficient than other algorithms because it has an inner loop that requires only at most 4 operations per pixel per disparity; (6)

Some embodiments of the present invention includes a unique confidence measure, called the interest operation, for determining the point at which stereo readings are reliable or unreliable; and (7) Industrial application of the present invention to various disciplines requiring real-time feature tracking and localization enables functionality not presently available and greatly enhances reliability of the process.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. One skilled in the art will readily appreciate that other applications may be substituted for those set forth herein without departing from the spirit and scope of the present invention. Accordingly, the invention should only be limited by the Claims included below.

We claim:

1. A method of generating disparity results with low latency in an image processing system that processes elements of a first set of image data and a second set of image data, each having a plurality of elements, comprising:

generating, using a processor, a disparity result for a first element before all elements of the first data set and the second data set have been received.

2. The method of claim 1, further comprising recognizing a hand gesture in order to control an application by tracking a location and an orientation of a user's hand based at least in part on the disparity result.

3. The method of claim 2, wherein the application includes providing instructions for a visual display.

4. The method of claim 1, further comprising alerting a person entering a controlled zone to a danger or redirecting hazardous activity around the person based at least in part on the disparity result.

5. The method of claim 1, further comprising detecting a position of one or more vehicles and/or one or more pedestrians for a traffic monitoring application based at least in part on the disparity result.

6. The method of claim 1, further comprising determining whether an object associated with the first element is moving by calculating a motion associated with the object as the object appears in a first image and in a second image taken at different times.

7. A system for generating disparity results with low latency in an image processing system that processes elements of a first set of image data and a second set of image data, each having a plurality of elements, comprising:

a processor configured to generate a disparity result for a first element before all elements of the first data set and the second data set have been received; and an input interface coupled to the processor and configured to receive the first set of image data and the second set of image data; and an output interface coupled to the processor and configured to provide the disparity result.

8. A method of generating a disparity result with low latency in a data processing system that processes elements of a first set of data and a second set of data, each having a plurality of elements, comprising:

performing a transformation on a first subset of one or more elements and a second subset of one or more elements of a first data set;

performing a transformation on a third subset of one or more elements and a fourth subset of one or more elements of a second data set;

generating a first correlation result by correlating a transformed first subset of one or more elements with a transformed third subset of one or more elements; and generating a second correlation result, concurrently with generating the first correlation result, by correlating a transformed second set of one or more elements with a transformed fourth subset of one or more elements, and generating a disparity result based at least in part on the first correlation result and the second correlation result.

9. The method of claim 8, wherein the first subset and the second subset contain the same elements.

10. The method of claim 8, further comprising recognizing a hand gesture in order to control an application by tracking a location and an orientation of a user's hand based at least in part on the correlation result.

11. The method of claim 10, wherein the application includes providing instructions for a visual display.

12. The method of claim 8, further comprising alerting a person entering a controlled zone to a danger or redirecting hazardous activity around the person based at least in part on the correlation result.

13. The method of claim 8, further comprising detecting a position of one or more vehicles and/or one or more pedestrians for a traffic monitoring application based at least in part on the correlation result.

14. The method of claim 8, further comprising determining whether an object associated with the transformed first subset of one or more elements is moving by calculating a motion associated with the object as the object appears in a first image and in a second image taken at different times.

15. A system for generating a disparity result with low latency in a data processing system that processes elements of a first set of data and a second set of data, each having a plurality of elements, comprising:

a processor configured to:

perform a transformation on a first subset of one or more elements and a second subset of one or more elements of a first data set;

perform a transformation on a third subset of one or more elements and a fourth subset of one or more elements of a second data set;

generate a first correlation result by correlating a transformed first subset of one or more elements with a transformed third subset of one or more elements; and generate a second correlation result, concurrently with generating the first correlation result, by correlating a transformed second set of one or more elements with a transformed fourth subset of one or more elements;

generate a disparity result based at least in part on the first correlation result and the second correlation result; and an input interface coupled to the processor and configured to receive the first set of data and the second set of data; and an output interface coupled to the processor and configured to provide the disparity result.

16. The system of claim 15, wherein an application processor is configured to recognize a hand gesture in order to control an application by tracking a location and an orientation of a user's hand based at least in part on the disparity result.

17. The system of claim 16, wherein the application includes providing instructions for a visual display.

18. The system of claim 15, wherein an application processor is configured to alert a person entering a controlled zone to a danger or redirecting hazardous activity around the person based at least in part on the disparity result.

19. The system of claim 15, wherein an application processor is configured to detect a position of one or more vehicles and/or one or more pedestrians for a traffic monitoring application based at least in part on the disparity result.

20. The system of claim 15, wherein an application processor is configured to determine whether an object associated with the first element is moving by calculating a motion associated with the object as the object appears in a first image and in a second image taken at different times.

21. The system of claim 15, wherein the first subset and the second subset contain the same elements.

22. The system of claim 15, wherein an application processor is configured to recognize a hand gesture in order to control an application by tracking a location and an orientation of a user's hand based at least in part on the correlation result.

23. The system of claim 22, wherein the application includes providing instructions for a visual display.

24. The system of claim 15, wherein an application processor is configured to alert a person entering a controlled zone to a danger or redirecting hazardous activity around the person based at least in part on the correlation result.

25. The system of claim 15, wherein an application processor is configured to detect a position of one or more vehicles and/or one or more pedestrians for a traffic monitoring application based at least in part on the correlation result.

26. The system of claim 15, wherein an application processor is configured to determine whether an object associated with the transformed first subset of one or more elements is moving by calculating a motion associated with the object as the object appears in a first image and in a second image taken at different times.

* * * * *